US011448850B2

(12) United States Patent
Tsai et al.

(10) Patent No.: US 11,448,850 B2
(45) Date of Patent: Sep. 20, 2022

(54) OPTICAL MEMBER DRIVING MECHANISM

(71) Applicant: TDK TAIWAN CORP., Taoyuan (TW)

(72) Inventors: Sung-Mao Tsai, Taoyuan (TW); Liang-Ting Ho, Taoyuan (TW); Chao-Chang Hu, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 784 days.

(21) Appl. No.: 16/257,376

(22) Filed: Jan. 25, 2019

(65) Prior Publication Data

US 2019/0227300 A1 Jul. 25, 2019

Related U.S. Application Data

(60) Provisional application No. 62/785,593, filed on Dec. 27, 2018, provisional application No. 62/782,664, (Continued)

(51) Int. Cl.
*G02B 26/08* (2006.01)
*G02B 7/09* (2021.01)
(Continued)

(52) U.S. Cl.
CPC ............. *G02B 7/023* (2013.01); *F03G 7/065* (2013.01); *G02B 3/14* (2013.01); *G02B 6/0025* (2013.01);
(Continued)

(58) Field of Classification Search
CPC ............ G02B 26/0841; G02B 26/0833; G02B 26/101; G02B 26/085; G02B 26/105; G02B 26/0816; G02B 27/0172; G02B 26/0808; G02B 26/0825; G02B 26/0875; G02B 26/10; G02B 6/1225; G02B 7/023; G02B 7/1821; G02B 13/22; G02B 17/0642; G02B 17/0663; G02B 17/0694; G02B 2027/011; G02B 2027/0174; G02B 21/002; G02B 21/0032; G02B 21/0048; G02B 21/006; G02B 21/0076; G02B 21/008; G02B 21/0096; G02B 21/16; G02B 21/18; G02B 26/00; G02B 26/008; G02B 26/026;
(Continued)

(56) References Cited

U.S. PATENT DOCUMENTS

2018/0234004 A1* 8/2018 Moto .................. G02B 27/646
2019/0011809 A1* 1/2019 Wippermann ......... G03B 13/34
2020/0132980 A1* 4/2020 Kuenlin ................... H02K 1/12

* cited by examiner

*Primary Examiner* — Collin X Beatty
*Assistant Examiner* — Grant A Gagnon
(74) *Attorney, Agent, or Firm* — Muncy, Geissler, Olds & Lowe, P.C.

(57) ABSTRACT

An optical member driving mechanism is provided, including a fixed portion, a movable portion, and a driving module, wherein the movable portion is movably connected to the fixed portion and includes an optical member holder and a spacing member. The optical member holder can support an optical member and has a surface facing the optical member. The optical member can change the moving direction of an external light. The spacing member is disposed between the surface and the optical member, and a gap is formed between the surface and the optical member. The driving module can drive the movable portion to move relative to the fixed portion.

20 Claims, 324 Drawing Sheets

Related U.S. Application Data filed on Dec. 20, 2018, provisional application No. 62/780,077, filed on Dec. 14, 2018, provisional application No. 62/760,320, filed on Nov. 13, 2018, provisional application No. 62/753,716, filed on Oct. 31, 2018, provisional application No. 62/711,036, filed on Jul. 27, 2018, provisional application No. 62/703,147, filed on Jul. 25, 2018, provisional application No. 62/688,694, filed on Jun. 22, 2018, provisional application No. 62/682,671, filed on Jun. 8, 2018, provisional application No. 62/625,600, filed on Feb. 2, 2018, provisional application No. 62/621,967, filed on Jan. 25, 2018.

(51) Int. Cl.

| | |
|---|---|
| ***G02B 7/02*** | (2021.01) |
| ***G02B 27/64*** | (2006.01) |
| ***G03B 9/14*** | (2021.01) |
| ***G02B 13/00*** | (2006.01) |
| ***G02B 7/182*** | (2021.01) |
| ***H04N 5/225*** | (2006.01) |
| ***G02B 7/08*** | (2021.01) |
| ***G03B 9/06*** | (2021.01) |
| ***F03G 7/06*** | (2006.01) |
| ***G03B 5/00*** | (2021.01) |
| ***G03B 13/36*** | (2021.01) |
| ***H02K 41/035*** | (2006.01) |
| ***G02B 7/10*** | (2021.01) |
| ***G06F 1/16*** | (2006.01) |
| ***H04N 5/235*** | (2006.01) |
| ***G02B 3/14*** | (2006.01) |
| ***G02B 26/00*** | (2006.01) |
| ***G02B 27/00*** | (2006.01) |
| ***G03B 17/17*** | (2021.01) |
| ***F21V 8/00*** | (2006.01) |
| ***G02B 27/09*** | (2006.01) |
| ***G09G 5/00*** | (2006.01) |
| ***G02B 7/18*** | (2021.01) |
| ***G06T 7/521*** | (2017.01) |
| ***G06T 7/00*** | (2017.01) |
| ***G06T 15/08*** | (2011.01) |
| *G03B 5/04* | (2021.01) |
| *G02B 5/00* | (2006.01) |

(52) U.S. Cl.

CPC ............. *G02B 6/0066* (2013.01); *G02B 7/08* (2013.01); *G02B 7/09* (2013.01); *G02B 7/102* (2013.01); *G02B 7/182* (2013.01); *G02B 7/1805* (2013.01); *G02B 7/1821* (2013.01); *G02B 13/009* (2013.01); *G02B 13/0065* (2013.01); *G02B 13/0075* (2013.01); *G02B 26/004* (2013.01); *G02B 26/0816* (2013.01); *G02B 26/0883* (2013.01); *G02B 27/0068* (2013.01); *G02B 27/0955* (2013.01); *G02B 27/0972* (2013.01); *G02B 27/0977* (2013.01); *G02B 27/646* (2013.01); *G03B 5/00* (2013.01); *G03B 9/06* (2013.01); *G03B 9/14* (2013.01); *G03B 13/36* (2013.01); *G03B 17/17* (2013.01); *G06F 1/1686* (2013.01); *G06T 7/521* (2017.01); *G06T 7/97* (2017.01); *G06T 15/08* (2013.01); *G09G 5/003* (2013.01); *H02K 41/0356* (2013.01); *H04N 5/2252* (2013.01); *H04N 5/2253* (2013.01); *H04N 5/2254* (2013.01); *H04N 5/2256* (2013.01); *H04N 5/2257* (2013.01); *H04N 5/2258* (2013.01); *H04N 5/2353* (2013.01); *G02B 5/003* (2013.01); *G02B 13/004* (2013.01); *G03B 5/04* (2013.01); *G03B 2205/0007* (2013.01); *G03B 2205/0015* (2013.01); *G03B 2205/0069* (2013.01); *G06T 2207/10028* (2013.01); *G06T 2207/10048* (2013.01); *G09G 2354/00* (2013.01)

(58) Field of Classification Search

CPC .. G02B 26/0858; G02B 26/12; G02B 26/121; G02B 26/123; G02B 26/125; G02B 27/0068; G02B 27/0093; G02B 27/0101; G02B 27/0149; G02B 27/017; G02B 27/40; G02B 30/50; G02B 5/005; G02B 5/20; G02B 5/32; G02B 6/3518; G02B 6/357; G02B 6/3578; G02B 6/359; G02B 7/021; G03B 21/28; G03B 21/005; G03B 21/00; G03B 21/006; G03B 21/008; G03B 21/14; G03B 21/142; G03B 21/26; G03B 35/16; G03B 35/18; H04N 9/3129; H04N 13/339; H04N 1/1017; H04N 5/74; H04N 13/20; H04N 13/302; H04N 13/363; H04N 13/388; H04N 1/02865; H04N 1/03; H04N 1/0303; H04N 1/10; H04N 1/1008; H04N 1/1135; H04N 1/192; H04N 1/193; H04N 2201/02462; H04N 2201/02481; H04N 2201/02493; H04N 2201/02495; H04N 2201/0471; H04N 2201/04718; H04N 2201/04732; H04N 2201/04737; H04N 5/2254; H04N 5/2352; H04N 5/2353; H04N 9/3114; H04N 9/317; H04N 9/3182; G09G 3/002; G09G 2310/0235; G09G 2320/0626; G09G 2320/0666; G09G 2320/0693; G09G 3/003; G09G 3/02; G09G 3/3406; G09G 3/346; G09G 5/00; G06T 2207/20212; G06T 2207/30041; G06T 2207/30148; G06T 7/0004; H02K 21/22; H02K 29/08; H02K 7/14

USPC ........................................................ 359/221

See application file for complete search history.

9-A-9-A'

12-M1

12-1200

OPTICAL MEMBER DRIVING MECHANISM

CROSS REFERENCE TO RELATED APPLICATIONS

The present application claims priority to U.S. Provisional Patent Application No. 62/621,967, filed on Jan. 25, 2018, No. 62/625,600, filed on Feb. 2, 2018, No. 62/682,671, filed on Jun. 8, 2018, No. 62/688,694, filed on Jun. 22, 2018, No. 62/703,147, filed on Jul. 25, 2018, No. 62/711,036, filed on Jul. 27, 2018, No. 62/753,716, filed on Oct. 31, 2018, No. 62/760,320, filed on Nov. 13, 2018, No. 62/780,077, filed on Dec. 14, 2018, No. 62/782,664, filed on Dec. 20, 2018, No. 62/785,593, filed on Dec. 27, 2018, which are incorporated by reference herein in their entirety.

BACKGROUND OF THE INVENTION

Field of the Invention

The application relates in general to an optical member driving mechanism, and in particular, to an optical member driving mechanism disposed in a reflecting unit.

Description of the Related Art

Thanks to technological advancements, the latest consumer electronic devices (such as tablet computers and smartphones) now usually include a lens module capable of aiding in photography or recording video. These electronic devices have become commonplace, and have been developed to be more convenient and thin. More and more choices are available for users to choose from. However, when a lens with long focal length is disposed in the electronic device, the thickness of the electronic device is increased, and as such it is hard to make the electronic device thin.

BRIEF SUMMARY OF INVENTION

To address the deficiencies of conventional products, an embodiment of the invention provides an optical member driving mechanism, including a fixed portion, a movable portion, and a driving module, wherein the movable portion is movably connected to the fixed portion and includes an optical member holder and a spacing member. The optical member holder can support an optical member and has a surface facing the optical member. The optical member can change the moving direction of an external light. The spacing member is disposed between the surface and the optical member, and a gap is formed between the surface and the optical member. The driving module can drive the movable portion to move relative to the fixed portion.

In some embodiments, the spacing member is adjacent to the edge of the surface, the optical member driving mechanism further comprises an adhesive member, and the optical member holder further comprises an attaching wall and a glue slot. The attaching wall is connected to the surface. The adhesive member is disposed between the attaching wall and the optical member. The glue slot is formed on the surface and adjacent to the attaching wall, and used to accommodate at least a portion of the adhesive member. In some embodiments, the attaching wall comprises a groove extending to a lateral side of the attaching wall.

In some embodiments, the optical member holder further comprises an abutting surface, and the optical member holder comprises a cutting surface, wherein the abutting surface connects the surface and faces the cutting surface, and the abutting surface and the cutting surface are substantially parallel.

Another embodiment of the invention provides an optical member driving mechanism, including a fixed portion, a movable portion, a driving module, and a damping member. The movable portion is movably connected to the fixed portion and includes an optical member holder to support an optical member. The optical member can change the moving direction of an external light from a first direction to a second direction. The driving module can drive the movable portion to rotate relative to the fixed portion around a rotation axis, and the rotation axis is substantially perpendicular to the first direction and the second direction. The damping member is connected to the fixed portion and the movable portion, and disposed away from the rotation axis.

In some embodiments, the optical member driving mechanism further comprises a plurality of damping members, and the center of the optical member holder is disposed between the damping members.

In some embodiments, the optical member driving mechanism further comprises an elastic member. The elastic member comprises a first fixing section, a second fixing section, and a string section. The first fixing section and the second fixing section are respectively affixed to the fixed portion and the movable portion, and the string section is connected to the first fixing section and the second fixing section. The damping member is connected to the string section and the first fixing section, or the string section and the second fixing section.

Another embodiment of the invention provides an optical member driving mechanism, including a fixed portion, a movable portion, a driving module, and a plurality of elastic members. The movable portion is movably connected to the fixed portion and includes an optical member holder to support an optical member. The optical member can change the moving direction of an external light from a first direction to a second direction. The driving module can drive the movable portion to rotate relative to the fixed portion around a rotation axis, and the rotation axis is substantially perpendicular to the first direction and the second direction. Each of the elastic members comprises a first fixing section, a second fixing section, and a string section. The first fixing section and the second fixing section are respectively affixed to the fixed portion and the movable portion, and the string section is connected to the first fixing section and the second fixing section. The second fixing sections of the elastic members are coplanar.

In some embodiments, the optical member holder comprises a plurality of positioning pillars, and the elastic members comprise a plurality of positioning recesses corresponding to the positioning pillars. The optical member driving mechanism further comprises a glue connected the positioning pillars and the second fixing sections. The elastic member and the optical member overlap as seen from the rotation axis. The fixed portion further comprises a toughened component and a circuit board, wherein the toughened component is disposed on the circuit board, and the circuit board is disposed between the toughened component and the driving module.

Another embodiment of the invention provides an optical member driving mechanism, including a fixed portion, a movable portion, a rotation restricting structure, and a driving module. The movable portion is movably connected to the fixed portion and includes an optical member holder to support an optical member. The optical member can change the moving direction of an external light from a first direction to a second direction. The rotation restricting structure is formed on the optical member holder and restricts the rotating range of the movable portion. The driving module can drive the movable portion to rotate relative to the fixed portion around a rotation axis, and the rotation axis is substantially perpendicular to the first direction and the second direction.

In some embodiments, the rotation restricting structure can restrict the shift range of the movable portion.

In some embodiments, the movable portion further comprises a plurality of shift restricting structures, formed on the optical member holder and restricting the shifting distance of the movable portion along the rotation axis. When the movable portion rotates relative to the fixed portion and the rotation restricting structure contacts the fixed portion, a gap is formed between the shift restricting structure and the fixed portion. When the movable portion shifts relative to the fixed portion and the shift restricting structure contacts the fixed portion, a gap is formed between the rotation restricting structure and the fixed portion.

Another embodiment of the invention provides an optical member driving mechanism, including a fixed portion, a movable portion, and a driving module. The movable portion is elastically connected to the fixed portion and includes an optical member holder to support an optical member. The optical member can change the moving direction of an external light from a first direction to a second direction. The driving module can drive the movable portion to rotate relative to the fixed portion around a rotation axis, and the rotation axis is substantially perpendicular to the first direction and the second direction. The fixed portion has at least three extending portions protruding from a lateral surface of the fixed portion. Furthermore, each of the extending portions has a contacting surface, and the contacting surfaces of the extending portions are coplanar.

Another embodiment of the invention provides an optical member driving mechanism, including a fixed portion, a movable portion, and a driving module. The movable portion is elastically connected to the fixed portion and includes an optical member holder to support an optical member. The optical member can change the moving direction of an external light from a first direction to a second direction. The driving module can drive the movable portion to rotate relative to the fixed portion around a rotation axis, and the rotation axis is substantially perpendicular to the first direction and the second direction. The fixed portion has an outer surface, and the optical member has a light-entering surface, wherein the light-entering surface is disposed between the outer surface and the optical member holder.

In some embodiments, the light-entering surface is disposed between the outer surface and the optical member holder during the movement of the movable portion relative to the fixed portion.

BRIEF DESCRIPTION OF DRAWINGS

The invention can be more fully understood by reading the subsequent detailed description and examples with references made to the accompanying drawings, wherein:

FIG. 1-1B is an exploded-view diagram of a first optical module according to an embodiment of the disclosure;

FIG. 1-2A is a schematic diagram of an electronic device according to another embodiment of the disclosure;

FIG. 1-2B is a schematic diagram of a first optical module according to another embodiment of the disclosure;

FIG. 1-2C is a schematic diagram of a reflecting unit according to another embodiment of the disclosure;

FIG. 1-2D is a exploded-view diagram of the reflecting unit according to another embodiment of the disclosure;

FIG. 1-2E is a cross-sectional view along line 1-A-1-A' in FIG. 1-2C;

FIG. 1-2F is a side view of an optical member holder according to another embodiment of the disclosure;

FIG. 1-3A is a schematic diagram of a reflecting unit according to another embodiment of the disclosure;

FIG. 1-3B is a bottom view of the reflecting unit according to another embodiment of the disclosure;

FIG. 1-4A is a exploded-view diagram of a reflecting unit according to another embodiment of the disclosure;

FIG. 1-4B is a schematic diagram of the reflecting unit according to another embodiment of the disclosure;

FIG. 1-5A is a schematic diagram of a reflecting unit according to another embodiment of the disclosure;

FIG. 1-5B is a front view of the reflecting unit according to another embodiment of the disclosure;

FIG. 1-6A is a schematic diagram of a reflecting unit according to another embodiment of the disclosure;

FIG. 1-6B is a cross-sectional view of the reflecting unit according to another embodiment of the disclosure;

FIG. 1-7A is a schematic diagram of an electronic device according to another embodiment of the disclosure;

FIG. 1-7B is a schematic diagram of an optical member in a first angle according to another embodiment of the disclosure;

FIG. 1-7C is a schematic diagram of the optical member in a second angle according to another embodiment of the disclosure;

FIG. 1-7D is a schematic diagram of a reflecting unit according to another embodiment of the disclosure;

FIG. 1-7E is a front view of the reflecting unit according to another embodiment of the disclosure;

FIG. 1-8A is a schematic diagram of an optical member in a first angle according to another embodiment of the disclosure;

FIG. 1-8B is a schematic diagram of the optical member in a second angle according to another embodiment of the disclosure:

FIG. 1-9A is a schematic diagram of an electronic device according to another embodiment of the disclosure;

FIG. 1-9B is a schematic diagram of a first optical module, a third optical module, and a reflecting unit according to another embodiment of the disclosure; and FIG. 1-10 is a schematic diagram of a lens unit according to some embodiments of the disclosure.

FIG. 2-1 is a schematic diagram of an electronic device according to an embodiment of the disclosure;

FIG. 2-2 is a schematic diagram of an optical system according to an embodiment of the disclosure;

FIG. 2-3 is a schematic diagram of a reflecting unit according to an embodiment of the disclosure;

FIG. 2-4 is an exploded-view diagram of the reflecting unit according to an embodiment of the disclosure;

FIG. 2-5 is a schematic diagram of an optical member holder according to an embodiment of the disclosure;

FIG. 2-6 is a schematic diagram, of an optical member disposed on the optical member holder according to an embodiment of the disclosure;

FIG. 2-7 is a schematic diagram of the reflecting unit according to an embodiment of the disclosure, wherein a frame is omitted;

FIG. 2-8 is a side view of the reflecting unit according to an embodiment of the disclosure, wherein a cover is omitted;

FIG. 2-9 is a side view of the reflecting unit according to an embodiment of the disclosure, wherein the cover and the frame are omitted; and FIG. 2-10 a schematic diagram of the reflecting unit according to an embodiment of the disclosure, wherein the frame and the elastic member are omitted;

FIG. 3-1 is a schematic diagram of a camera system according to an embodiment of the present disclosure.

FIG. 3-2 is a diagram of a lens module and a photosensitive element of the photosensitive module in FIG. 3-1 of the present disclosure.

FIG. 3-3 is a schematic diagram of a camera system according to another embodiment of the present disclosure.

FIG. 3-4 is a schematic diagram of a camera system according to another embodiment of the present disclosure.

FIG. 3-5 is a schematic diagram of a camera system according to another embodiment of the present disclosure.

FIG. 4-1 is a perspective view illustrating an optical member driving mechanism in accordance with an embodiment of the present disclosure.

FIG. 4-2 is an exploded view illustrating the optical member driving mechanism shown in FIG. 4-1.

FIG. 4-3 is a perspective view illustrating the interior of the optical member driving mechanism shown in FIG. 4-1.

FIG. 4-4 is a schematic view illustrating the optical member driving mechanism as viewed in a light exit direction.

FIG. 4-5 is a schematic view illustrating a carrier as viewed in a light incident direction.

FIG. 4-6 is a cross-sectional view along line 4-B shown in FIG. 4-5.

FIG. 4-7 is a cross-sectional view illustrating the carrier shown in FIG. 4-6 with an optical member.

FIG. 4-8A is a perspective view illustrating the separated carrier and base in accordance with another embodiment of the present disclosure.

FIG. 4-8B is a plane view illustrating the carrier and the base shown in FIG. 4-8A.

FIG. 4-9 is a cross-sectional view along line 4-A shown in FIG. 4-1.

FIG. 4-10A is a schematic view illustrating the optical member driving mechanism shown in FIG. 4-1 as viewed in a light incident direction.

FIG. 4-10B is a schematic view illustrating the optical member driving mechanism shown in FIG. 4-1 as viewed in a light exit direction.

FIG. 5-1 is a perspective view of a lens unit in accordance with some embodiments of this disclosure.

FIG. 5-2A is an exploded view of the lens unit of FIG. 5-1.

FIG. 5-2B and FIG. 5-2C are schematic views of the arrangement of the magnets and the coils of the second driving assembly.

FIGS. 5-3A to 5-3C are top views of a first driving assembly.

FIG. 5-4 is a cross-sectional view illustrated along the line 5-A-5-A' of FIG. 5-1.

FIG. 5-5 is a plan view of the lens unit with a portion of elements omitted in accordance with some embodiments of this disclosure.

FIG. 5-6 is a perspective view of the lens unit with a portion of the element omitted in accordance with some embodiments of this disclosure.

FIG. 5-7 is a schematic view of the lens unit and a driving unit in accordance with some embodiments of this disclosure.

FIG. 5-8A is a perspective view of the lens unit, a reflecting unit, a lens holding unit in accordance with some embodiments of this disclosure.

FIG. 5-8B is a perspective view of the lens unit, the reflecting unit, the lens holding unit in accordance with some embodiments of this disclosure.

FIG. 5-9 is a perspective view of the reflecting unit in accordance with some embodiment of this disclosure.

FIG. 5-10 is a cross-sectional view illustrated along the line 5-B-5-B' of FIG. 5-9.

FIG. 5-11 is a perspective view of a lens unit in accordance with some embodiments of this disclosure.

FIG. 5-12 is a cross-sectional view illustrated along the line 5-C-5-C' of FIG. 5-11.

FIG. 6-1 is a perspective view of an image capturing device according to some embodiments of the present disclosure.

FIG. 6-2A is an exploded view of the image capturing device in FIG. 6-1.

FIG. 6-2B is an exploded view of an image capturing device according to some embodiments of the present disclosure.

FIG. 6-3 is a cross sectional view illustrated along a line 6-A-A' in FIG. 6-1.

FIG. 6-4 is a schematic view showing the position relationship between some elements of the image capturing device in FIG. 6-1.

FIG. 6-5 is a schematic view of the position relationship between some elements of the image capturing device according to some embodiments of the present disclosure.

FIG. 6-6 is a schematic view of the position relationship between some elements of the image capturing device according to some embodiments of the present disclosure.

FIG. 6-7 is a schematic view of the position relationship between some elements of the image capturing device according to some embodiments of the present disclosure.

FIG. 6-8 is a schematic view of the position relationship between some elements of the image capturing device according to some embodiments of the present disclosure.

FIG. 7-1 is an exploded view of an optical element driving mechanism according to the present disclosure.

FIG. 7-2A is a schematic view of a first shutter of the optical element driving mechanism according to the present disclosure.

FIG. 7-2B is a schematic view of a second shutter of the optical element driving mechanism according to the present disclosure.

FIG. 7-3 is a schematic view of a shutter driving member of the optical element driving mechanism according to the present disclosure.

FIGS. 7-4A and 7-4B are schematic views of magnetic pole directions of a first magnetic element and second magnetic element of the shutter driving member of the optical element driving mechanism according to the present disclosure.

FIGS. 7-5A, 7-5B and 7-5C are schematic views of the relationship of relative positions of the first shutter and the second shutter of the optical element driving mechanism according to the present disclosure.

FIGS. 7-6A and 7-6B are schematic views of the relationship of relative positions of the first shutter, the second shutter and a supporting plate of the optical element driving mechanism according to the present disclosure.

FIG. 7-7A is a top view of the optical element driving mechanism according to the present disclosure.

FIG. 7-7B is a side view of the optical element driving mechanism according to the present disclosure.

FIG. 7-7C is a side view of the optical element driving mechanism according to the present disclosure.

FIG. 7-8 is a schematic view of a first stop mechanism and a second stop mechanism of the optical element driving mechanism according to the present disclosure.

FIG. 7-9 is a schematic view of the first stop mechanism and the second stop mechanism of the optical element driving mechanism according to the present disclosure.

FIG. 7-10A is a top view of a holder, a frame and an optical element stop member according to the present disclosure.

FIG. 7-10B is a bottom view of the holder, the frame and the optical element stop member according to the present disclosure.

FIG. 7-11 is a schematic view of an optical element driving mechanism with four shutters according to the present disclosure.

FIG. 8-1 is a perspective view of an optical system according to some embodiments of the present disclosure.

FIG. 8-2 is an exploded view of the optical system in FIG. 8-1.

FIG. 8-3 is a cross sectional view illustrated along the line 8-A-8-A' of FIG. 8-1.

FIG. 8-4A is an illustrative view of the top cover in FIG. 8-2.

FIG. 8-4B is an illustrative view of the bottom in FIG. 8-2.

FIG. 8-4C is an illustrative view of the aperture in FIG. 8-2.

FIG. 8-4D is an illustrative view of the aperture element in FIG. 8-2.

FIG. 8-4E is an illustrative view of the guiding element in FIG. 8-2.

FIG. 8-4F is an exploded view of the third driving assembly in FIG. 8-2.

FIG. 8-4G is an exploded view of the aperture unit in FIG. 8-2.

FIG. 8-5A is an illustrative view of the bottom and the third driving assembly of FIG. 8-2 in one condition.

FIG. 8-5B is the aperture and the guiding element of FIG. 8-2 in one condition.

FIG. 8-5C is an illustrative view of the aperture in FIG. 8-5B.

FIG. 8-6A is an illustrative view of the bottom and the third driving assembly of FIG. 8-2 in another condition.

FIG. 8-6B is the aperture and the guiding element of FIG. 8-2 in another condition.

FIG. 8-6C is an illustrative view of the aperture in FIG. 8-6B.

FIG. 8-7A is an illustrative view of the bottom and the third driving assembly of FIG. 8-2 in another condition.

FIG. 8-7B is the aperture and the guiding element of FIG. 8-2 in another condition.

FIG. 8-7C is an illustrative view of the aperture in FIG. 8-7B.

FIG. 8-8A is an illustrative view of the bottom and the third driving assembly of FIG. 8-2 in another condition.

FIG. 8-8B is the aperture and the guiding element of FIG. 8-2 in another condition.

FIG. 8-8C is an illustrative view of the aperture in FIG. 8-8B.

FIG. 9-1 is a perspective view of an aperture unit according to some embodiments of the present disclosure.

FIG. 9-2 is an exploded view of the aperture unit in FIG. 9-1.

FIG. 9-3 is a cross sectional view illustrated along the line 9-A-9-A' of FIG. 9-1.

FIG. 9-4A is a top view of the top plate in FIG. 9-2.

FIG. 9-4B is a top view of the bottom in FIG. 9-2.

FIG. 9-4C is a bottom view of the bottom in FIG. 9-2.

FIG. 9-4D is a top view of the bottom plate in FIG. 9-2.

FIG. 9-4E is a top view of some elements in FIG. 9-2.

FIG. 9-4F is a top view of the guiding element in FIG. 9-2.

FIG. 9-4G is a schematic view of the driving assembly in FIG. 9-2.

FIG. 9-5A is a schematic view showing some elements in one condition according to some embodiments of the present disclosure.

FIG. 9-5B is a schematic view showing some elements in one condition according to some embodiments of the present disclosure.

FIG. 9-6A is a schematic view showing some elements in another condition according to some embodiments of the present disclosure.

FIG. 9-6B is a schematic view showing some elements in another condition according to some embodiments of the present disclosure.

FIG. 9-7A is a schematic view showing some elements in another condition according to some embodiments of the present disclosure.

FIG. 9-7B is a schematic view showing some elements in another condition according to some embodiments of the present disclosure.

FIG. 9-8A is a schematic view showing some elements in another condition according to some embodiments of the present disclosure.

FIG. 9-8B is a schematic view showing some elements in another condition according to some embodiments of the present disclosure.

FIG. 10-1 is a perspective view of an aperture unit according to some embodiments of the present disclosure.

Figures 1, 1A:
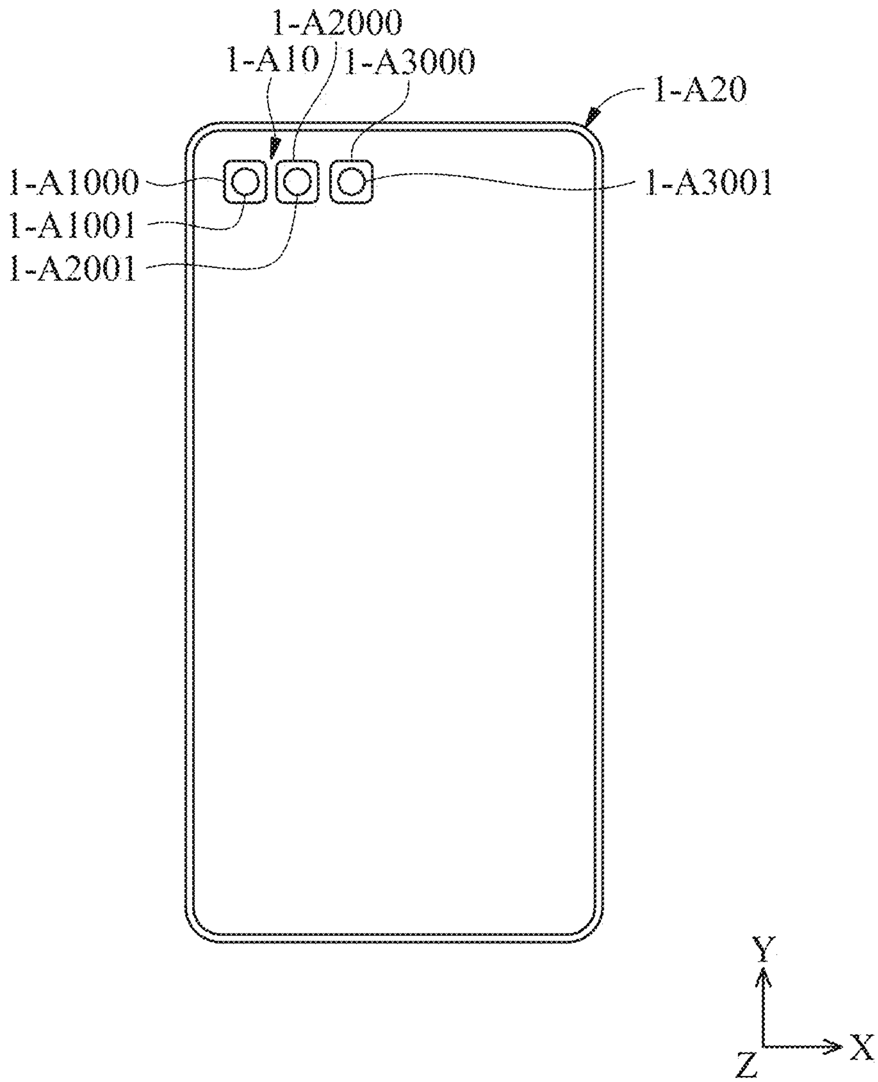
FIG. 1-1A is a schematic diagram of an electronic device according to an embodiment of the disclosure.
Figures 1, 1B:
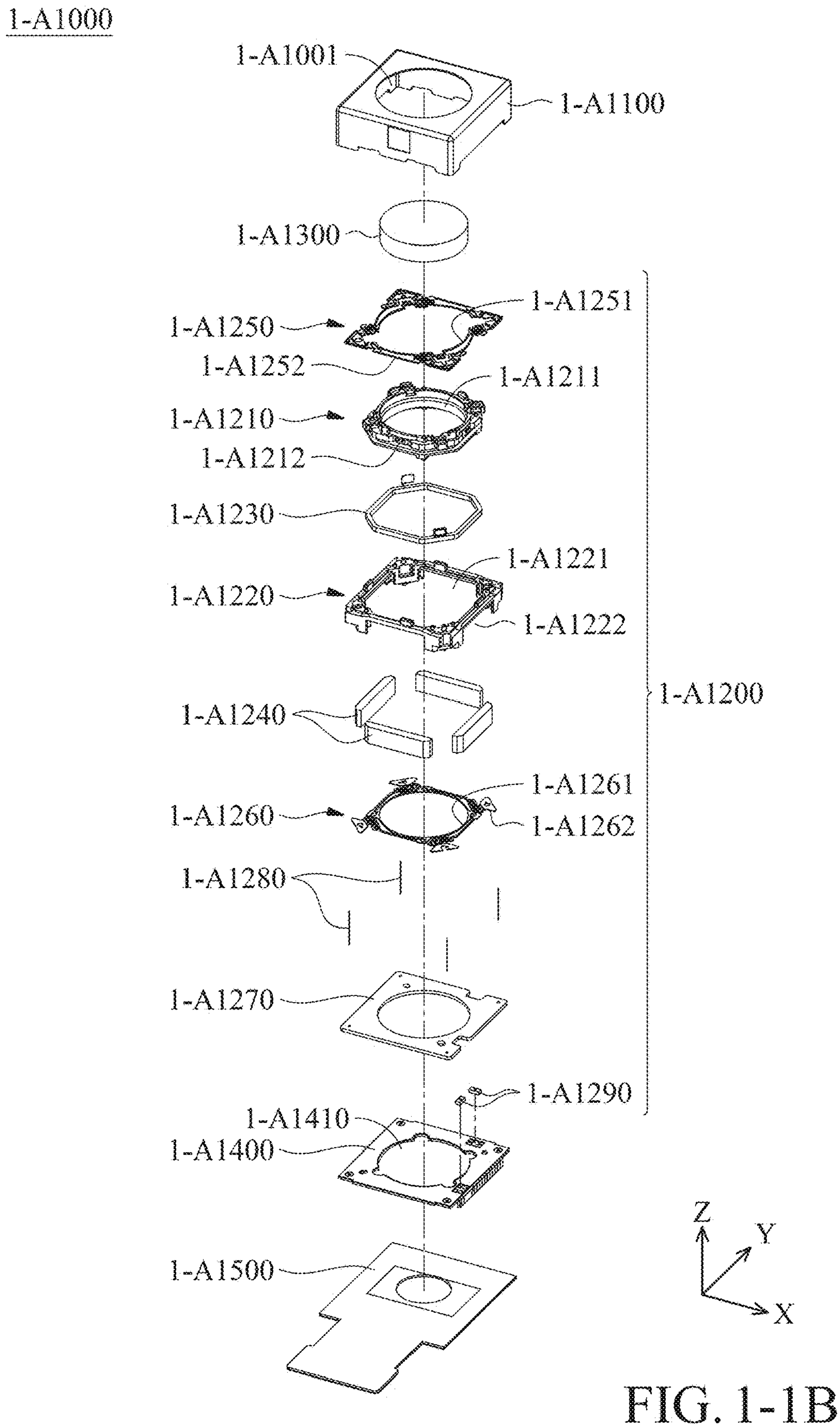
Figures 1, 2, 2A:
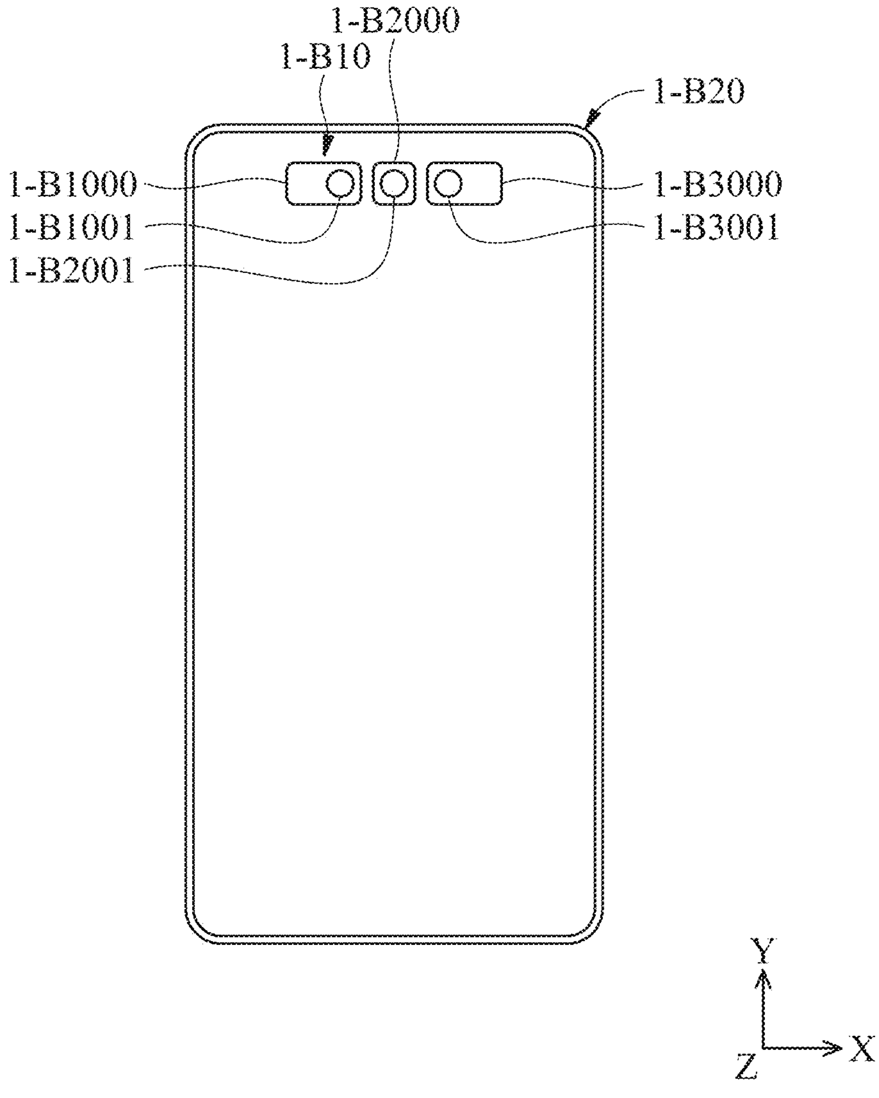
Figures 1, 2, 2B:
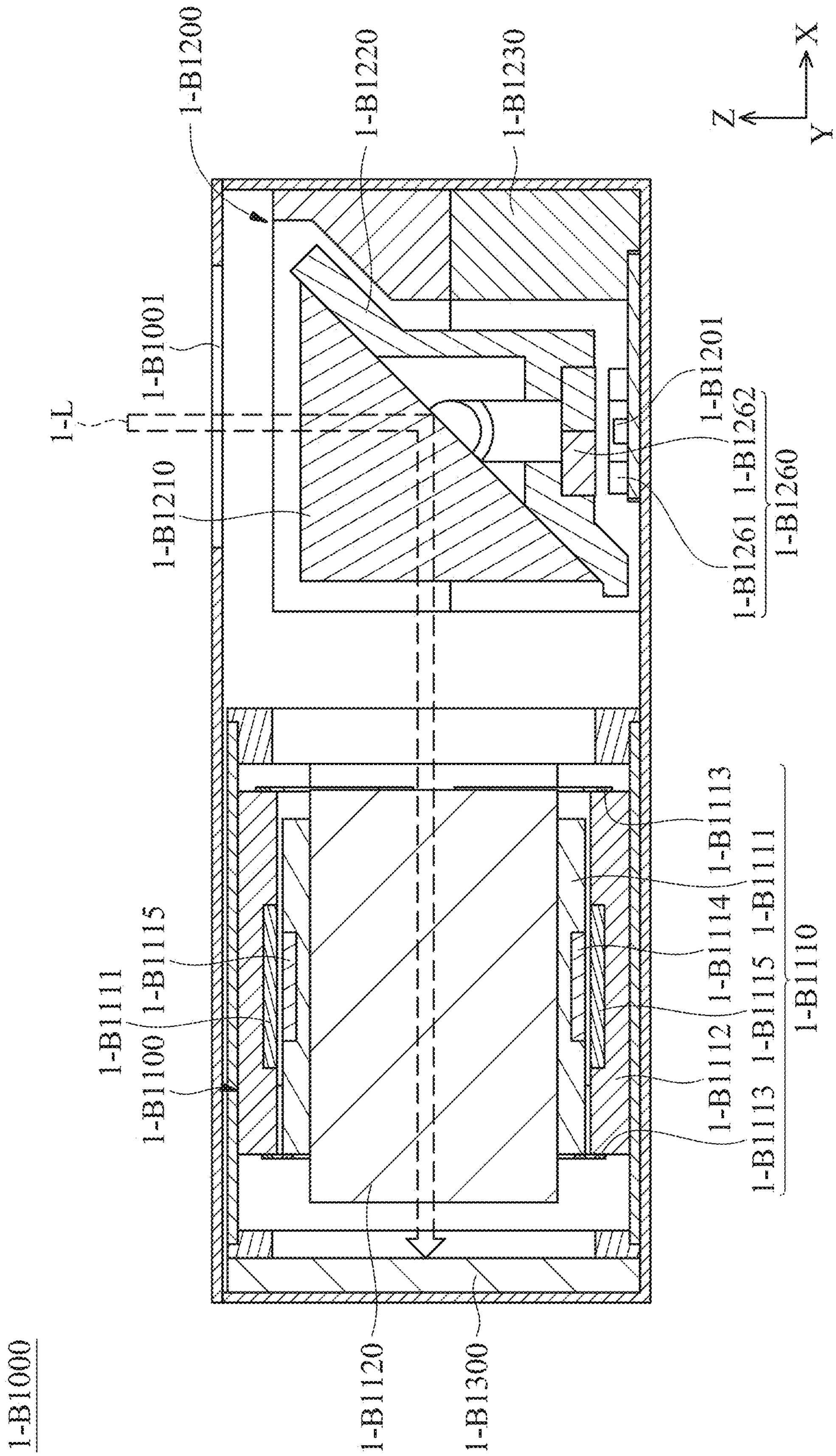
Figures 1, 2, 2C:
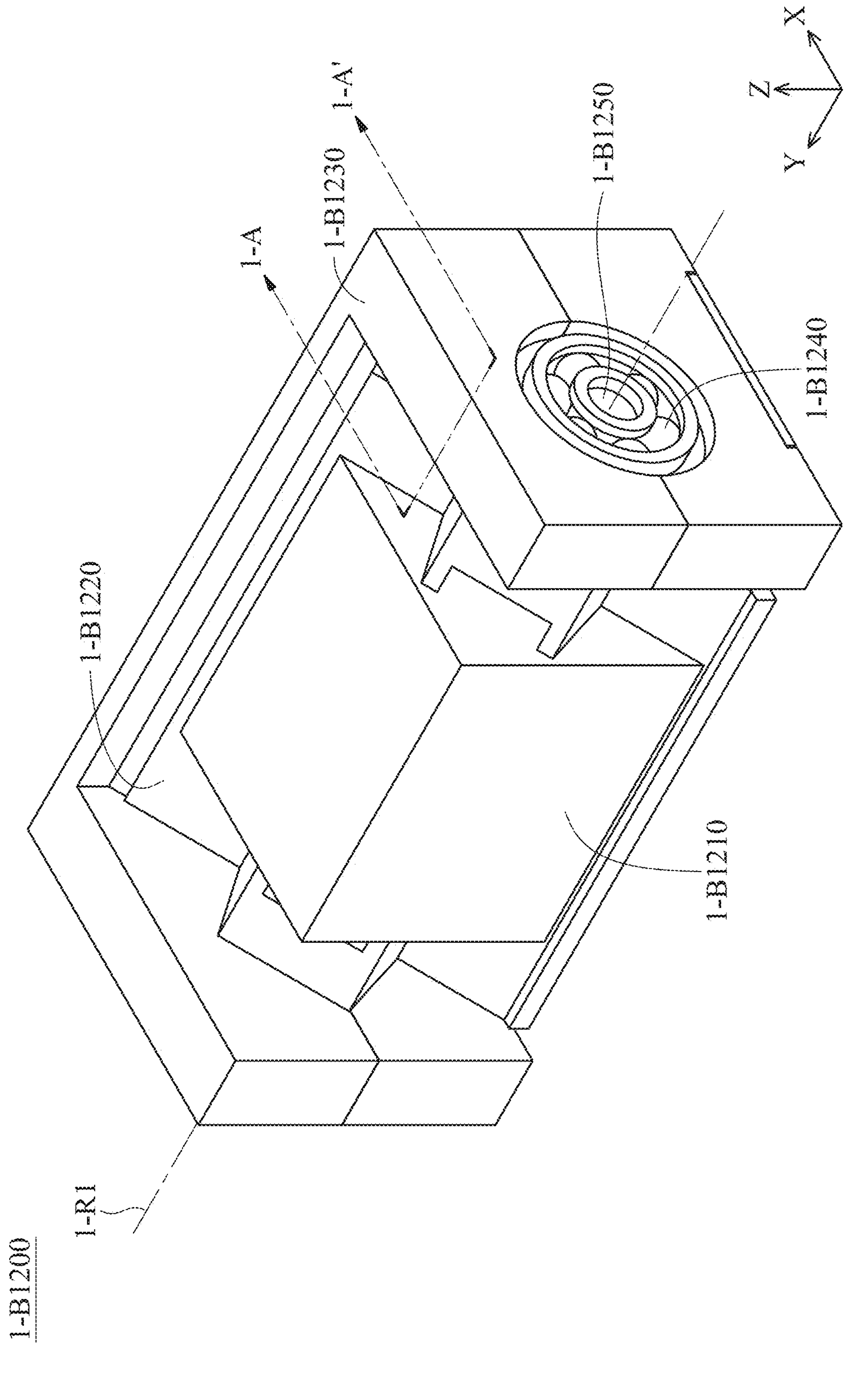
Figures 1, 2, 2D:
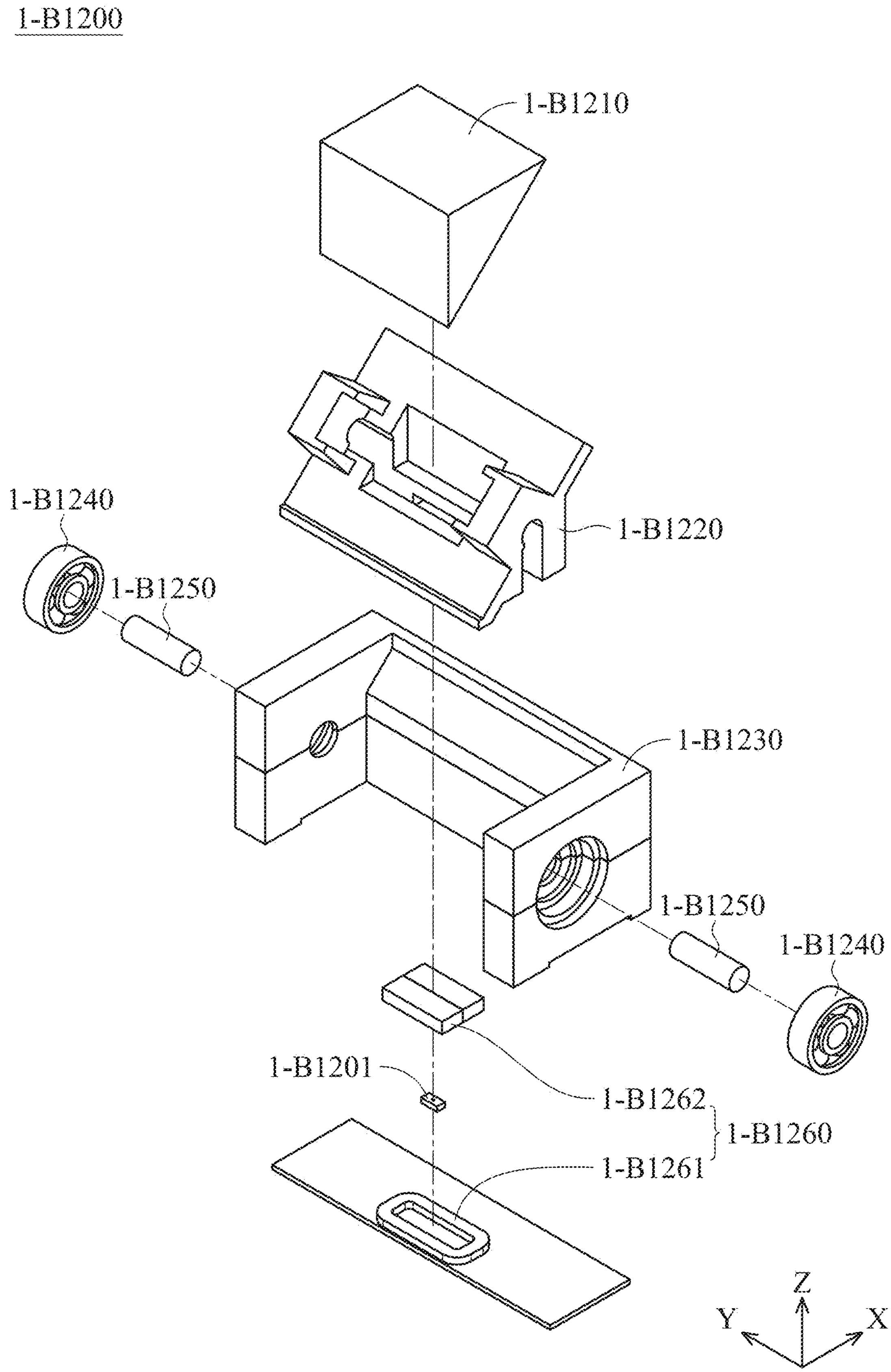
Figures 1, 2, 2E:
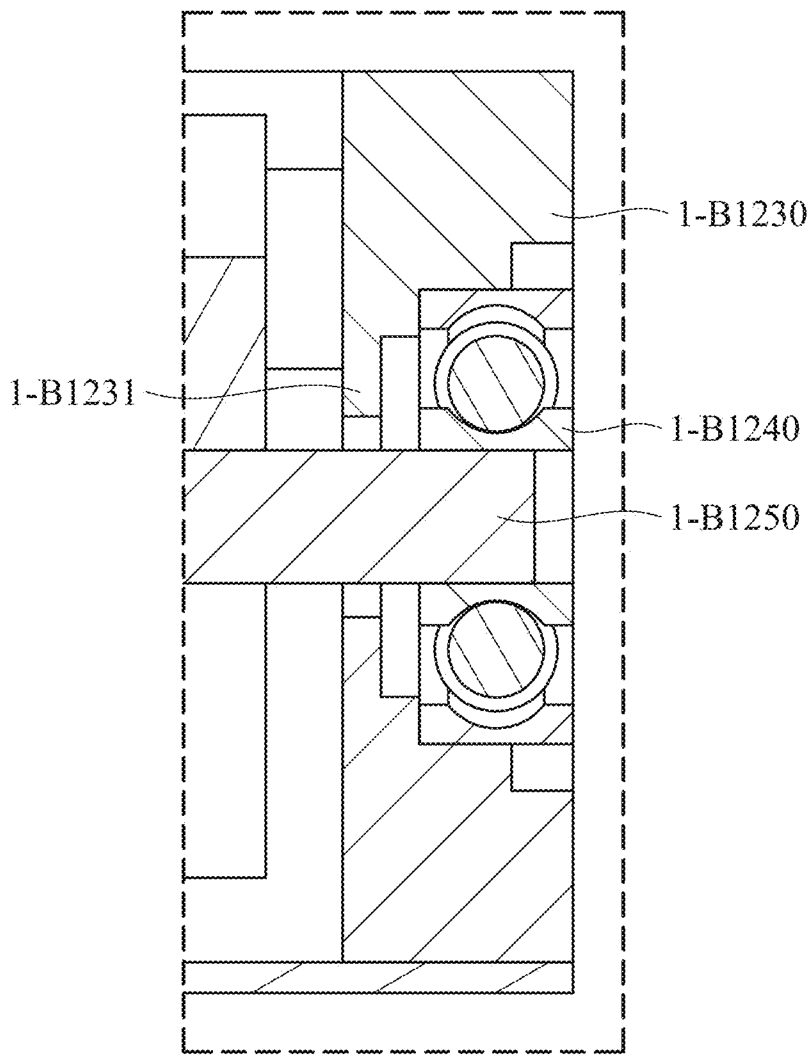
Figures 1, 2, 2F:
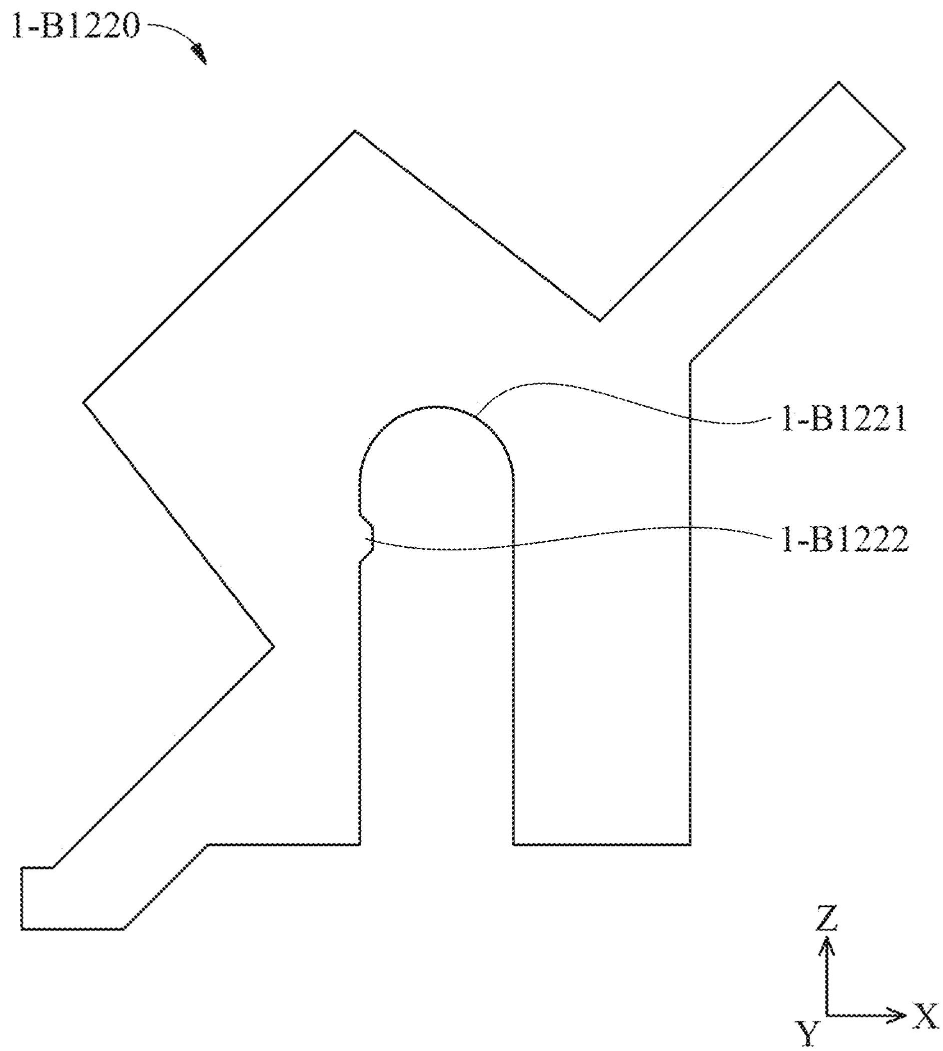
Figures 1, 2, 3, 3A:
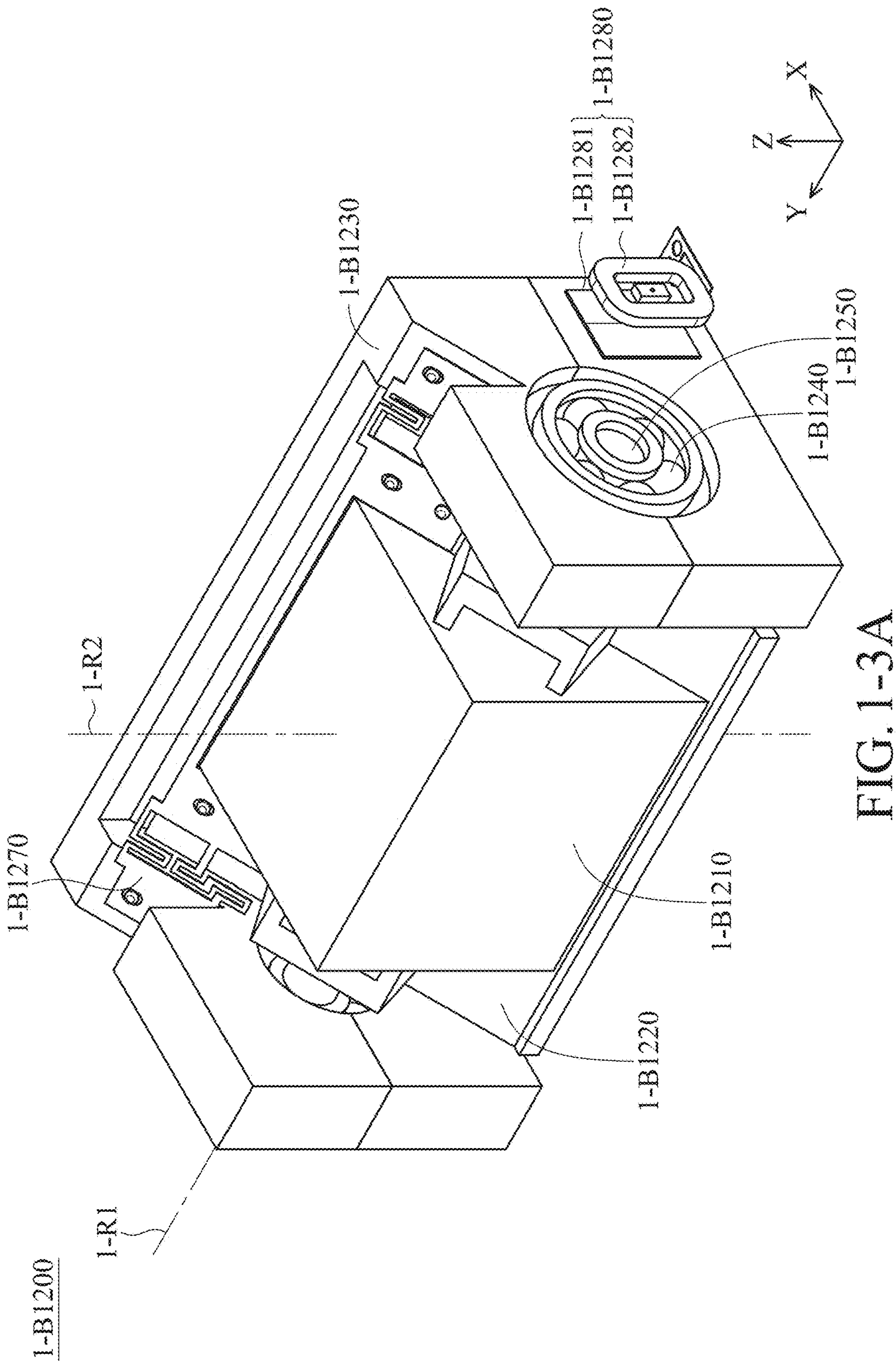
Figures 1, 2, 3, 3B:
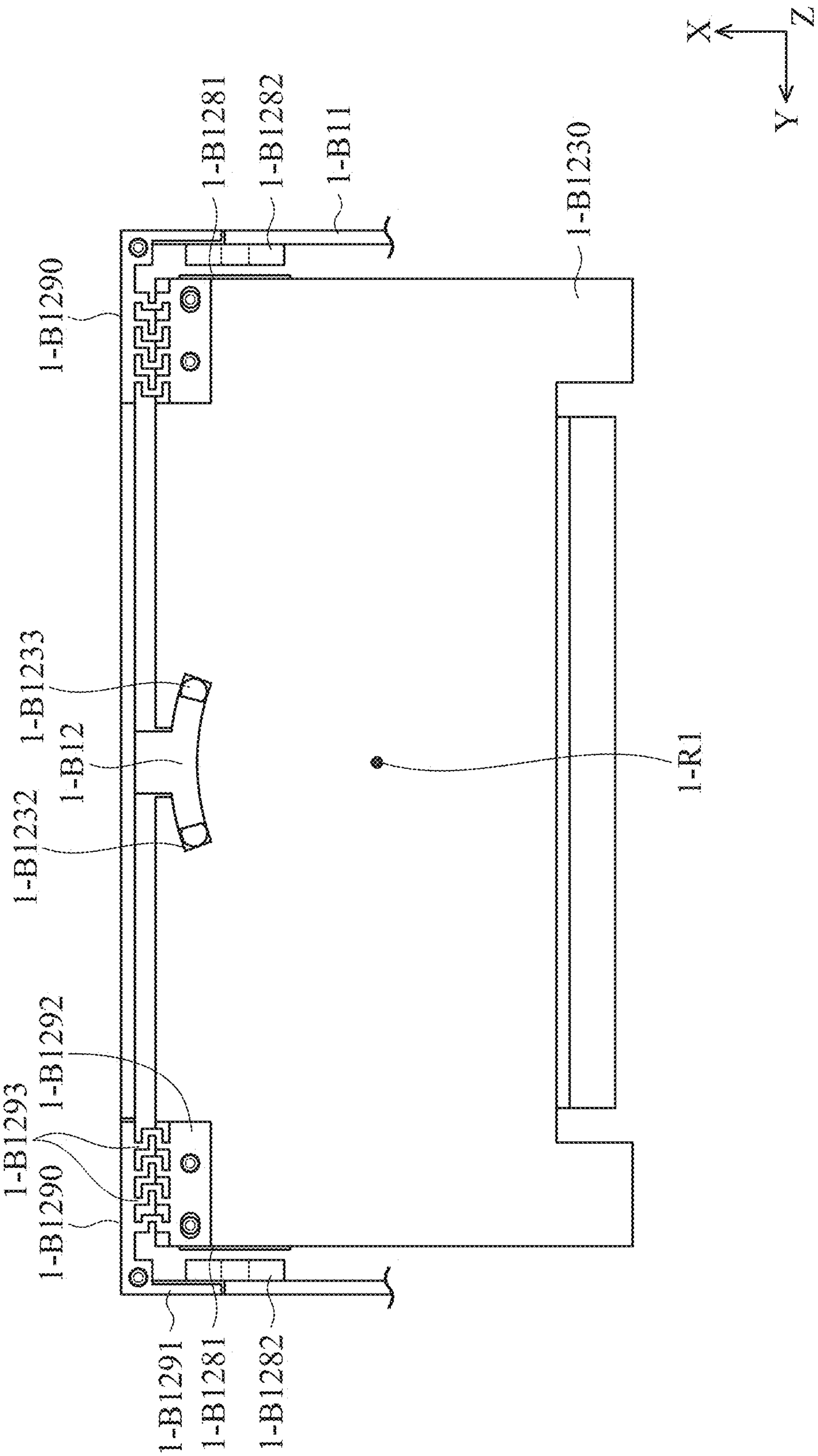
Figures 1, 2, 3, 4, 4A:
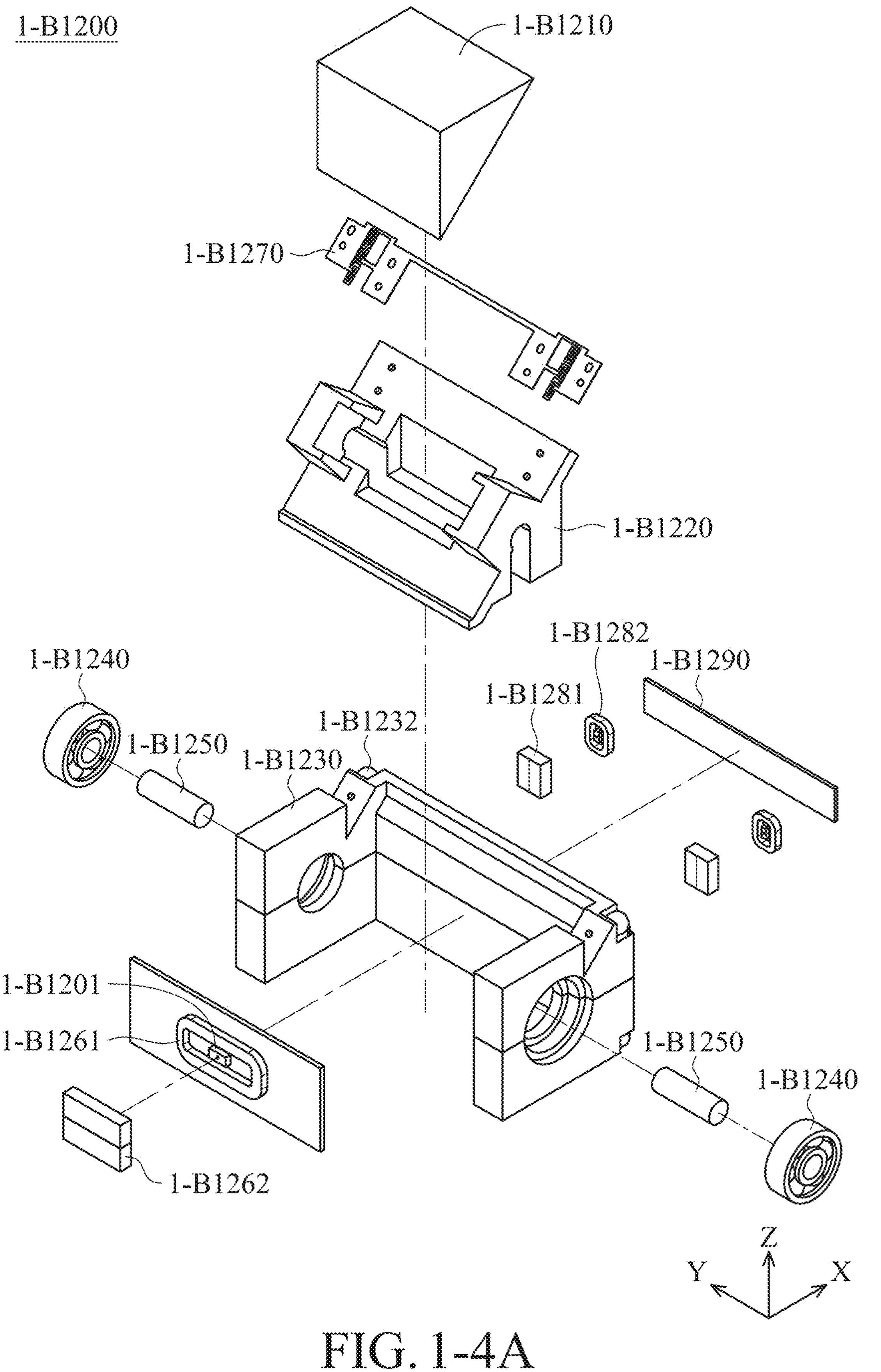
Figures 1, 2, 3, 4, 4B:
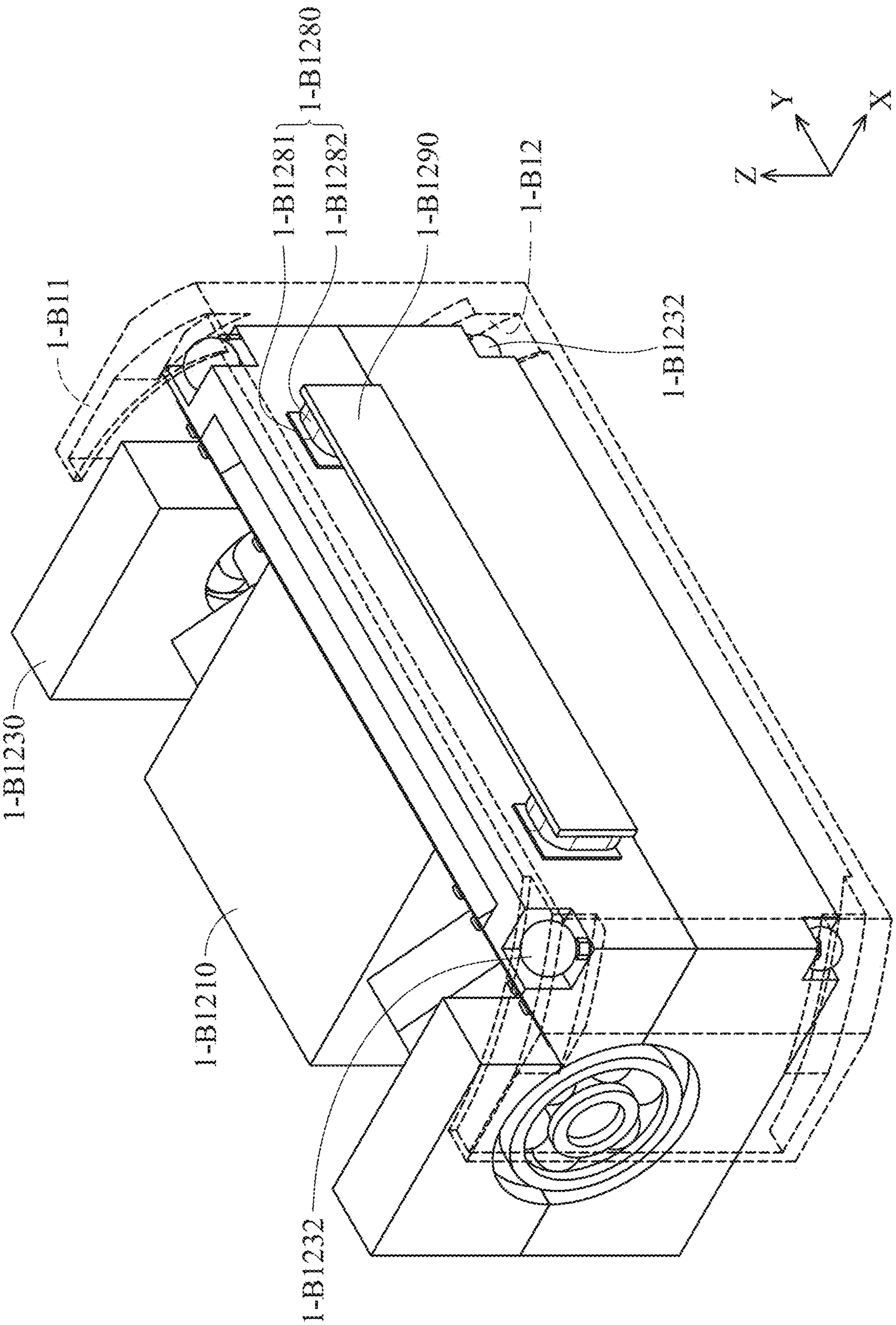
Figures 1, 2, 3, 4, 5, 5A:
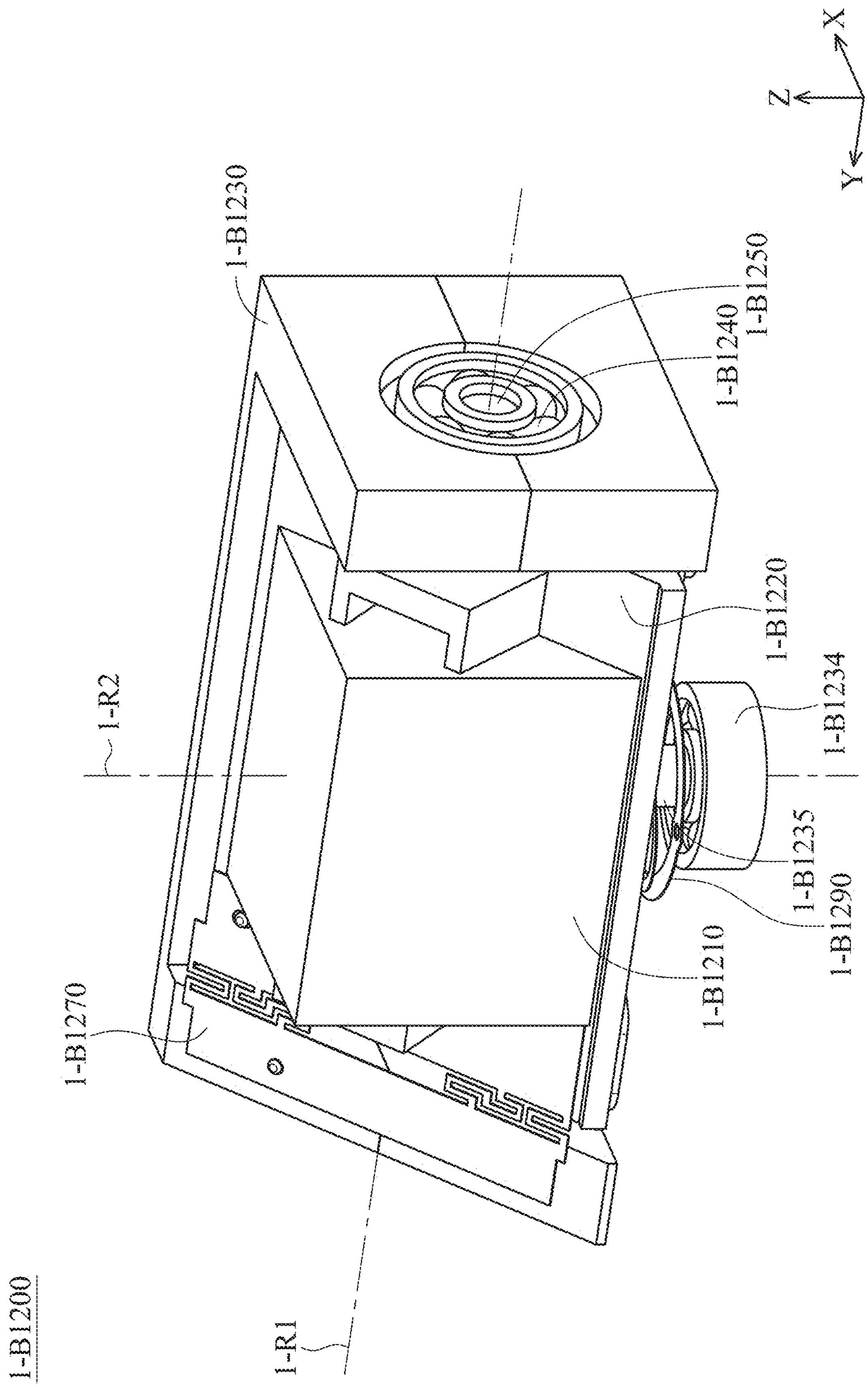
Figures 1, 2, 3, 4, 5, 5B:
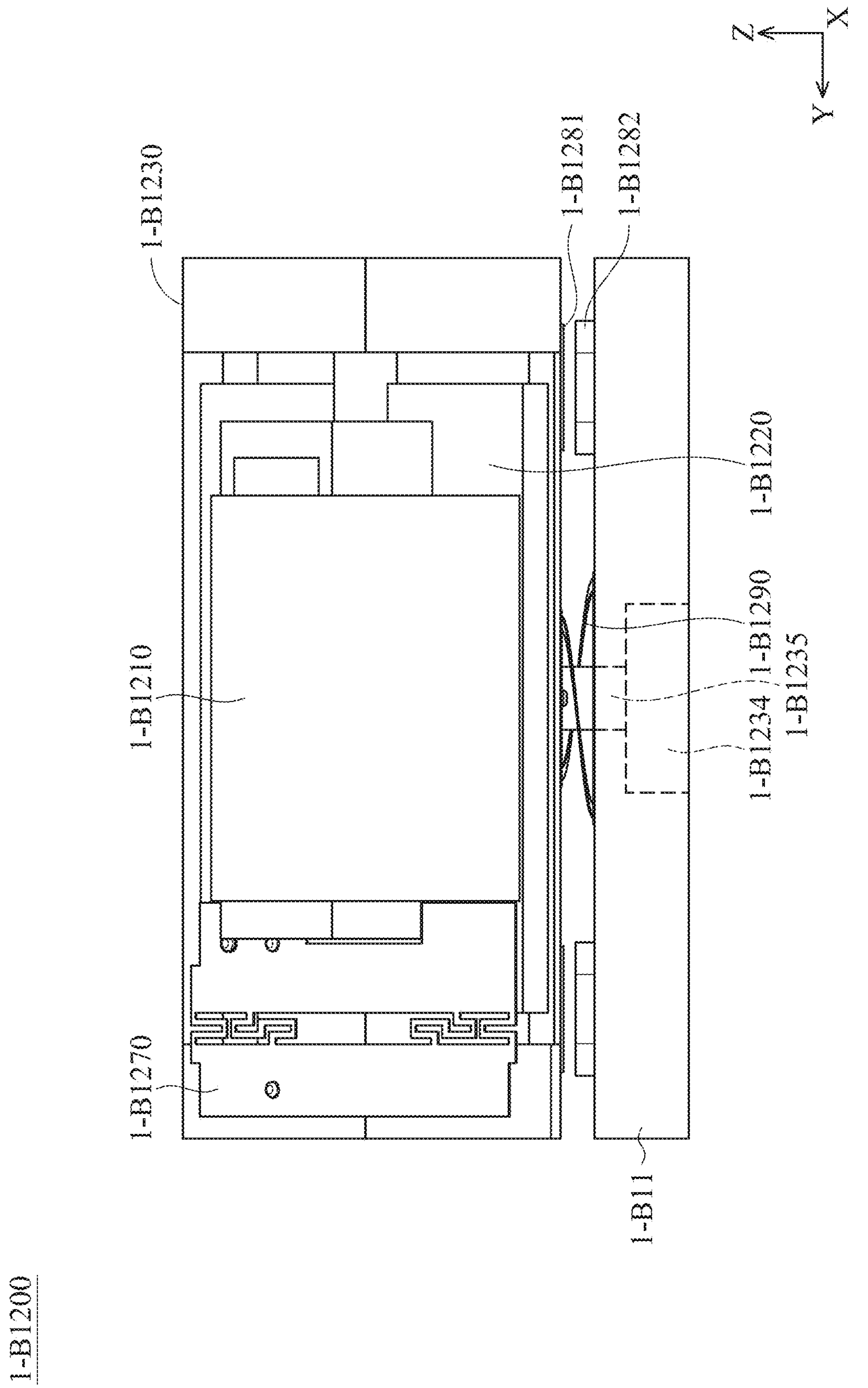
Figures 1, 2, 3, 4, 5, 6, 6A:
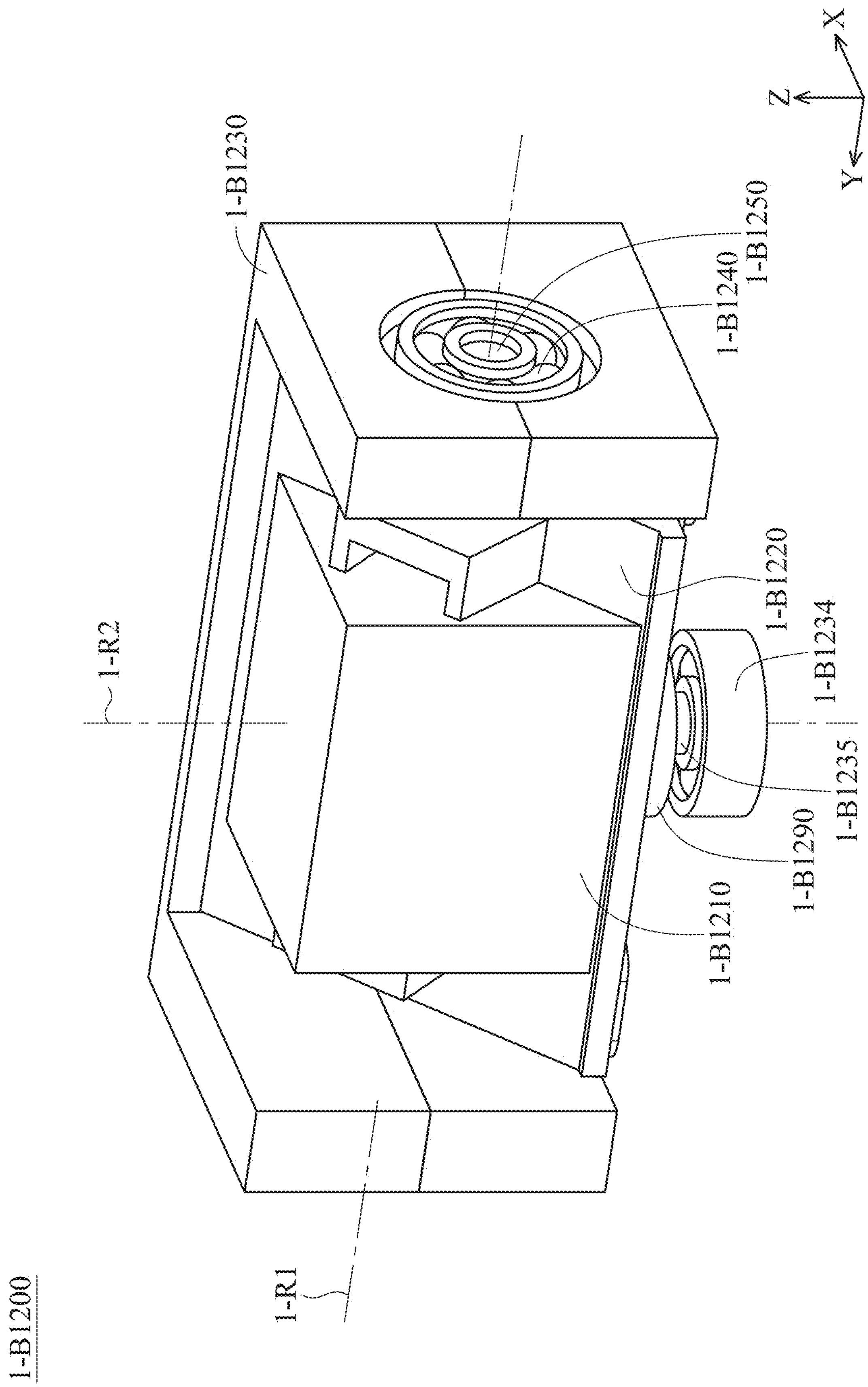
Figures 1, 2, 3, 4, 5, 6, 6B:
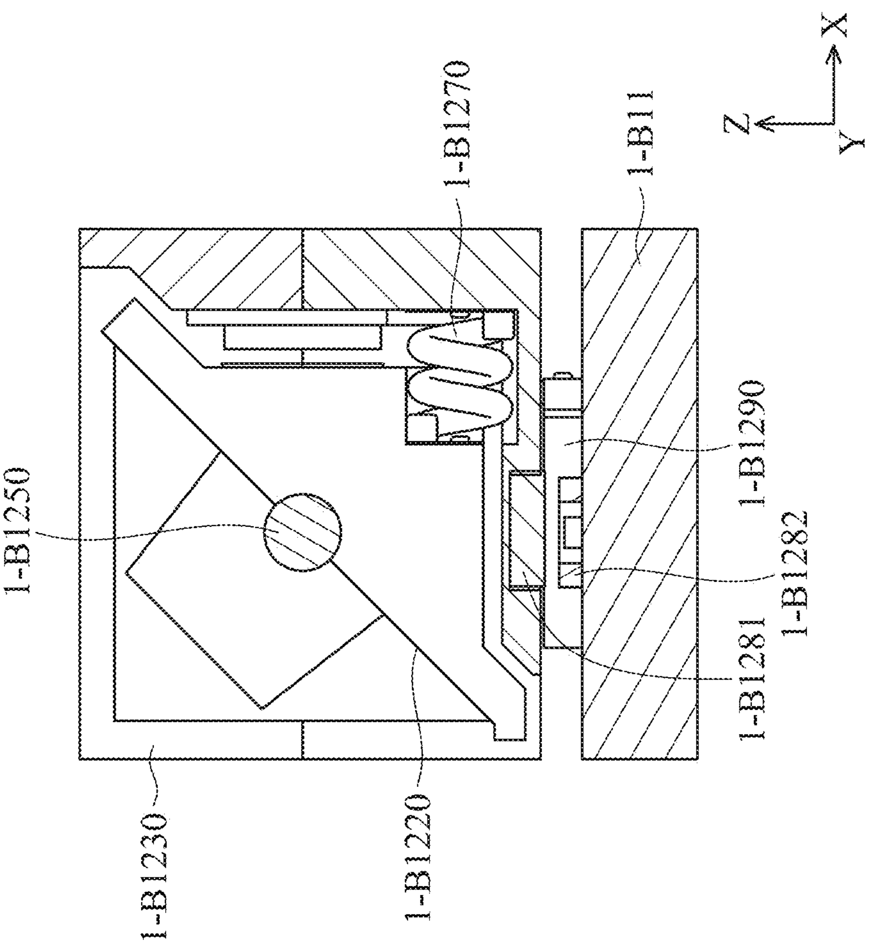
Figures 1, 2, 3, 4, 5, 6, 7, 7A:
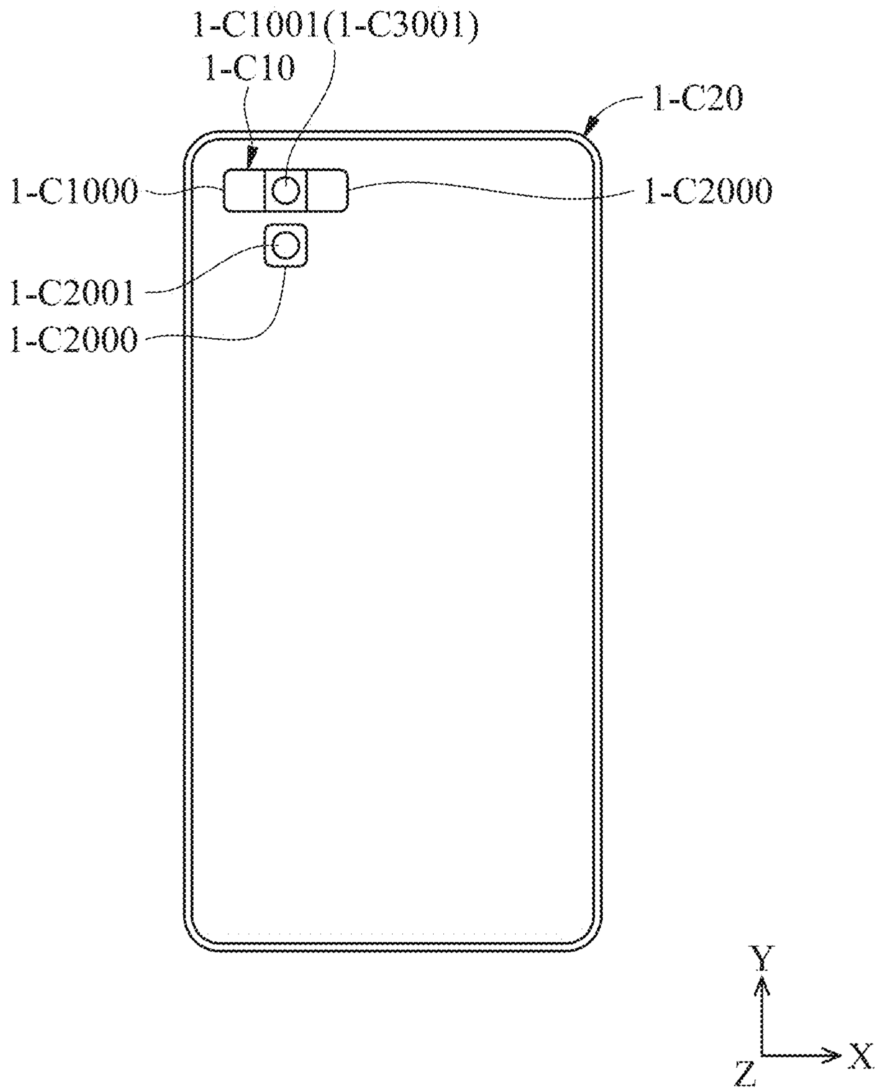
Figures 1, 2, 3, 4, 5, 6, 7, 7B:
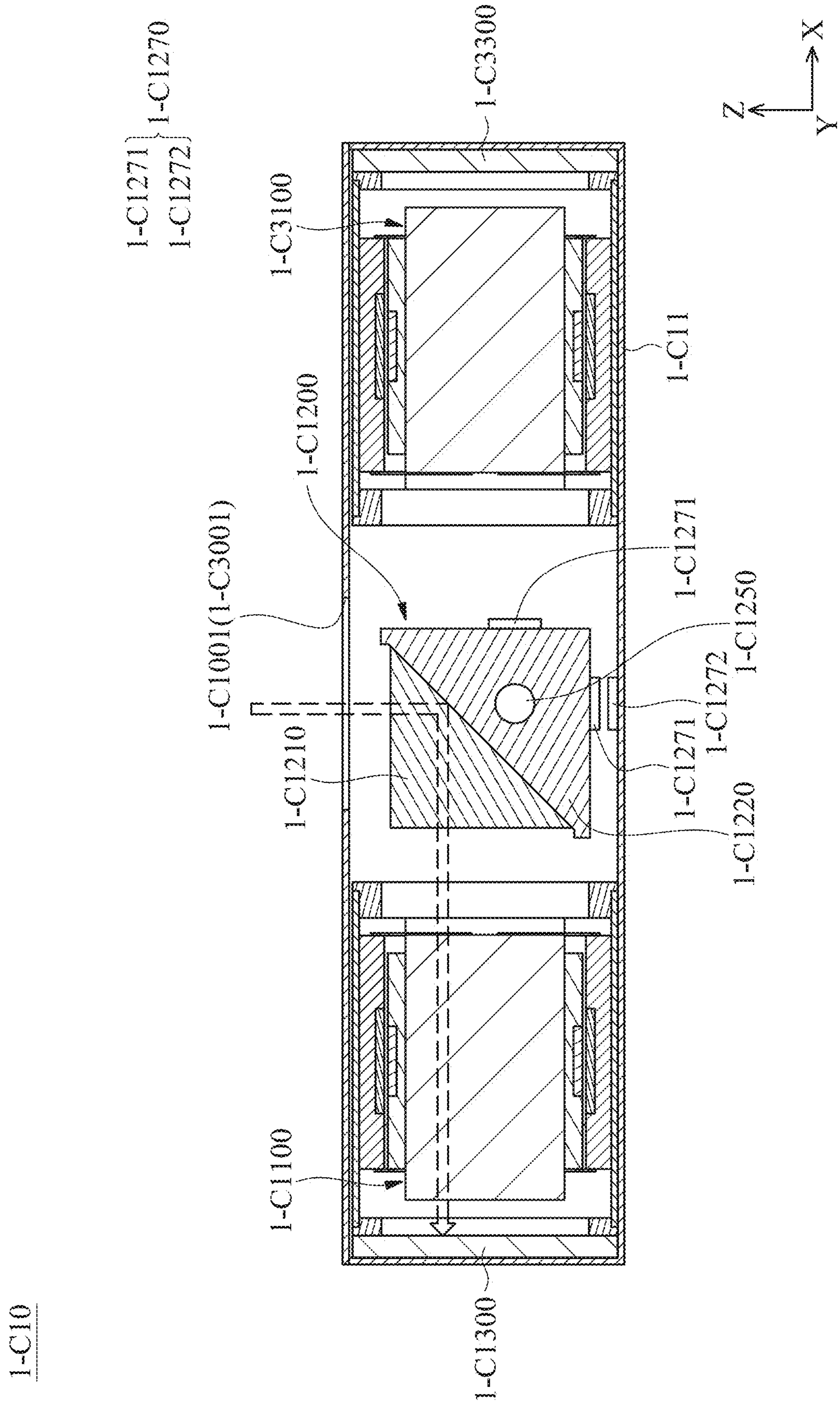
Figures 1, 2, 3, 4, 5, 6, 7, 7C:
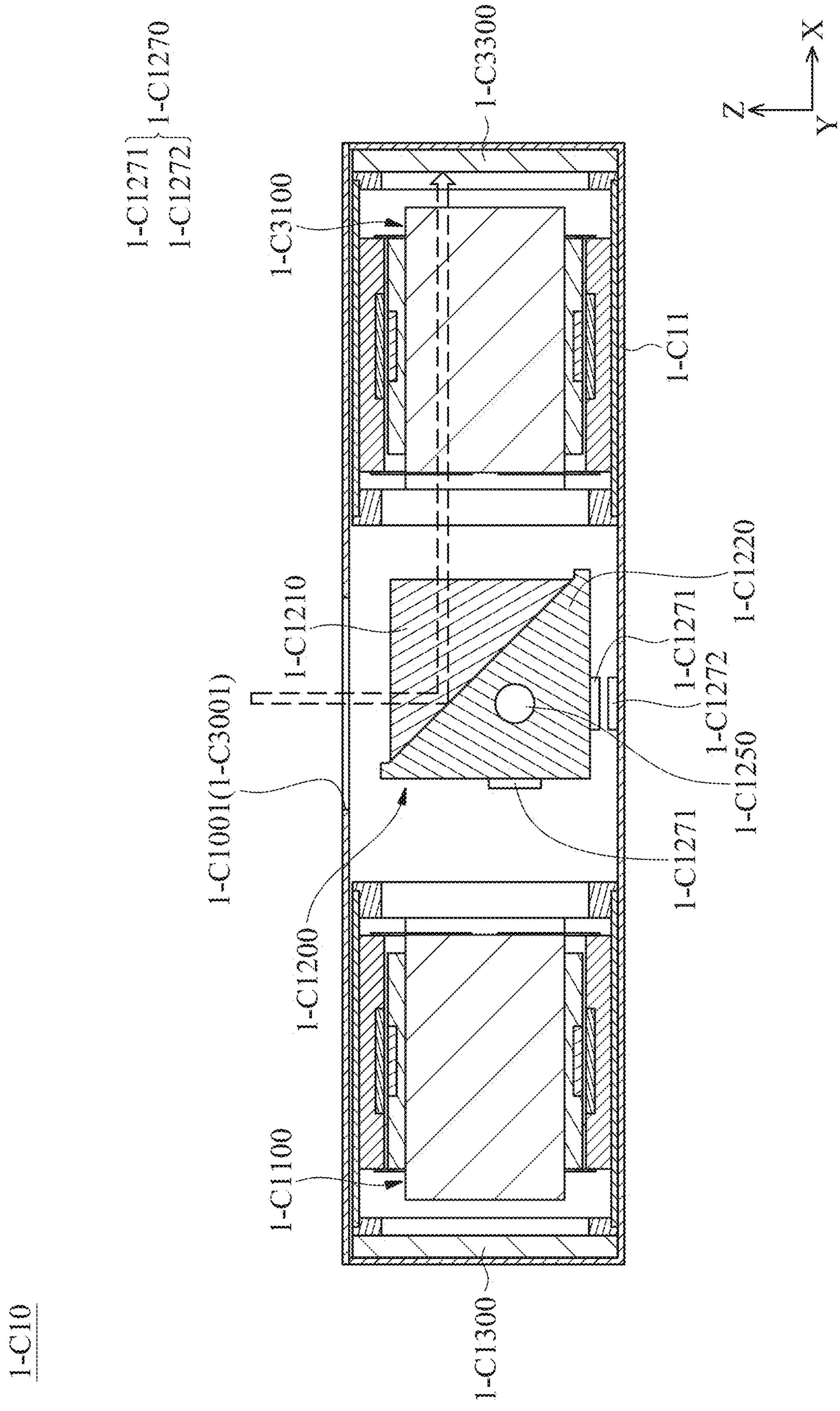
Figures 1, 2, 3, 4, 5, 6, 7, 7D:
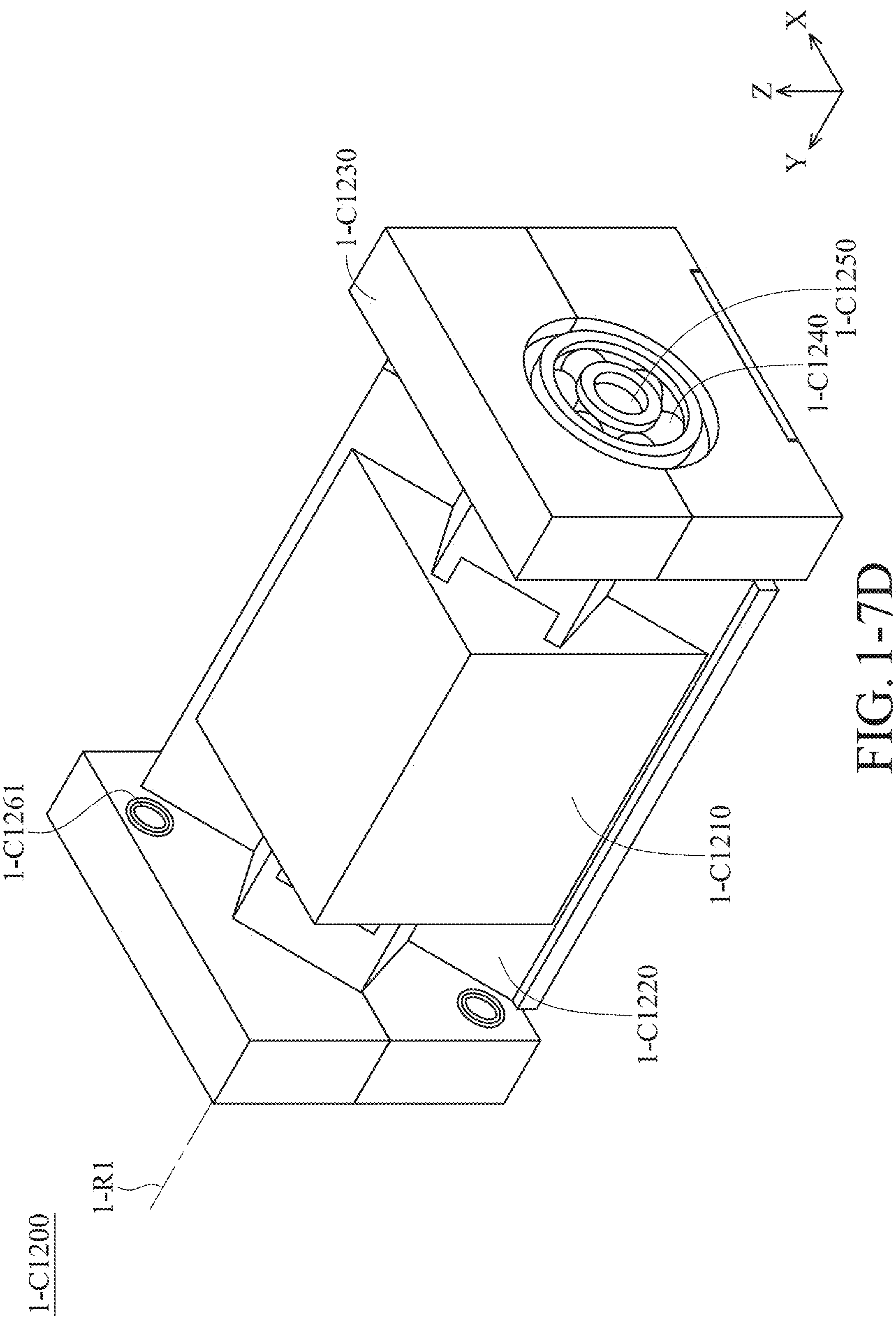
Figures 1, 2, 3, 4, 5, 6, 7, 7E:
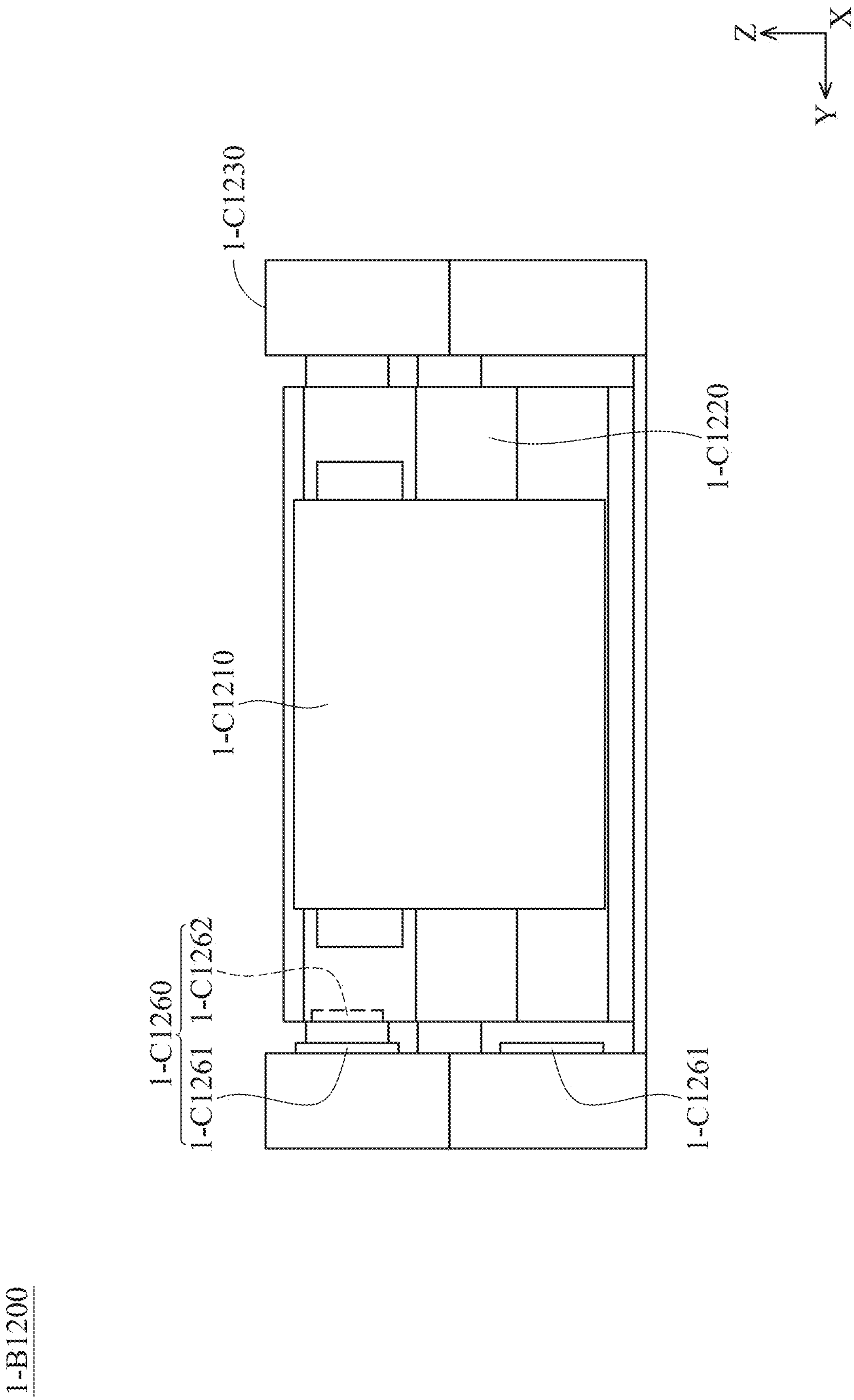
Figures 1, 2, 3, 4, 5, 6, 7, 8, 8A:
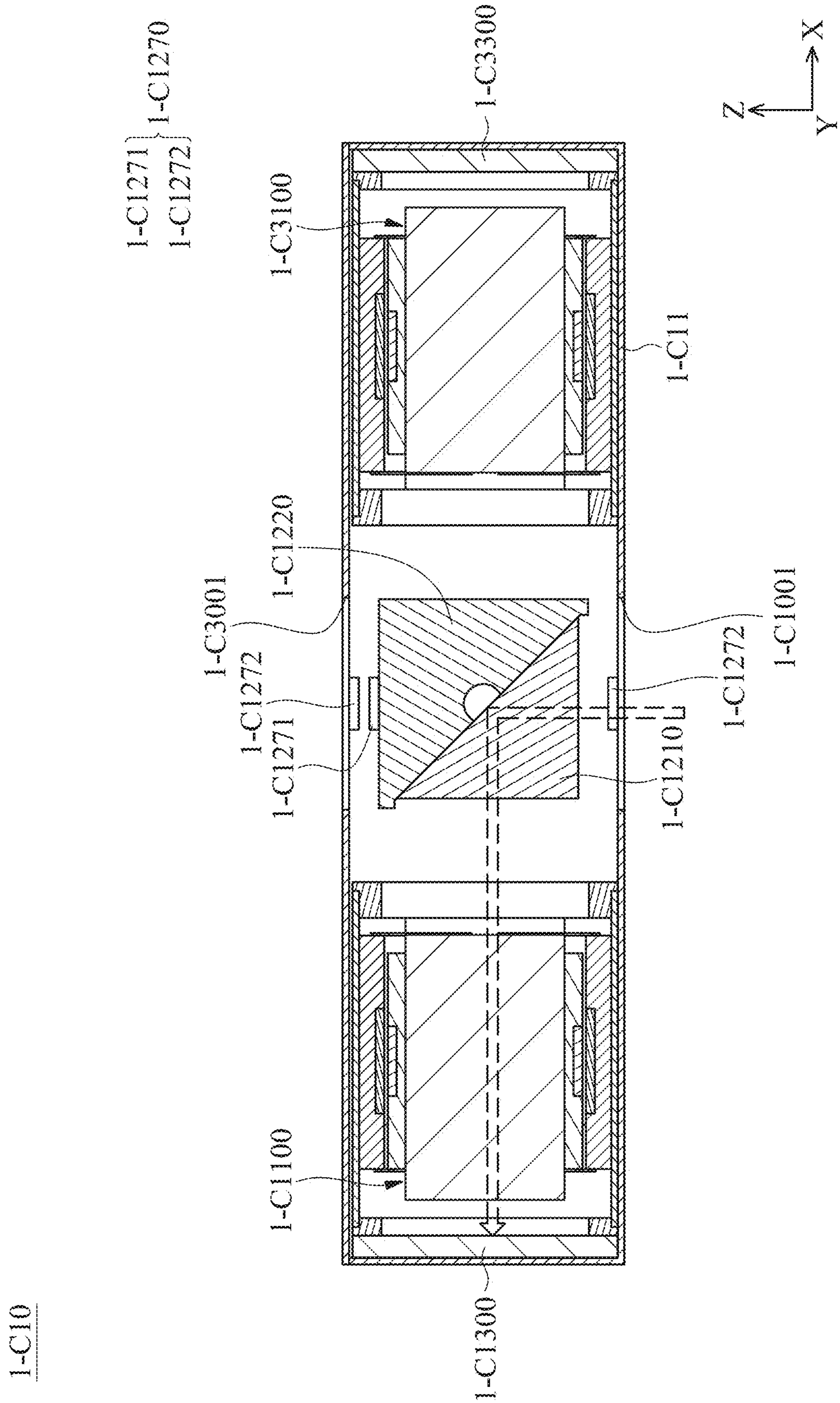
Figures 1, 2, 3, 4, 5, 6, 7, 8, 8B:
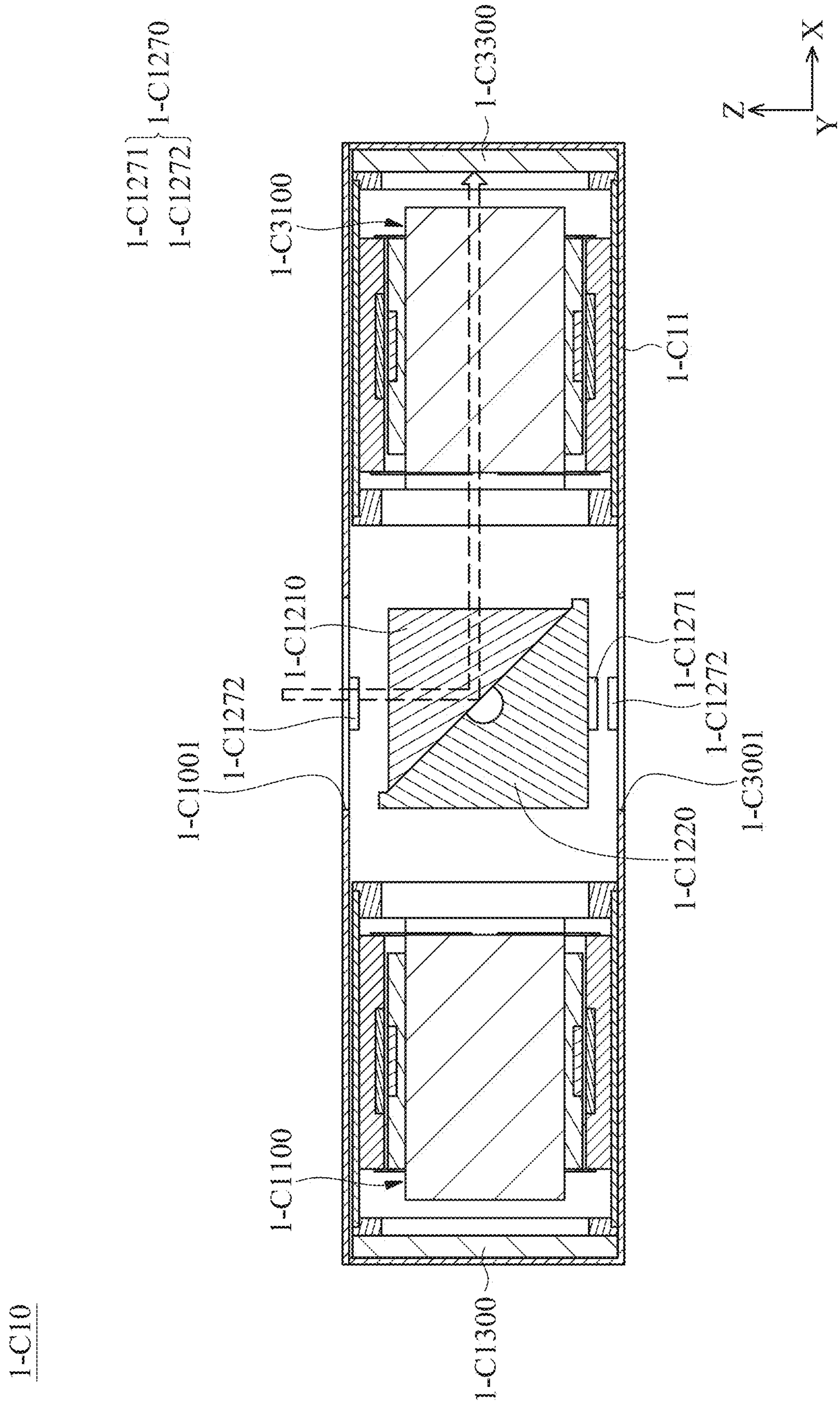
Figures 1, 2, 3, 4, 5, 6, 7, 8, 9, 9A:
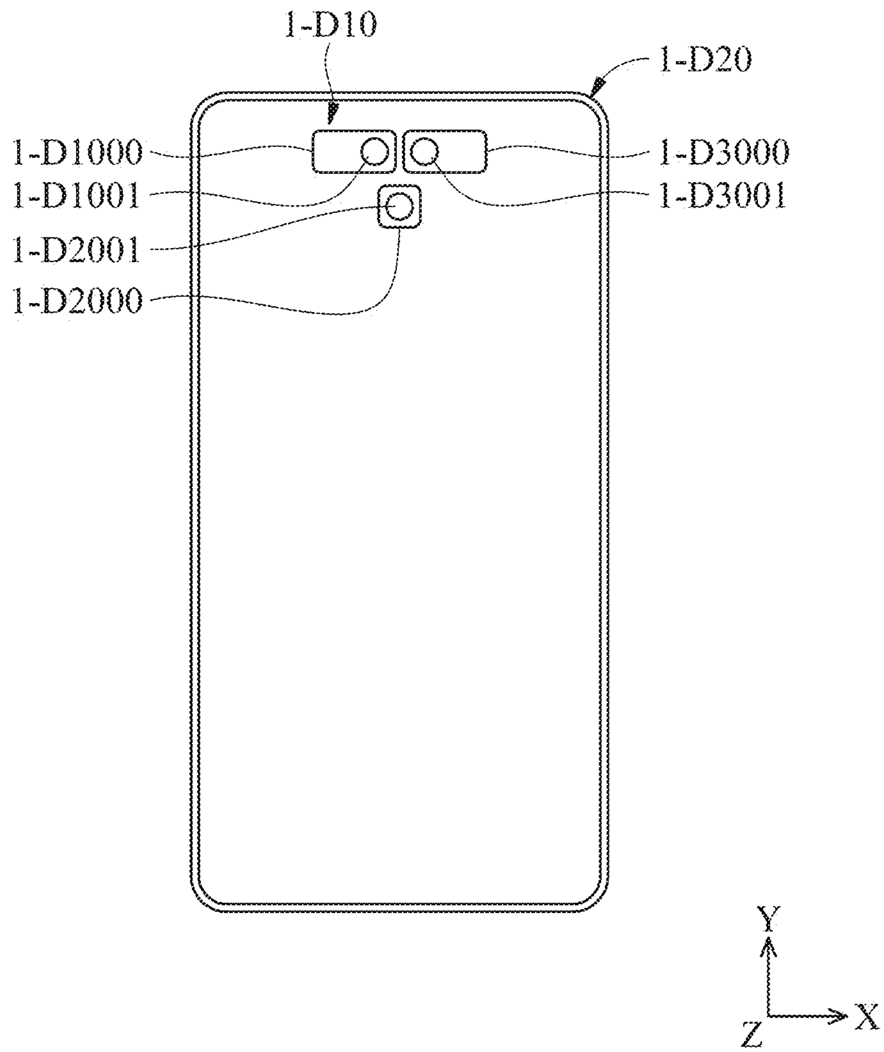
Figures 1, 2, 3, 4, 5, 6, 7, 8, 9, 9B:
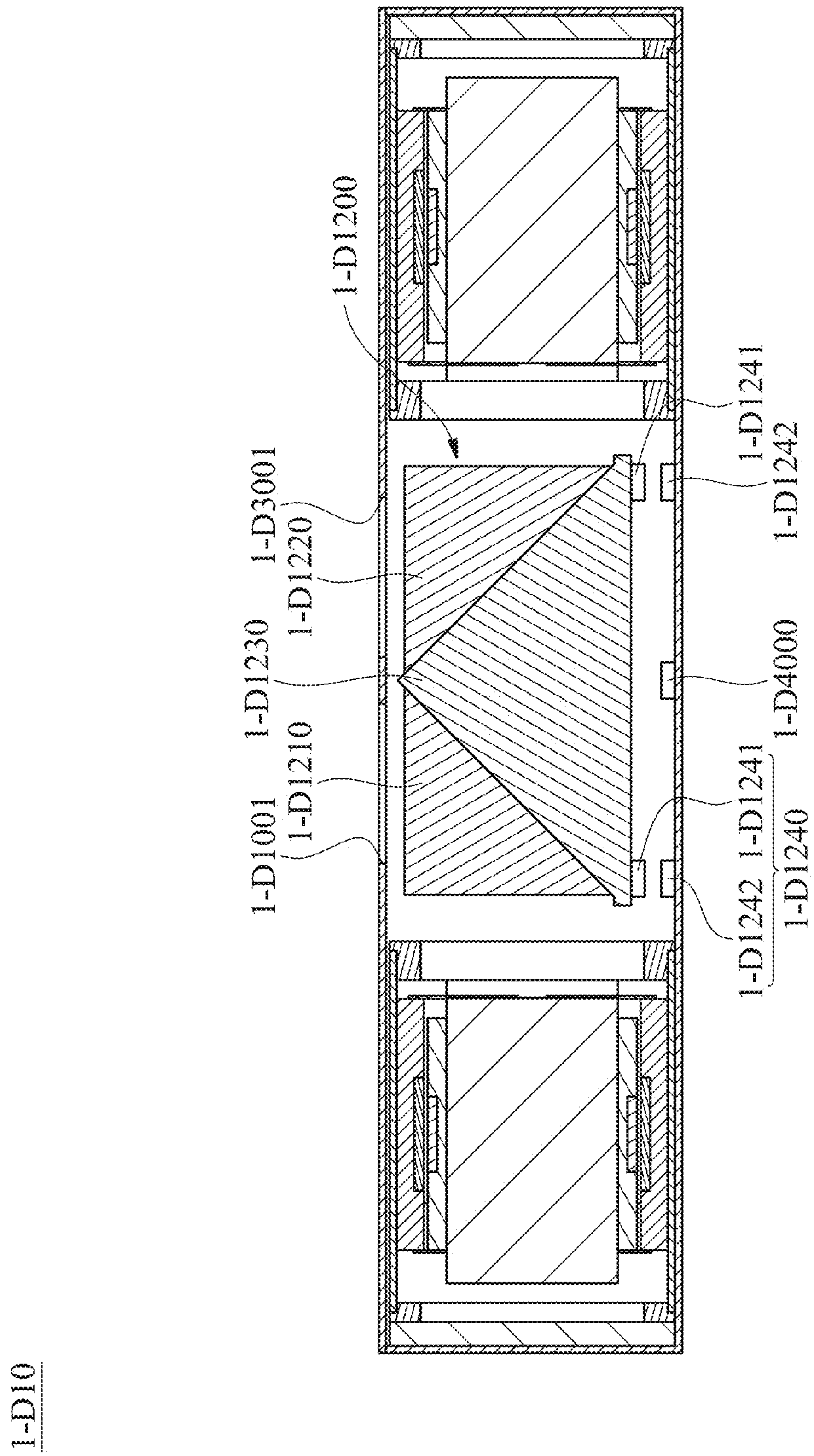
Figures 1, 2, 3, 4, 5, 6, 7, 8, 9, 10:
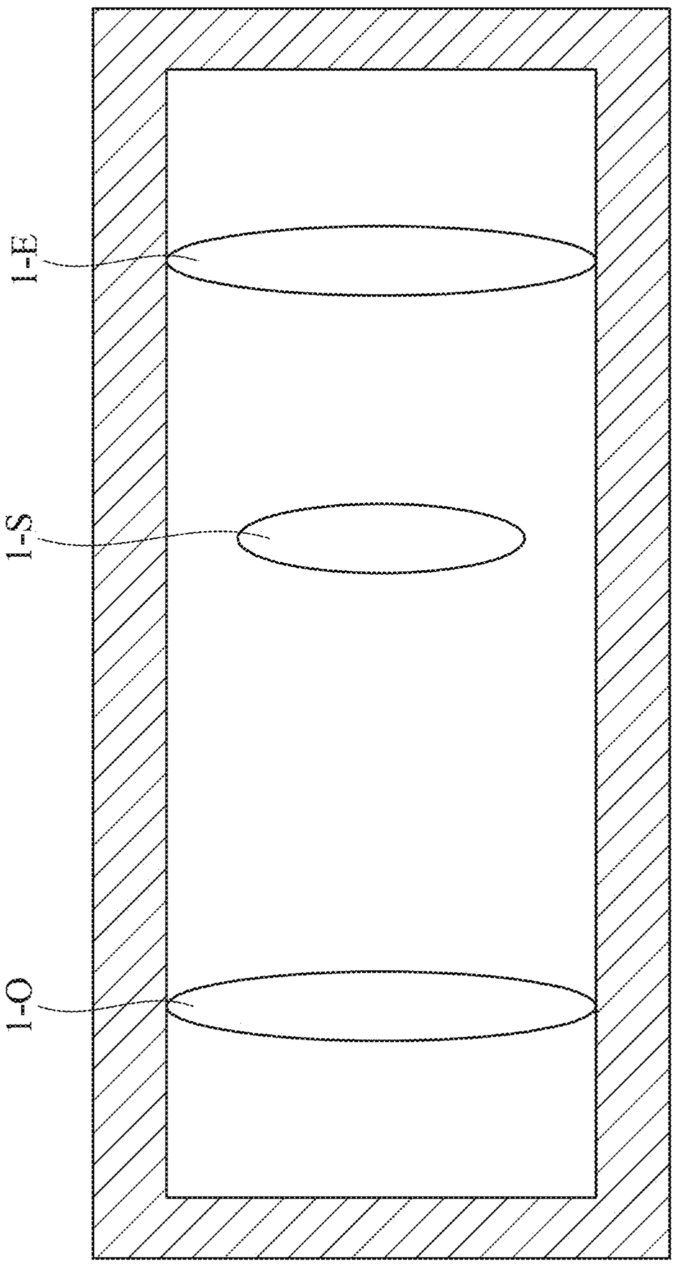
Figures 1, 2:
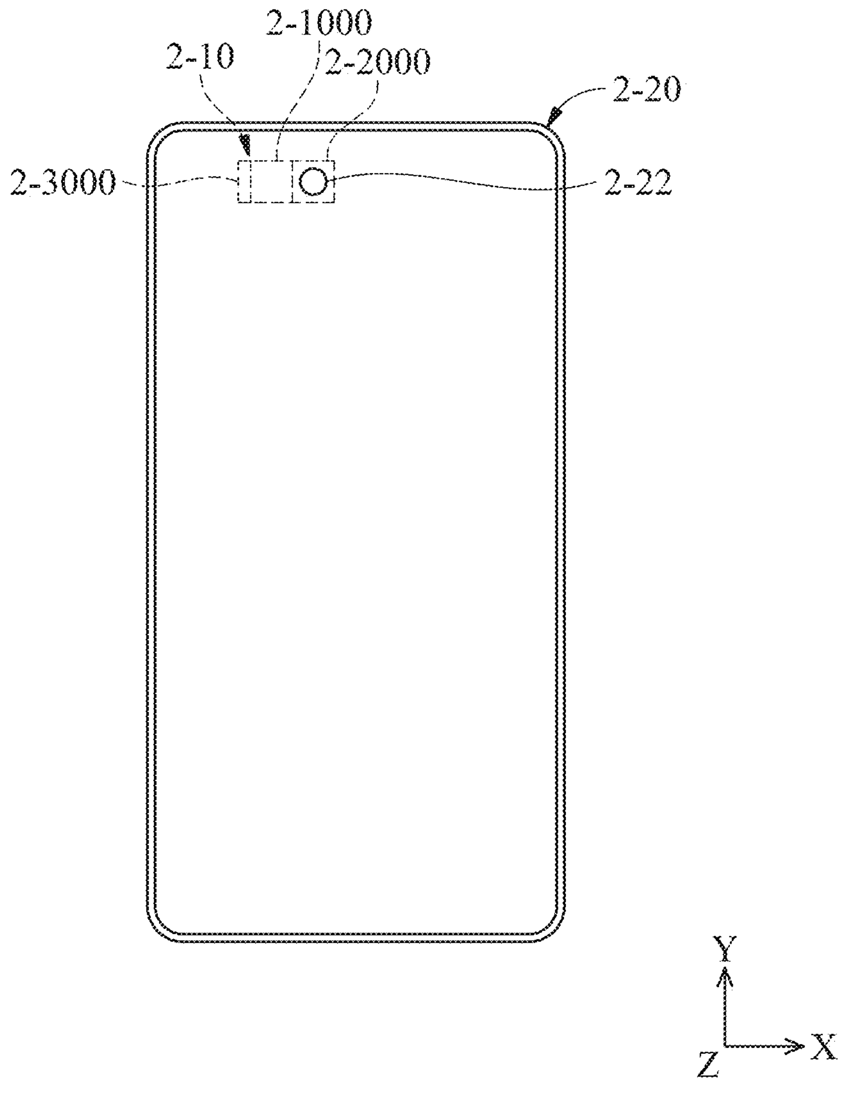
Figure 2:
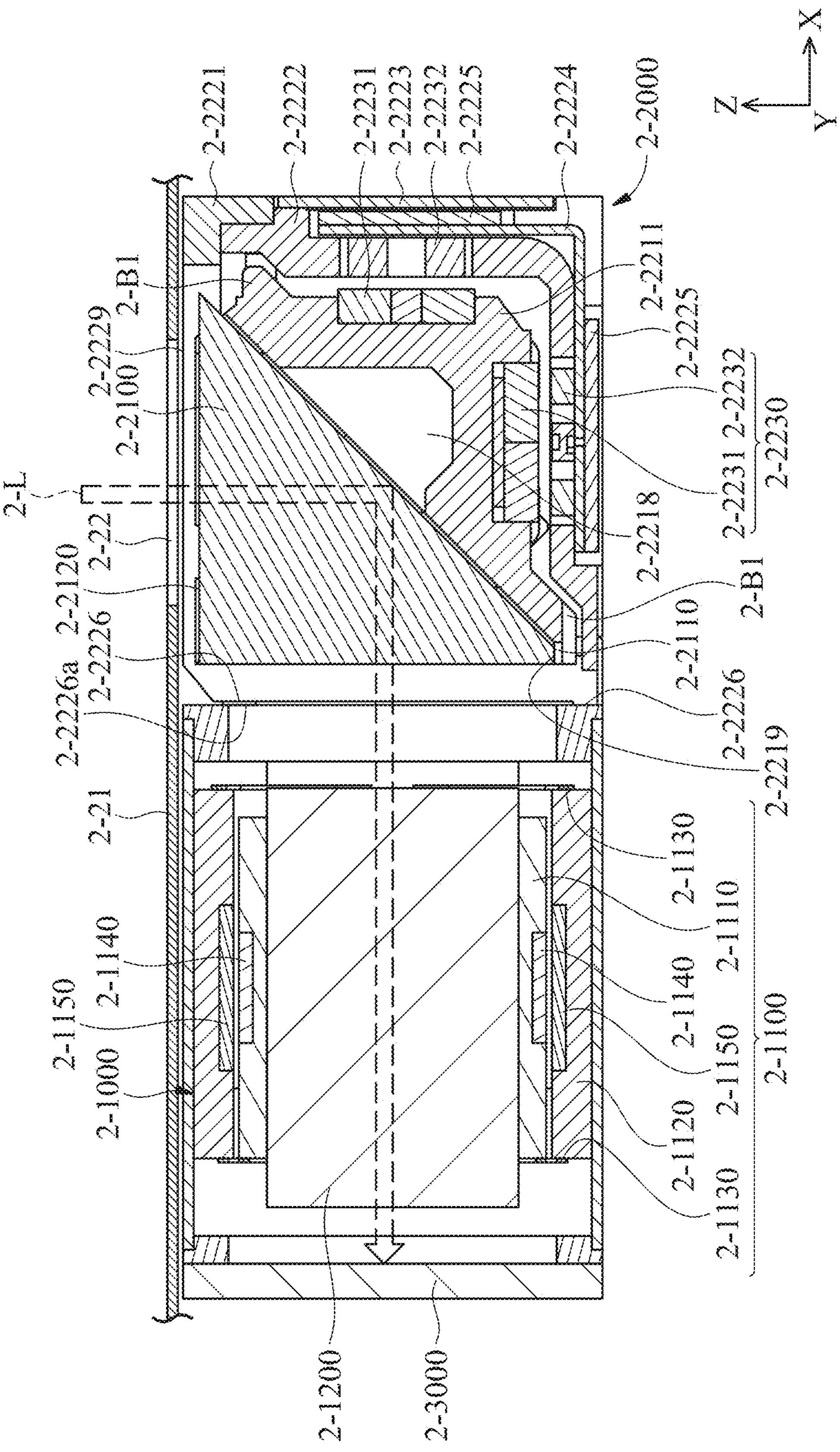
Figures 2, 3:
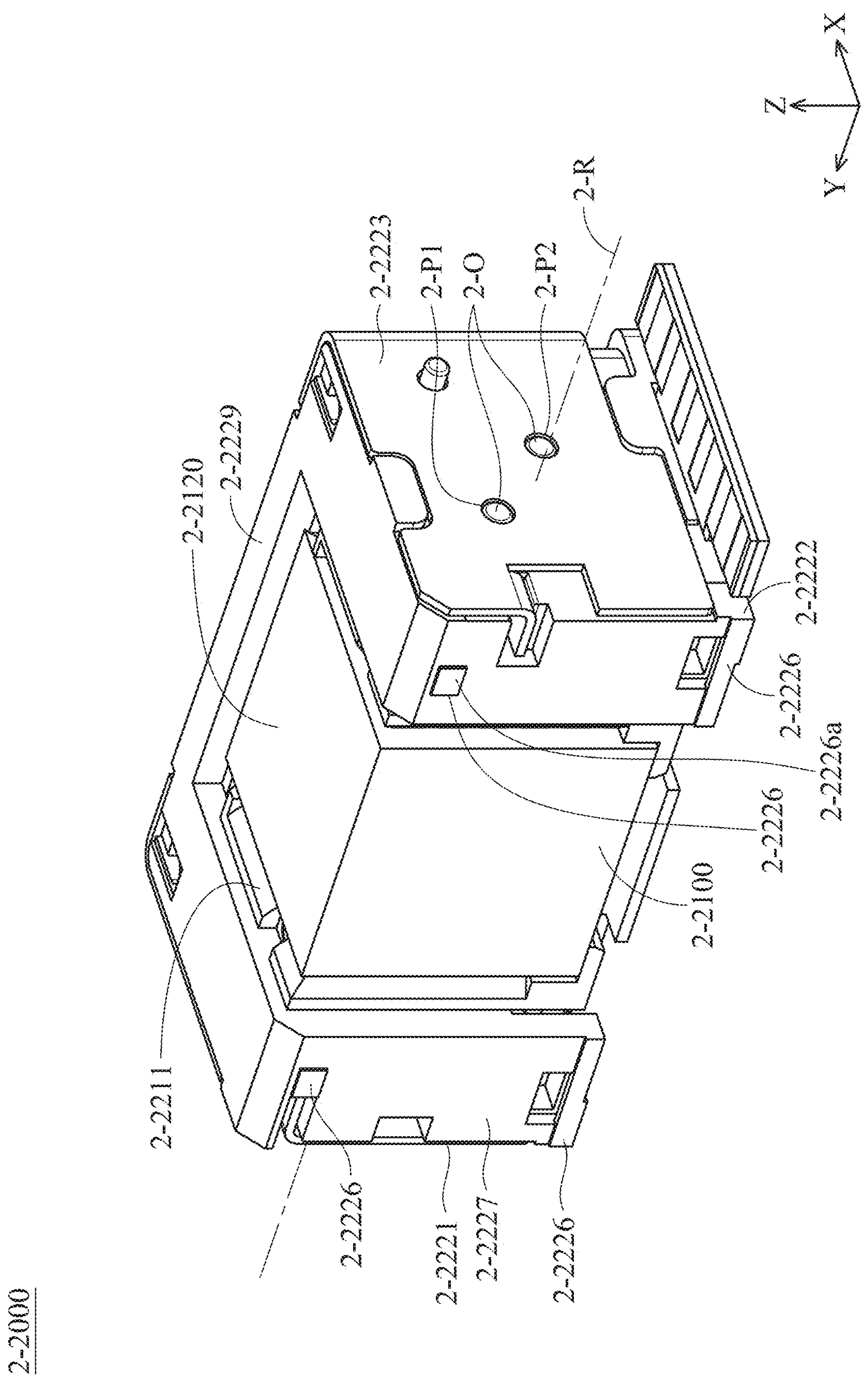
Figures 2, 3, 4:
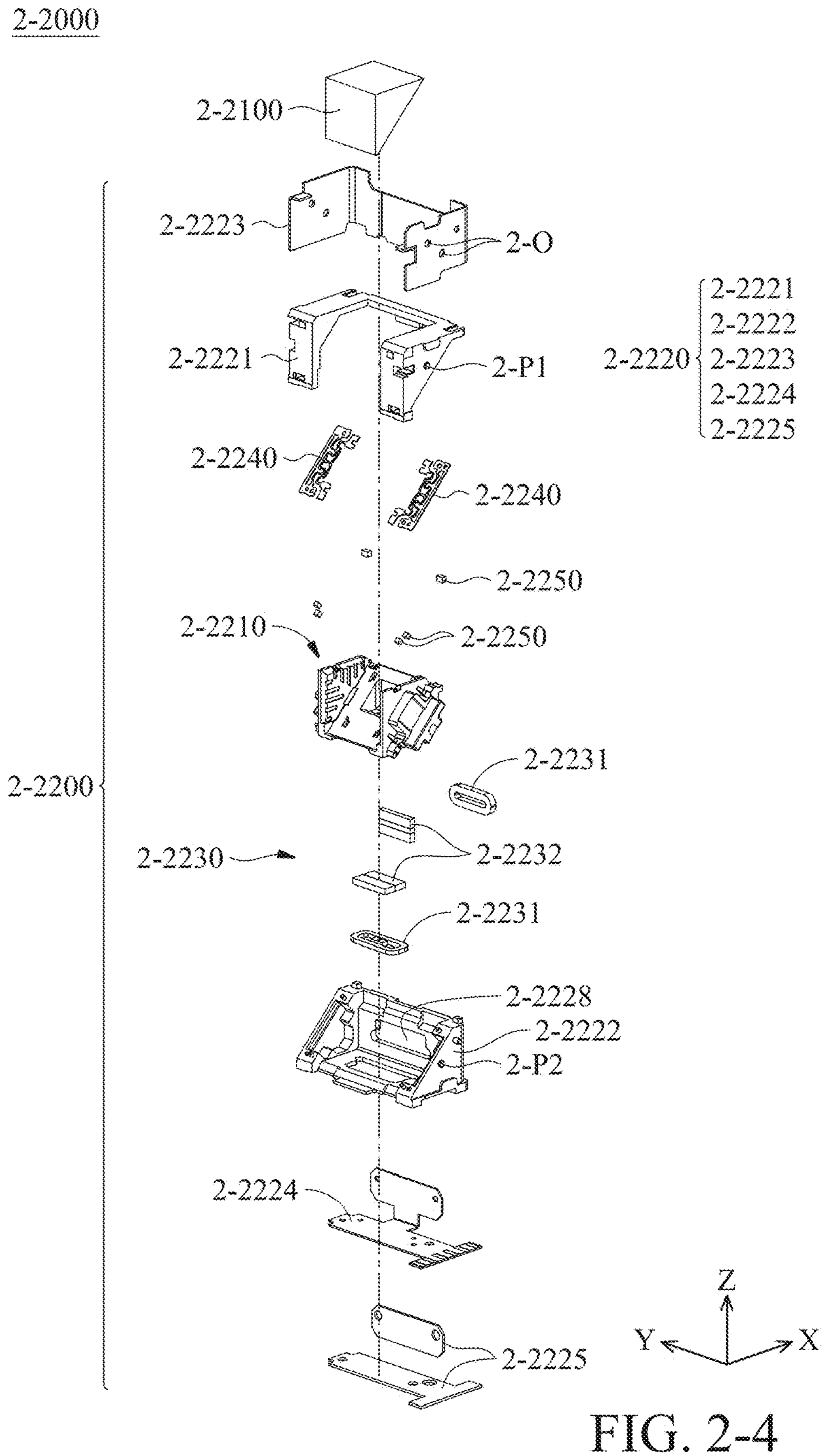
Figures 2, 3, 4, 5:
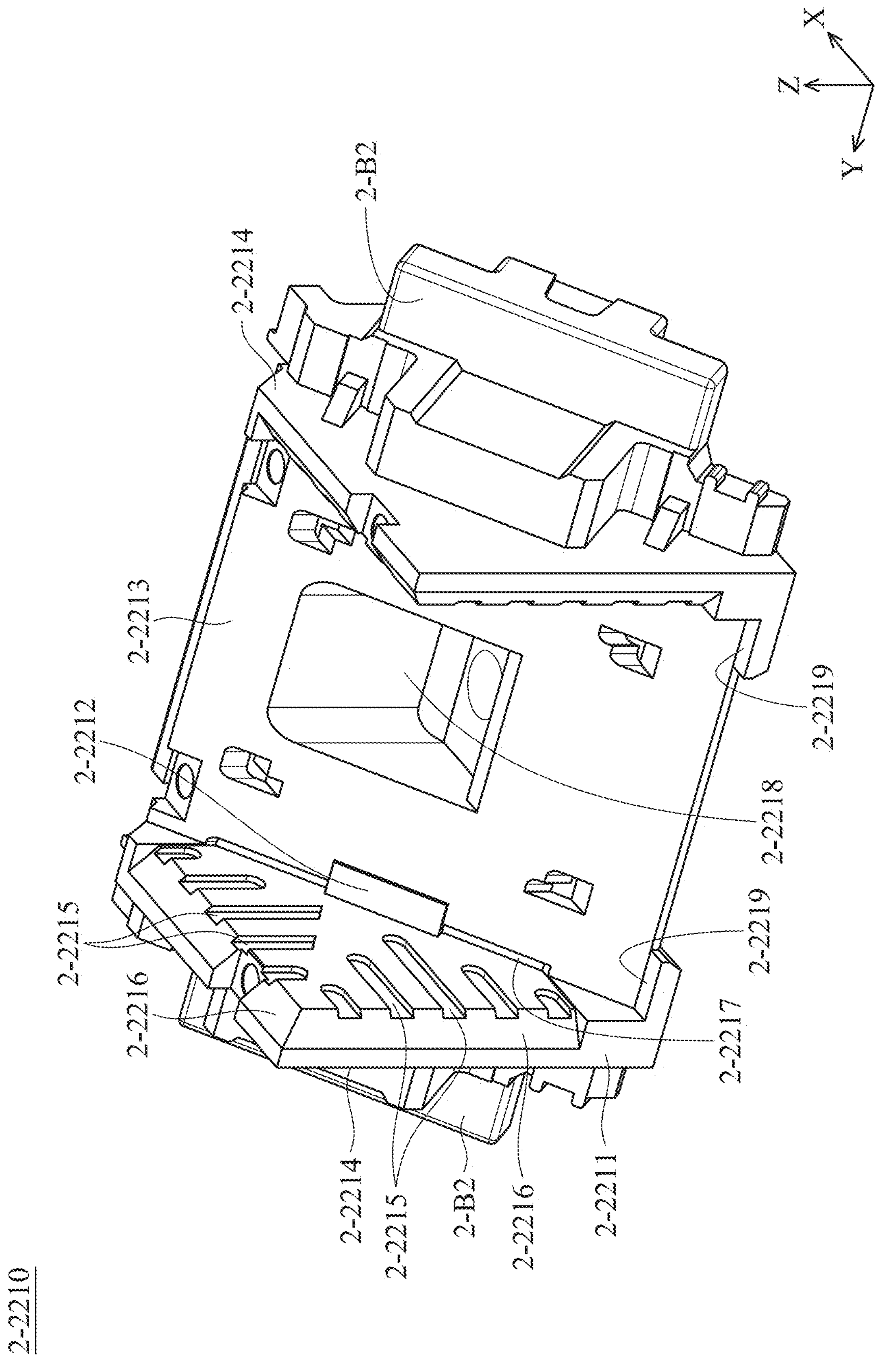
Figures 2, 3, 4, 5, 6:
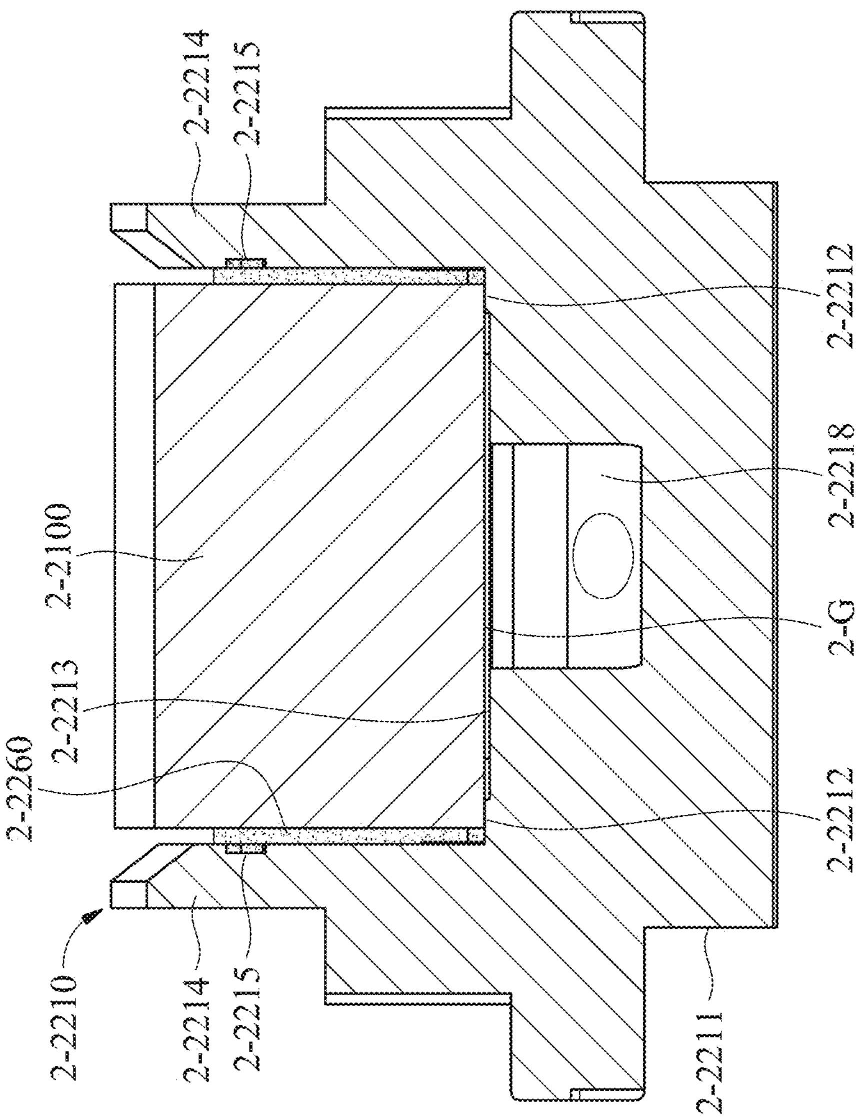
Figures 2, 3, 4, 5, 6, 7:
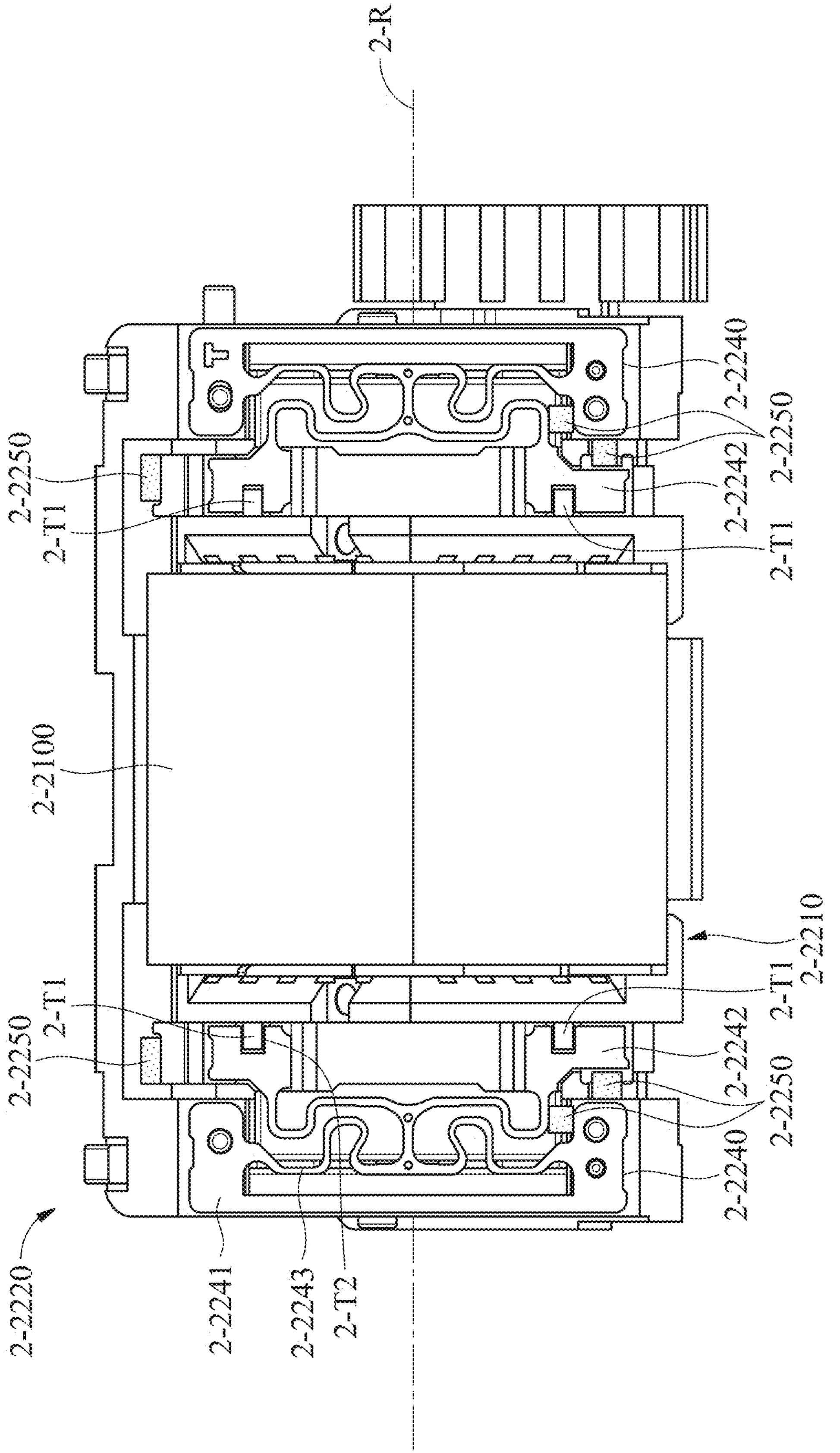
Figures 2, 3, 4, 5, 6, 7, 8, 9:
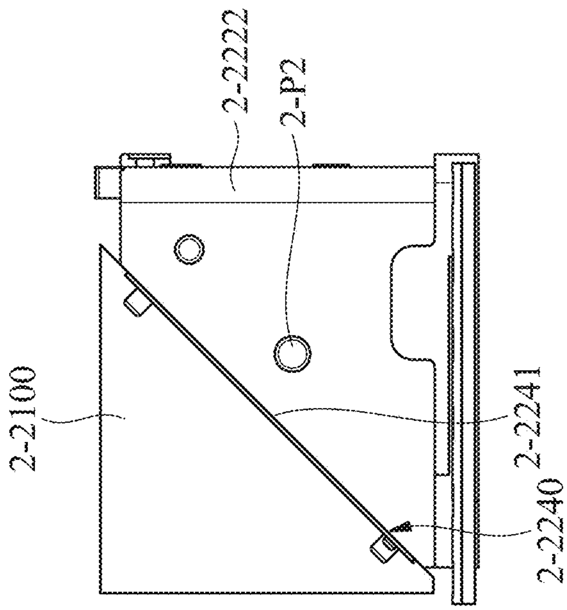
Figures 2, 3, 4, 5, 6, 7, 8:
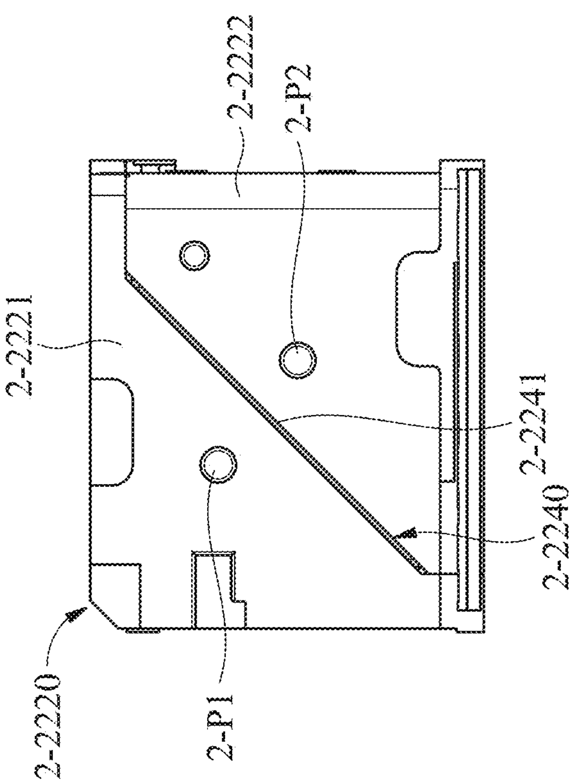
Figures 2, 3, 4, 5, 6, 7, 8, 9, 10:
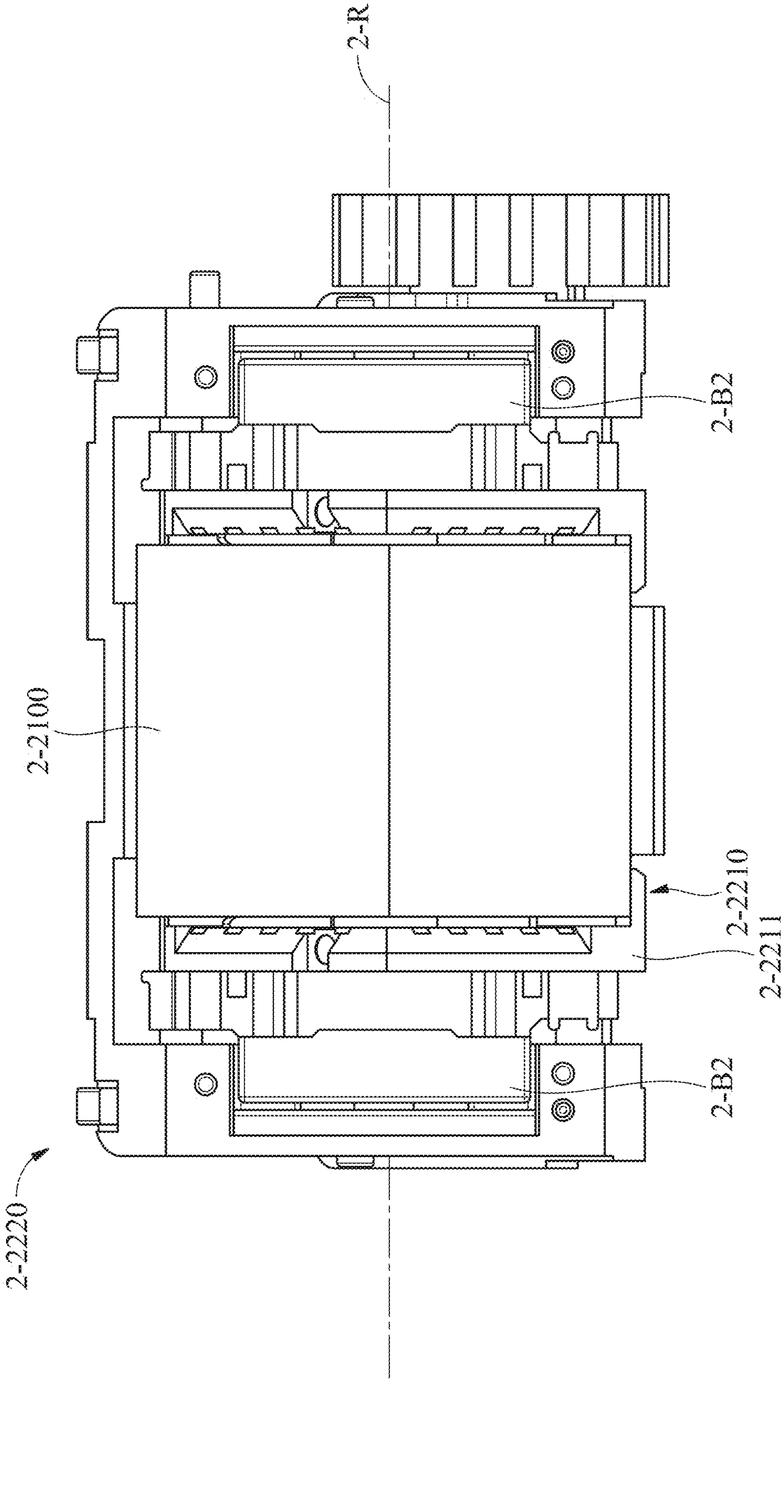
Figures 1, 3:
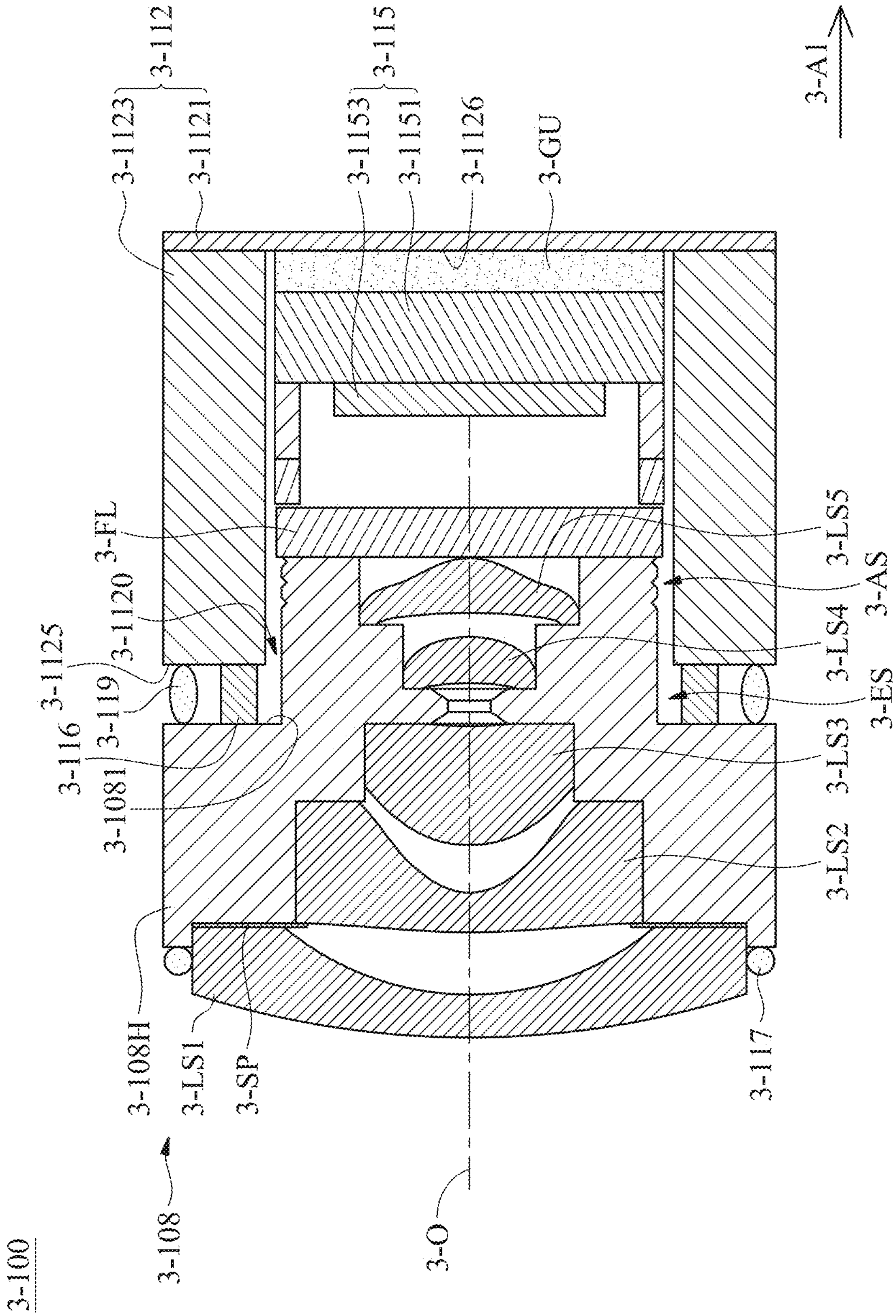
Figures 2, 3:
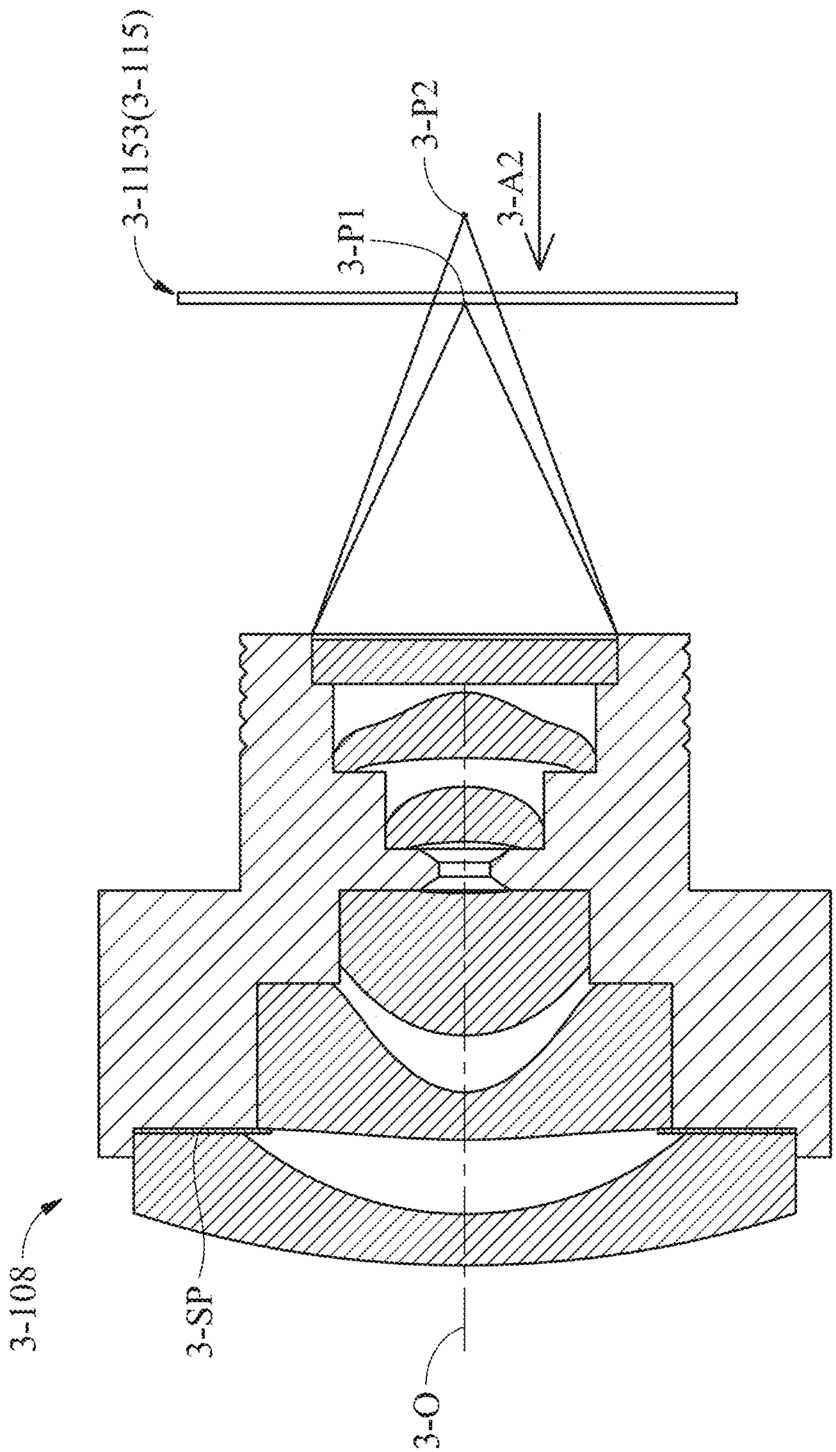
Figure 3:
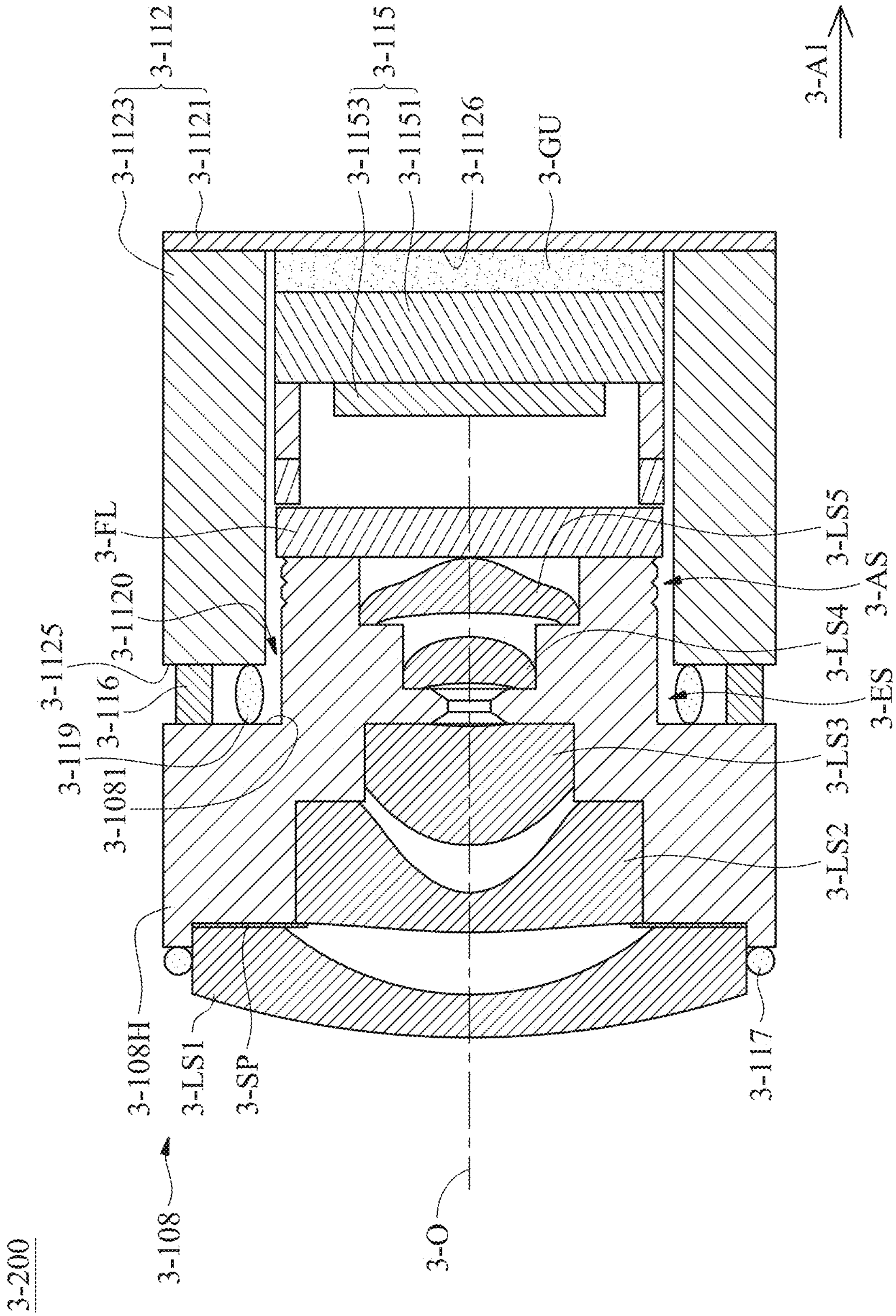
Figures 3, 4:
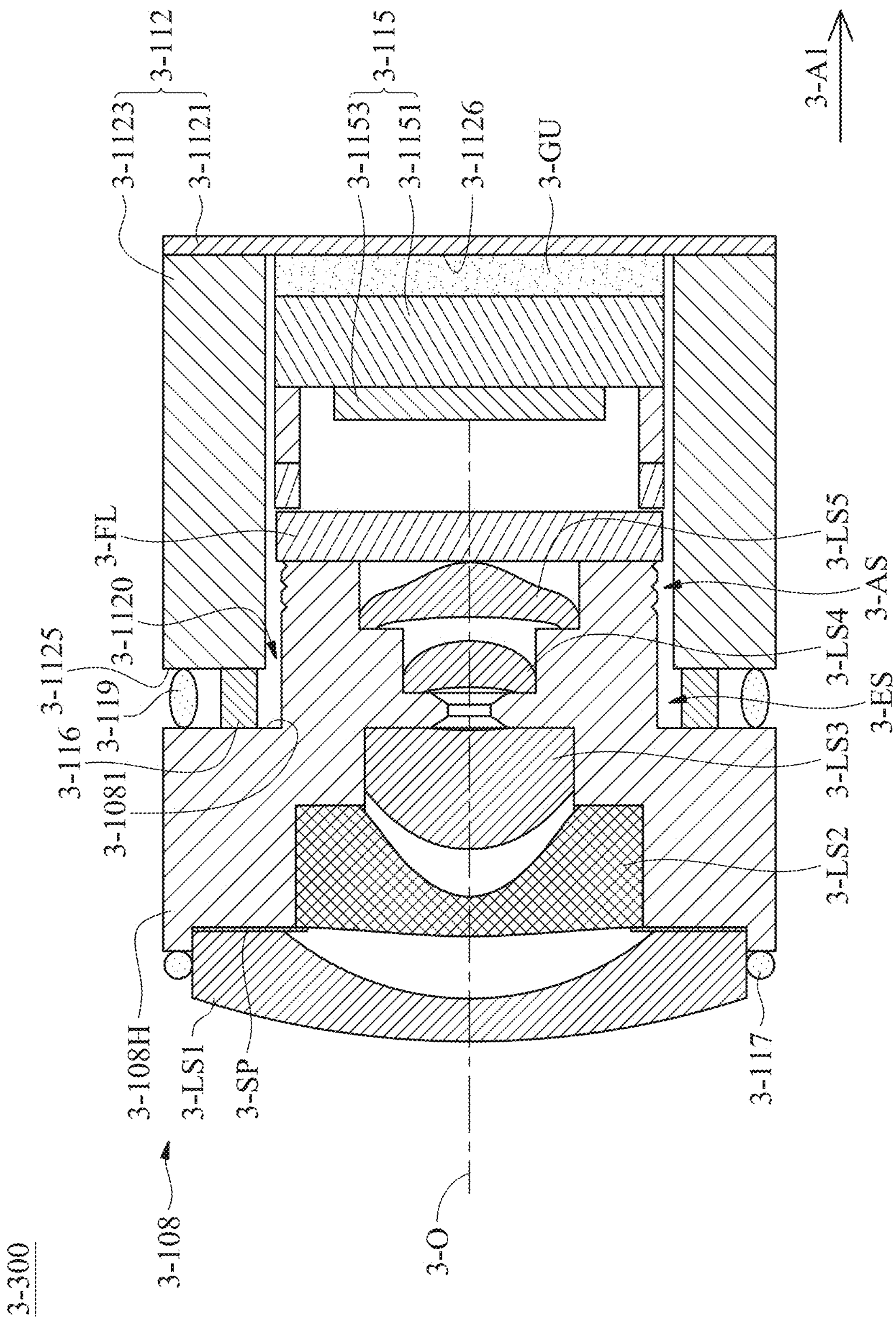
Figures 3, 4, 5:
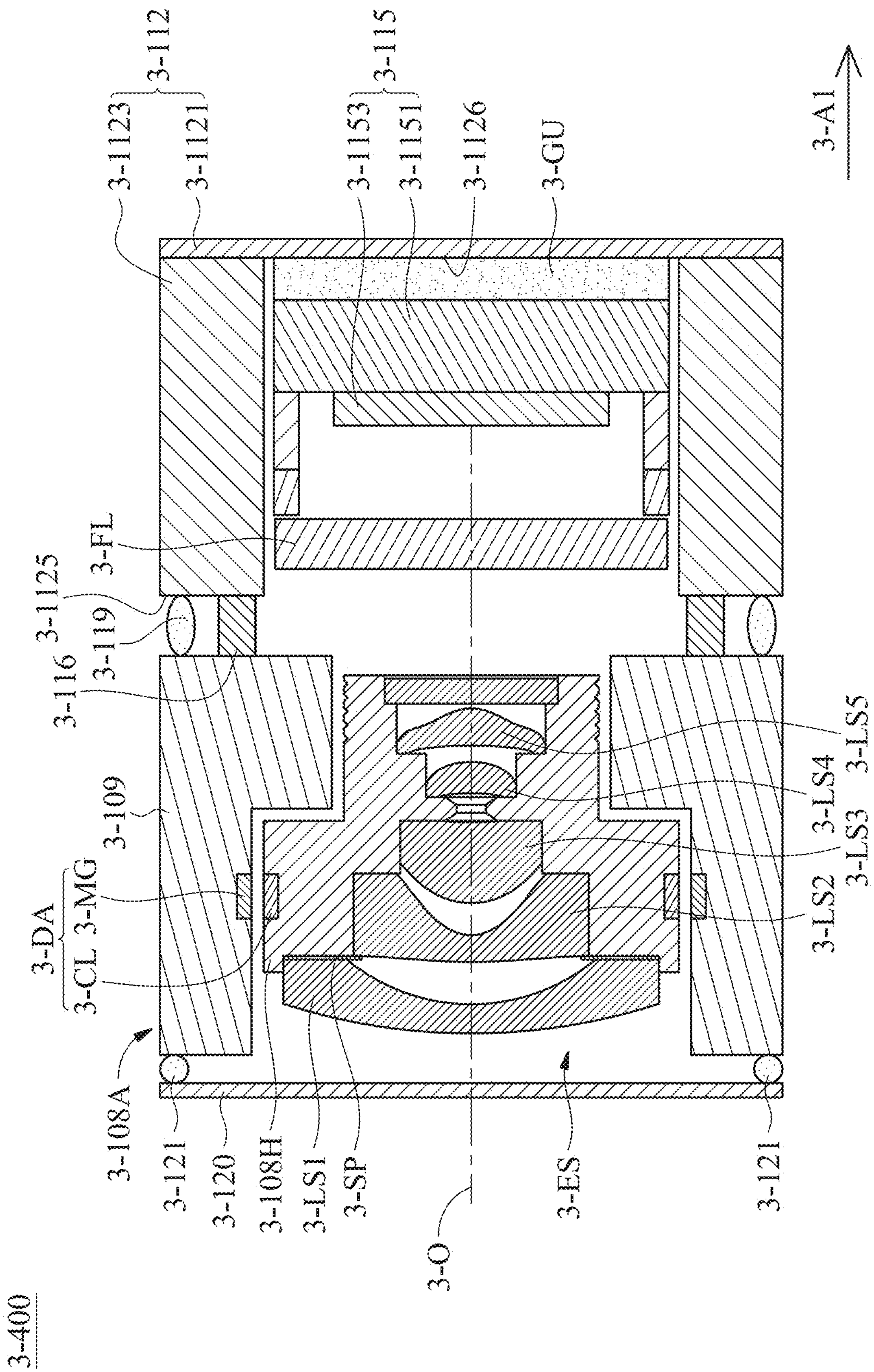
Figures 1, 4:
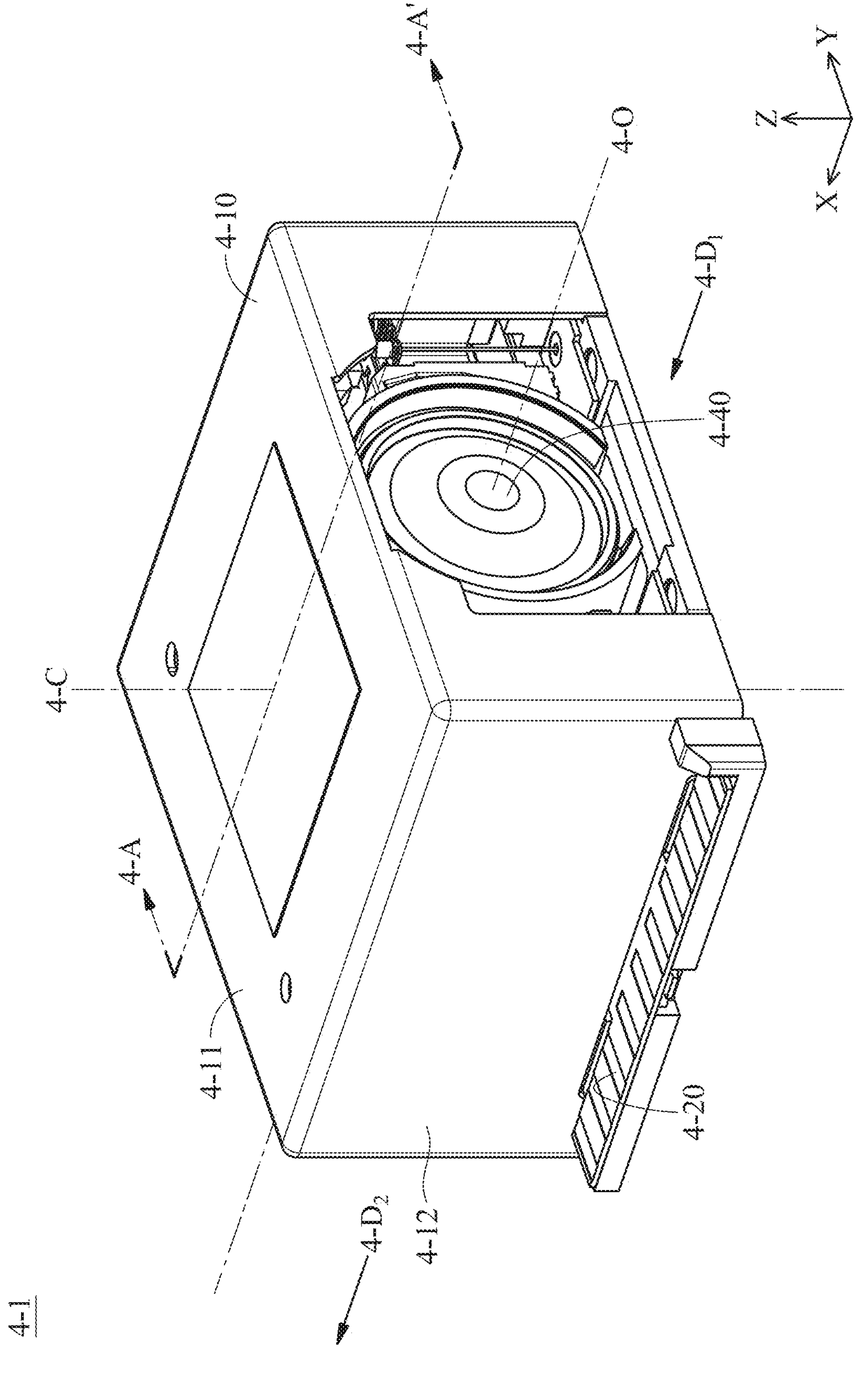
Figures 2, 4:
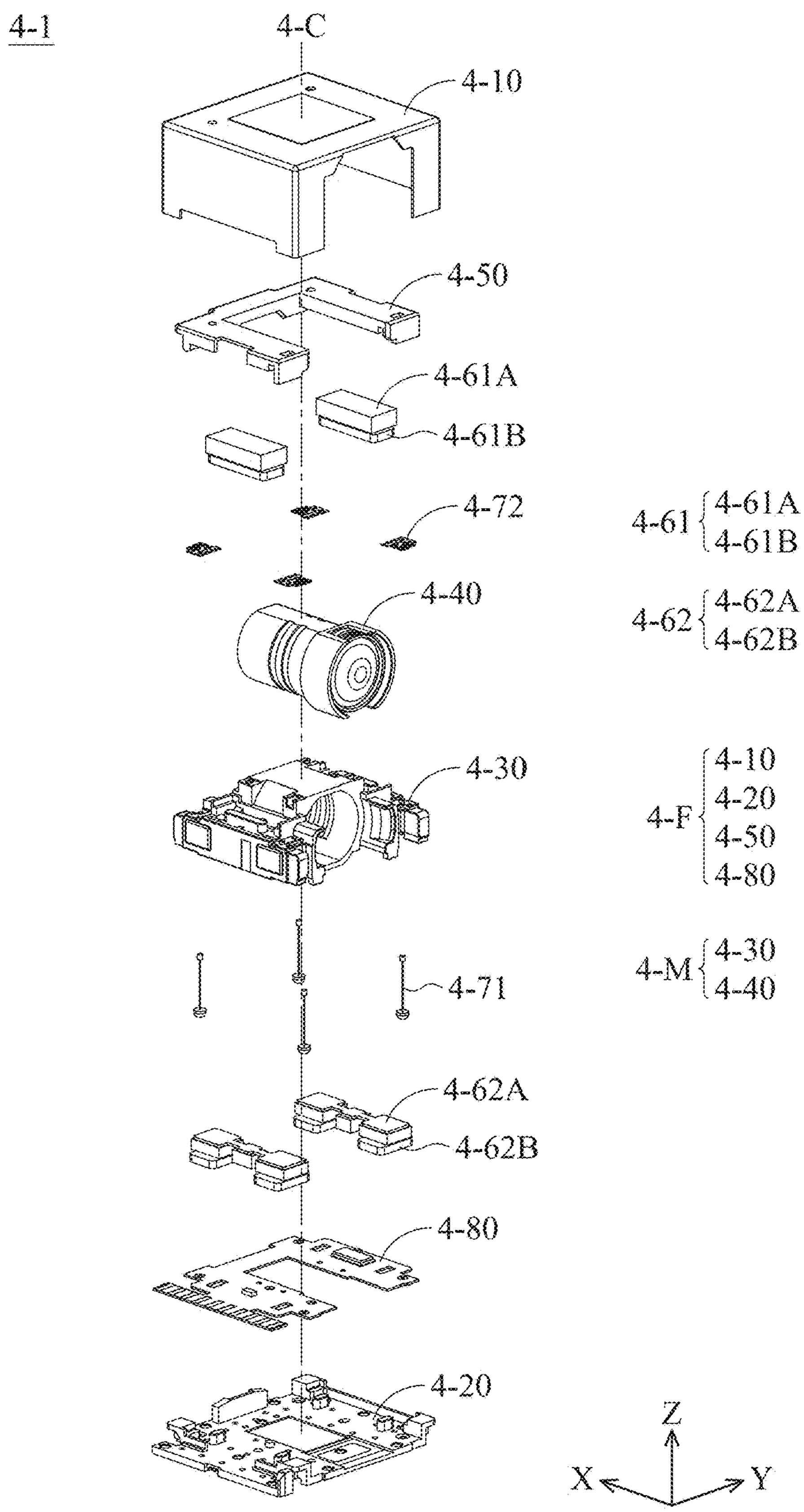
Figures 3, 4:
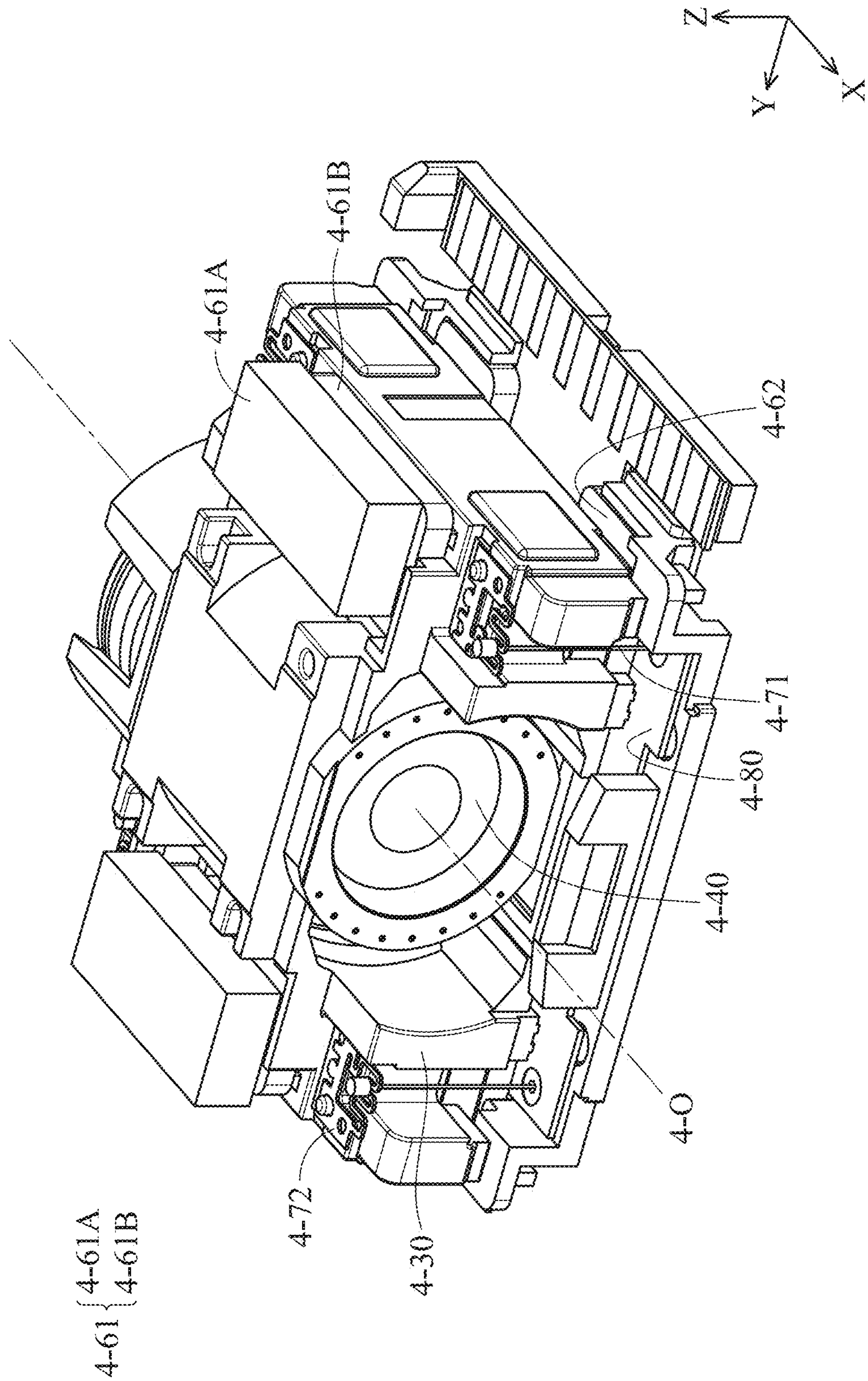
Figure 4:
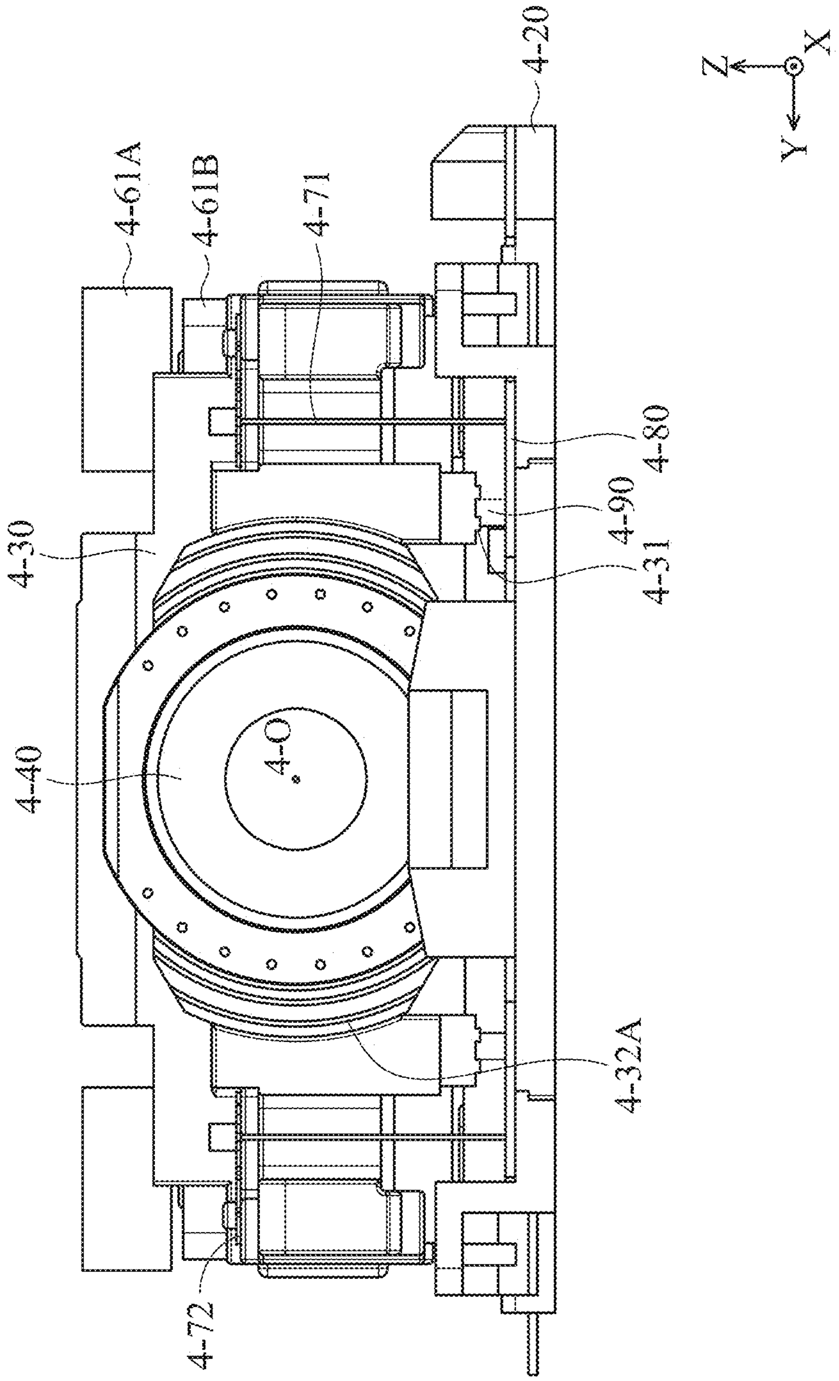
Figures 4, 5:
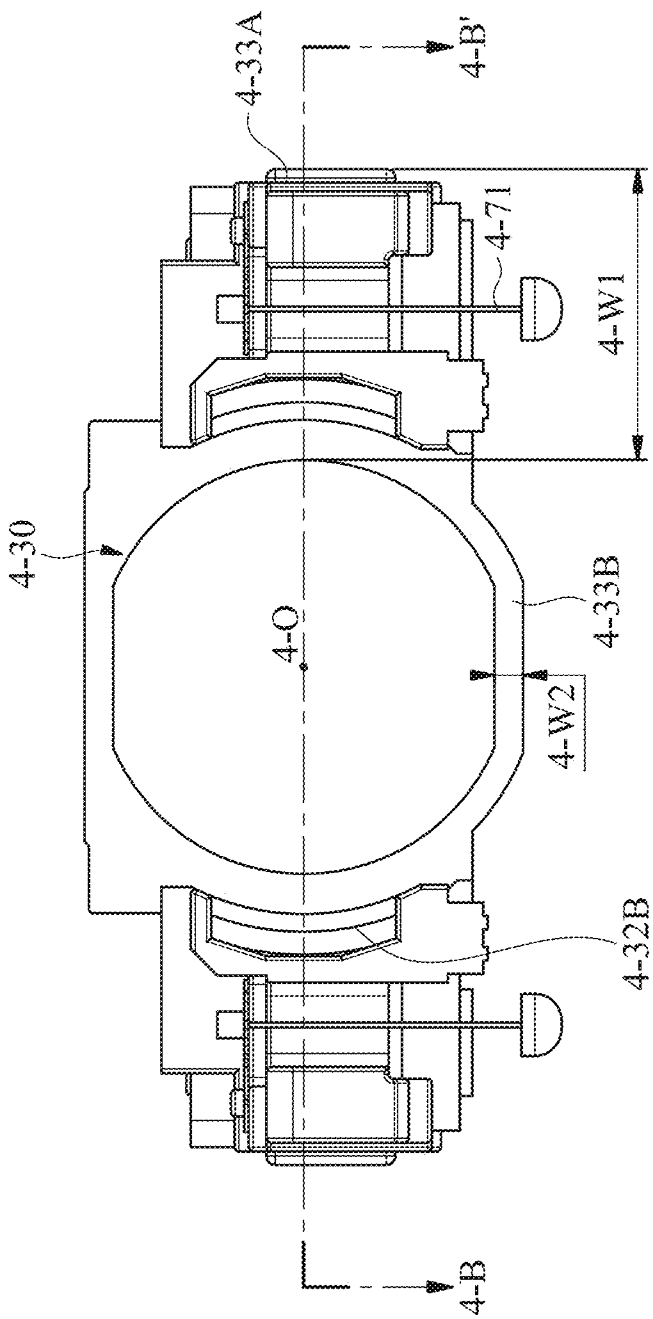
Figures 4, 5, 6:
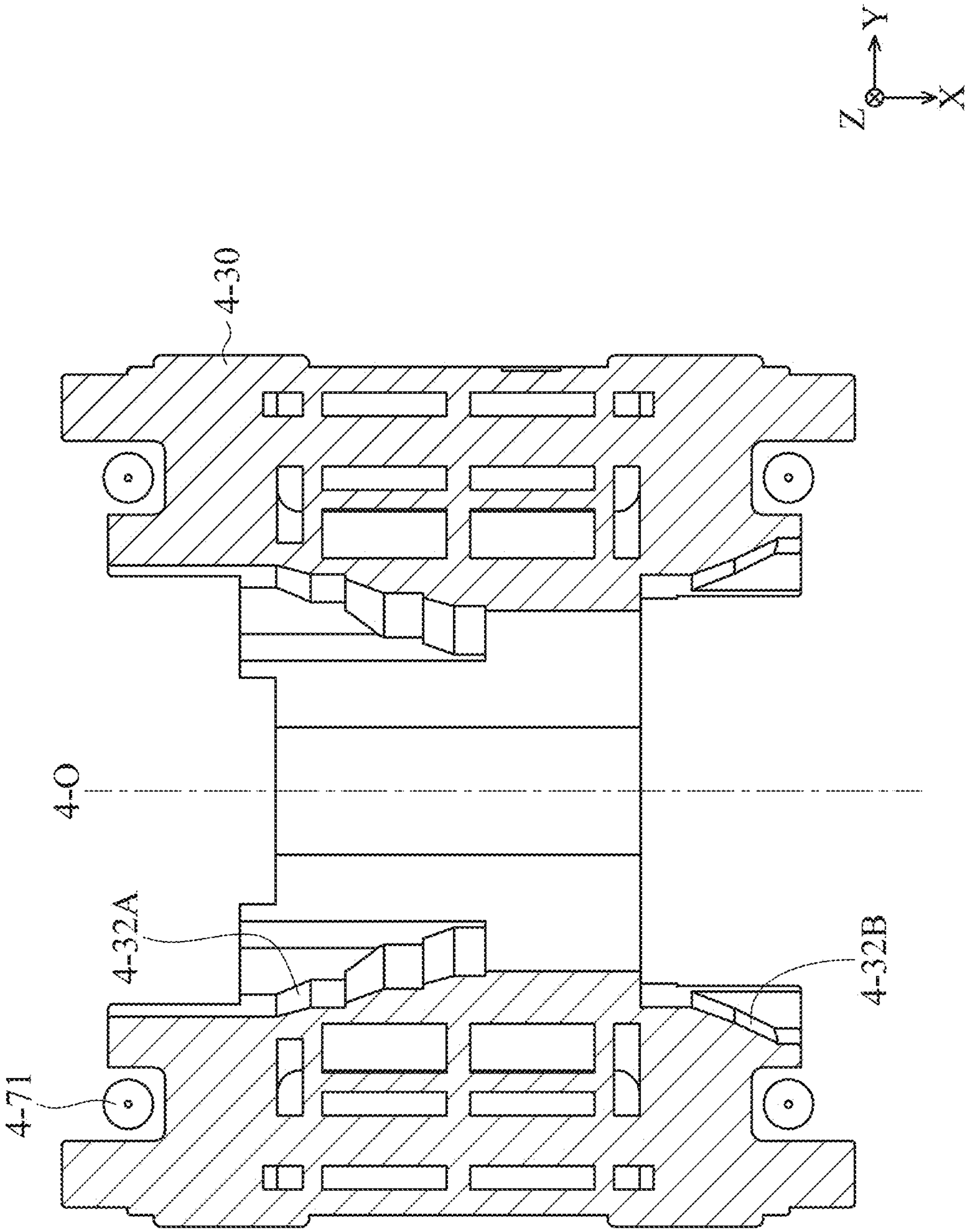
Figures 4, 5, 6, 7:
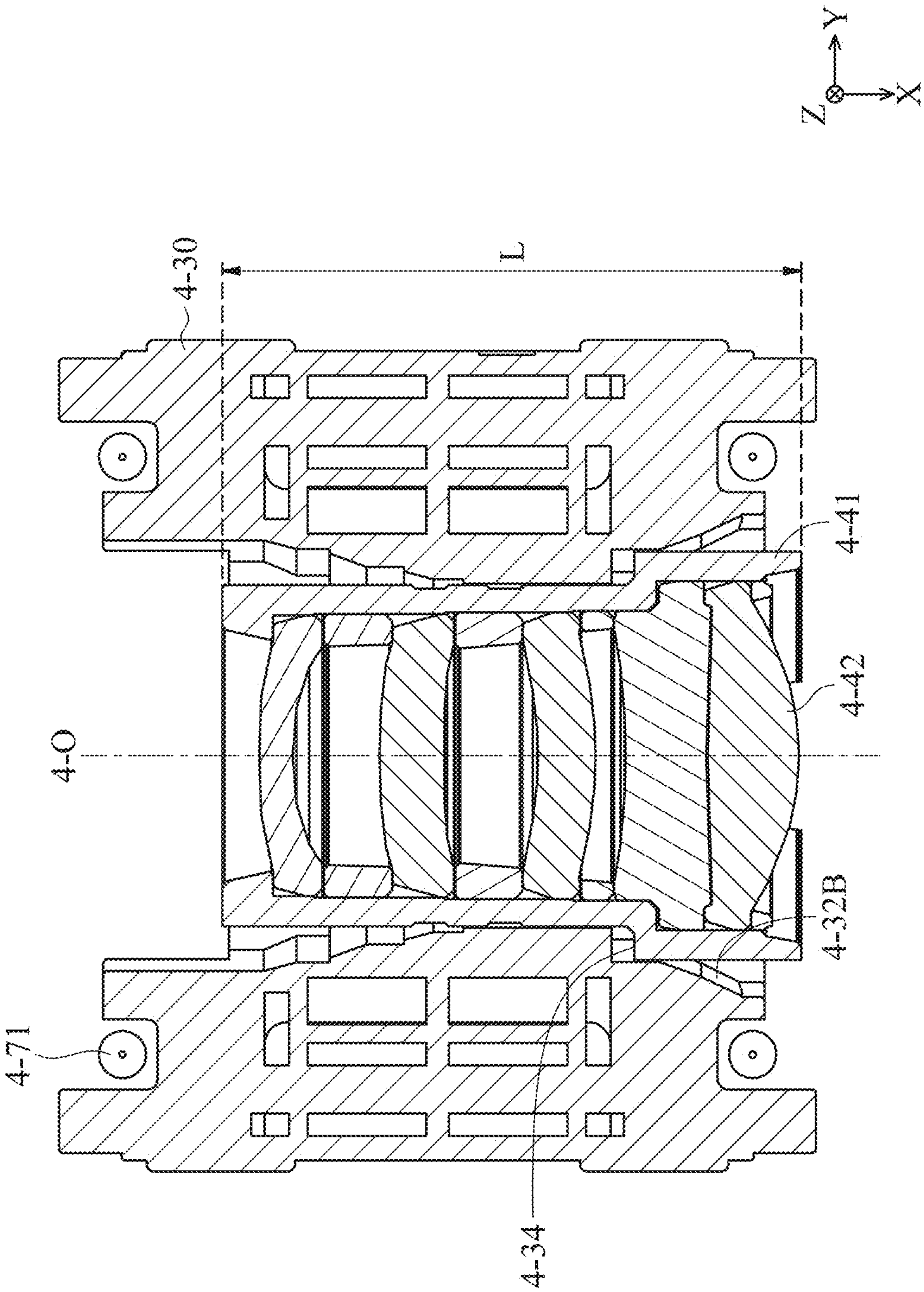
Figures 4, 5, 6, 7, 8, 8A:
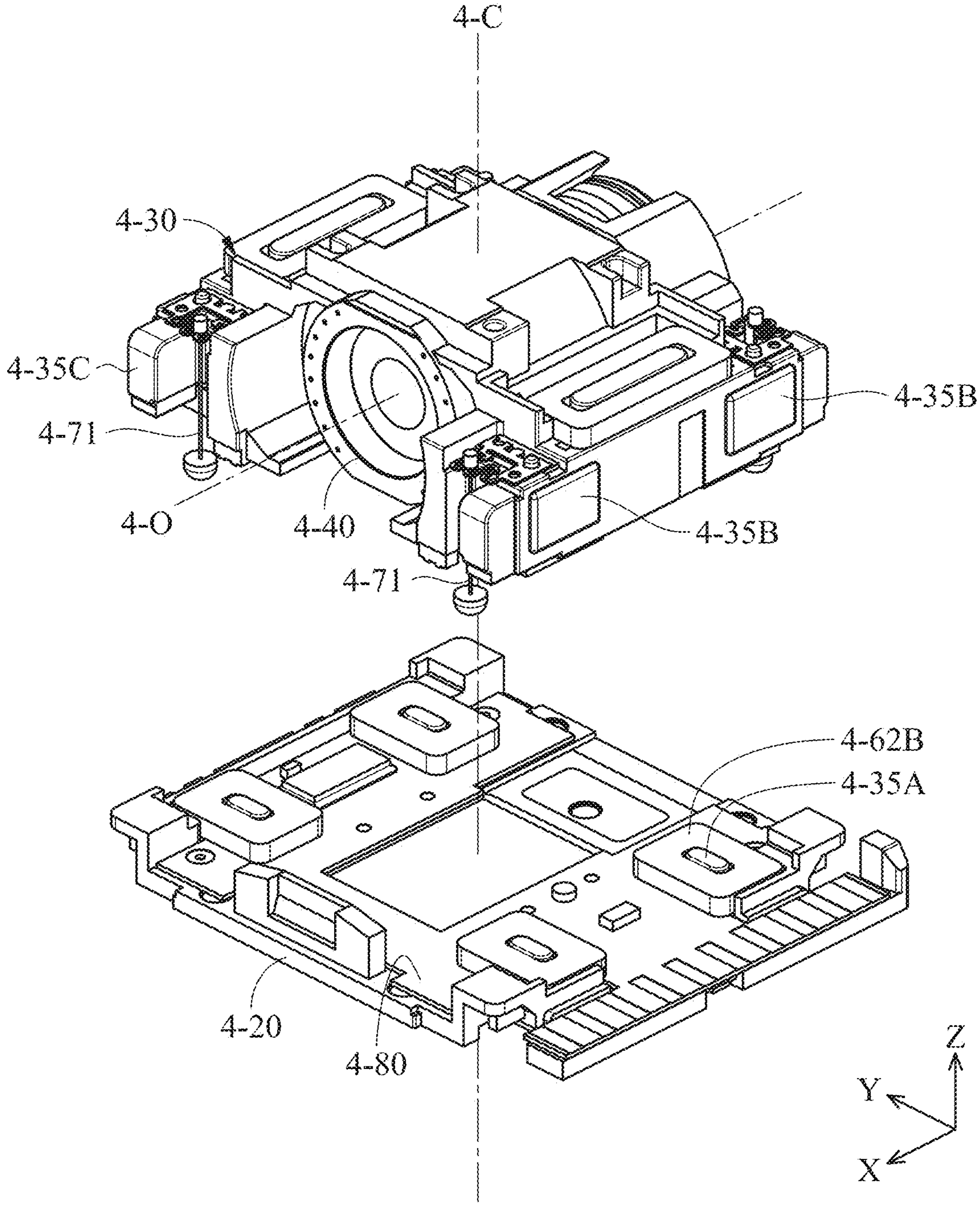
Figures 4, 5, 6, 7, 8, 8B:
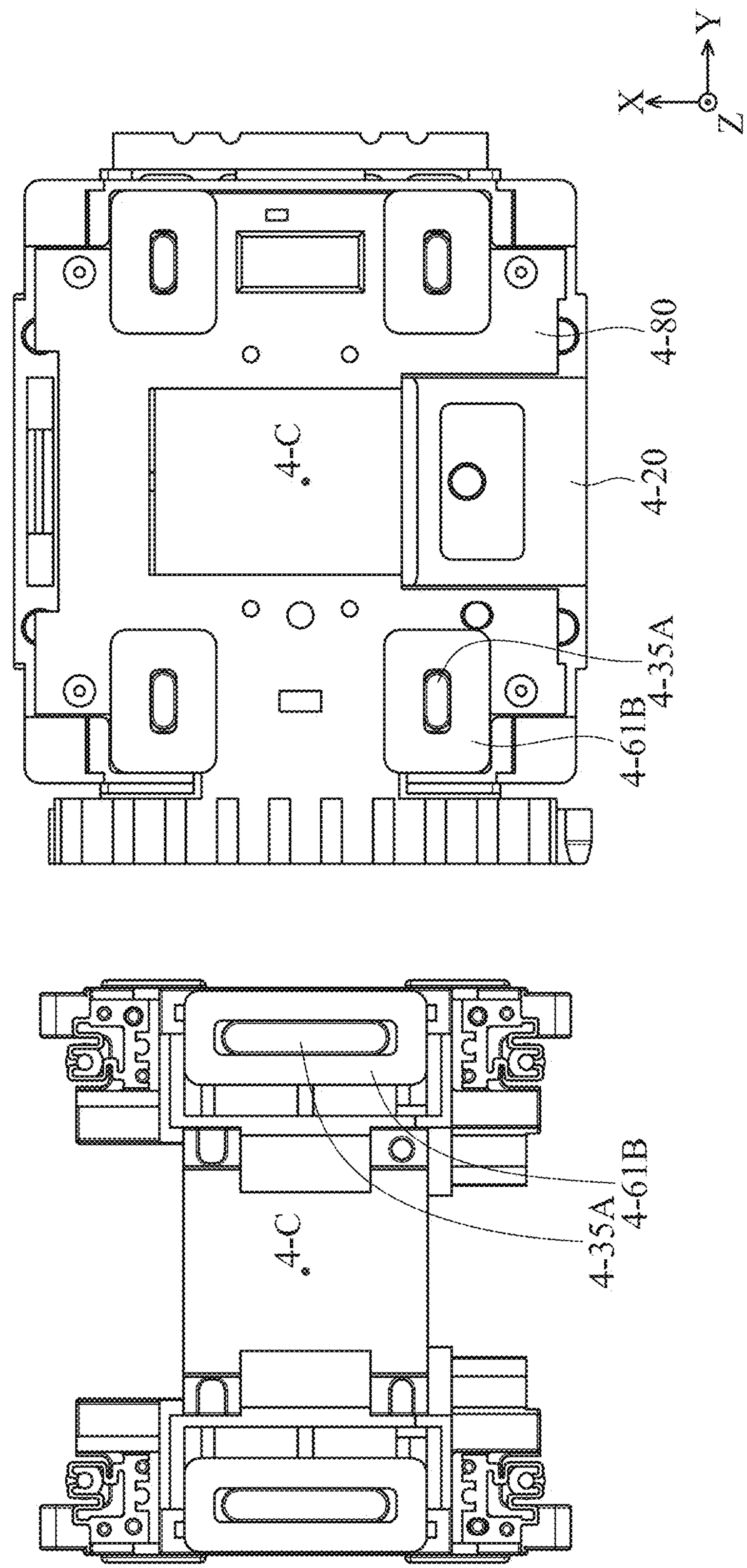
Figures 4, 5, 6, 7, 8, 9:
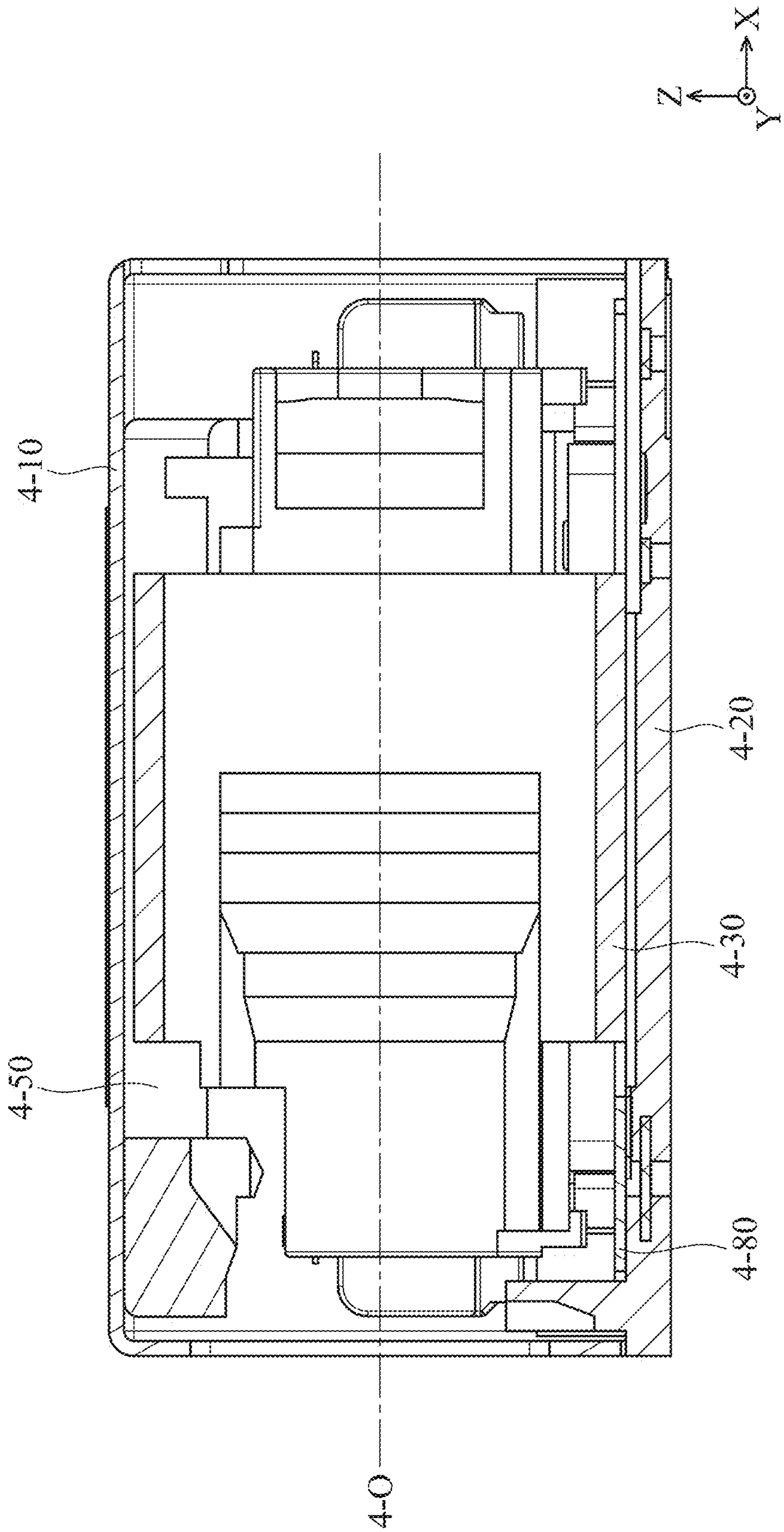
Figures 4, 5, 6, 7, 8, 9, 10, 10A:
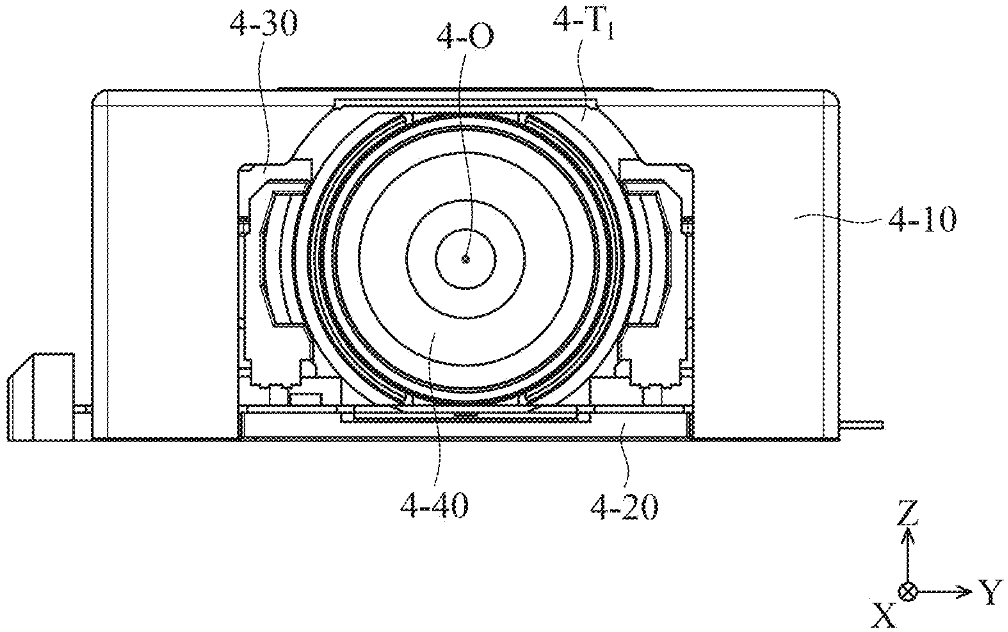
Figures 4, 5, 6, 7, 8, 9, 10, 10B:
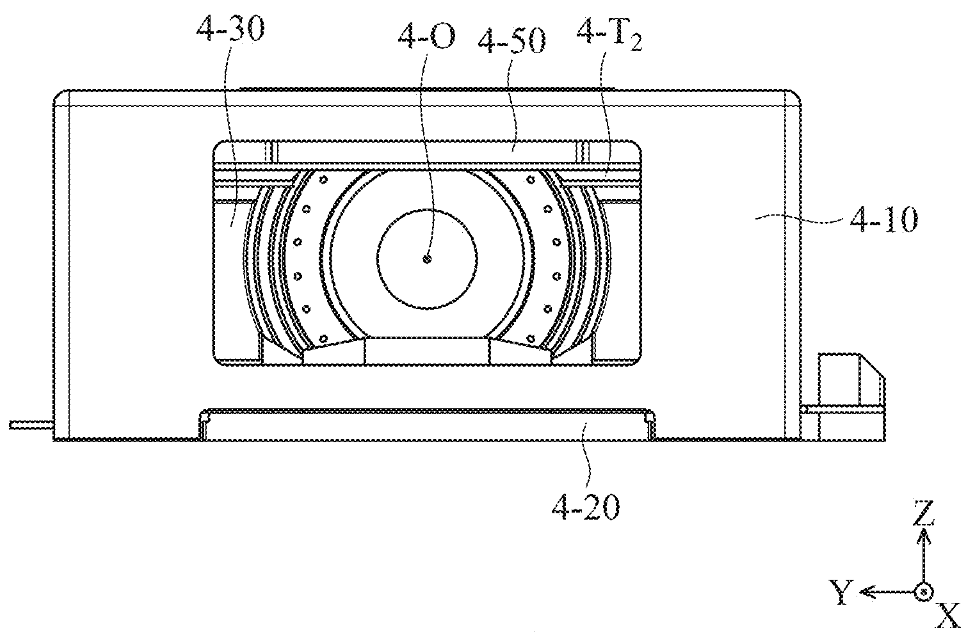

FIG. 10-2 is an exploded view of the aperture unit in FIG. 10-1.

FIG. 10-3 is a cross sectional view illustrated along the line 10-A-10-A' of FIG. 10-1.

FIG. 10-4A is a schematic view of the top plate in FIG. 10-1.

FIG. 10-4B is a schematic view of the bottom in FIG. 10-1.

Figures 1, 8:
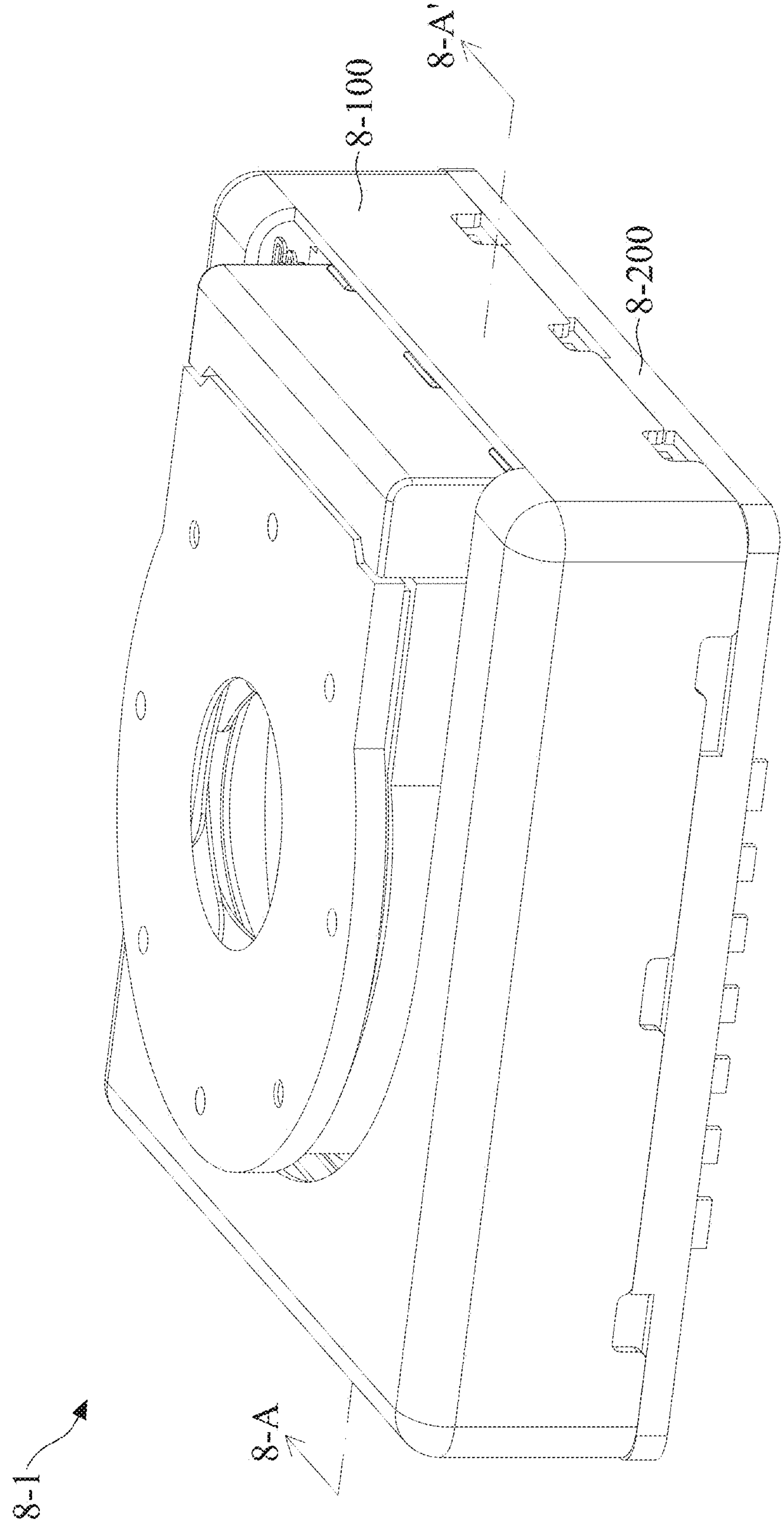
Figures 2, 8:
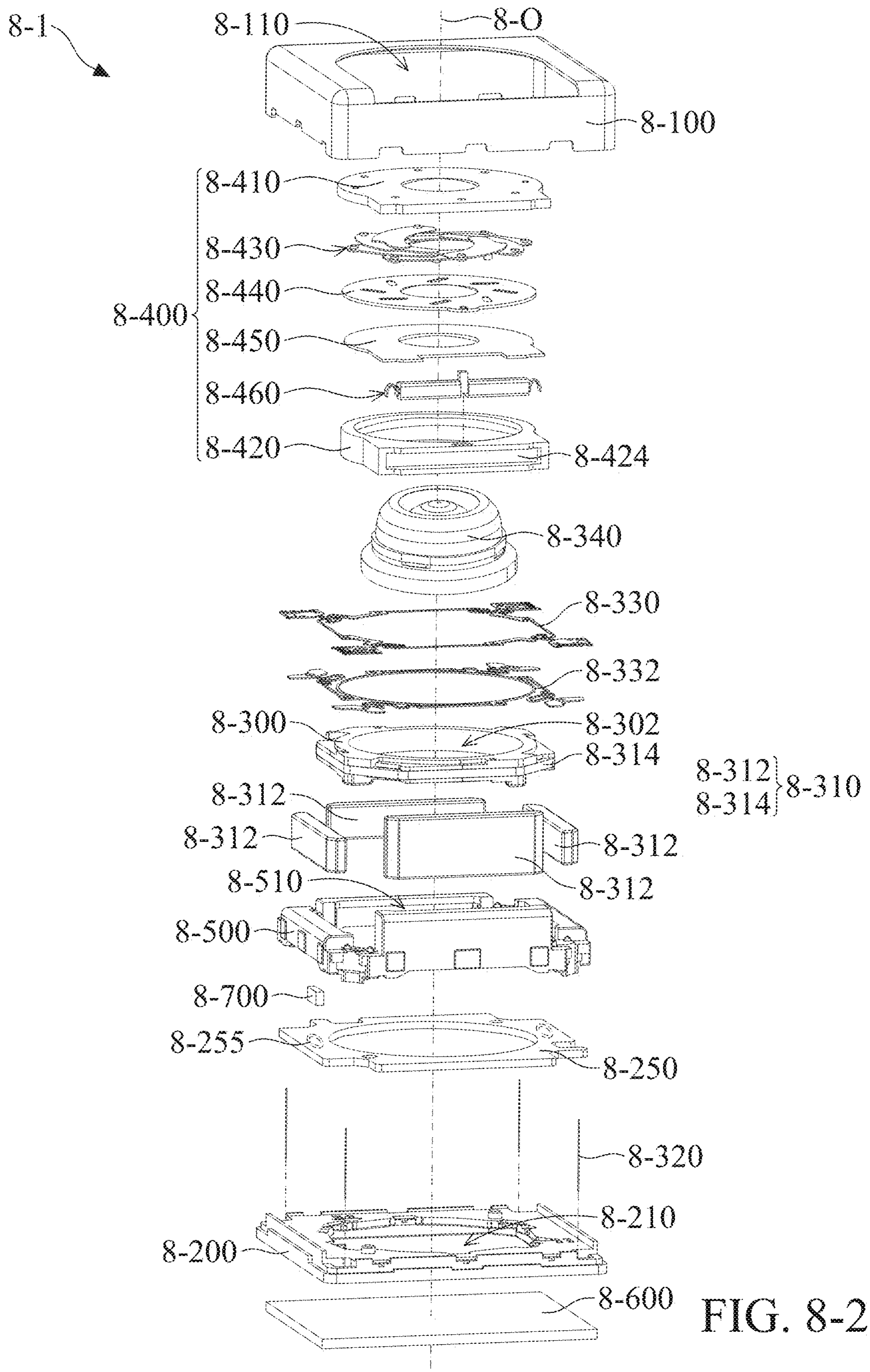
Figures 3, 8:
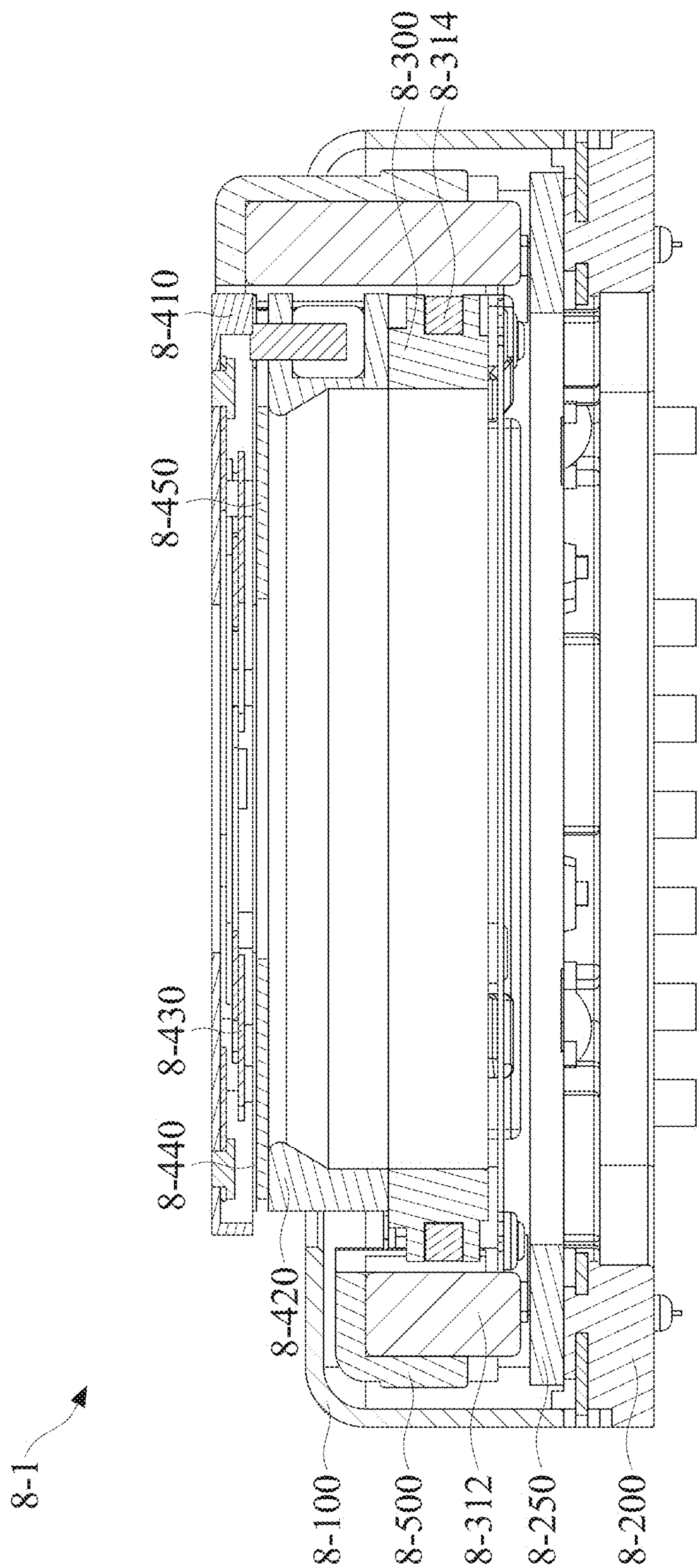
Figures 4A, 8:
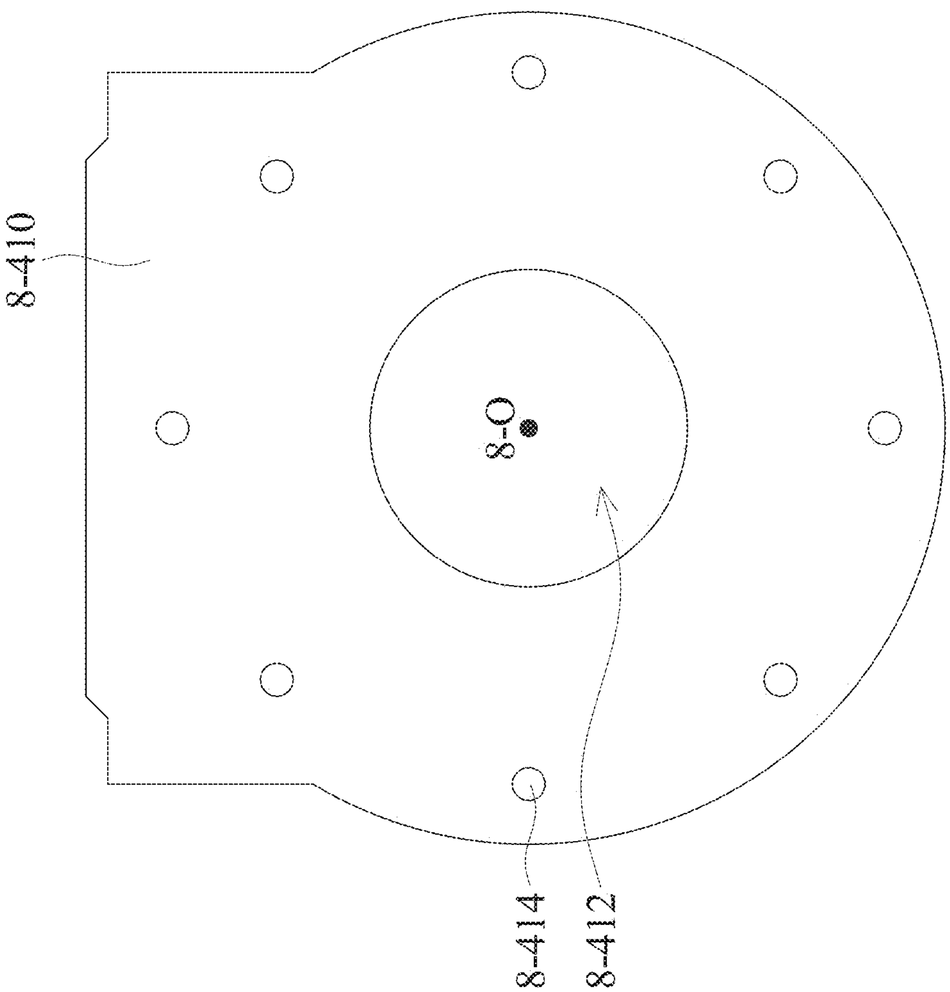
Figures 4B, 8:
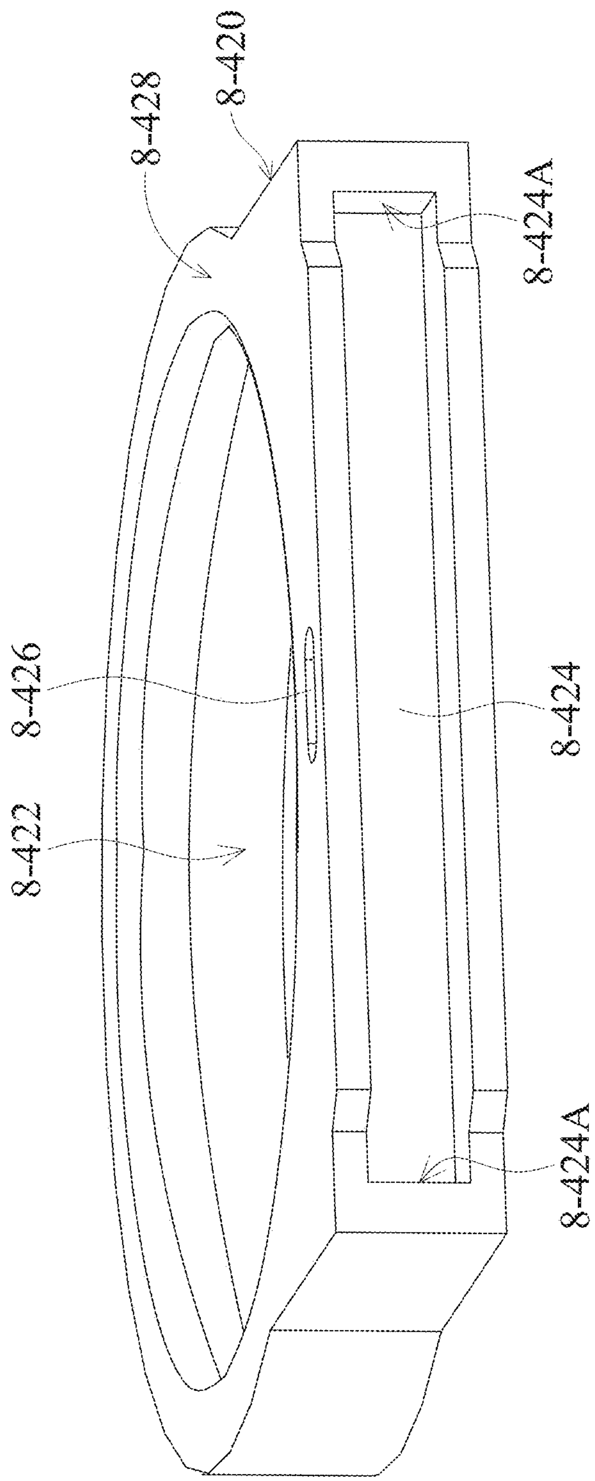
Figures 4C, 8:
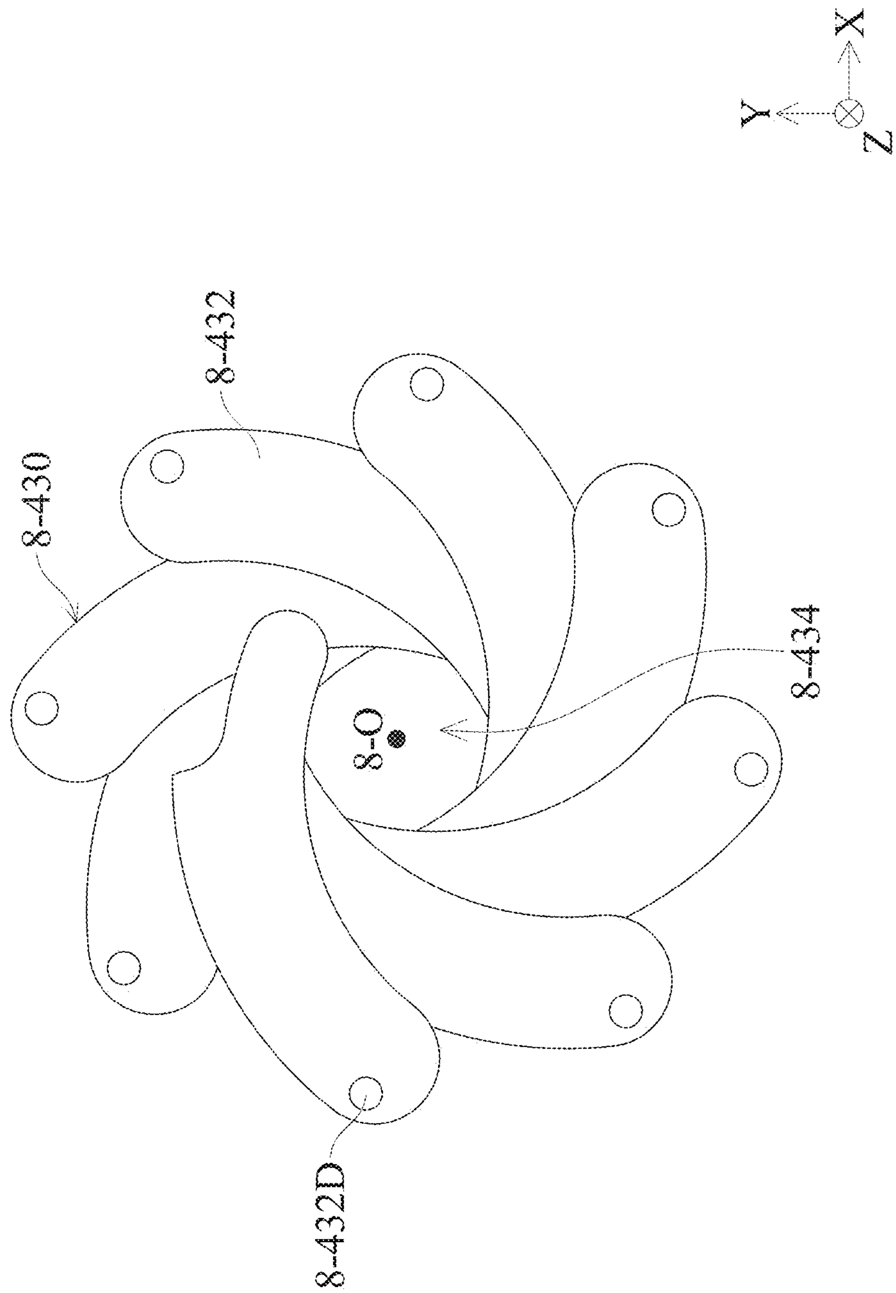

FIG. 10-4C is a schematic view of the bottom plate in FIG. 10-1.

Figures 4D, 8:
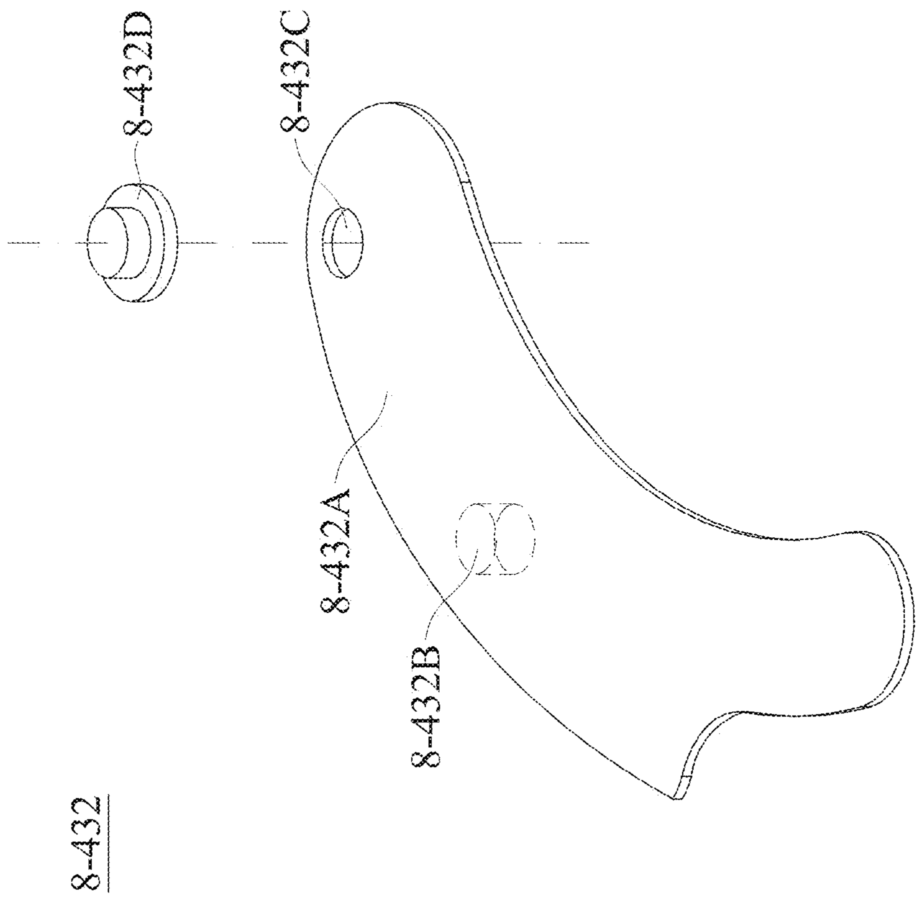

FIG. 10-4D is a schematic view of the first blade in FIG. 10-1.

Figures 4E, 8:
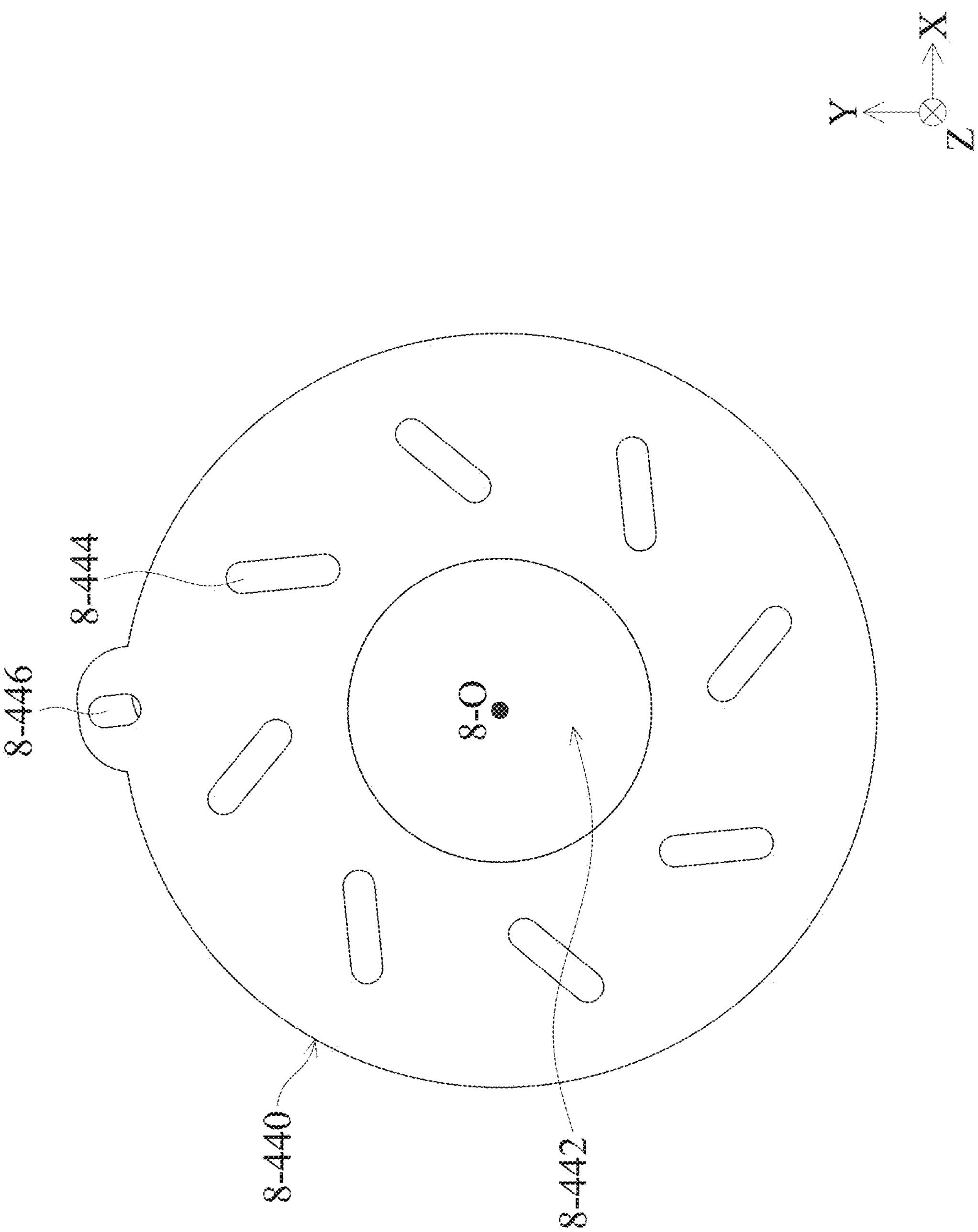

FIG. 10-4E is a schematic view of the second blade in FIG. 10-1.

Figures 4F, 8:
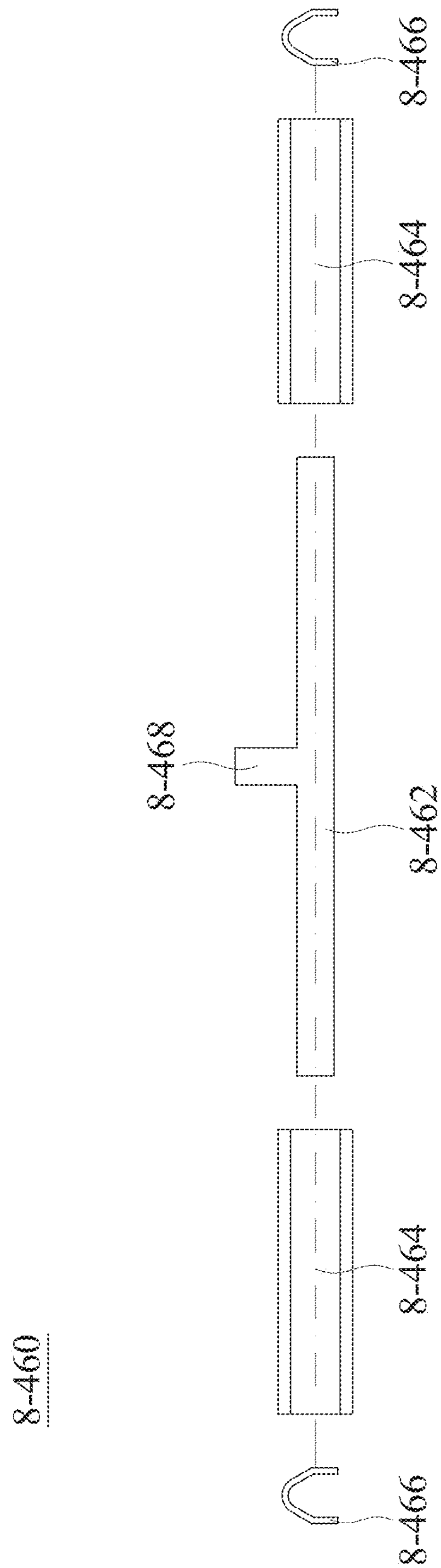

FIG. 10-4F is a schematic view of the guiding element in FIG. 10-1.

Figures 4G, 8:
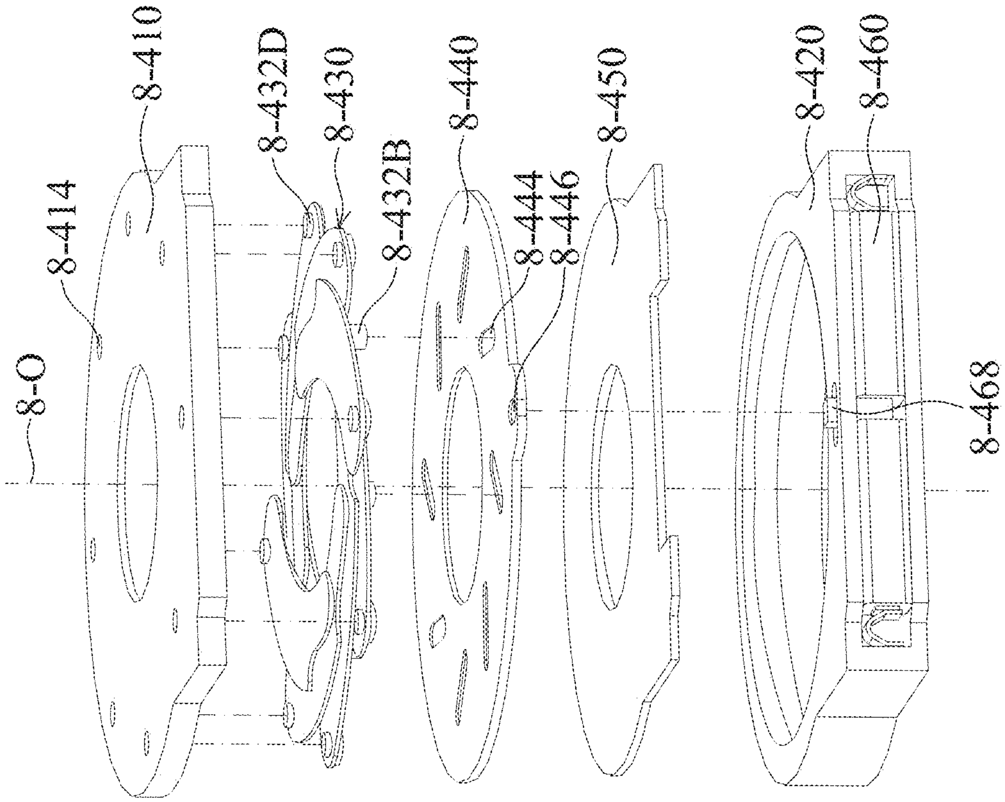
Figures 5A, 8:
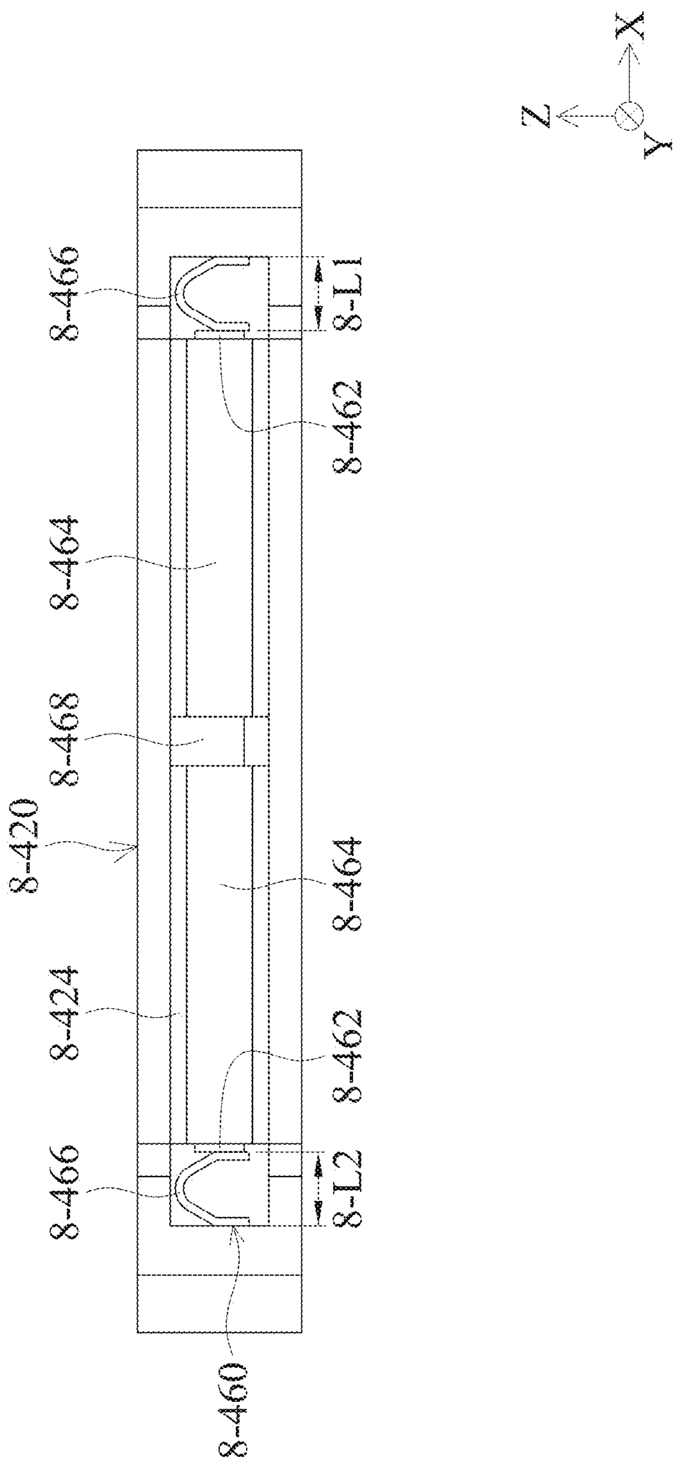
Figures 5B, 8:
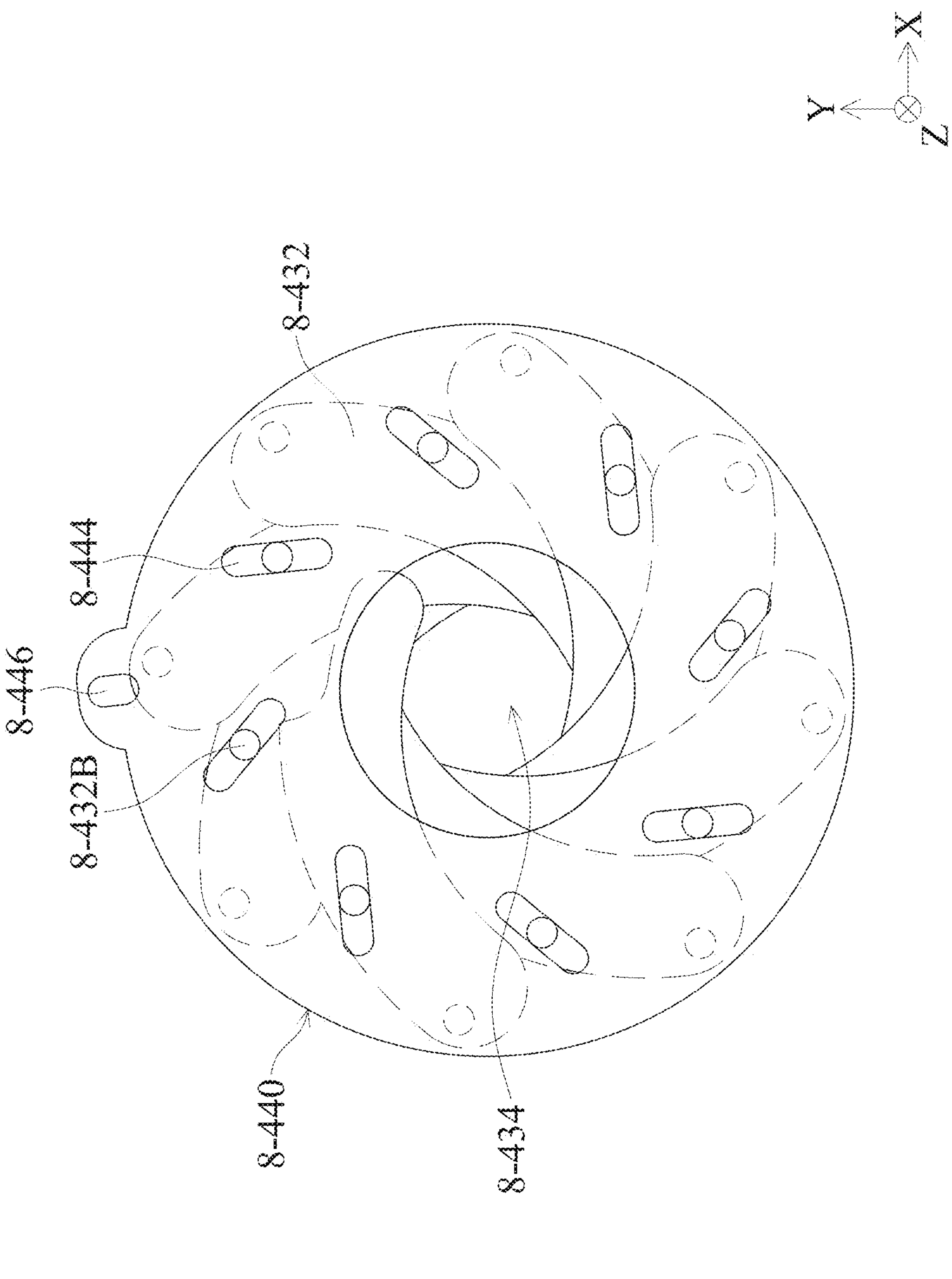
Figures 5C, 8:
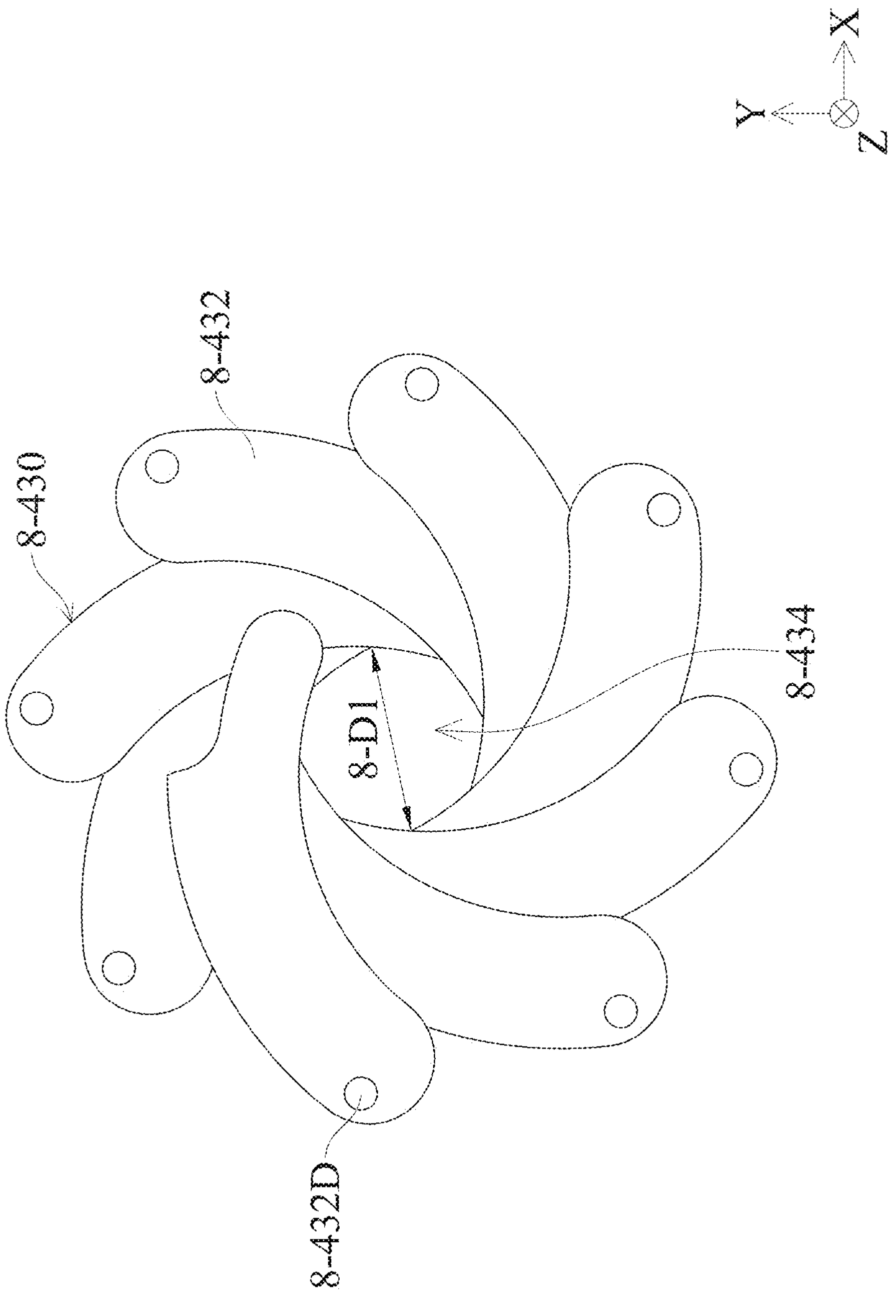
Figures 6A, 8:
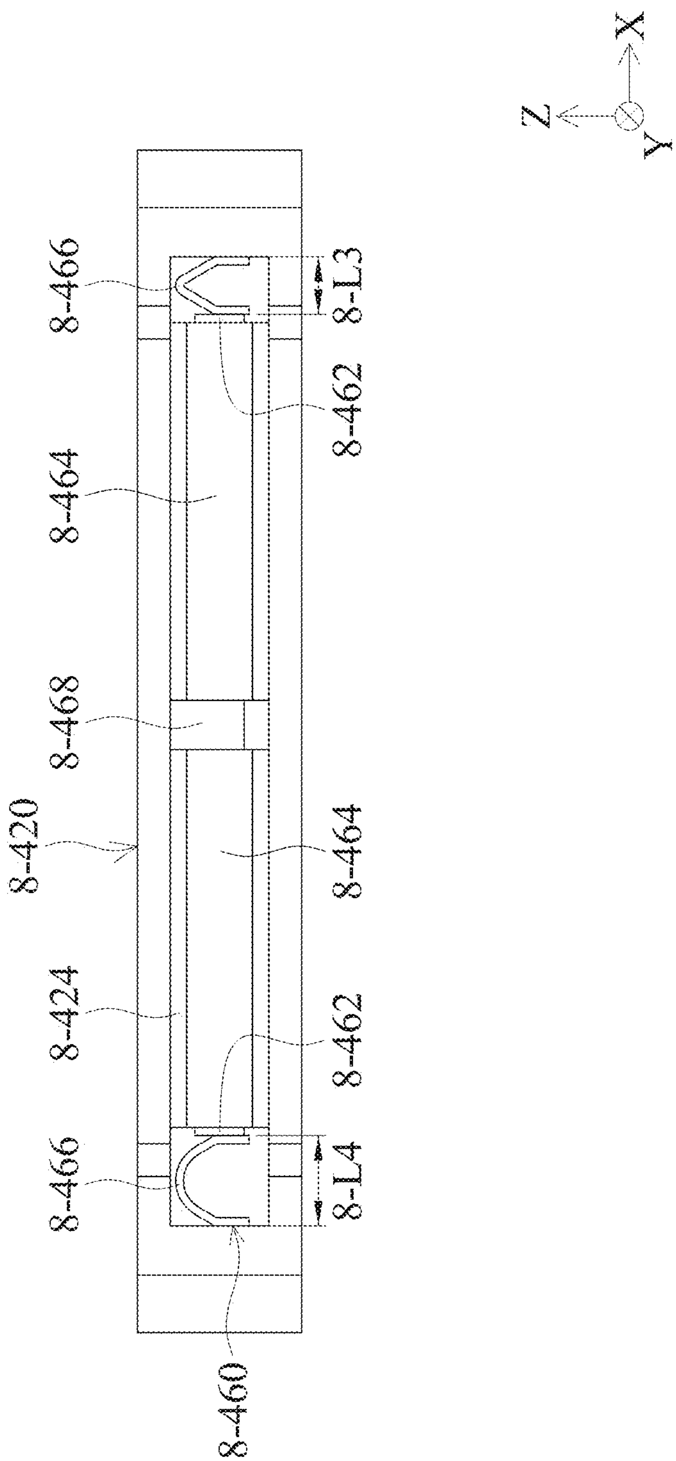
Figures 6B, 8:
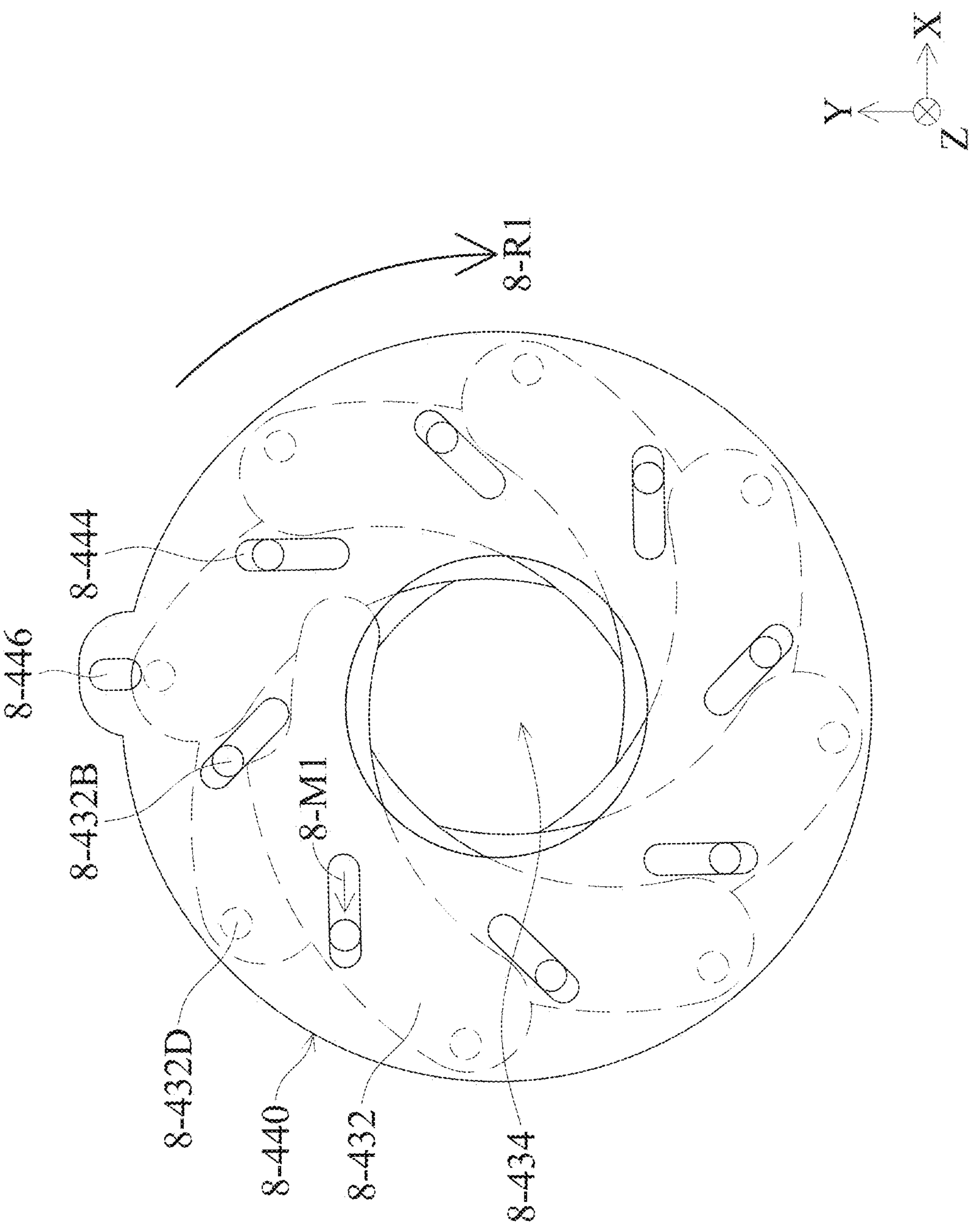

FIG. 10-4G is a schematic view of the guiding element in FIG. 10-1.

Figures 1, 10:
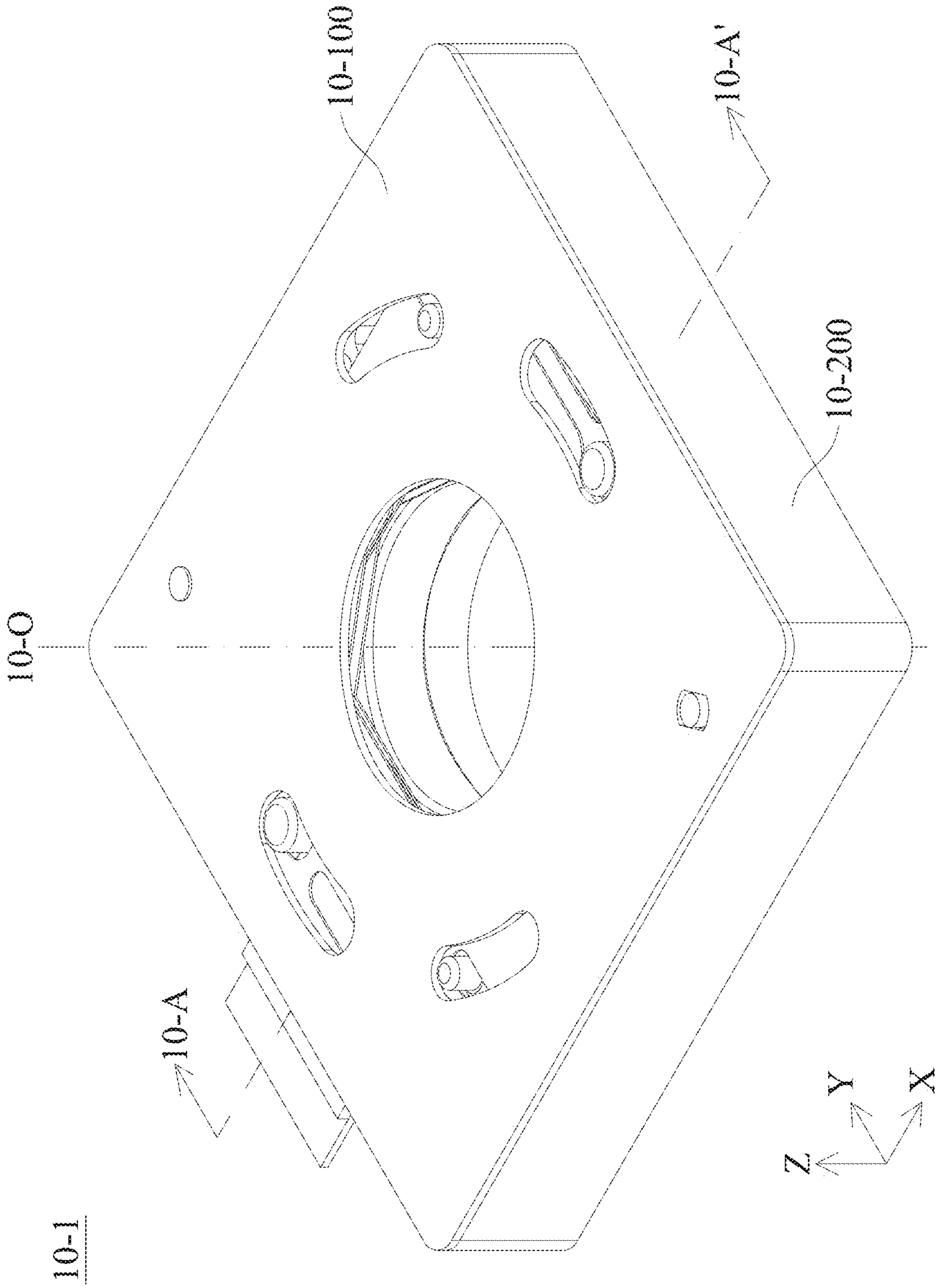
Figures 2, 10:
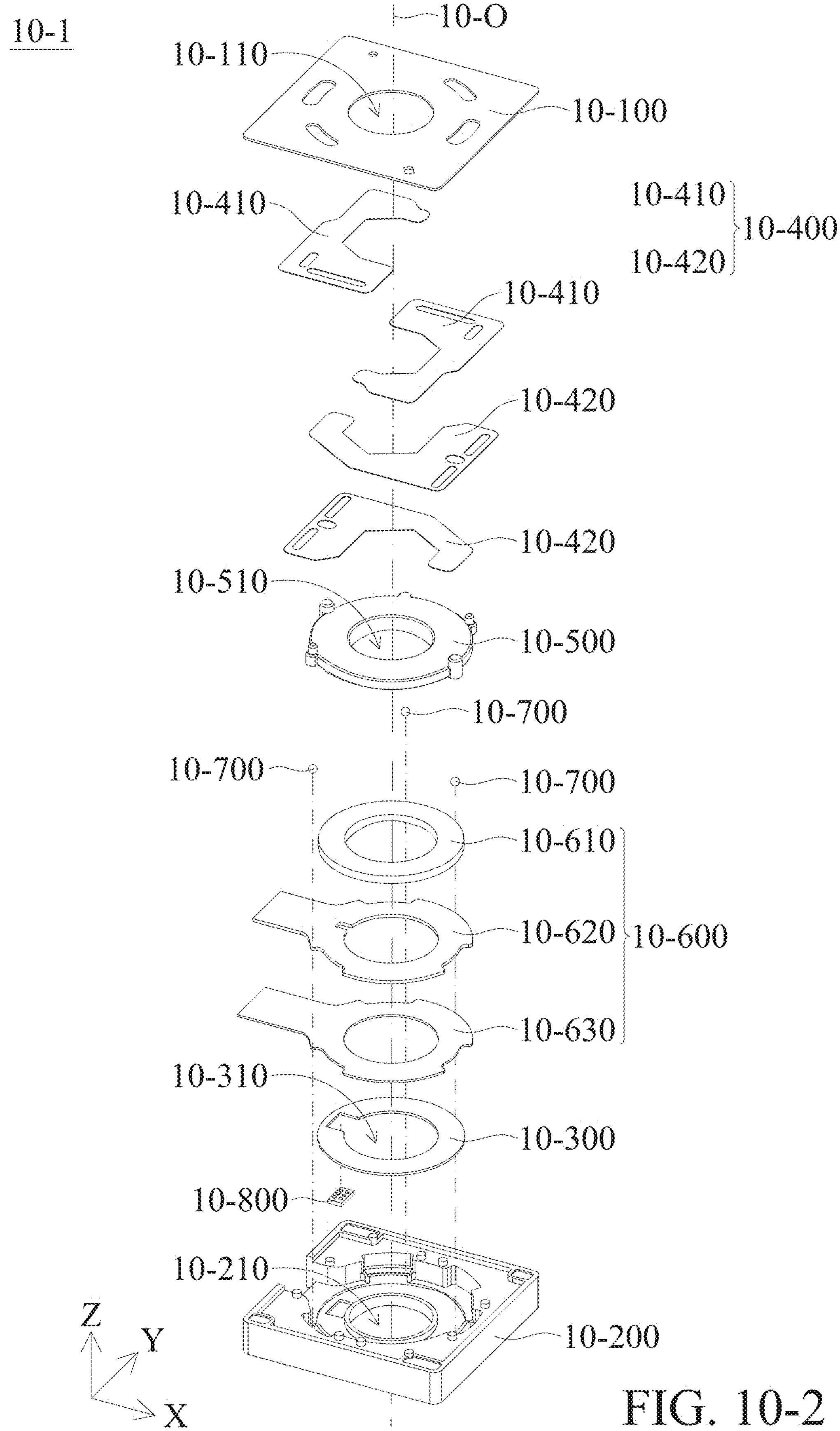
Figures 3, 10:
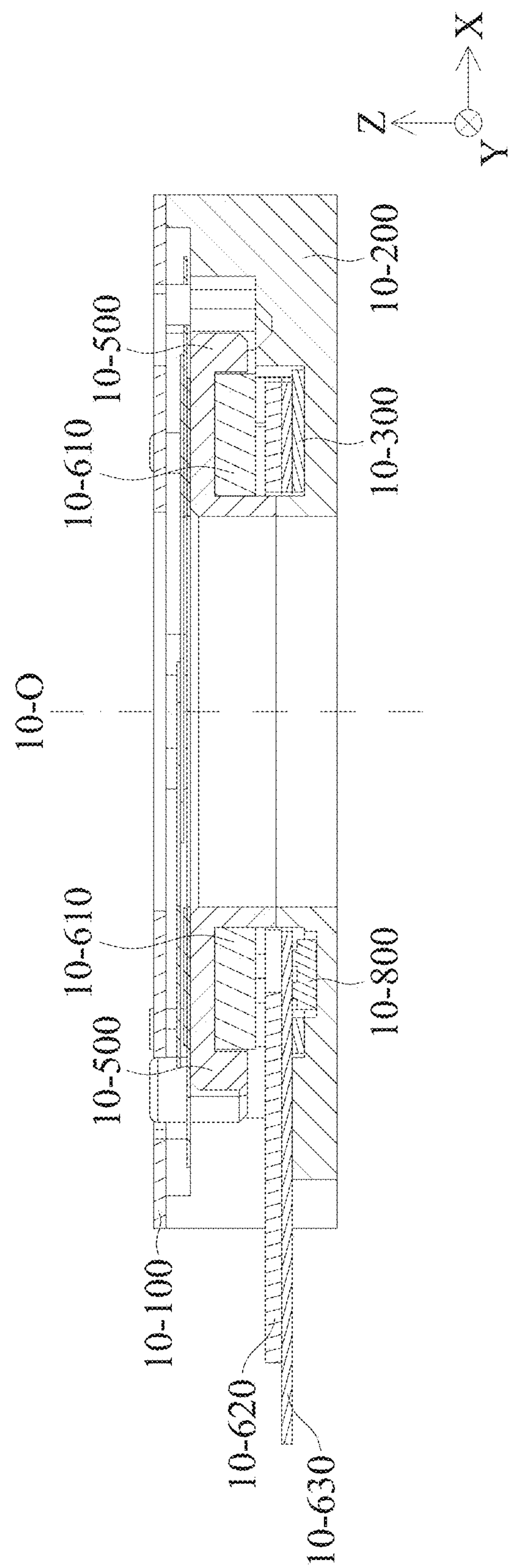
Figures 4A, 10:
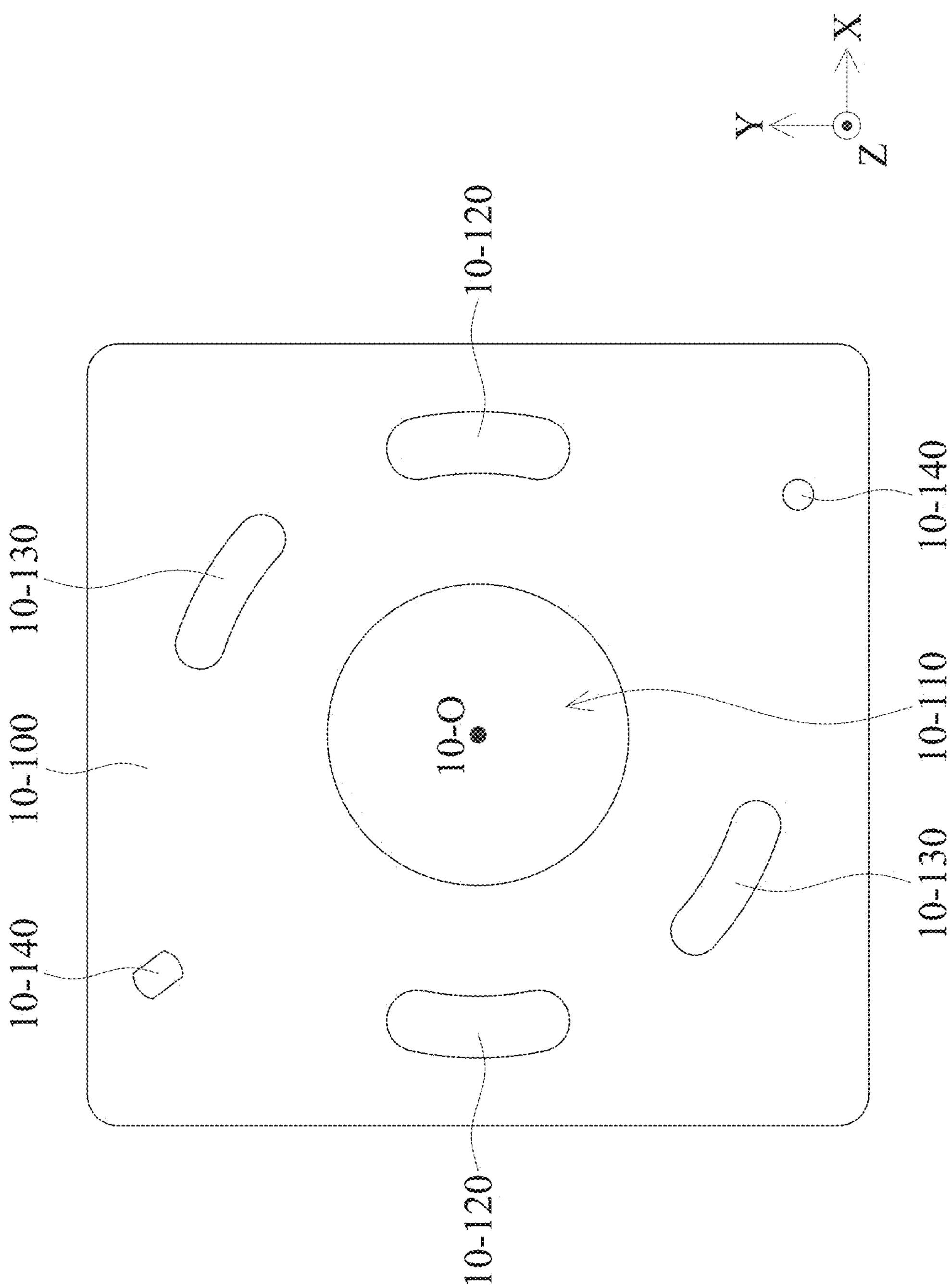
Figures 4B, 10:
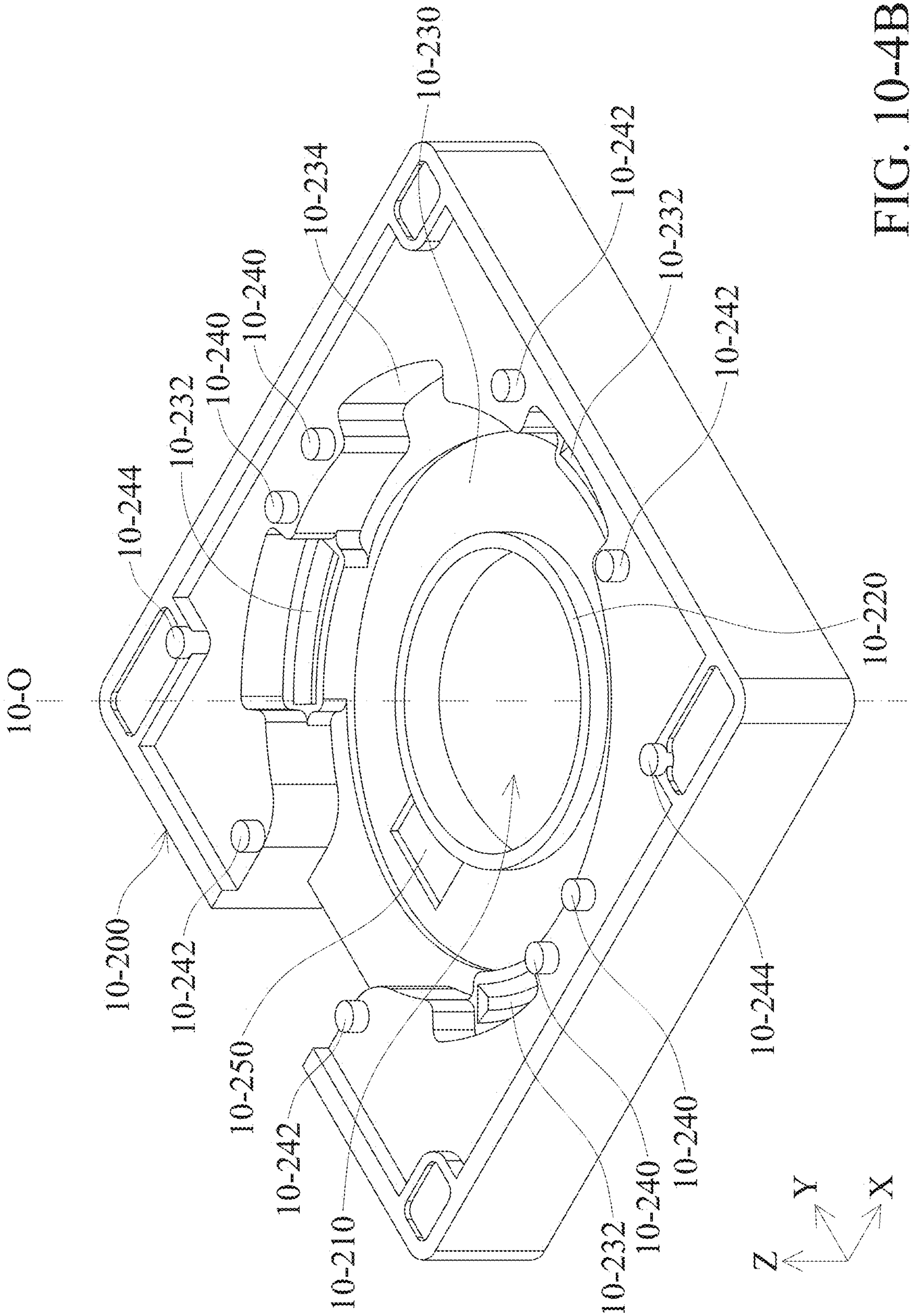
Figures 4C, 10:
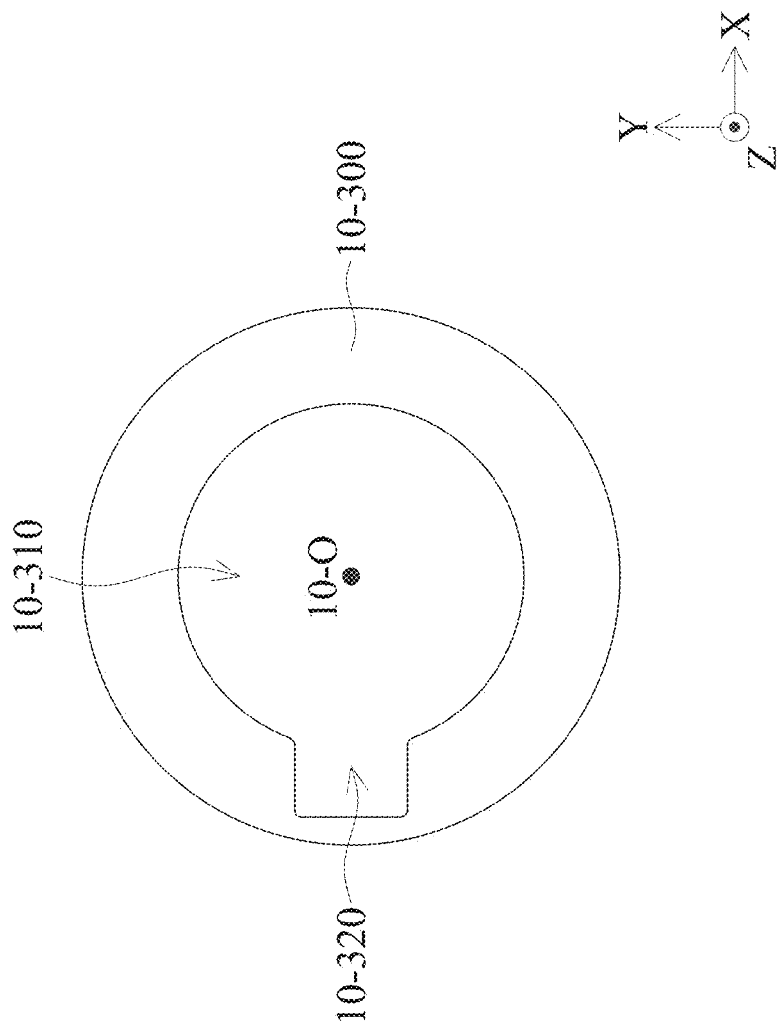
Figures 4D, 10:
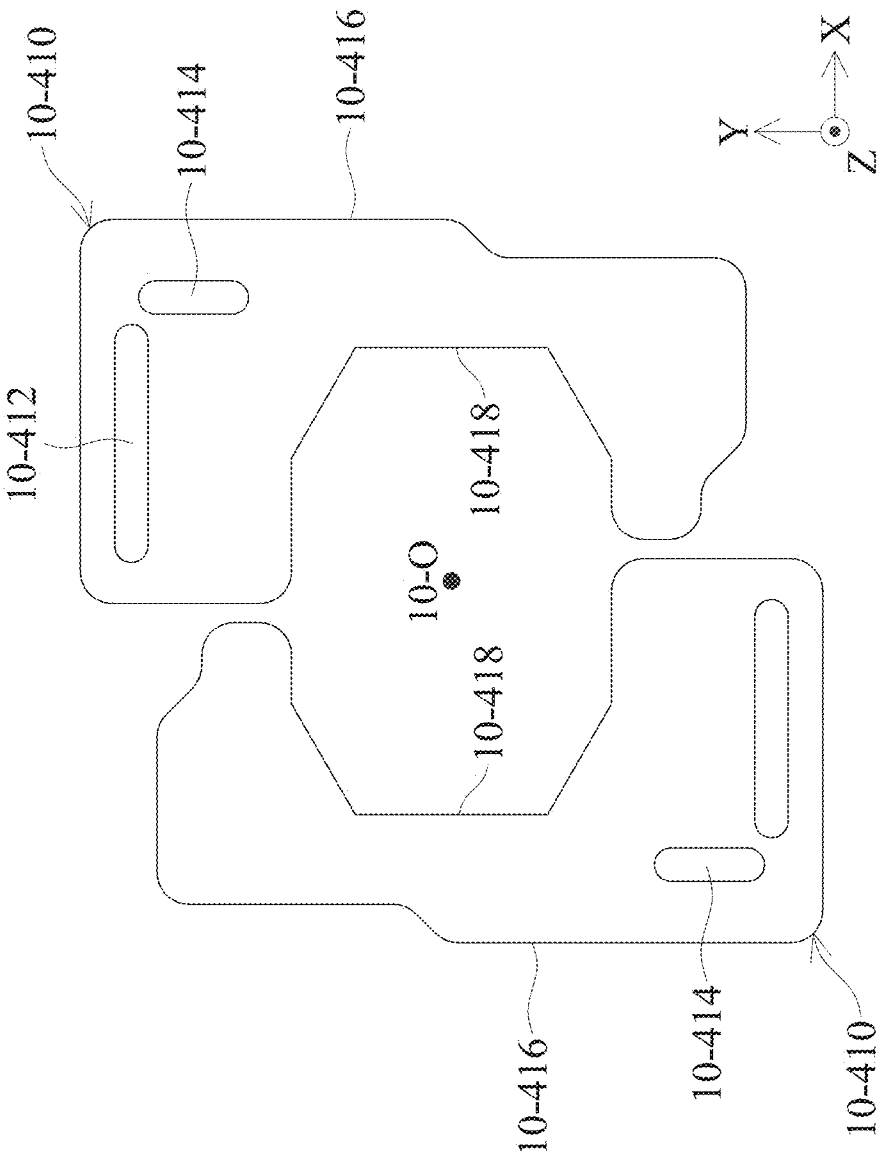
Figures 4E, 10:
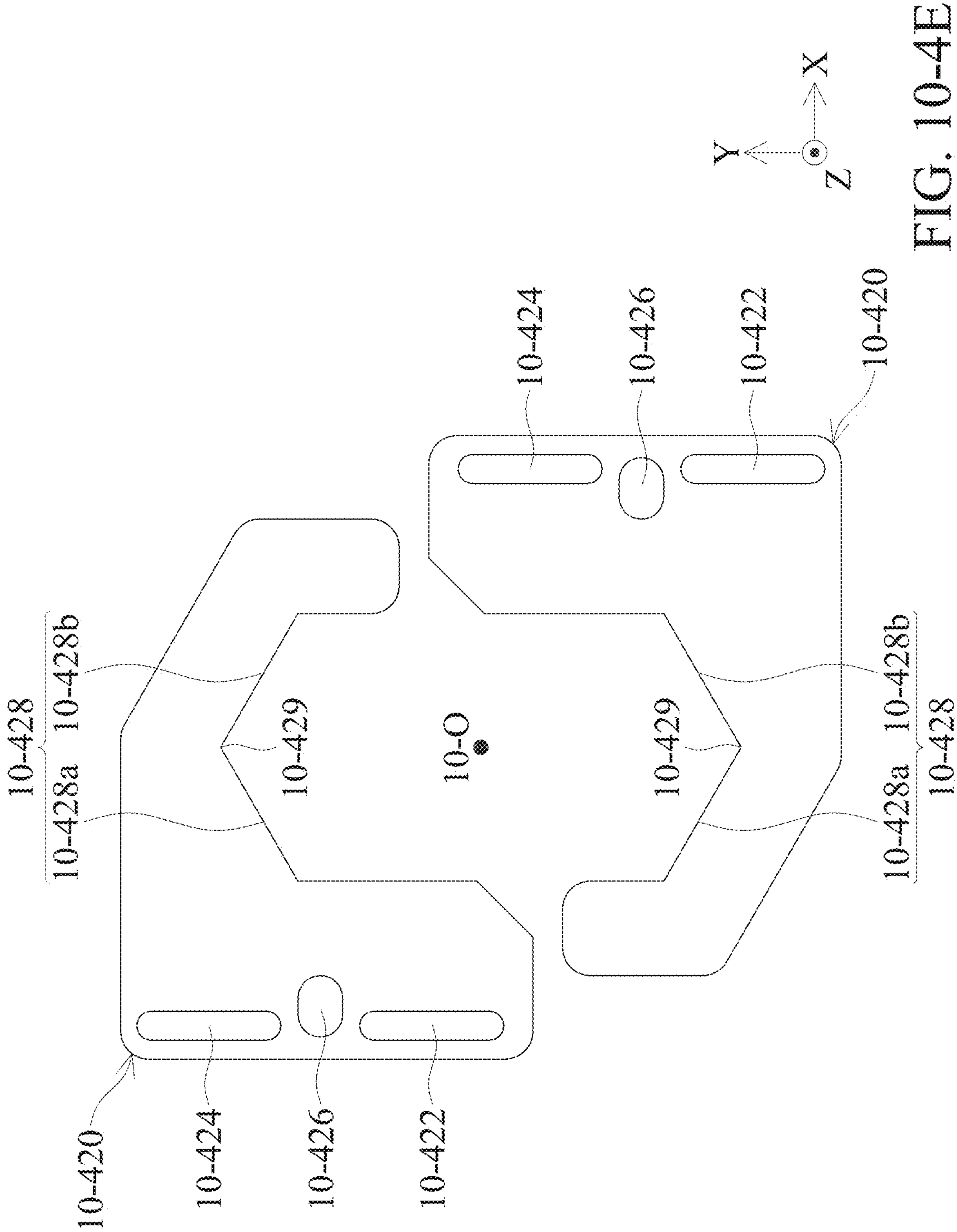
Figures 4F, 10:
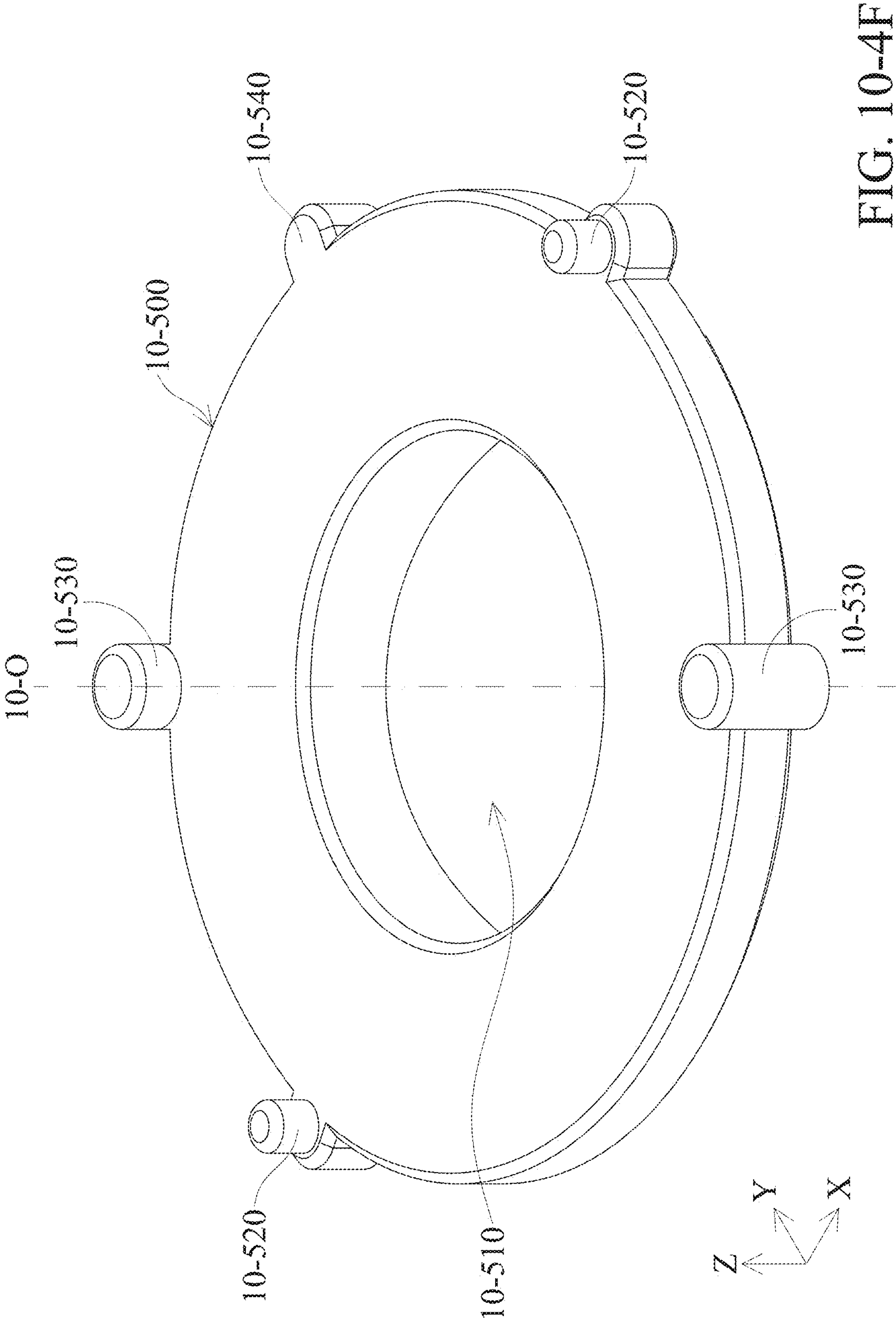
Figures 4G, 10:
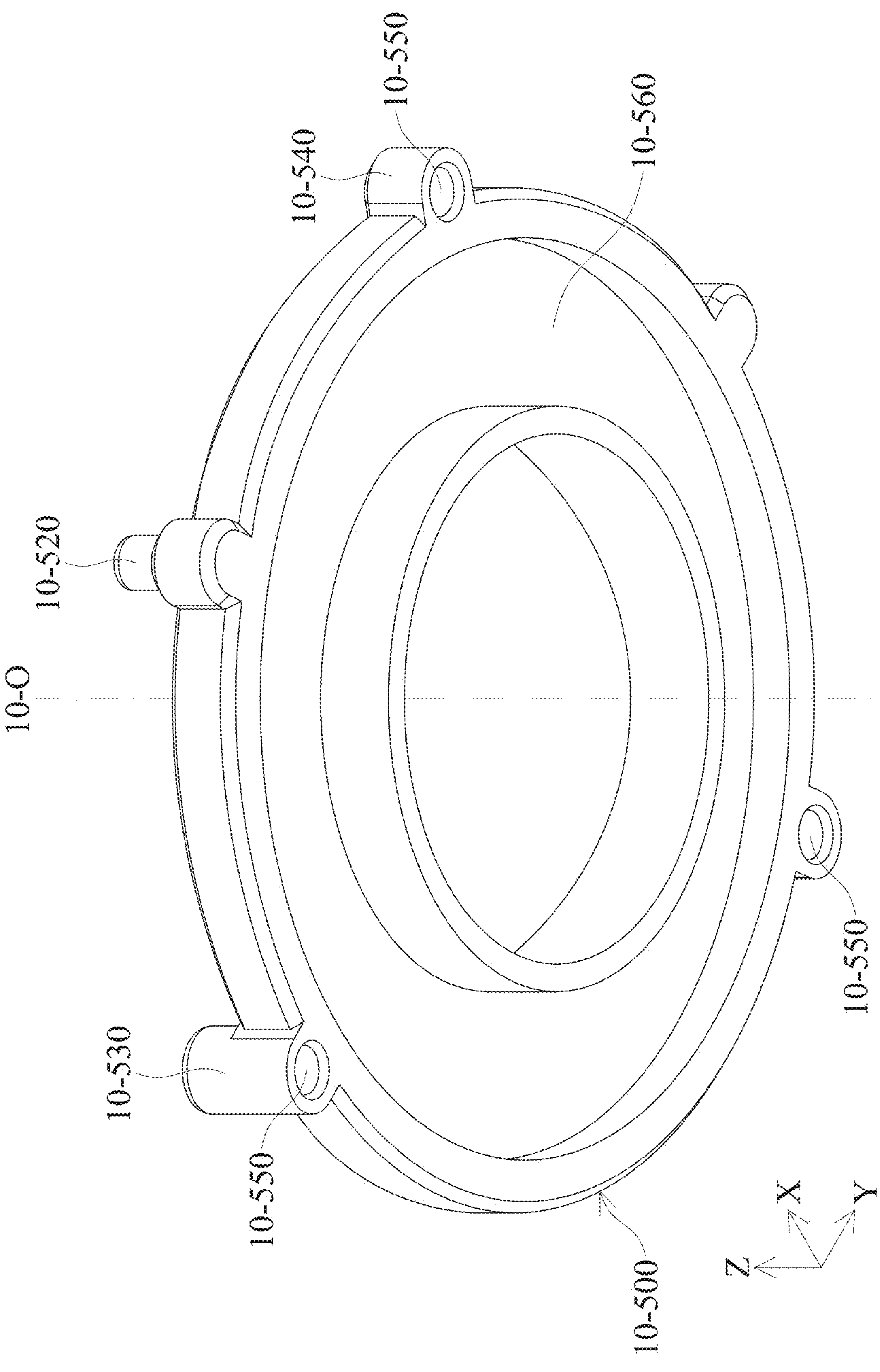
Figures 4H, 10:
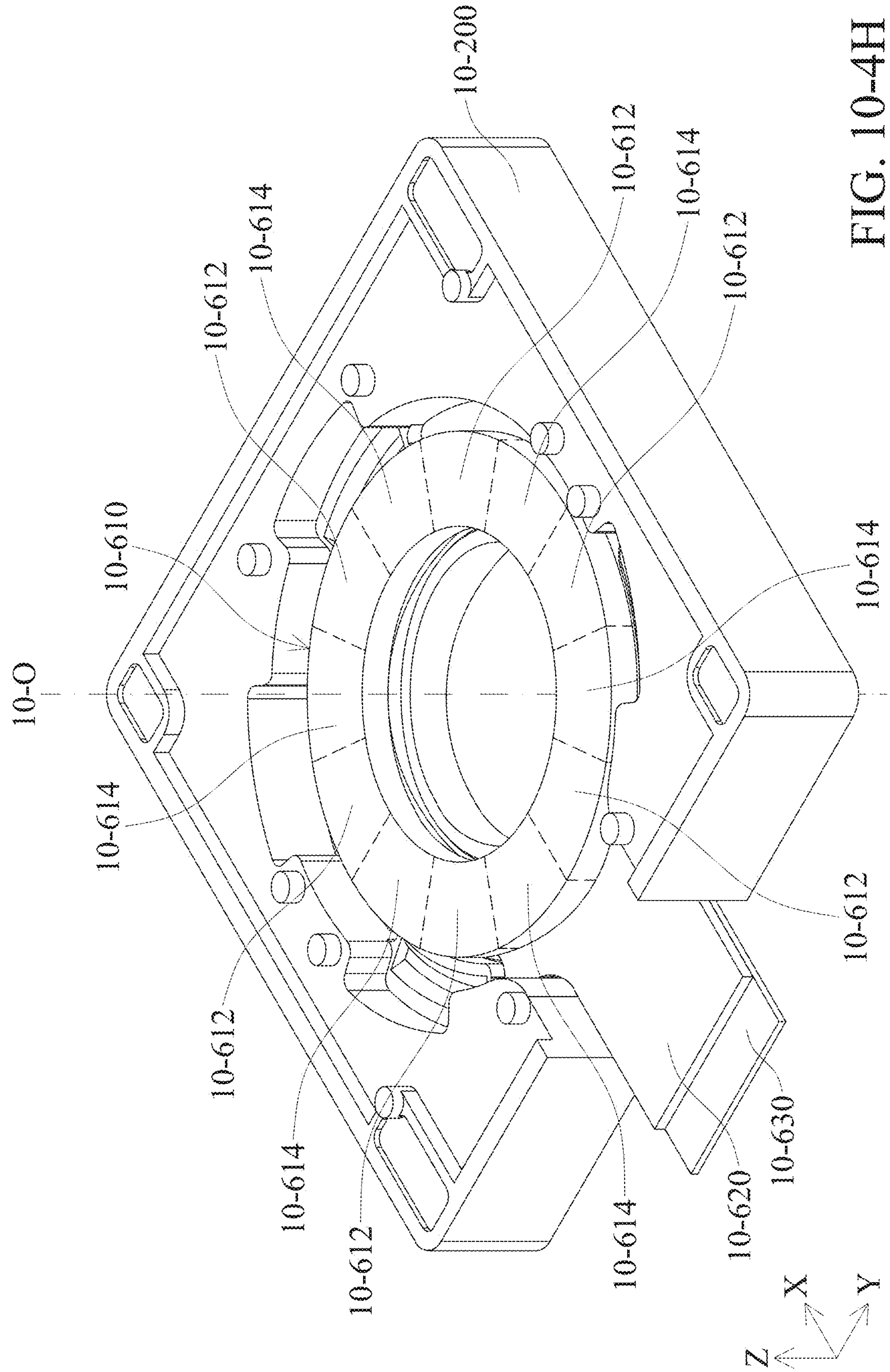
Figures 5A, 10:
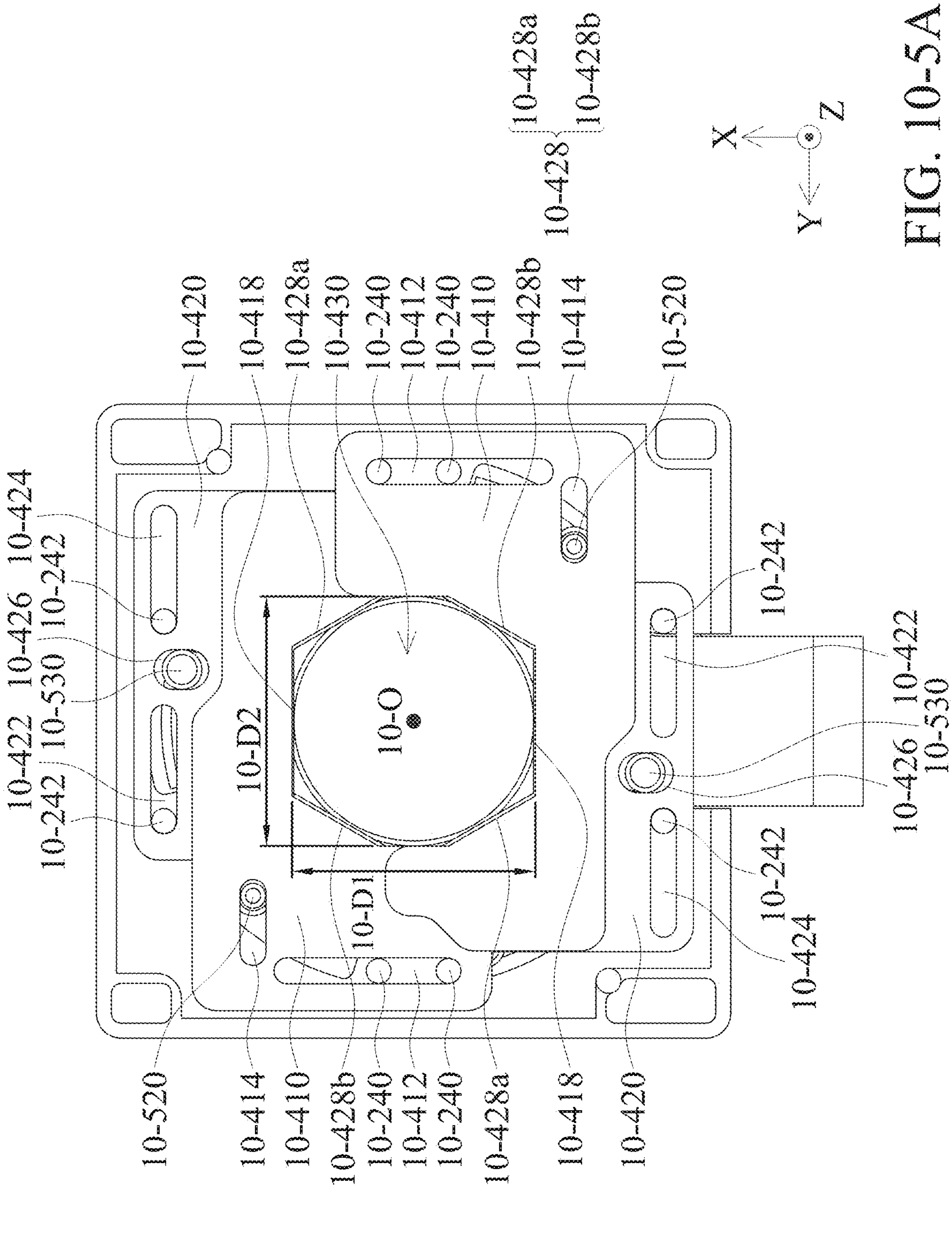
Figures 5B, 10:
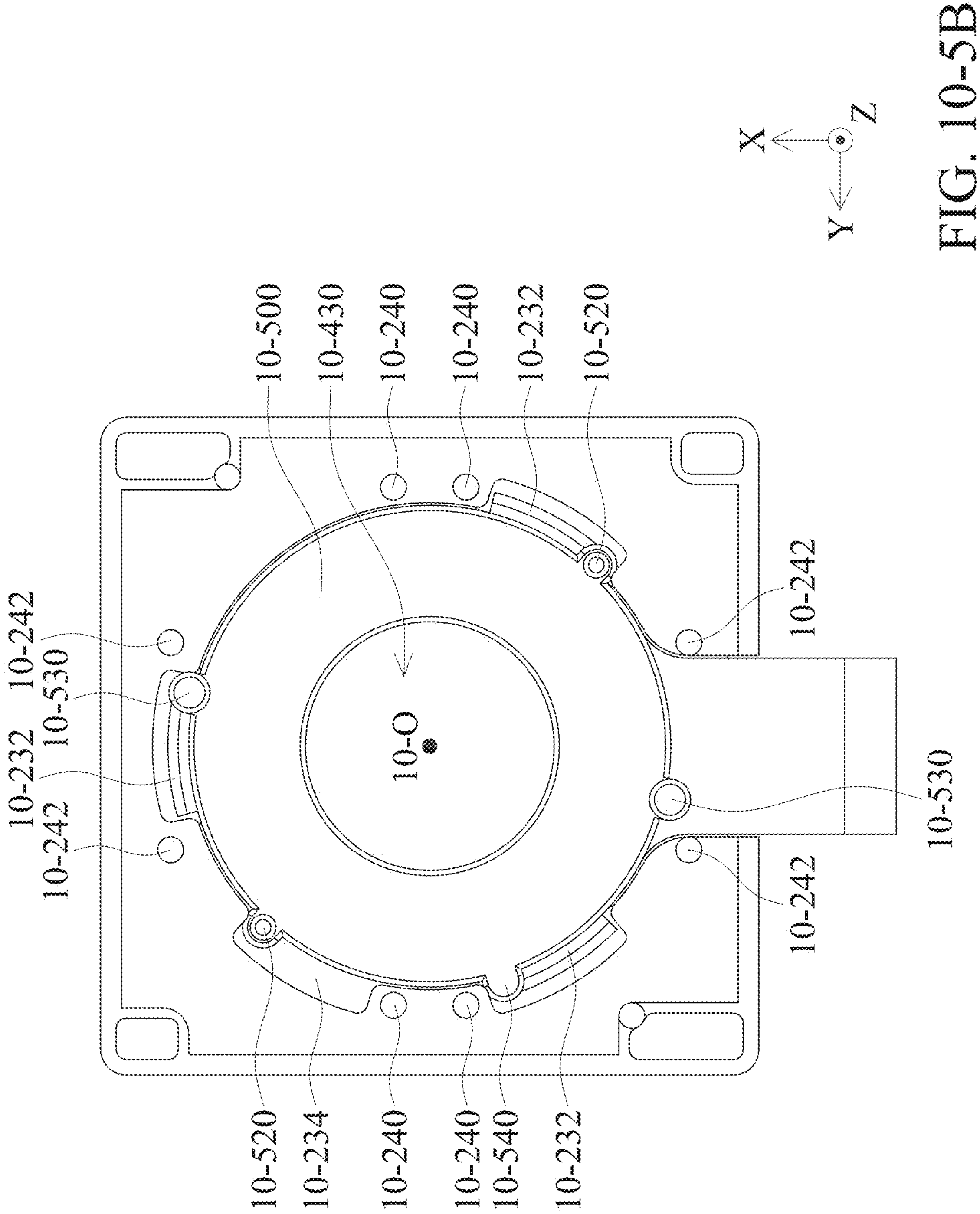
Figures 6A, 10:
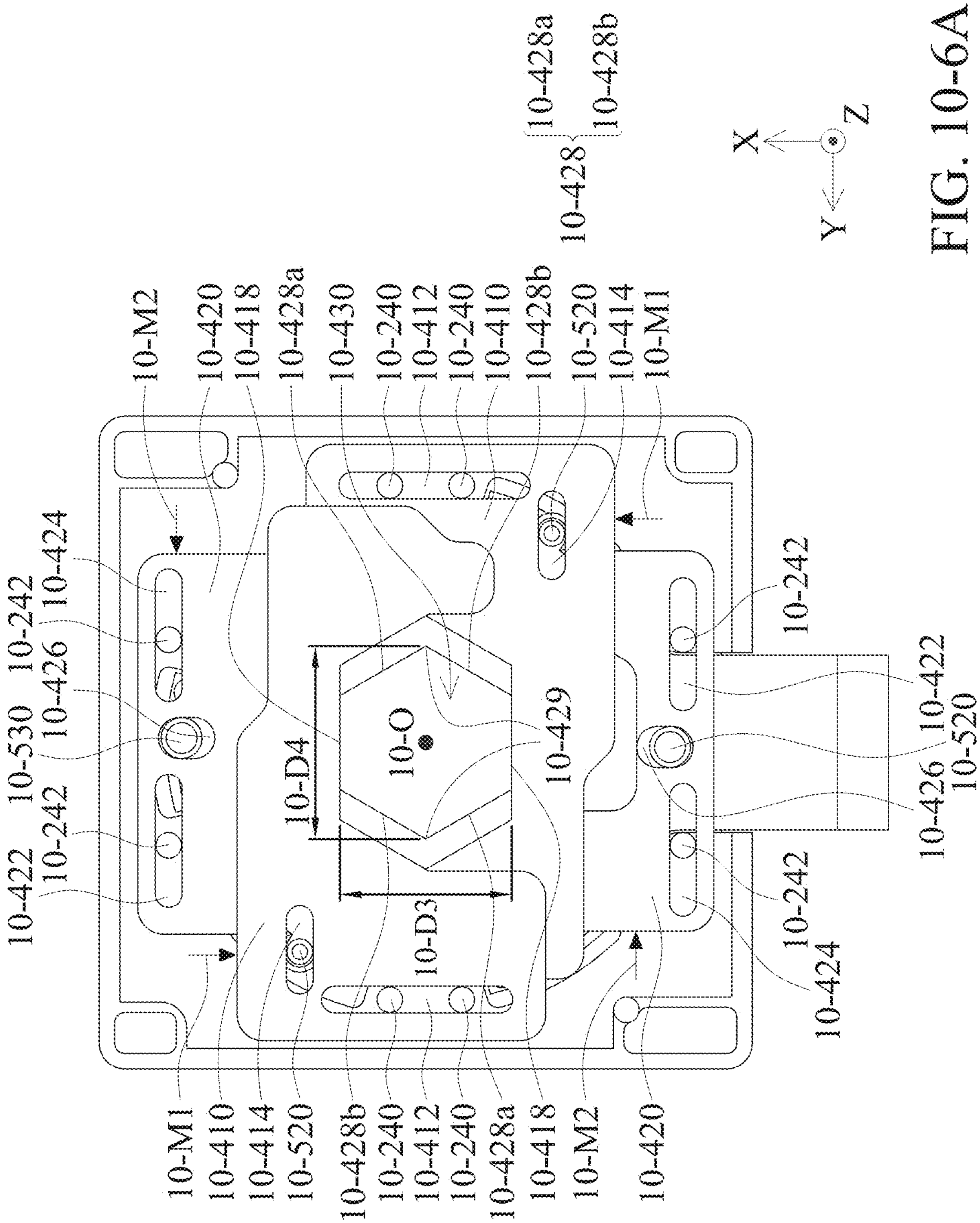
Figures 6B, 10:
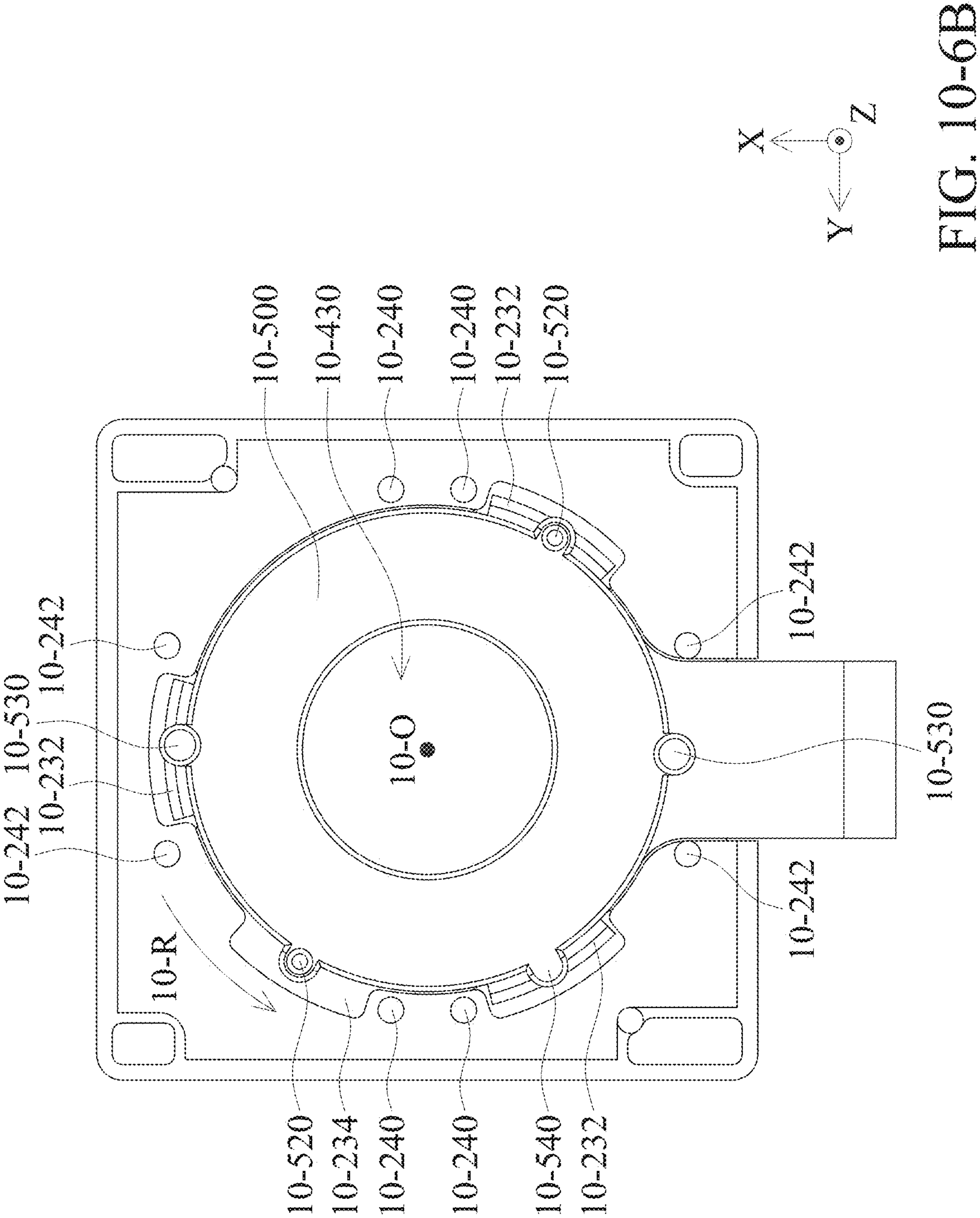
Figures 7A, 10:
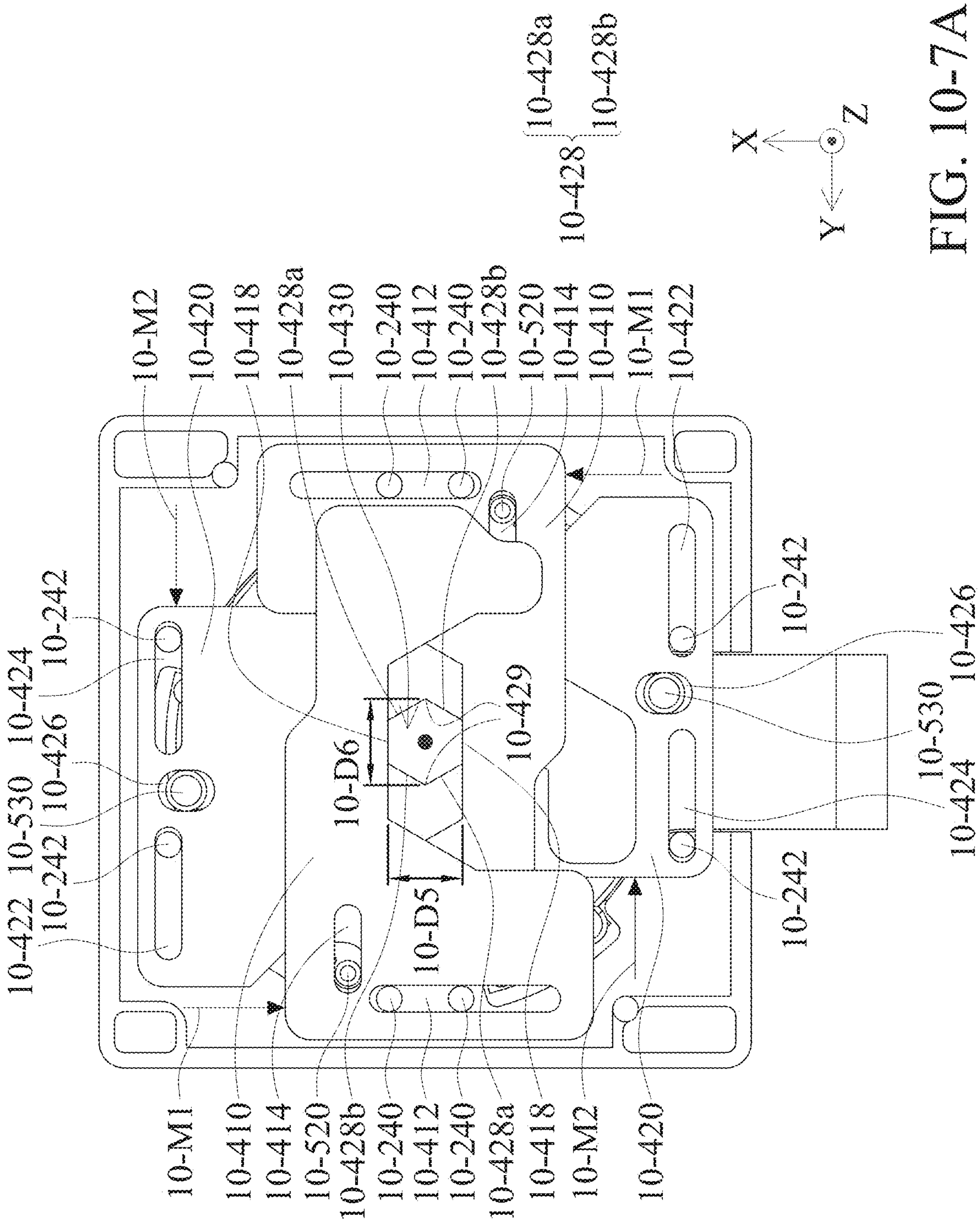
Figures 7B, 10:
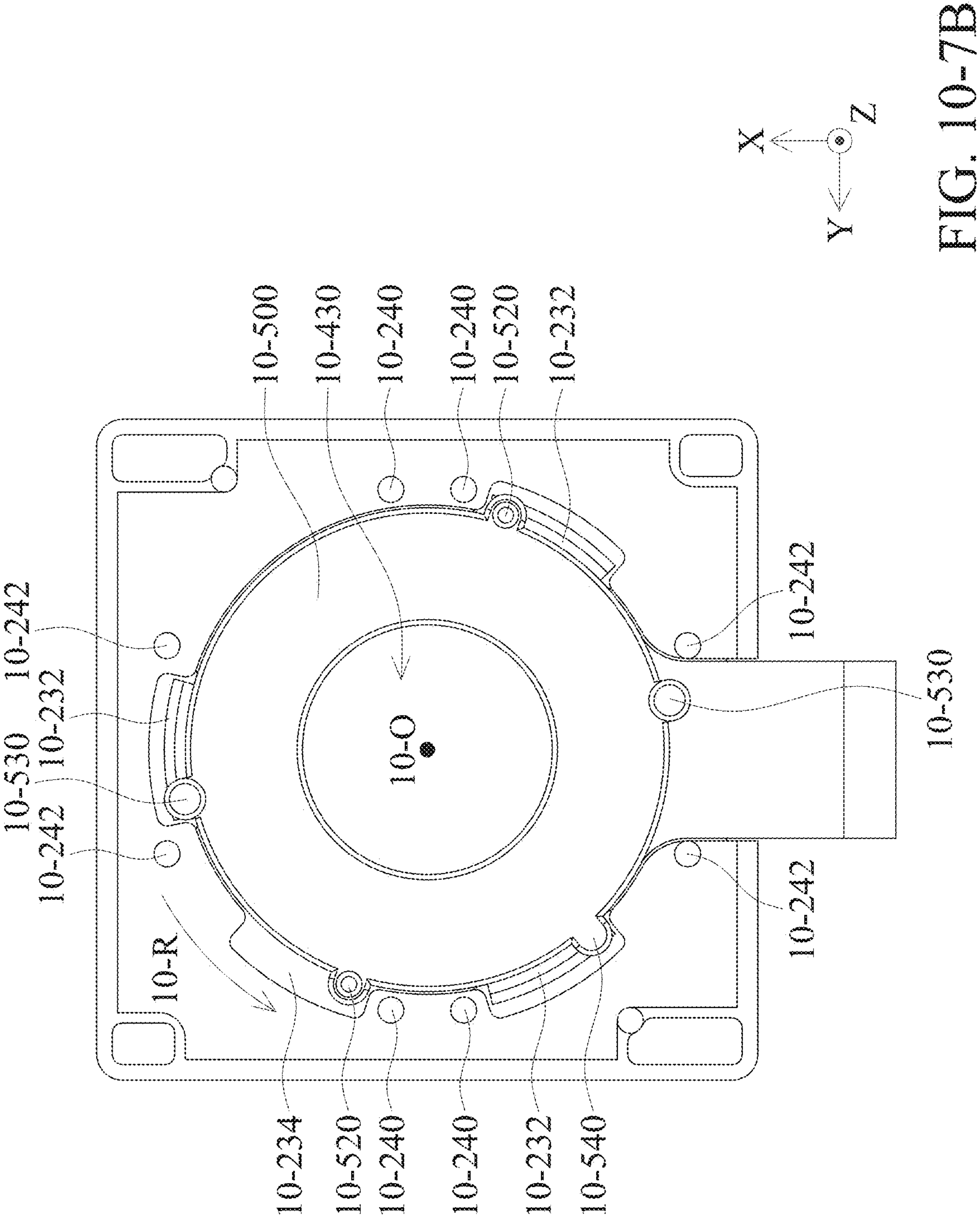
Figures 1A, 11:
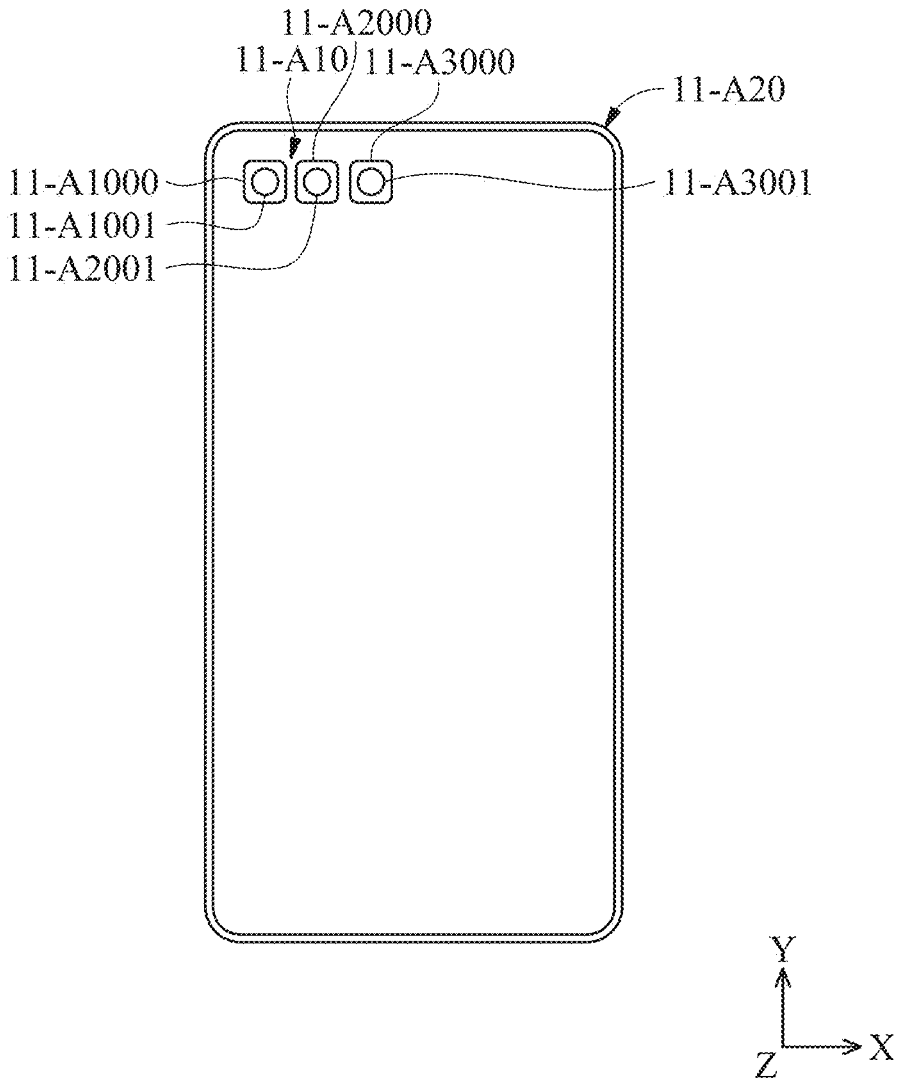
Figures 1B, 11:
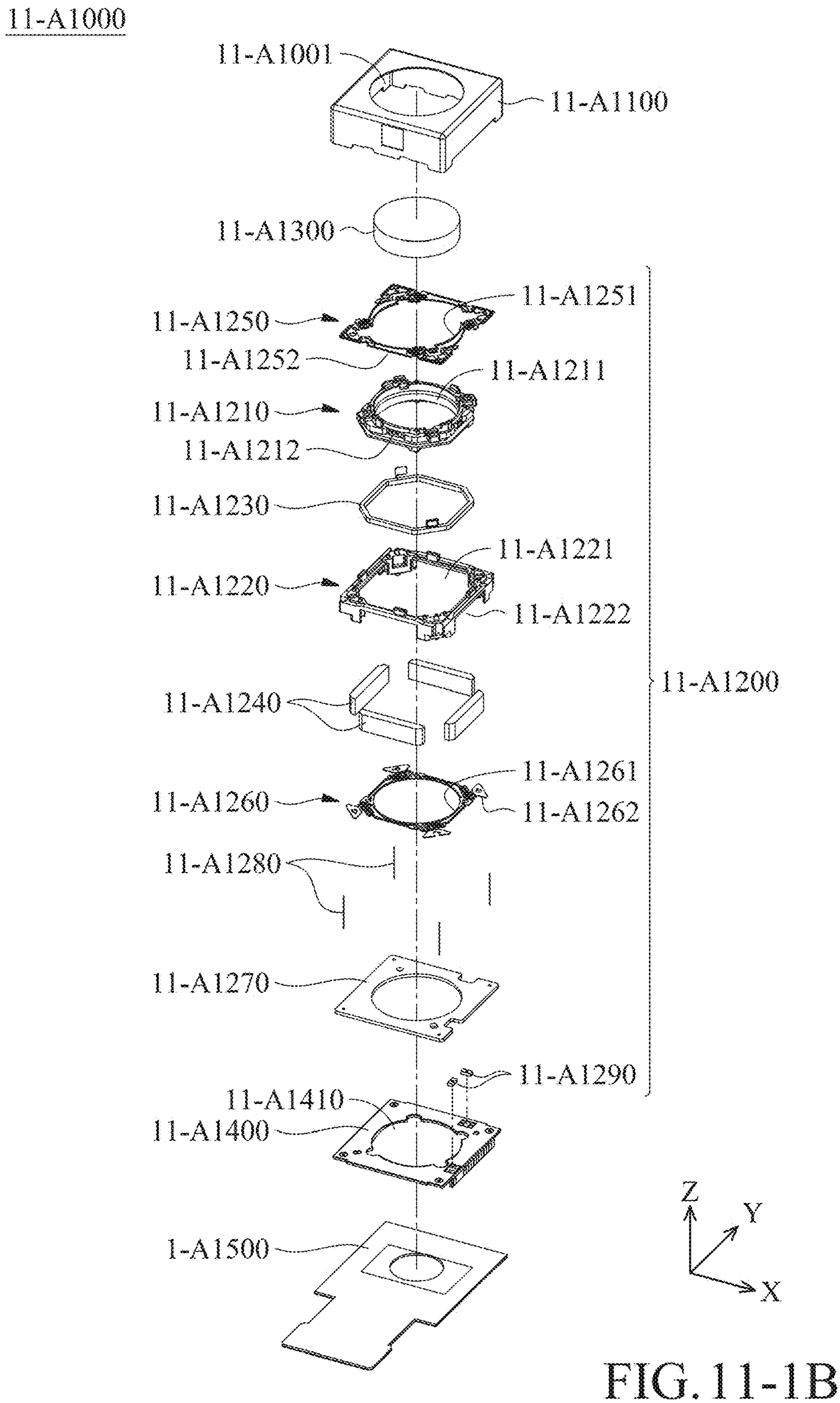
Figures 2A, 11:
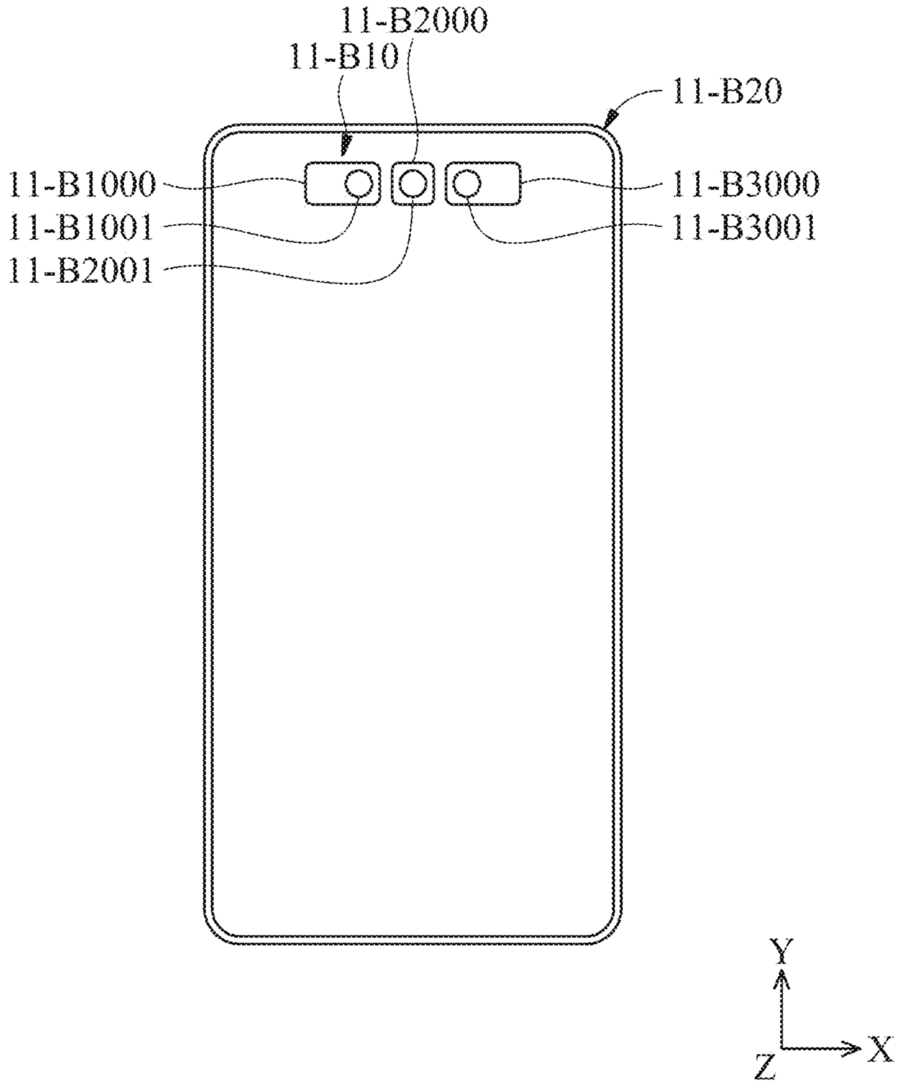
Figures 2B, 11:
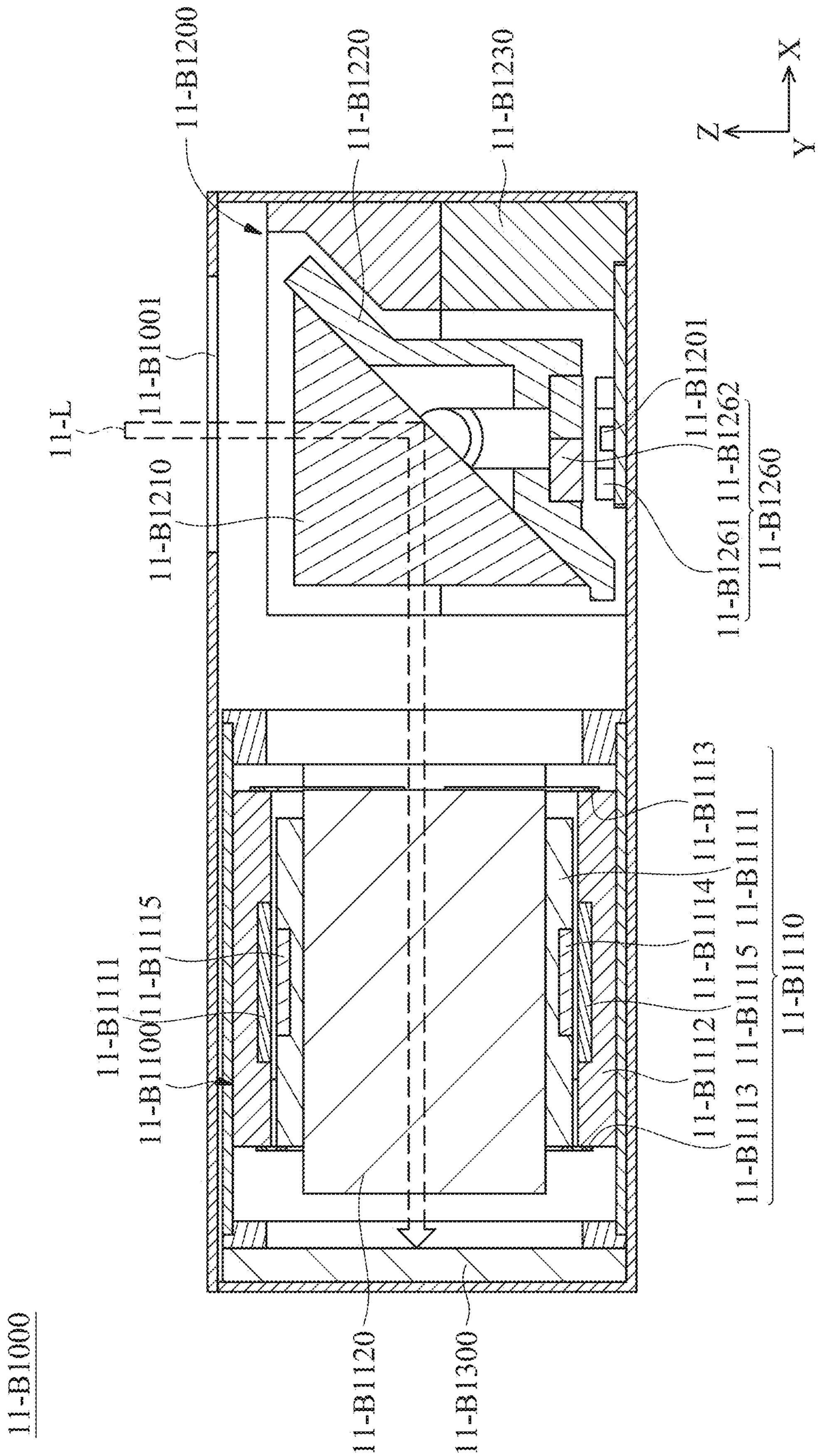
Figures 2C, 11:
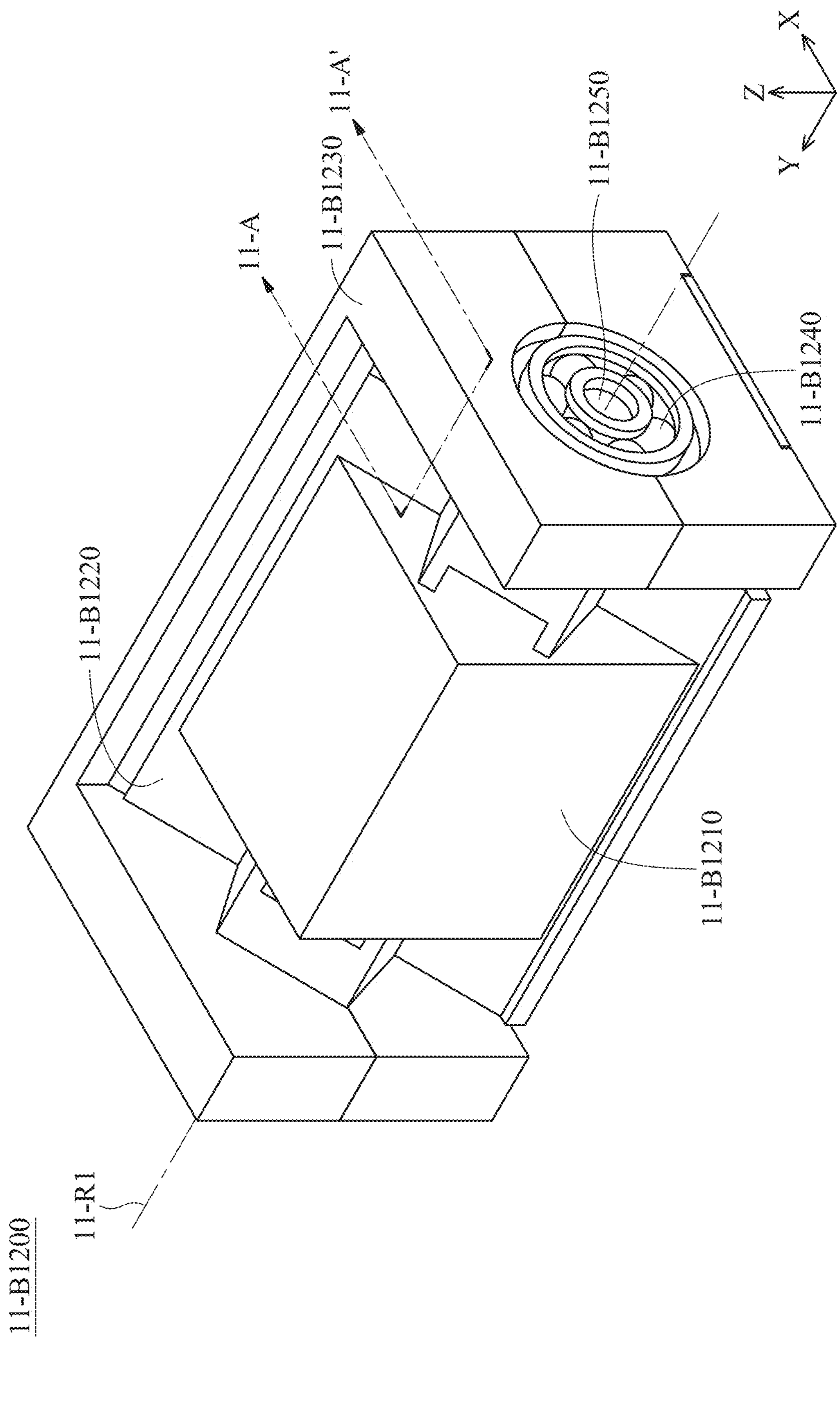
Figures 2D, 11:
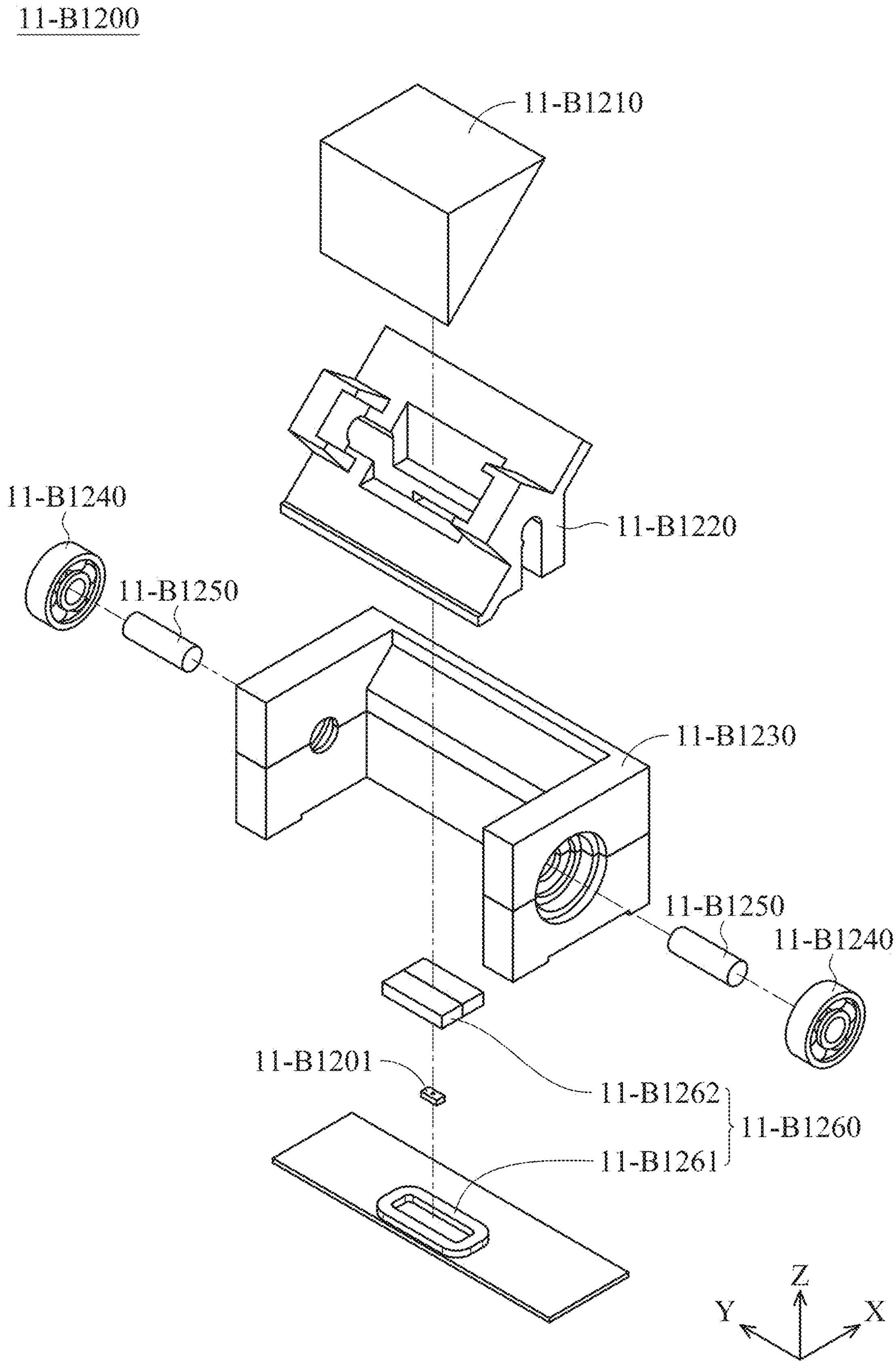
Figures 2E, 11:
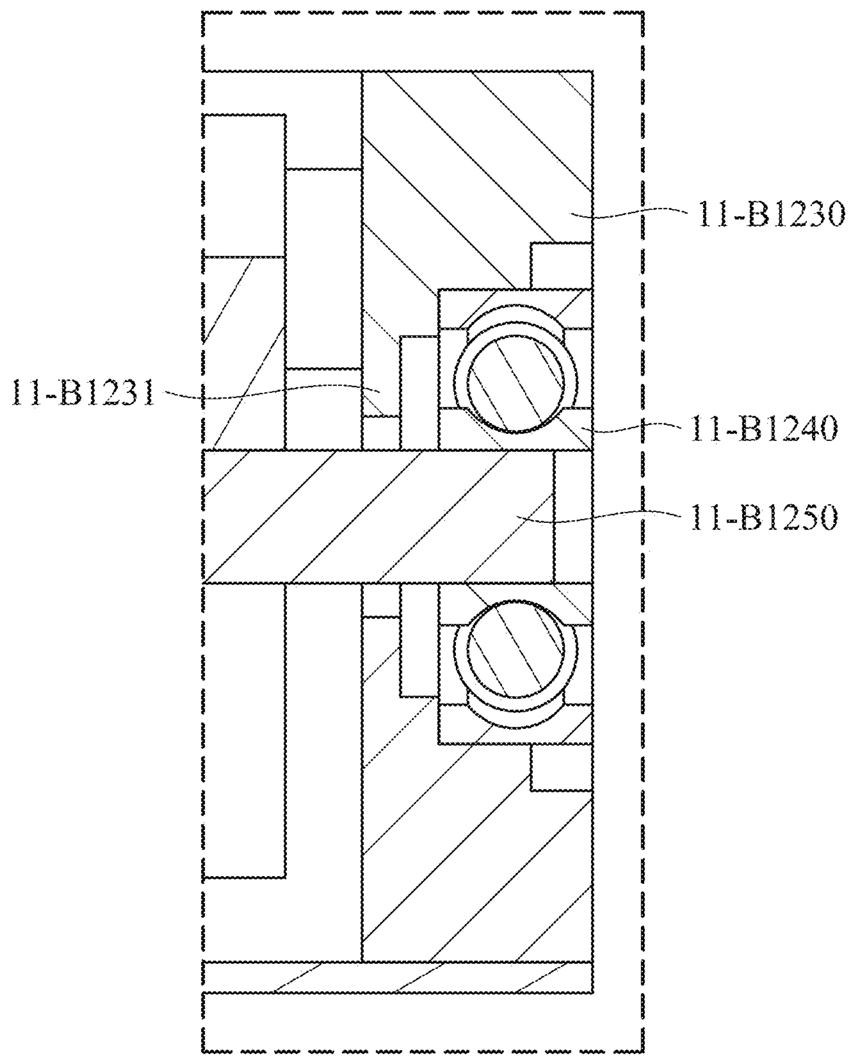
Figures 2F, 11:
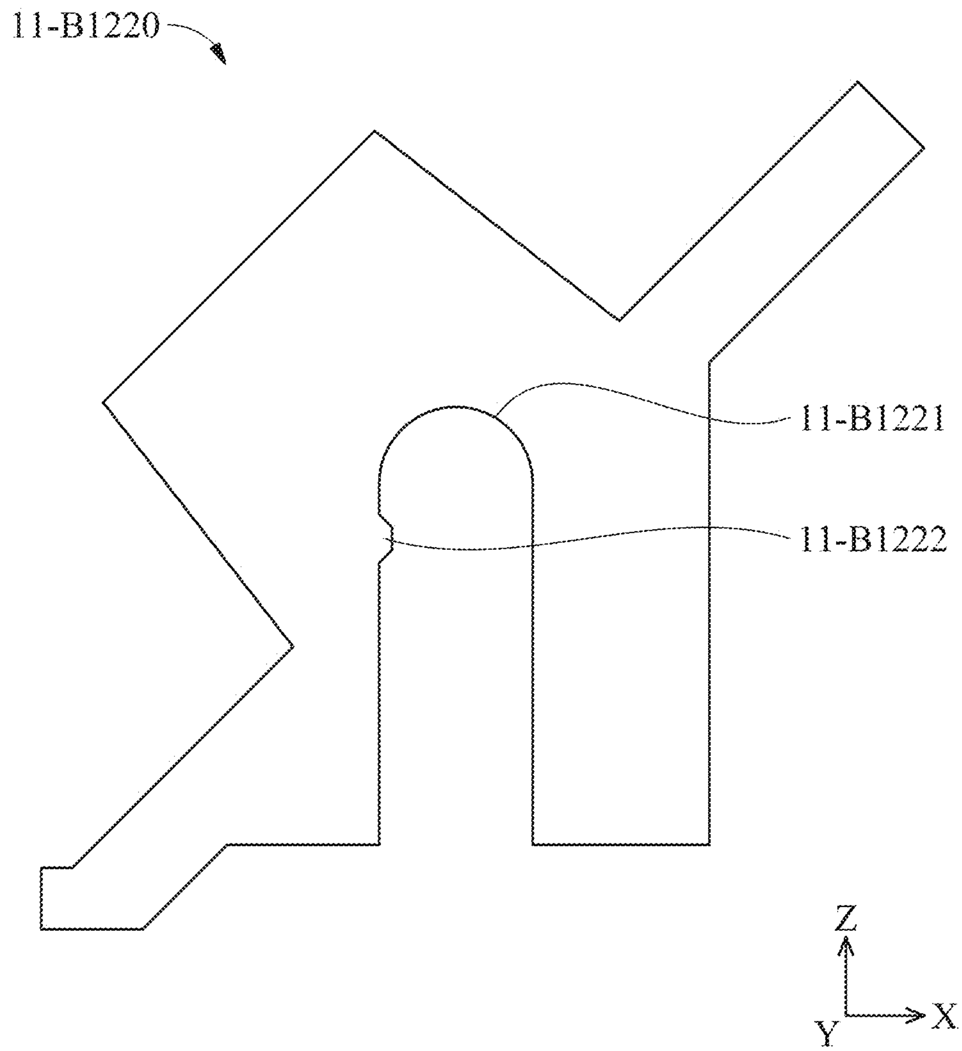
Figures 3A, 11:
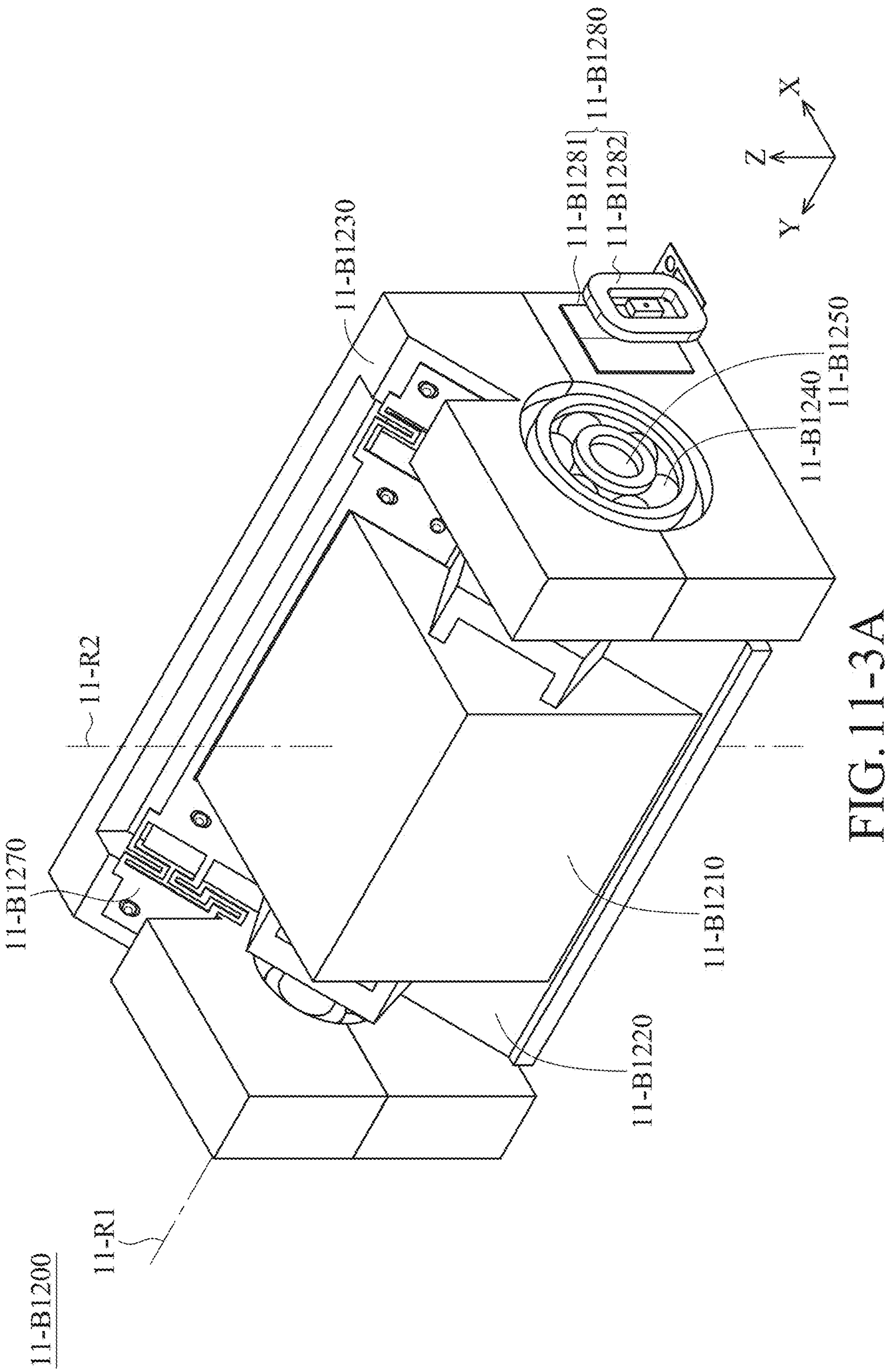
Figures 3B, 11:
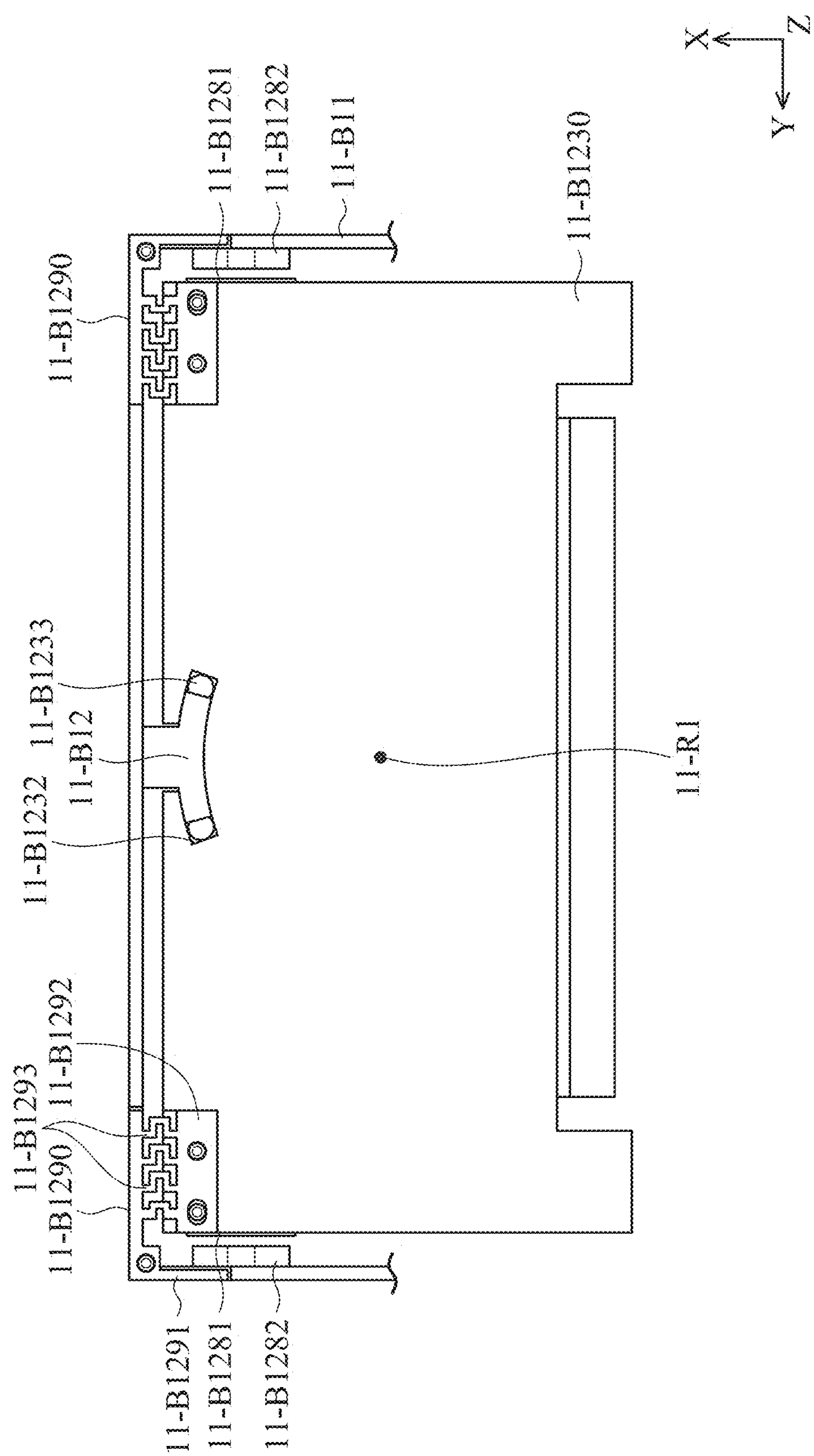
Figures 4A, 11:
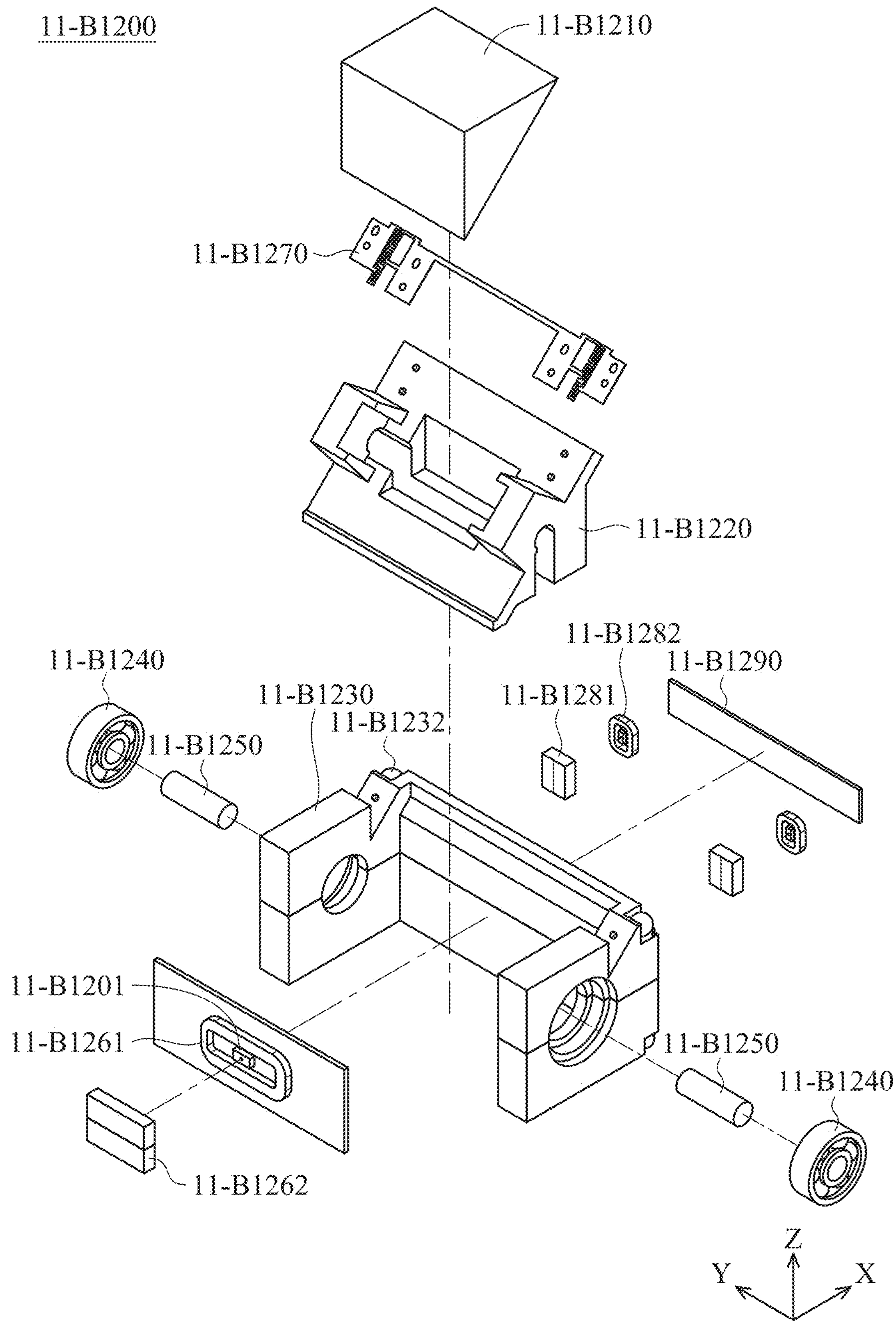
Figures 4B, 11:
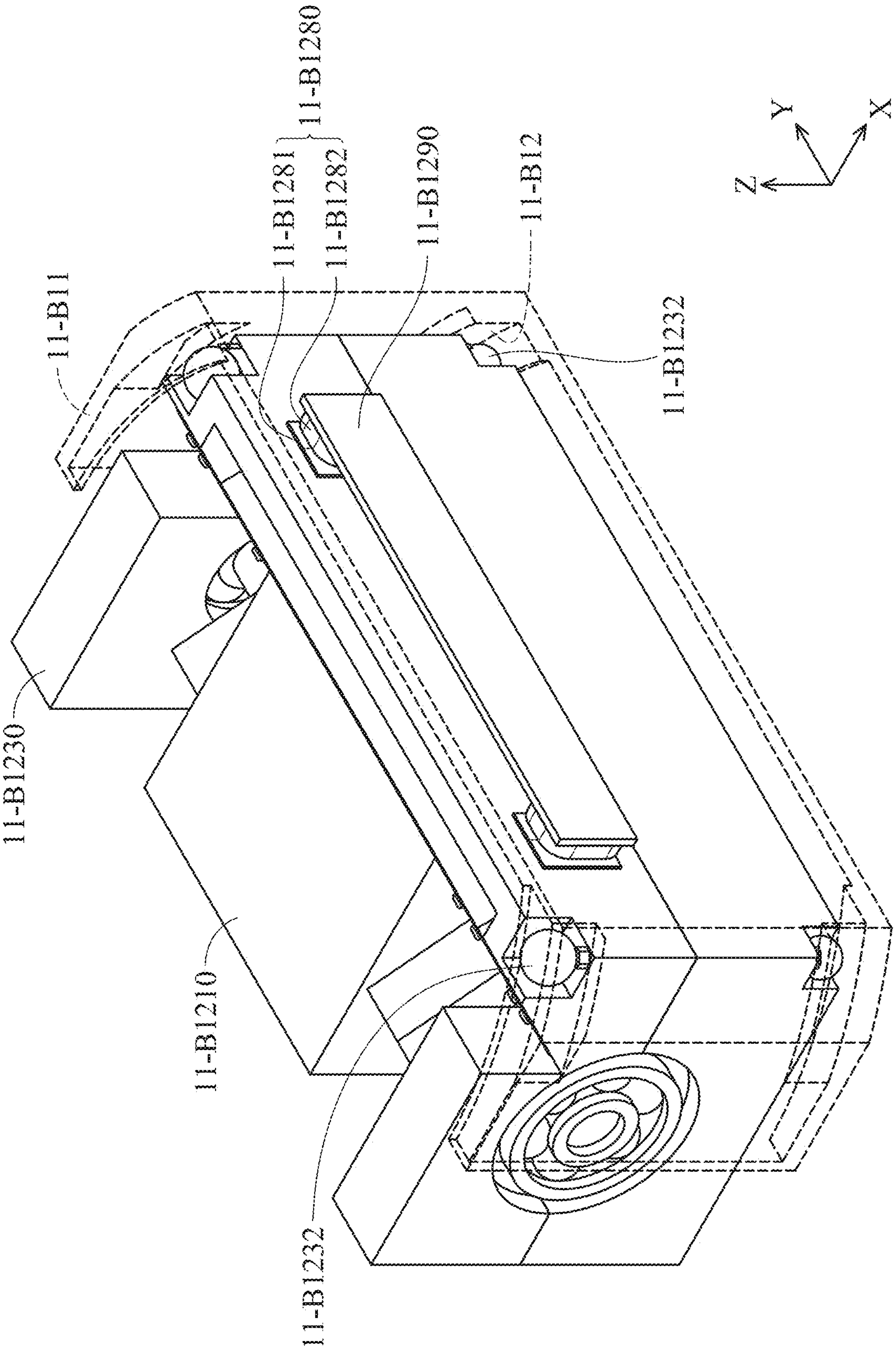
Figures 5A, 11:
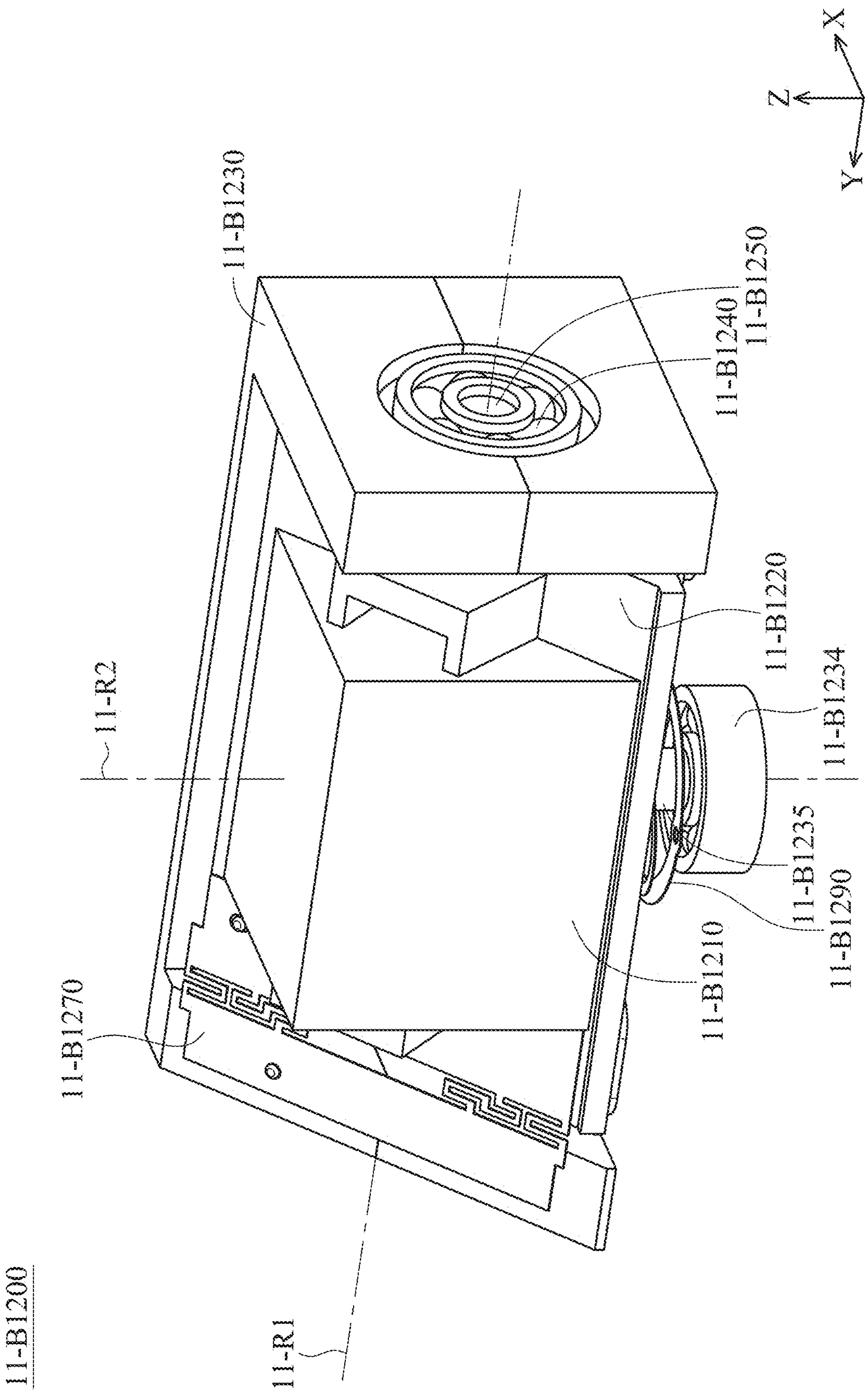
Figures 5B, 11:
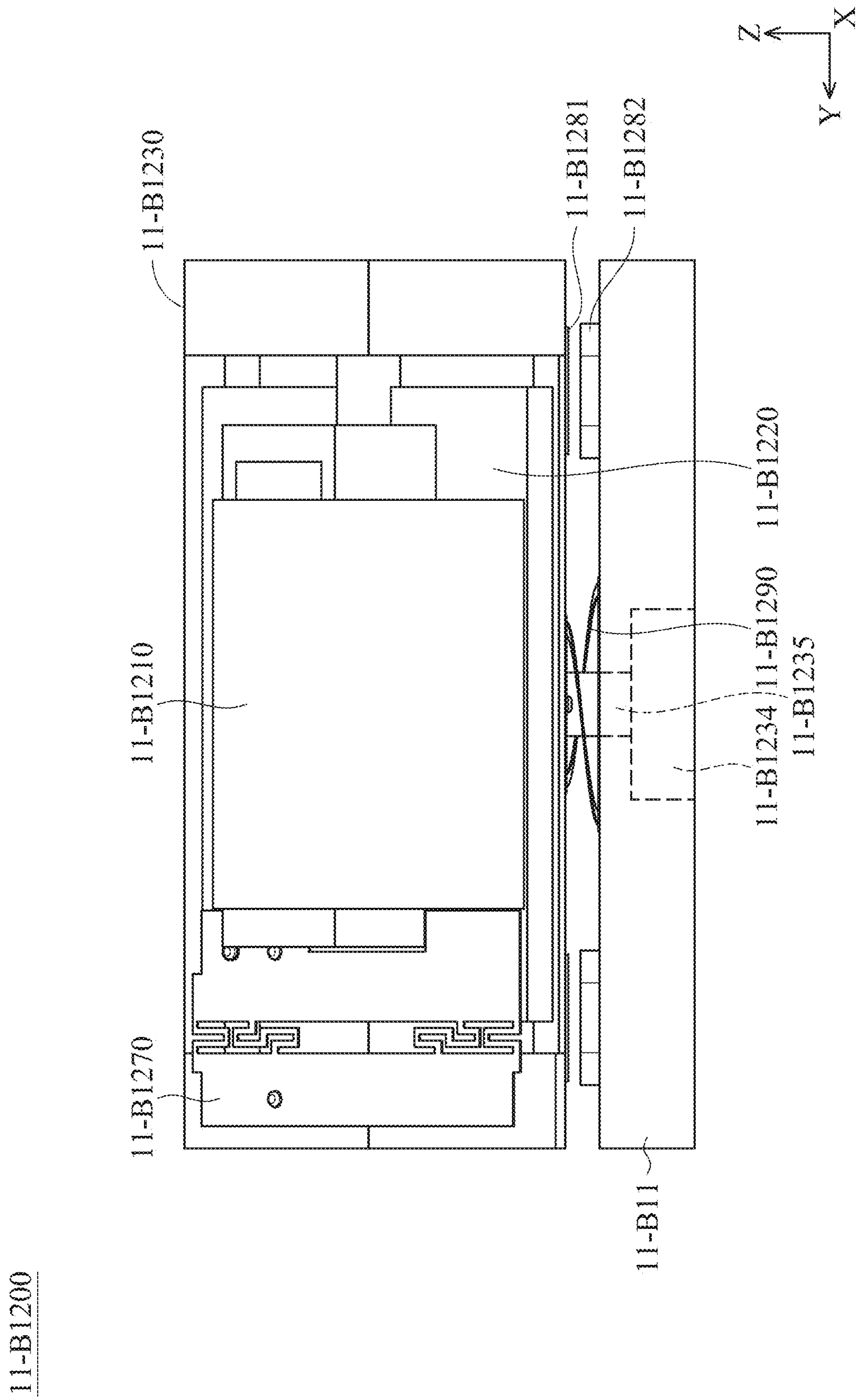
Figures 6A, 11:
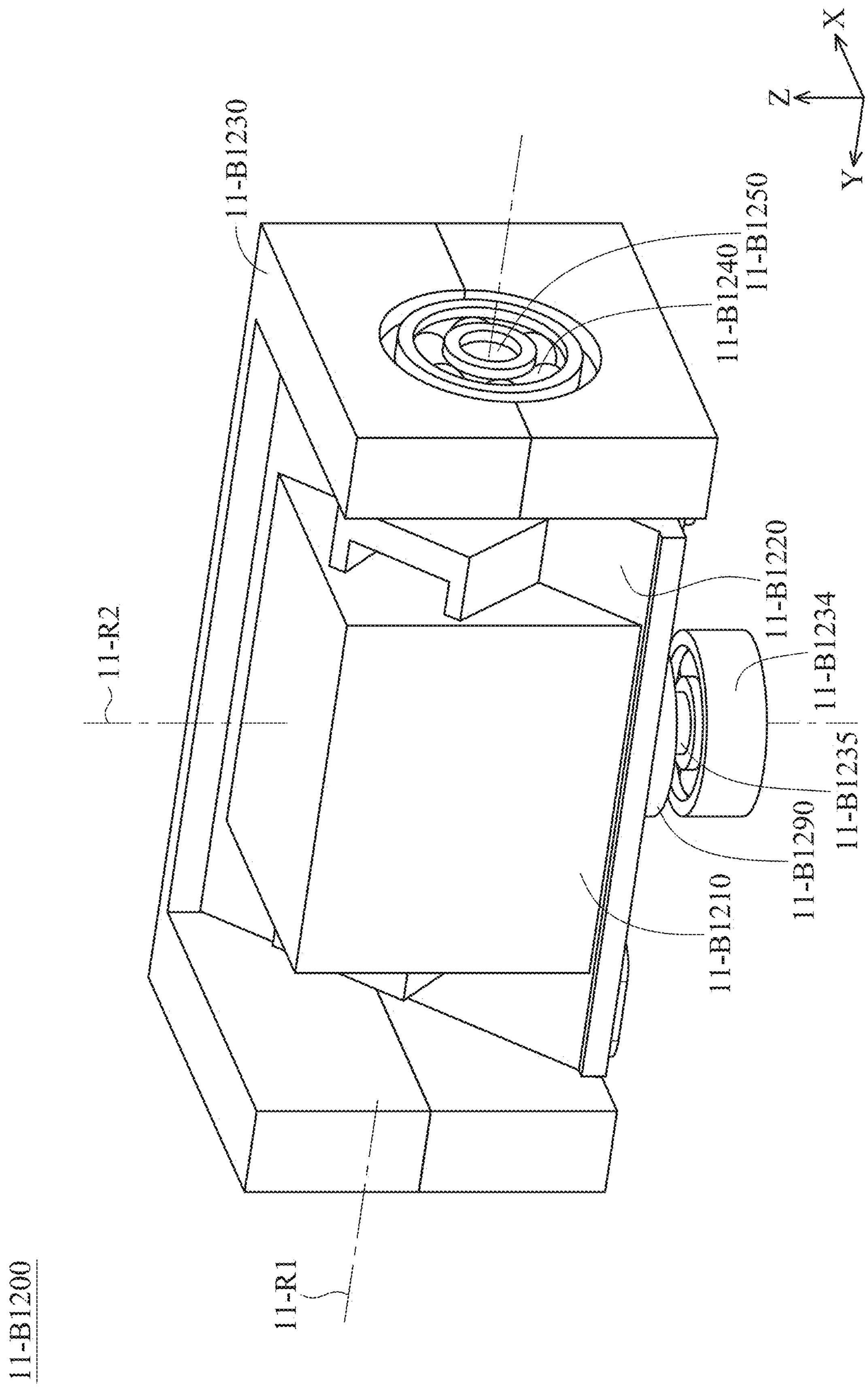
Figures 6B, 11:
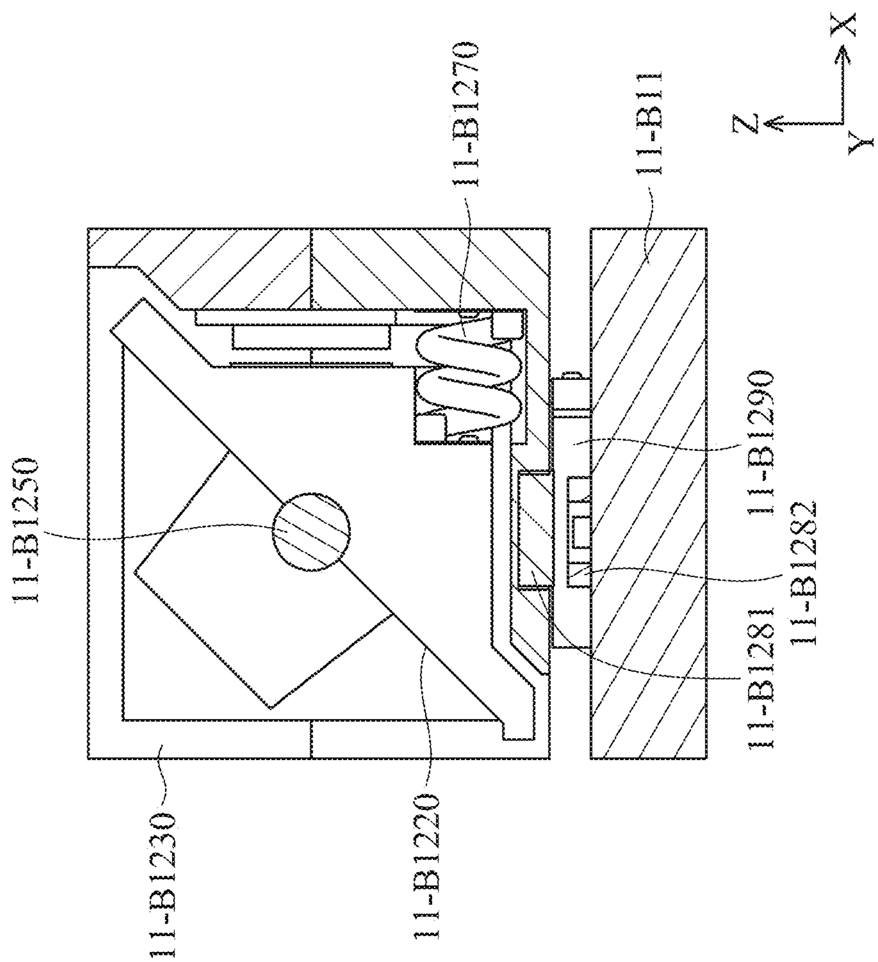
Figures 7A, 11:
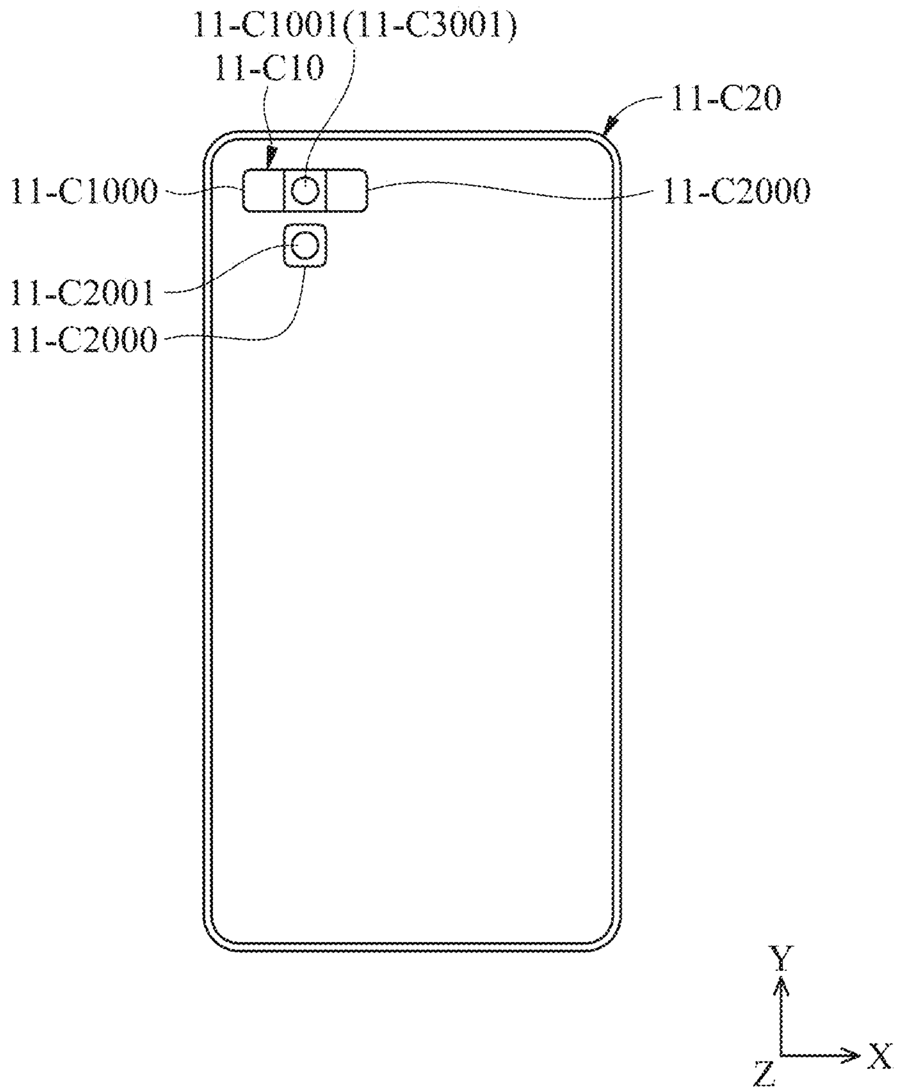
Figures 7B, 11:
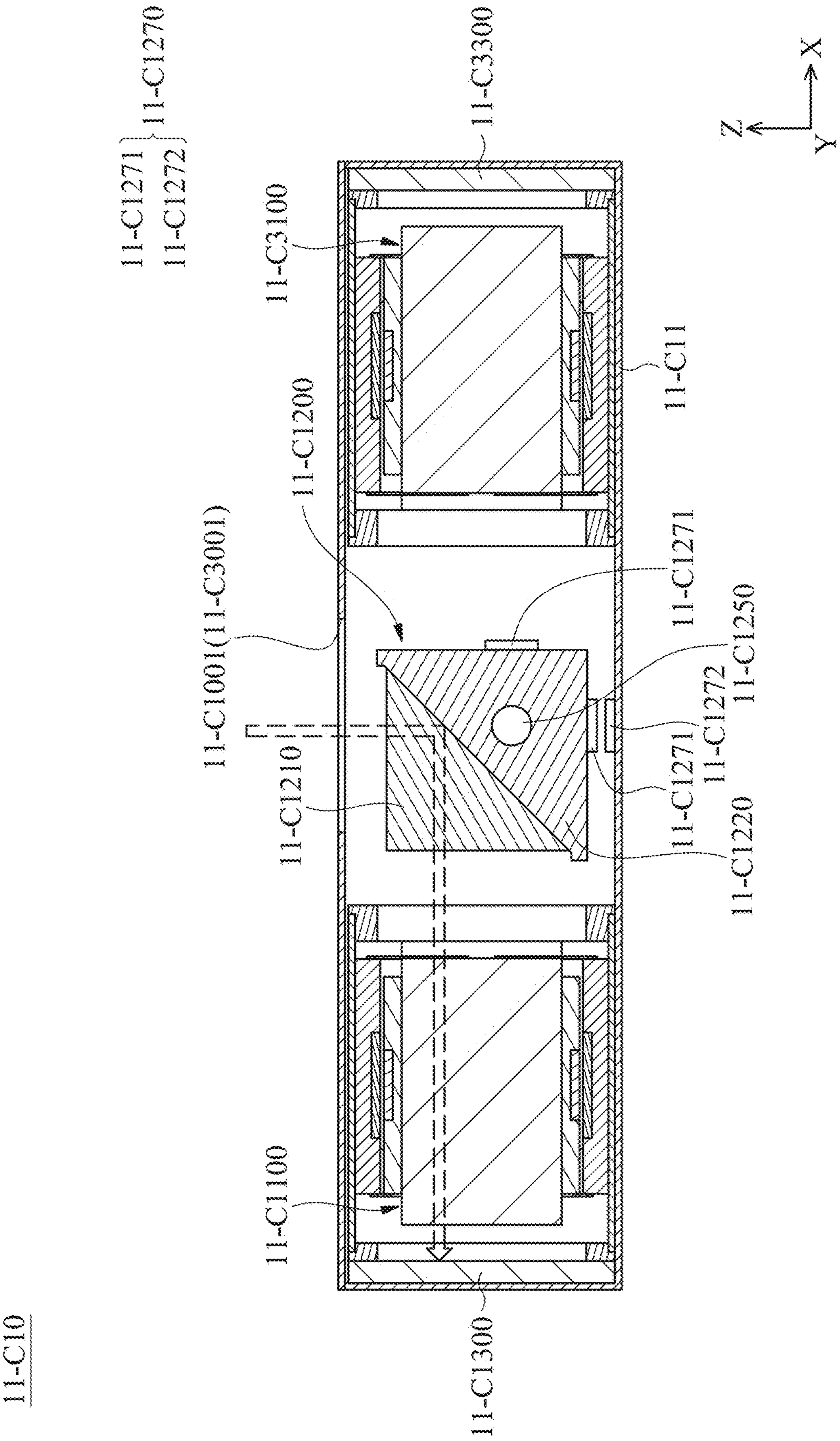
Figures 7C, 11:
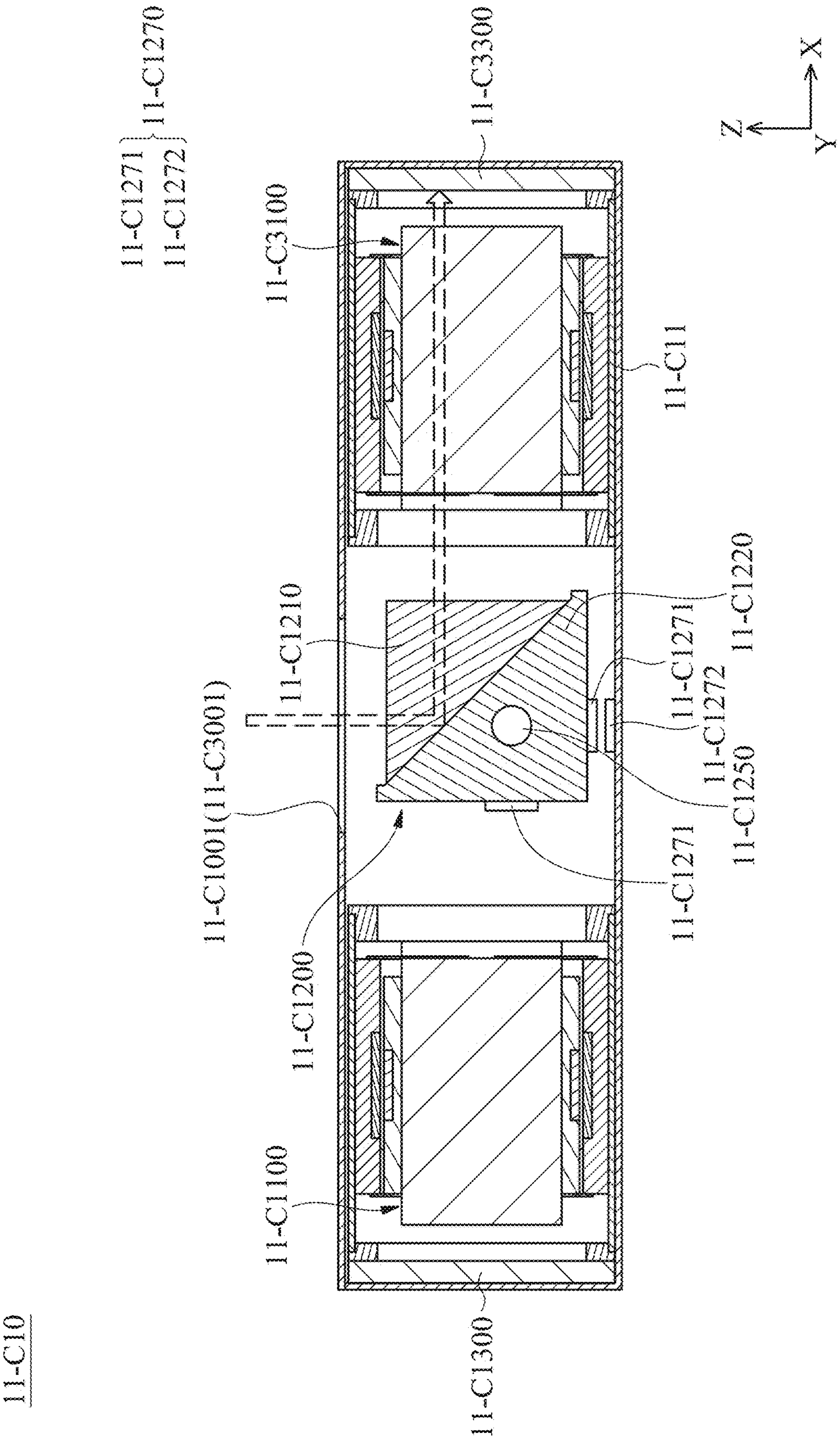
Figures 7D, 11:
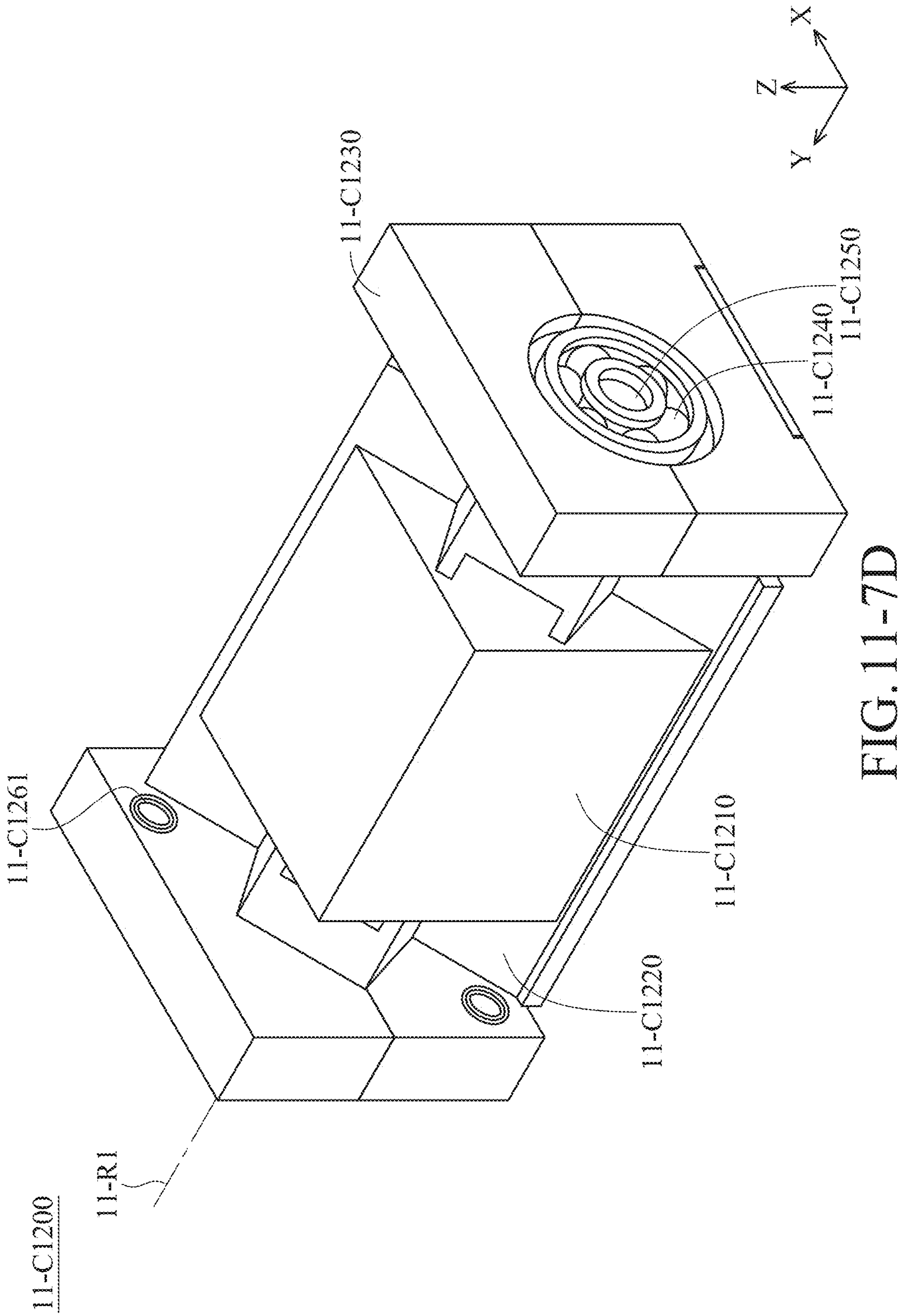
Figures 7E, 11:
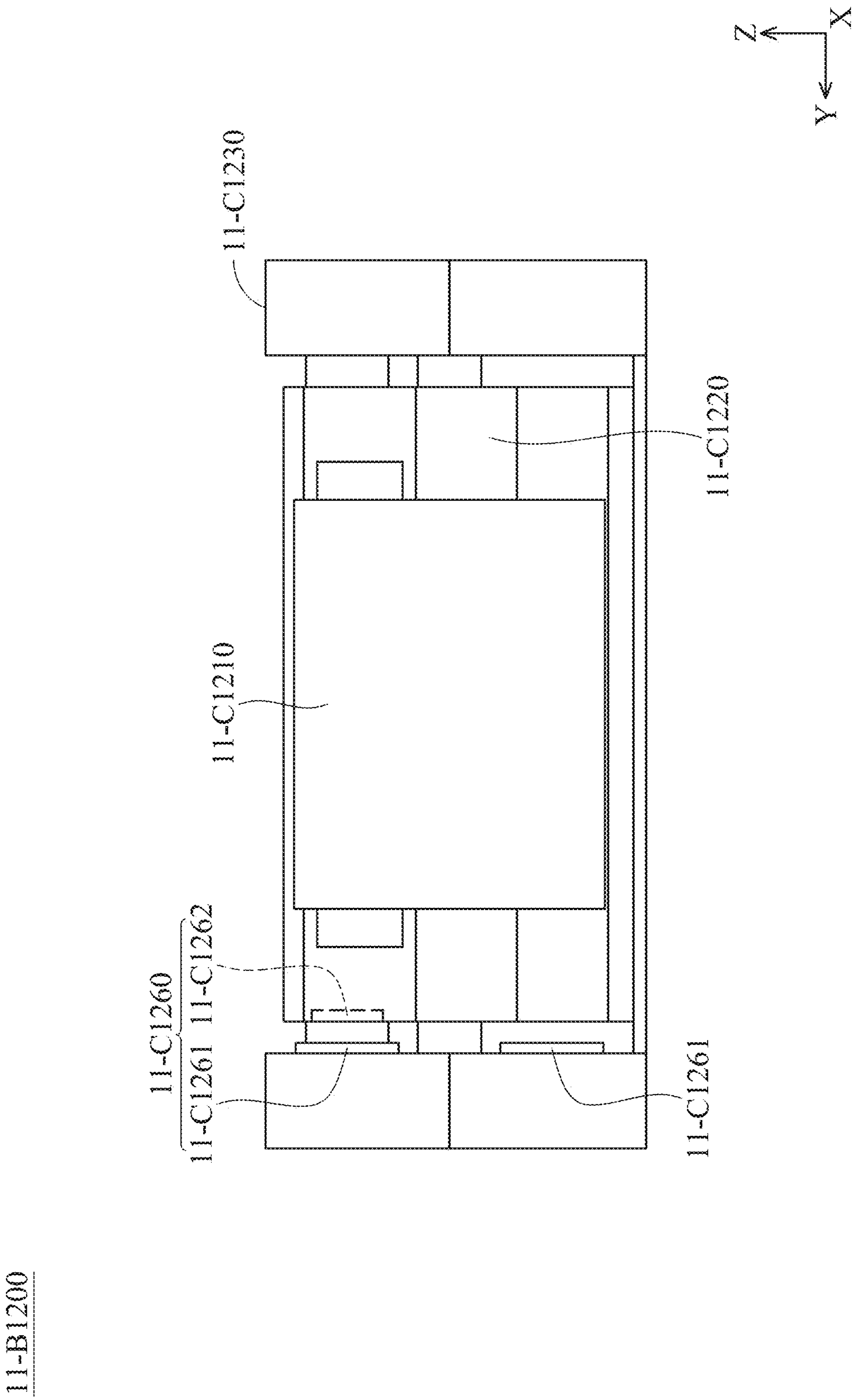
Figures 8A, 11:
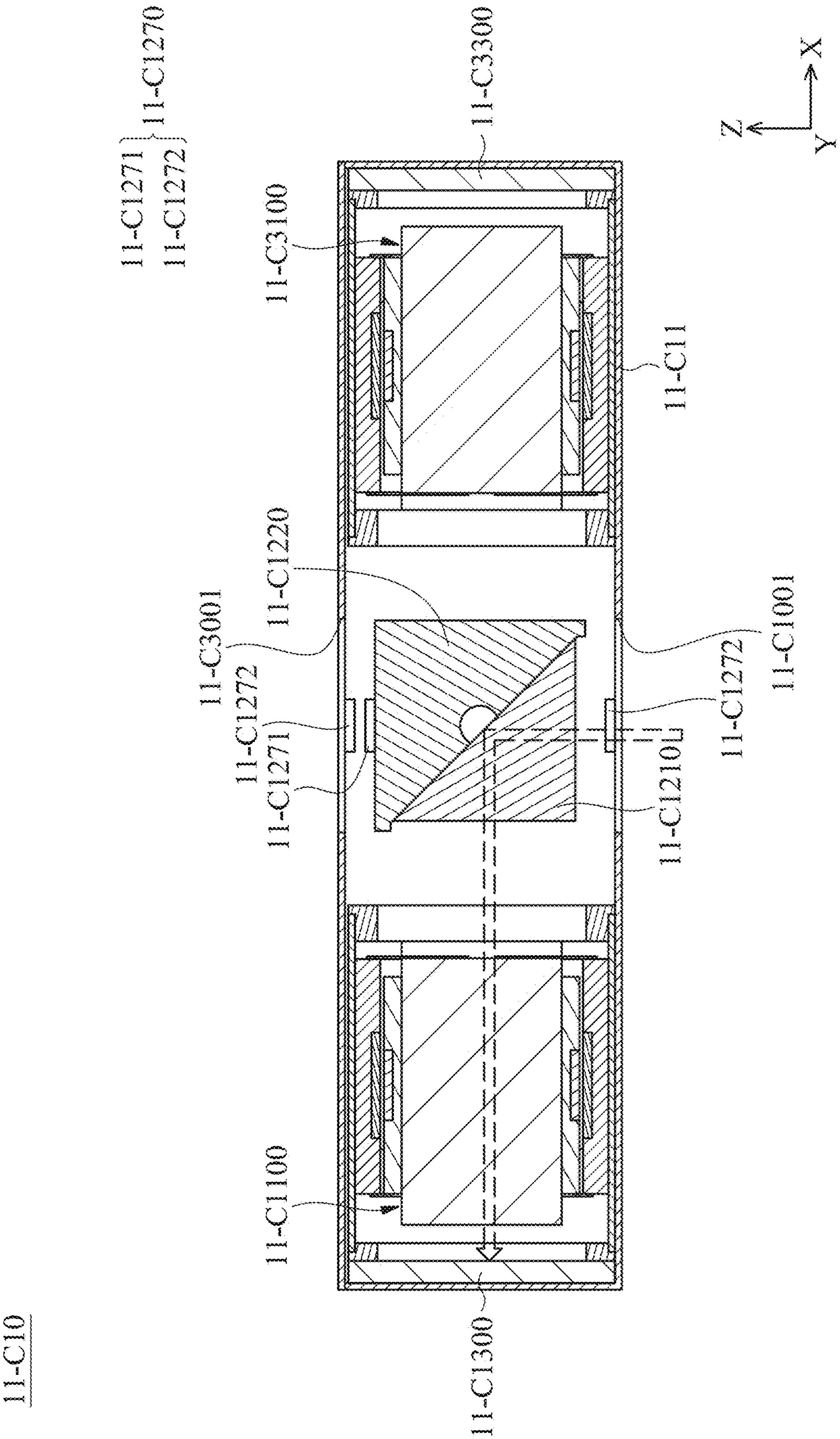
Figures 8B, 11:
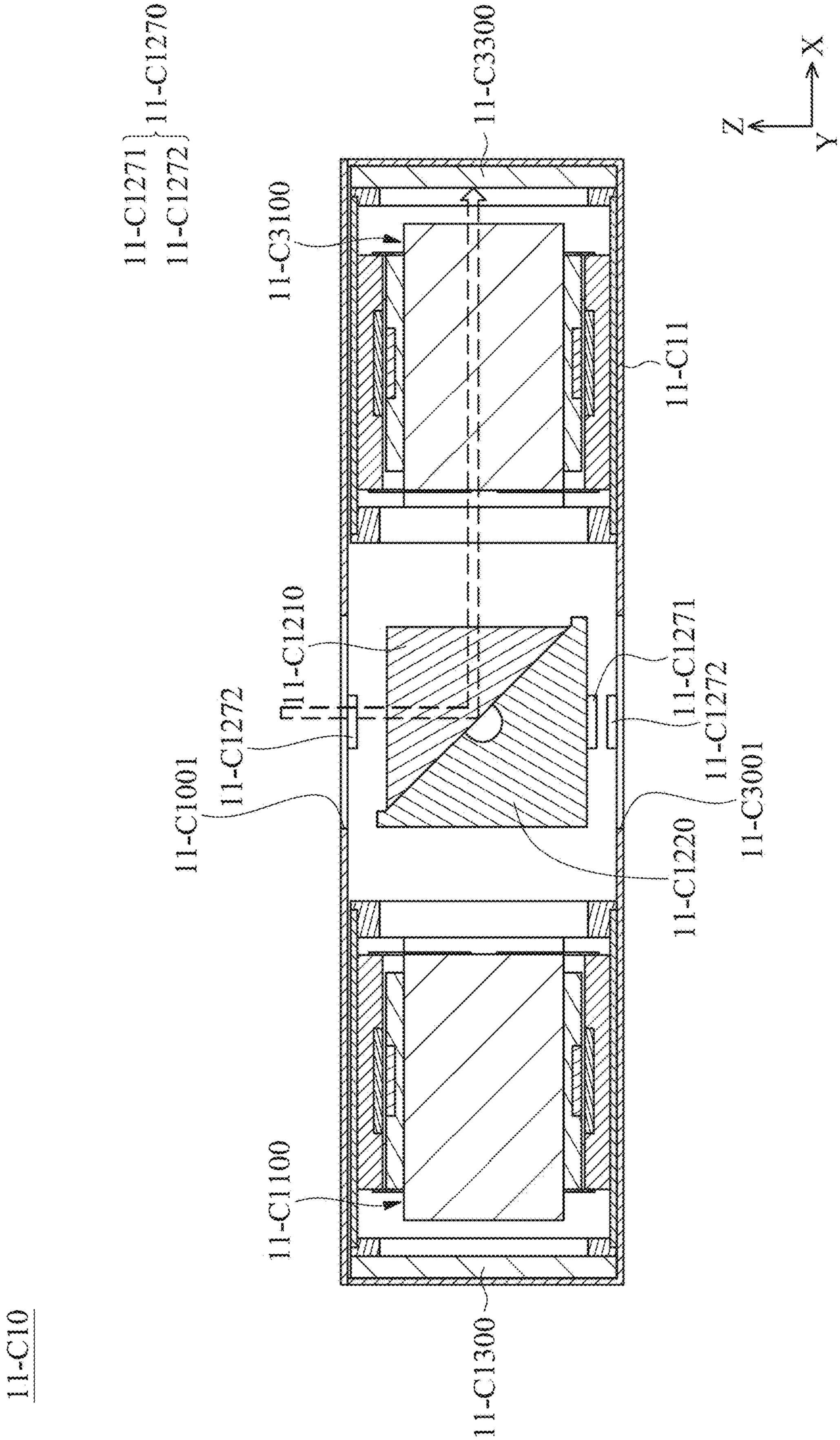
Figures 9A, 11:
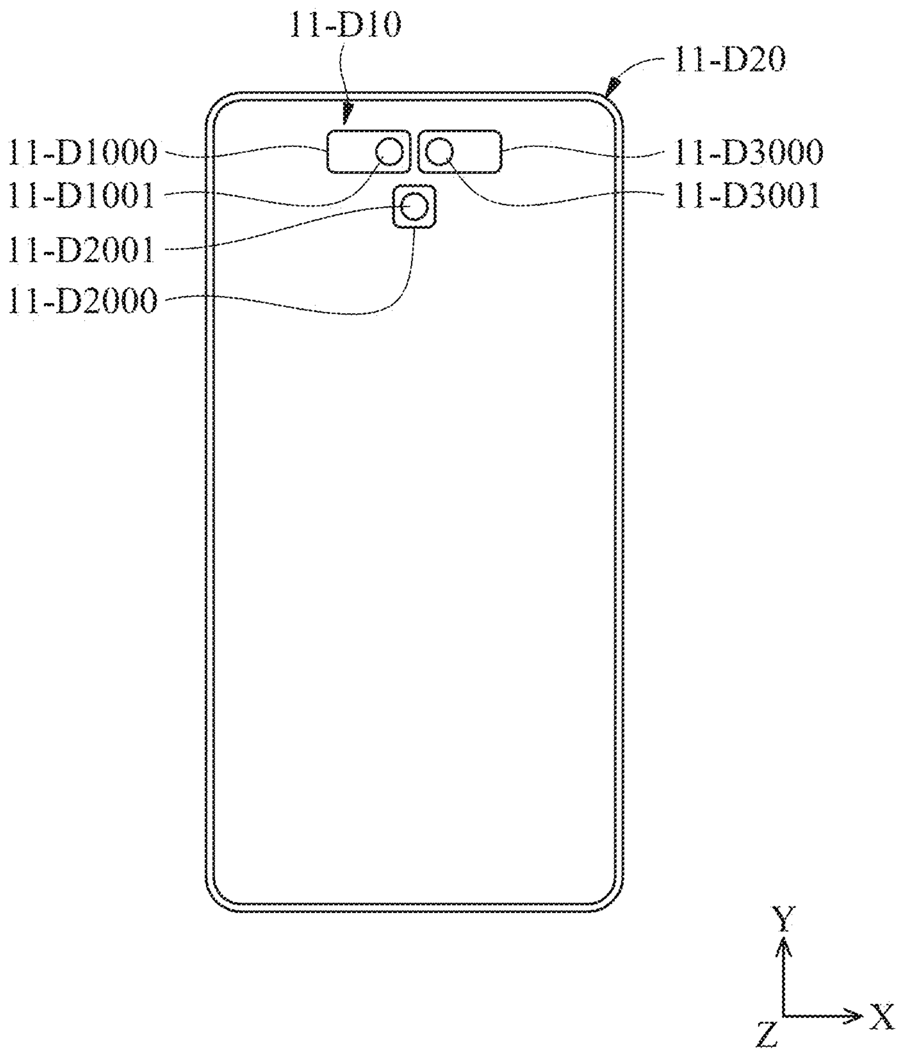
Figures 9B, 11:
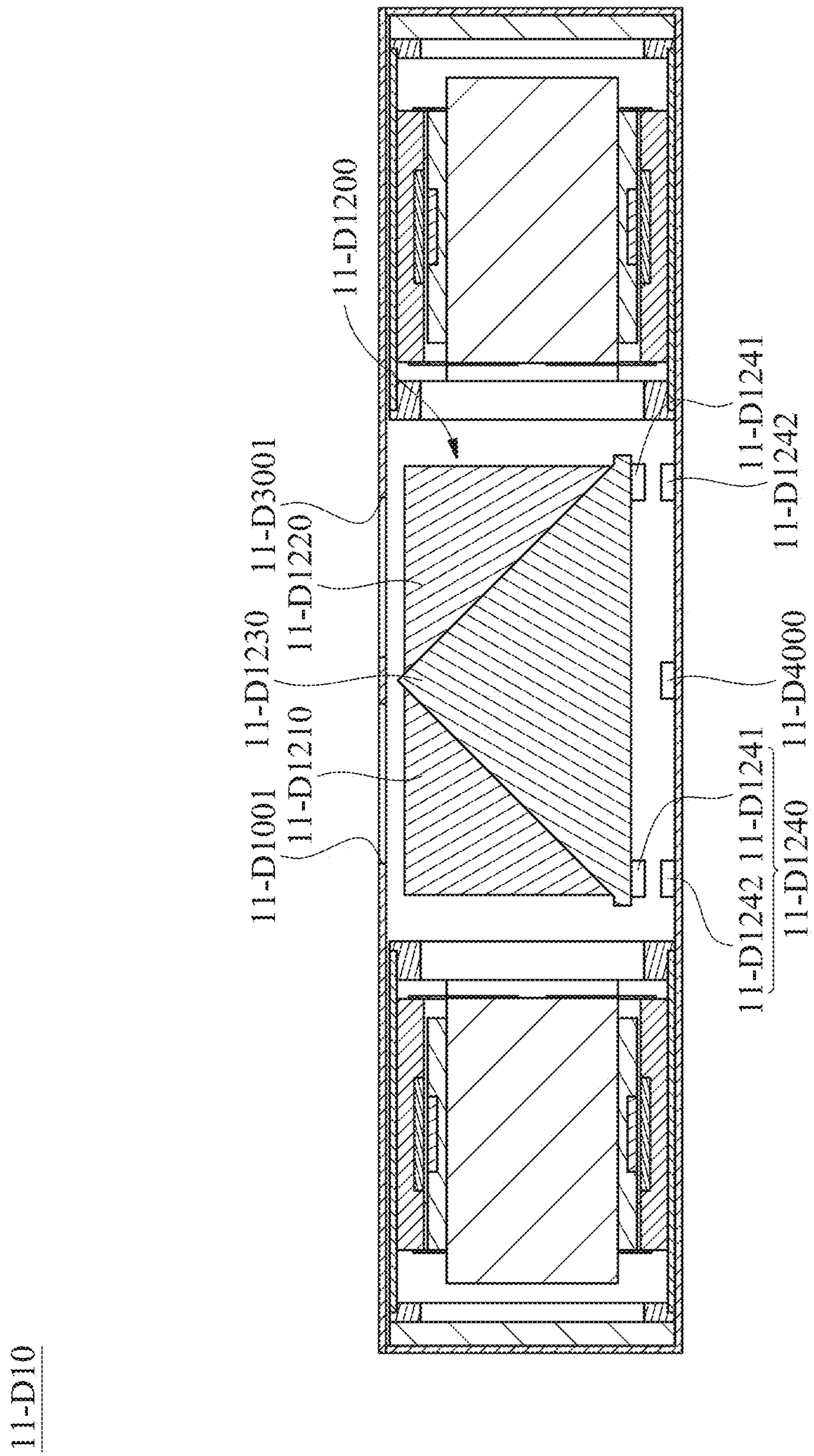
Figures 10, 11:
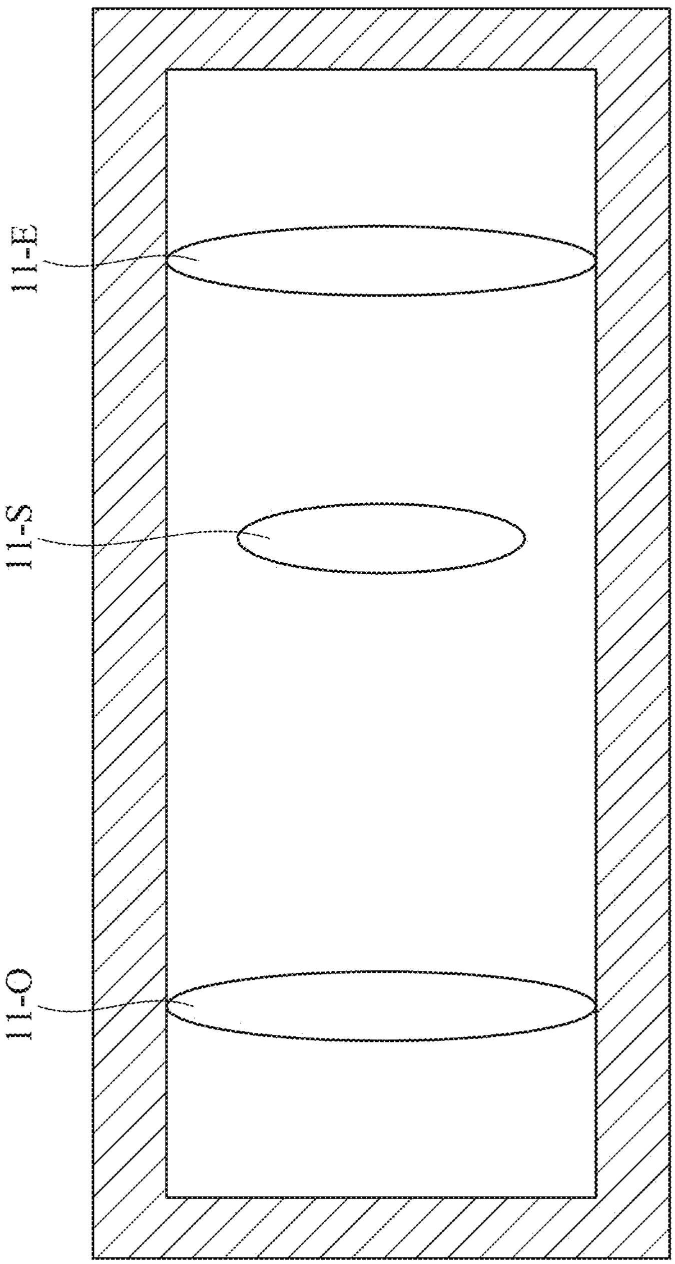
Figures 1, 12:
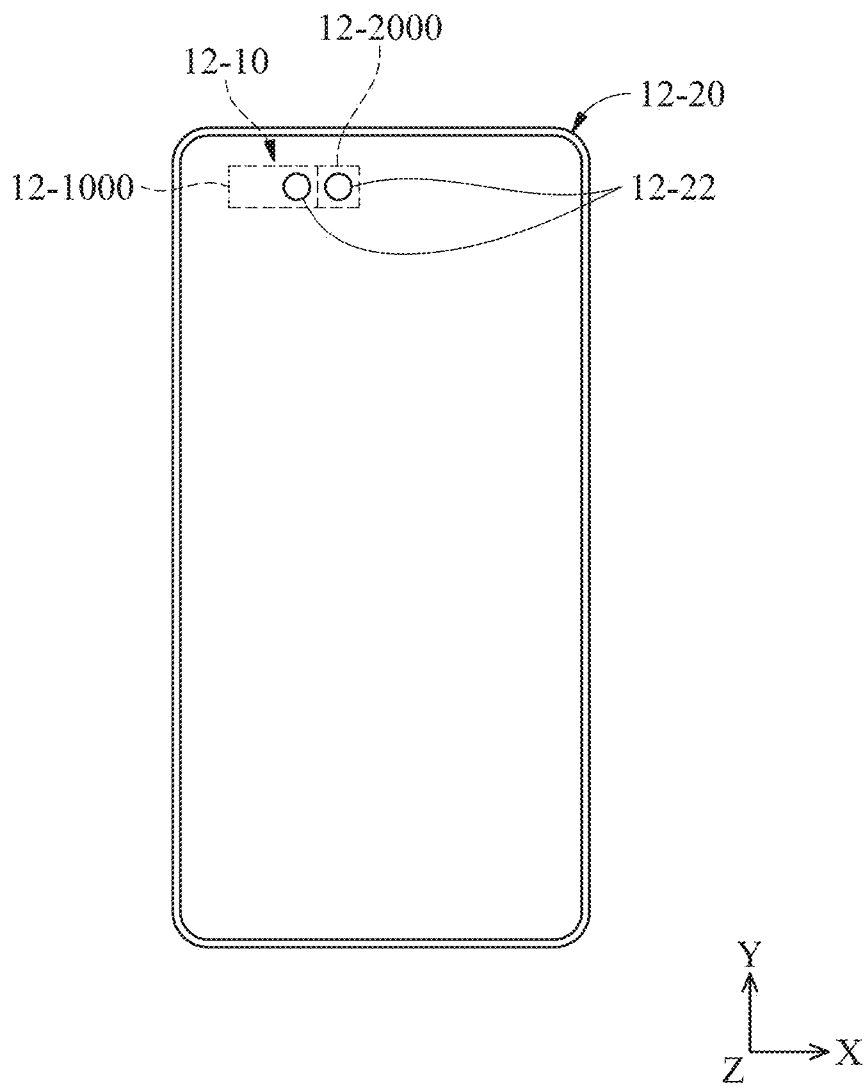
Figures 2, 12:
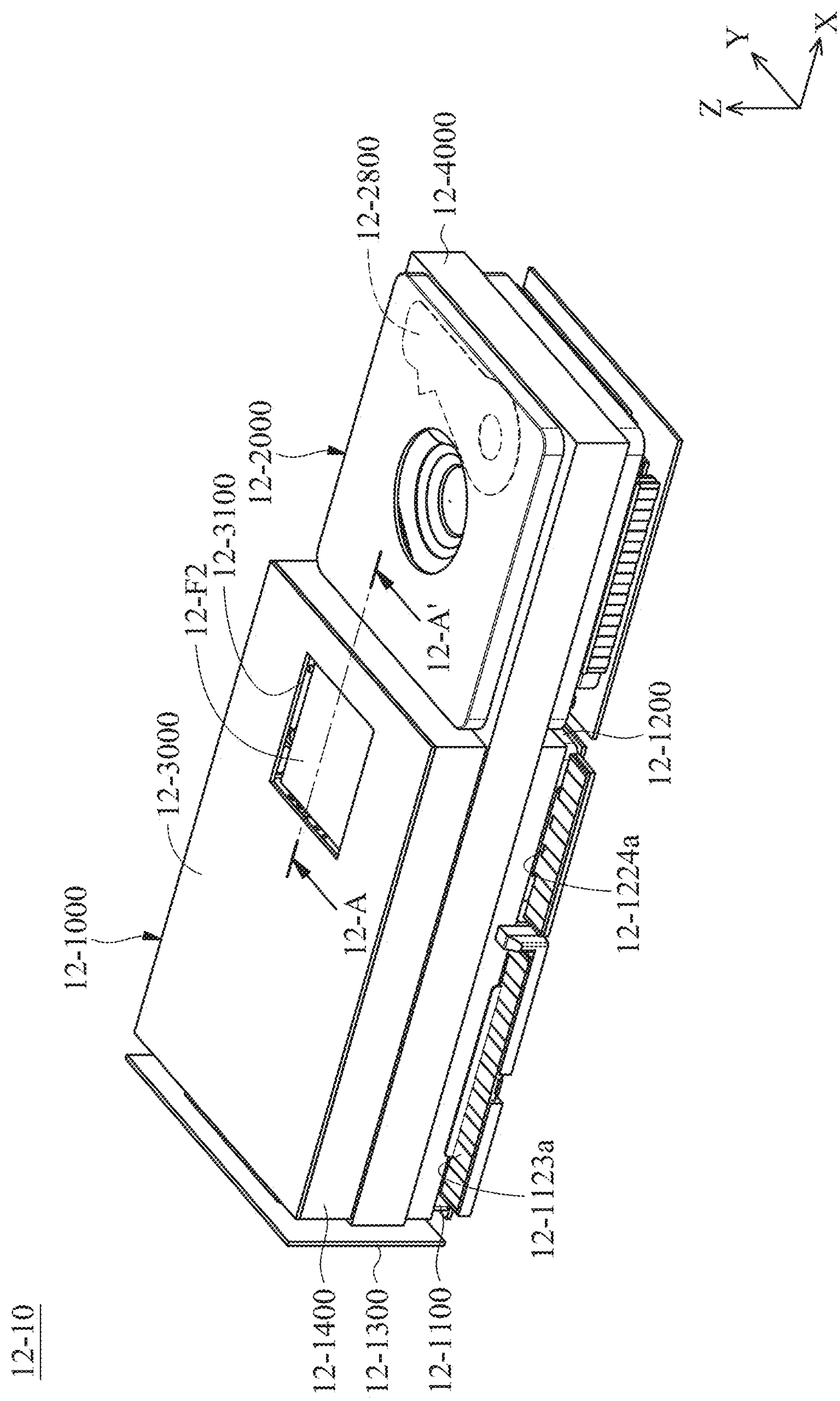
Figures 3, 12:
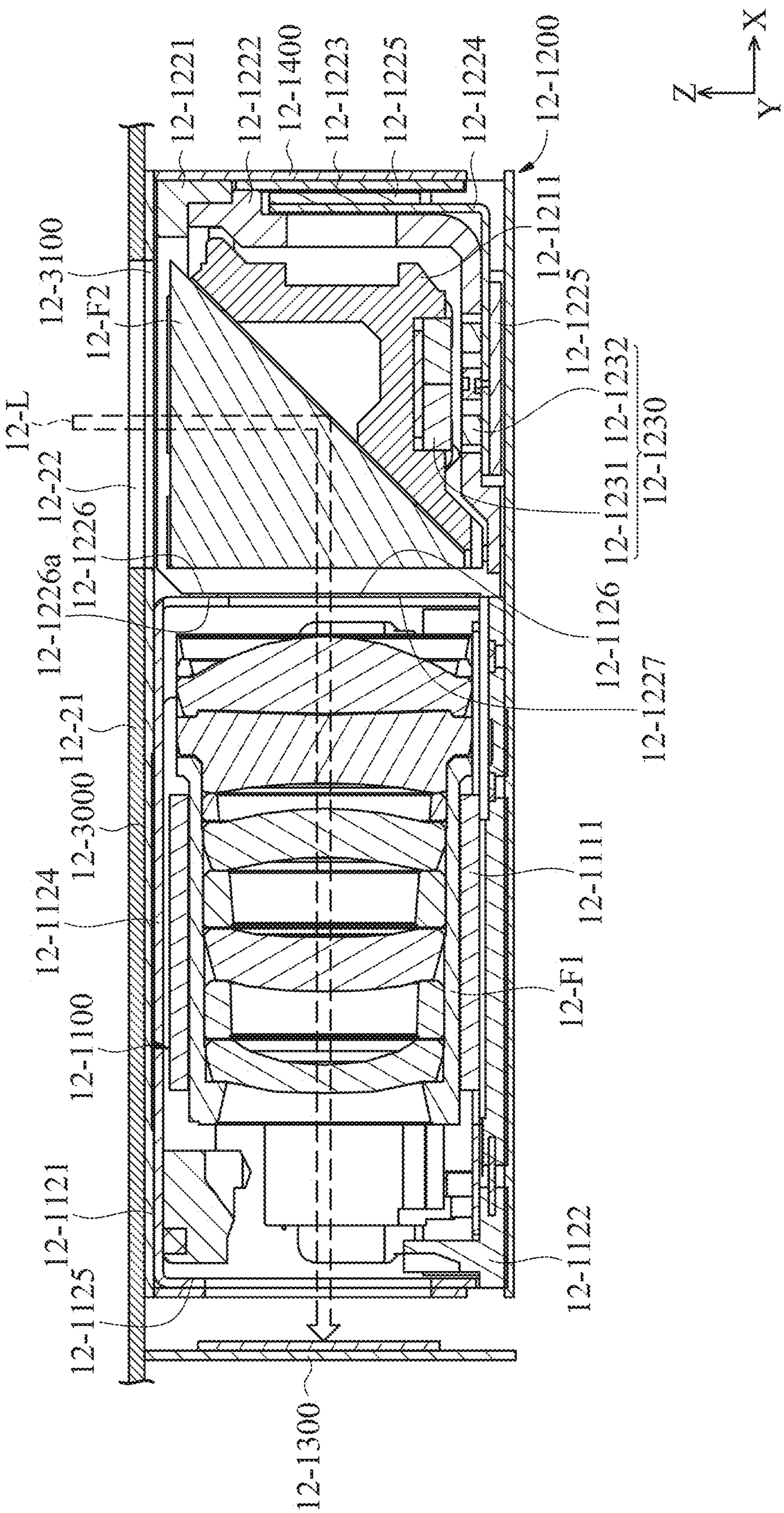
Figures 4, 12:
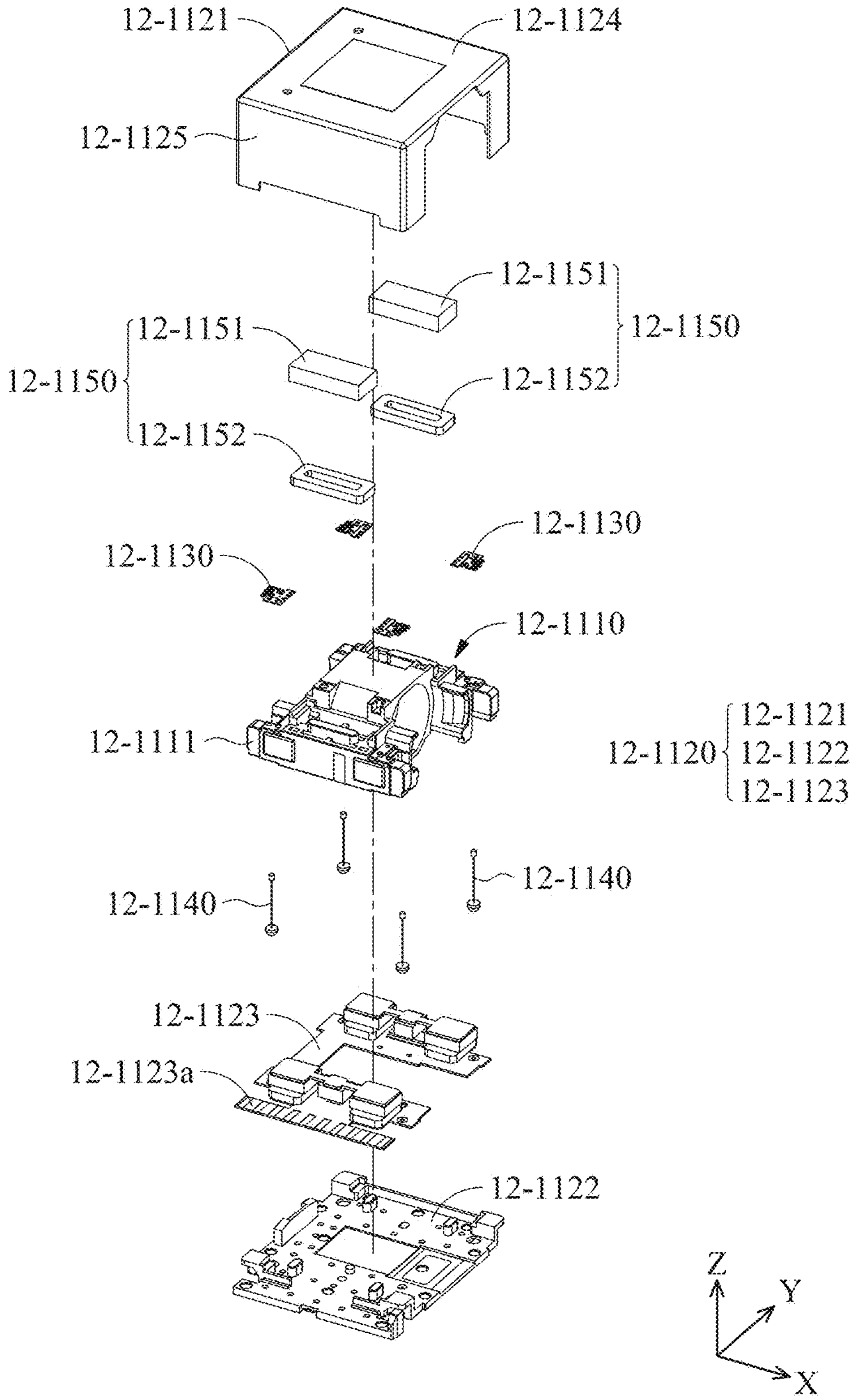
Figures 5, 12:
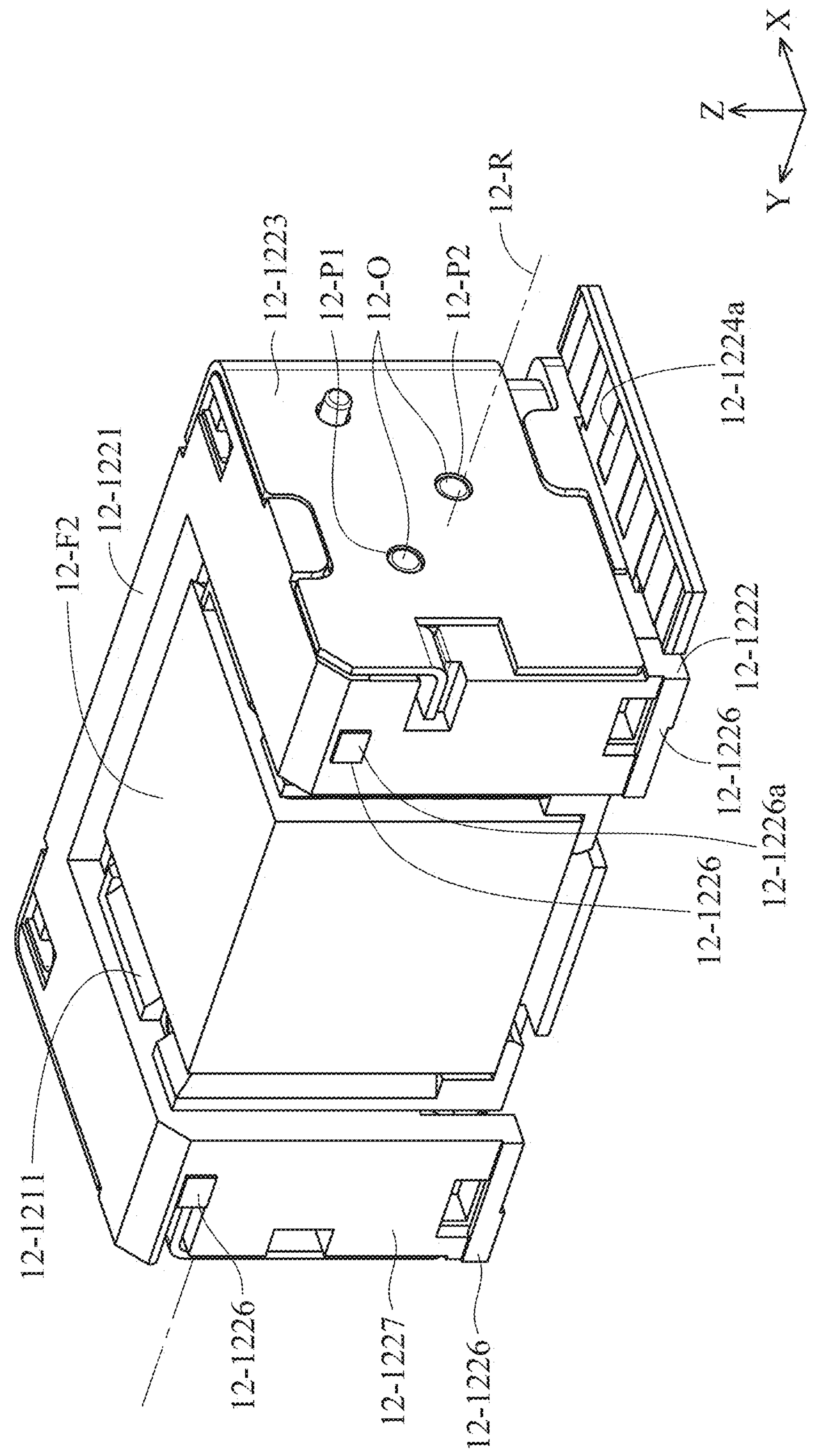
Figures 6, 12:
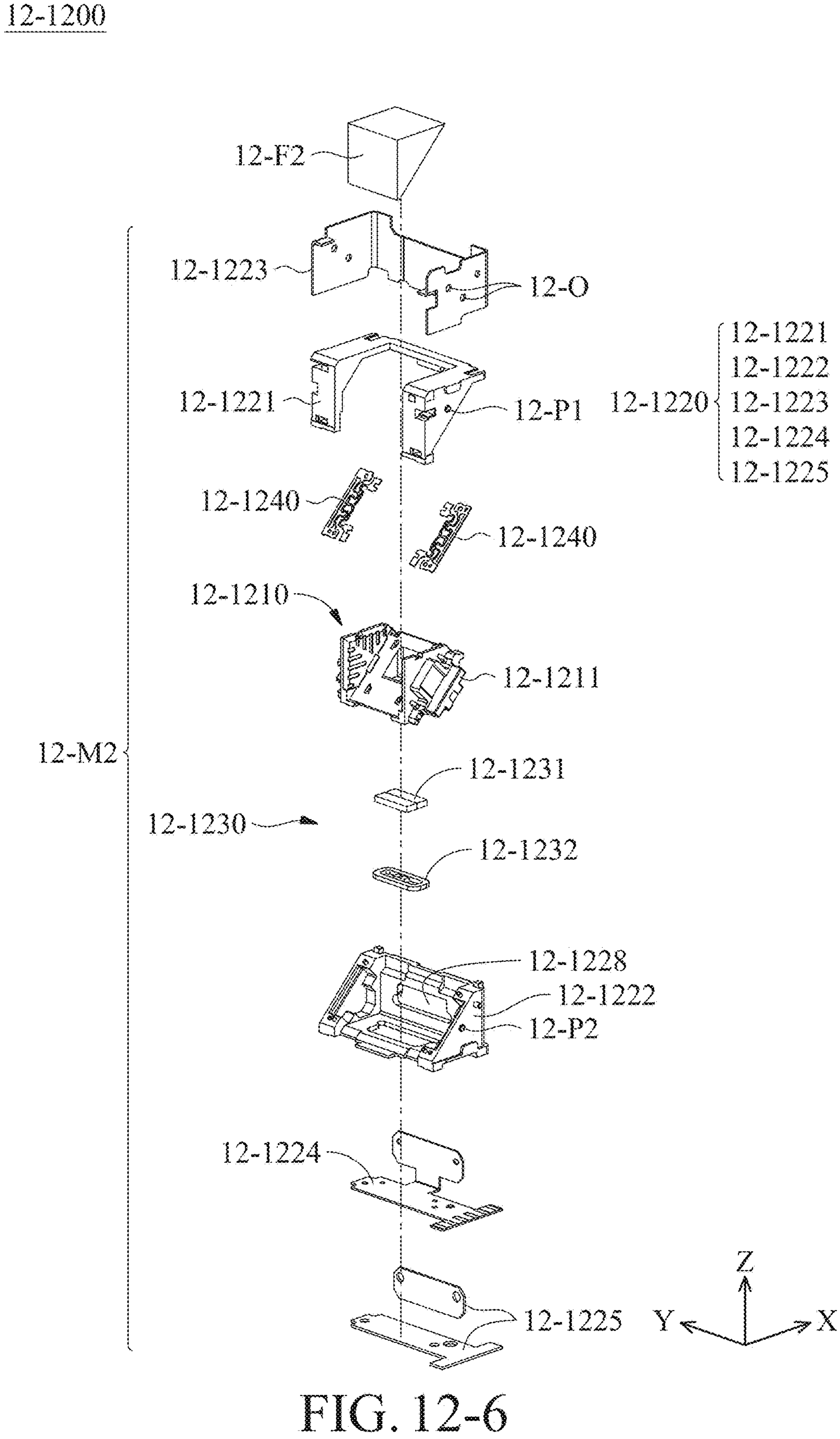
Figures 7, 12:
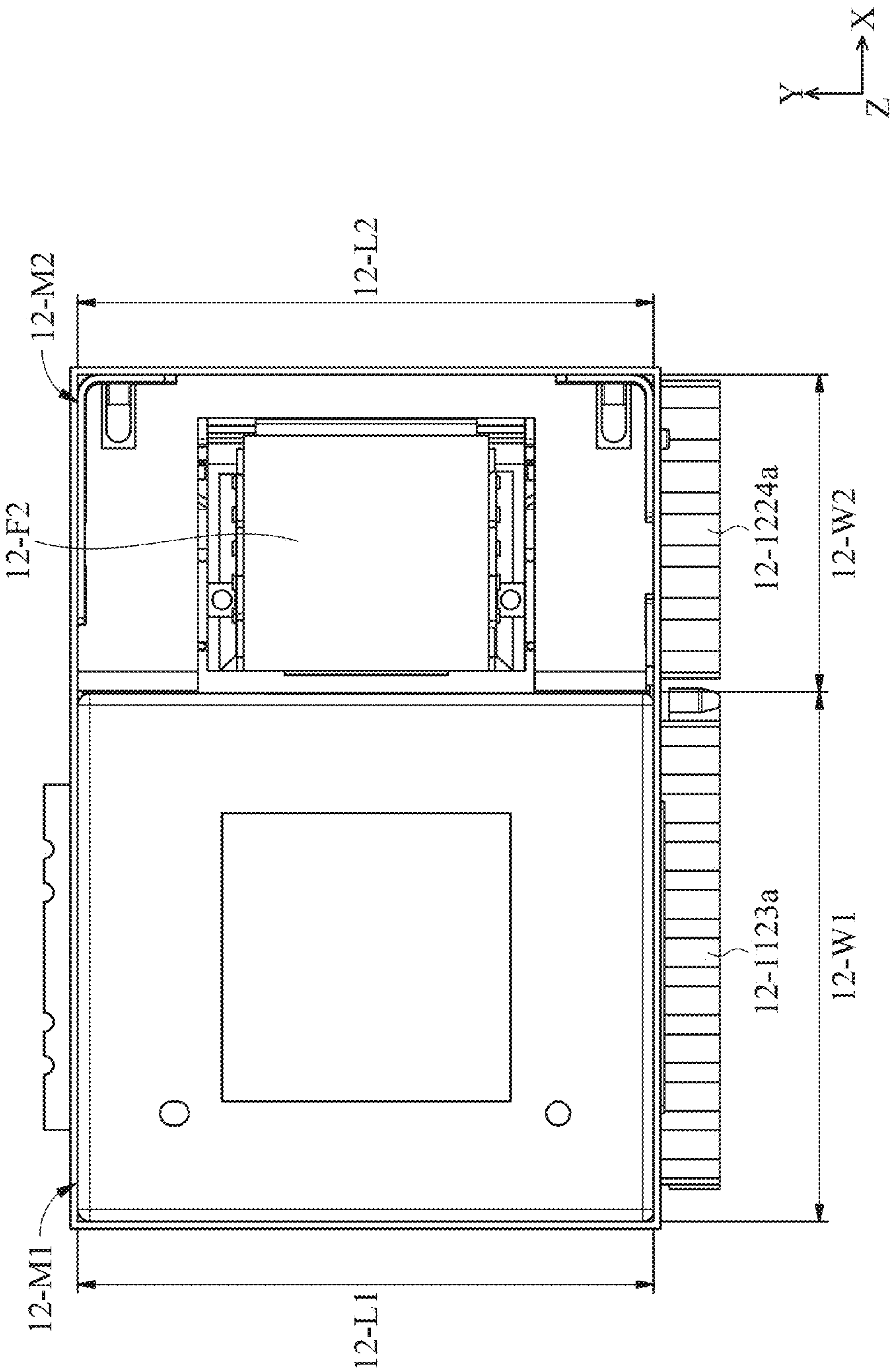
Figures 8, 12:
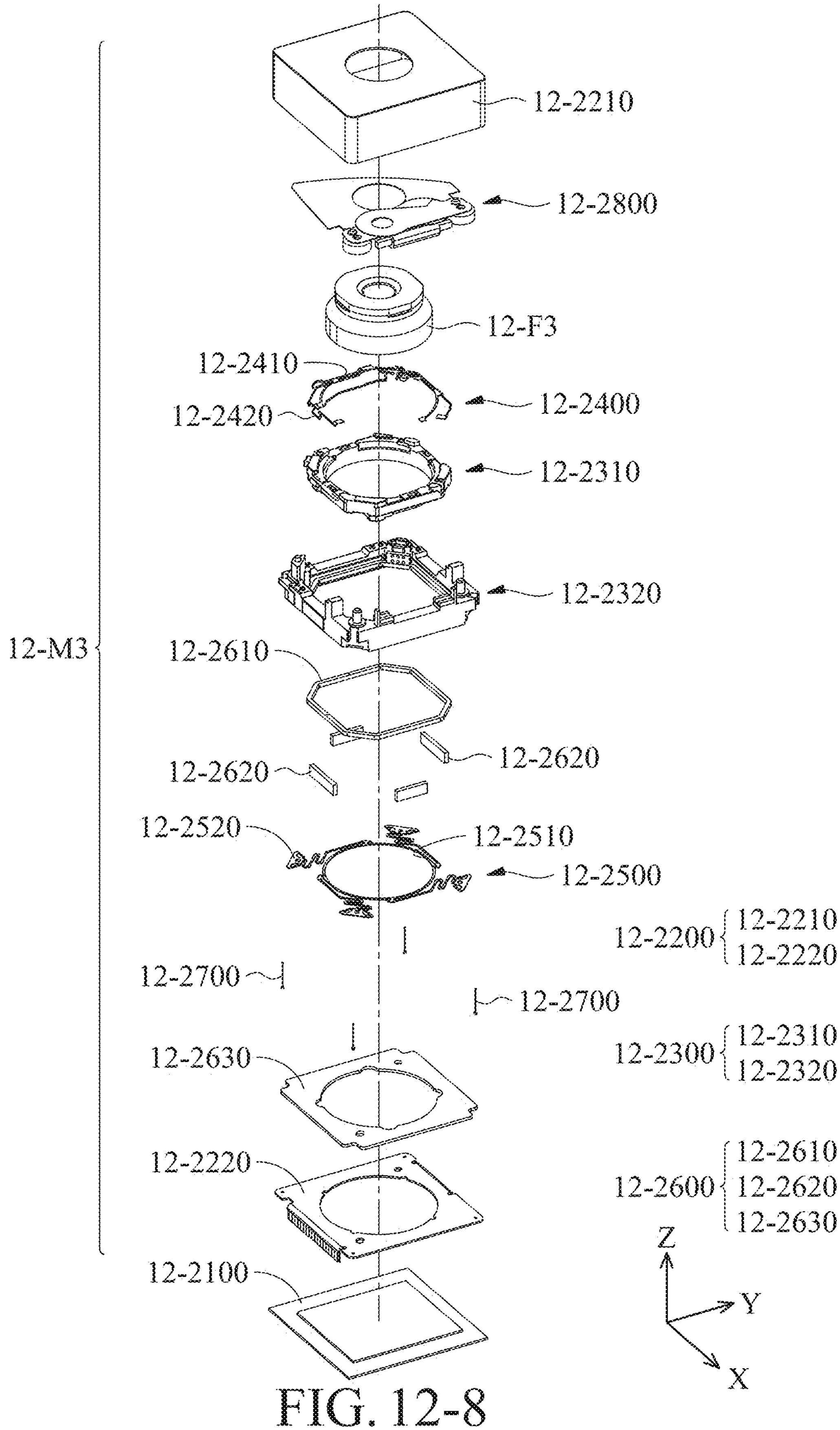
Figures 9, 12:
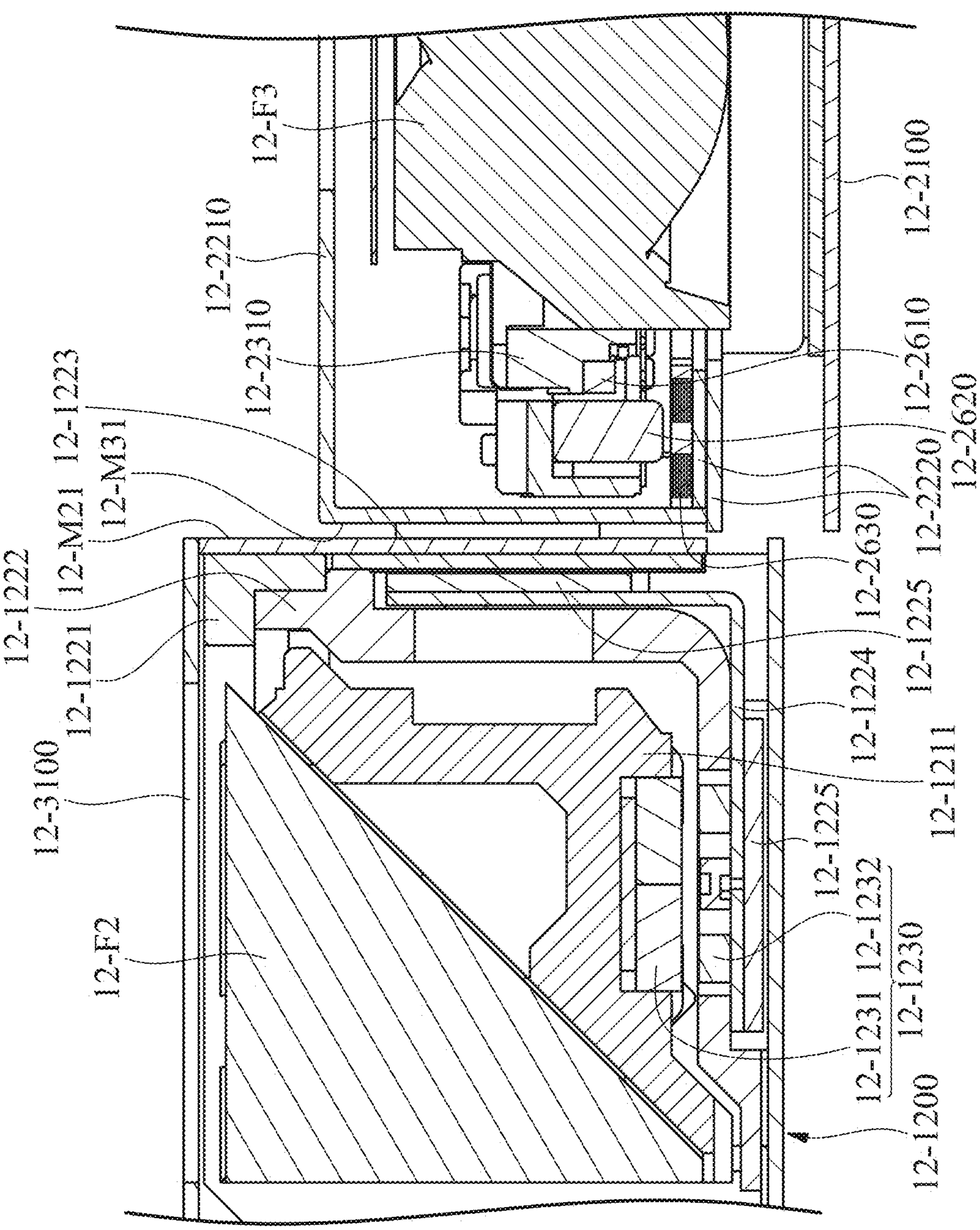
Figures 10, 12:
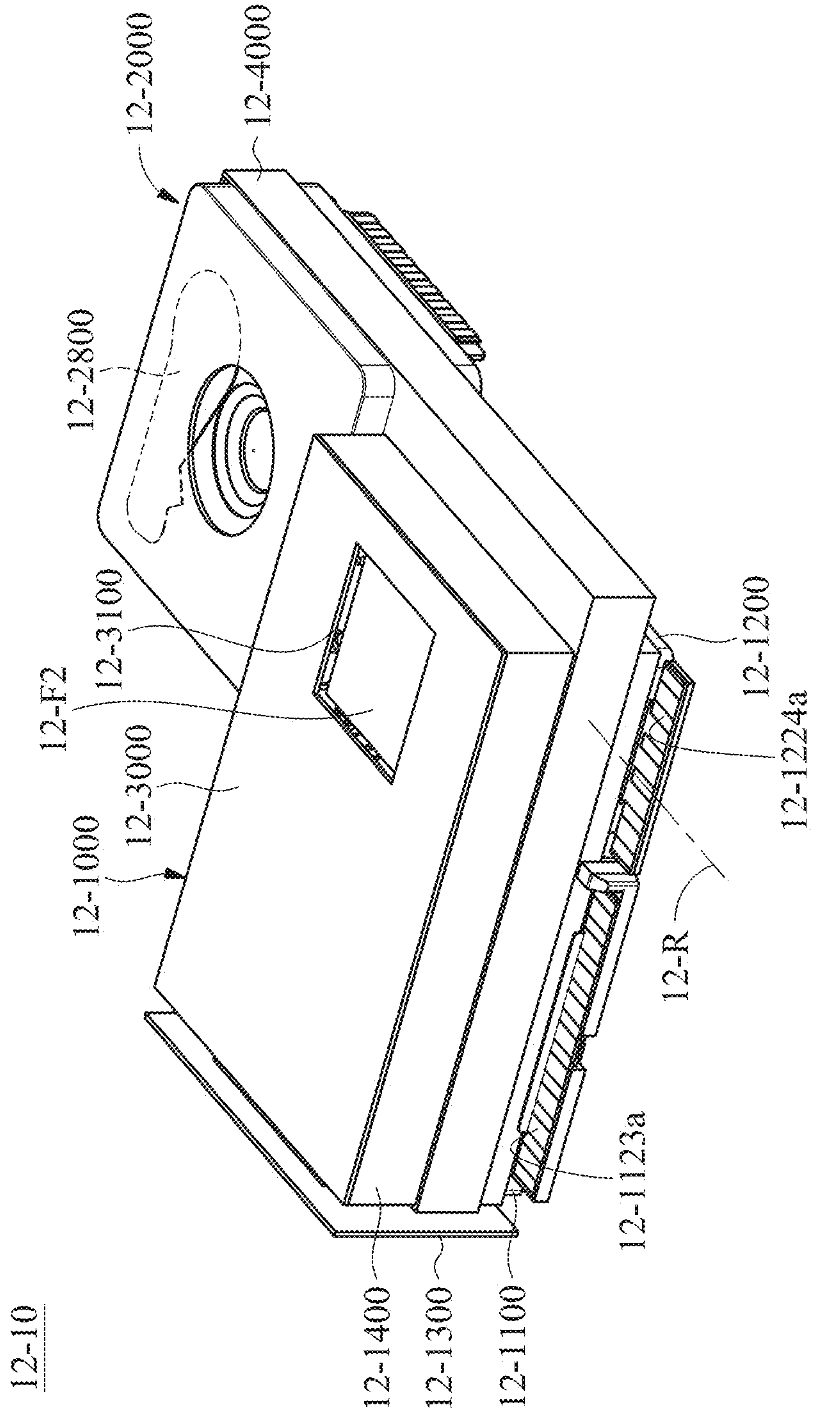
Figures 11, 12:
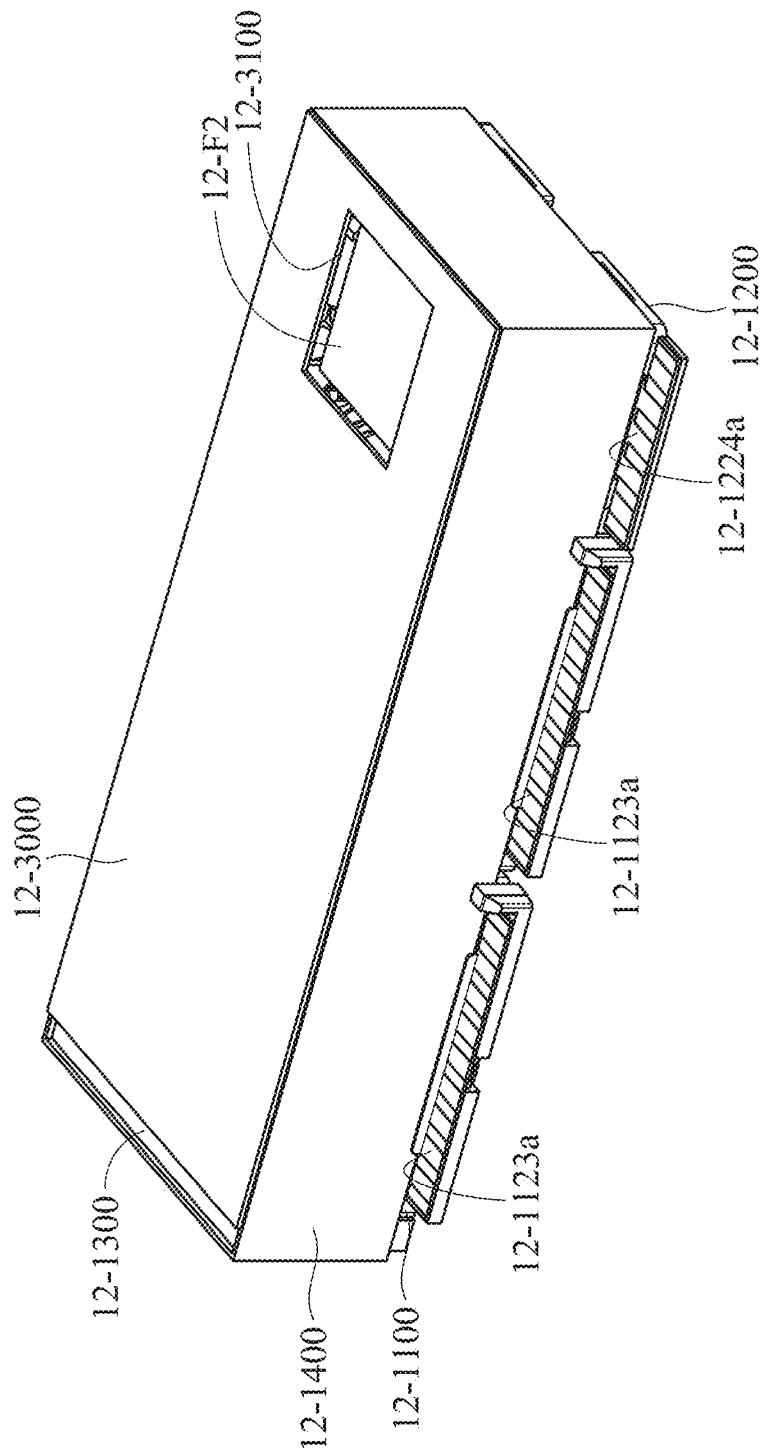
Figure 12:
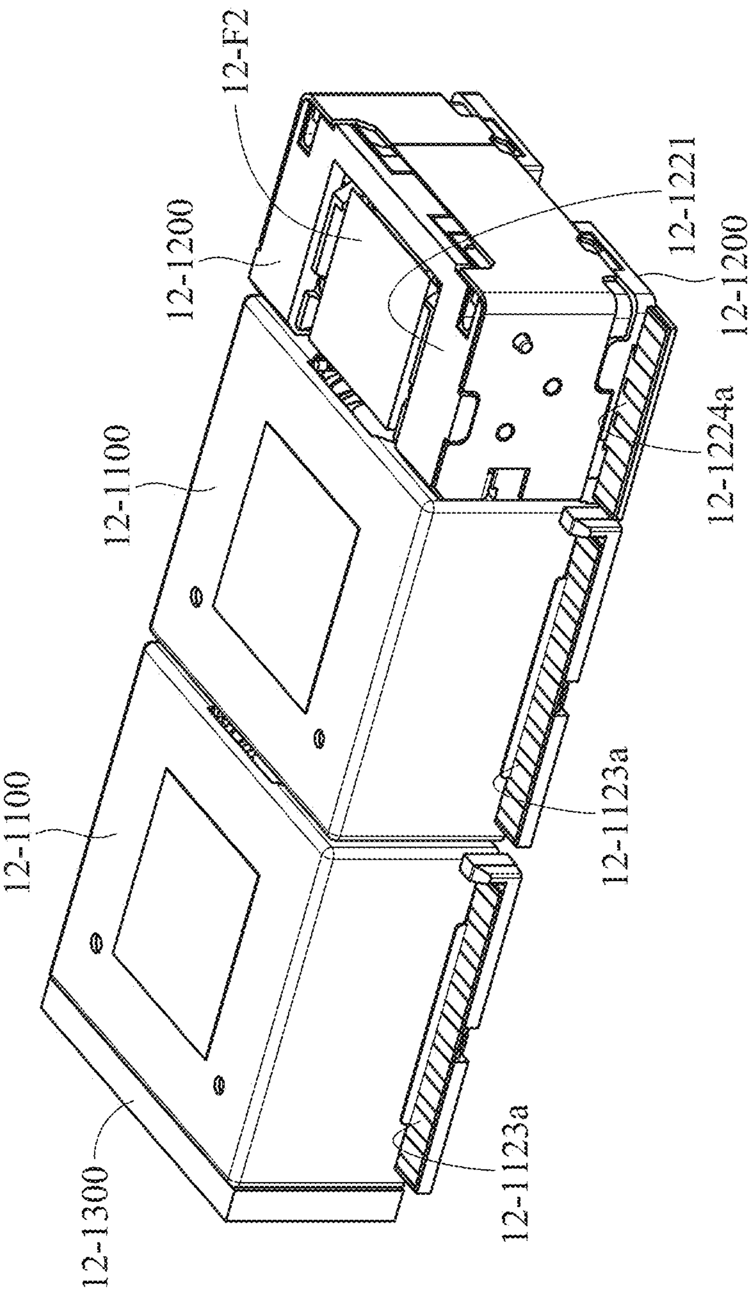

FIG. 10-4H is a schematic view of some elements in FIG. 10-1.

FIG. 10-5A is a schematic view of some elements in FIG. 10-1 under one condition.

FIG. 10-5B is a schematic view of some elements in FIG. 10-1 under one condition.

FIG. 10-6A is a schematic view of some elements in FIG. 10-1 under another condition.

FIG. 10-6B is a schematic view of some elements in FIG. 10-1 under another condition.

FIG. 10-7A is a schematic view of some elements in FIG. 10-1 under another condition.

FIG. 10-7B is a schematic view of some elements in FIG. 10-1 under another condition.

Figures 1, 5:
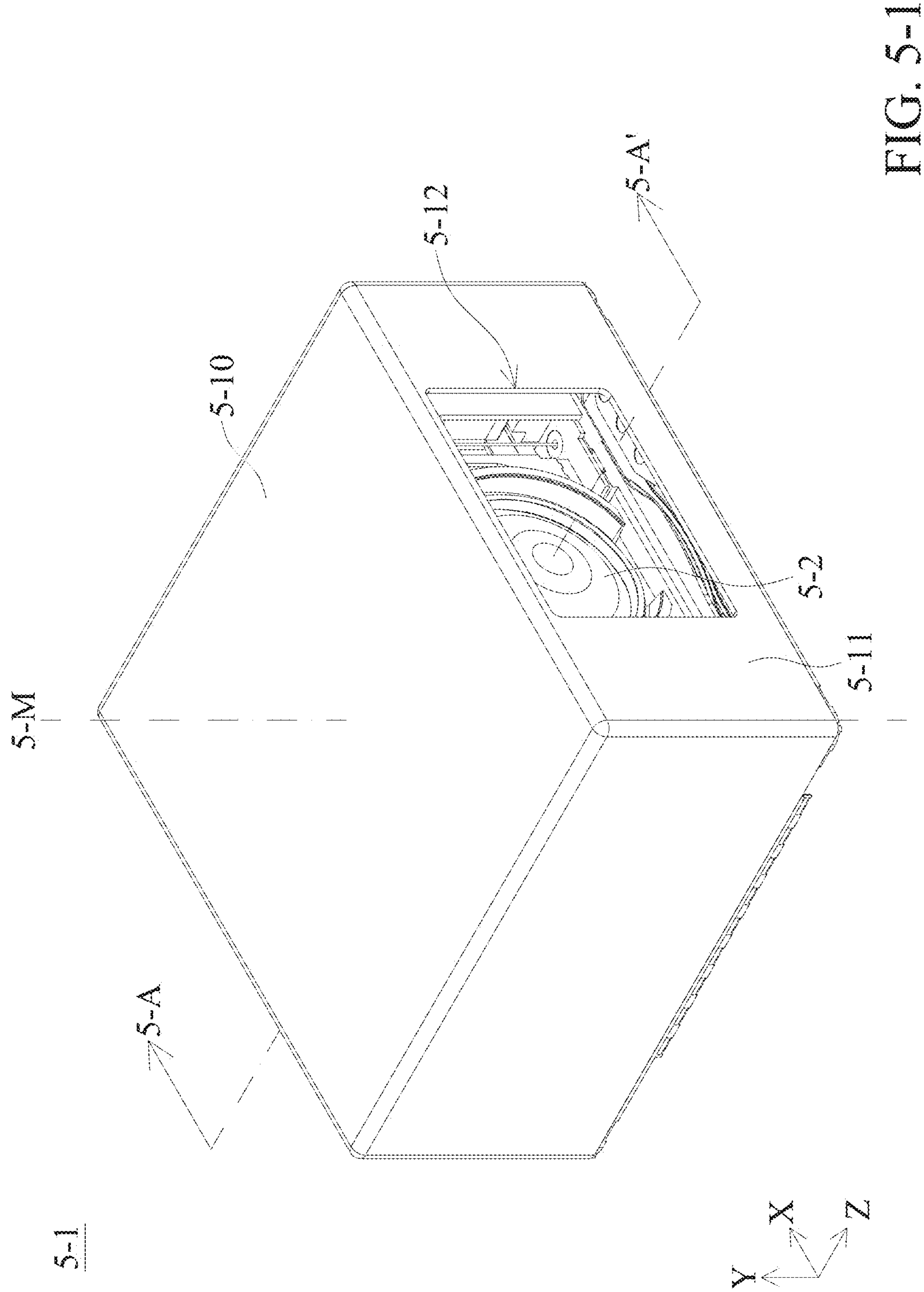
Figures 2A, 5:
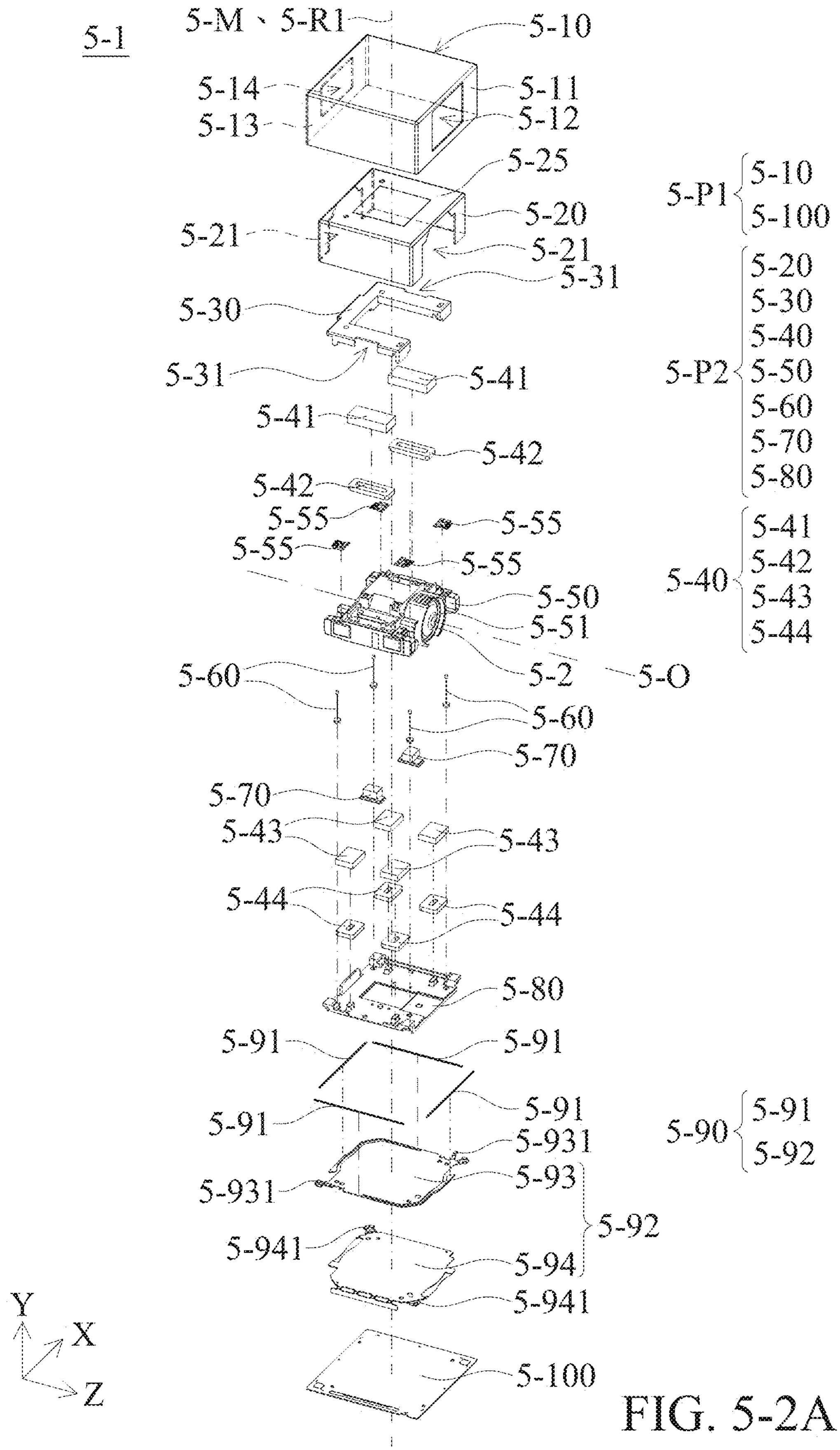
Figures 2B, 5:
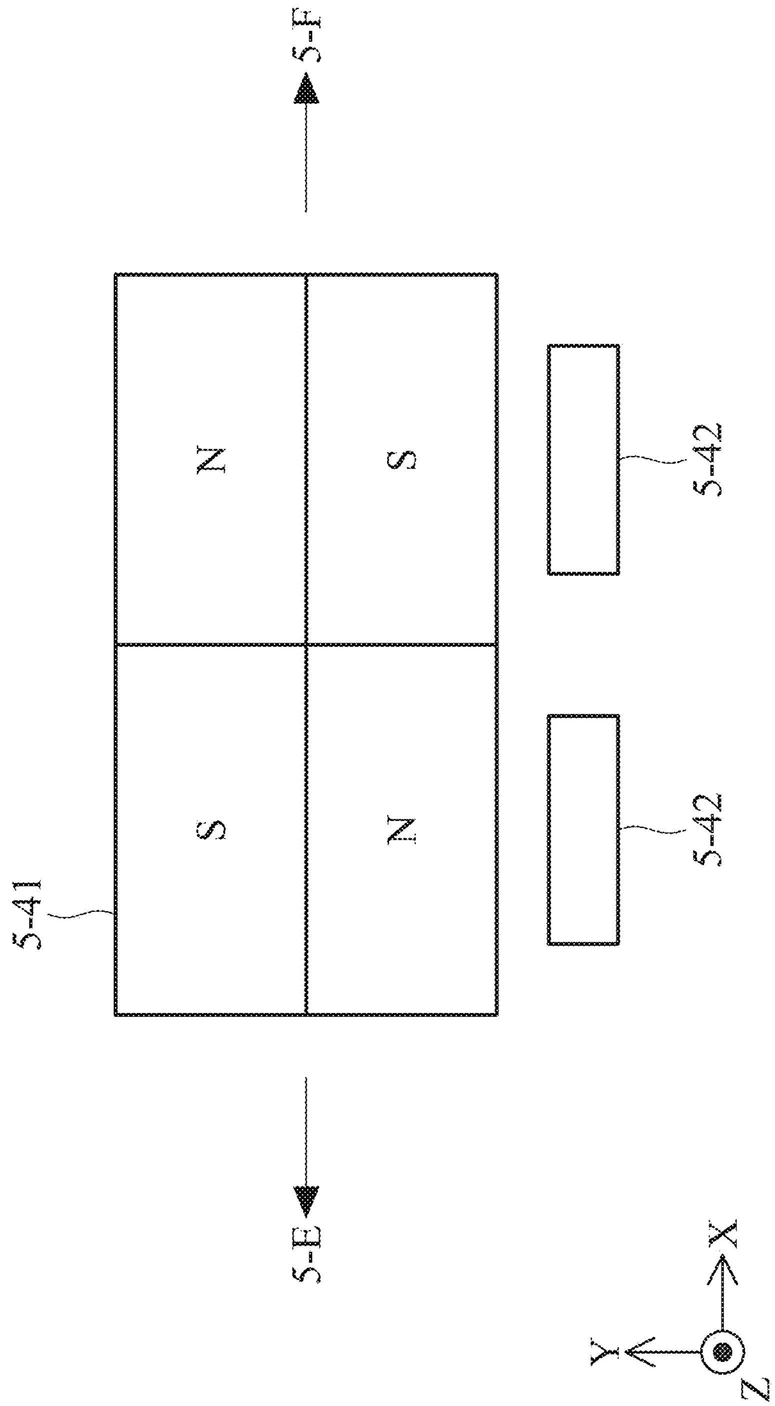
Figures 2C, 5:
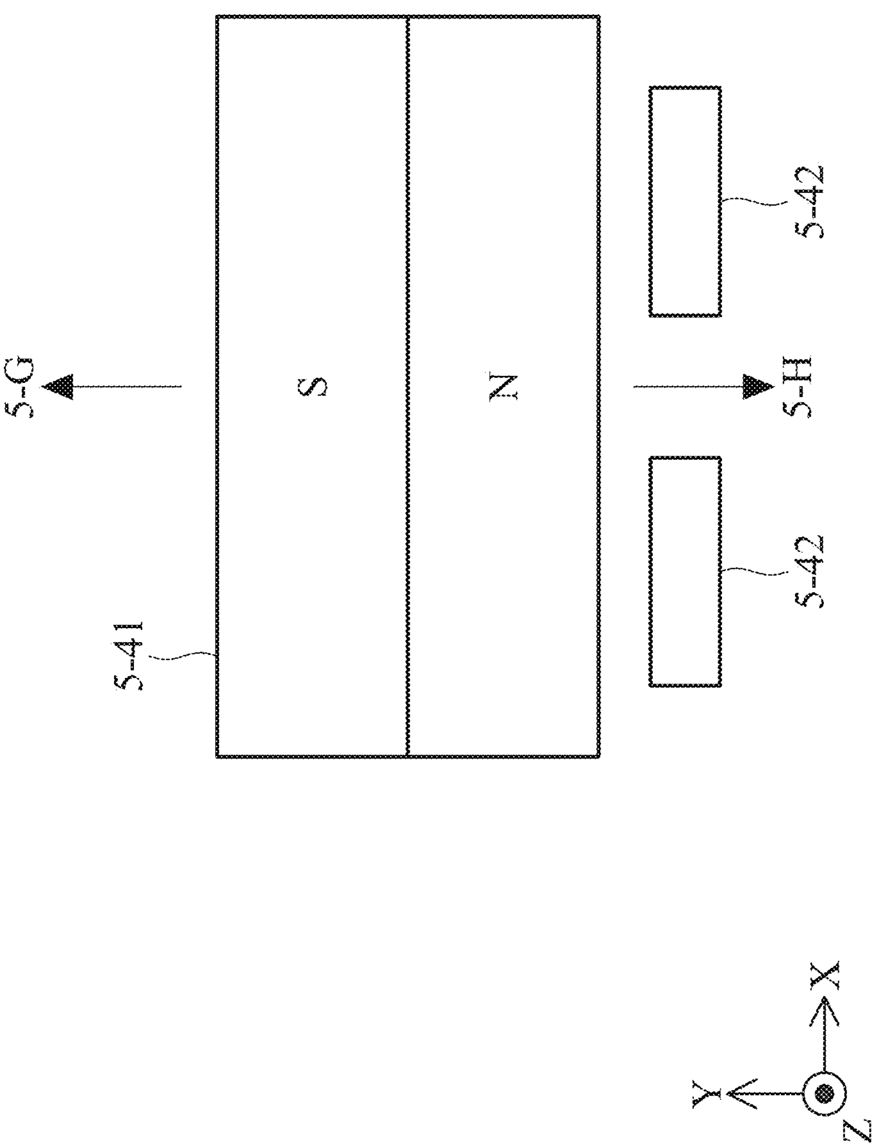
Figures 3A, 5:
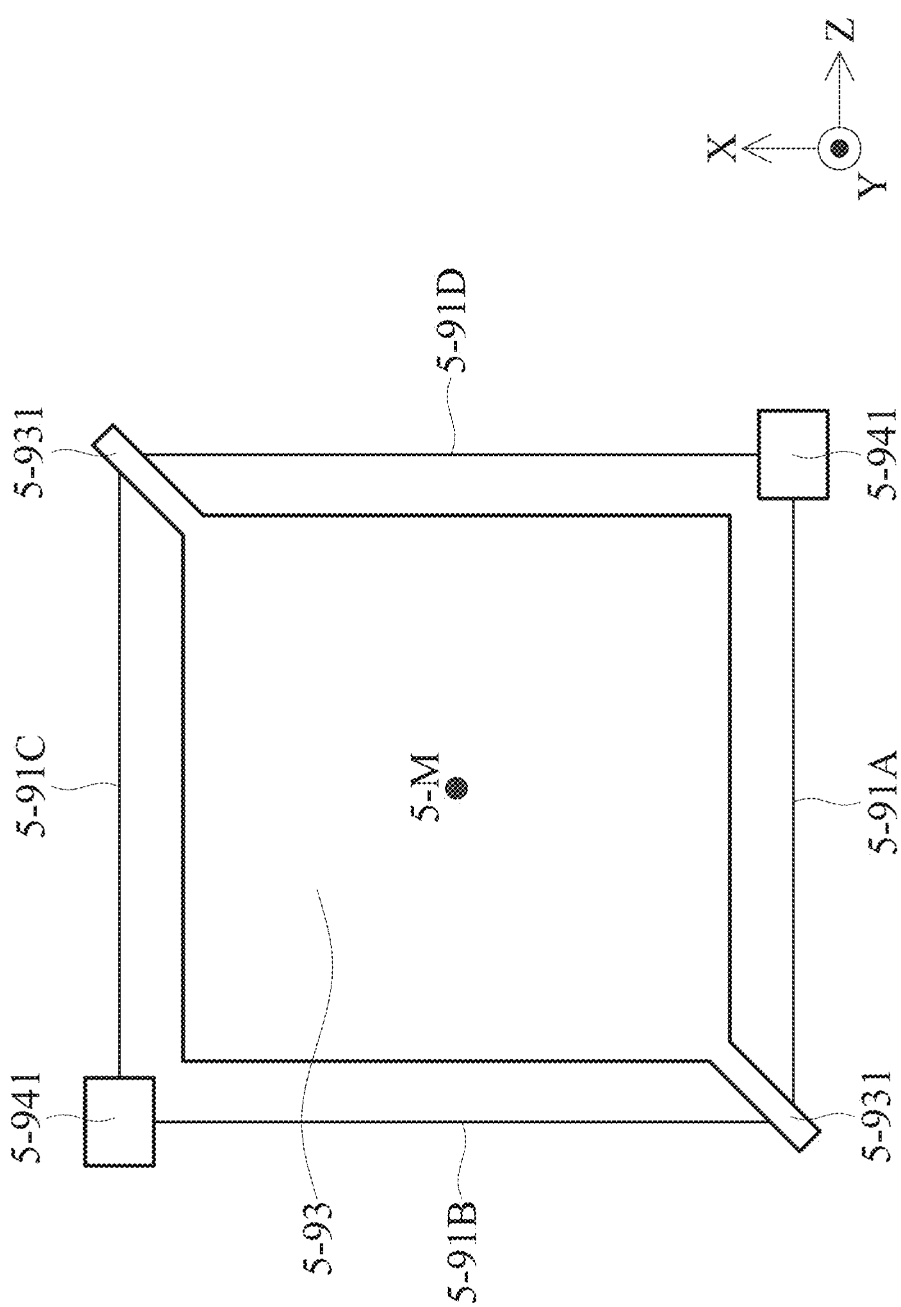
Figures 3B, 5:
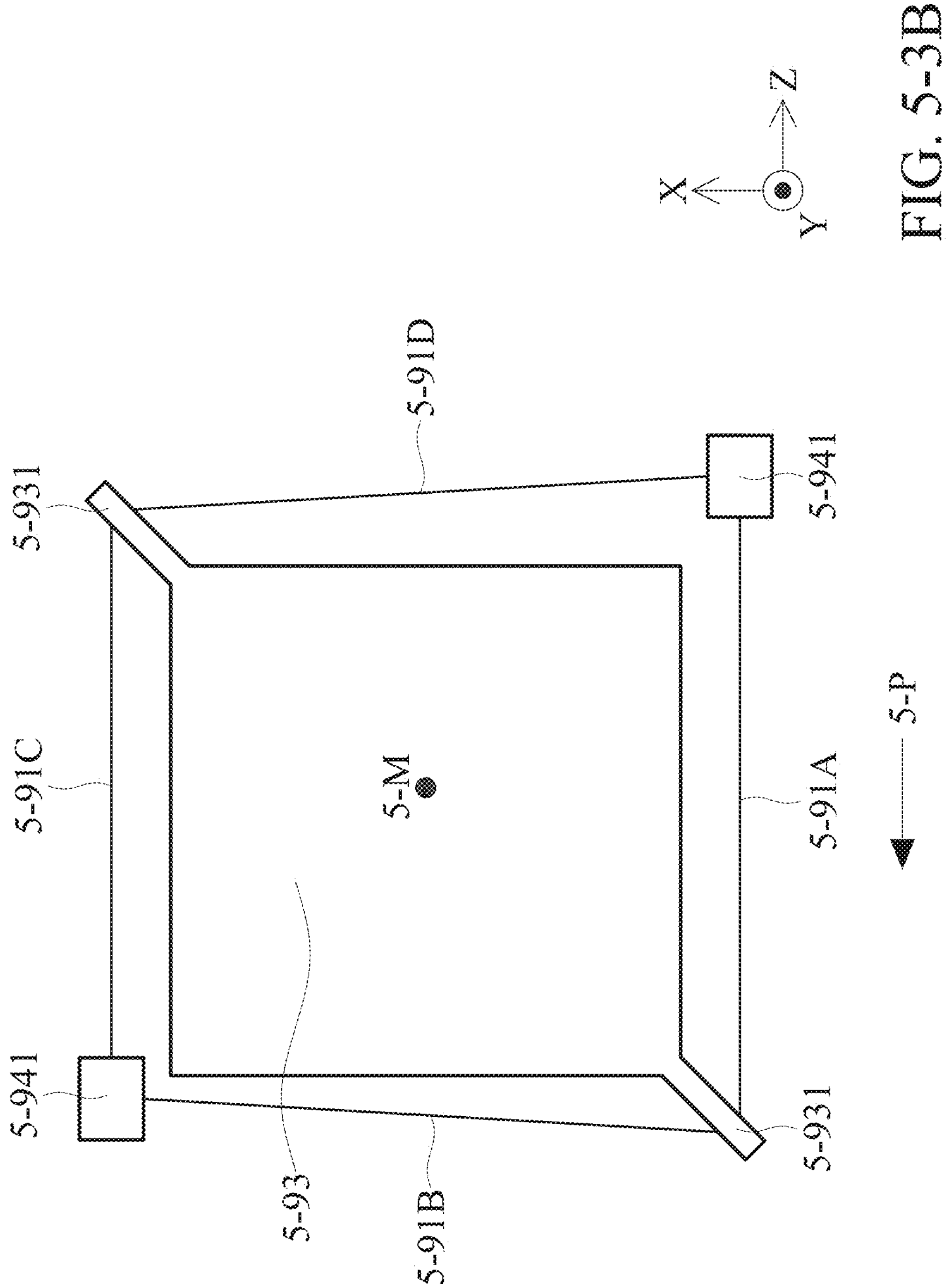
Figures 3C, 5:
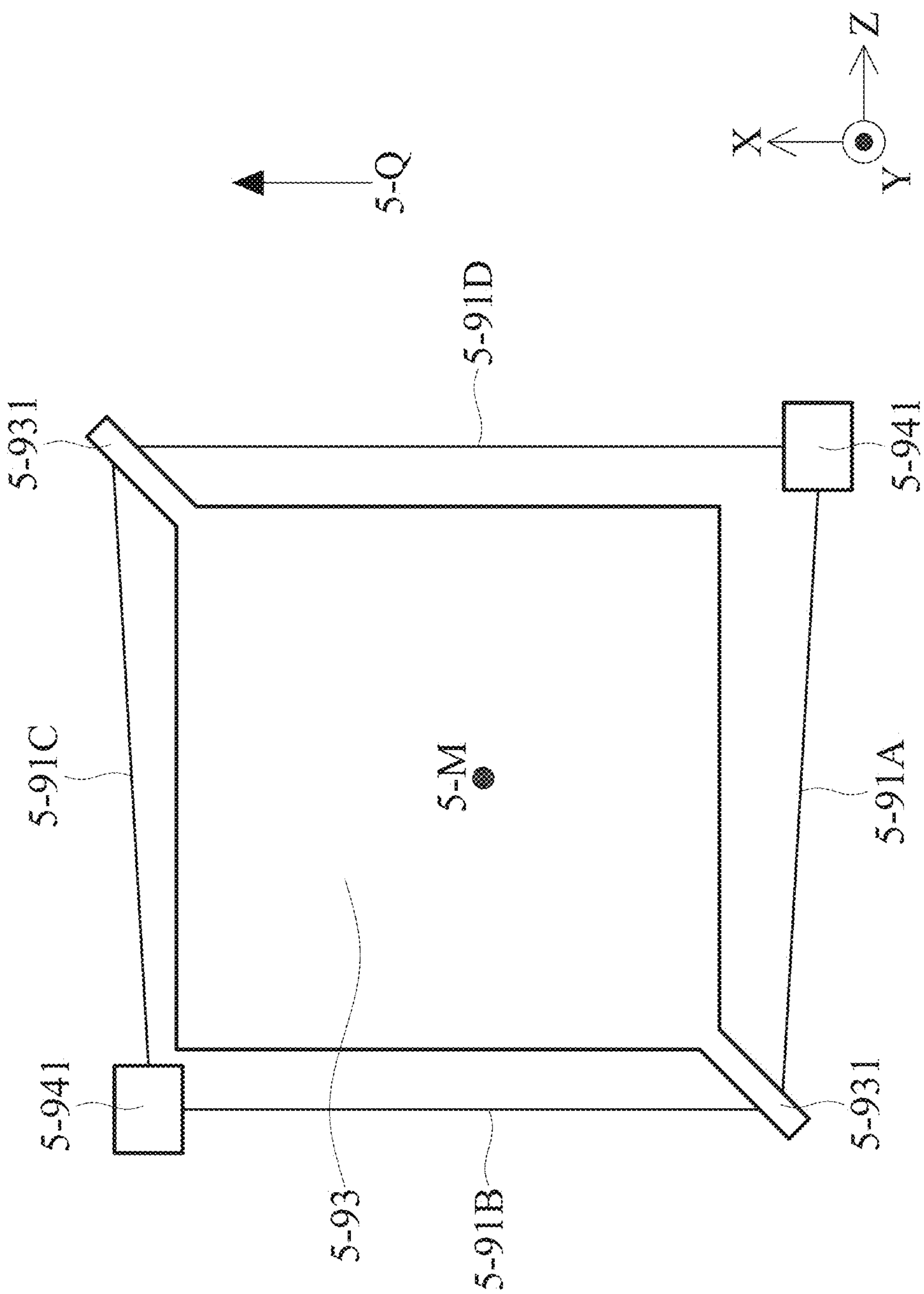
Figures 4, 5:
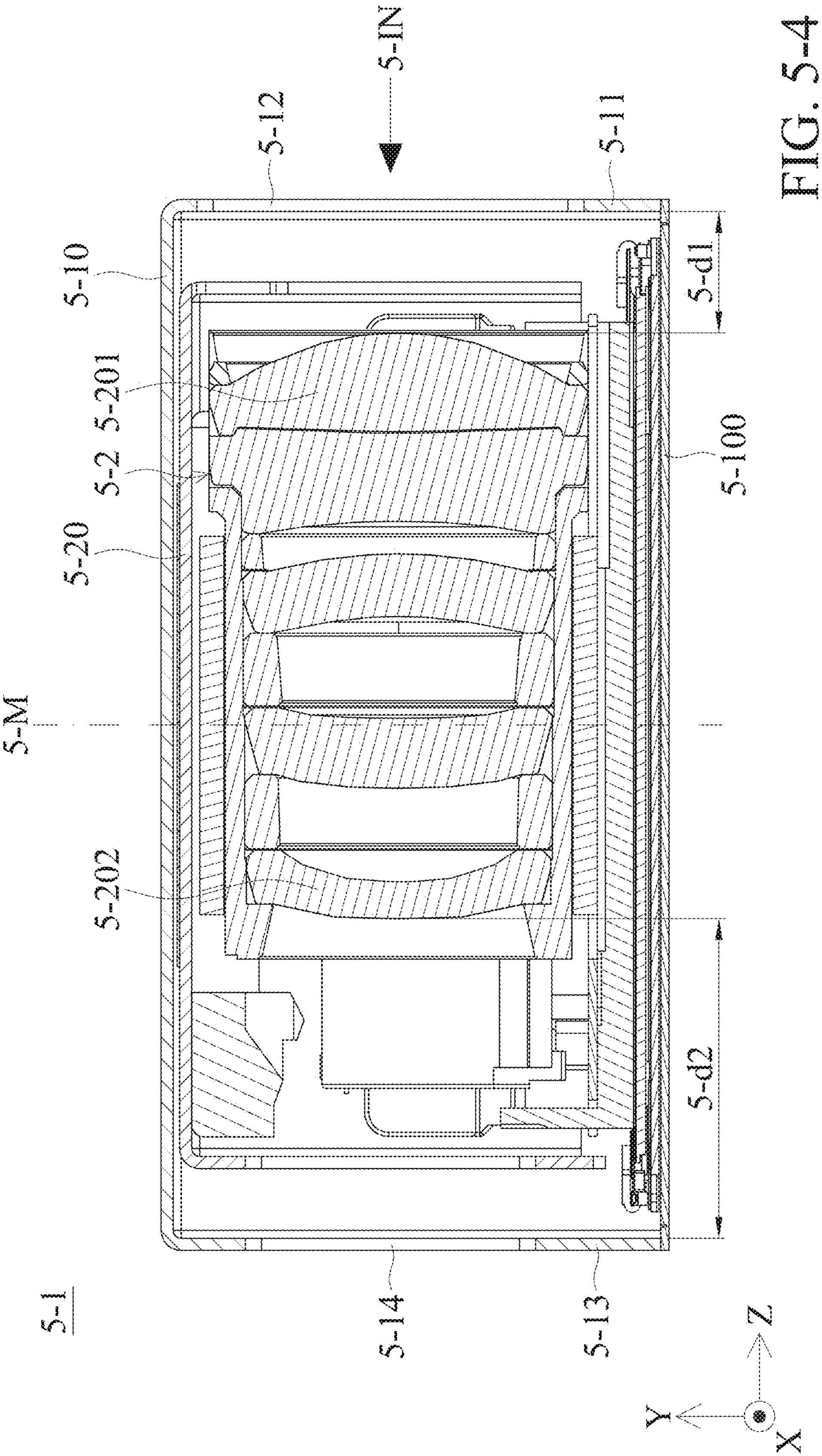
Figure 5:
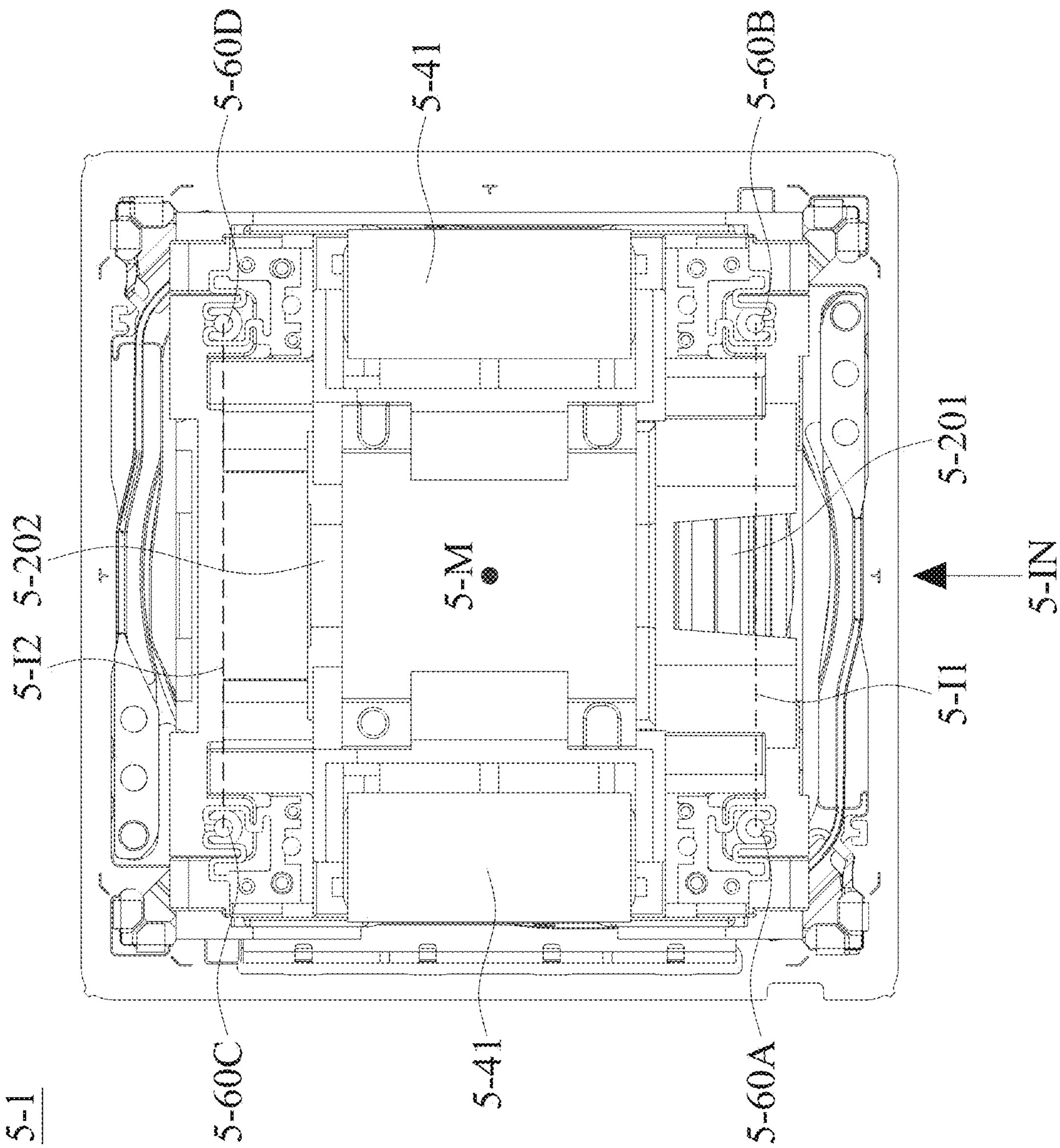
Figures 5, 6:
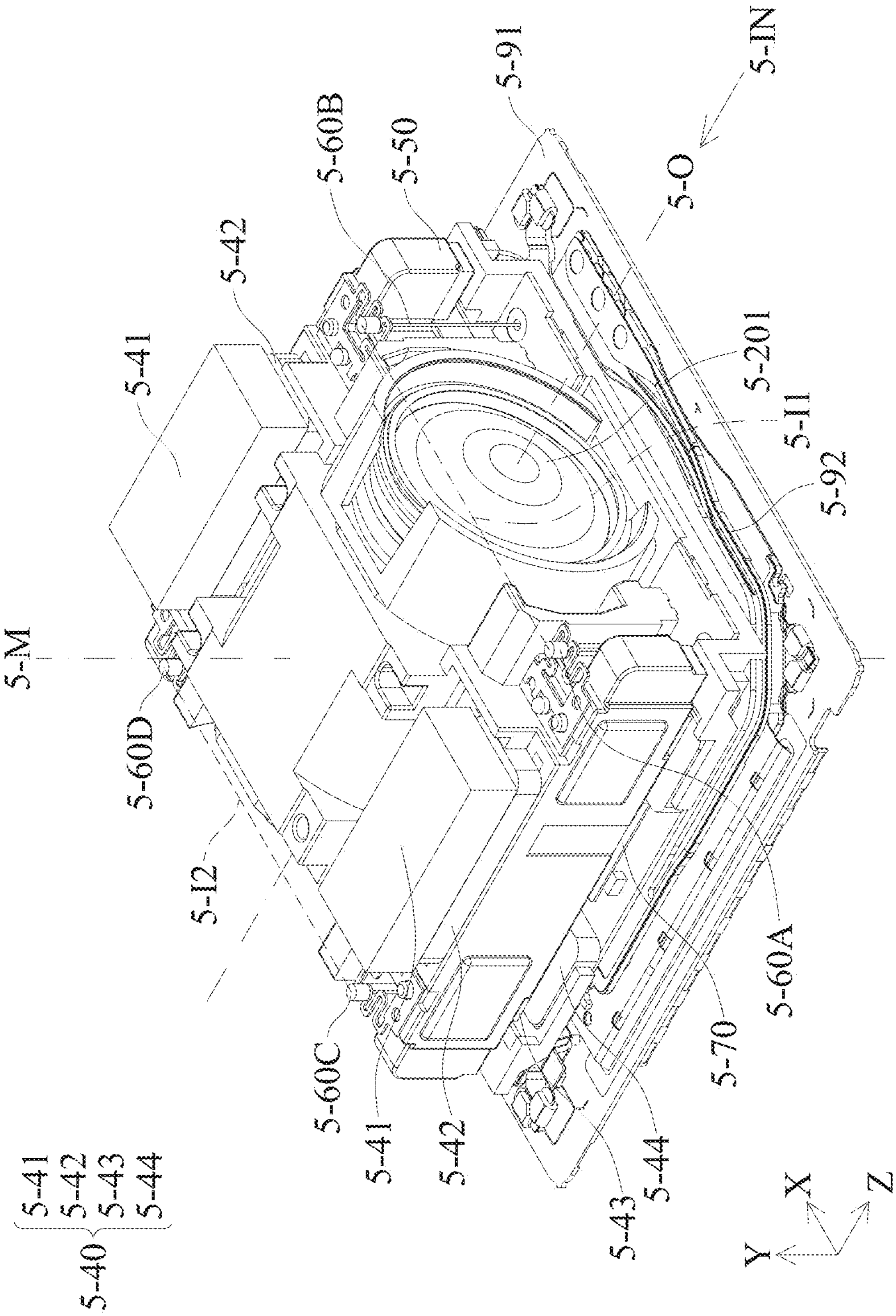
Figures 5, 6, 7:
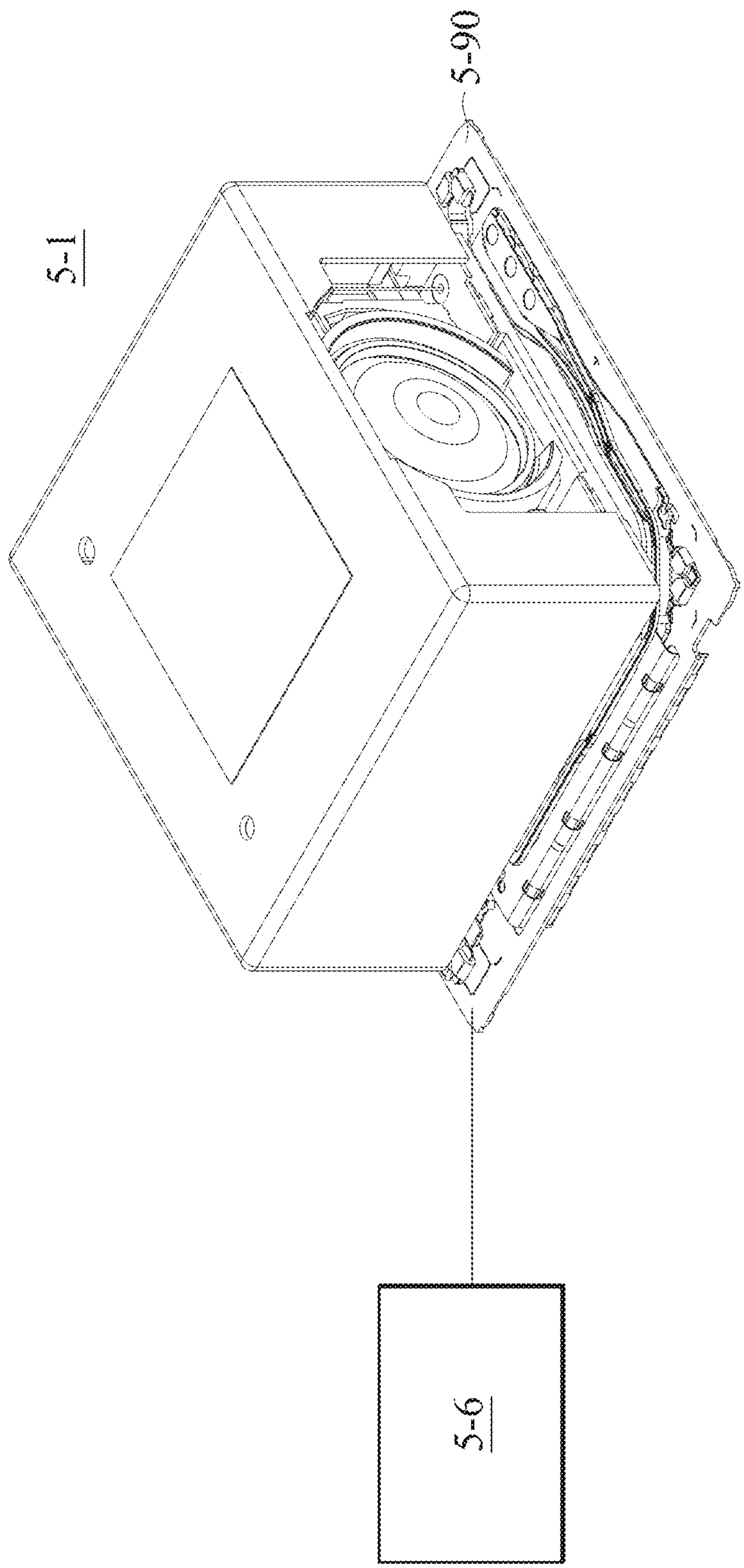
Figures 5, 6, 7, 8, 8A:
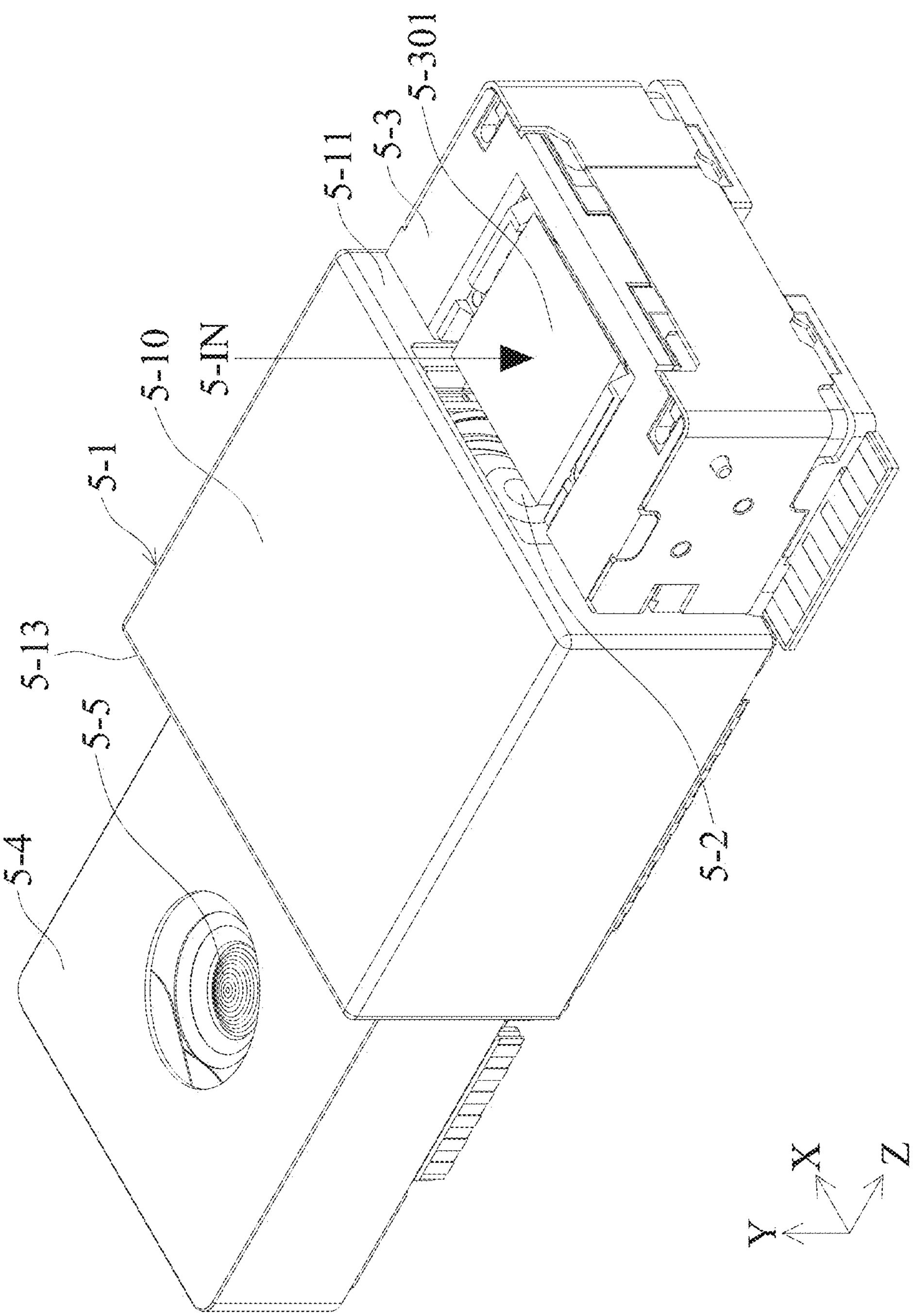
Figures 5, 6, 7, 8, 8B:
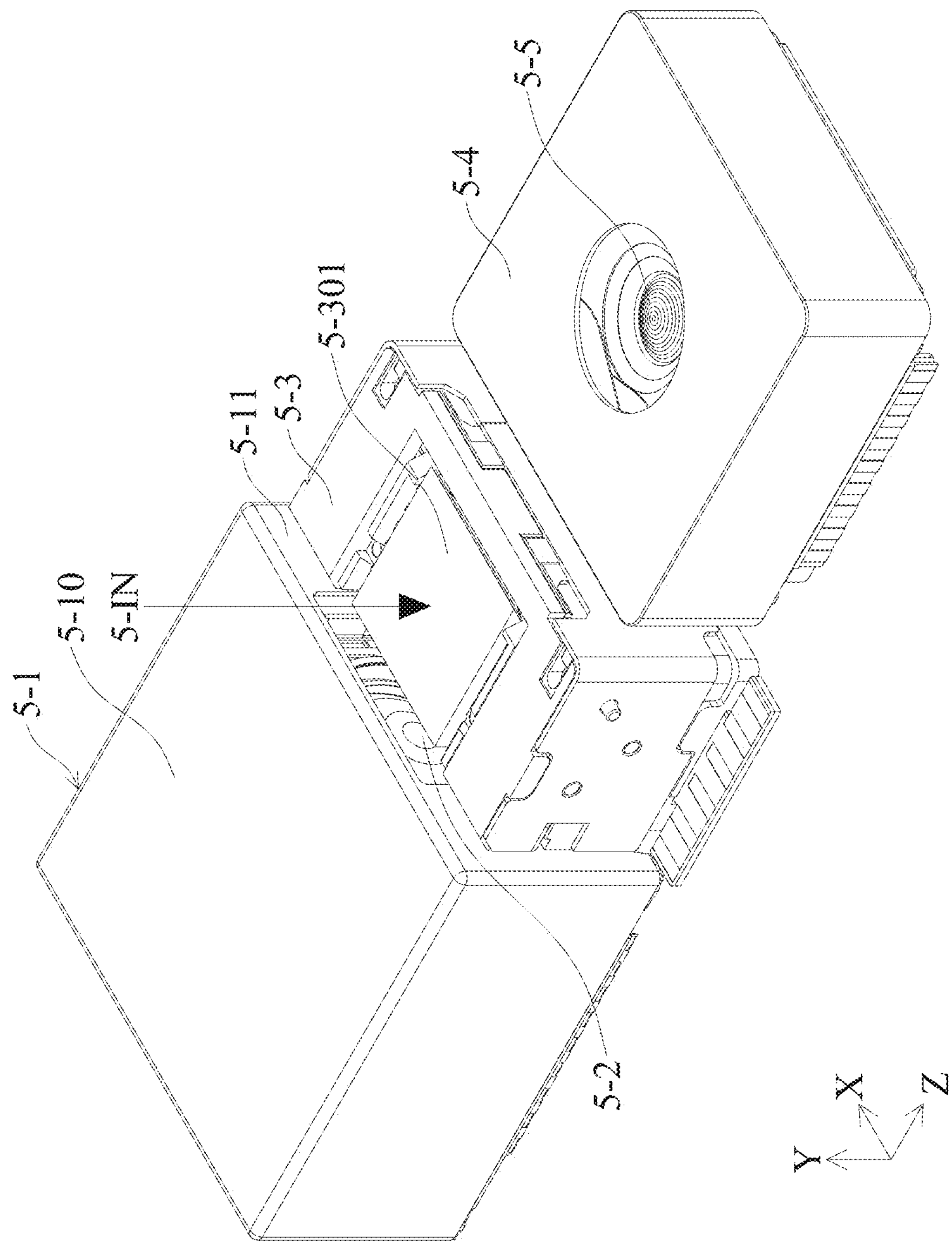
Figures 5, 6, 7, 8, 9:
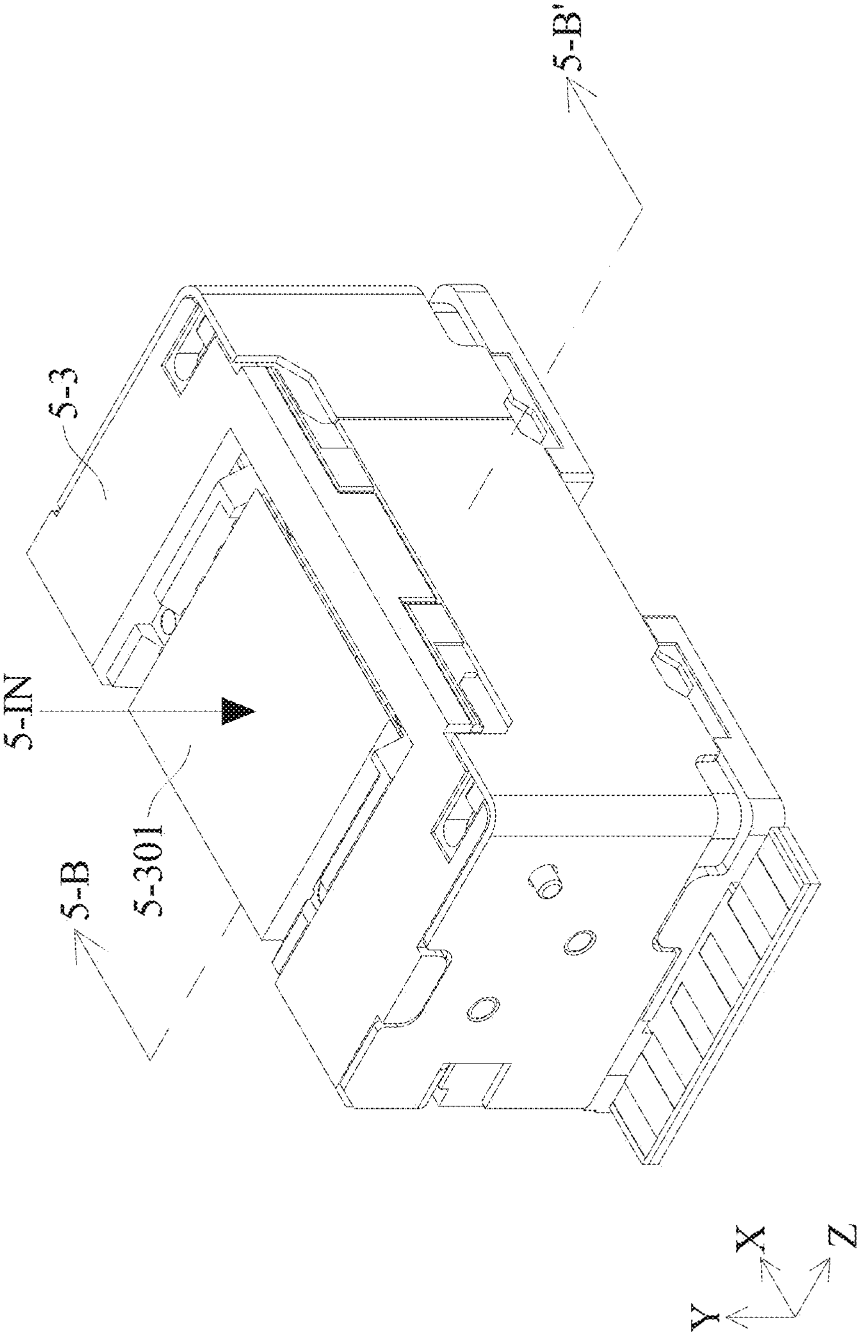
Figures 5, 6, 7, 8, 9, 10:
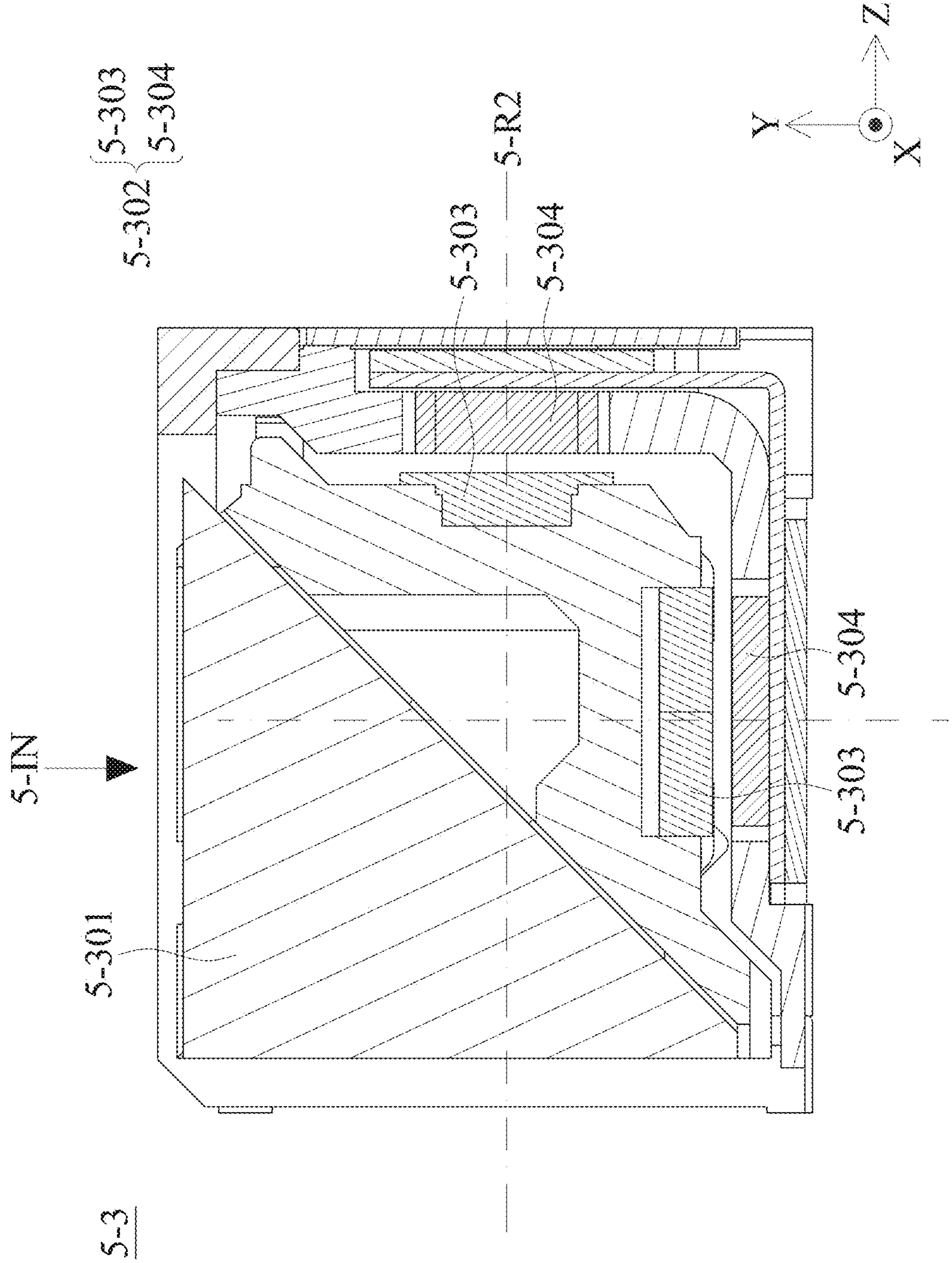
Figures 5, 6, 7, 8, 9, 10, 11:
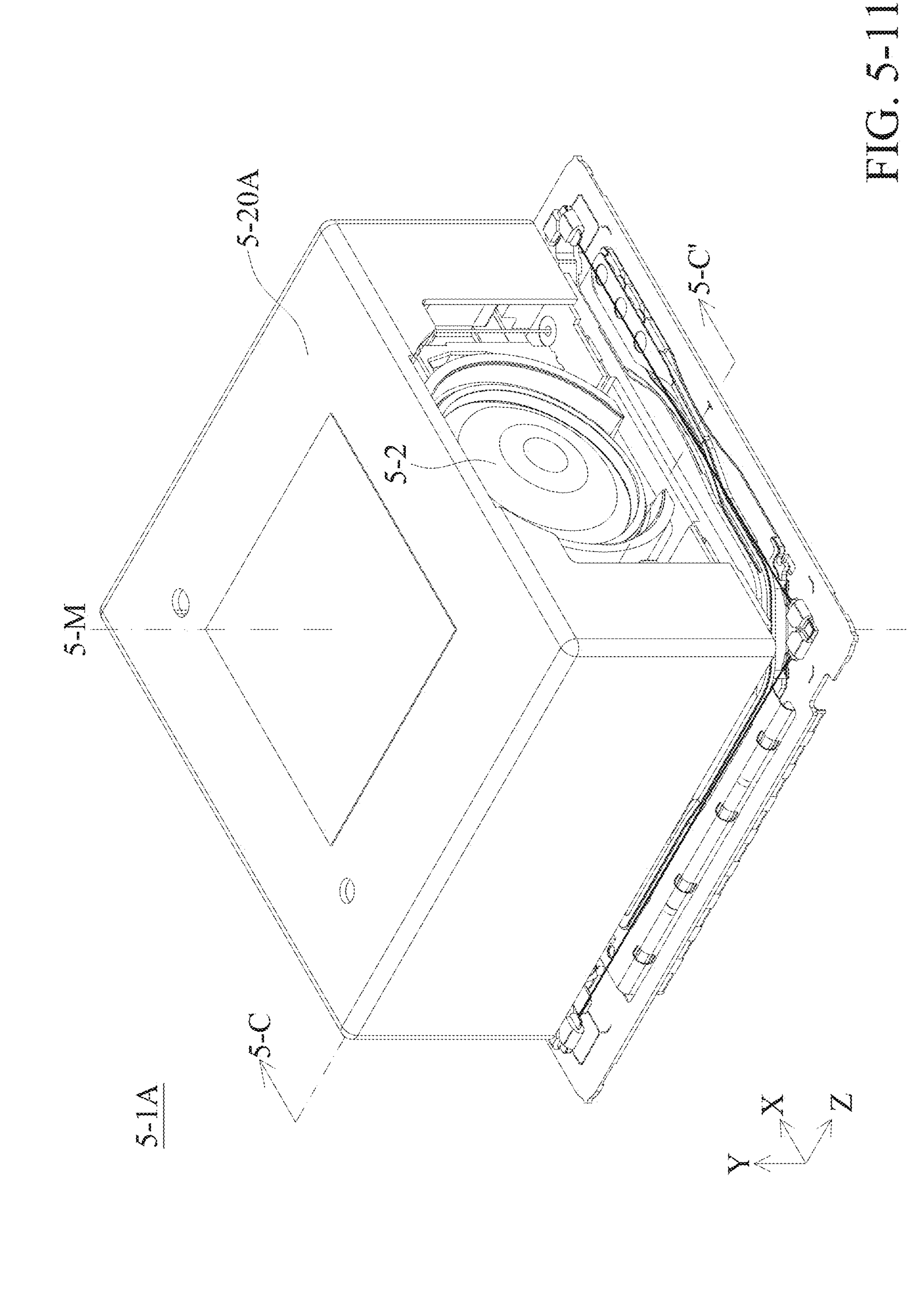

FIG. 11-1A is a schematic diagram, of an electronic device according to an embodiment of the disclosure;

FIG. 11-1B is an exploded-view diagram of a first optical module according to an embodiment of the disclosure;

FIG. 11-2A is a schematic diagram of an electronic device according to another embodiment of the disclosure;

FIG. 11-2B is a schematic diagram of a first optical module according to another embodiment of the disclosure;

FIG. 11-2C is a schematic diagram of a reflecting unit according to another embodiment of the disclosure;

FIG. 11-2D is a exploded-view diagram of the reflecting unit according to another embodiment of the disclosure;

FIG. 11-2E is a cross-sectional view along line 11-A-11-A' in FIG. 11-2C;

FIG. 11-2F is a side view of an optical member holder according to another embodiment of the disclosure;

FIG. 11-3A is a schematic diagram of a reflecting unit according to another embodiment of the disclosure;

FIG. 11-3B is a bottom view of the reflecting unit according to another embodiment of the disclosure;

FIG. 11-4A is a exploded-view diagram of a reflecting unit according to another embodiment of the disclosure;

FIG. 11-4B is a schematic diagram of the reflecting unit according to another embodiment of the disclosure;

FIG. 11-5A is a schematic diagram, of a reflecting unit according to another embodiment of the disclosure;

FIG. 11-5B is a front view of the reflecting unit according to another embodiment of the disclosure;

FIG. 11-6A is a schematic diagram of a reflecting unit according to another embodiment of the disclosure;

FIG. 11-6B is a cross-sectional view of the reflecting unit according to another embodiment of the disclosure;

FIG. 11-7A is a schematic diagram of an electronic device according to another embodiment of the disclosure;

FIG. 11-7B is a schematic diagram of an optical member in a first angle according to another embodiment of the disclosure;

FIG. 11-7C is a schematic diagram of the optical member in a second angle according to another embodiment of the disclosure;

FIG. 11-7D is a schematic diagram of a reflecting unit according to another embodiment of the disclosure;

FIG. 11-7E is a front view of the reflecting unit according to another embodiment of the disclosure;

FIG. 11-8A is a schematic diagram of an optical member in a first angle according to another embodiment of the disclosure;

FIG. 11-8B is a schematic diagram of the optical member in a second angle according to another embodiment of the disclosure;

FIG. 11-9A is a schematic diagram of an electronic device according to another embodiment of the disclosure;

FIG. 11-9B is a schematic diagram of a first optical module, a third optical module, and a reflecting unit according to another embodiment of the disclosure; and FIG. 11-10 is a schematic diagram of a lens unit according to some embodiments of the disclosure.

Figures 5, 6, 7, 8, 9, 10, 11, 12:
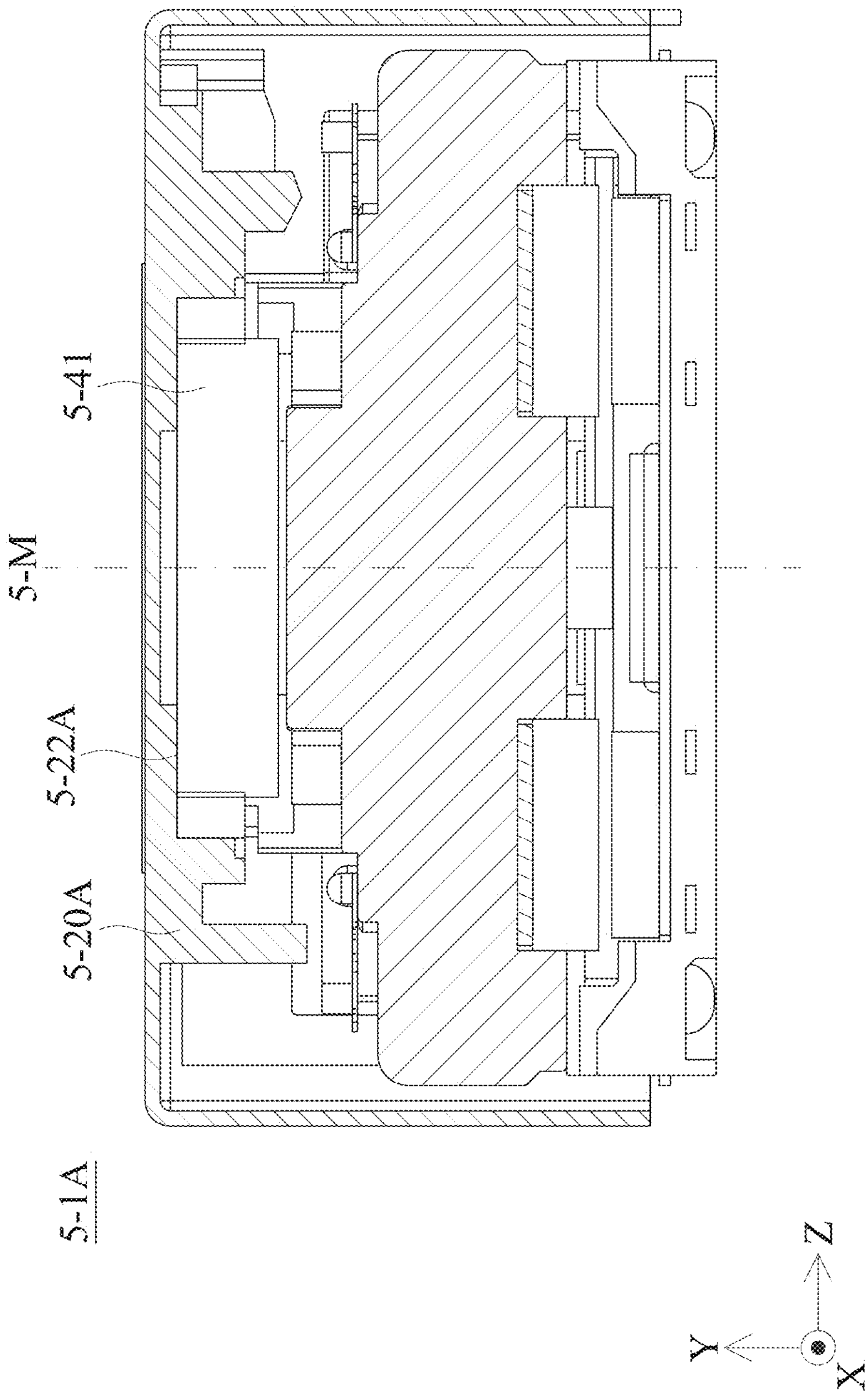
Figures 1, 6:
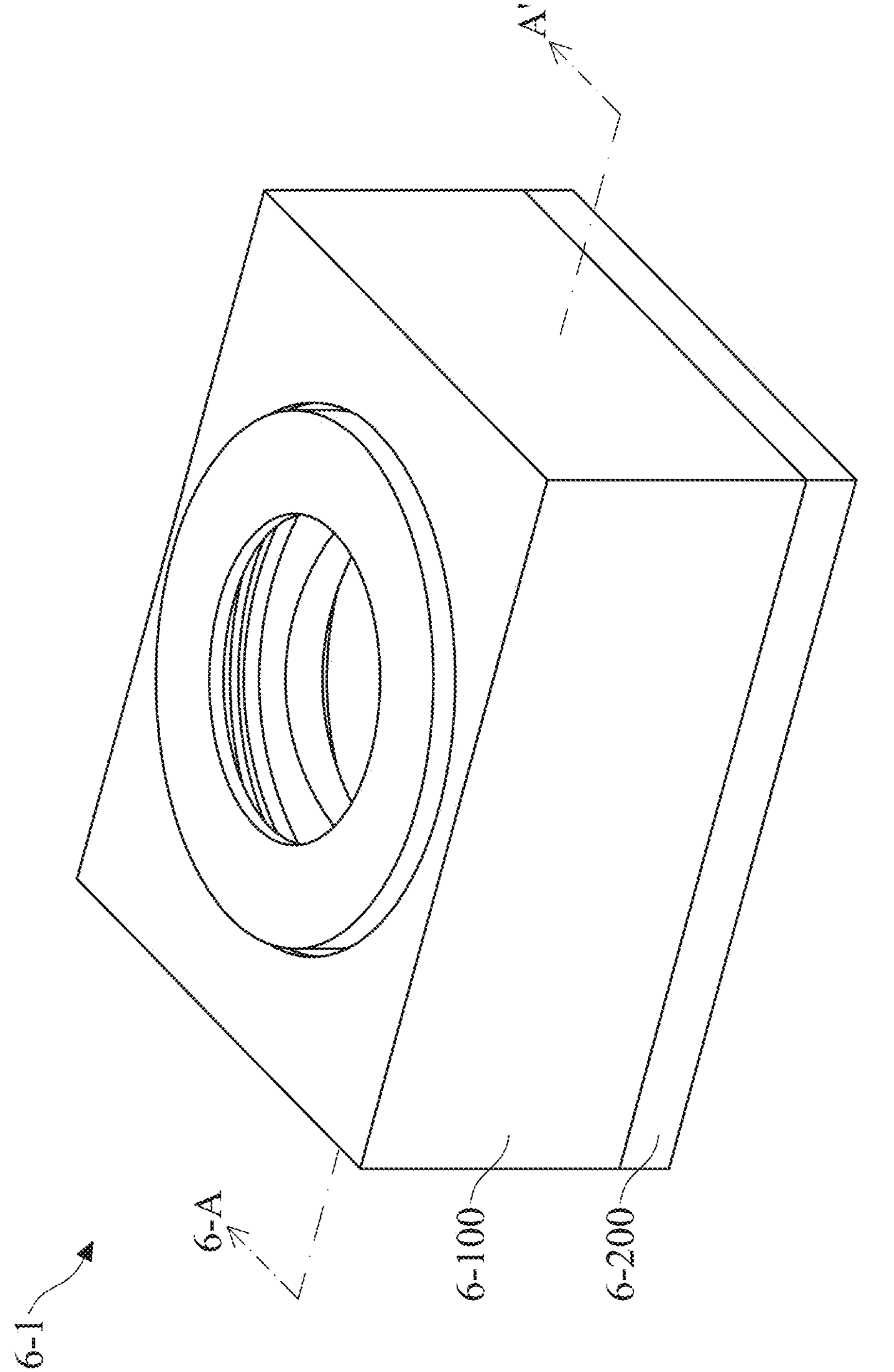
Figures 2A, 6:
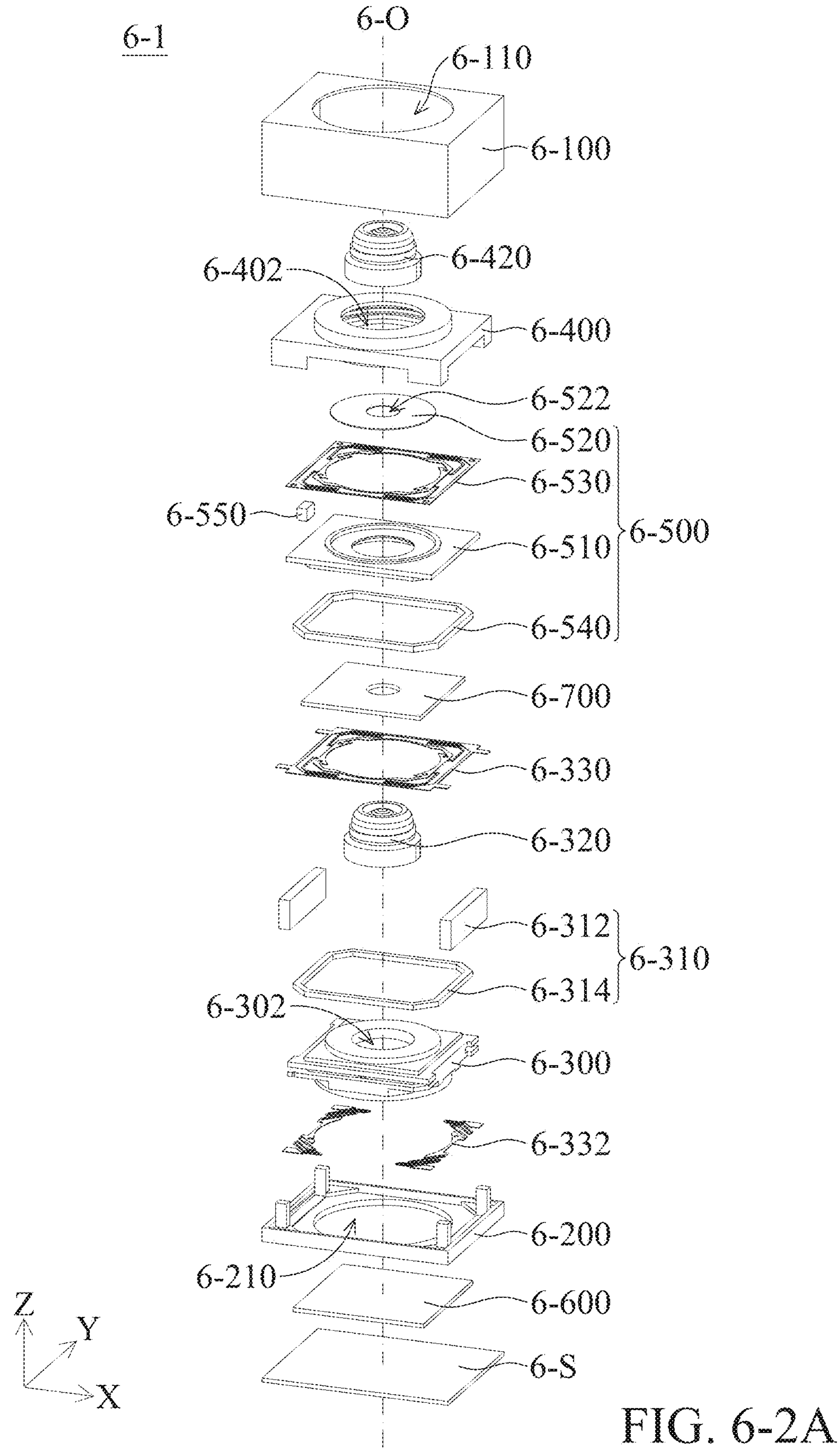
Figures 2B, 6:
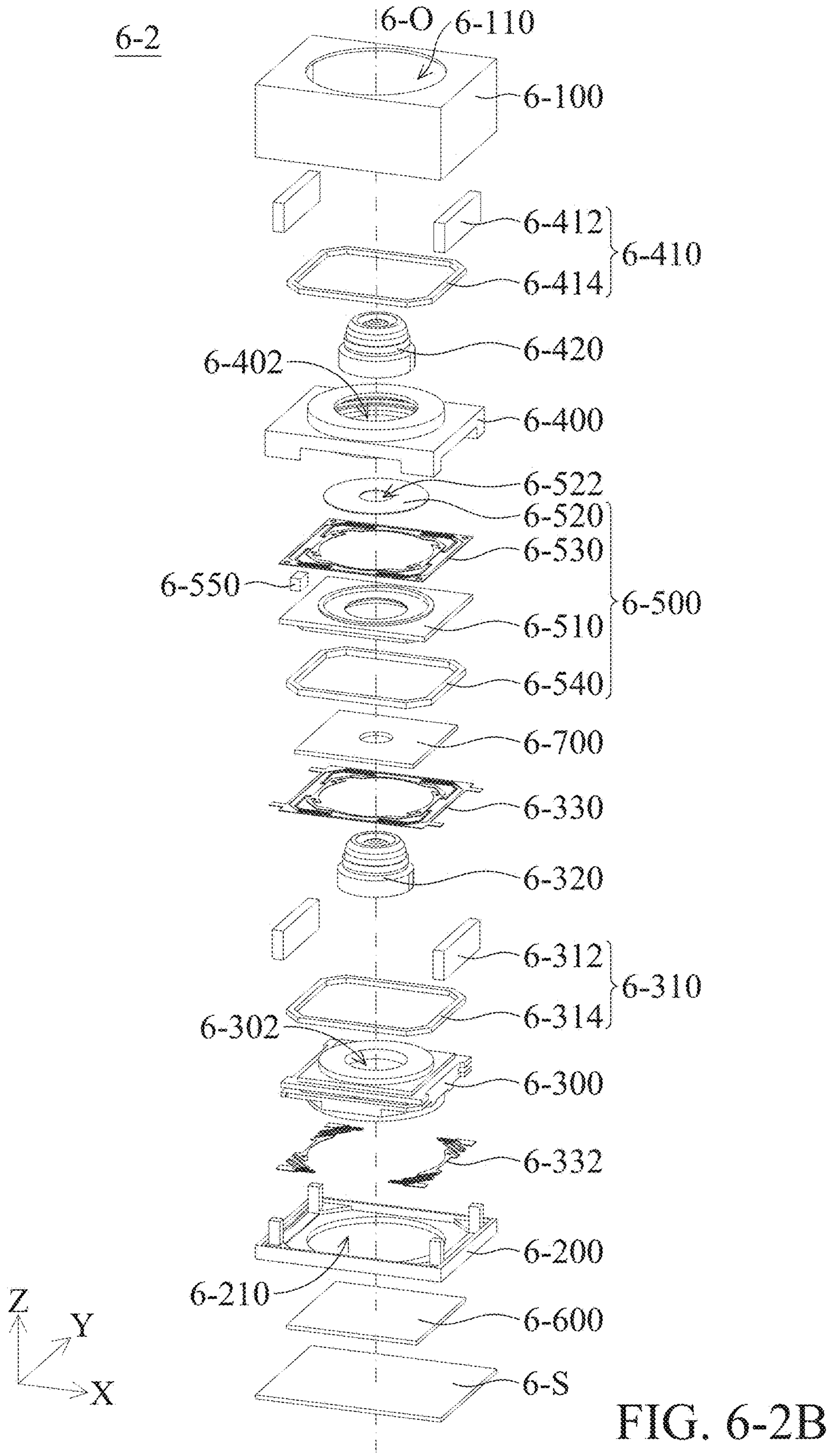
Figures 3, 6:
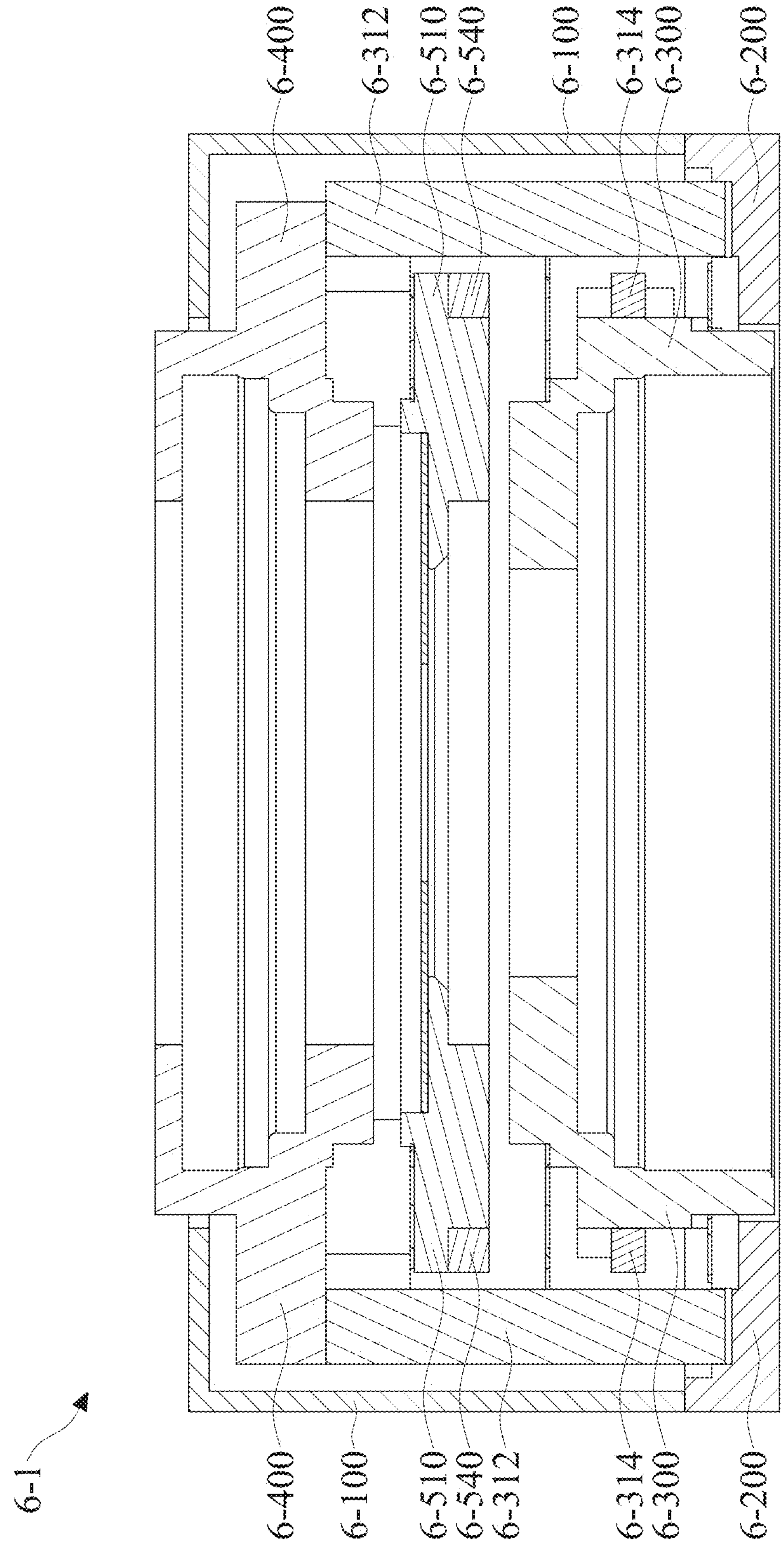
Figures 4, 6:
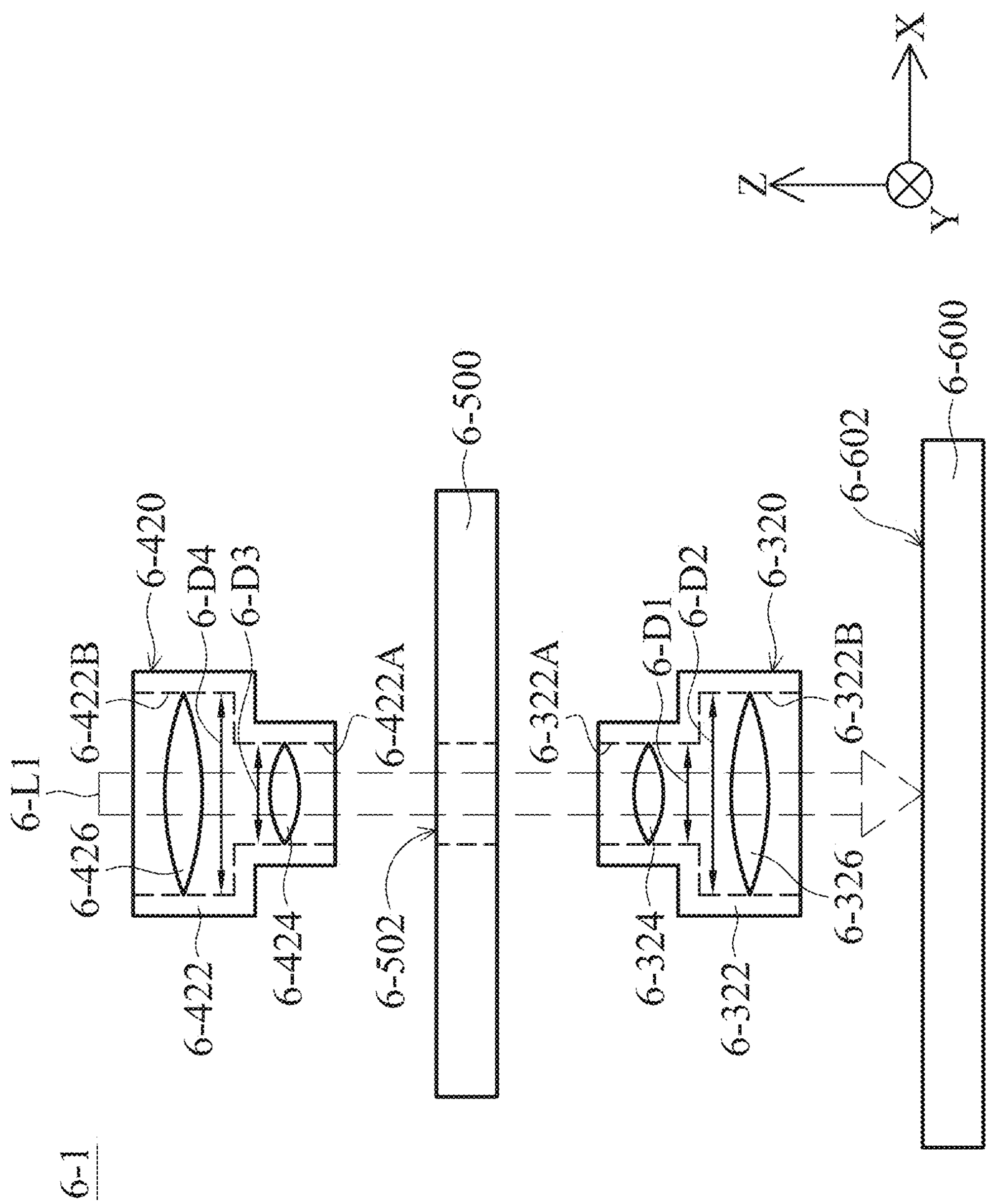
Figures 5, 6:
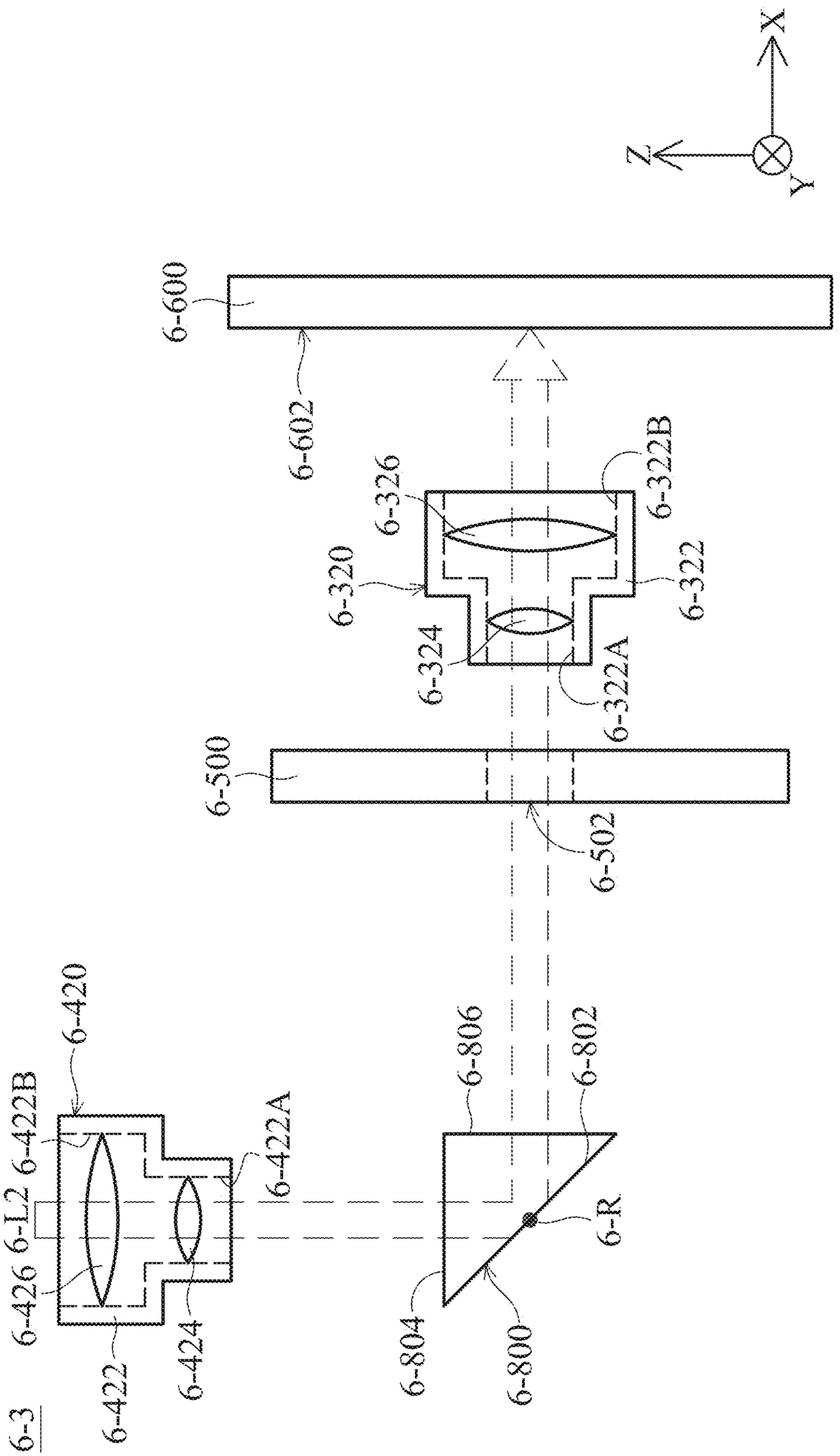
Figure 6:
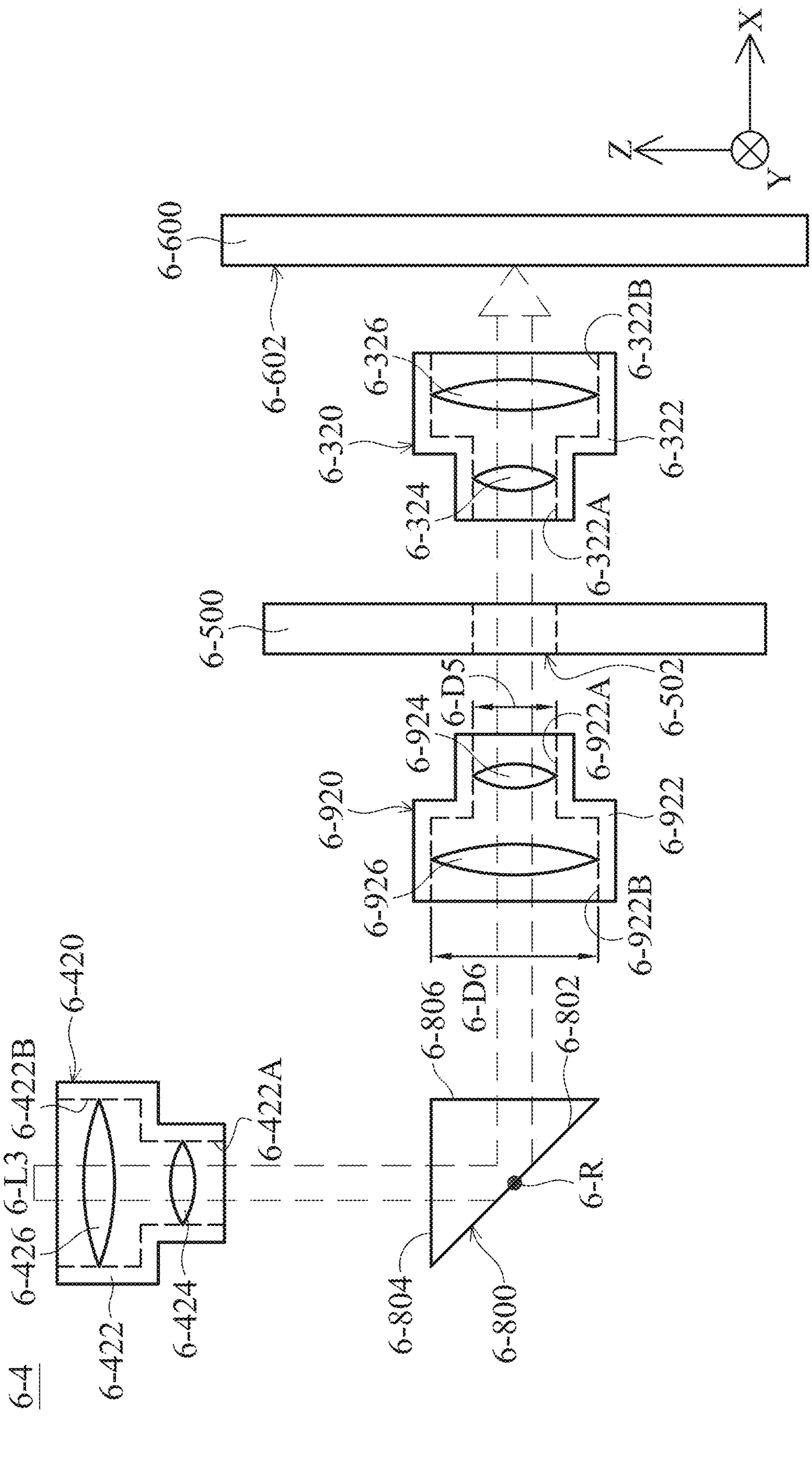
Figures 6, 7:
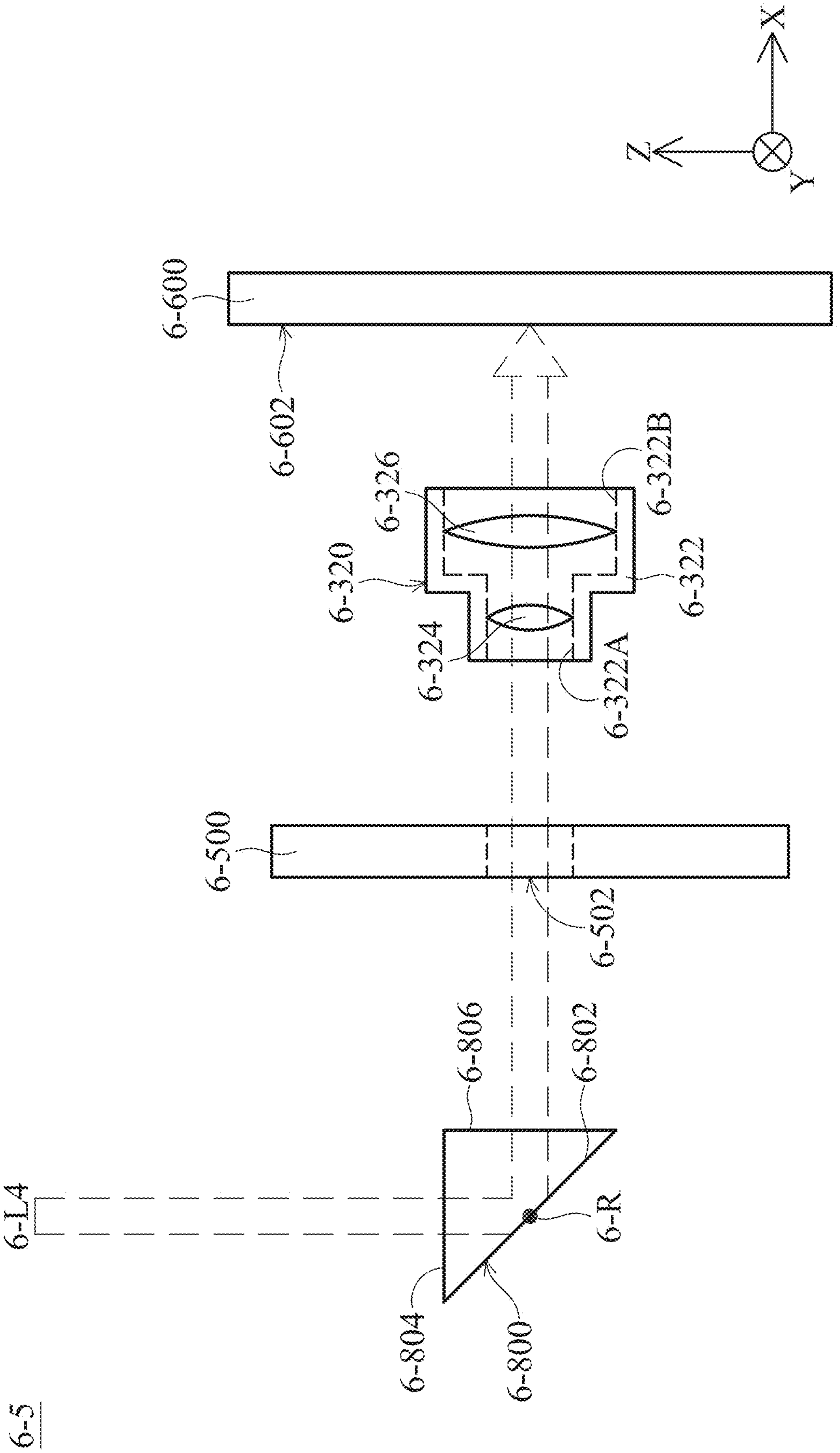
Figures 6, 7, 8:
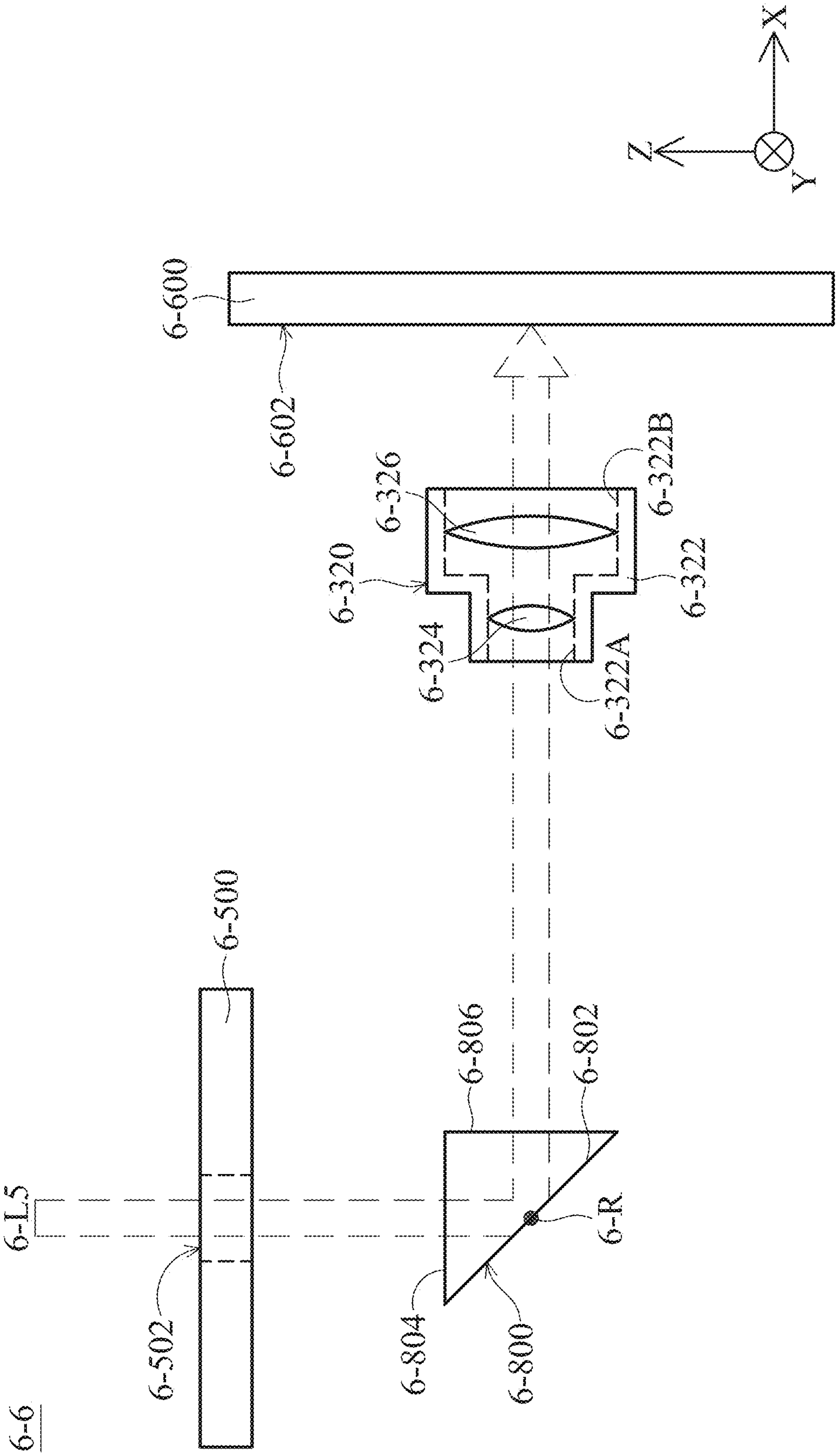

FIG. 12-1 is a schematic diagram of an electronic device according to an embodiment of the disclosure;

FIG. 12-2 is a schematic diagram of an optical system according to an embodiment of the disclosure;

FIG. 12-3 is a schematic diagram of a first optical module according to an embodiment of the disclosure;

FIG. 12-4 is an exploded-view diagram of a lens unit according to an embodiment of the disclosure;

FIG. 12-5 is a schematic diagram of a reflecting unit according to an embodiment of the disclosure;

FIG. 12-6 is an exploded-view diagram of the reflecting unit according to an embodiment of the disclosure;

FIG. 12-7 is a top view of the lens unit and the reflecting unit according to an embodiment of the disclosure;

FIG. 12-8 is an exploded-view diagram of a second optical module according to an embodiment of the disclosure;

FIG. 12-9 is a cross-sectional view along line 12-A-12-A' in FIG. 12-2;

FIG. 12-10 is a schematic diagram of an optical system according to another embodiment of the disclosure;

FIG. 12-11 is a schematic diagram of a first optical module according to another embodiment of the disclosure; and FIG. 12-12 is a schematic diagram of the first optical module according to another embodiment of the disclosure, wherein a dust-proof plate and a first fixing component are omitted.

Figures 1, 13:
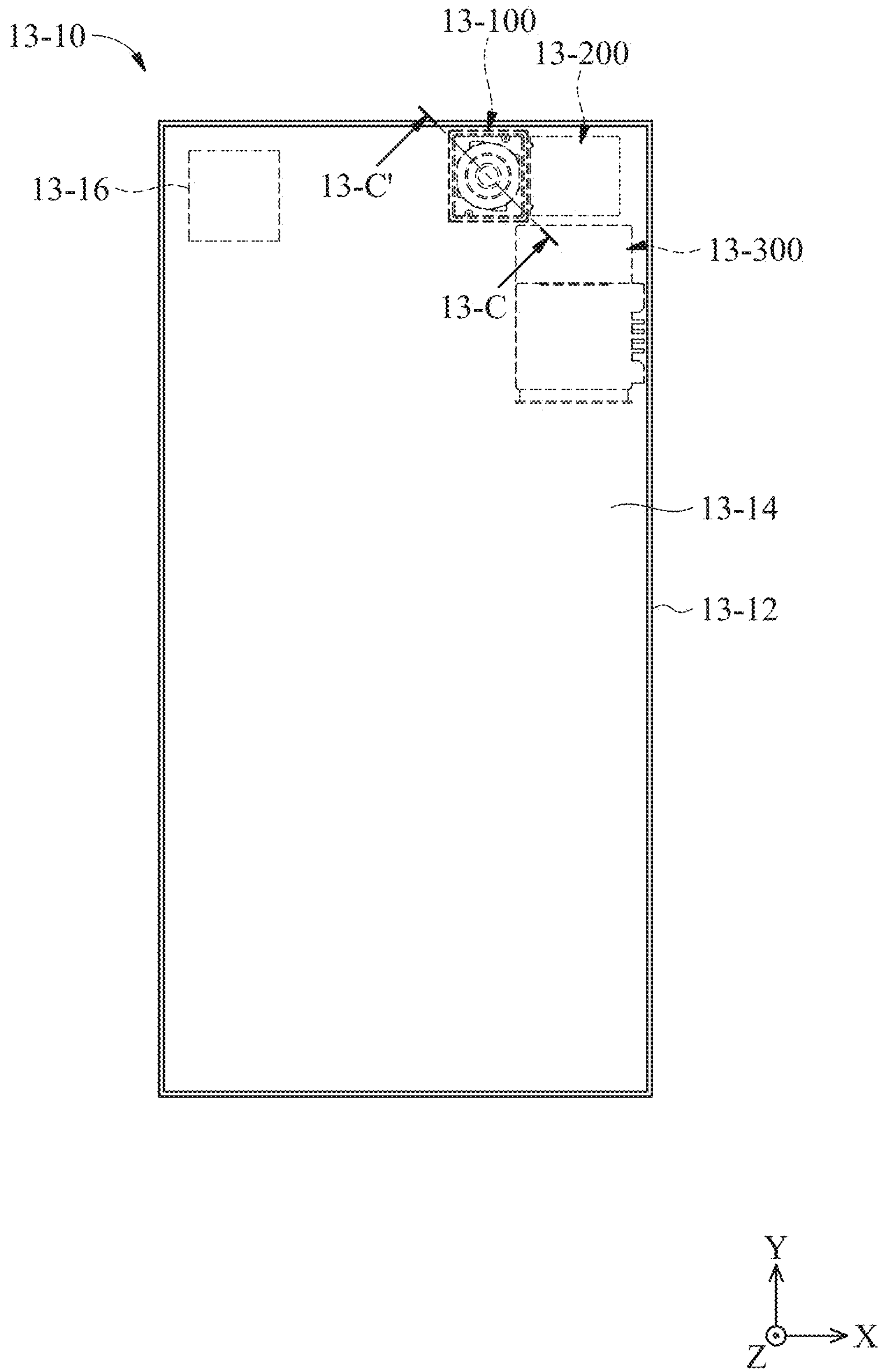
Figures 2, 13:
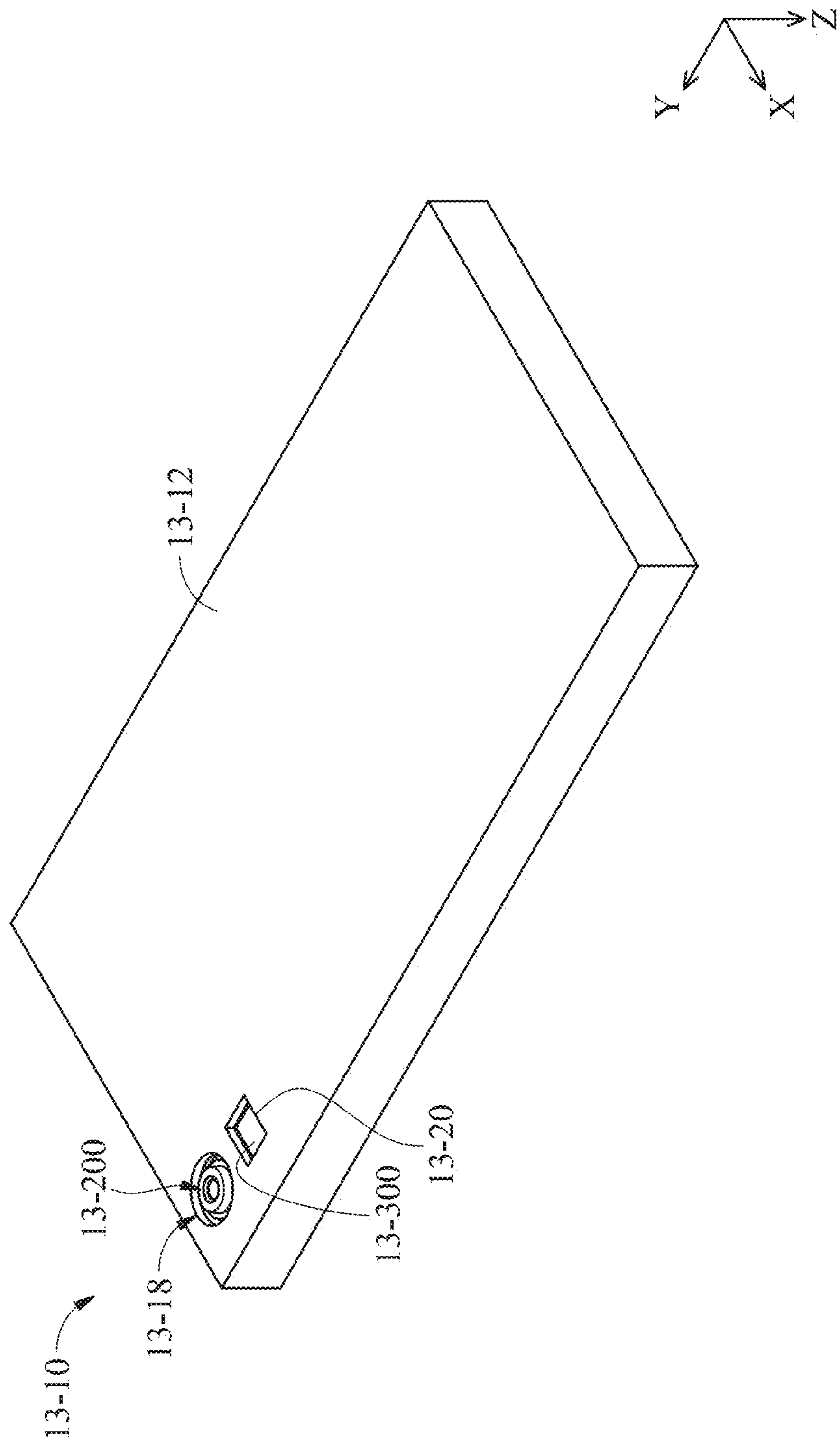
Figures 3, 13:
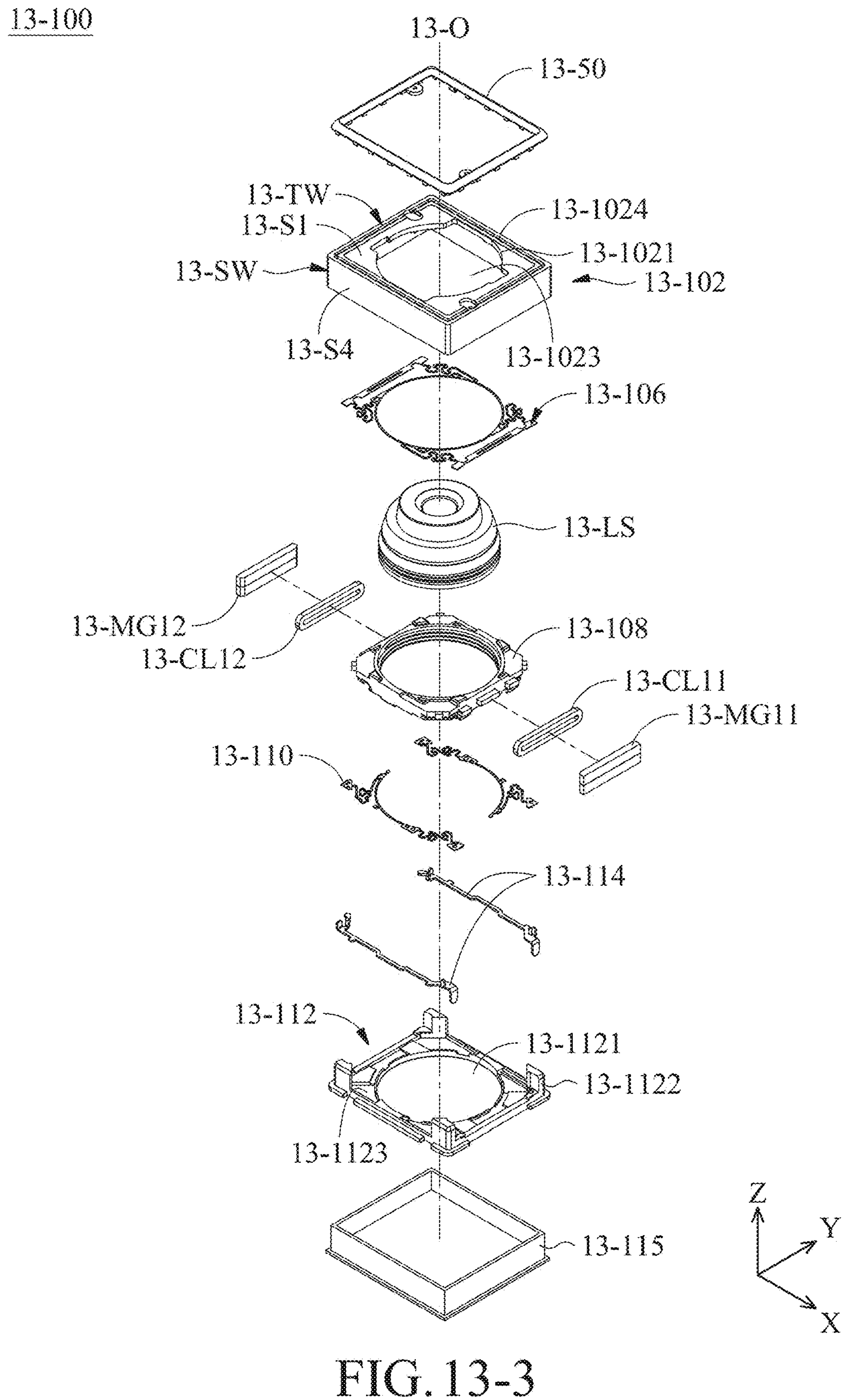
Figures 4, 13:
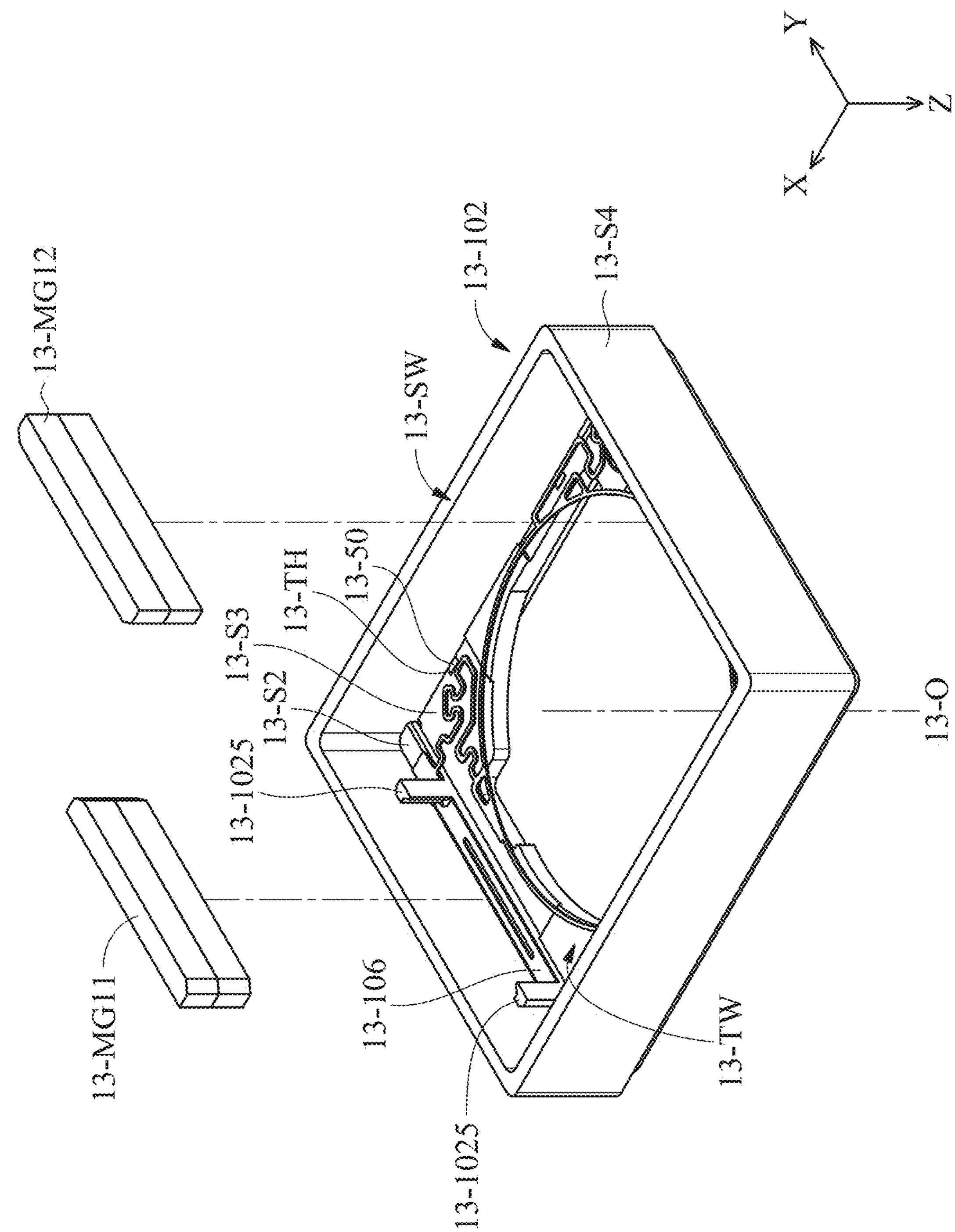
Figures 4A, 13:
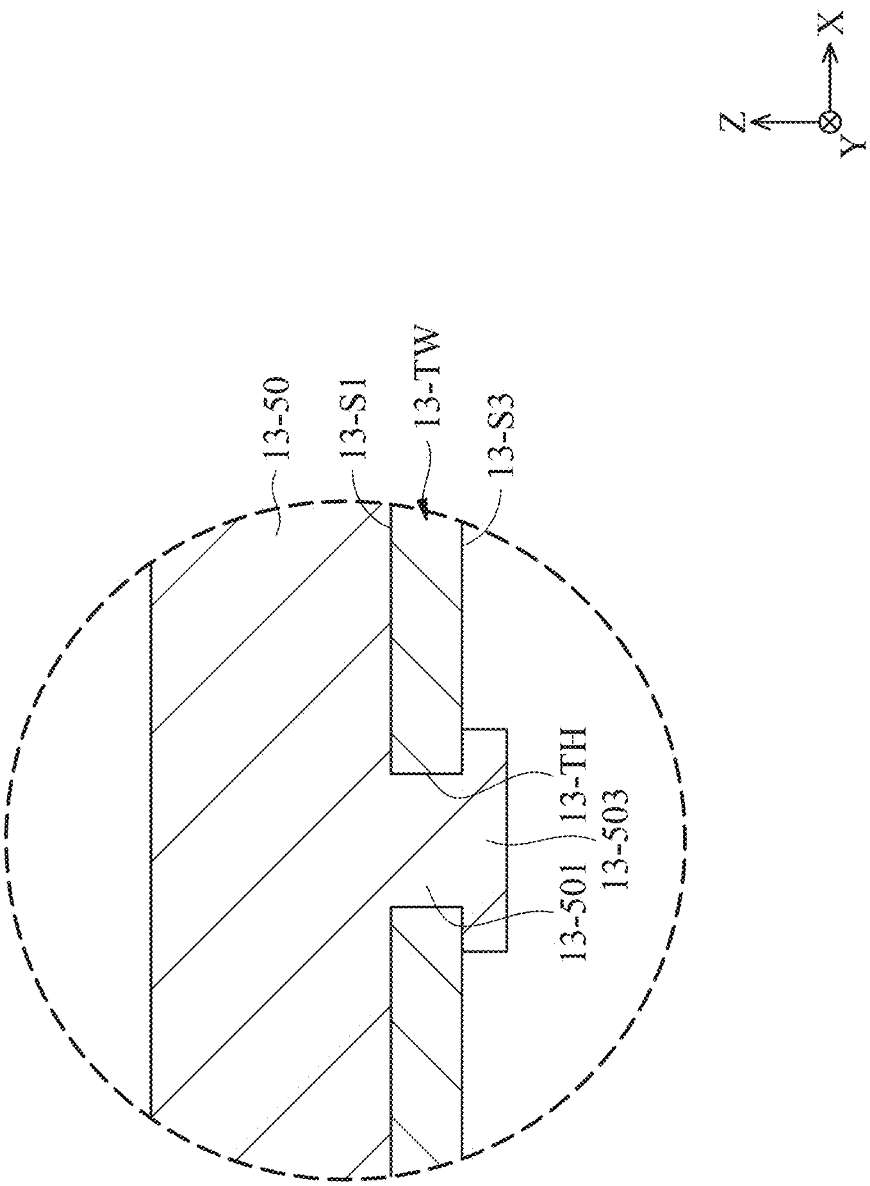
Figures 5, 13:
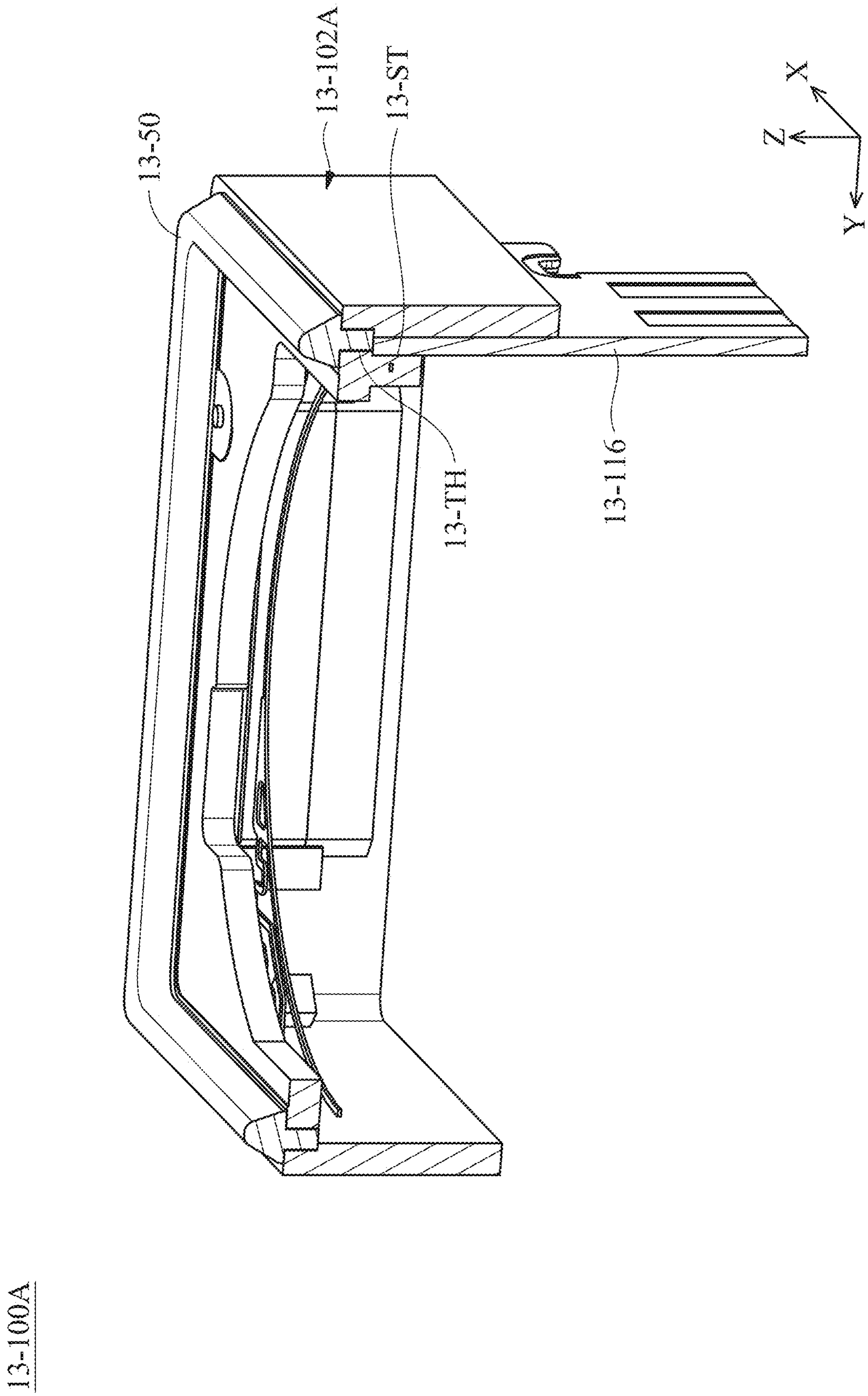
Figures 6, 13:
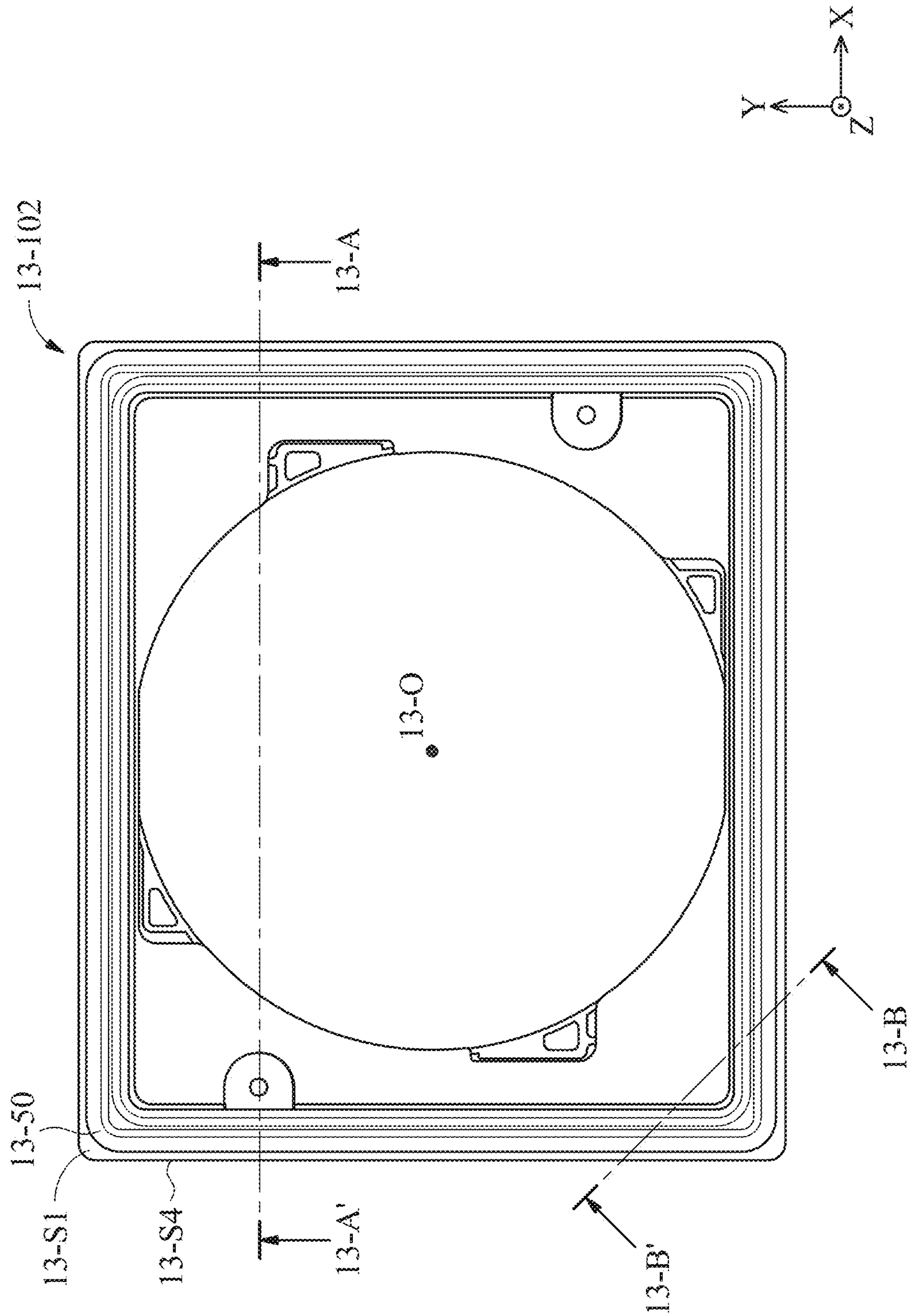
Figures 7, 13:
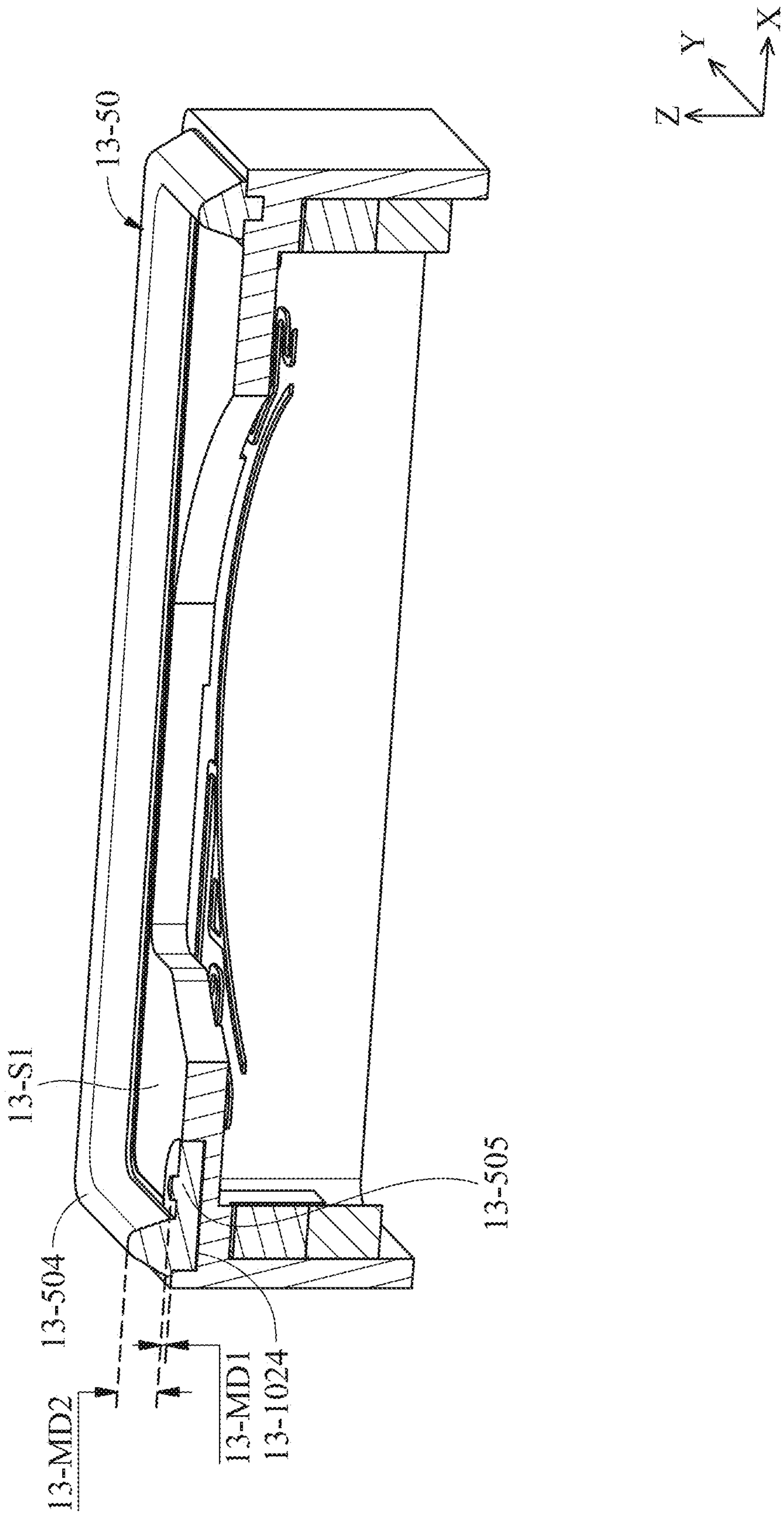
Figures 8, 13:
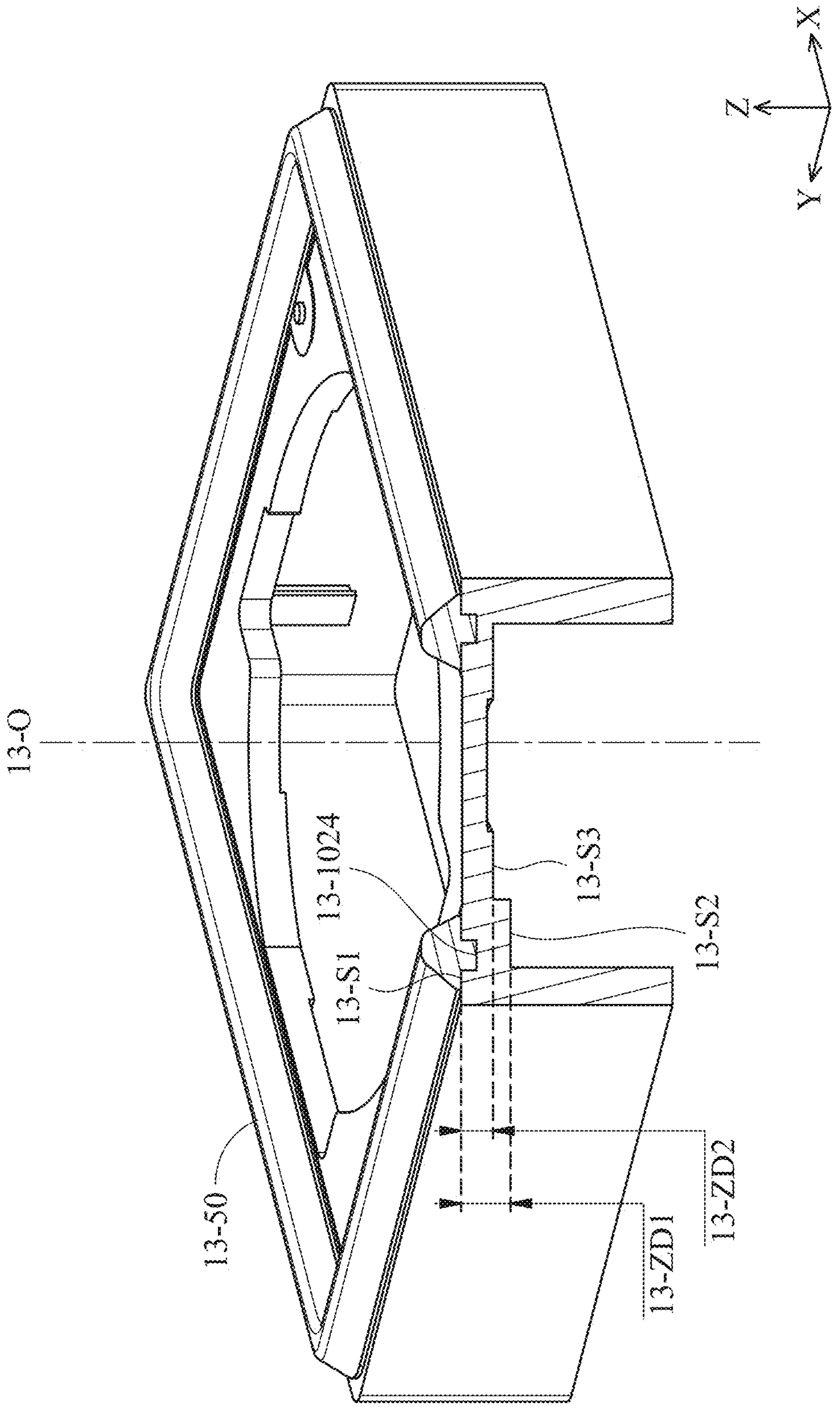
Figures 9, 13:
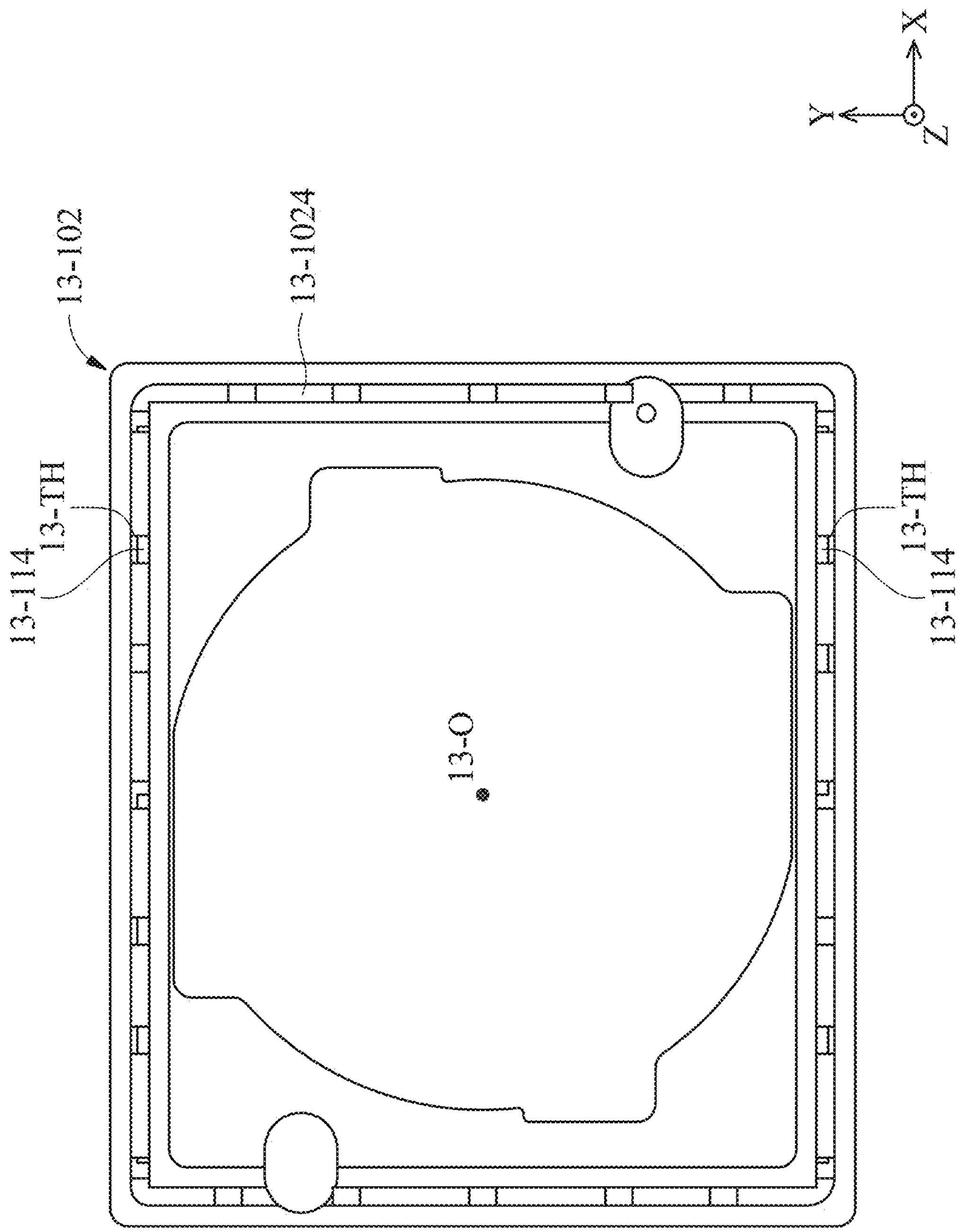
Figures 10, 13:
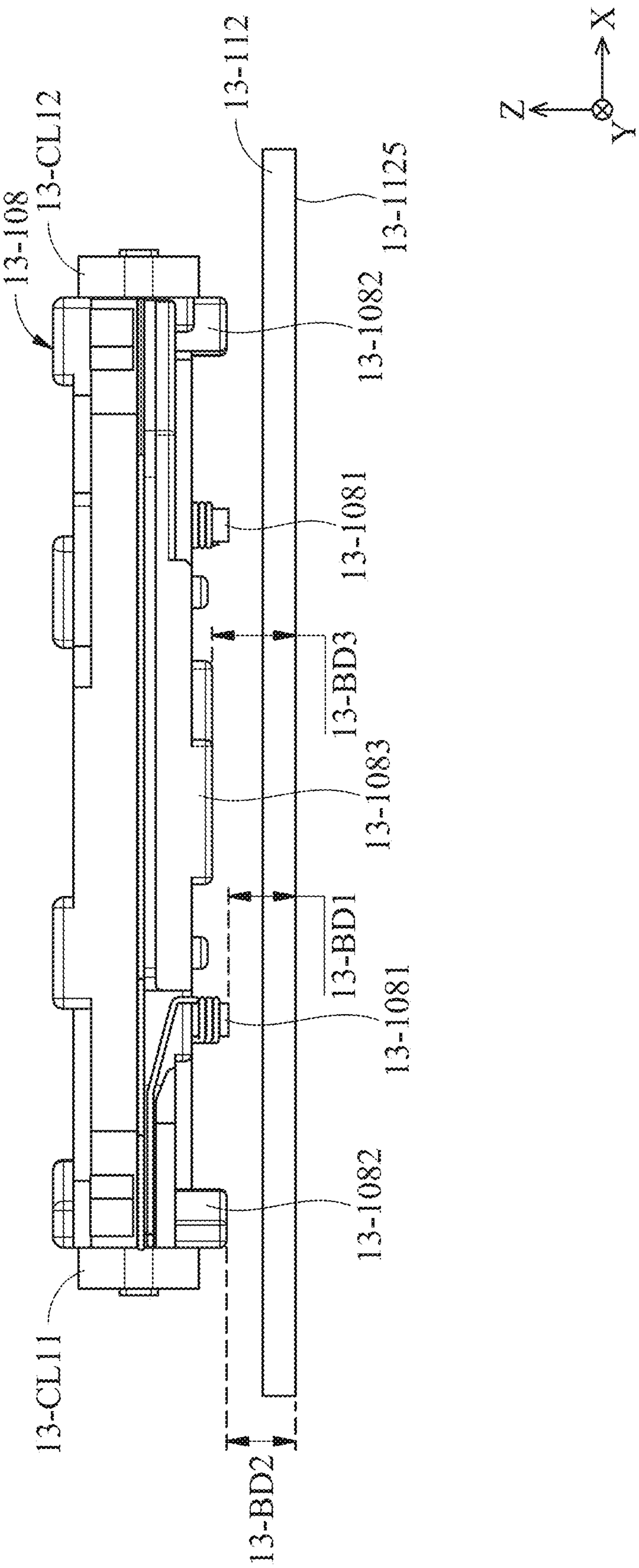
Figures 11, 13:
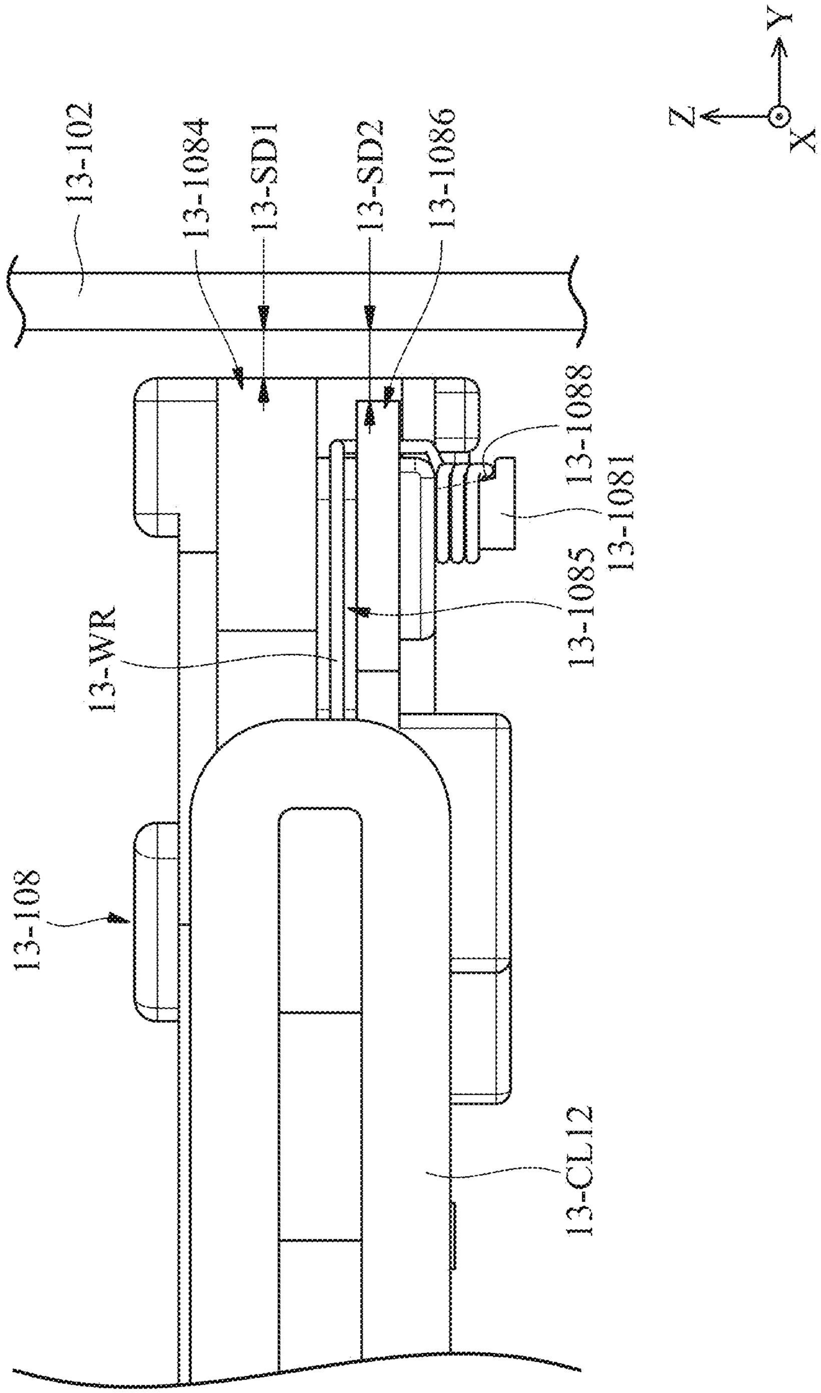
Figures 12, 13:
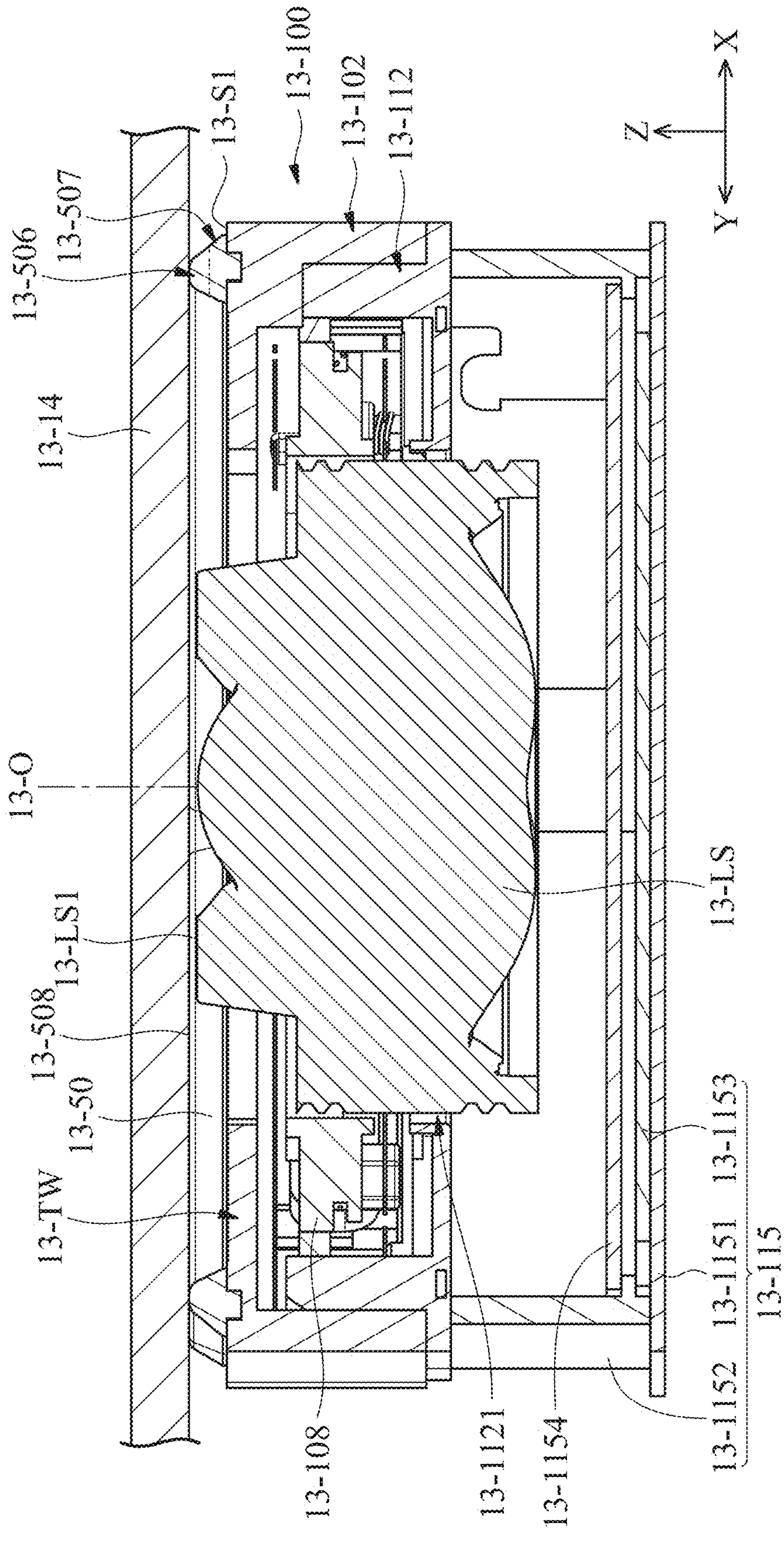

FIG. 13-1 is a top view of an electronic device according to an embodiment of the present disclosure.

FIG. 13-2 is a schematic diagram of the electronic device according to this embodiment of the present disclosure.

FIG. 13-3 is an exploded diagram of the optical module according to the embodiment in FIG. 13-1 of the present disclosure.

FIG. 13-4 is a schematic diagram of the first magnet, the second magnet, the first elastic member and the outer frame in another view according to an embodiment of the present disclosure.

FIG. 13-4A is a cross-sectional view of a partial structure of the top wall and the buffering member according to another embodiment of the present disclosure.

FIG. 13-5 is a cross-sectional view of a partial structure of an optical module according to another embodiment of the present disclosure.

FIG. 13-6 is a top view of FIG. 13-4 along the Z-axis direction according to the embodiment of the present disclosure.

FIG. 13-7 is a cross-sectional views along the line 13-A-13-A') in FIG. 13-6 according to the embodiment of the present disclosure.

FIG. 13-8 is a cross-sectional view along the line 13-B-13-B' in FIG. 13-6 according to the embodiment of the present disclosure.

FIG. 13-9 is a top view of the outer frame and the circuit members according to an embodiment of the present disclosure.

FIG. 13-10 is a diagram of the lens holder and the base according to an embodiment of the present disclosure.

FIG. 13-11 is a partial structural diagram of the lens holder and the outer frame according to an embodiment of the present disclosure.

FIG. 13-12 is a cross-sectional view along the line 13-C-13-C' in FIG. 13-1 according to the embodiment of the present disclosure.

Figures 1, 14:
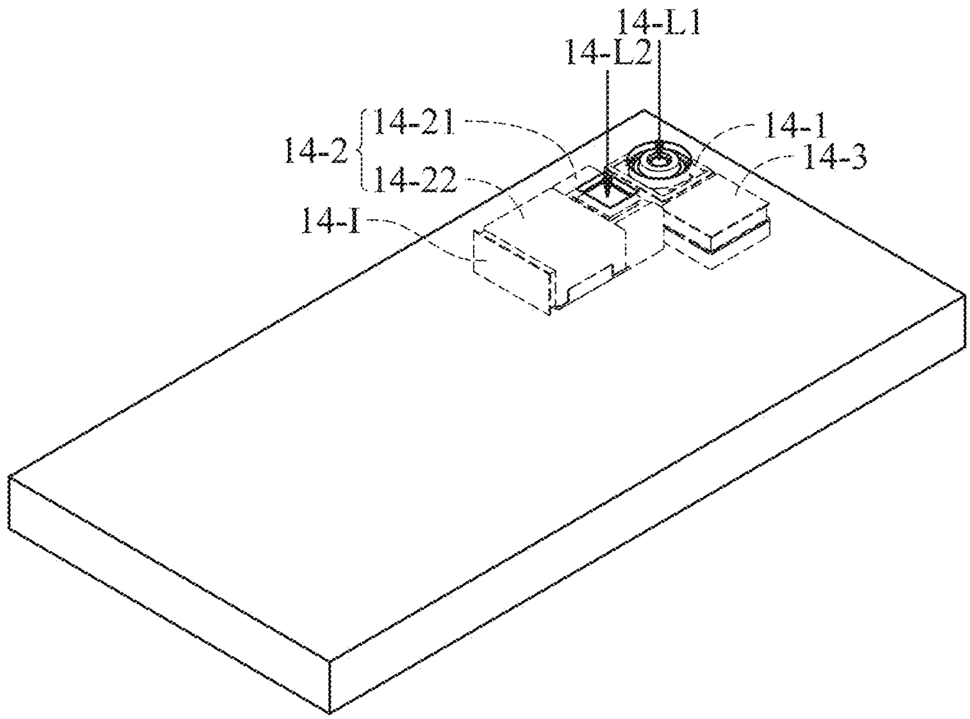
Figures 2, 14:
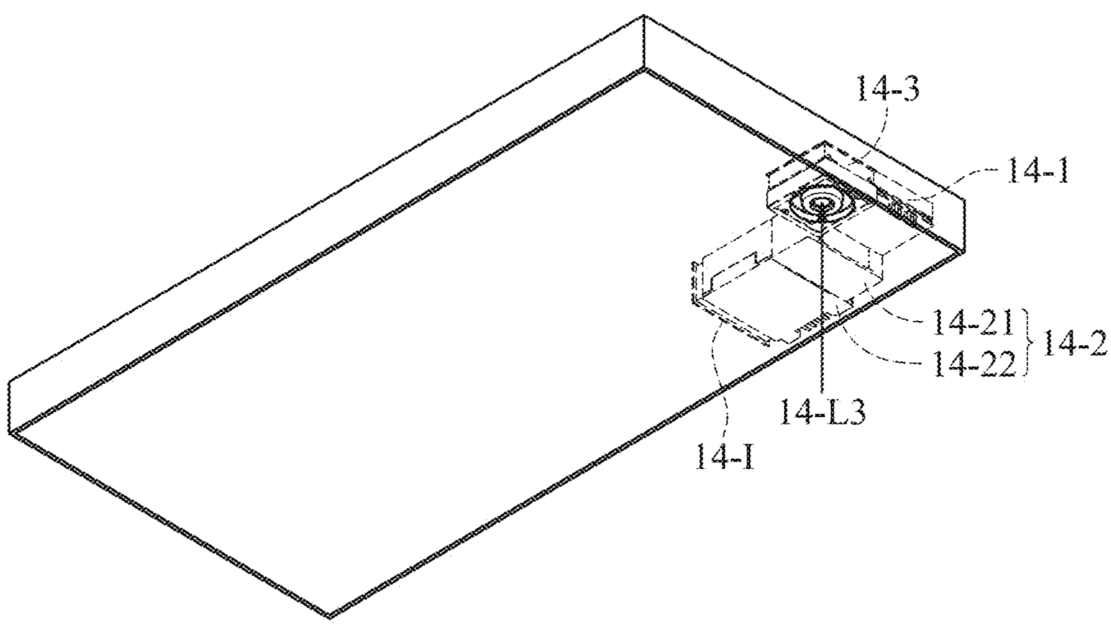
Figures 3, 14:
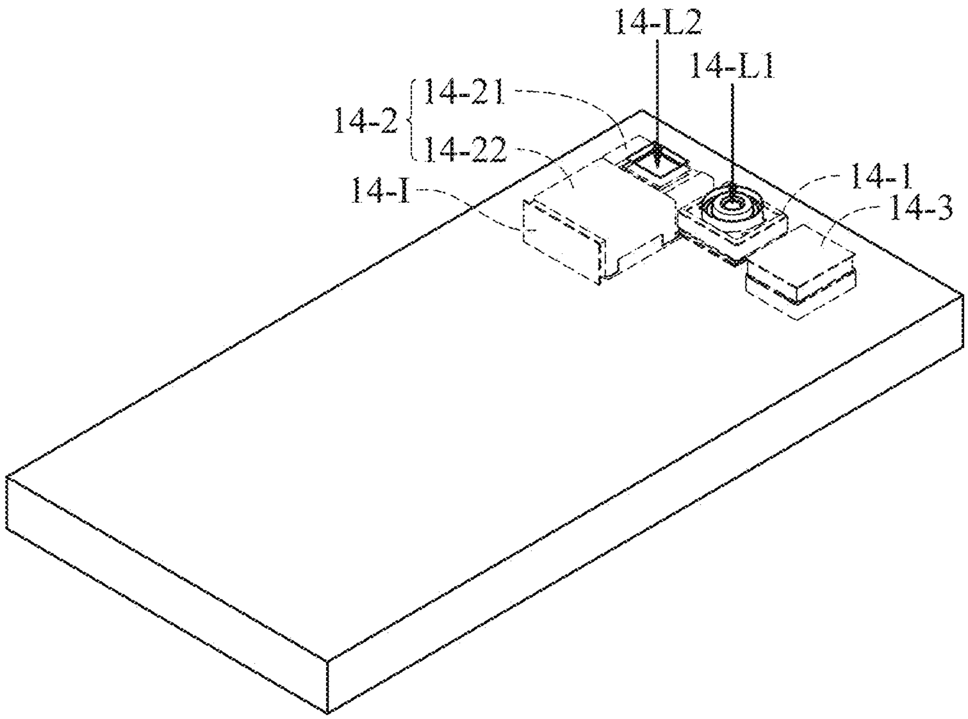
Figures 4, 14:
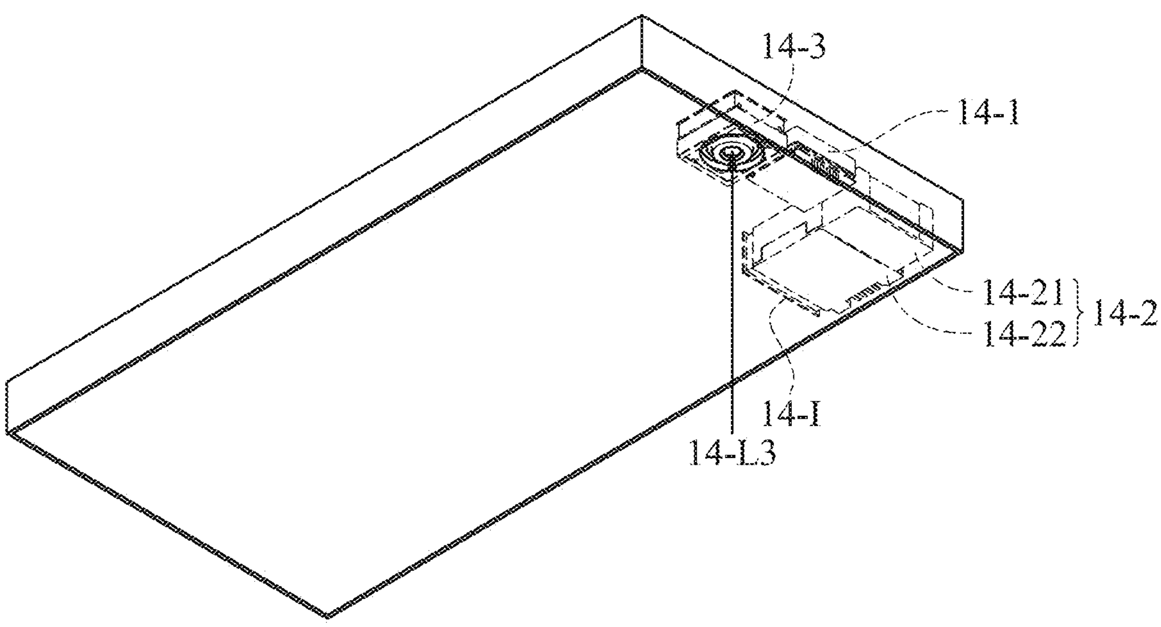
Figures 5, 14:
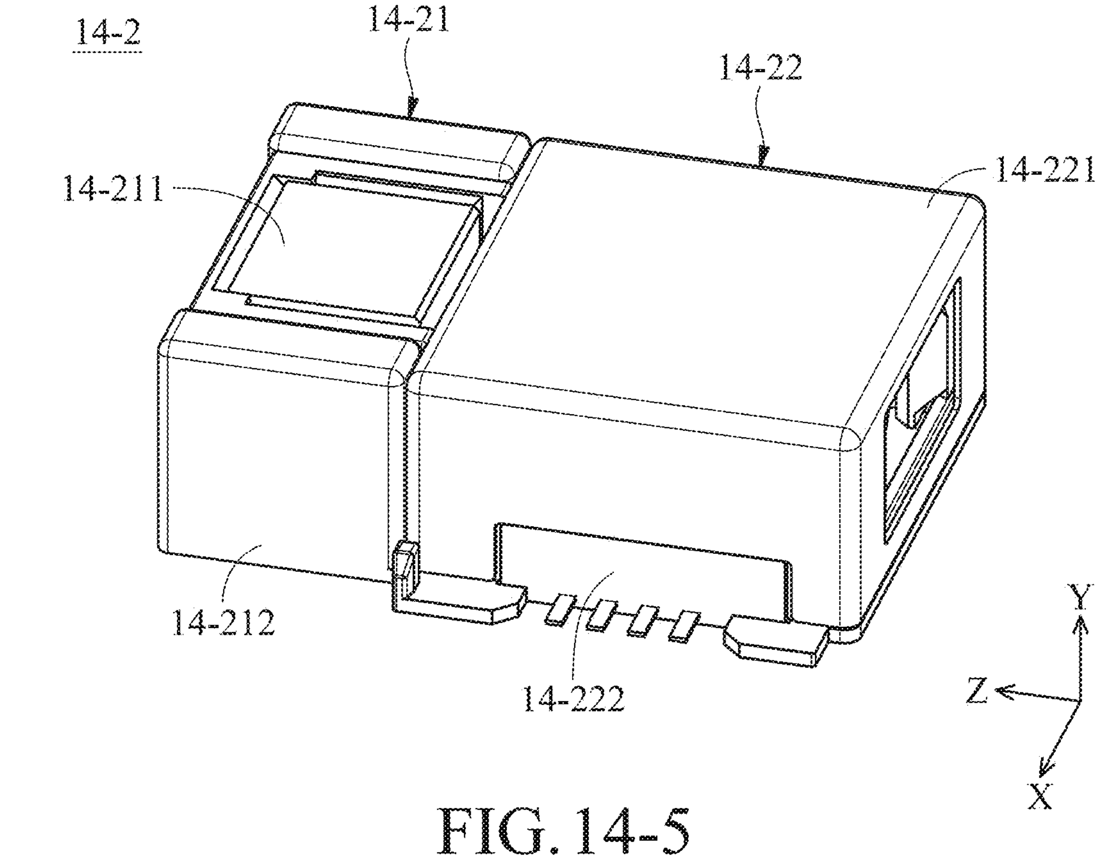
Figures 6, 14:
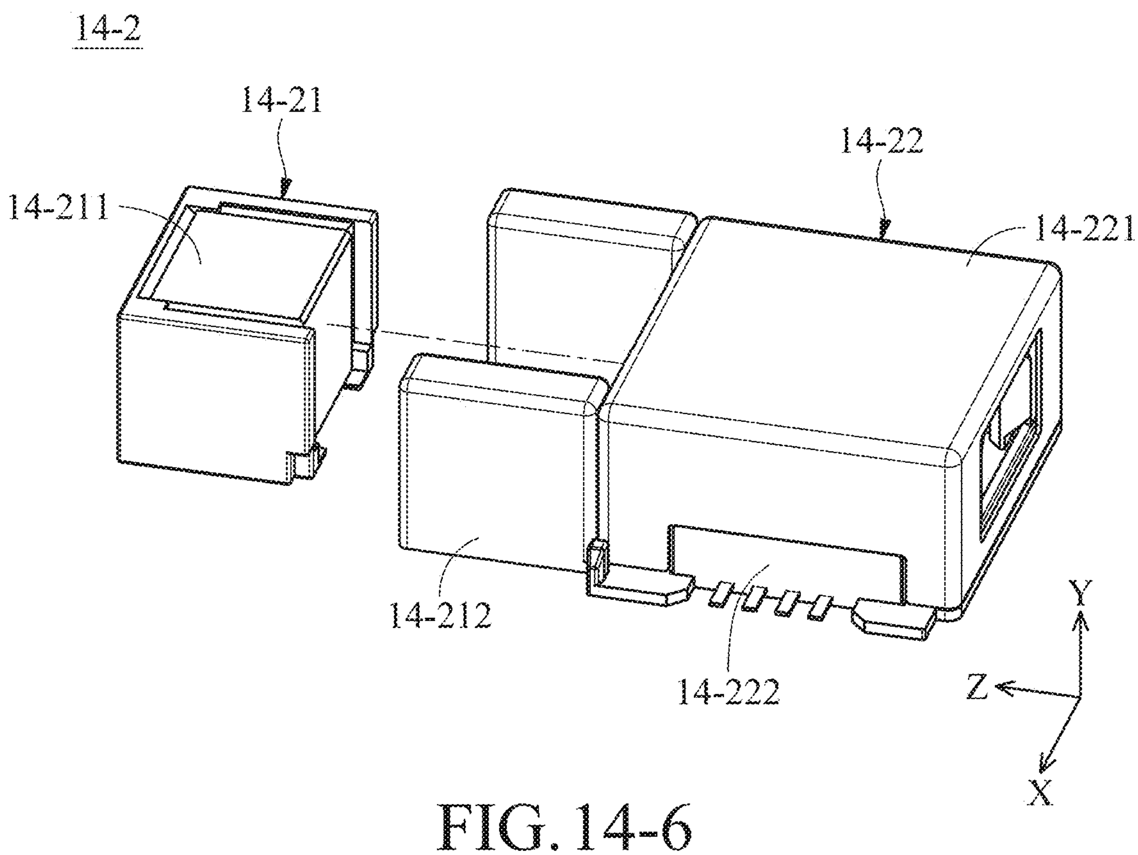
Figures 7, 14:
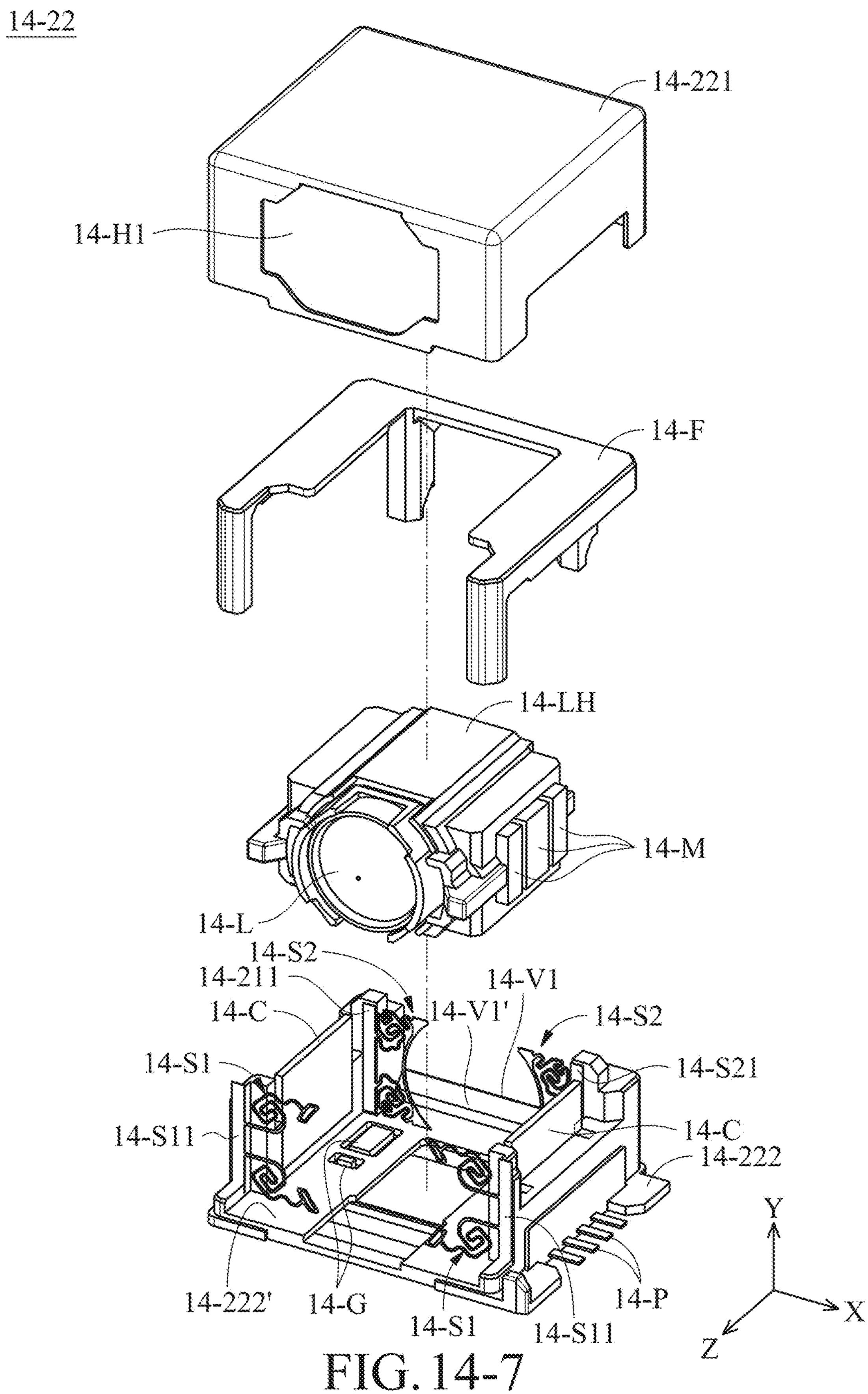
Figures 8, 14:
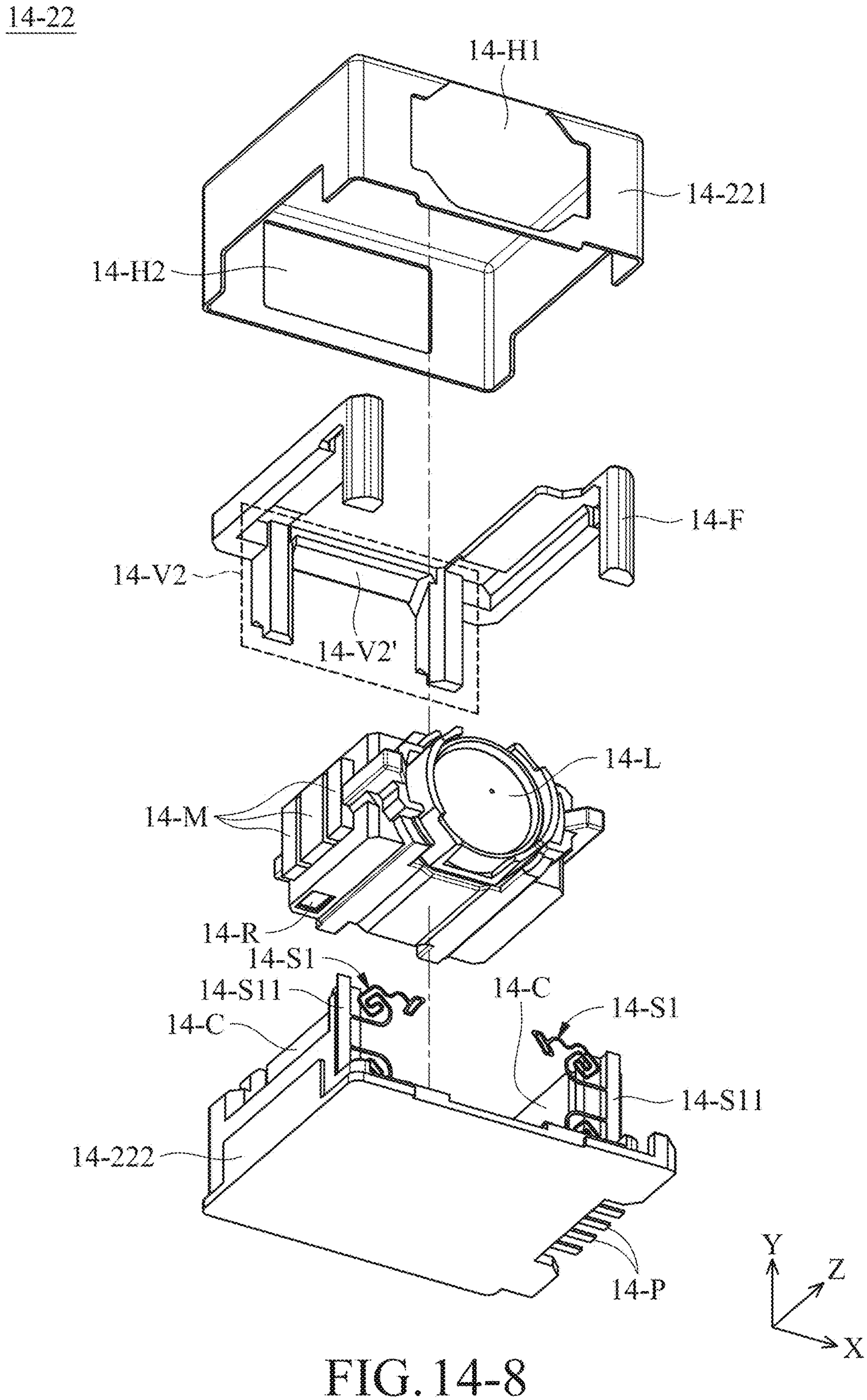
Figures 9, 14:
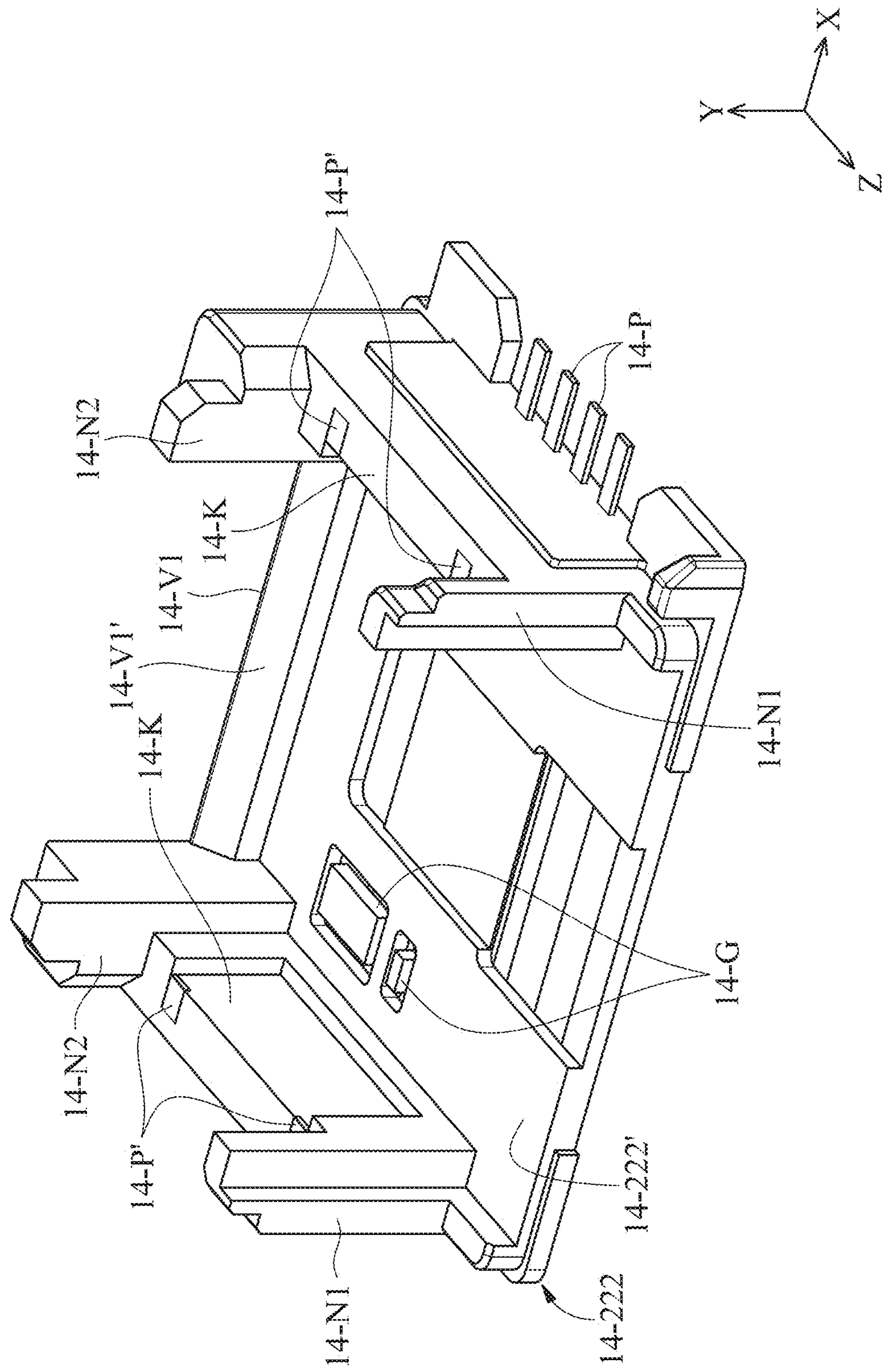
Figures 10, 14:
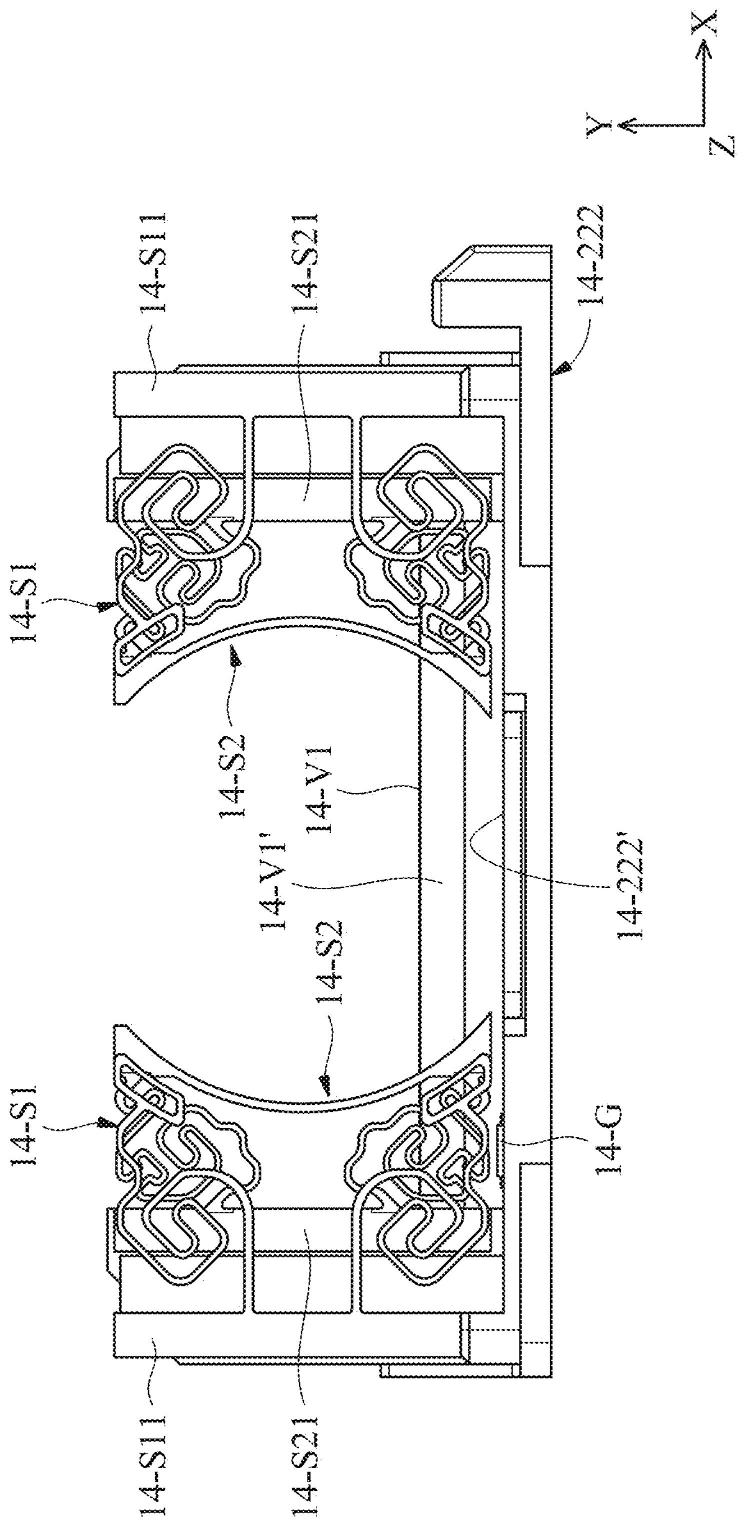
Figures 11, 14:
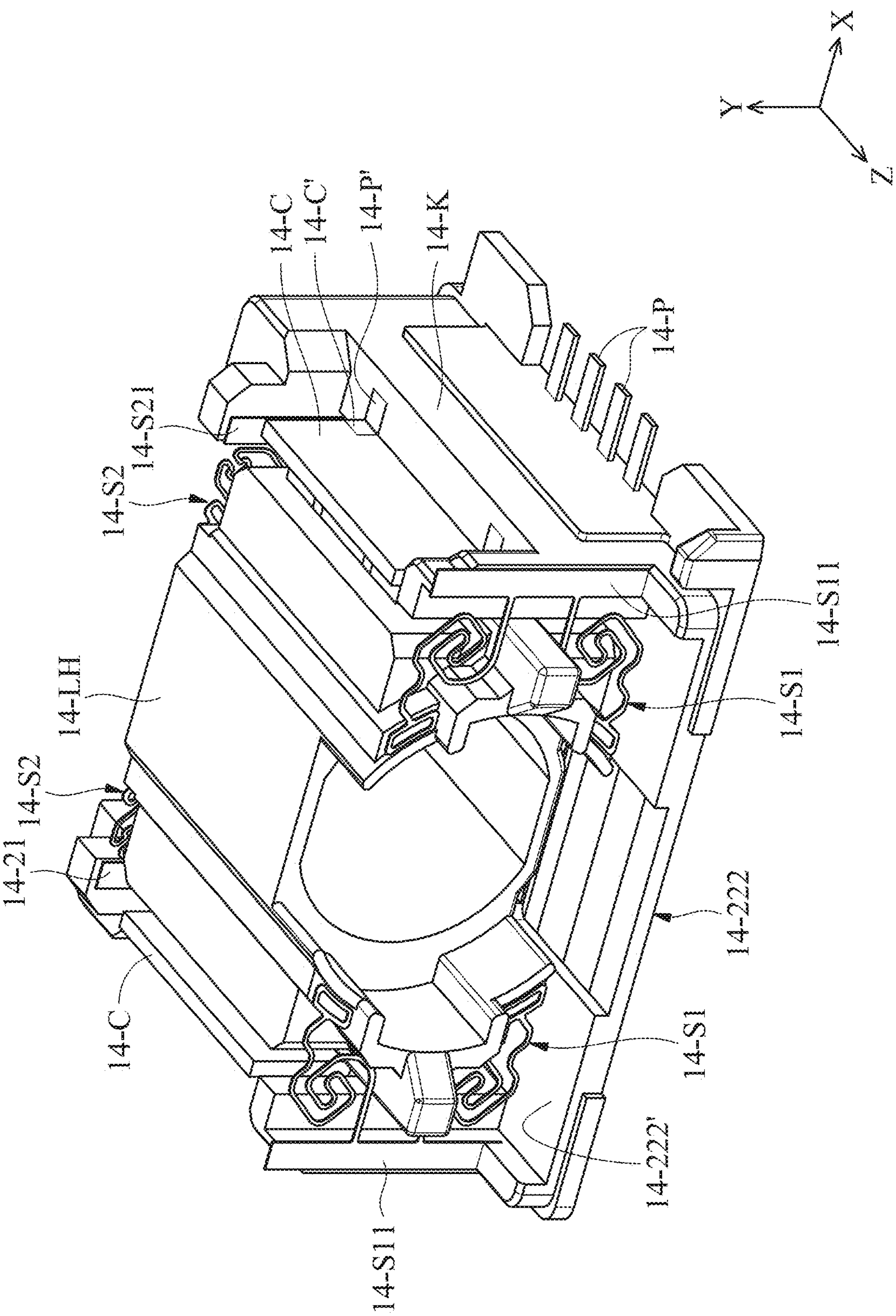
Figures 12, 14:
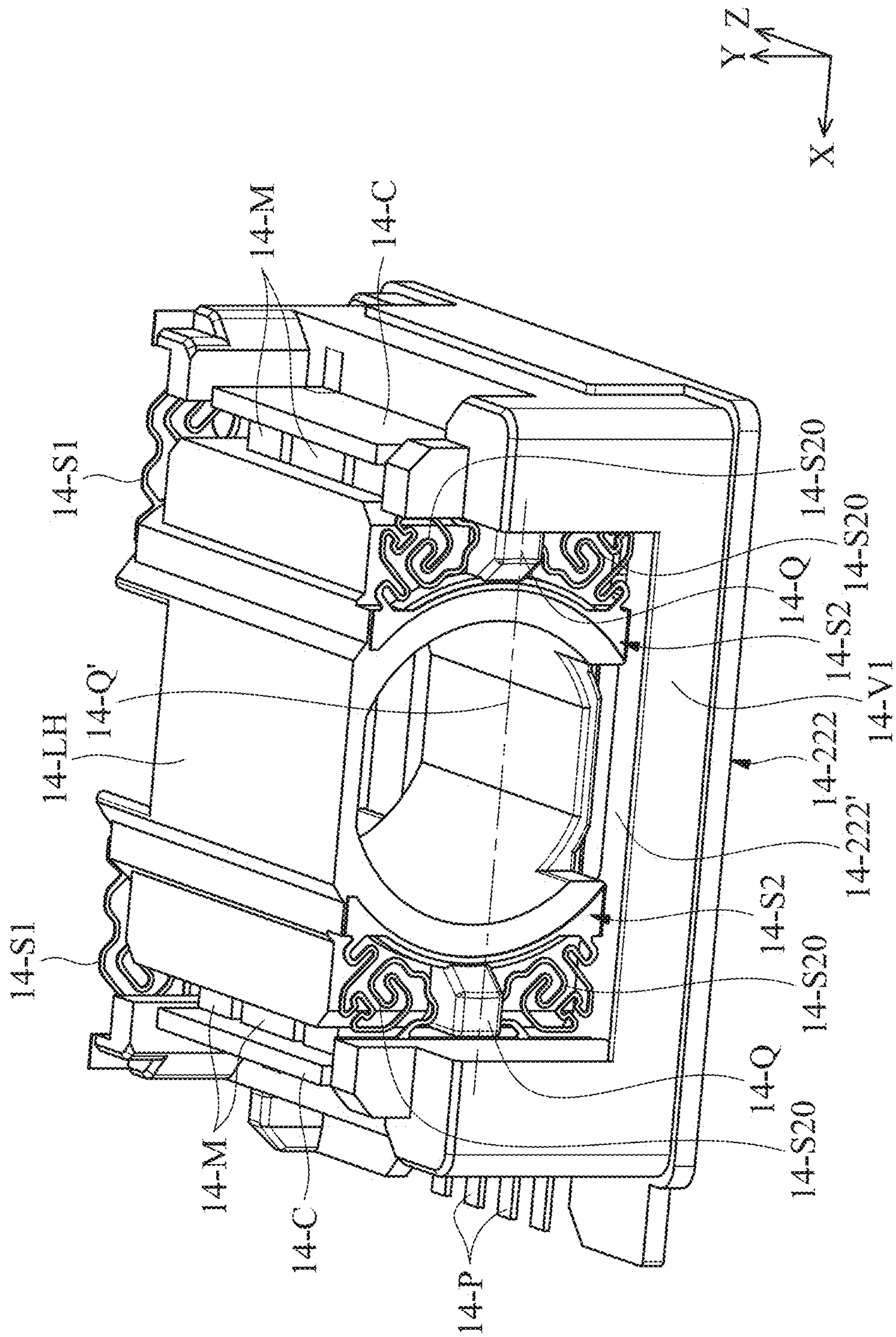
Figures 13, 14:
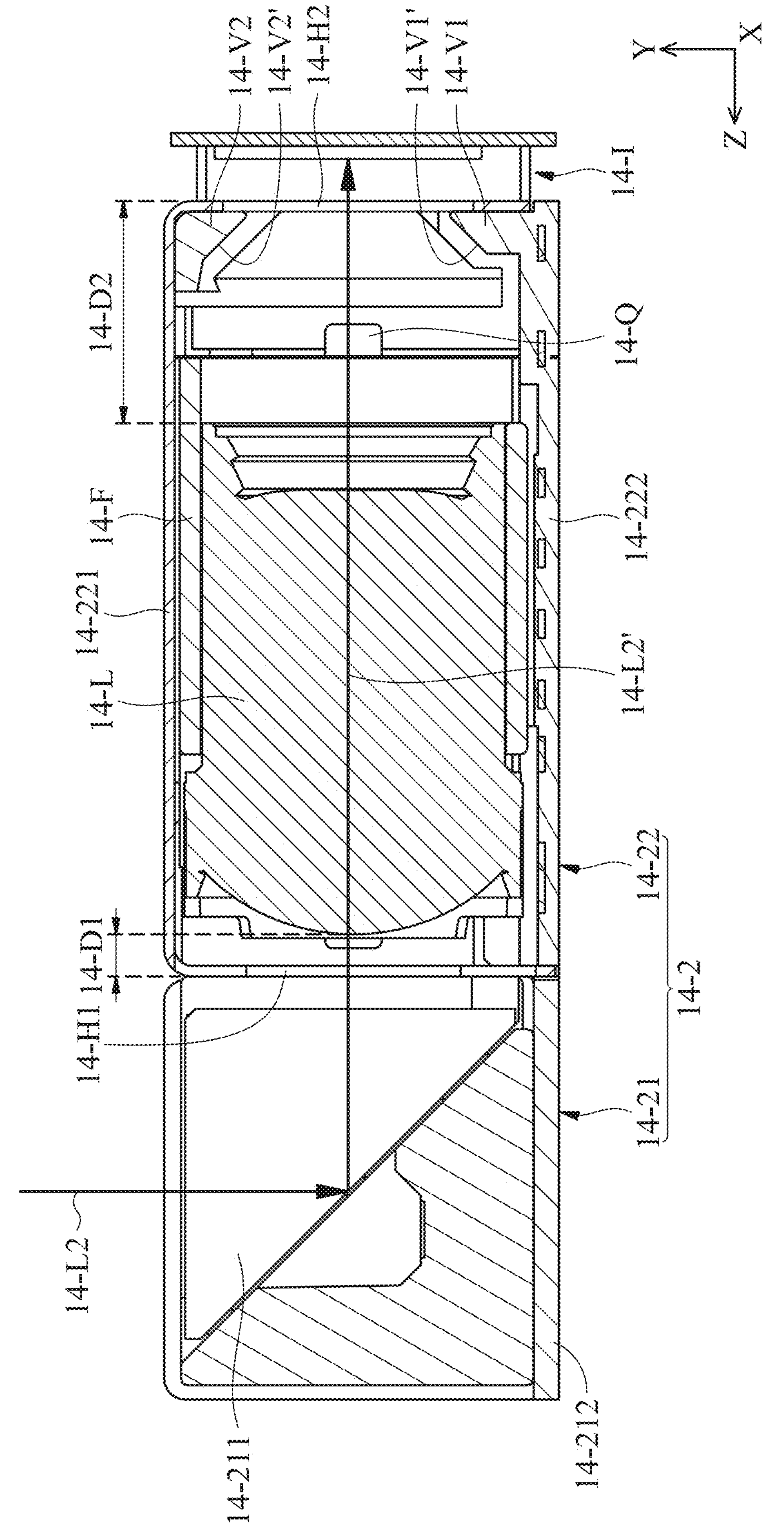
Figure 14:
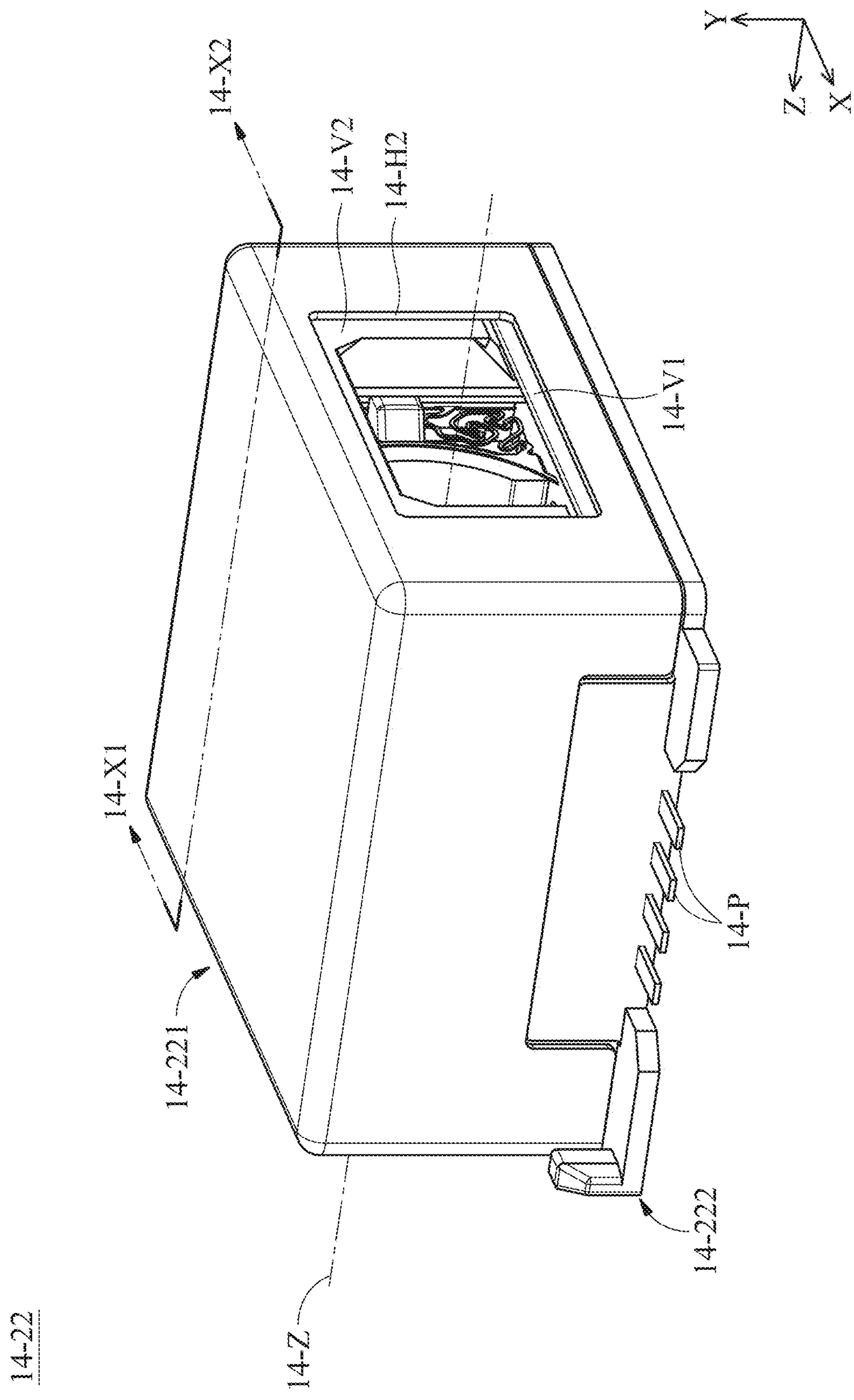

FIGS. 14-1 and 14-2 are schematic diagrams showing several optical systems 14-1, 14-2, and 14-3 disposed in a cell phone in accordance with an embodiment of the application.

FIGS. 14-3 and 14-4 are schematic diagrams showing the optical systems 14-1, 14-3 and the reflecting unit 14-21 of the optical system 14-2 linearly arranged along an axis.

FIG. 14-5 is a schematic diagram showing an optical system 14-2 in accordance with an embodiment of the application.

FIG. 14-6 is a schematic diagram showing an optical system 14-2 having a fixed member 14-212 integrally formed with a base 14-222 in one piece.

FIGS. 14-7 and 14-8 are exploded diagrams of a lens unit 14-22 in accordance with an embodiment of the application.

FIG. 14-9 is a schematic diagram showing at least a sensor 14-G disposed on the base 14-222.

FIG. 14-10 is a schematic diagram showing the first and second fixed portions 14-S11 and 14-S21 do not overlap when viewed along the Z axis.

FIGS. 14-11 and 14-12 are schematic diagrams showing the lens unit 14-22 with the housing 12-221, the frame 14-F, and the optical element 14-L removed therefrom.

FIG. 14-13 is a schematic diagram showing that light 14-L2 is reflected by the reflecting element 14-211 and propagates through the optical element 14-L of the lens unit 14-22 to the image sensor 14-1.

FIG. 14-14 is a schematic diagram showing the lens unit 14-22 in FIGS. 14-7 and 14-8 after assembly.

Figures 14, 15:
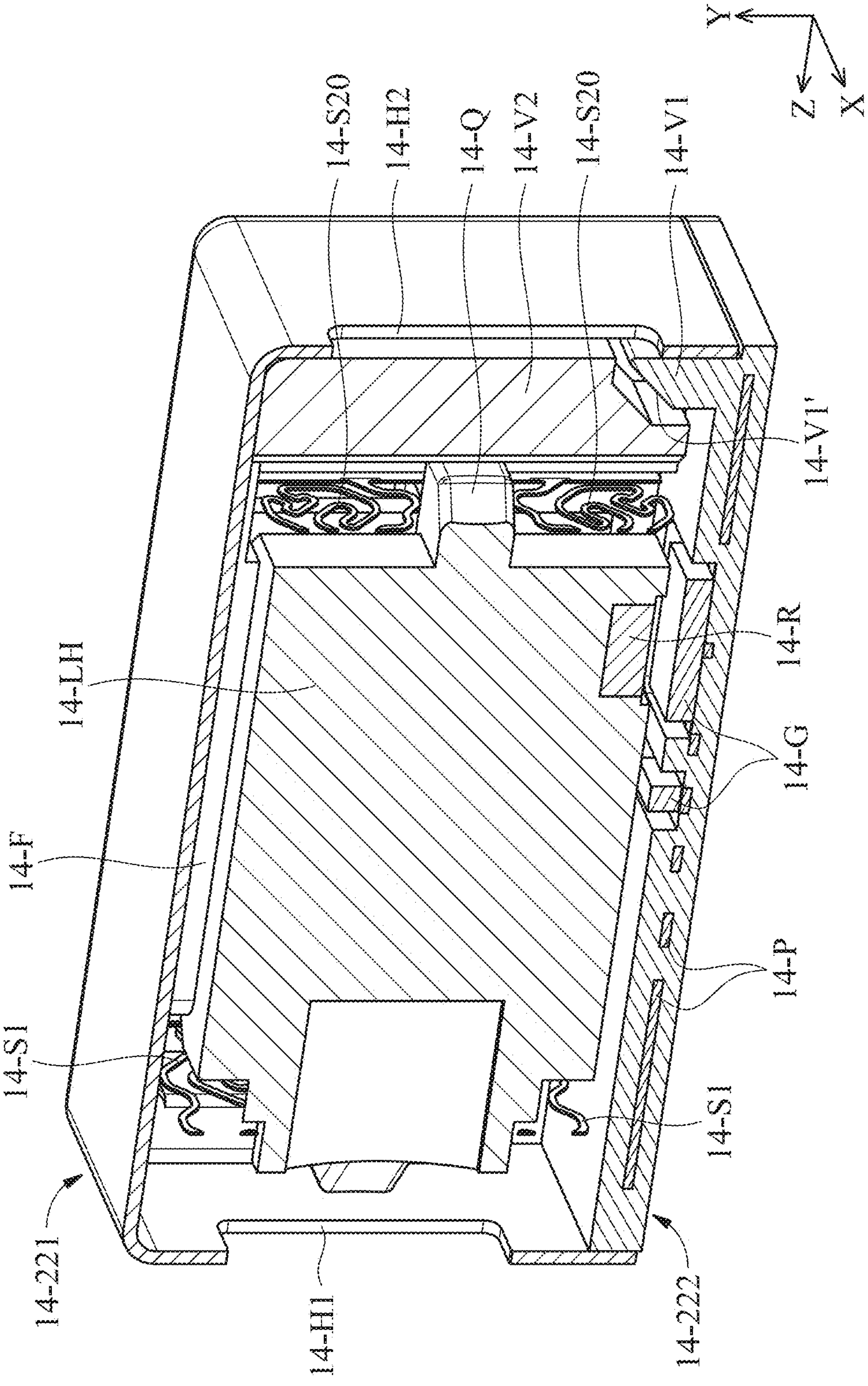

FIG. 14-15 is a cross-sectional view taken along line 14-X1-14-X2 in FIG. 14-14.

FIGS. 15-1 and 15-2 are schematic diagrams showing several optical systems 15-1, 15-2, and 15-3 disposed in a cell phone in accordance with an embodiment of the application.

FIGS. 15-3 and 15-4 are schematic diagrams showing the optical systems 15-1, 15-3 and the reflecting unit 15-21 of the optical system 15-2 linearly arranged along an axis.

FIG. 15-5 is a schematic diagram showing an optical system 15-2 in accordance with an embodiment of the application.

FIG. 15-6 is a schematic diagram showing an optical system 15-2 having a fixed member 15-212 integrally formed with a base 15-222 in one piece.

FIGS. 15-7 and 15-8 are exploded diagrams of a lens unit 15-22 in accordance with an embodiment of the application.

FIG. 15-9 is a schematic diagram showing at least a sensor 15-G disposed on the base 15-222.

FIG. 15-10 is a schematic diagram showing the first and second fixed portions 15-S11 and 15-S21 do not overlap when viewed along the Z axis.

FIGS. 15-11 and 15-12 are schematic diagrams showing the lens unit 15-22 with the housing 12-221, the frame 15-F, and the optical element 15-L removed therefrom.

FIG. 15-13 is a schematic diagram showing that light 15-L2 is reflected by the reflecting element 15-211 and propagates through the optical element 15-L of the lens unit 15-22 to the image sensor 15-1.

FIG. 15-14 is a schematic diagram showing a top view of the base 15-222 in FIG. 15-9.

FIG. 15-15 is a schematic diagram showing relative positions between the coils 15-C and the magnets 15-M after assembly.

Figures 1, 15:
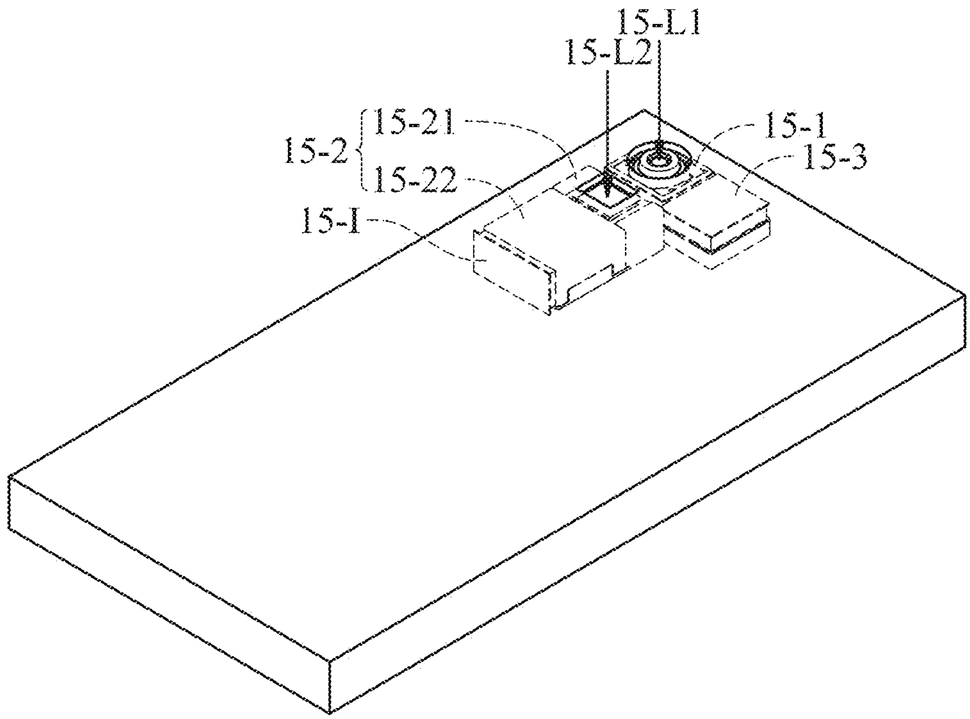
Figures 2, 15:
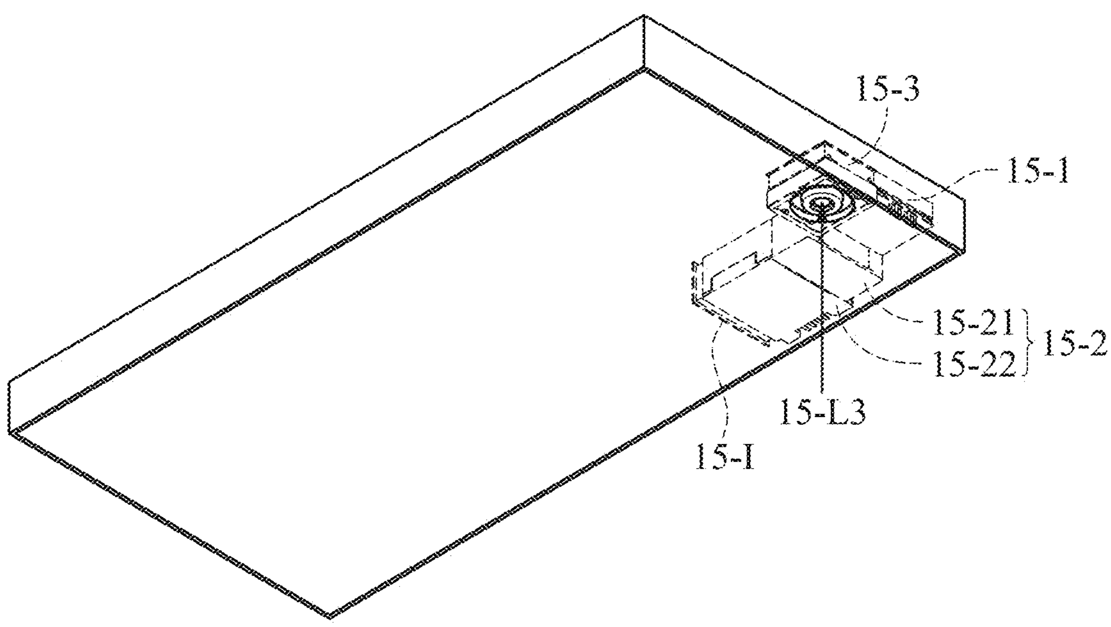
Figures 3, 15:
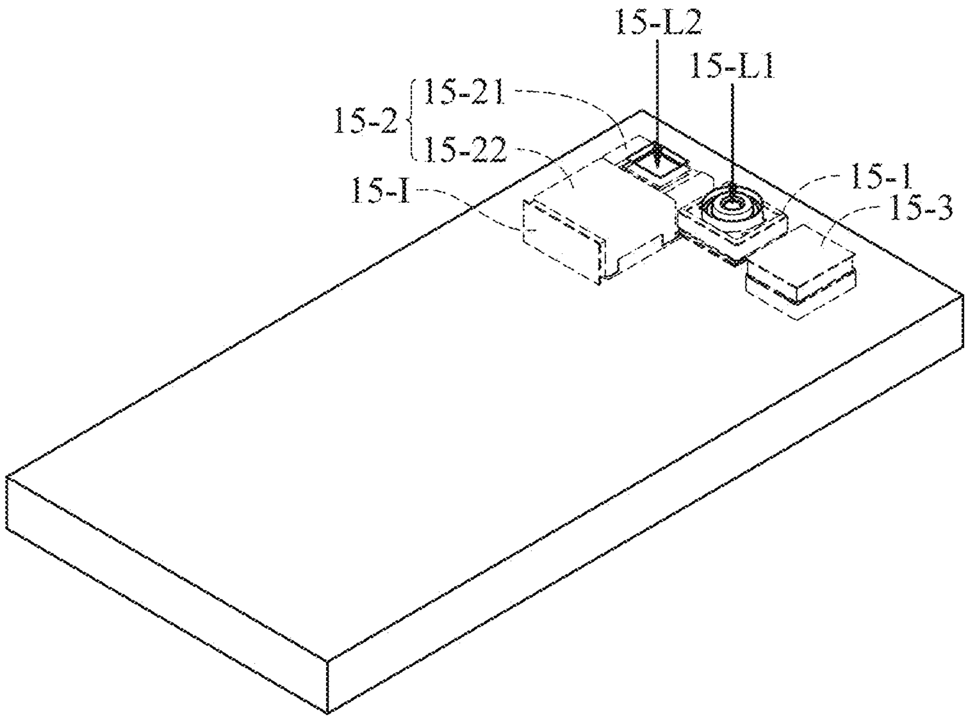
Figures 4, 15:
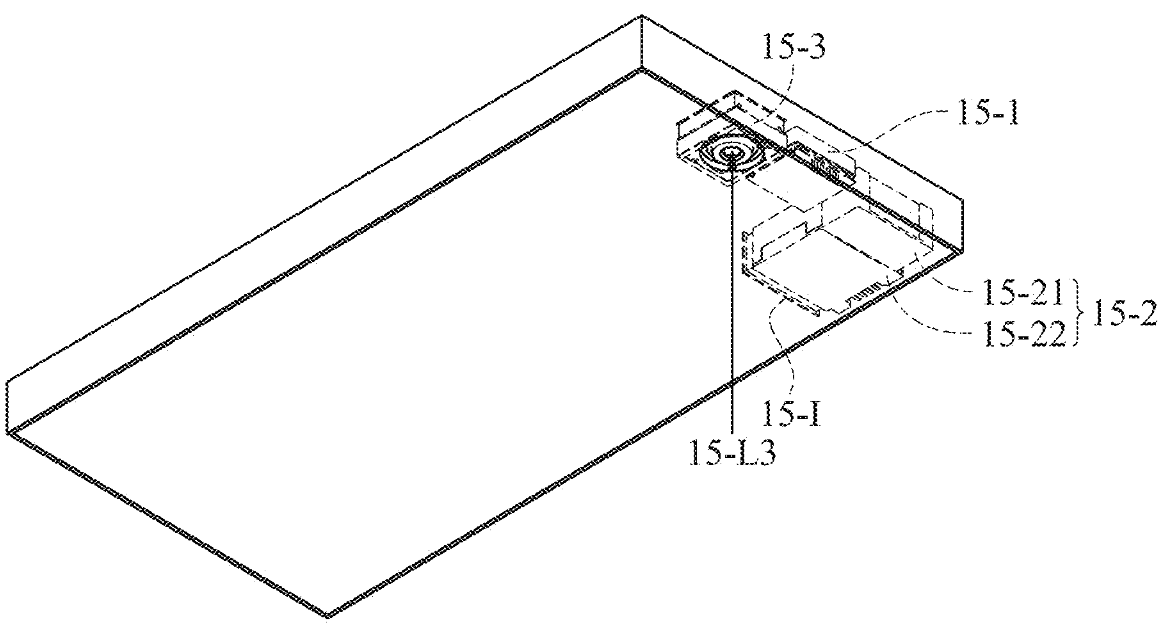
Figures 5, 15:
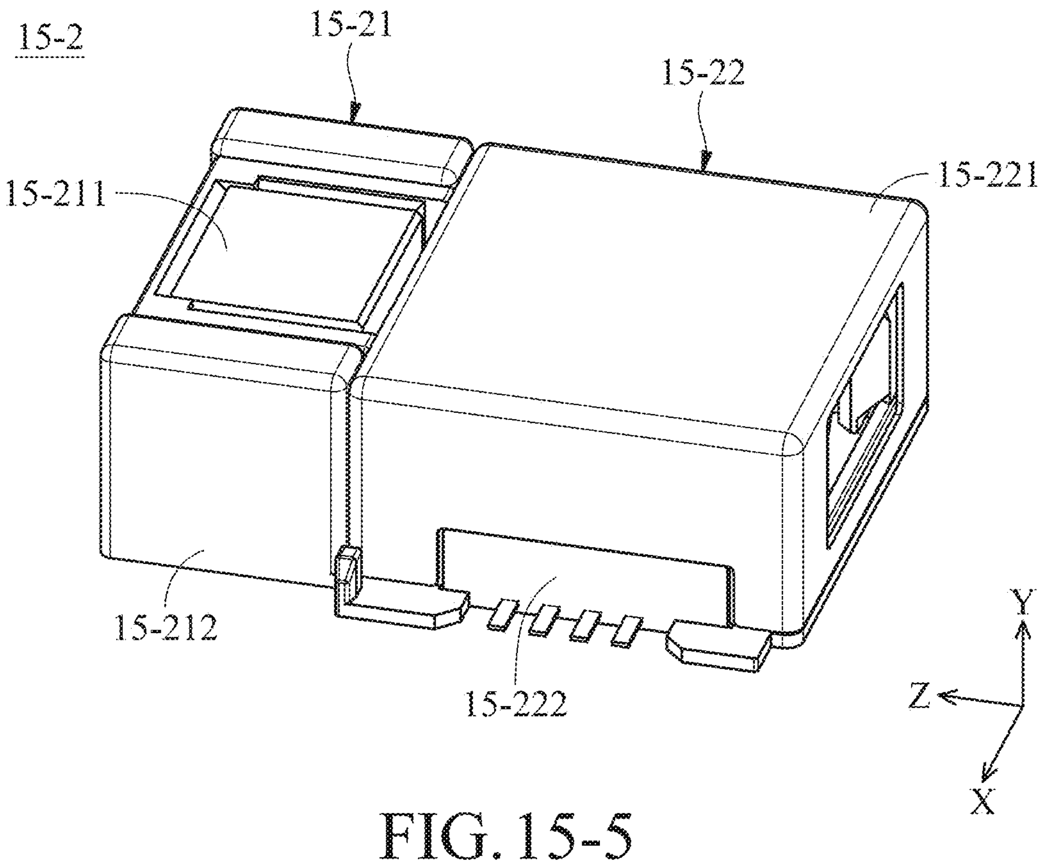
Figures 6, 15:
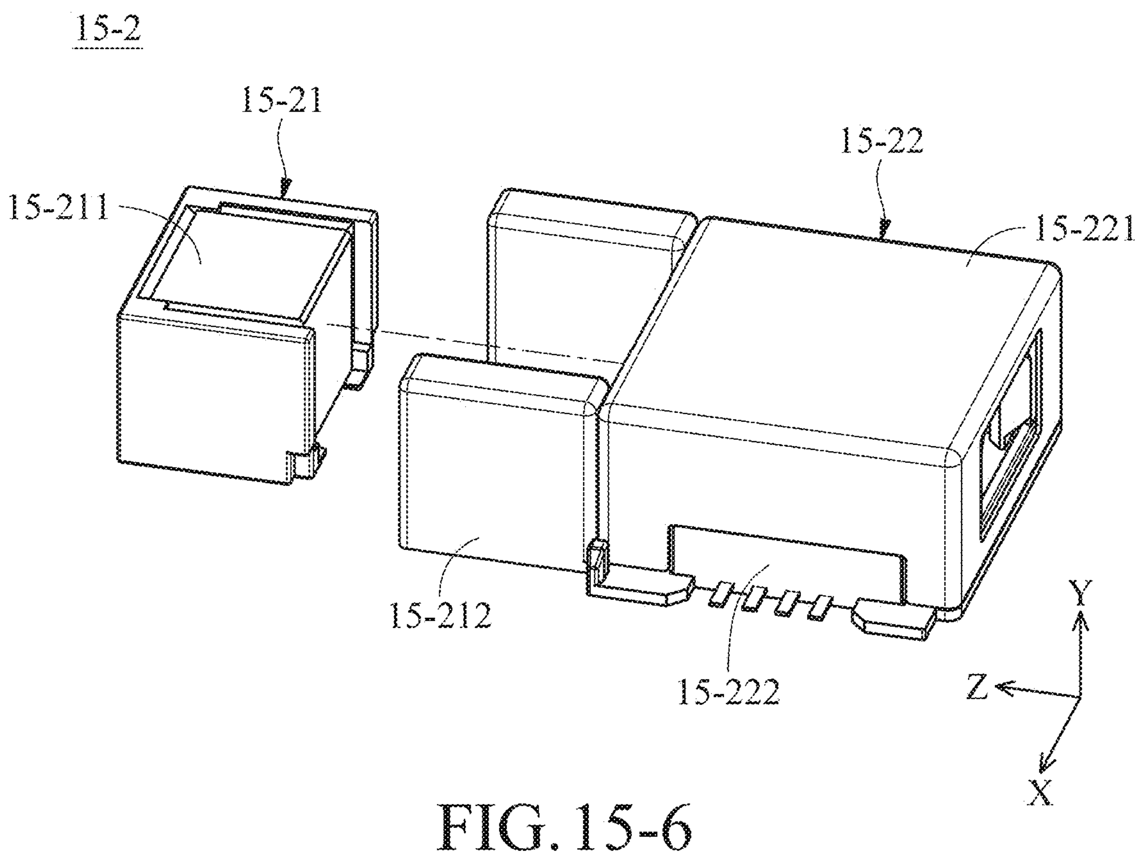
Figures 7, 15:
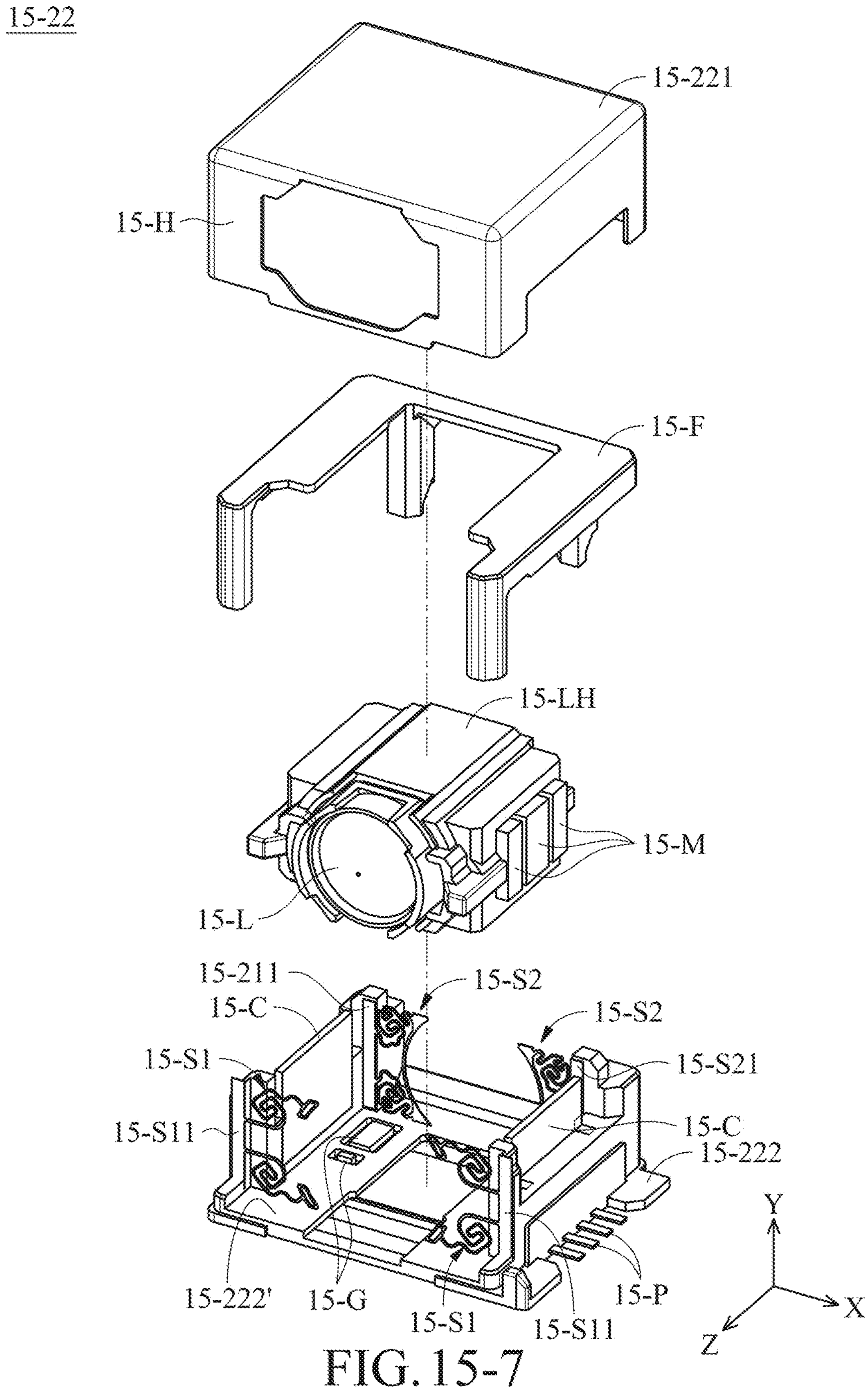
Figures 8, 15:
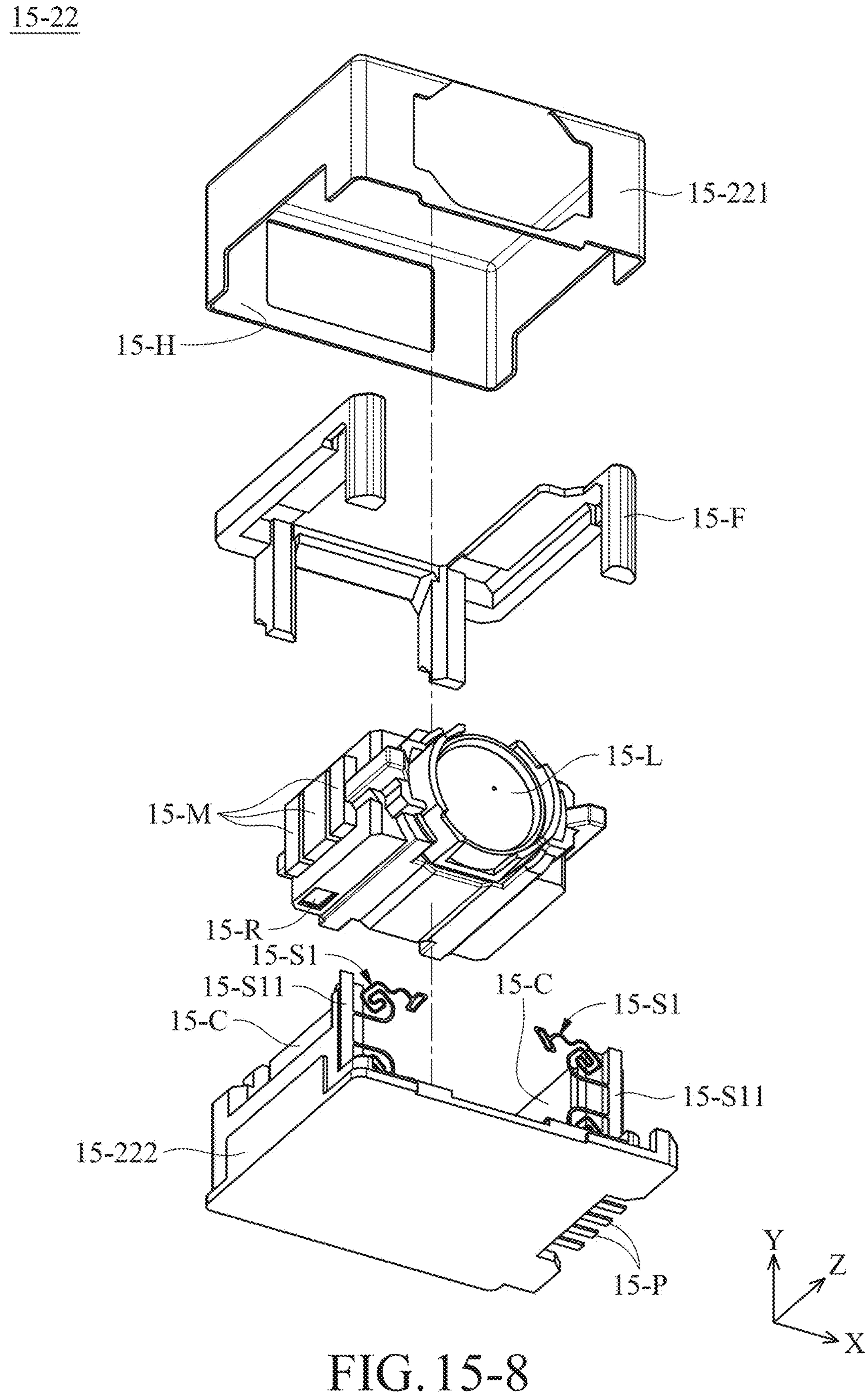
Figures 9, 15:
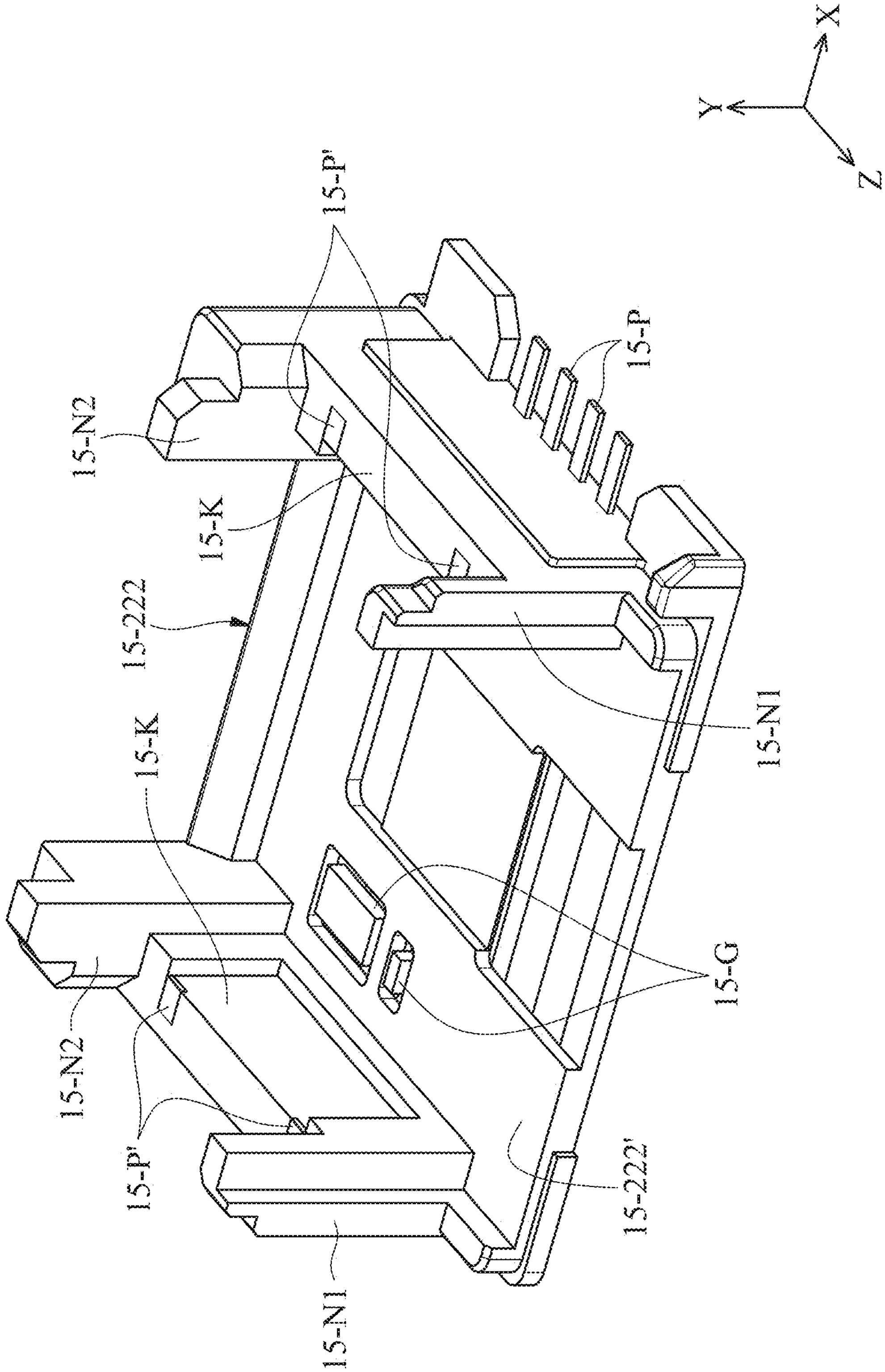
Figures 10, 15:
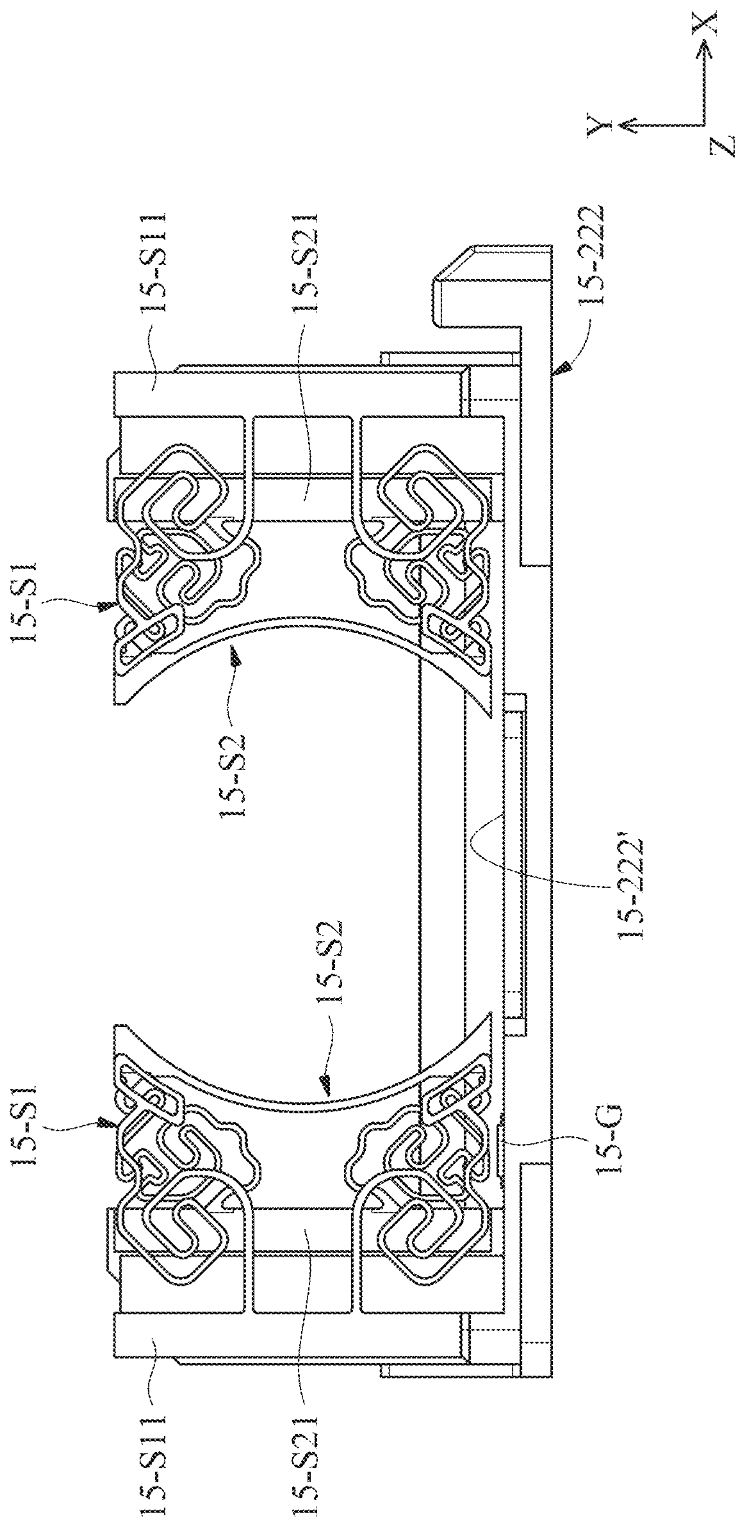
Figures 11, 15:
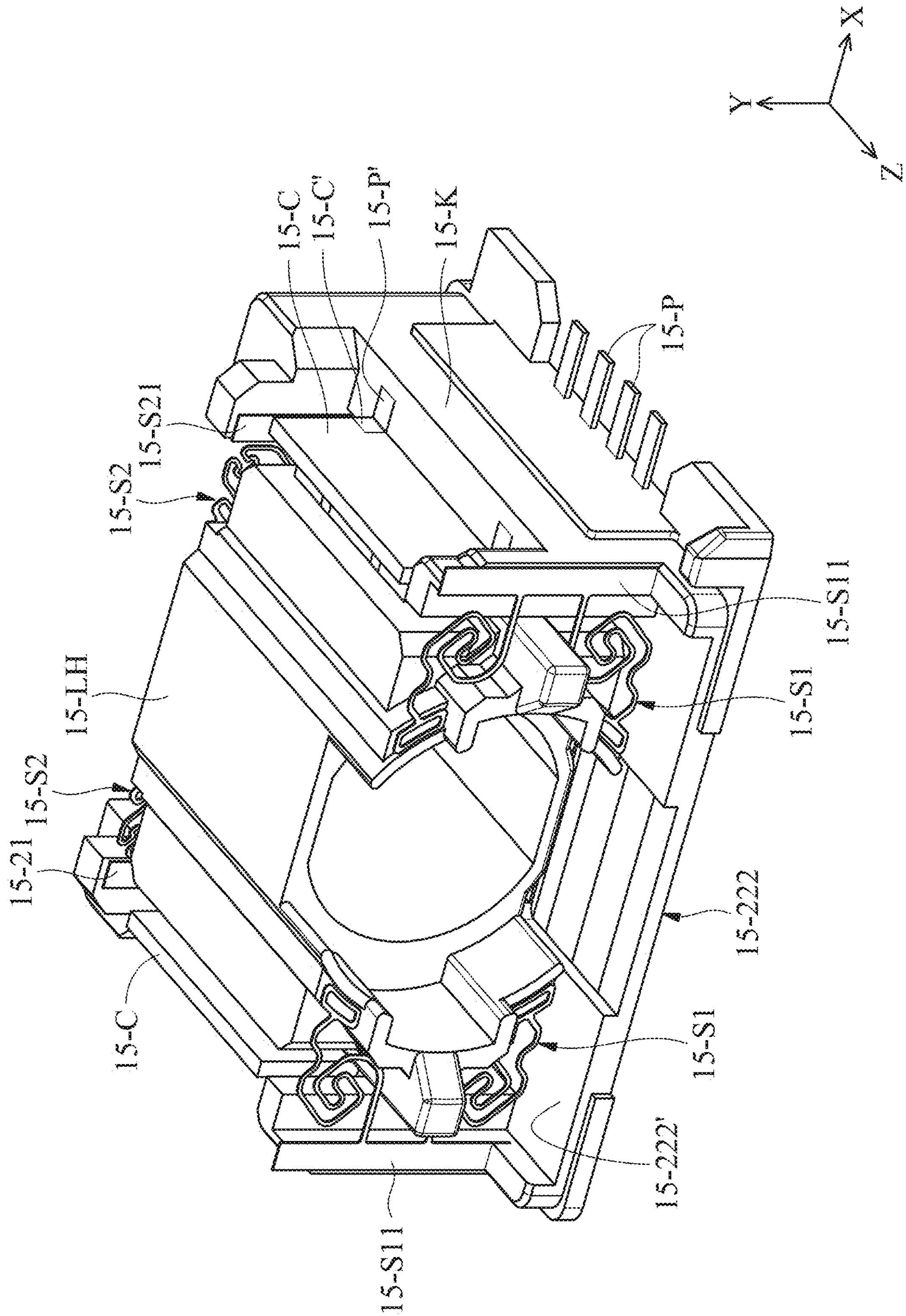
Figures 12, 15:
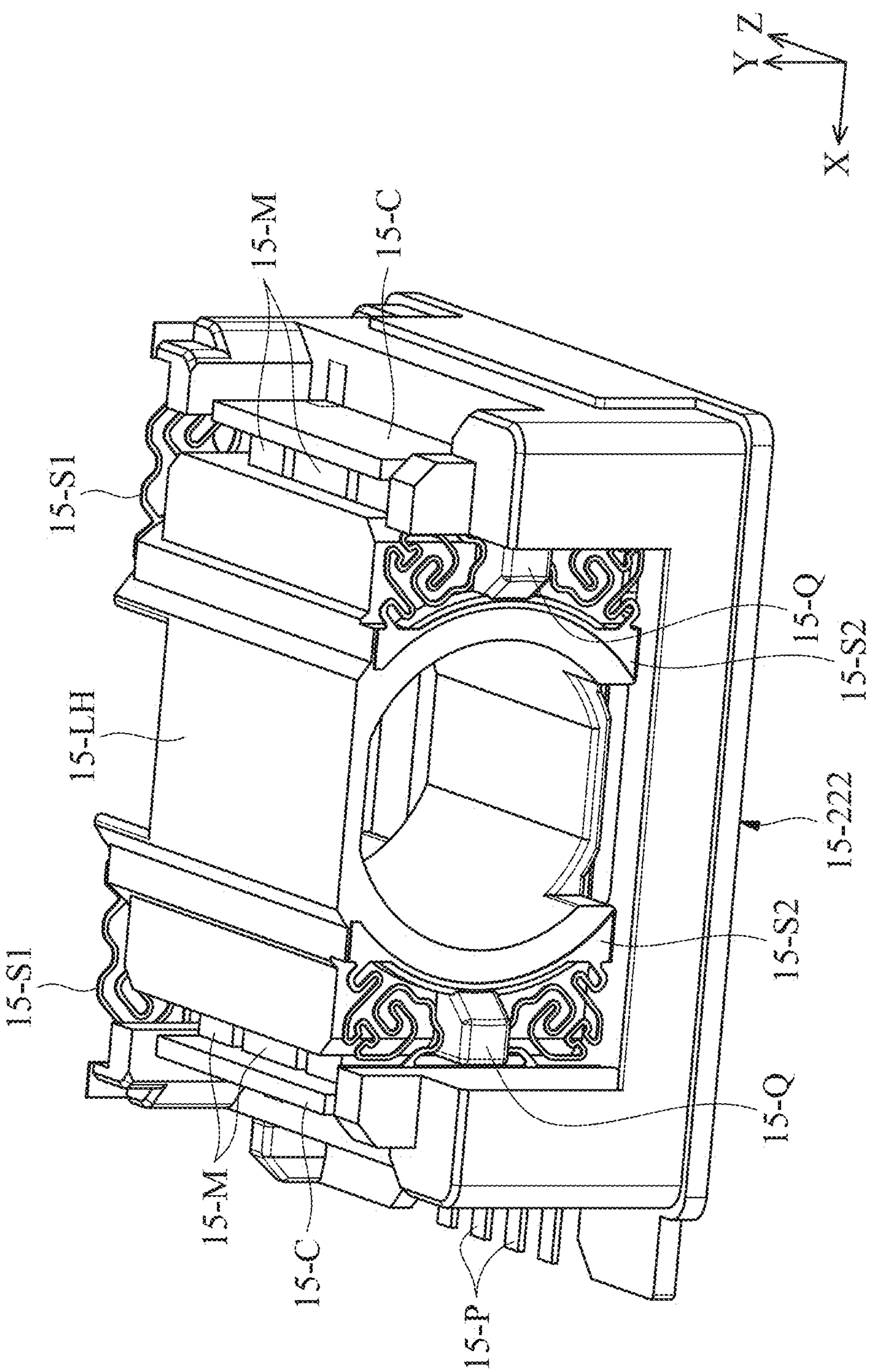
Figures 13, 15:
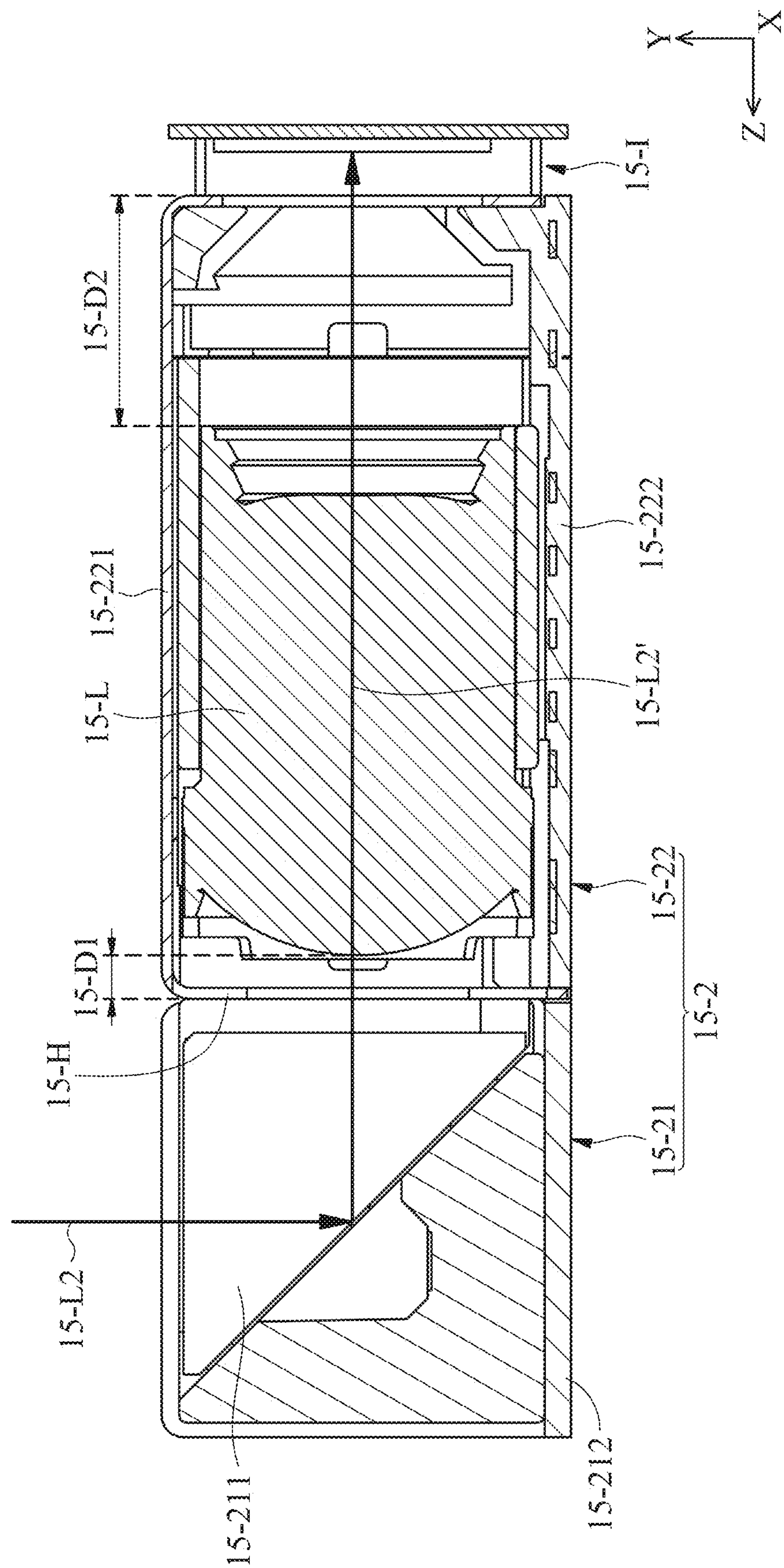
Figures 14, 15:
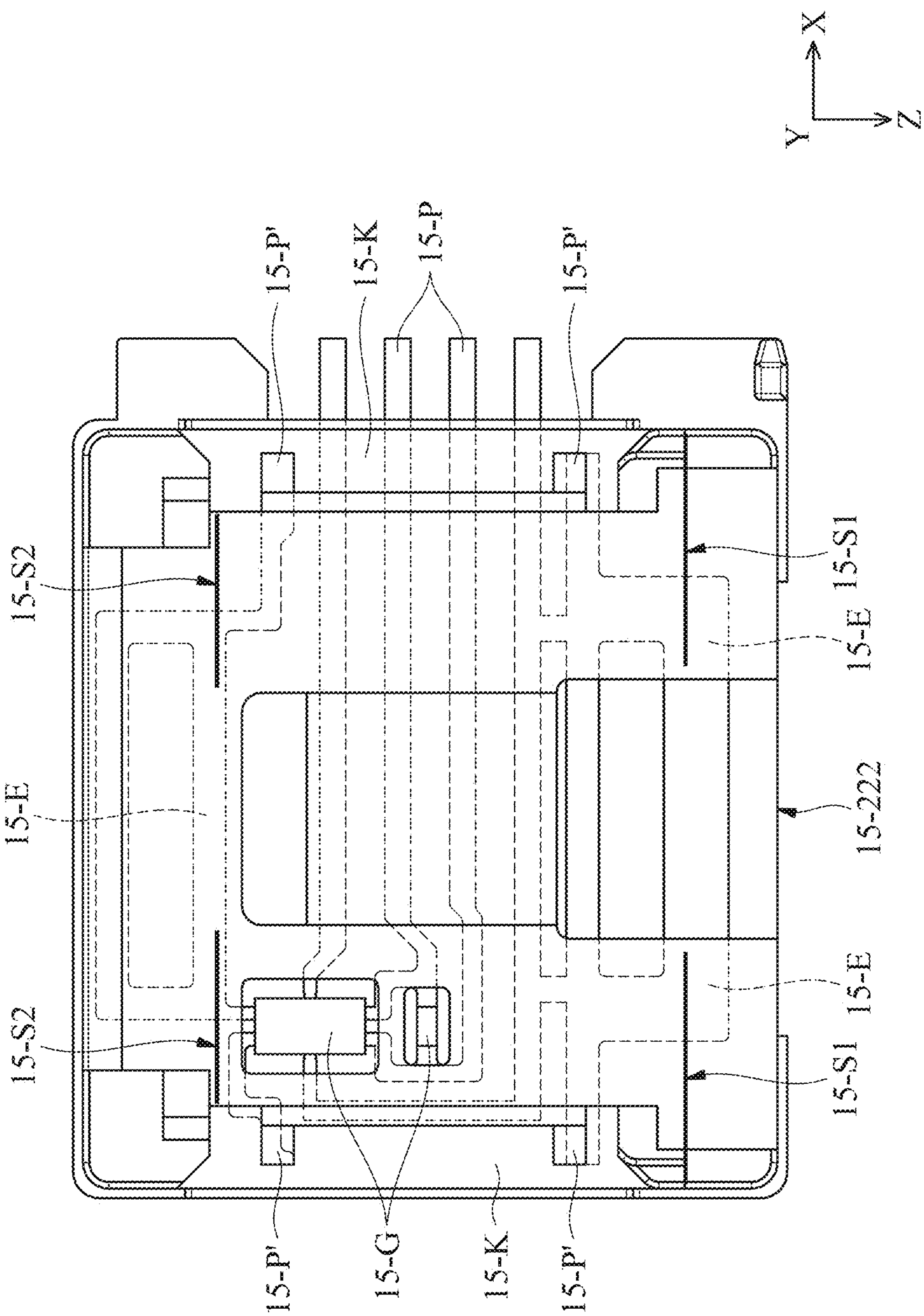
Figure 15:
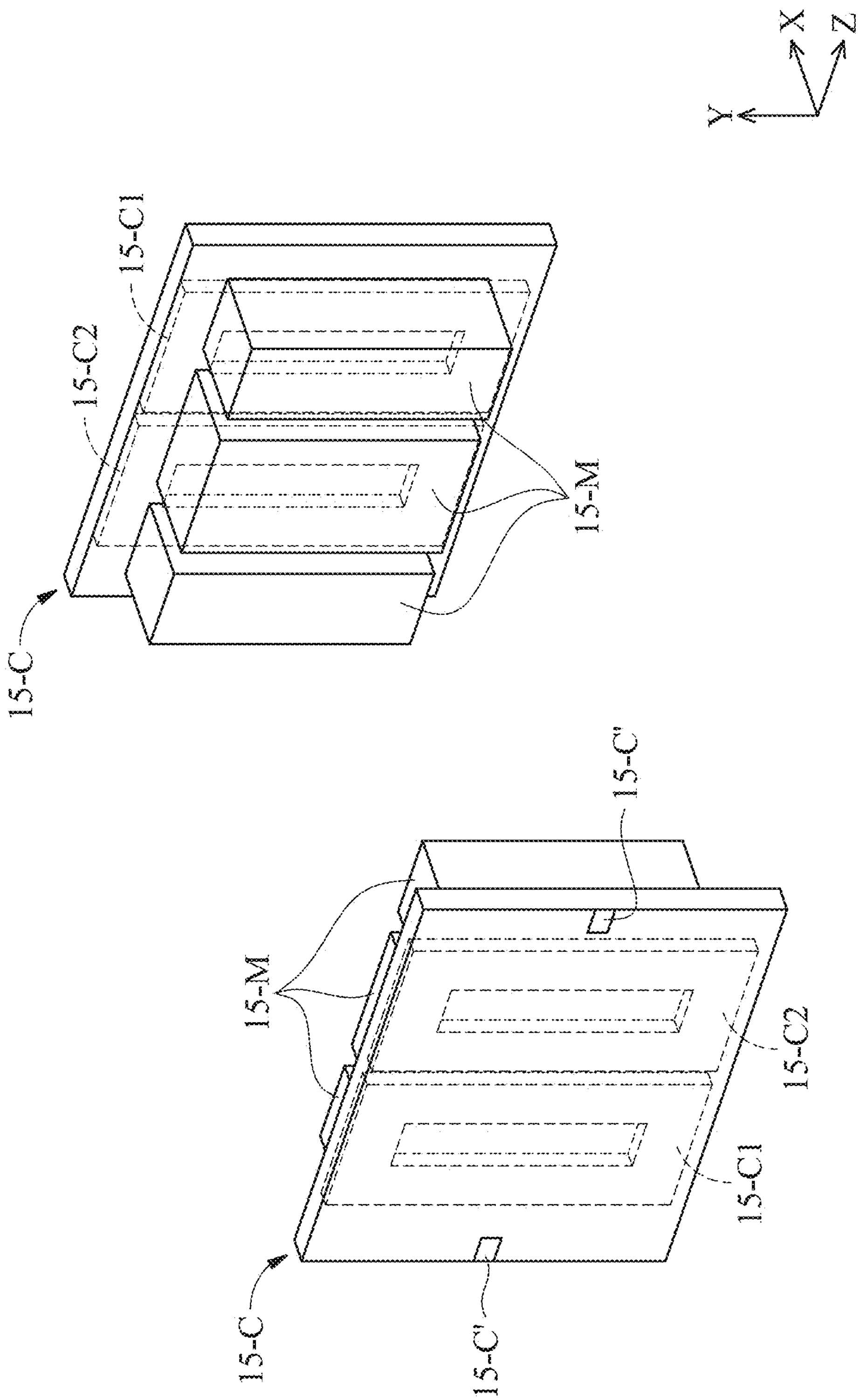
Figures 15, 16:
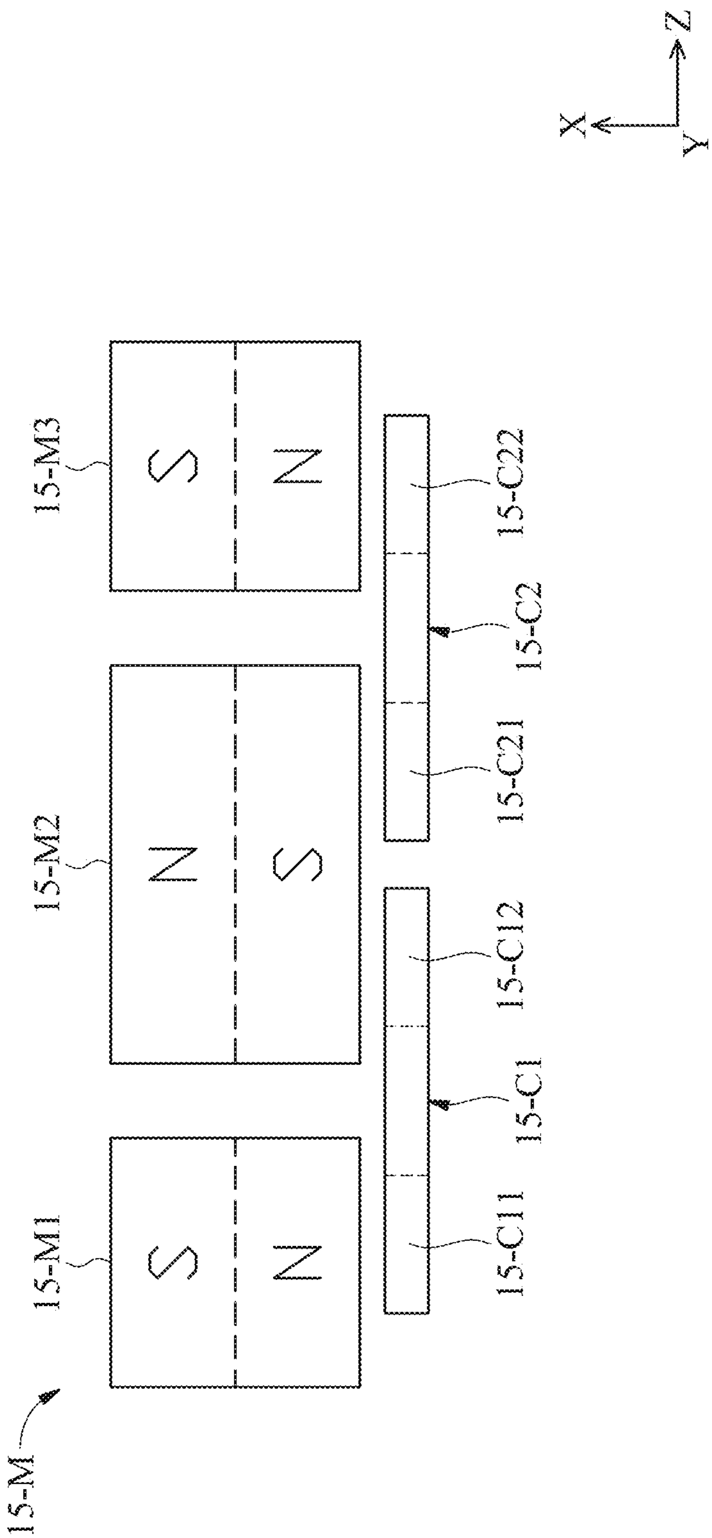

FIG. 15-16 is a schematic diagram showing relative positions between the winding portions 15-C1, 15-C2 of the coils 15-C and the magnetic units 15-M1, 15-M2, 15-M3 of the magnets 15-M in FIG. 15-15 after assembly.

Figures 15, 16, 17:
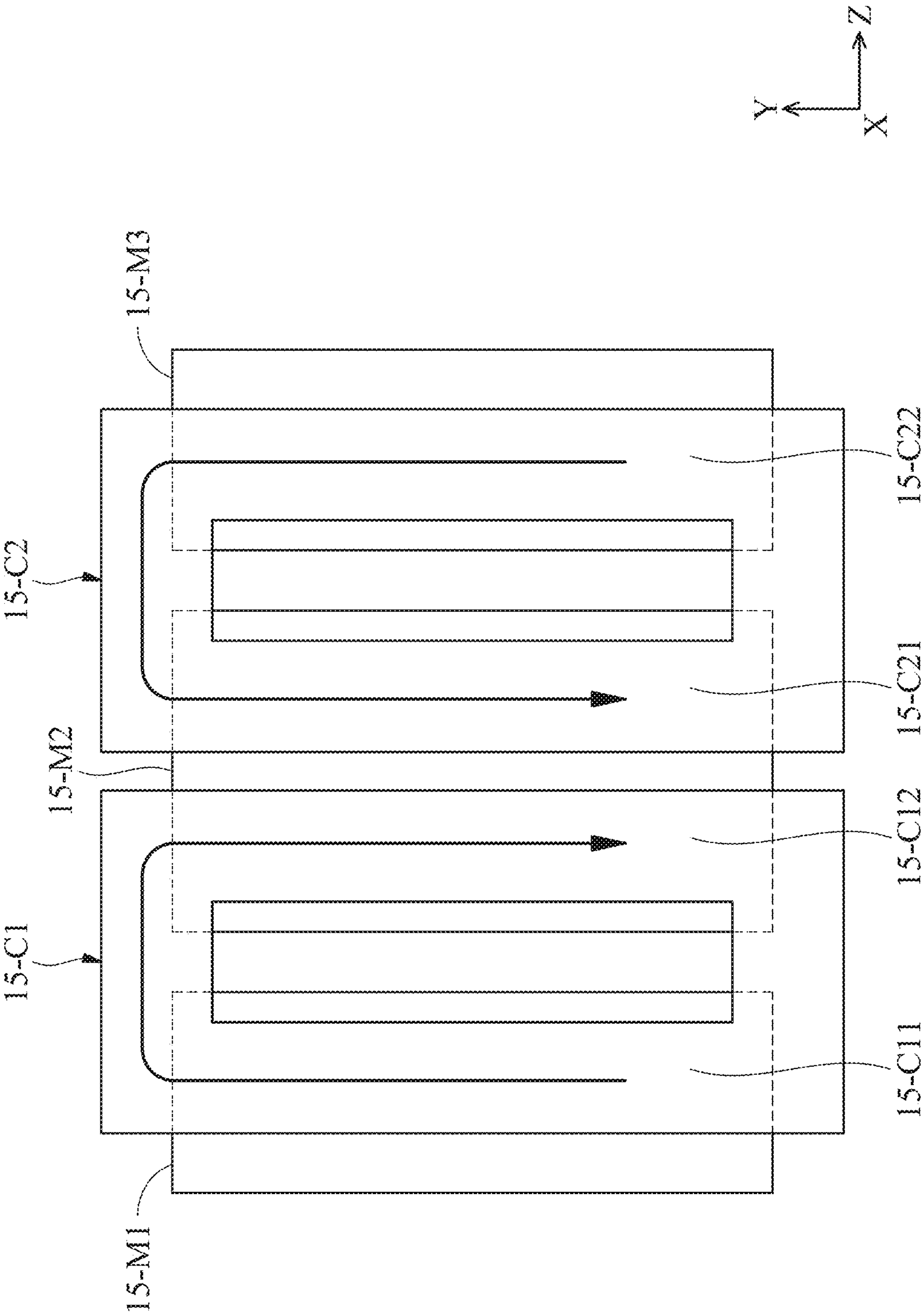

FIG. 15-17 is a schematic diagram showing a side view of the winding portions 15-C1, 15-C2 and the magnetic units 15-M1, 15-M2, 15-M3 in FIG. 15-16.

FIG. 15-18 is a schematic diagram showing the first, second, and third magnetic units 15-M1, 15-M2, and 15-M3 when moving relative to the first and second winding portions 15-C1 and 15-C2 in the Z direction.

FIG. 15-19 is a schematic diagram showing the first, second, and third magnetic units 15-M1, 15-M2, and 15-M3 when moving relative to the first and second winding portions 15-C1 and 15-C2 in the −Z direction.

FIG. 15-20 is an exploded diagram showing a reflecting element 15-211 and a carrier 15-213 in accordance with an embodiment of the application.

FIG. 15-21 is a cross-sectional view showing a reflecting element 15-211 and a carrier 15-213 after assembly, in accordance with another embodiment of the application.

FIG. 16-1 is an exploded view diagram showing an liquid optical module according to an embodiment of the present disclosure.

FIG. 16-2 is a schematic diagram showing the liquid optical module in FIG. 16-1 after assembly.

FIG. 16-3 is a schematic diagram of the liquid lens assembly and the liquid lens driving mechanism which are separated.

FIG. 16-4A is a schematic diagram of a liquid lens assembly.

FIG. 16-4B shows a schematic view of the liquid lens assembly of FIG. 16-4A after assembly (in bottom perspective view).

FIG. 16-5A is a schematic diagram of a liquid lens driving mechanism.

FIG. 16-5B shows a cross-sectional view along line 16-A-16-A' in FIG. 16-5A.

FIG. 16-6A is a schematic diagram showing that the liquid lens element is in an initial position and not pressed by the deforming member.

FIG. 16-6B is a schematic diagram showing the liquid lens element being pressed by the deforming member.

Figures 6C, 8:
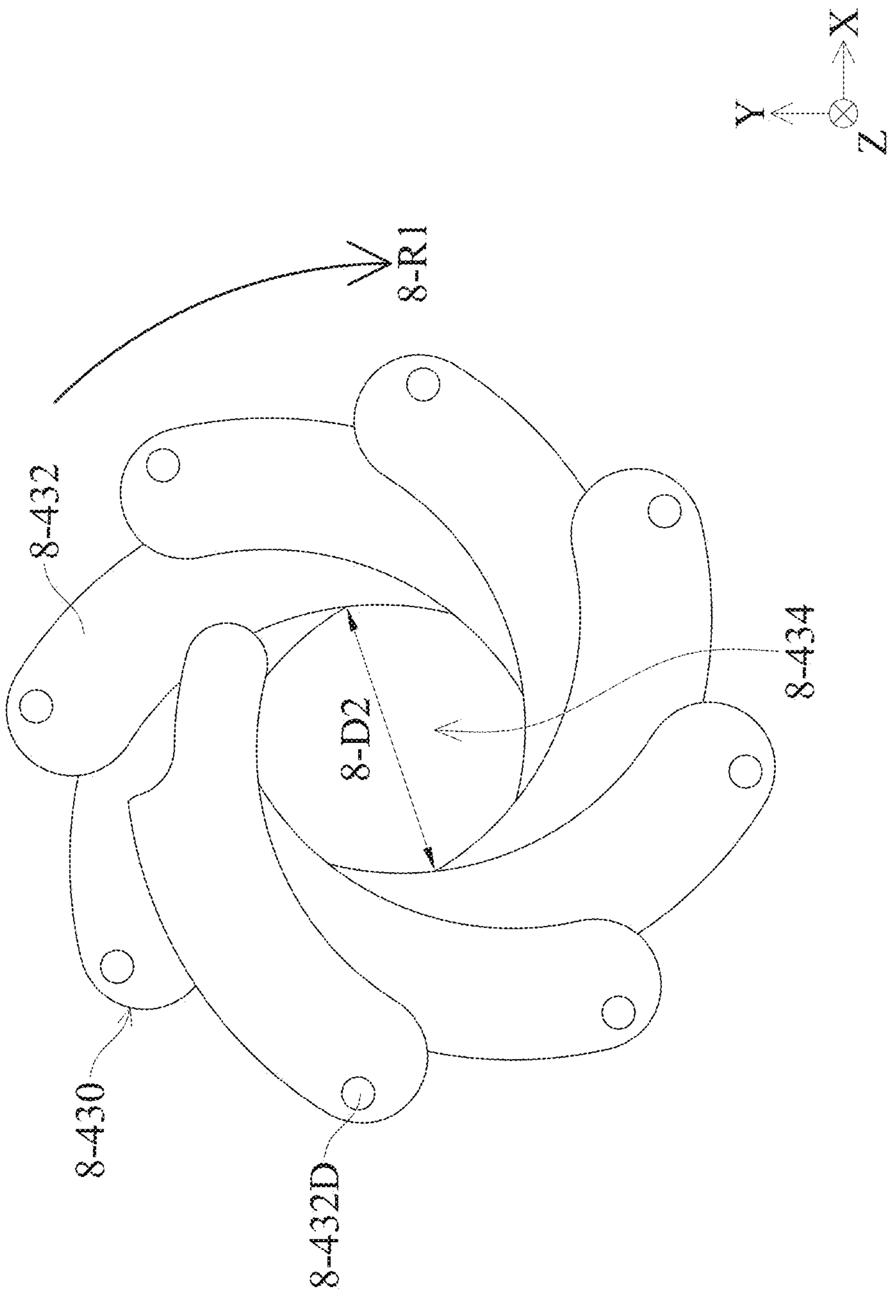
Figures 7A, 8:
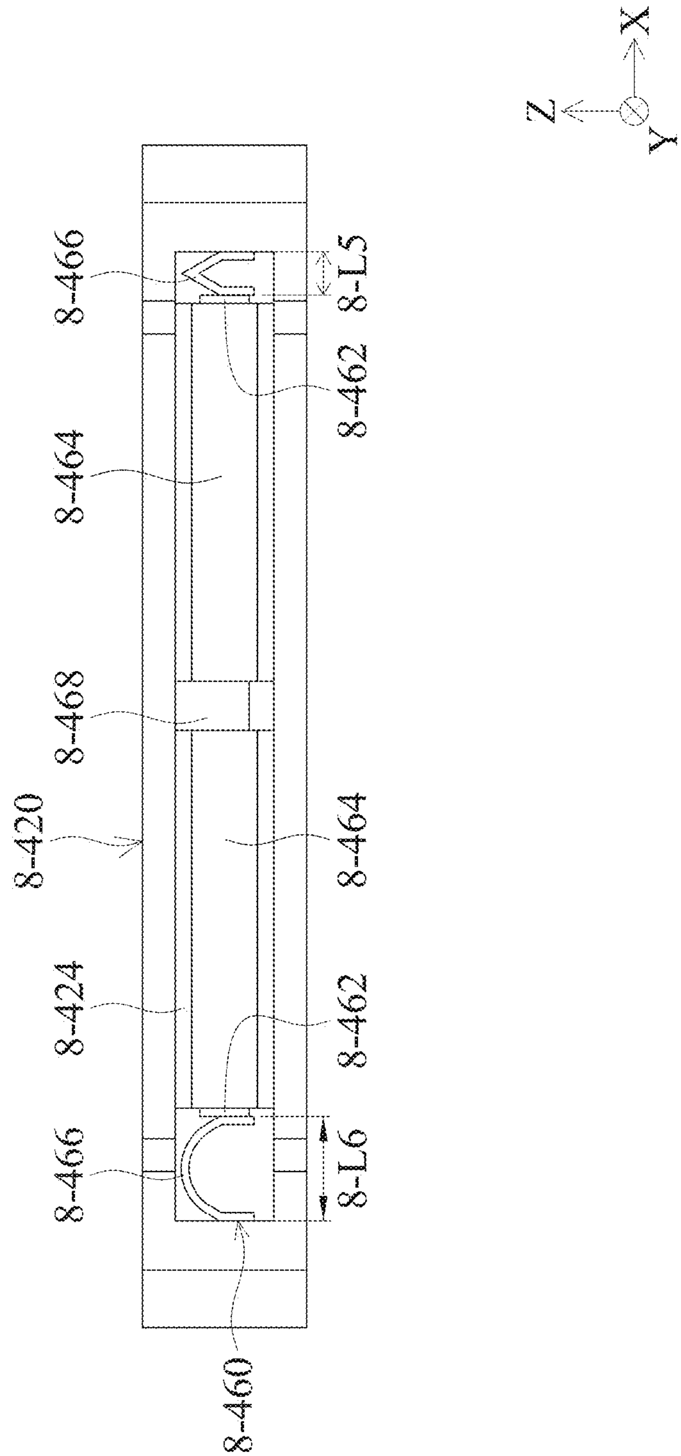
Figures 7B, 8:
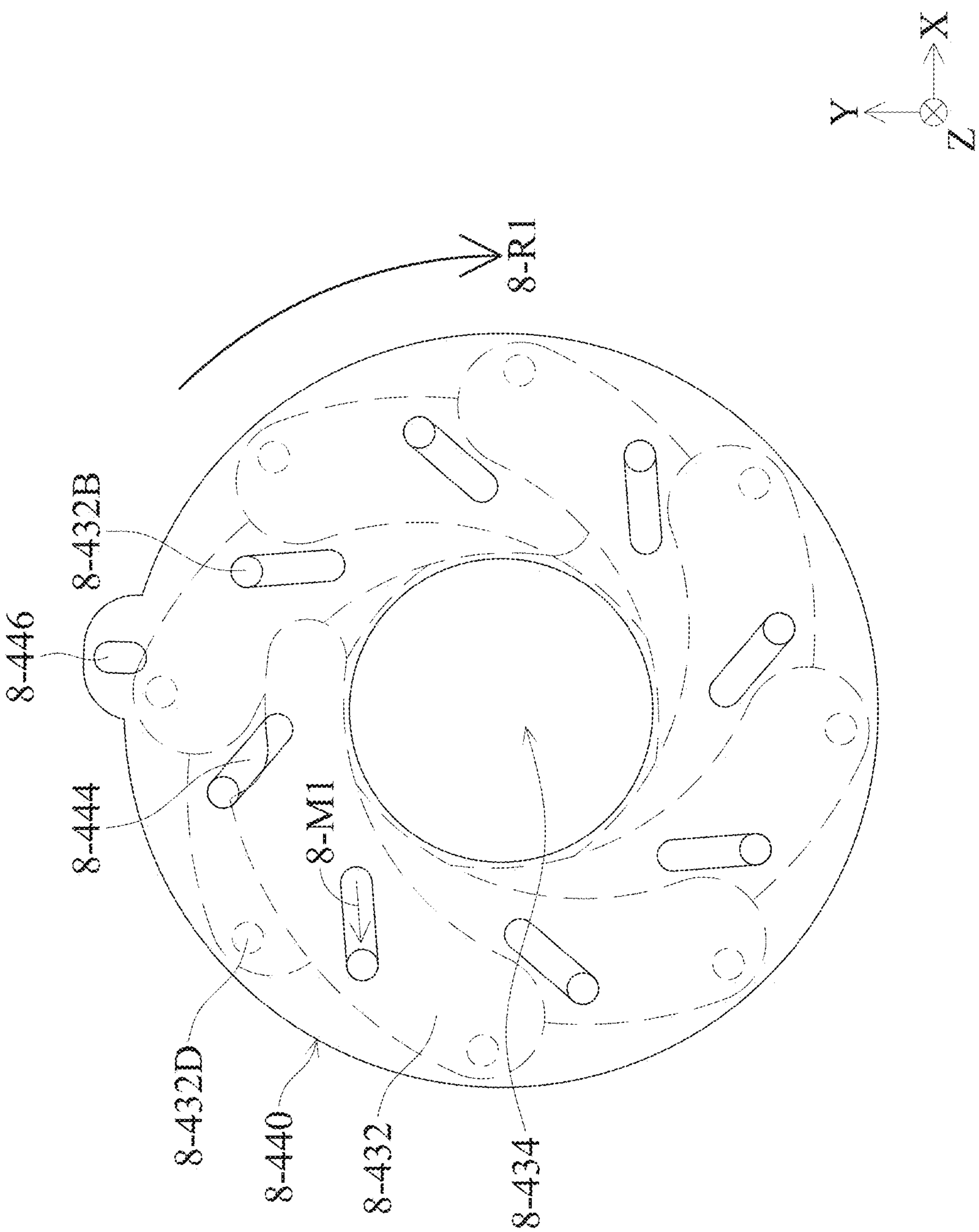
Figures 7C, 8:
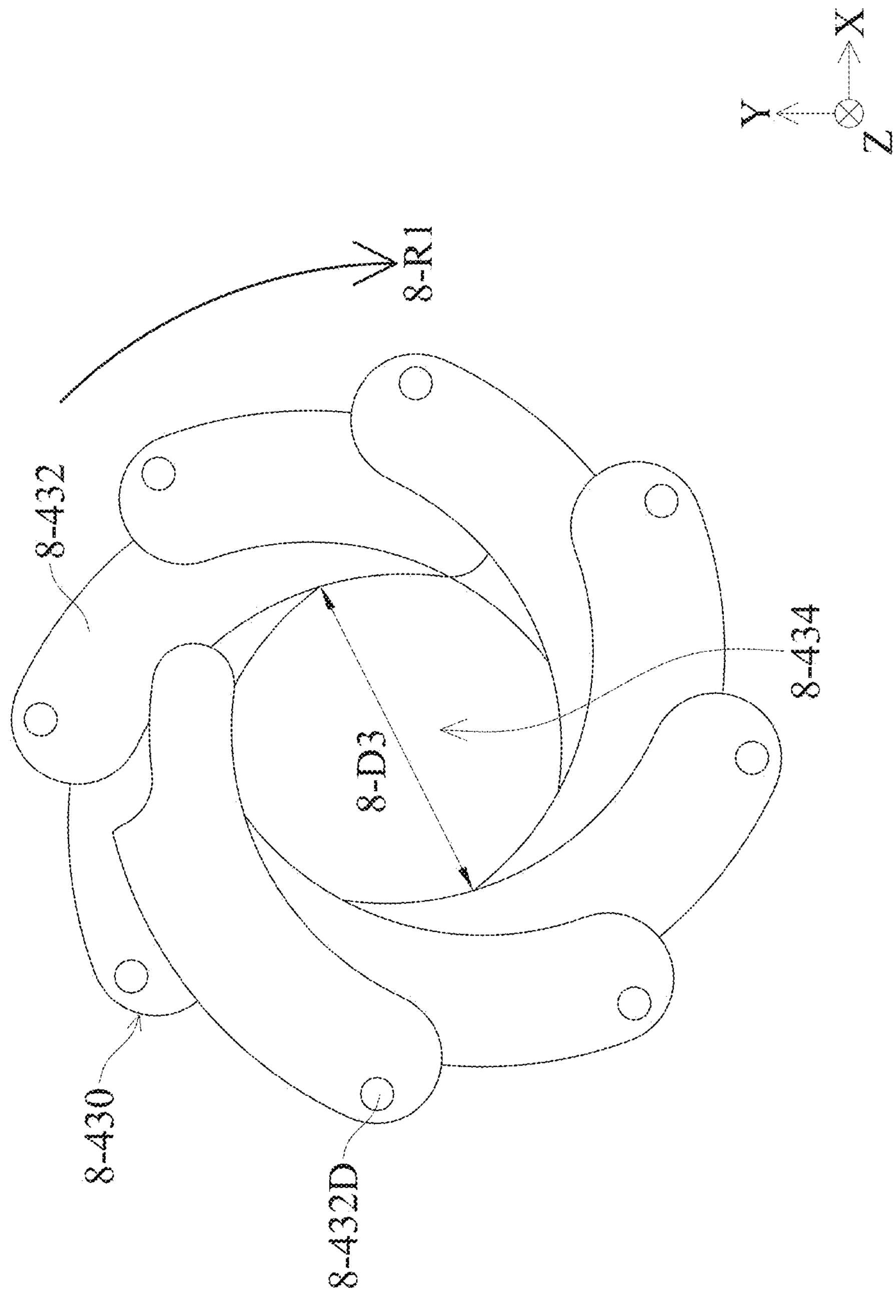
Figures 8, 8A:
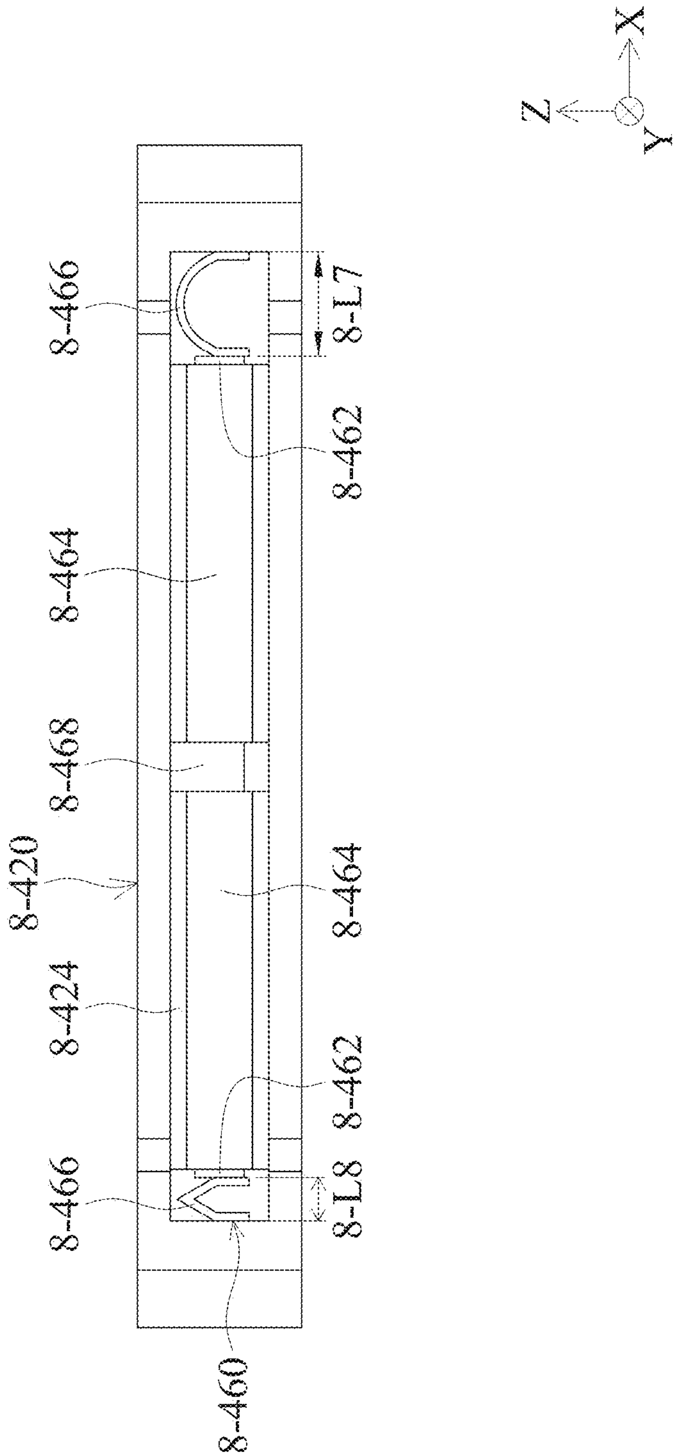
Figures 8, 8B:
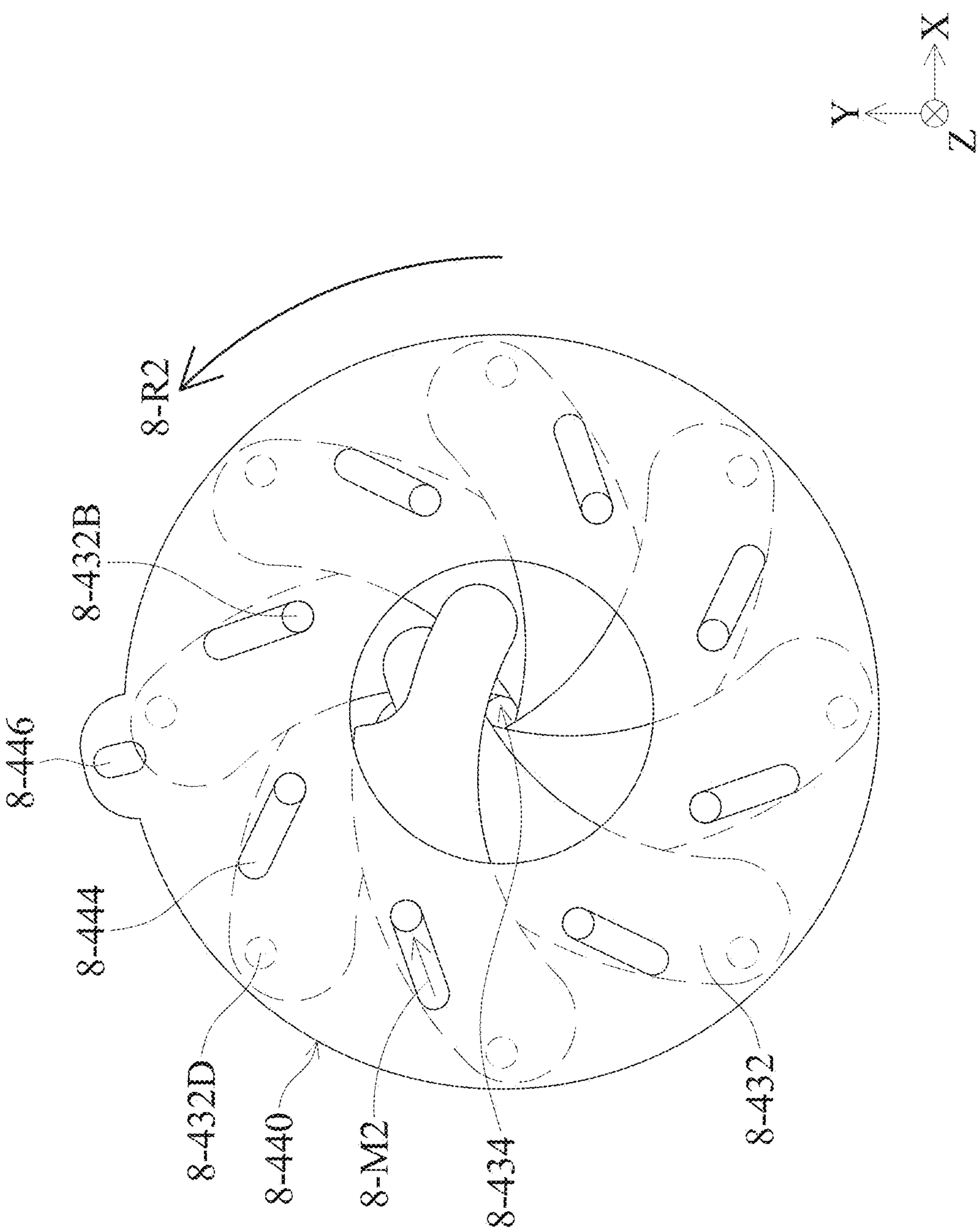

FIG. 16-6C is a schematic diagram showing the liquid lens element being pressed by the deforming member with different forces from FIG. 16-6B.

FIG. 16-7A is a schematic diagram of the frame of the fixed portion and the movable portion.

FIG. 16-7B is a top plan view diagram of the frame of the fixed portion and the movable portion.

FIG. 16-8A is a schematic diagram showing the first and second adhesive members connecting the liquid lens assembly and (the frame and the movable portion of) the liquid lens driving mechanism.

FIG. 16-8B is an enlarged view diagram showing a region 16-T in FIG. 16-8A.

FIG. 17-1 is an exploded view diagram showing an optical system according to an embodiment of the present disclosure.

FIG. 17-2 is a schematic diagram showing the optical system in FIG. 17-1 after assembly.

FIG. 17-3A is a schematic view diagram of the liquid lens assembly and the liquid lens drive mechanism (the outer casing 17-H is omitted).

FIG. 17-3B is a schematic view diagram showing the assembly of the liquid lens assembly and the frame and the movable portion of the liquid lens driving mechanism.

FIG. 17-4 is a schematic diagram of the first optical module and the image sensor module.

FIG. 17-5A is a perspective cross-sectional view diagram taken along the line 17-A-17-A' in FIG. 17-2, wherein the outer casing 17-H is separated.

FIG. 17-5B is a plan cross-sectional view diagram taken along the line 17-A-17-A' in FIG. 17-2.

Figures 1, 17:
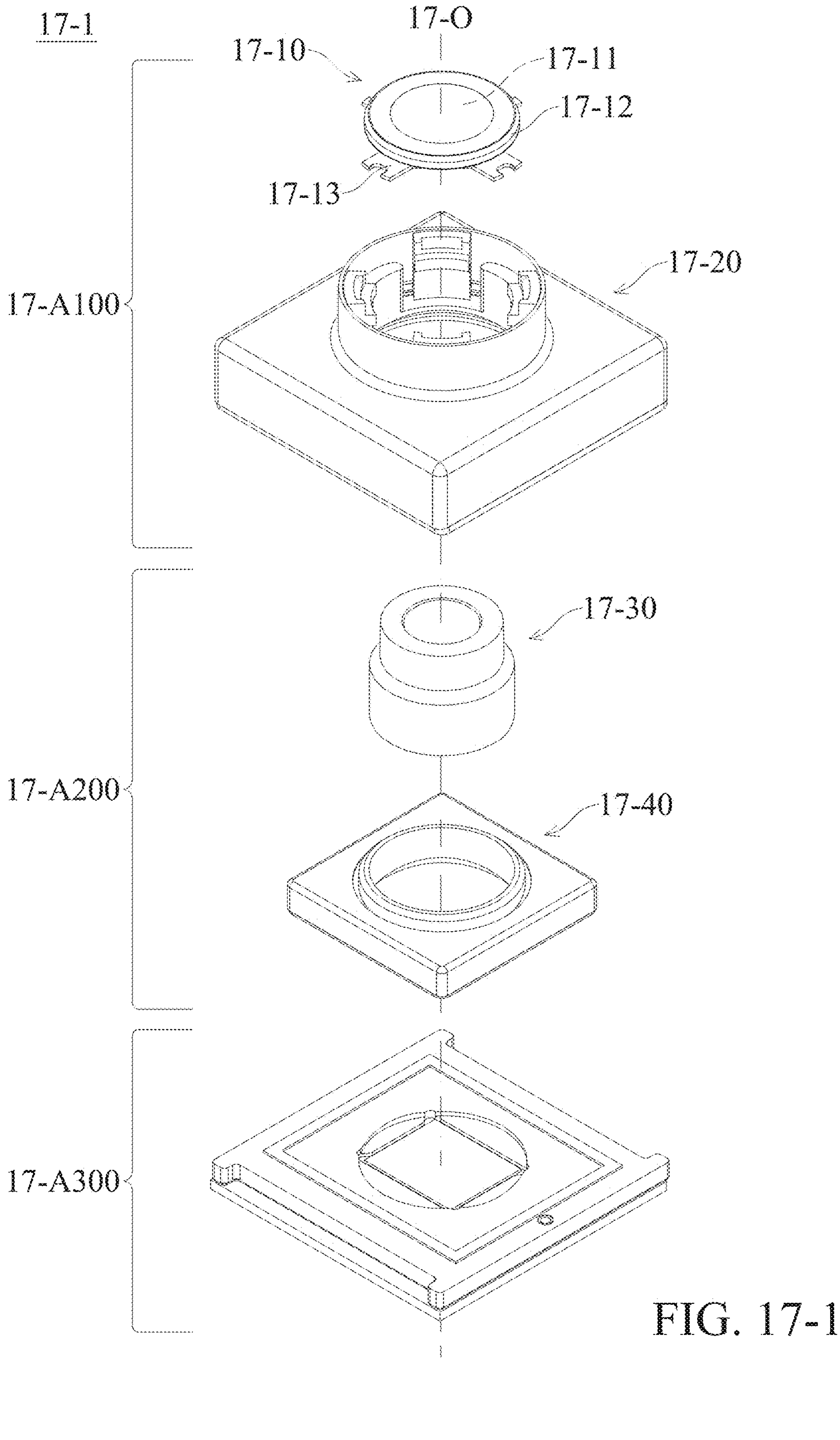
Figures 2, 17:
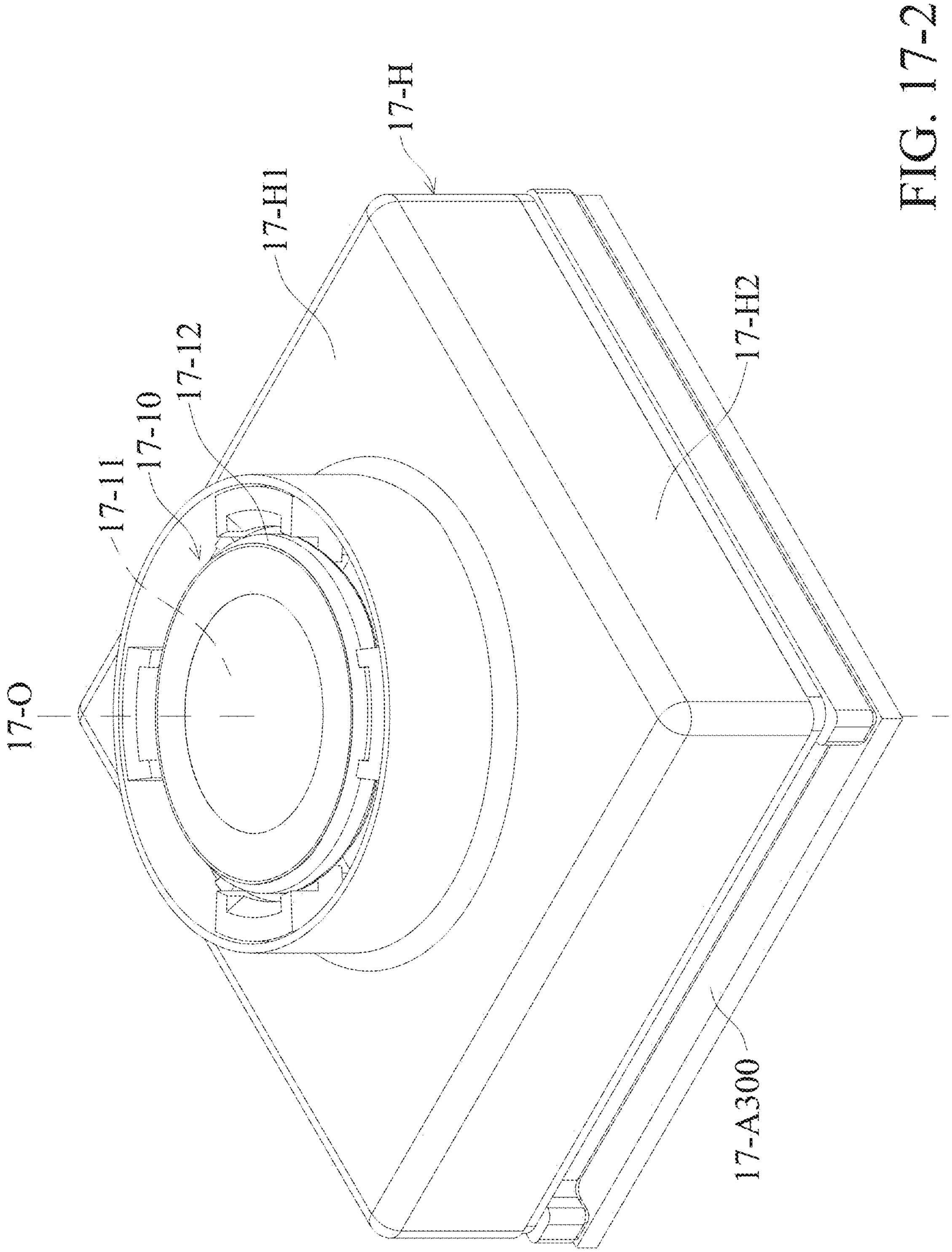
Figures 3A, 17:
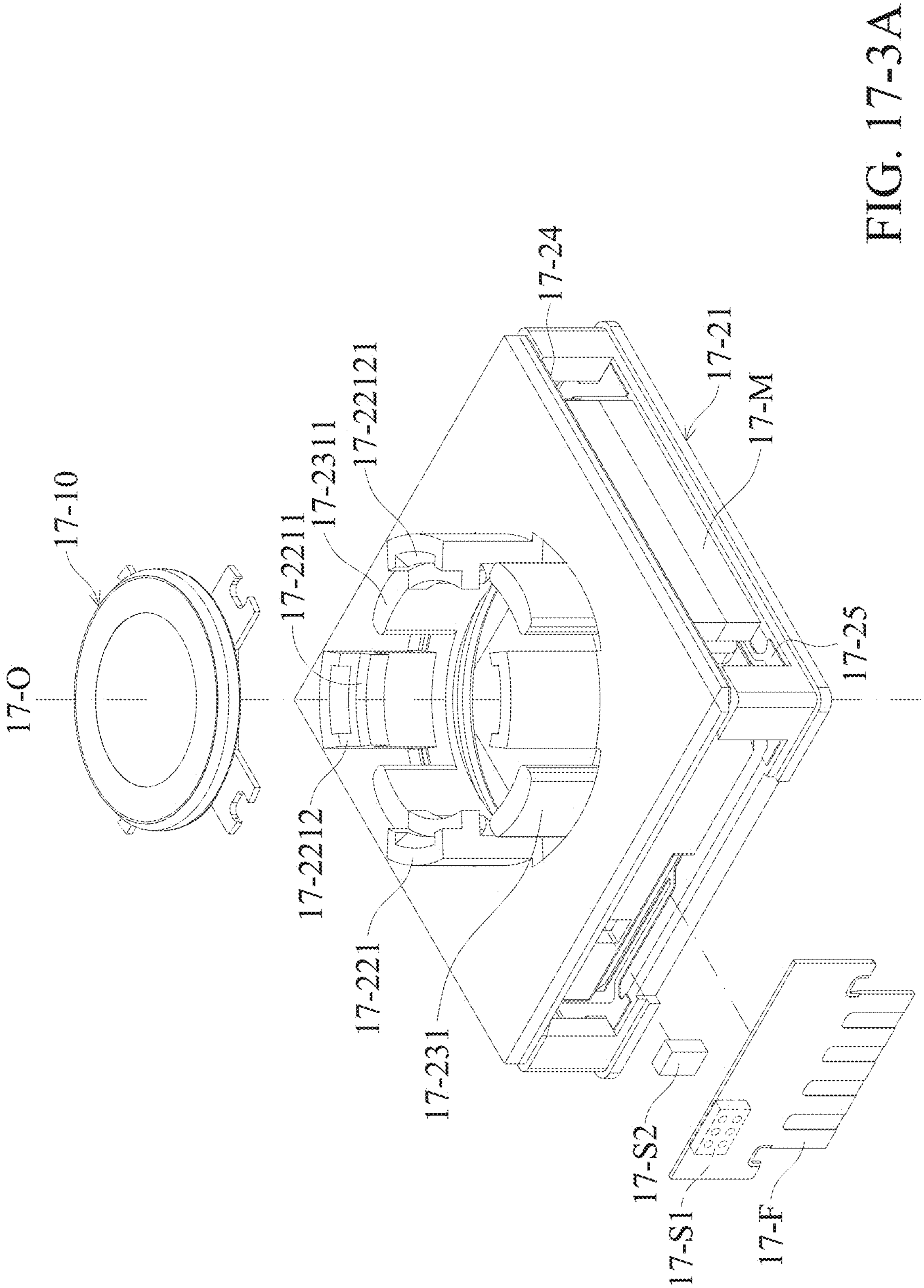
Figures 3B, 17:
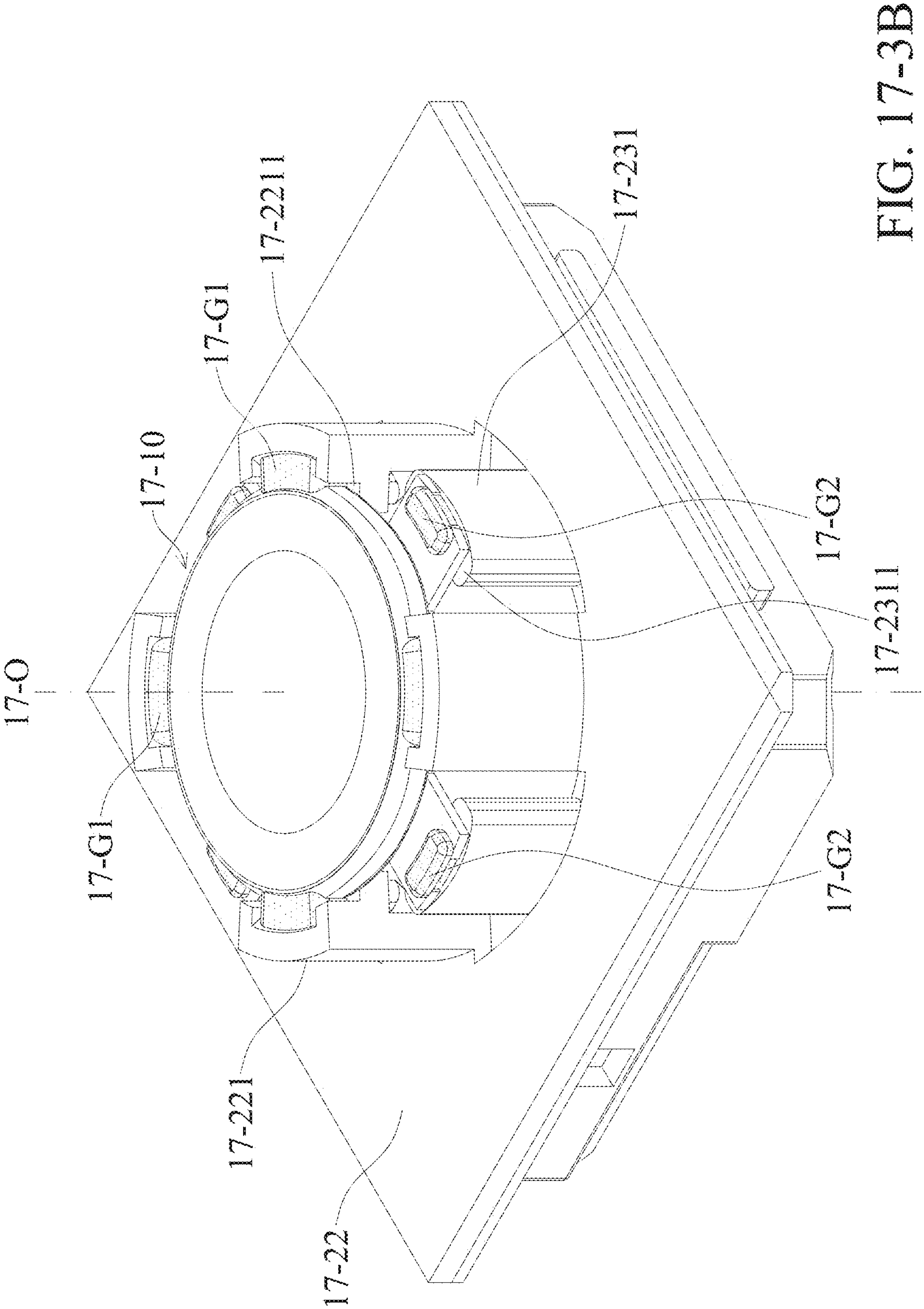
Figures 4, 17:
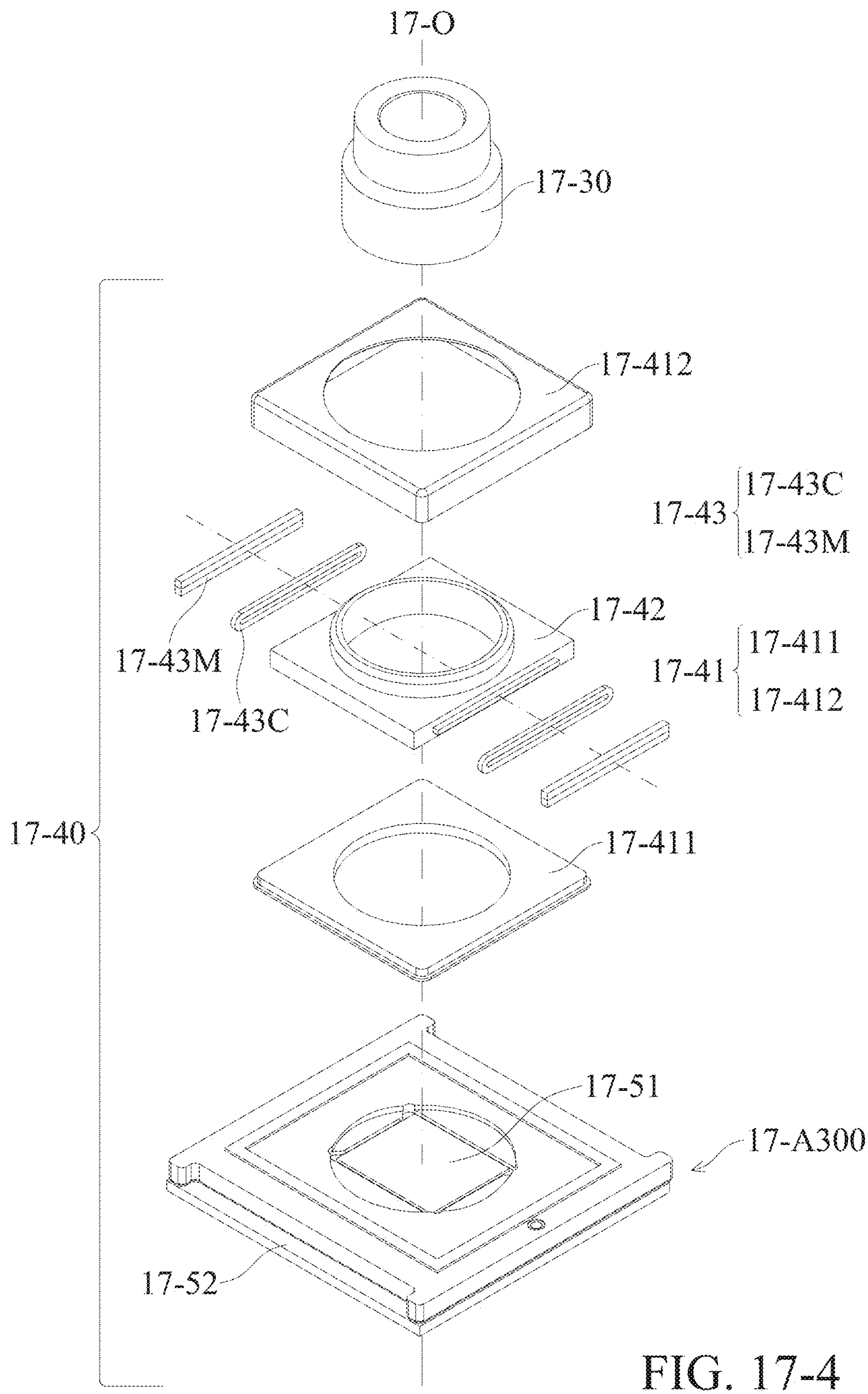
Figures 5A, 17:
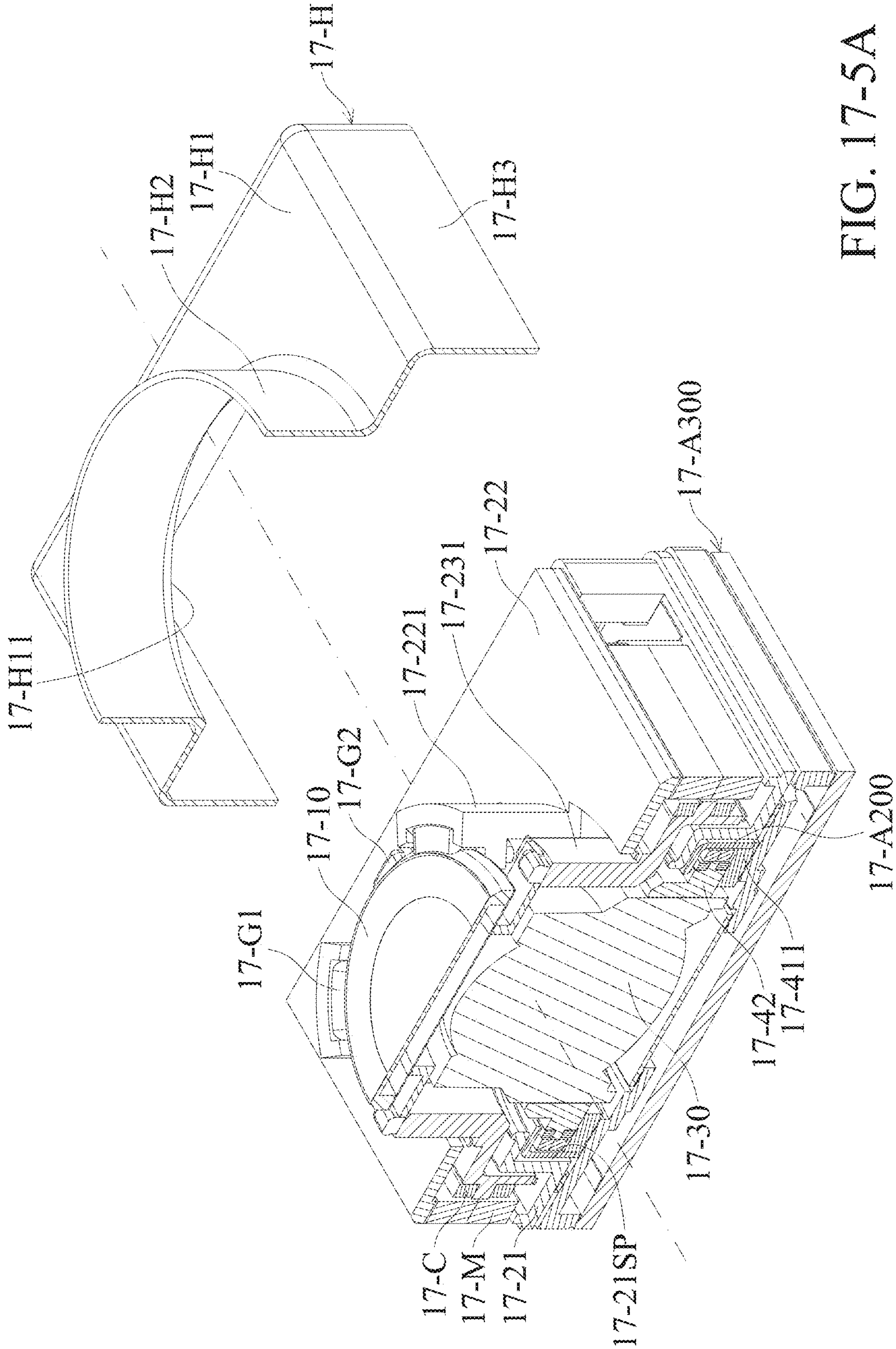
Figures 5B, 17:
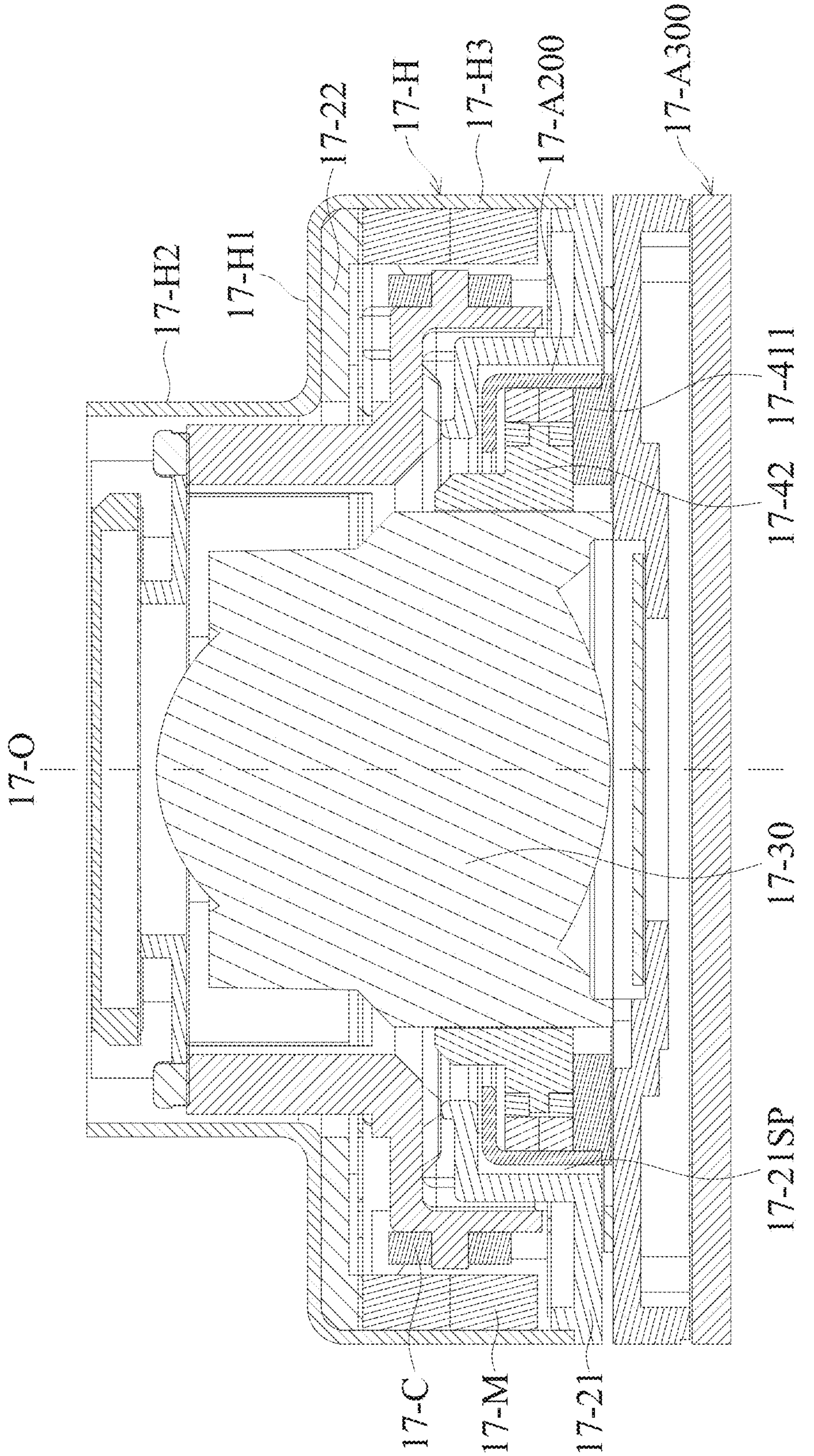
Figures 6A, 17:
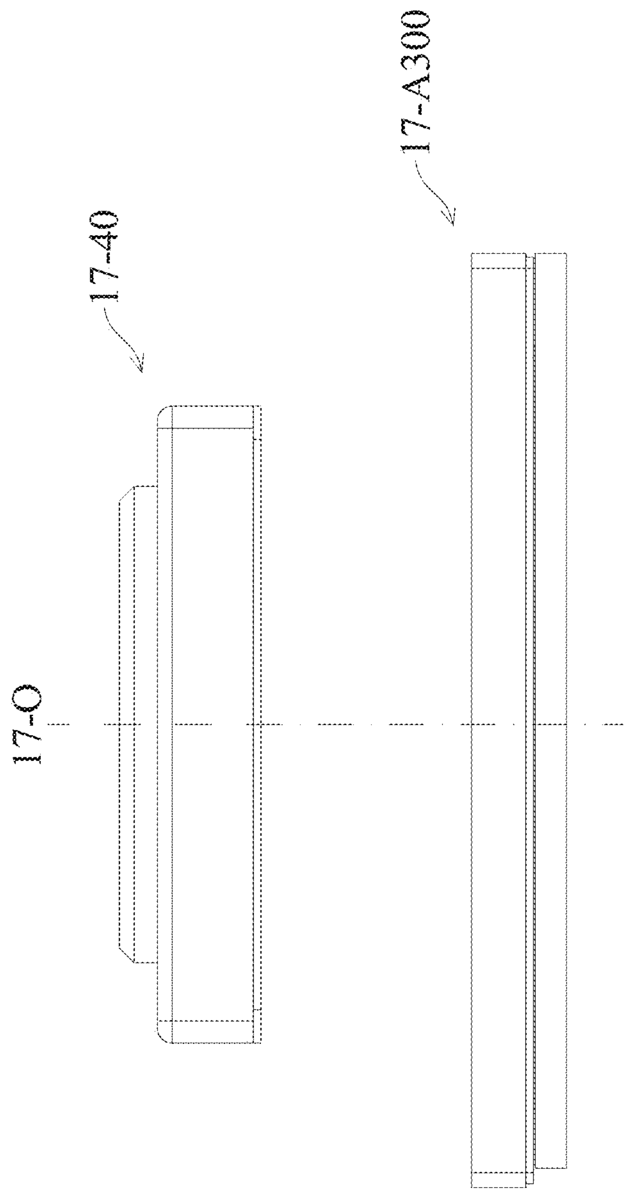
Figures 6B, 17:
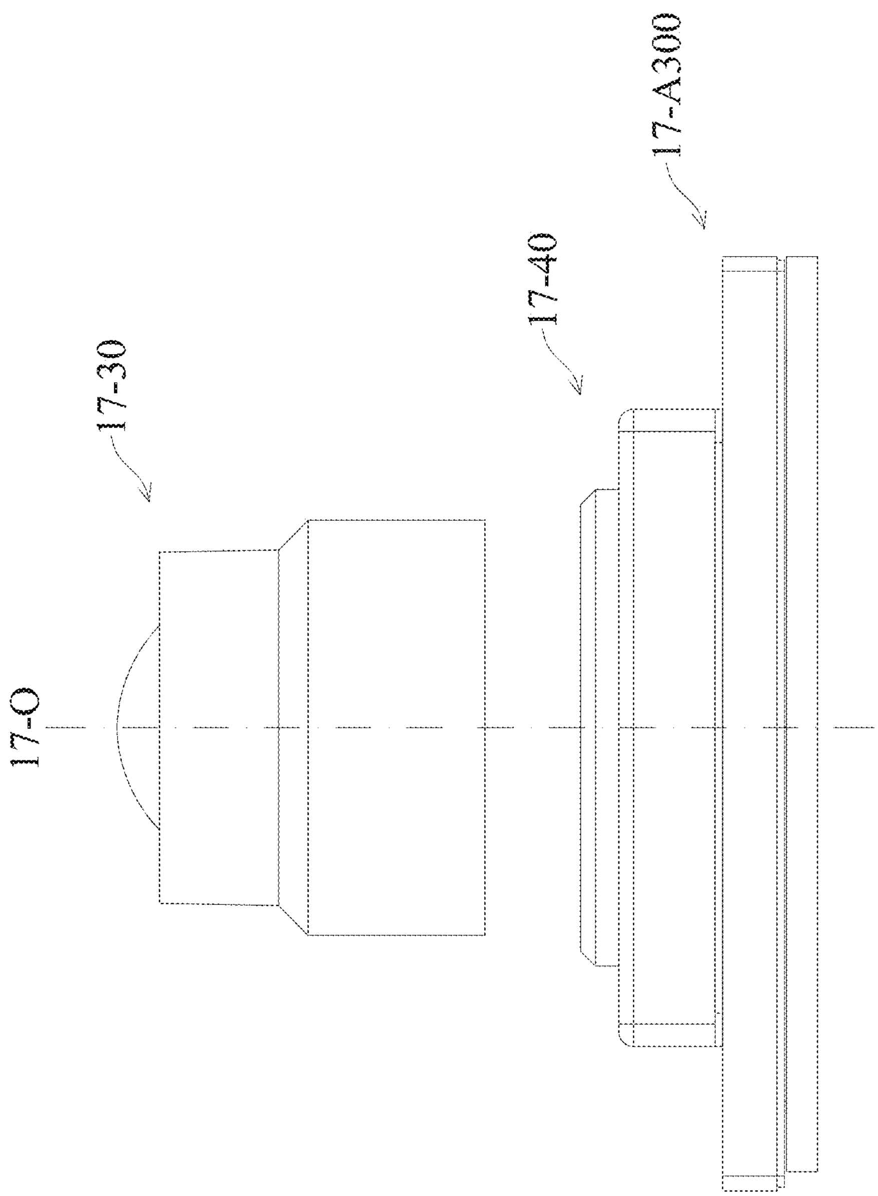
Figures 6C, 17:
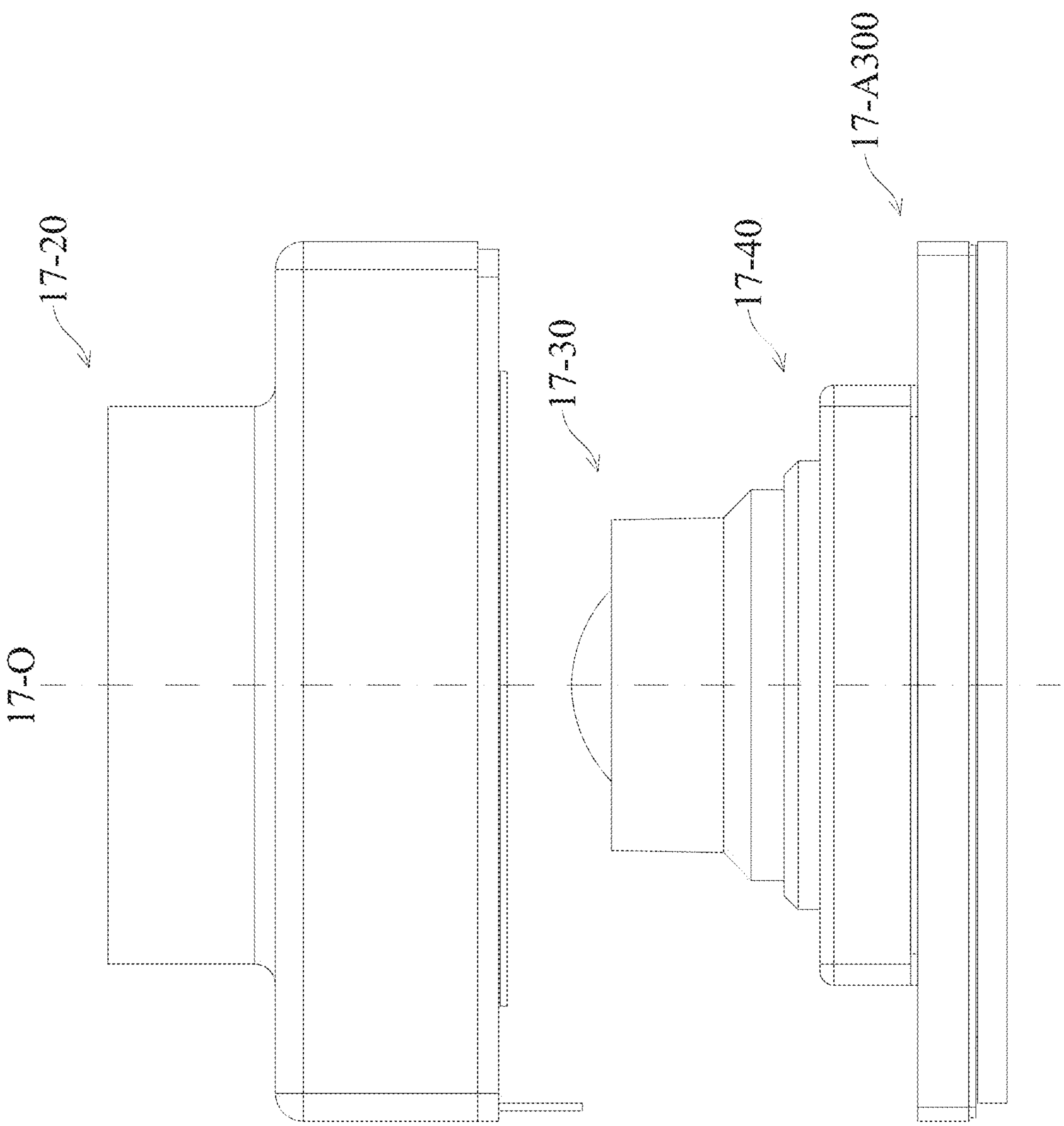
Figures 6D, 17:
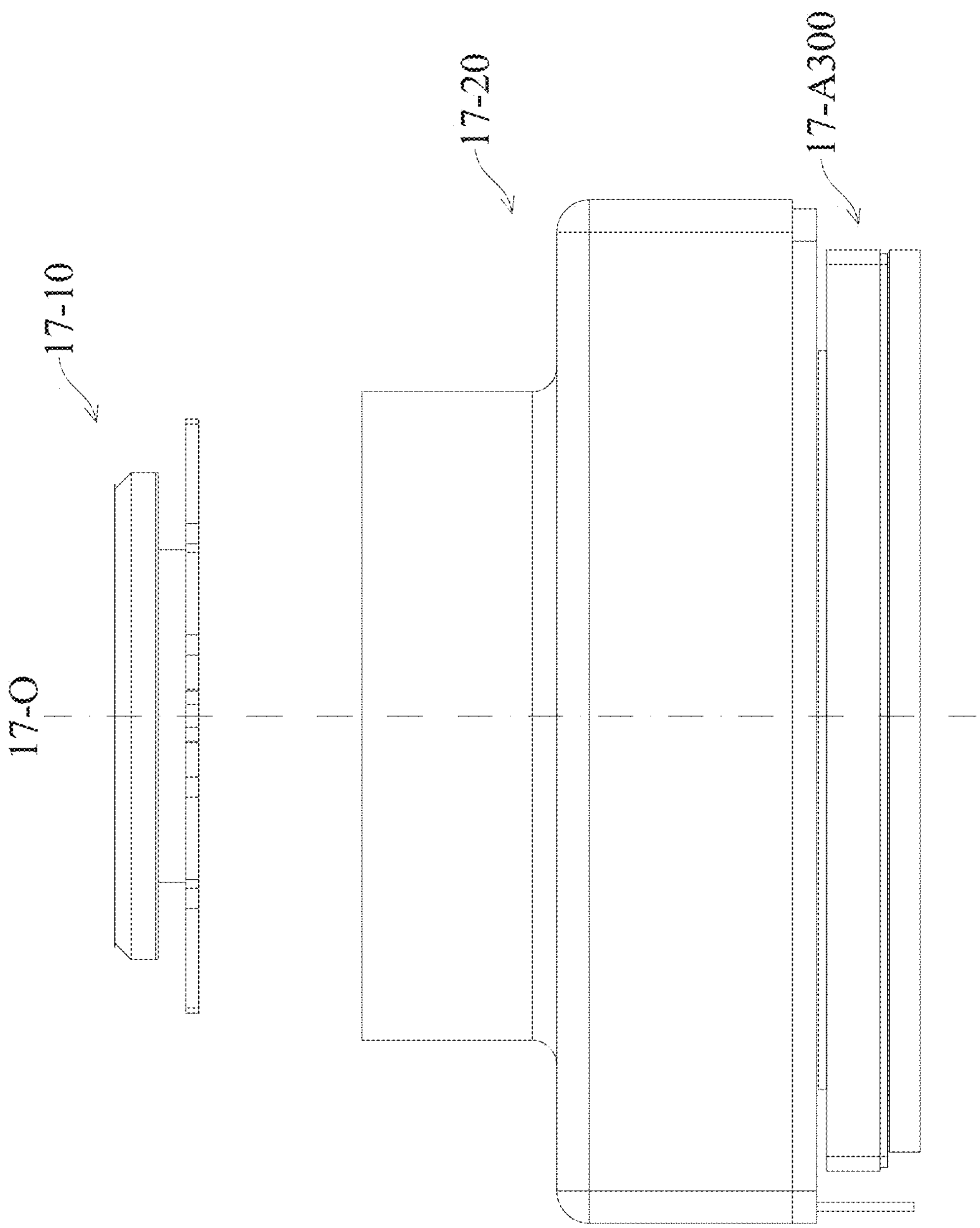
Figures 7, 17:
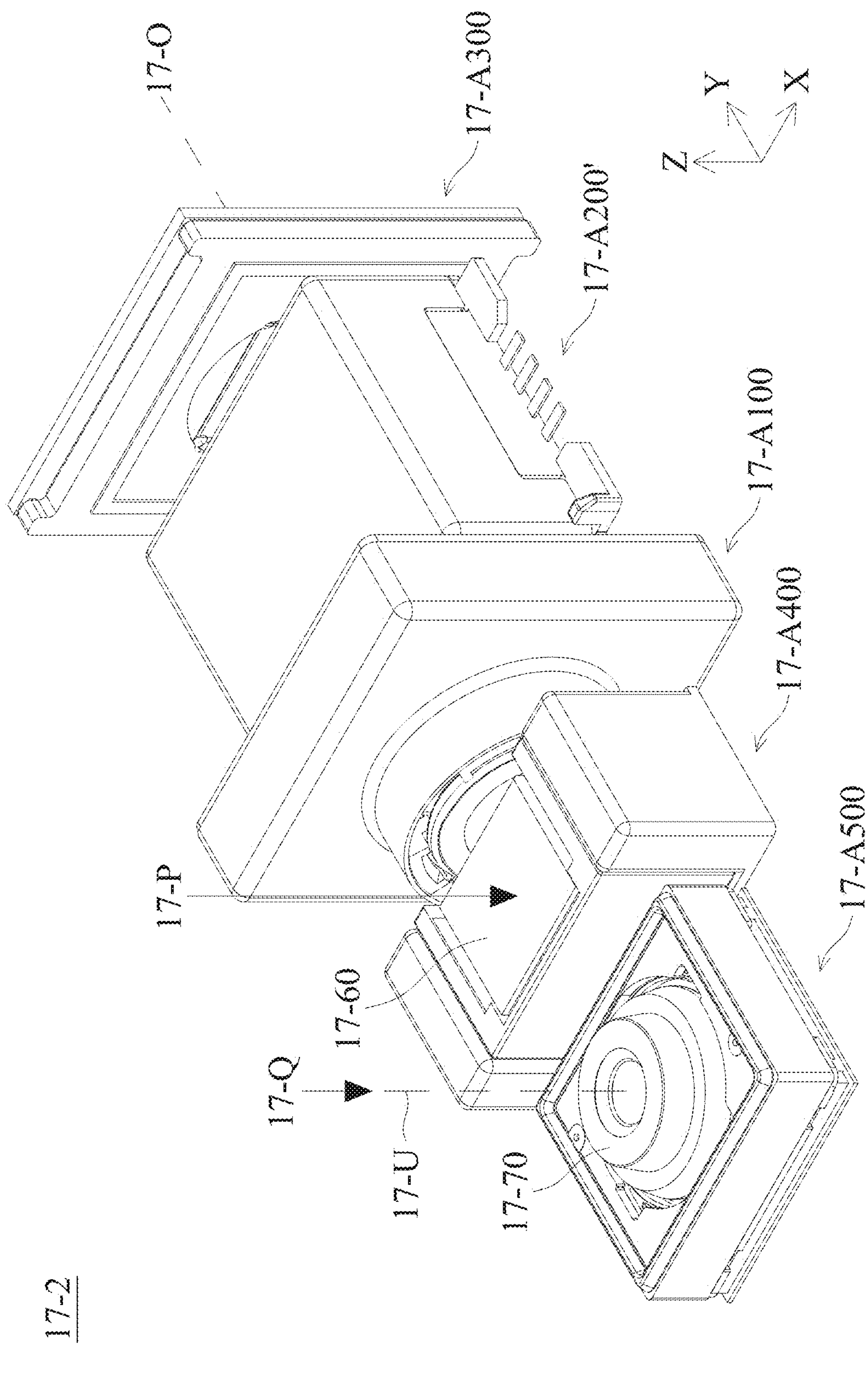
Figures 8, 17:
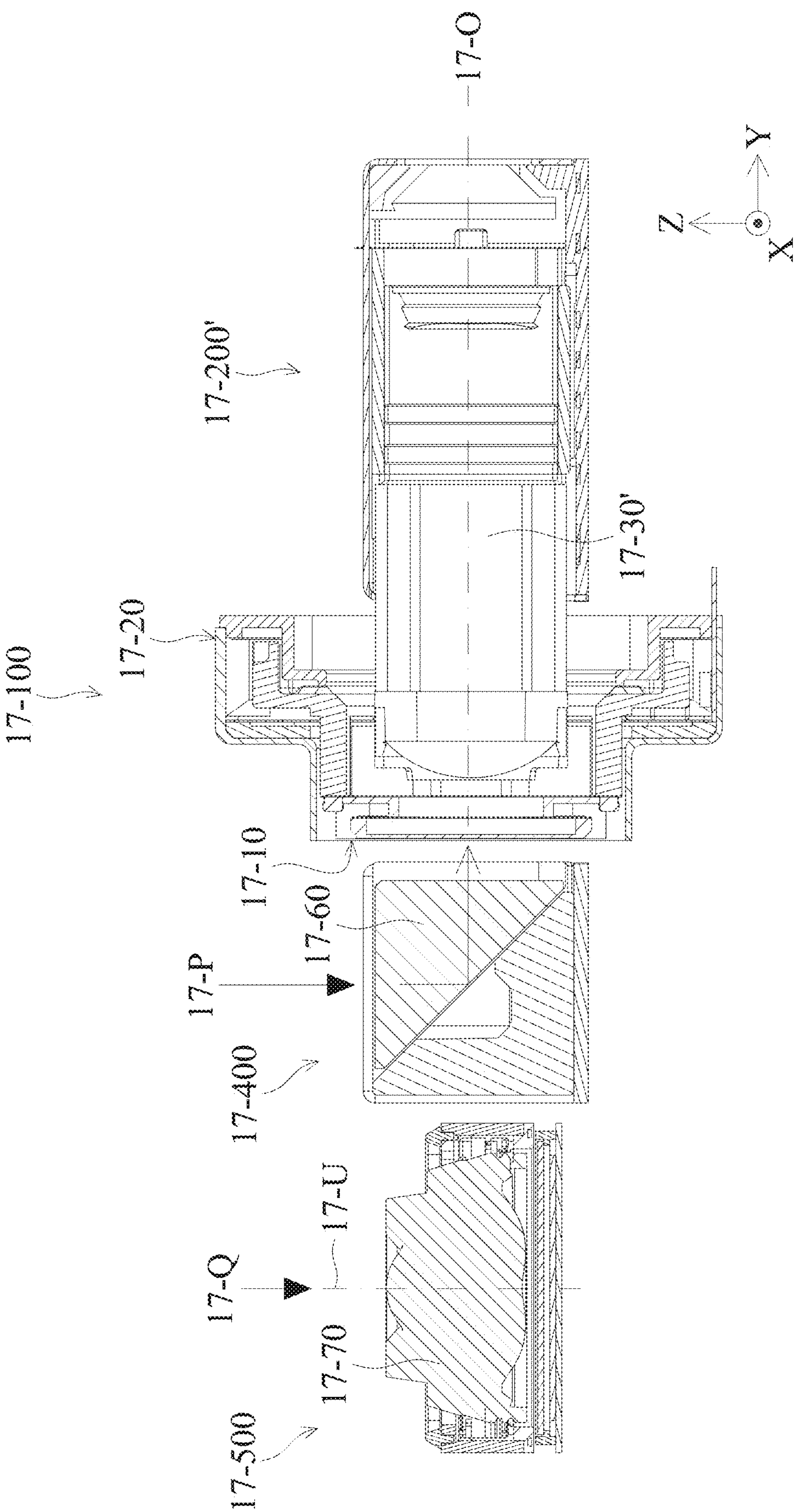
Figures 1, 18:
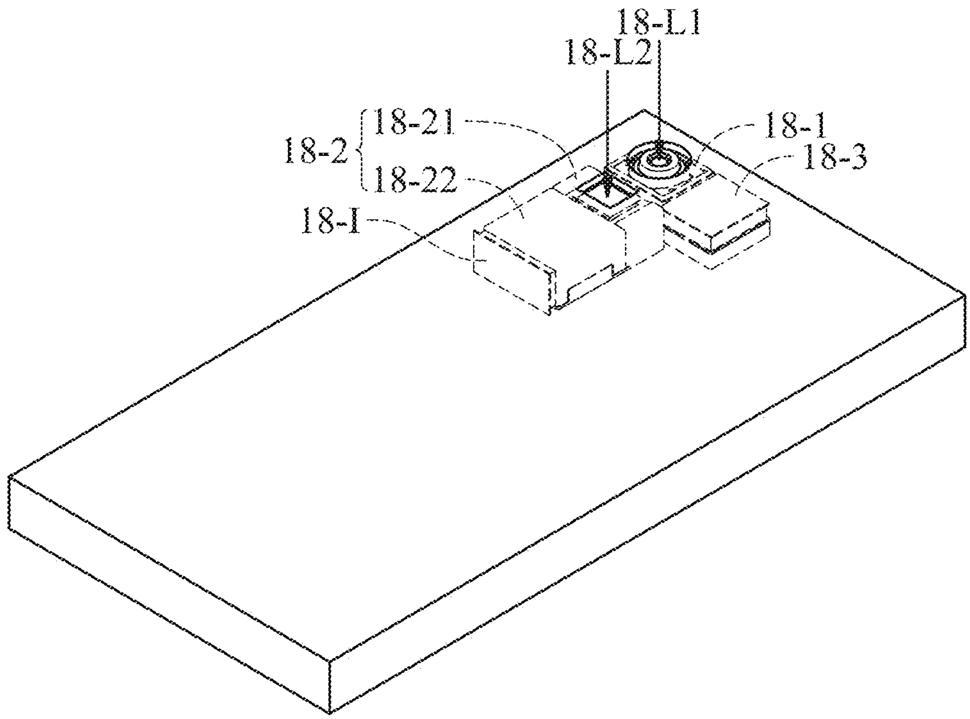
Figures 2, 18:
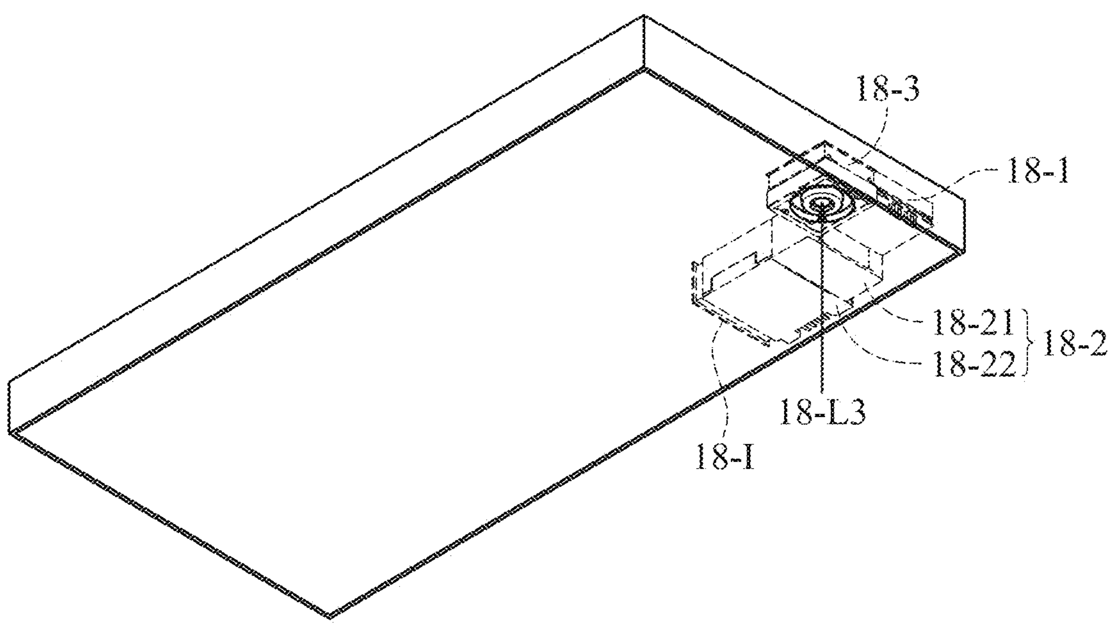
Figures 3, 18:
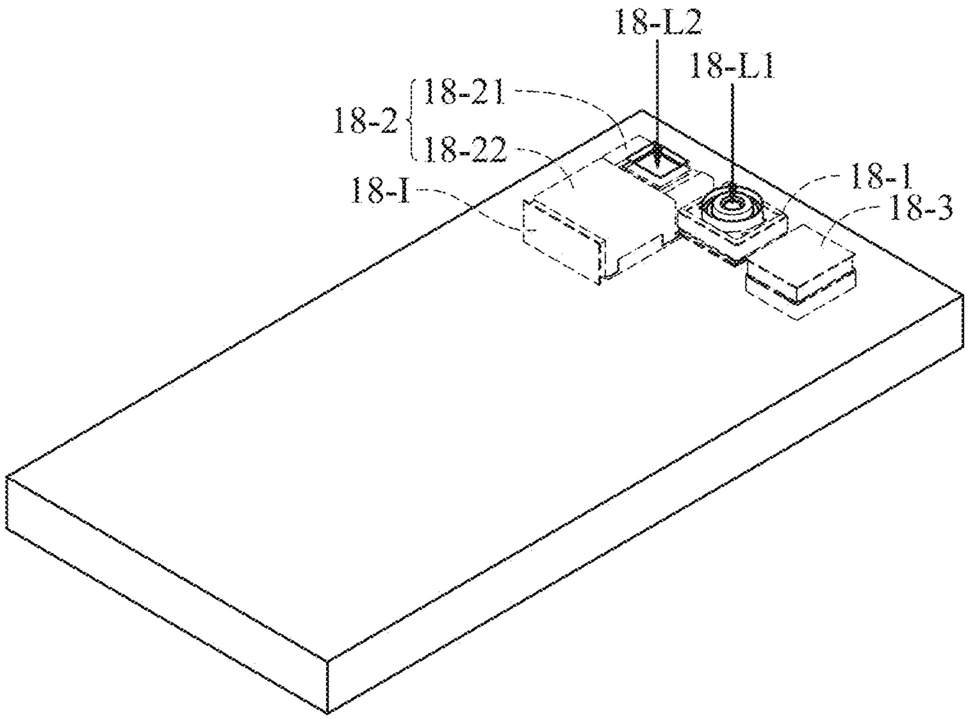
Figures 4, 18:
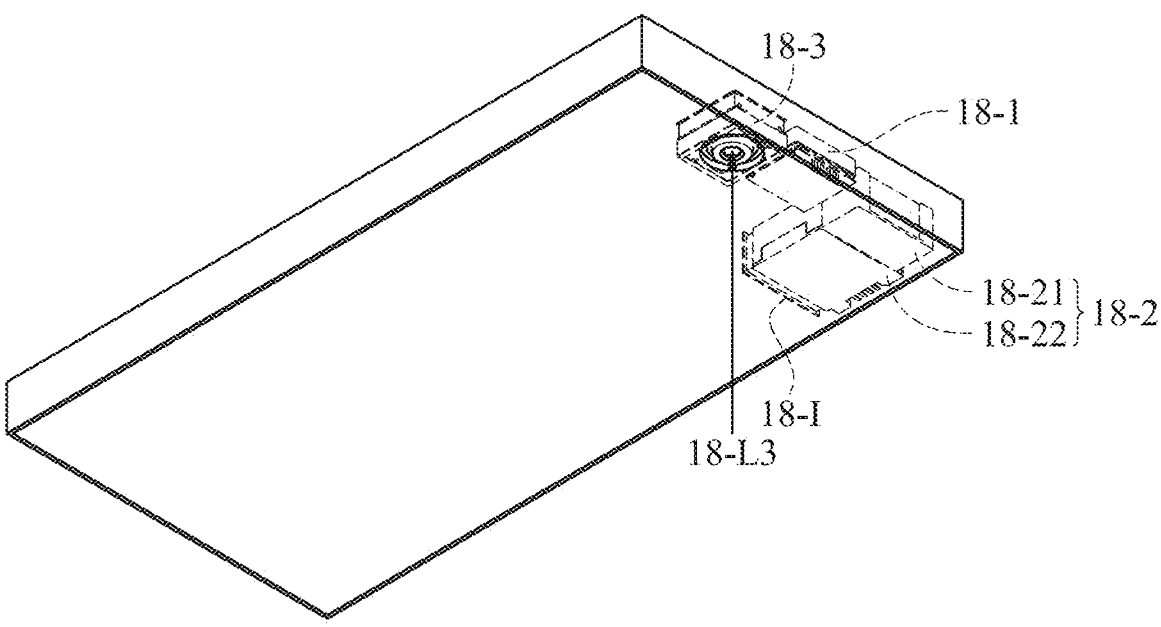
Figures 5, 18:
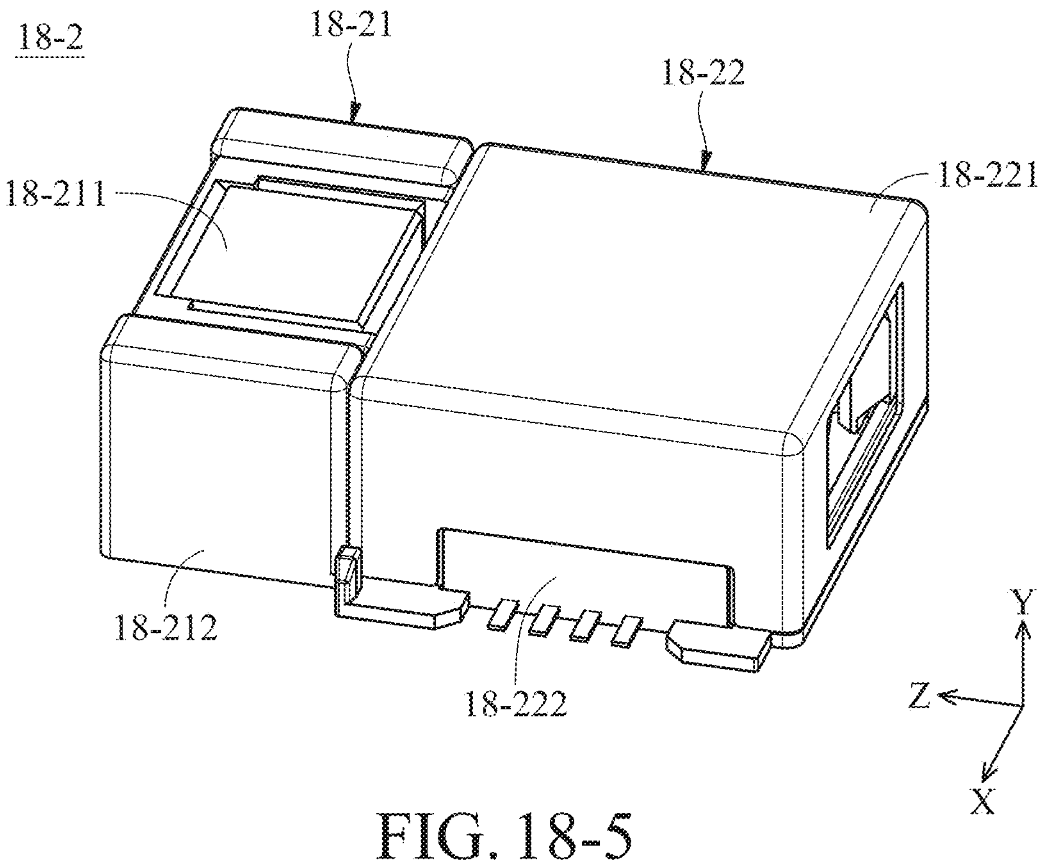
Figures 6, 18:
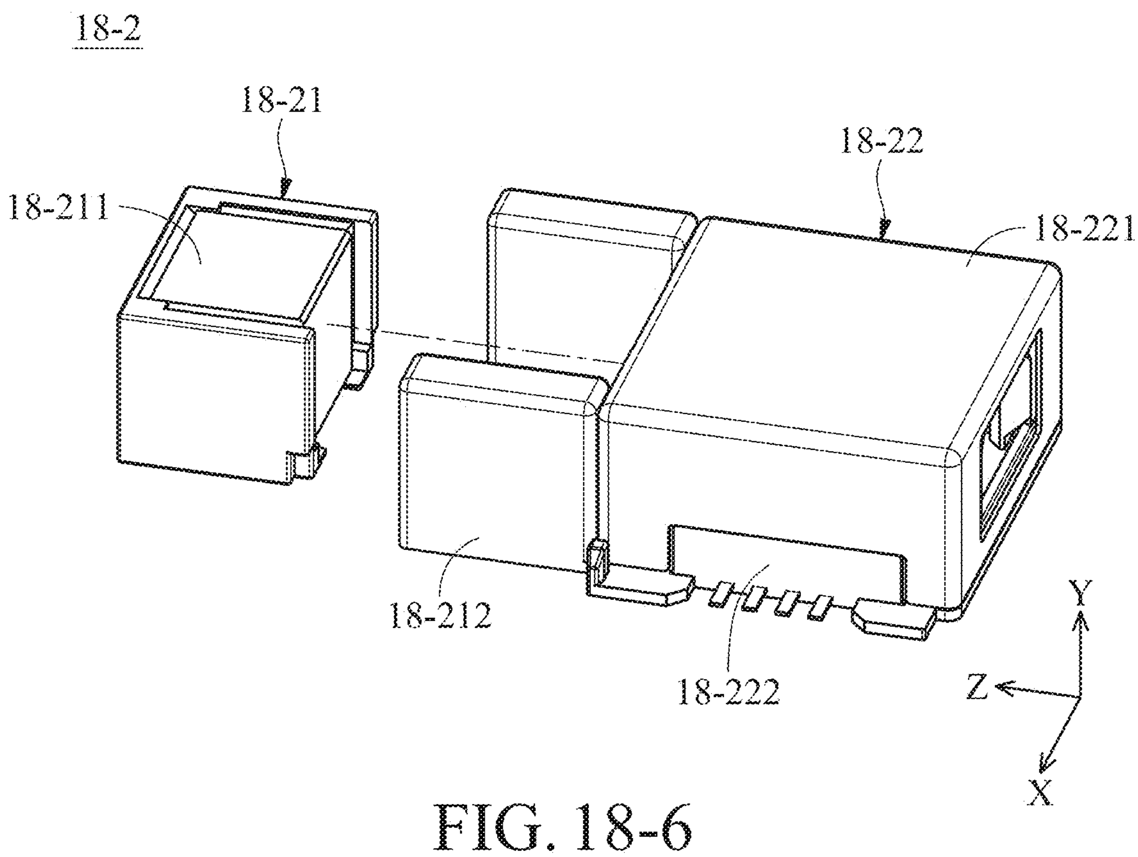
Figures 7, 18:
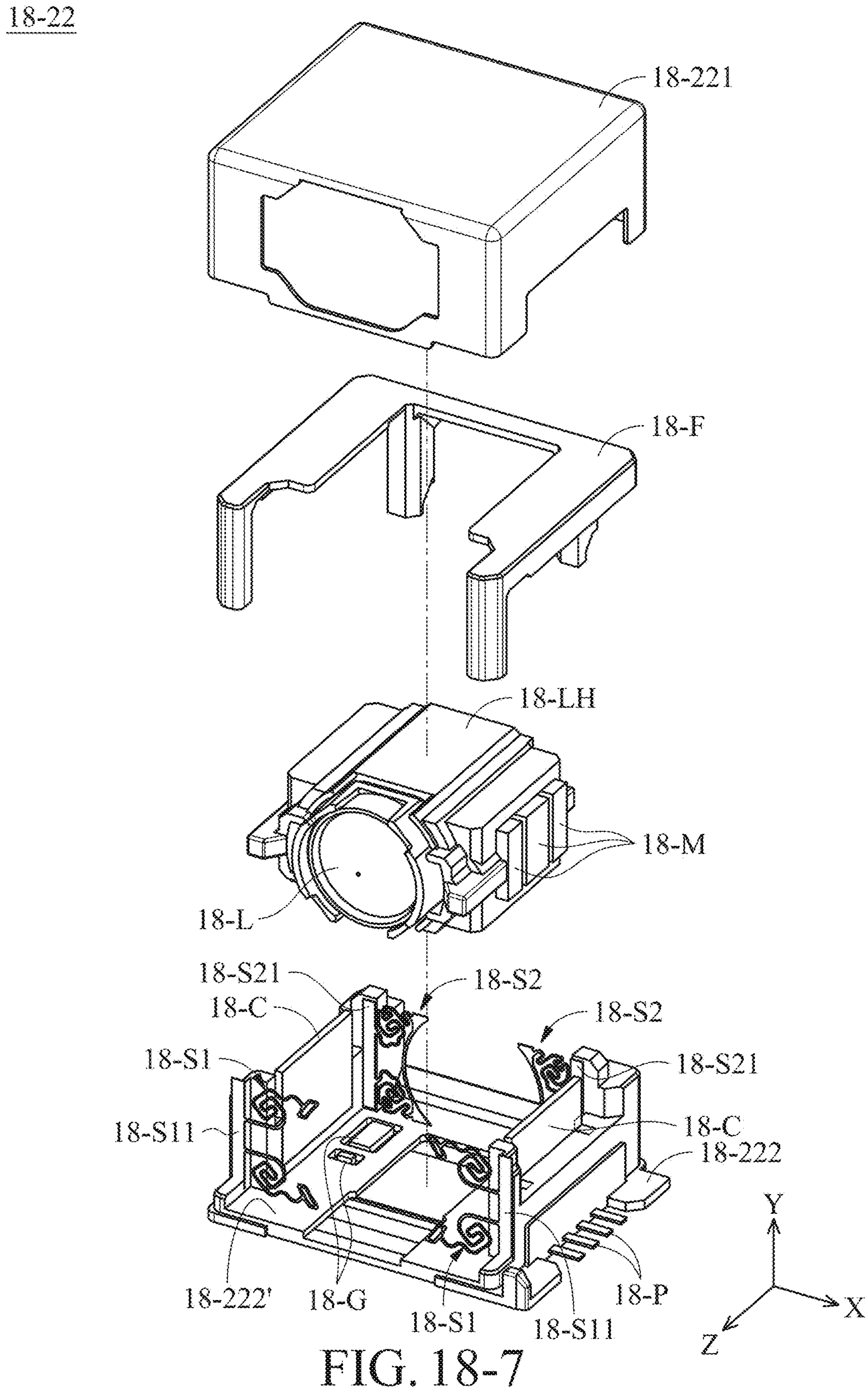
Figures 8, 18:
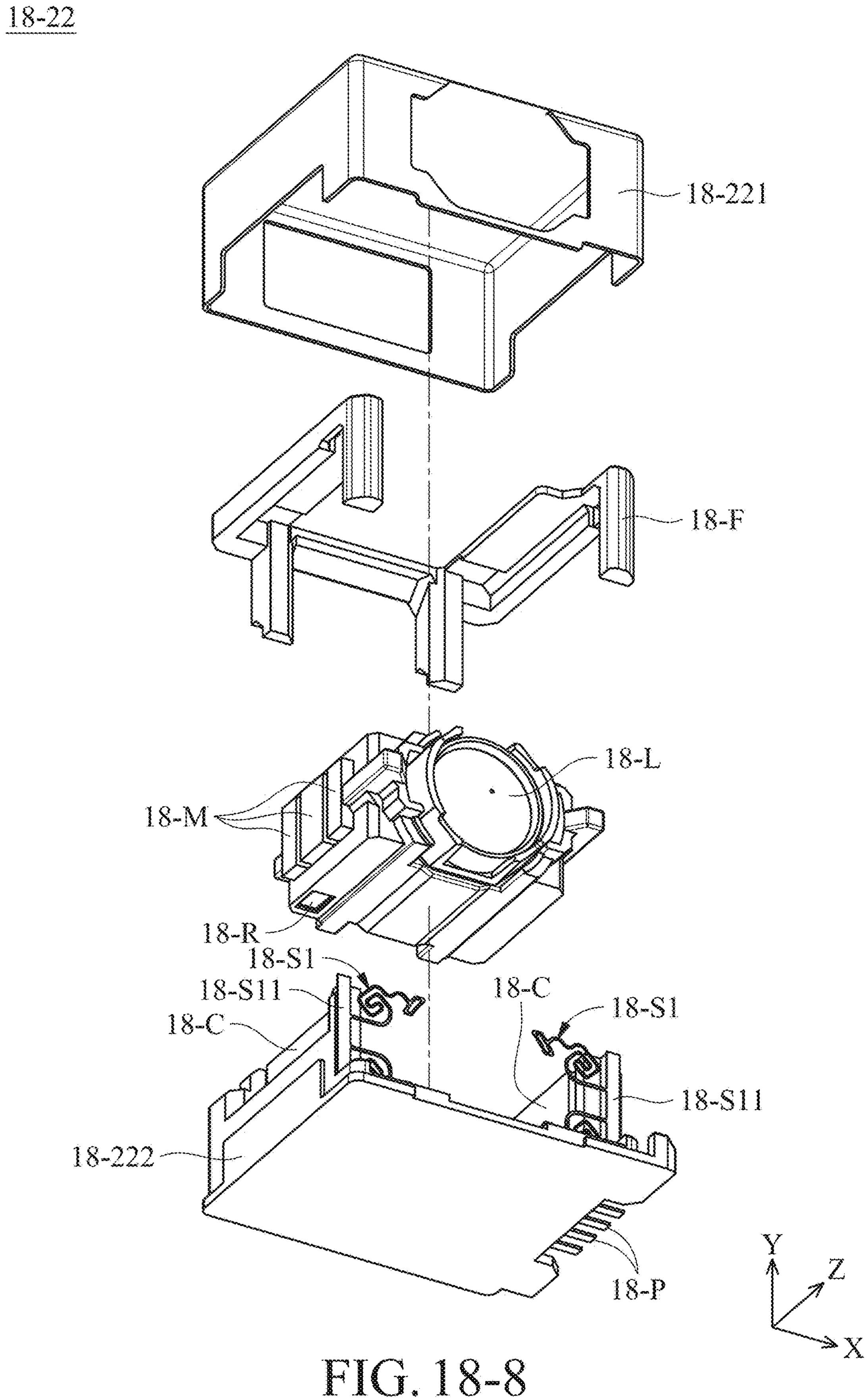
Figures 9, 18:
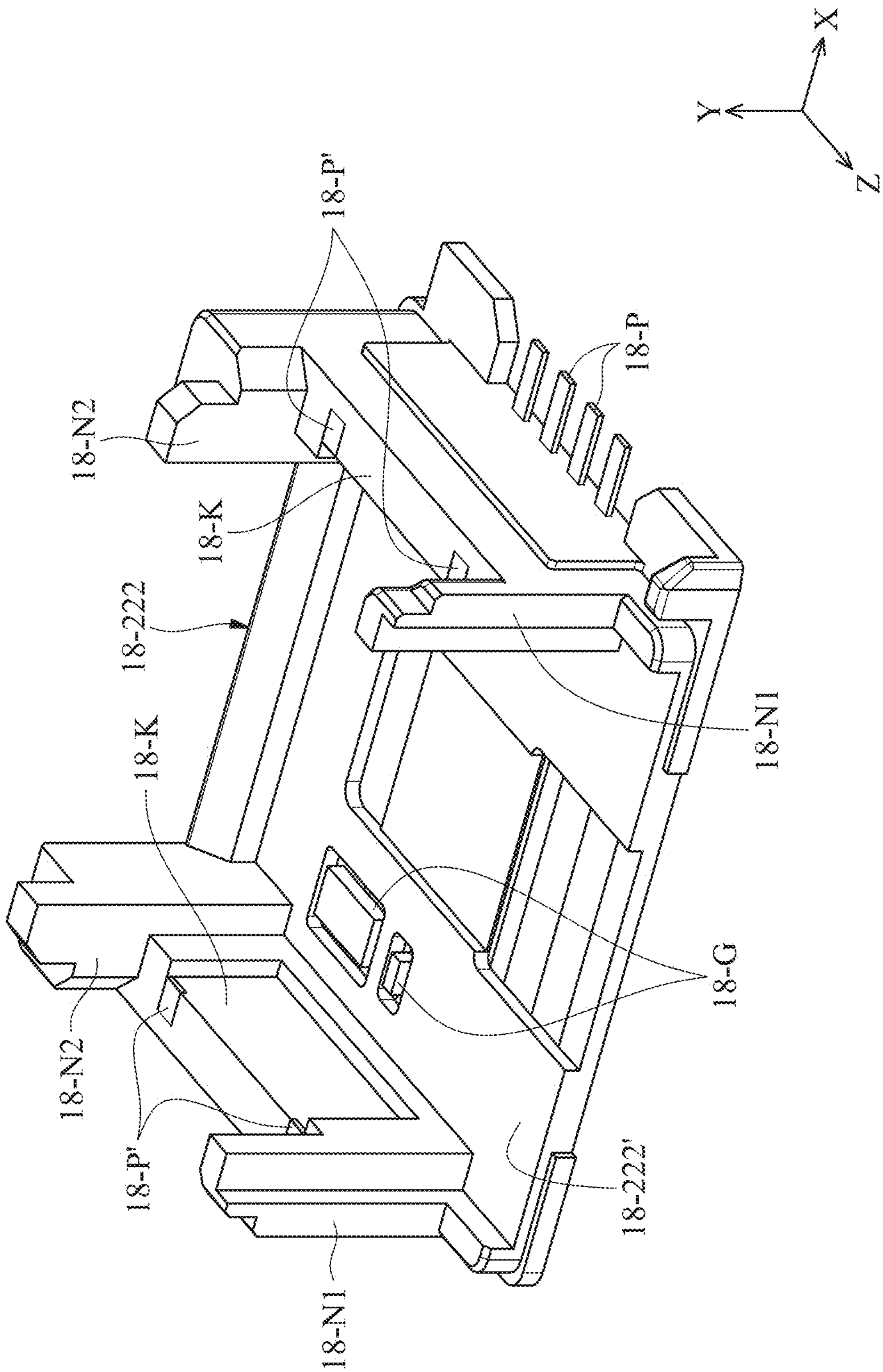
Figures 10, 18:
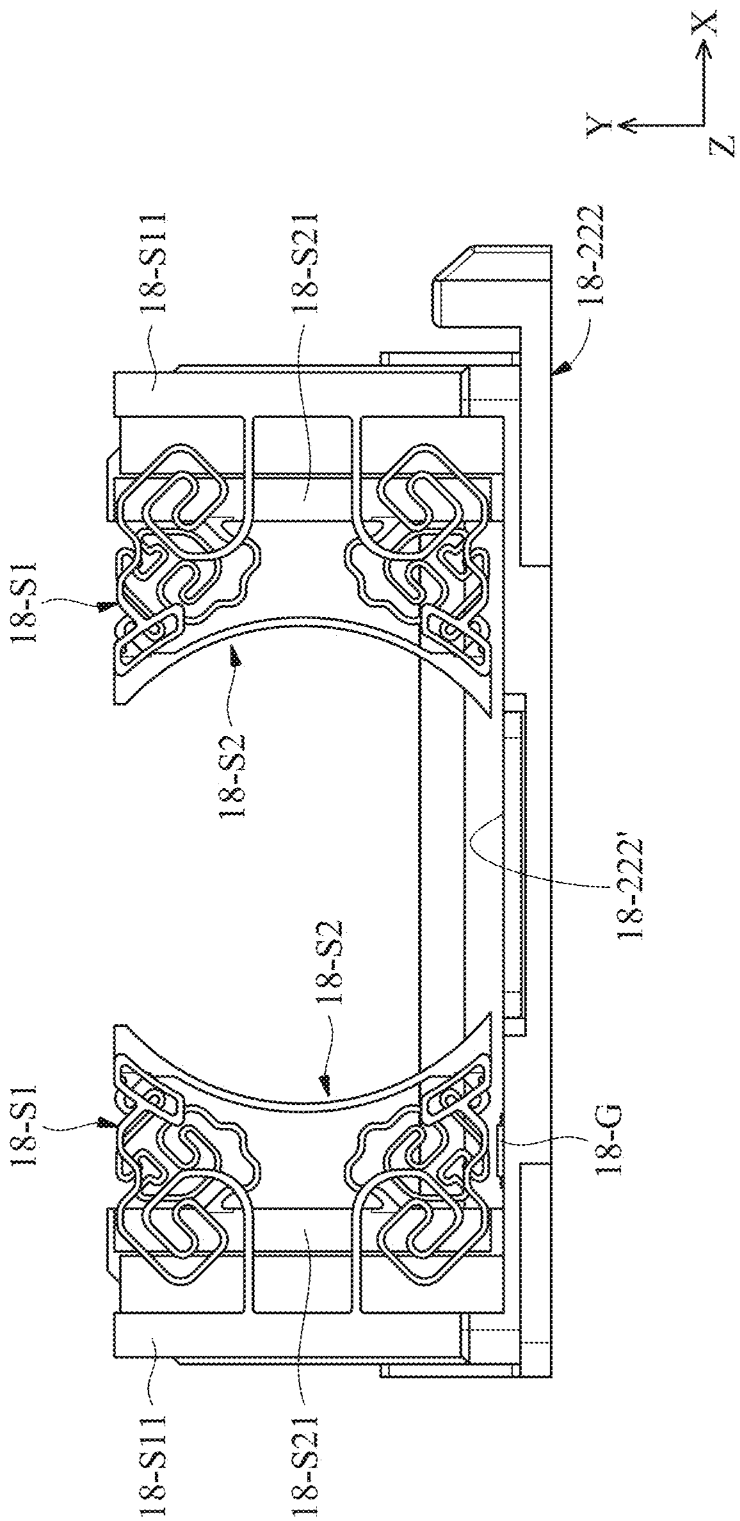
Figures 11, 18:
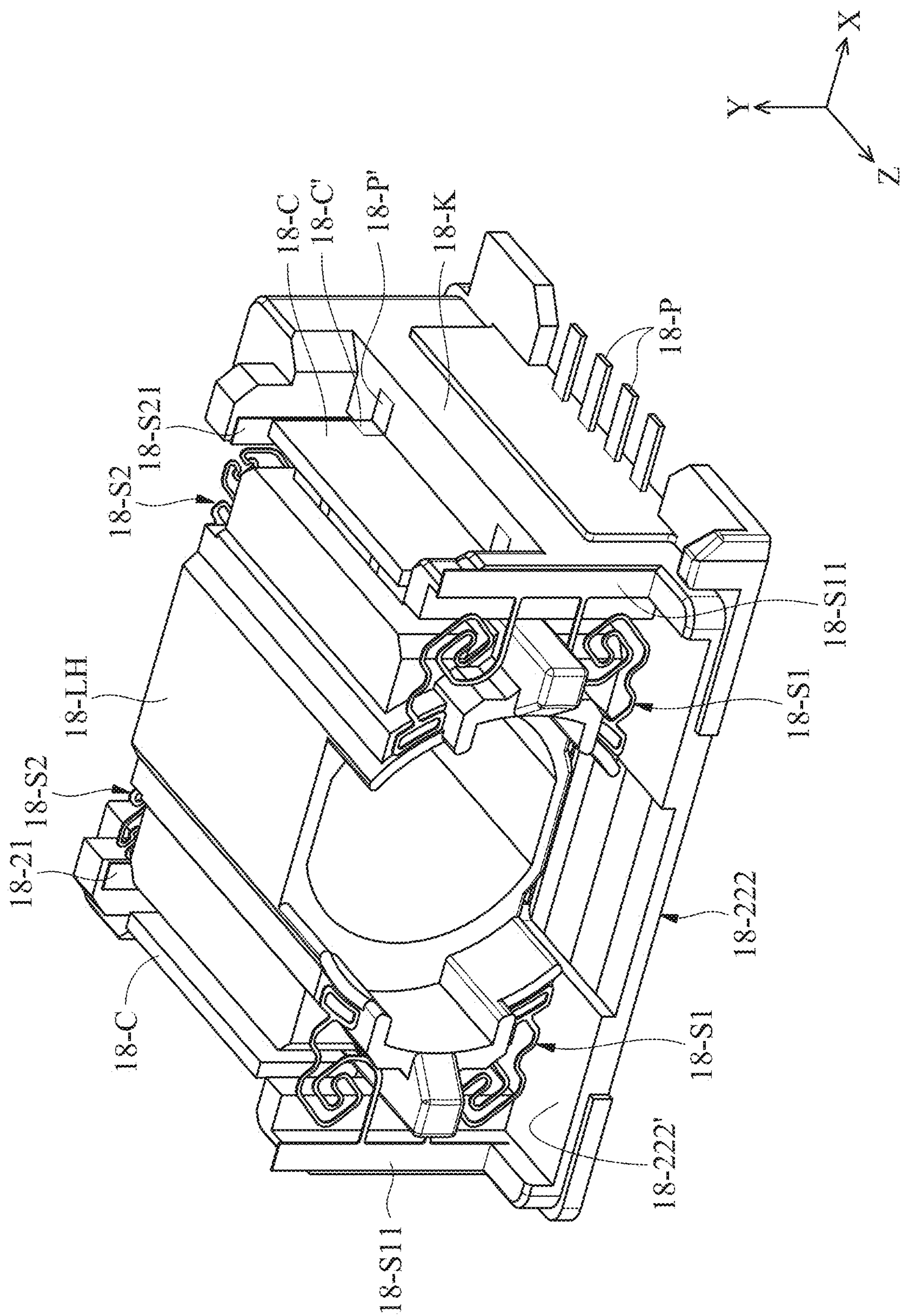
Figures 12, 18:
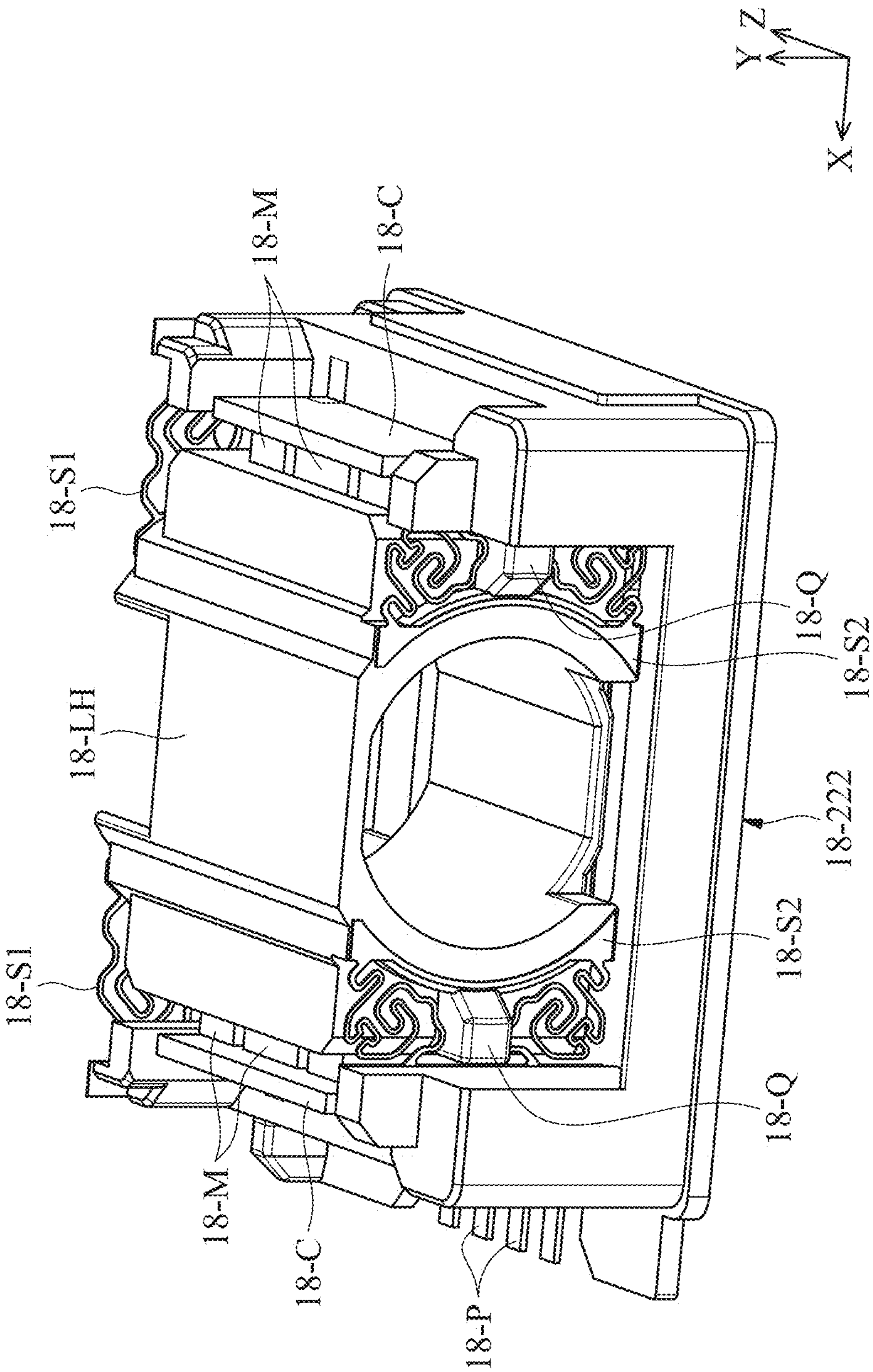
Figures 13, 18:
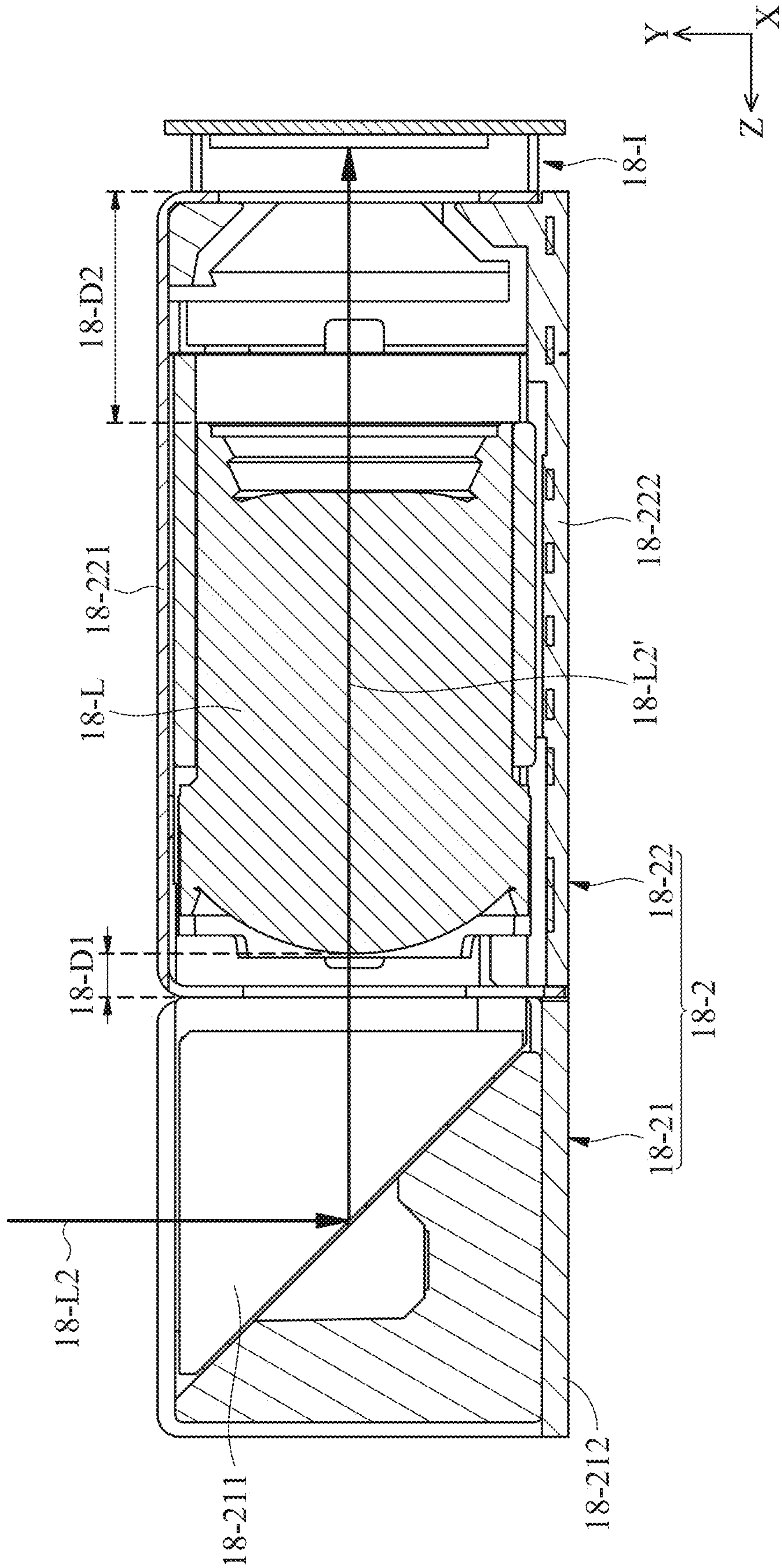
Figures 14, 18:
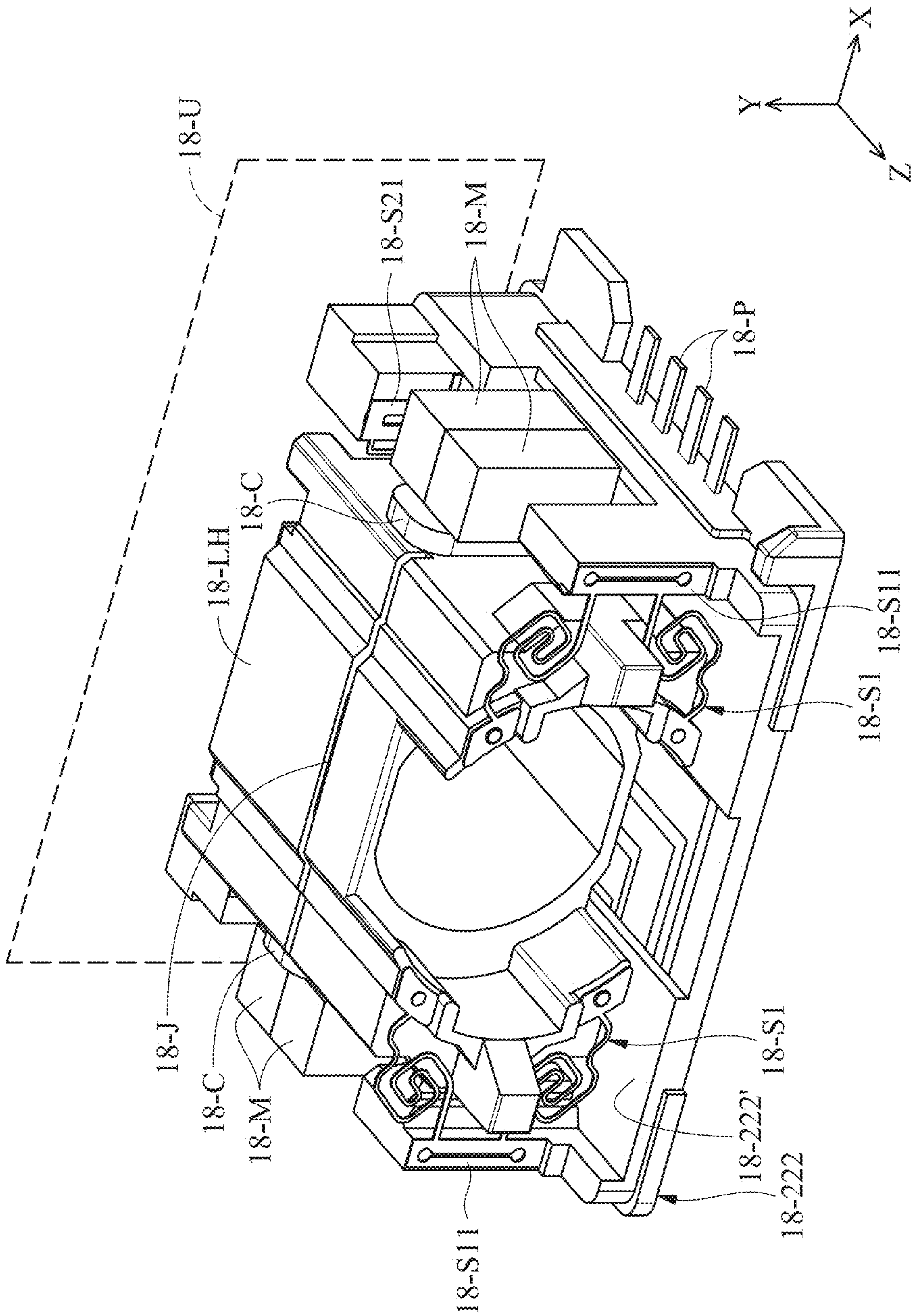
Figures 15, 18:
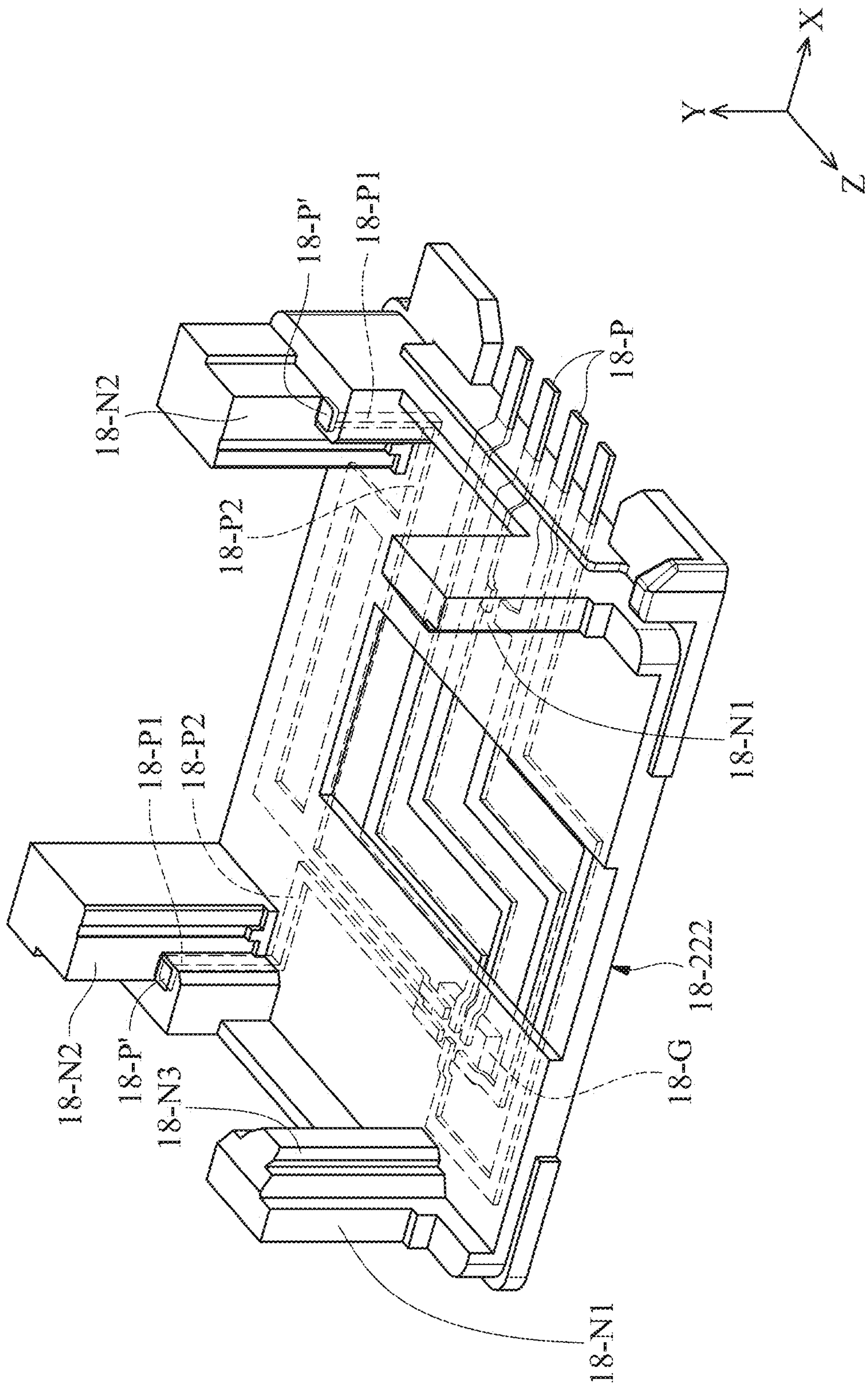
Figures 16, 18:
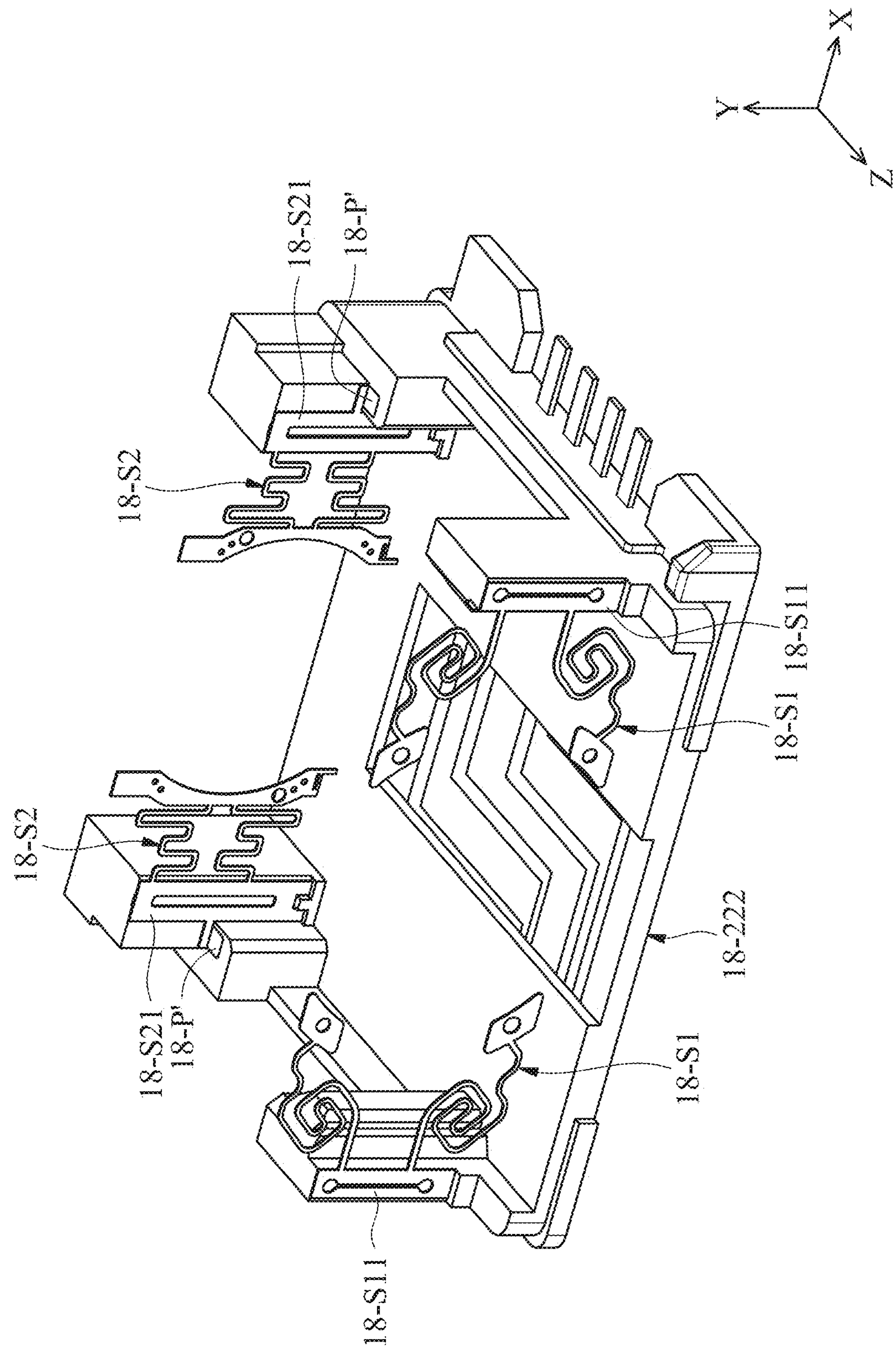
Figures 17, 18:
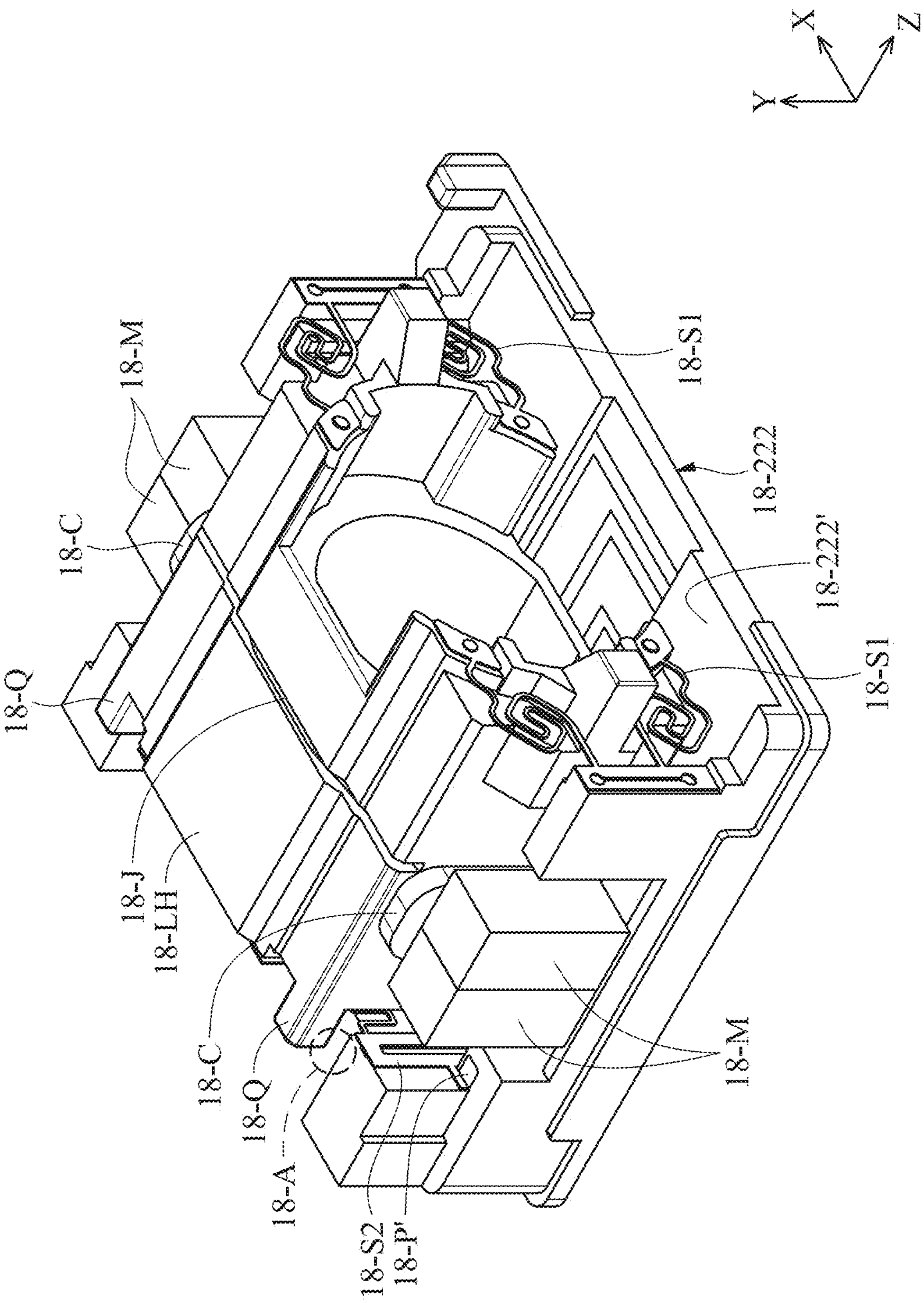
Figure 18:
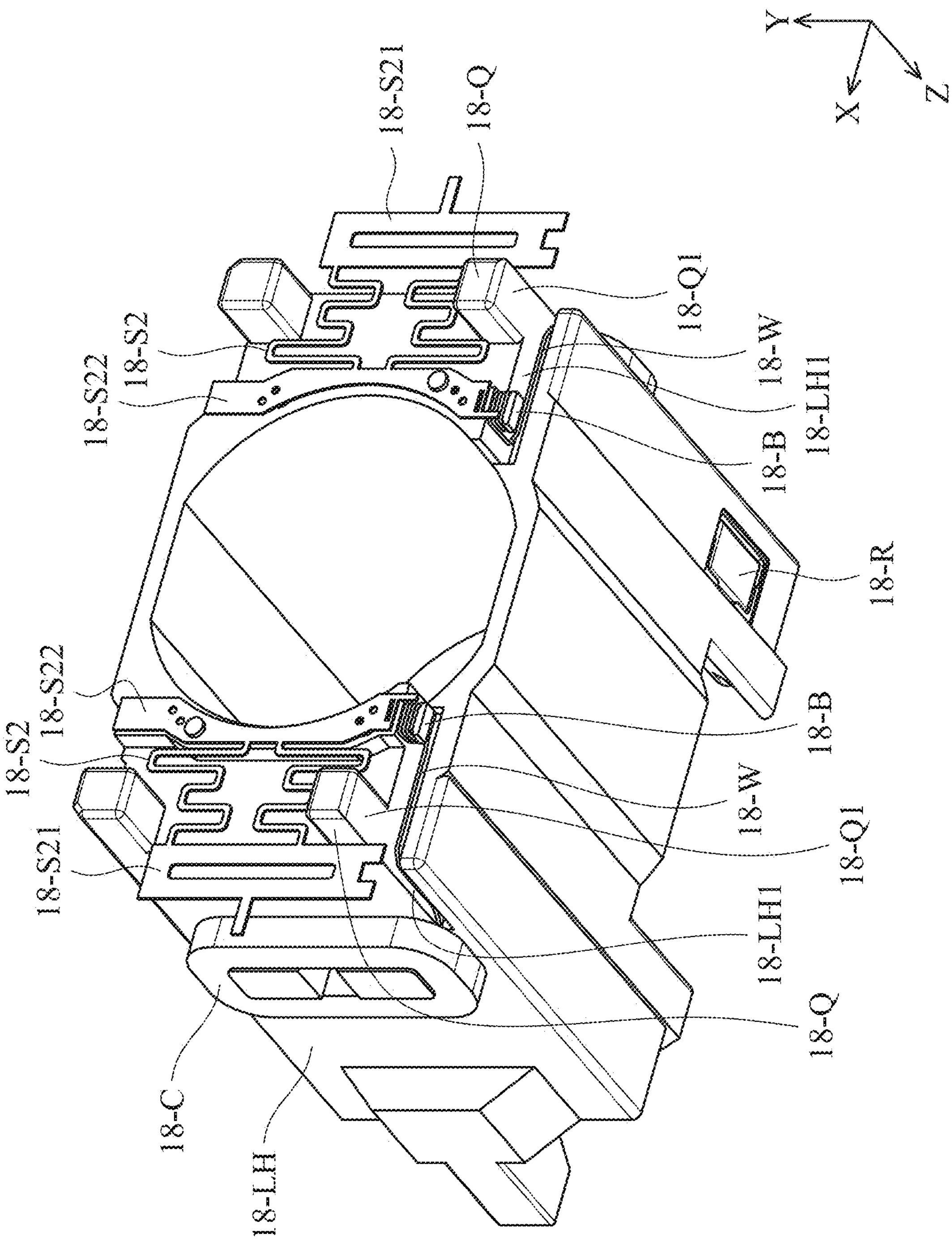
Figures 18, 19:
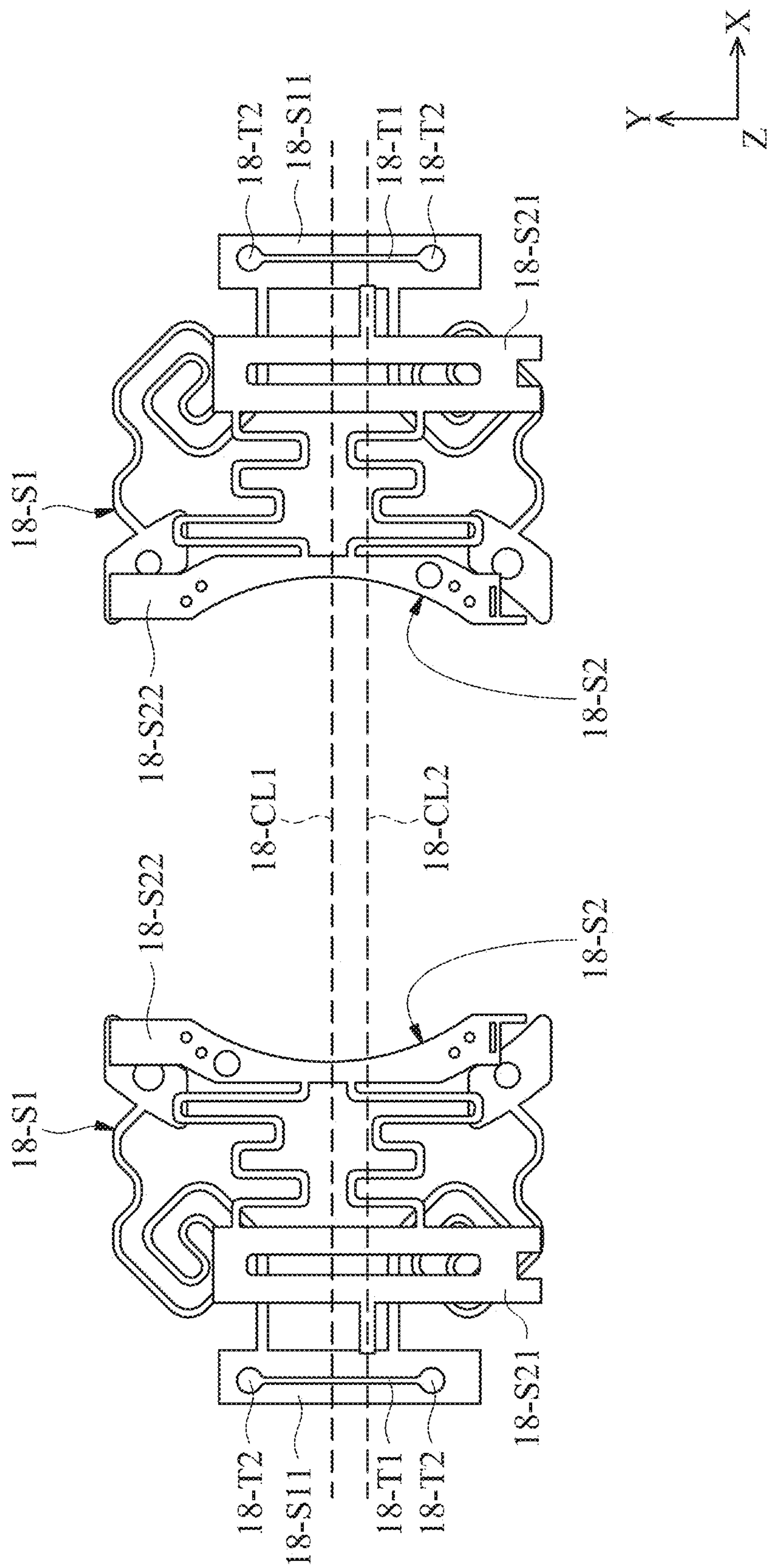
Figures 1, 19:
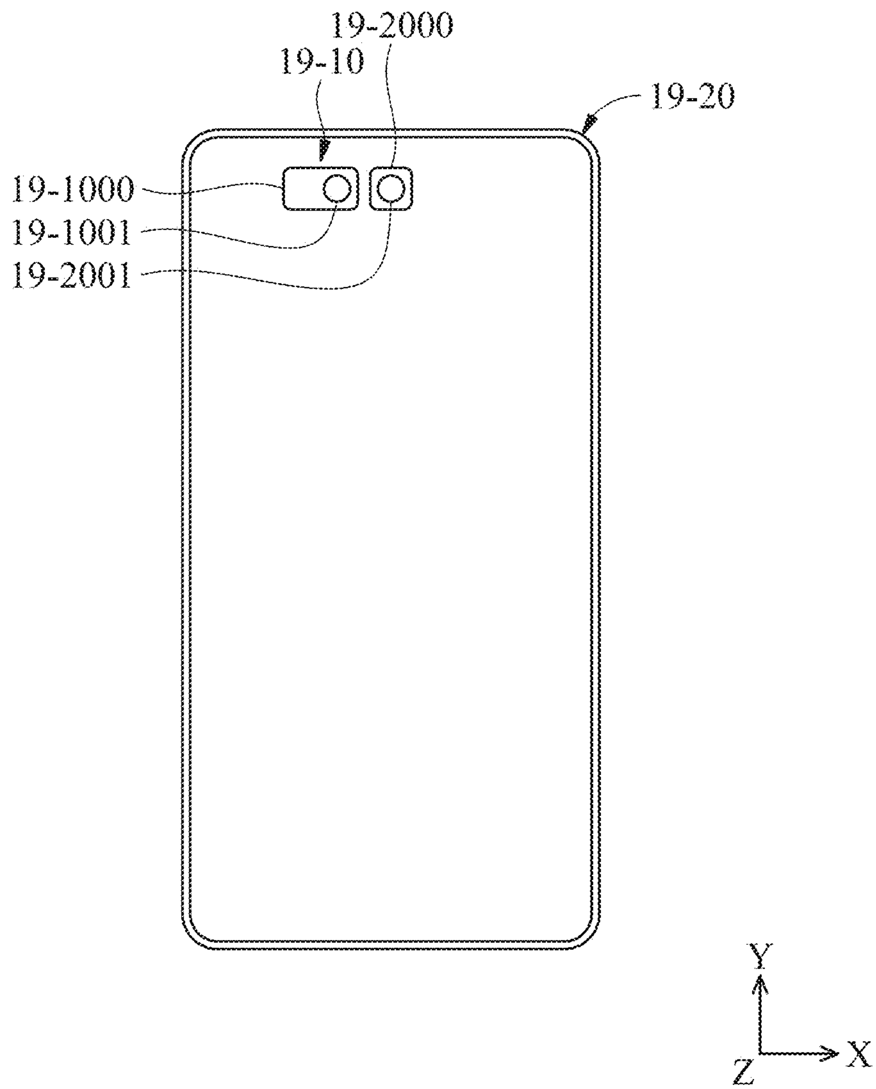
Figures 2, 19:
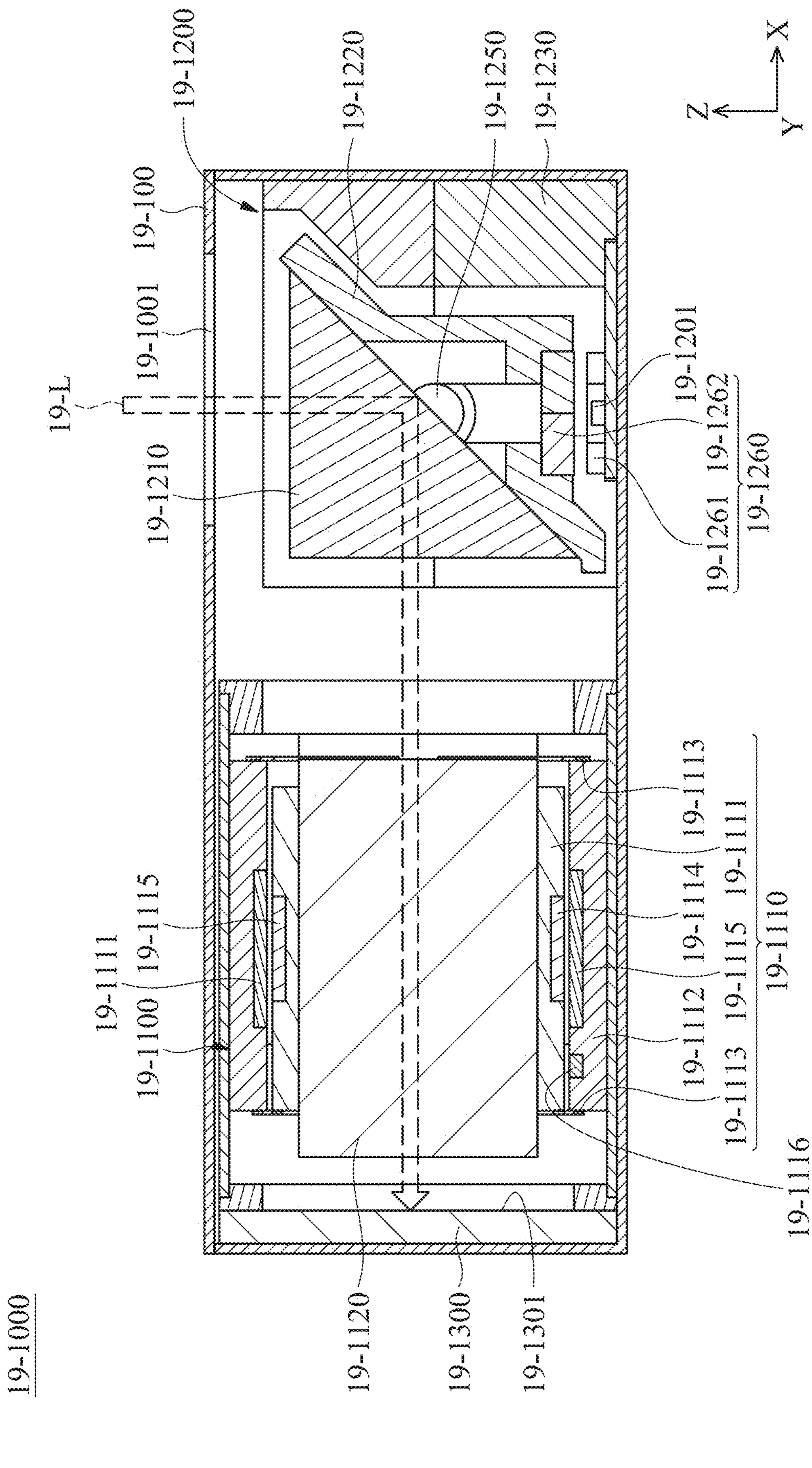
Figures 3, 19:
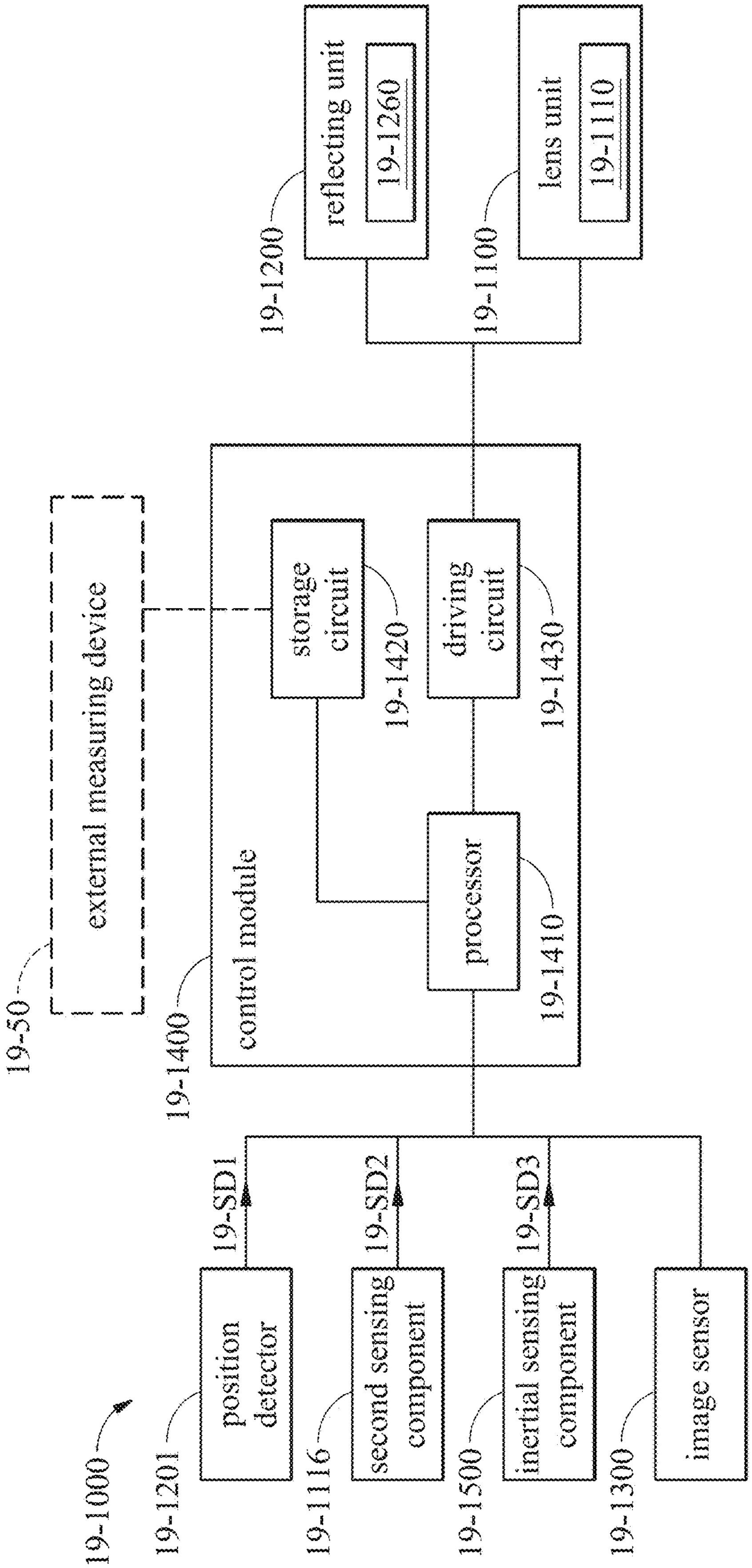
Figures 4A, 4B, 4C, 5A, 5B, 5C, 6A, 6B, 6C, 19:
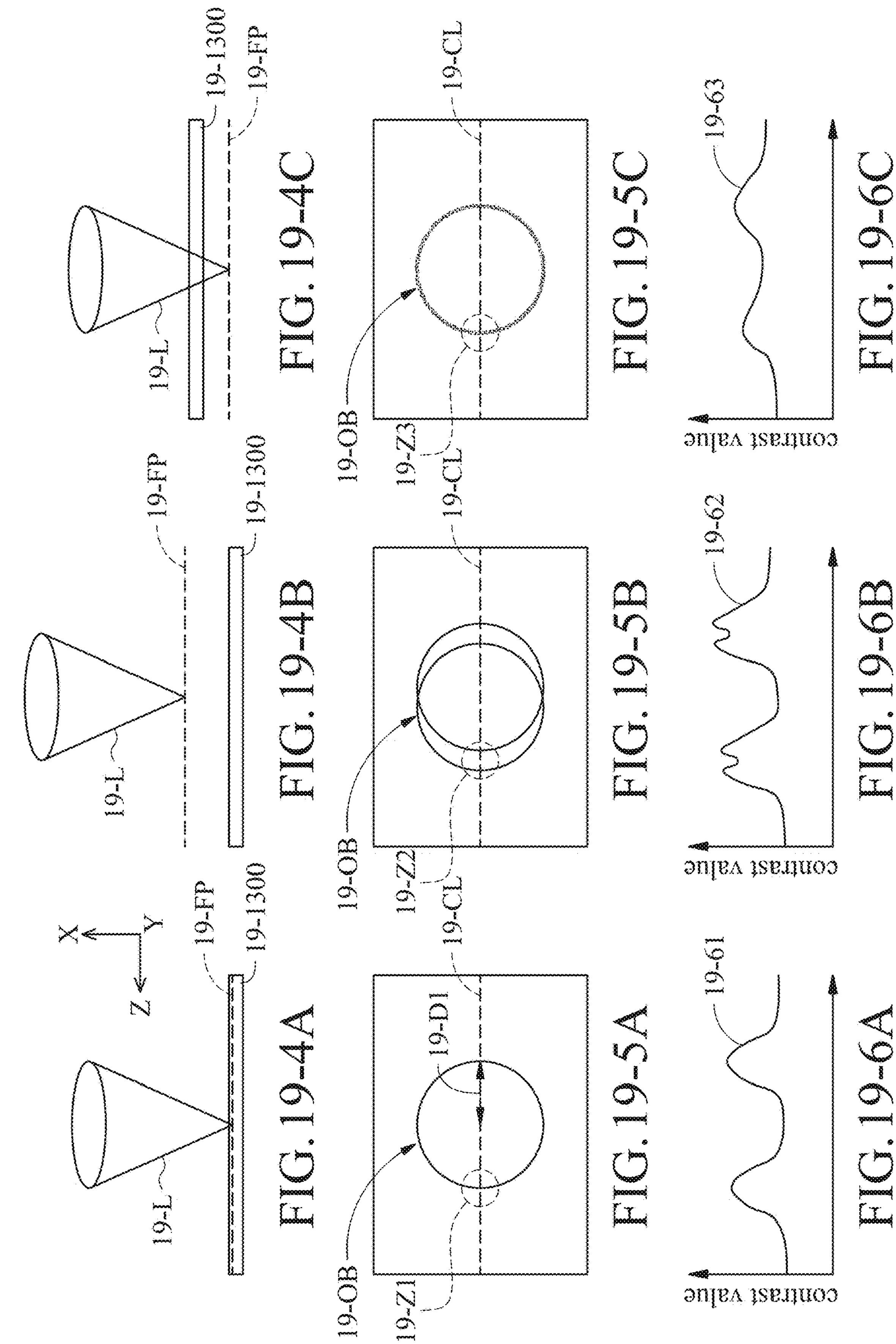
Figures 7A, 19:
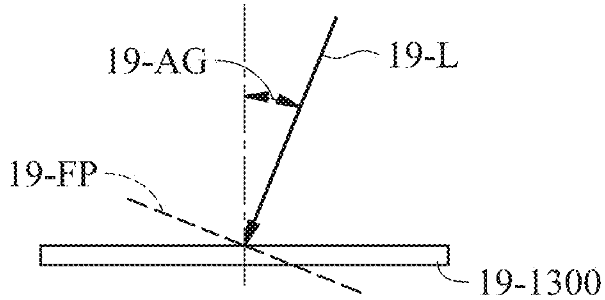
Figures 7B, 19:
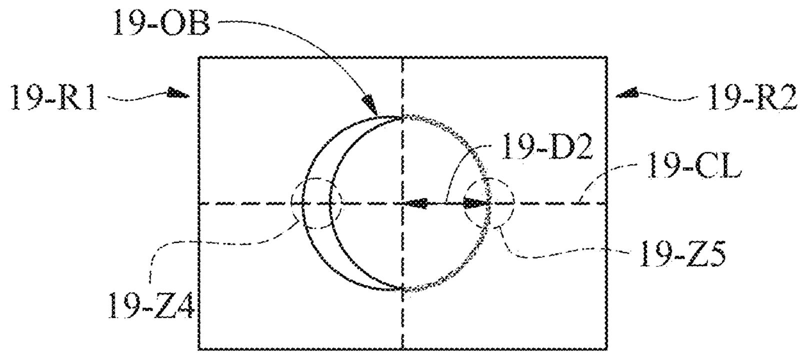
Figures 7C, 19:
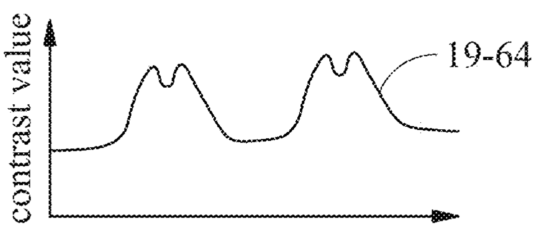
Figures 7D, 19:
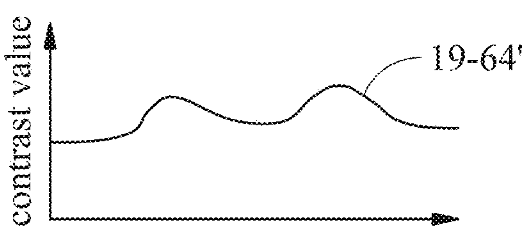
Figures 8A, 8B, 8C, 19:
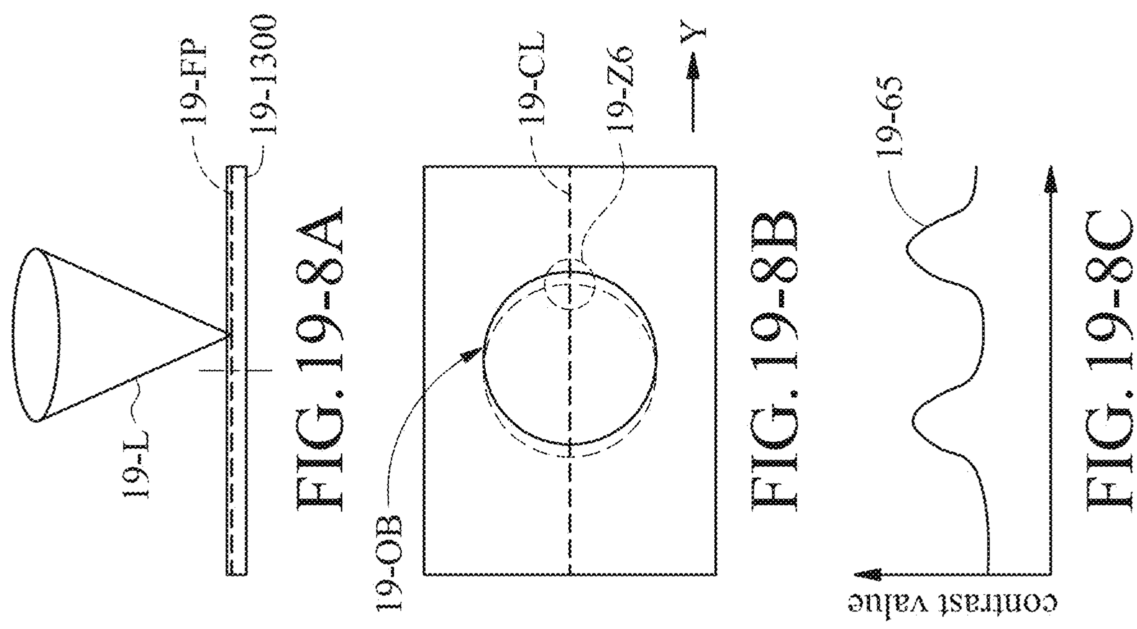
Figures 9, 19:
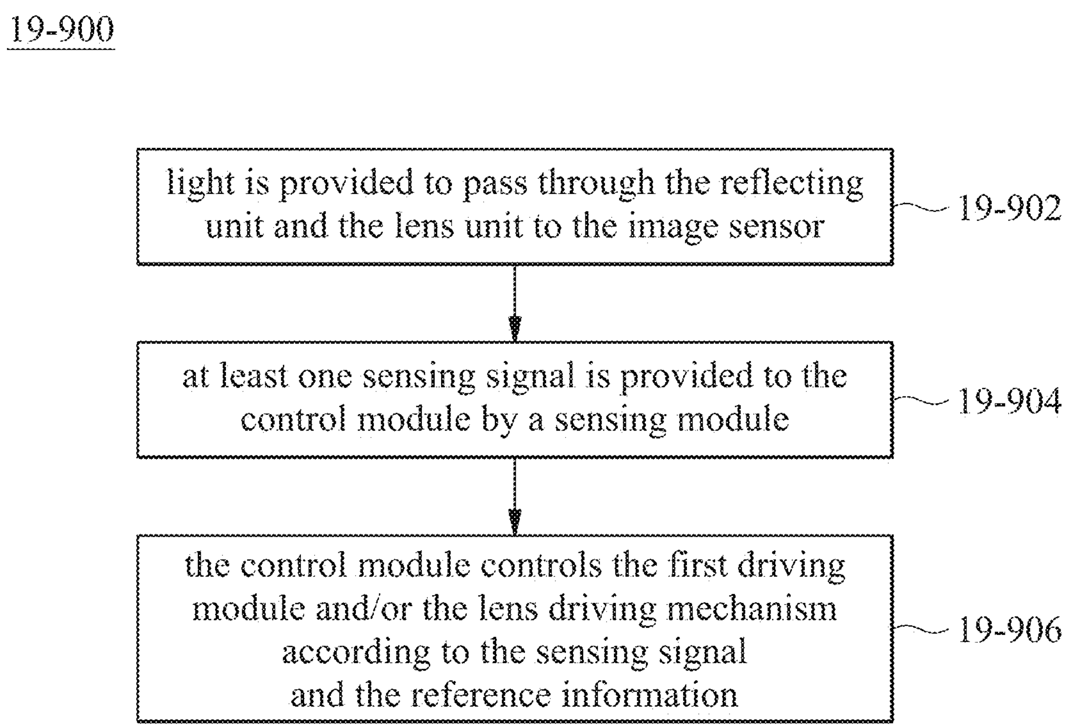
Figures 1, 20:
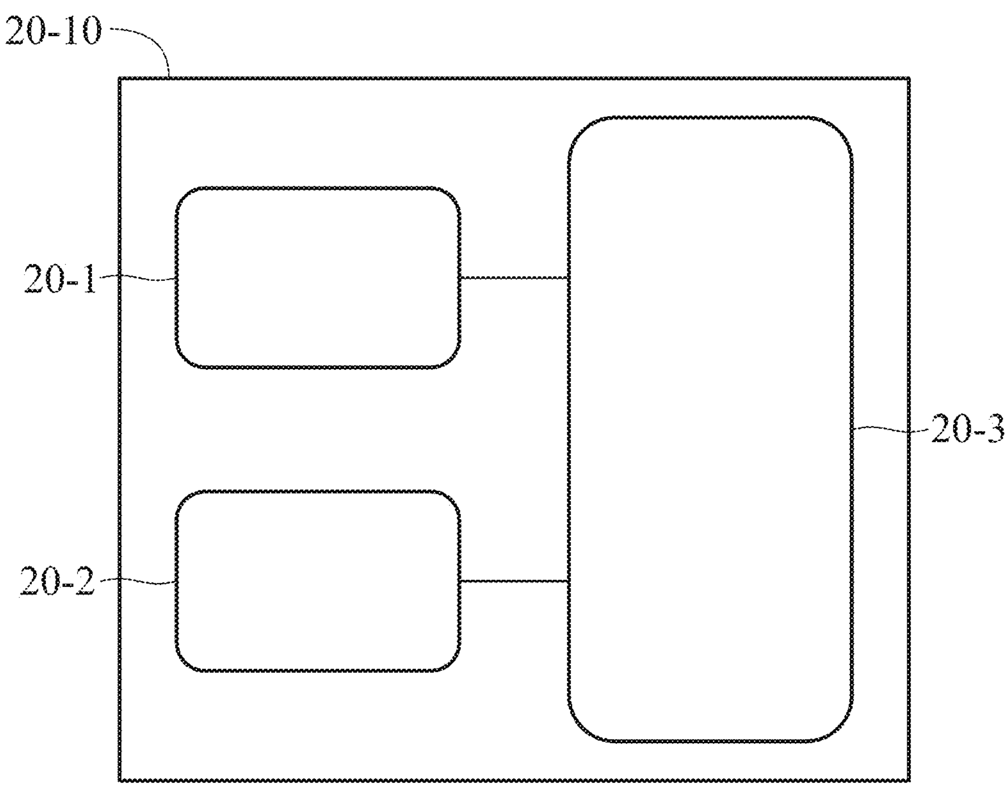
Figures 2, 20:
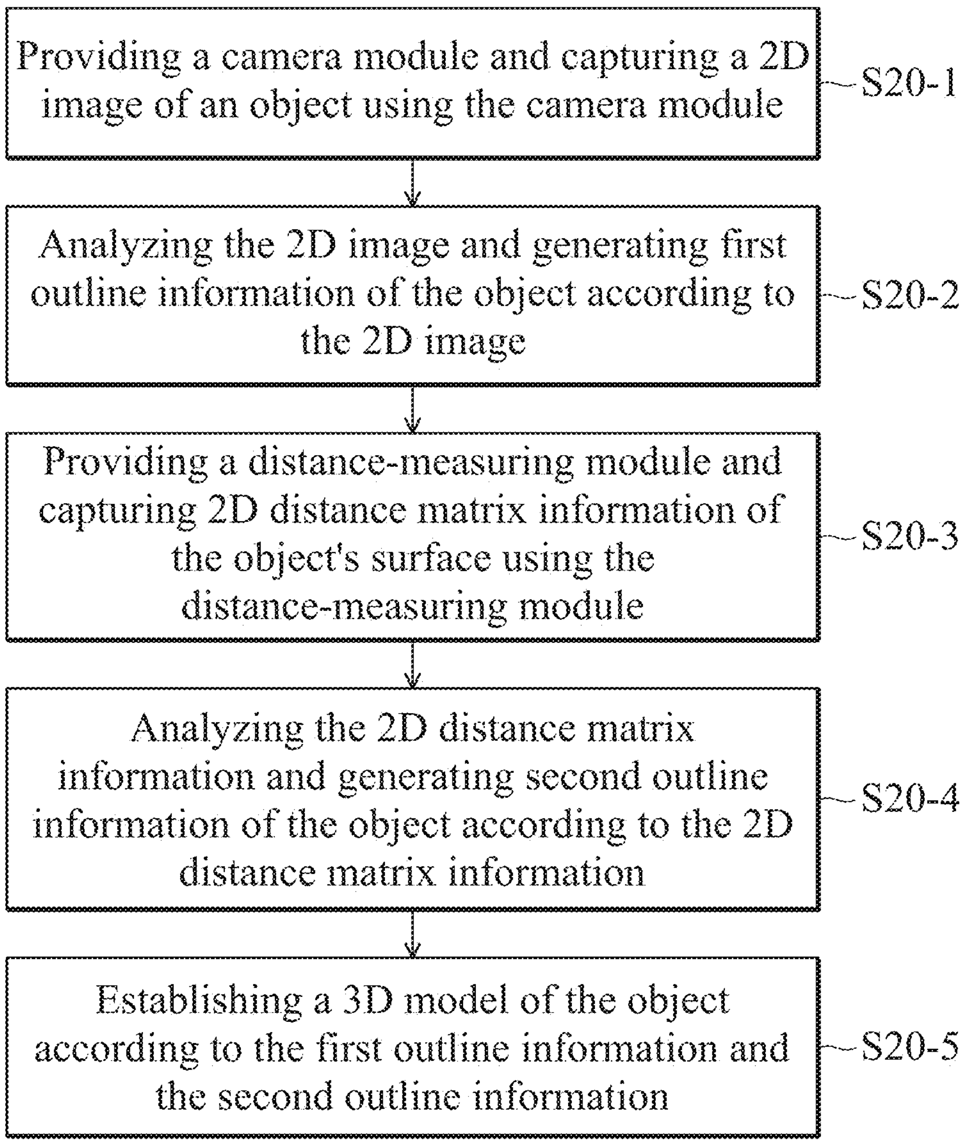
Figures 3, 20:
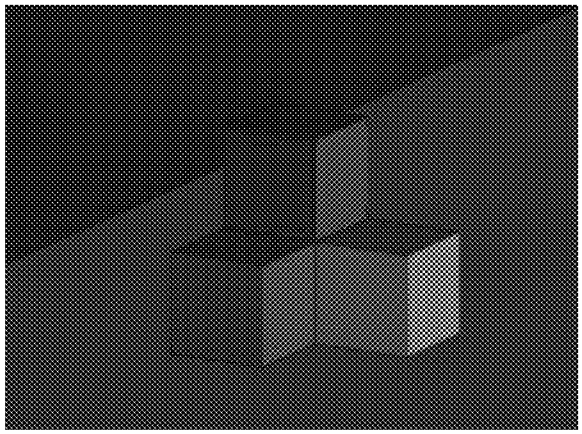
Figures 4, 20:
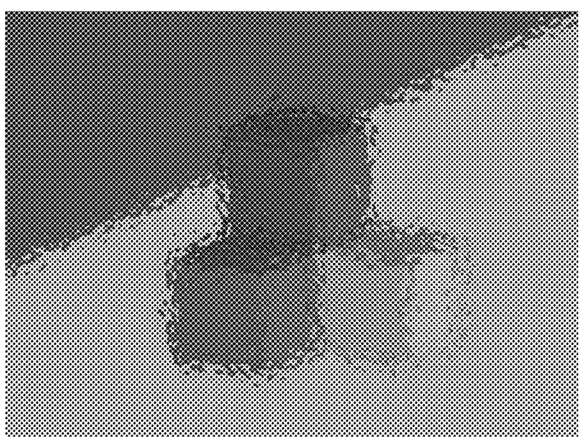
Figures 5, 20:
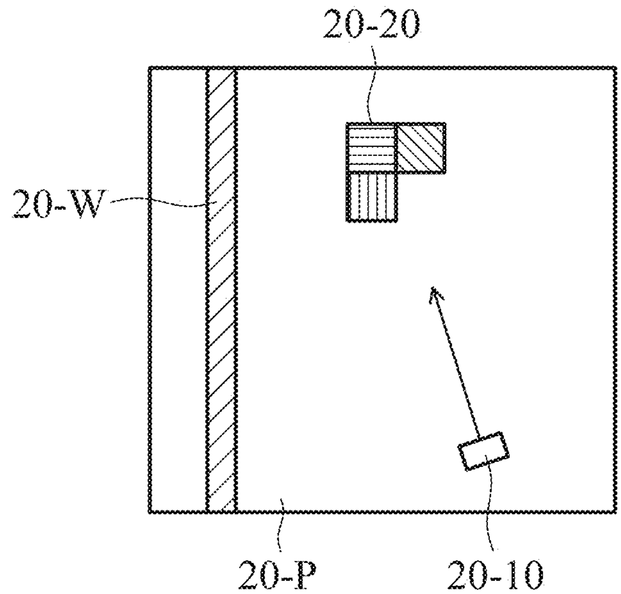
Figures 6, 20:
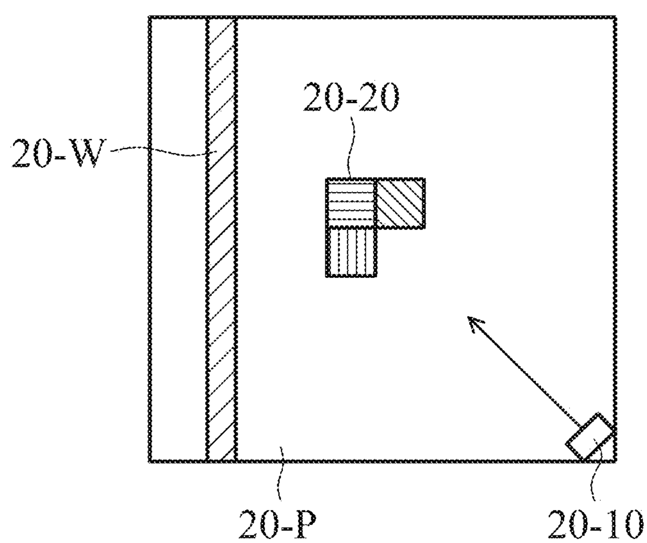
Figures 7, 20:
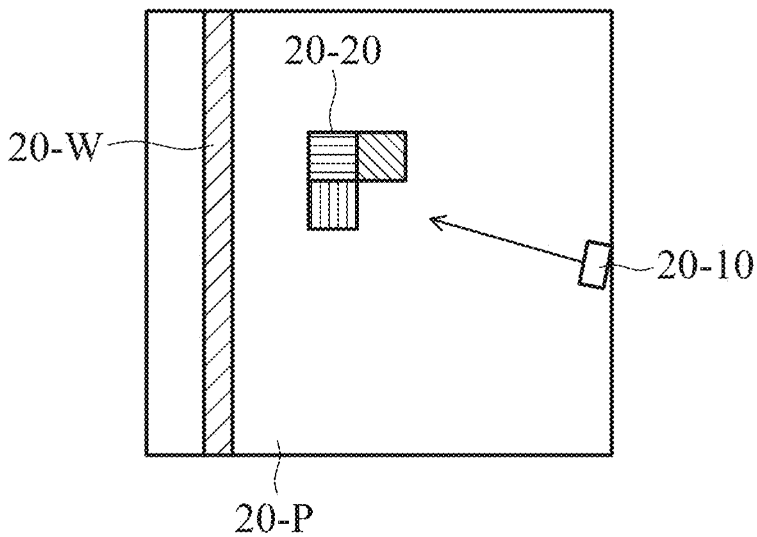
Figures 8, 20:
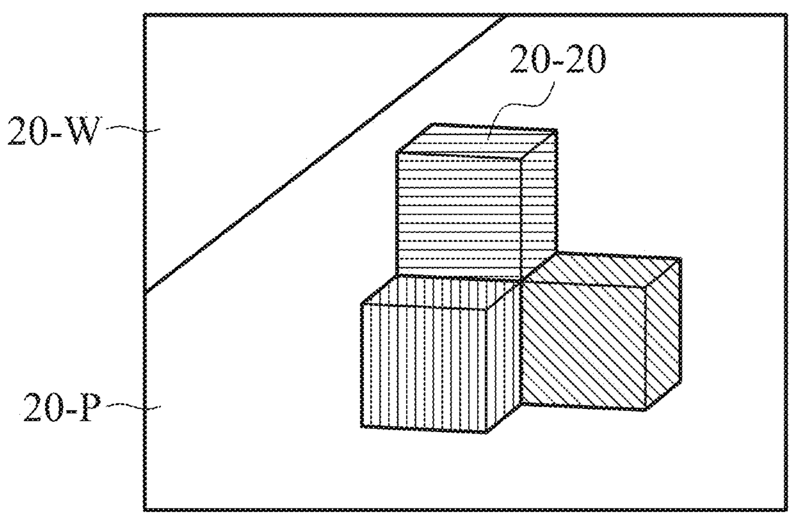
Figures 9, 20:
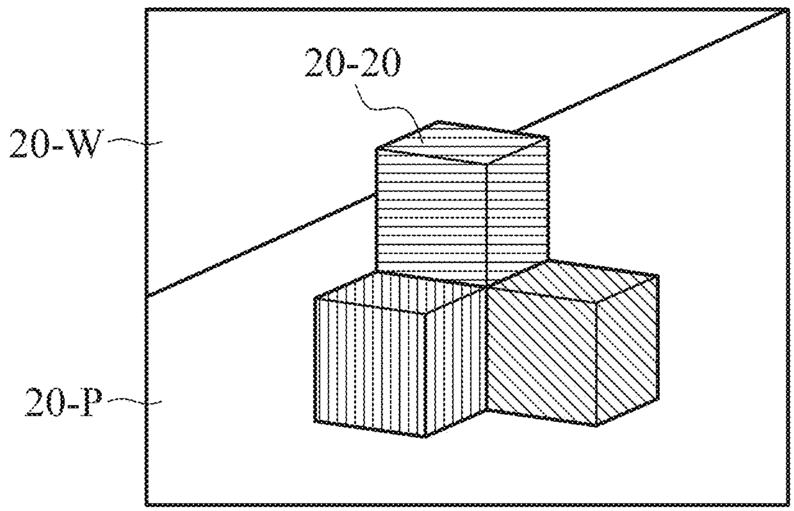
Figures 10, 20:
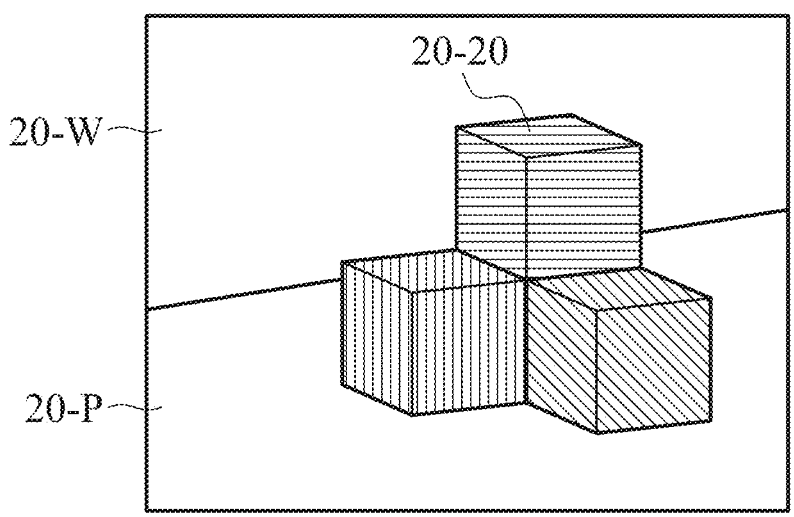
Figures 11, 20:
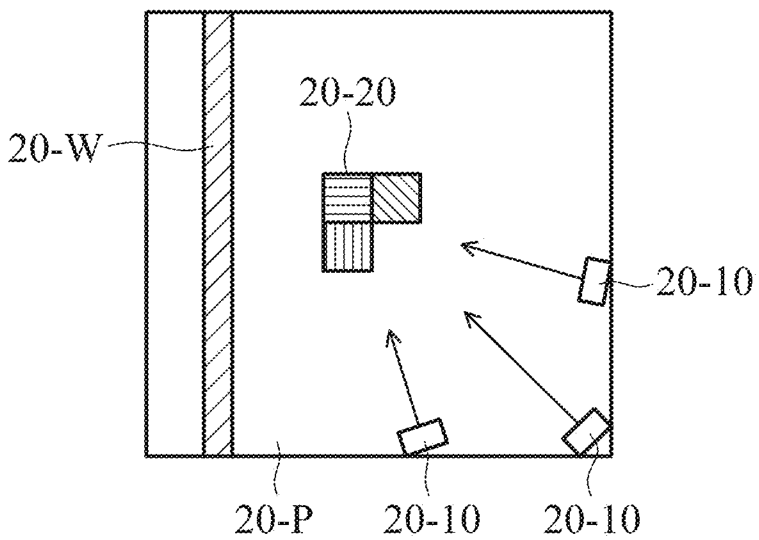
Figures 12, 20:
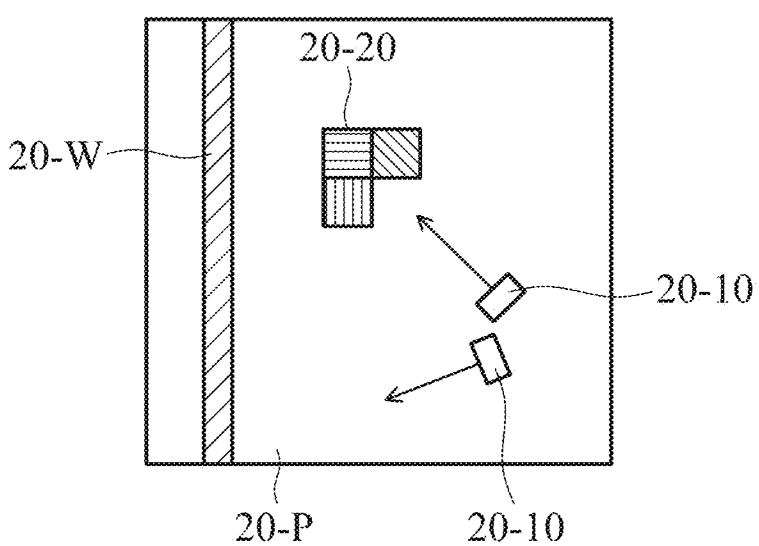
Figures 13, 20:
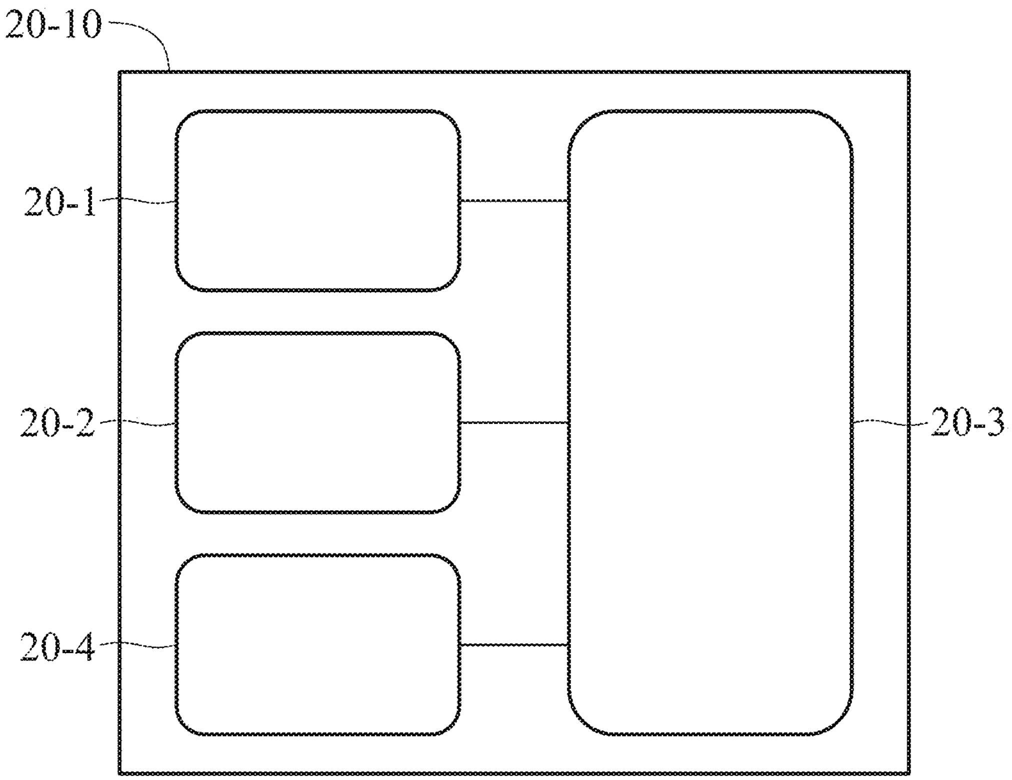
Figures 1, 21:
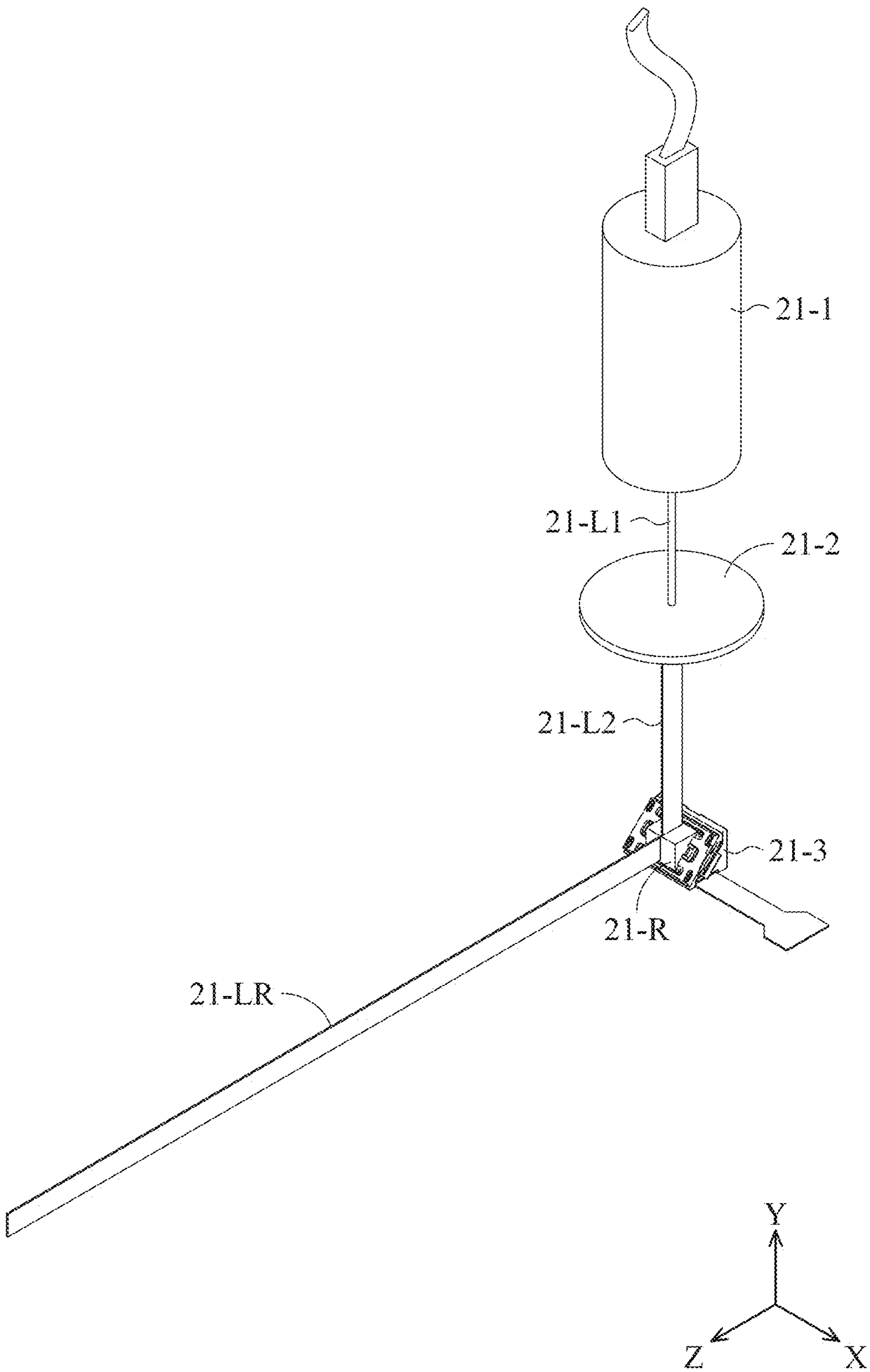
Figures 2, 21:
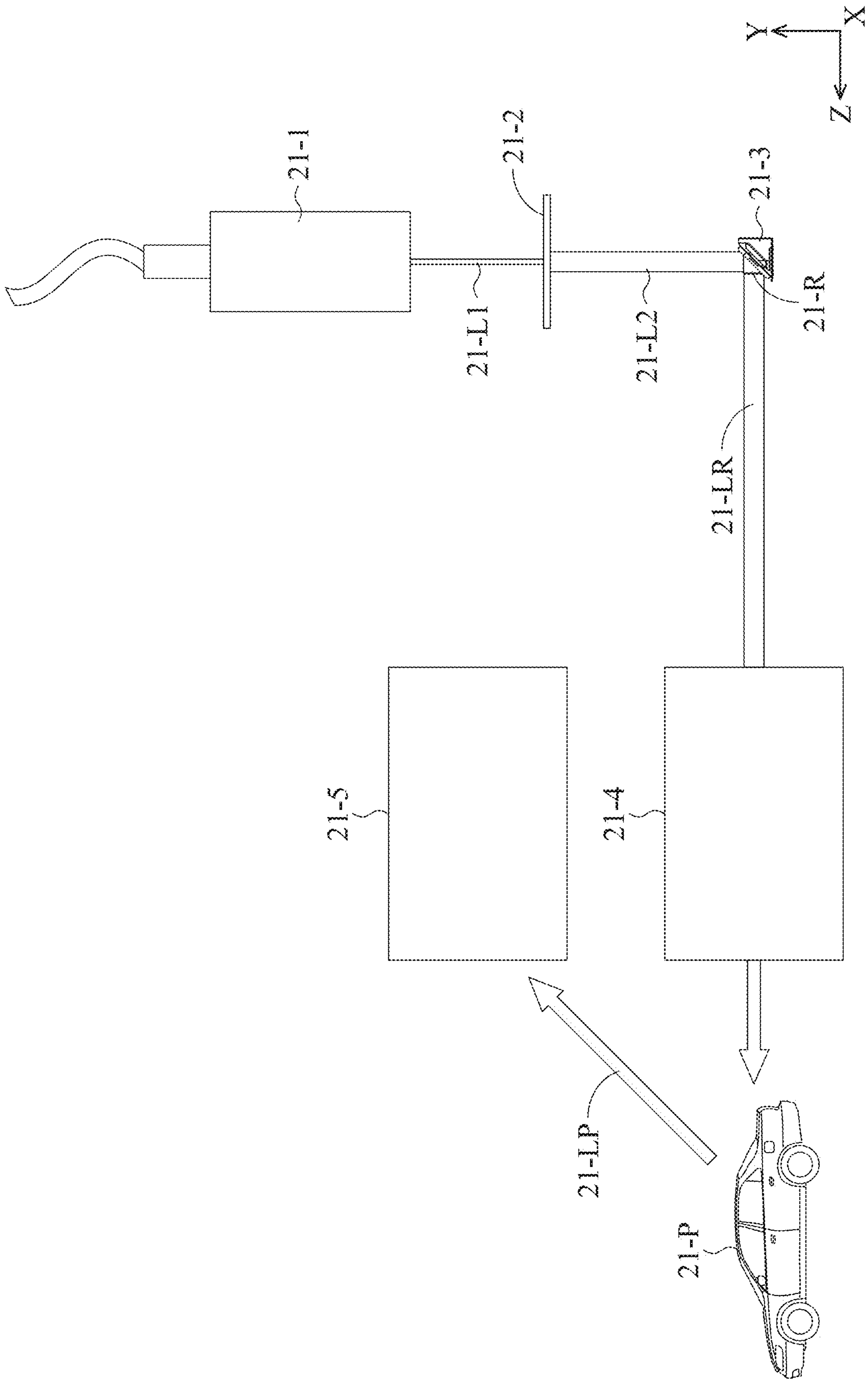
Figures 3, 21:
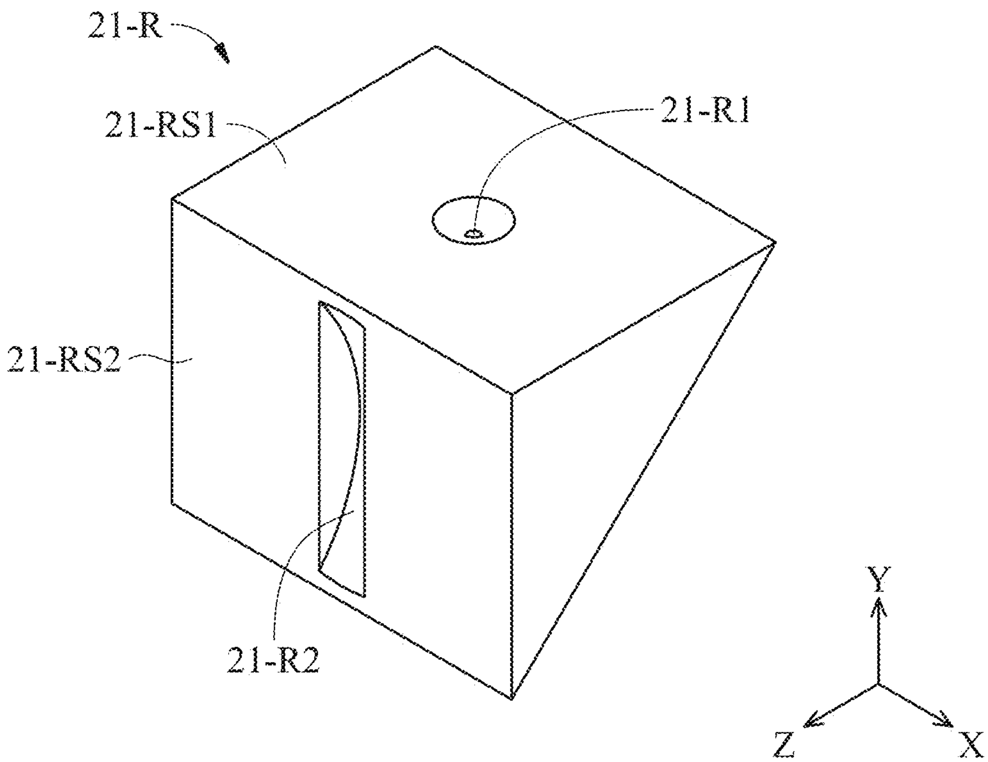
Figures 4, 21:
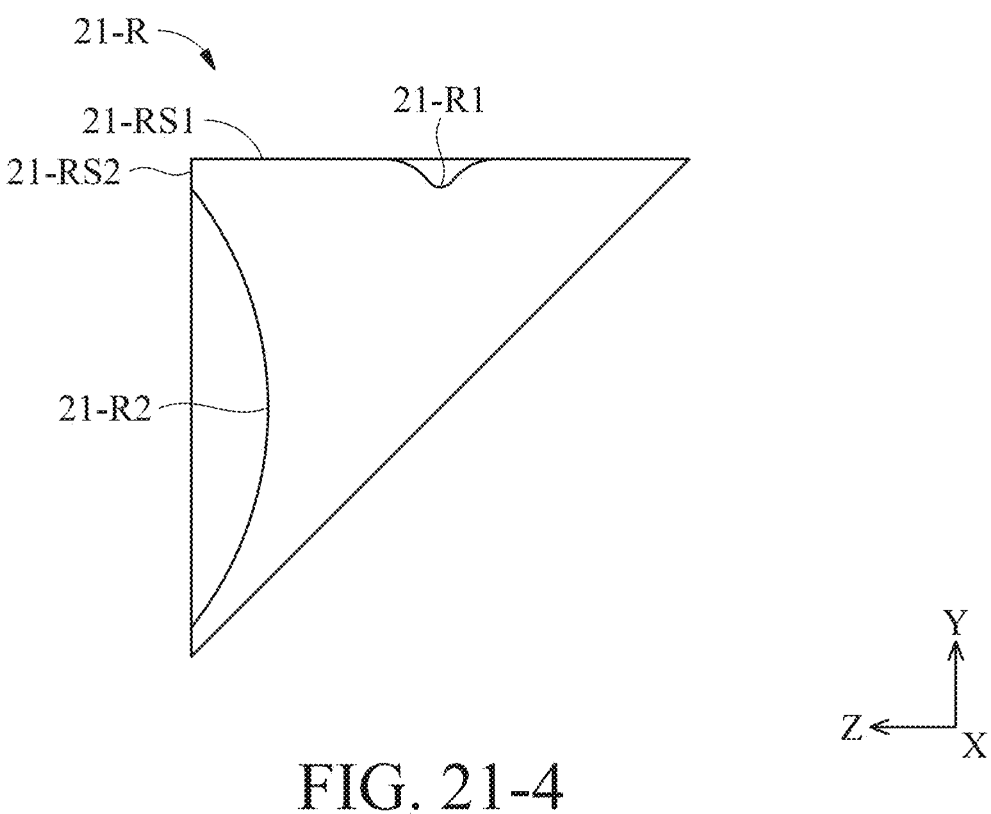
Figures 5, 21:
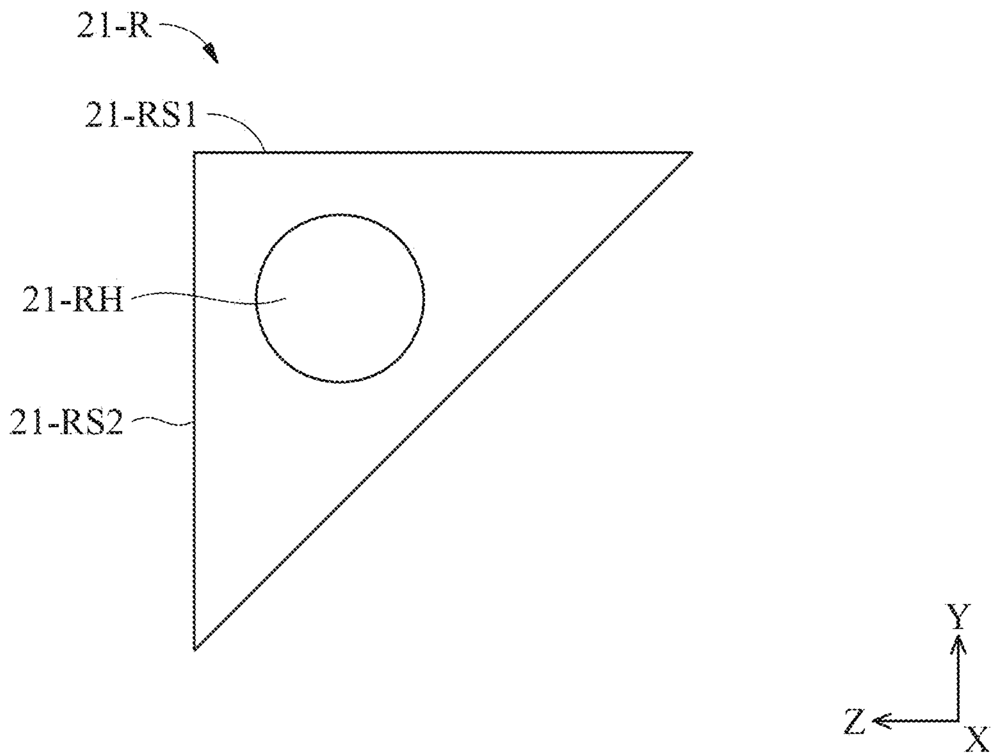
Figures 6, 21:
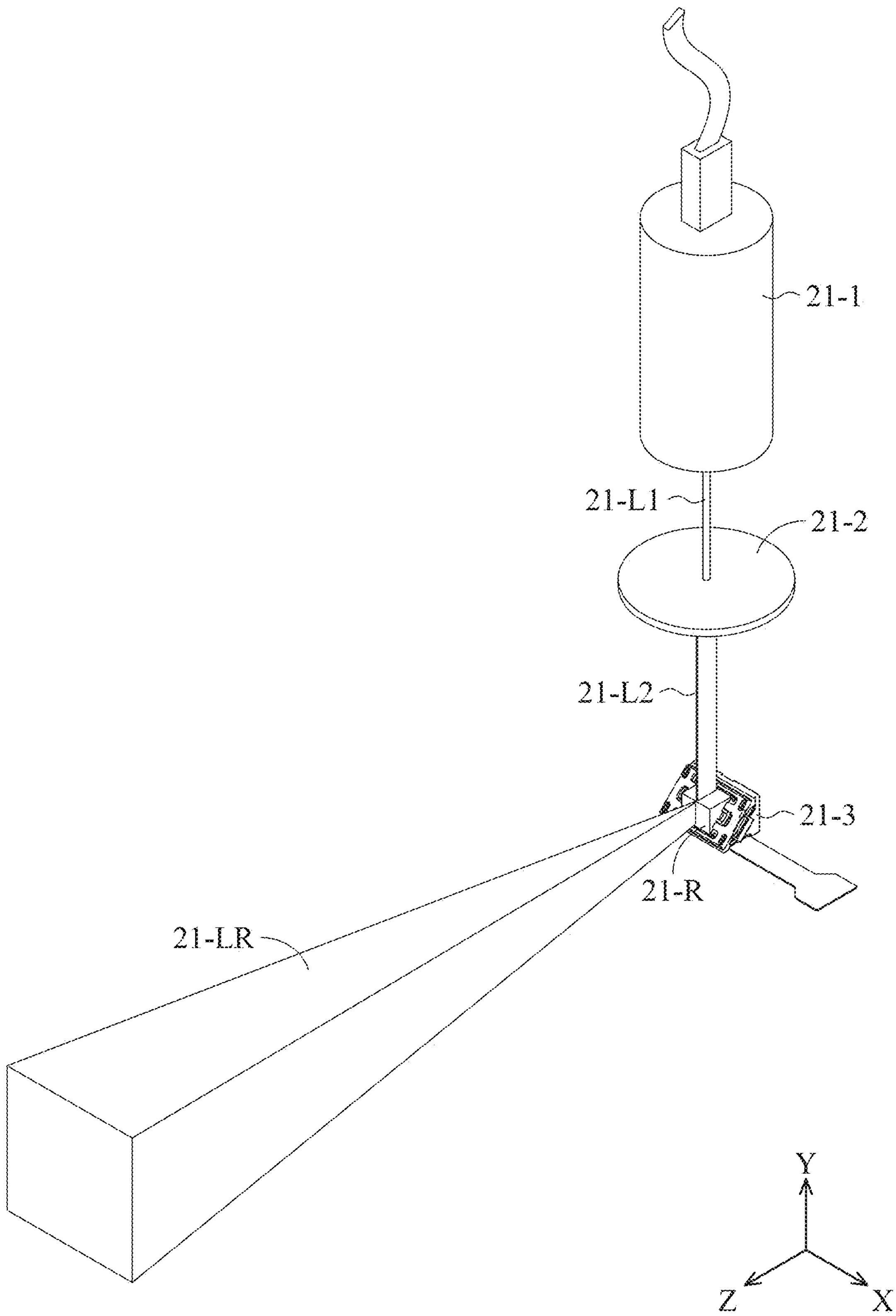
Figures 7, 21:
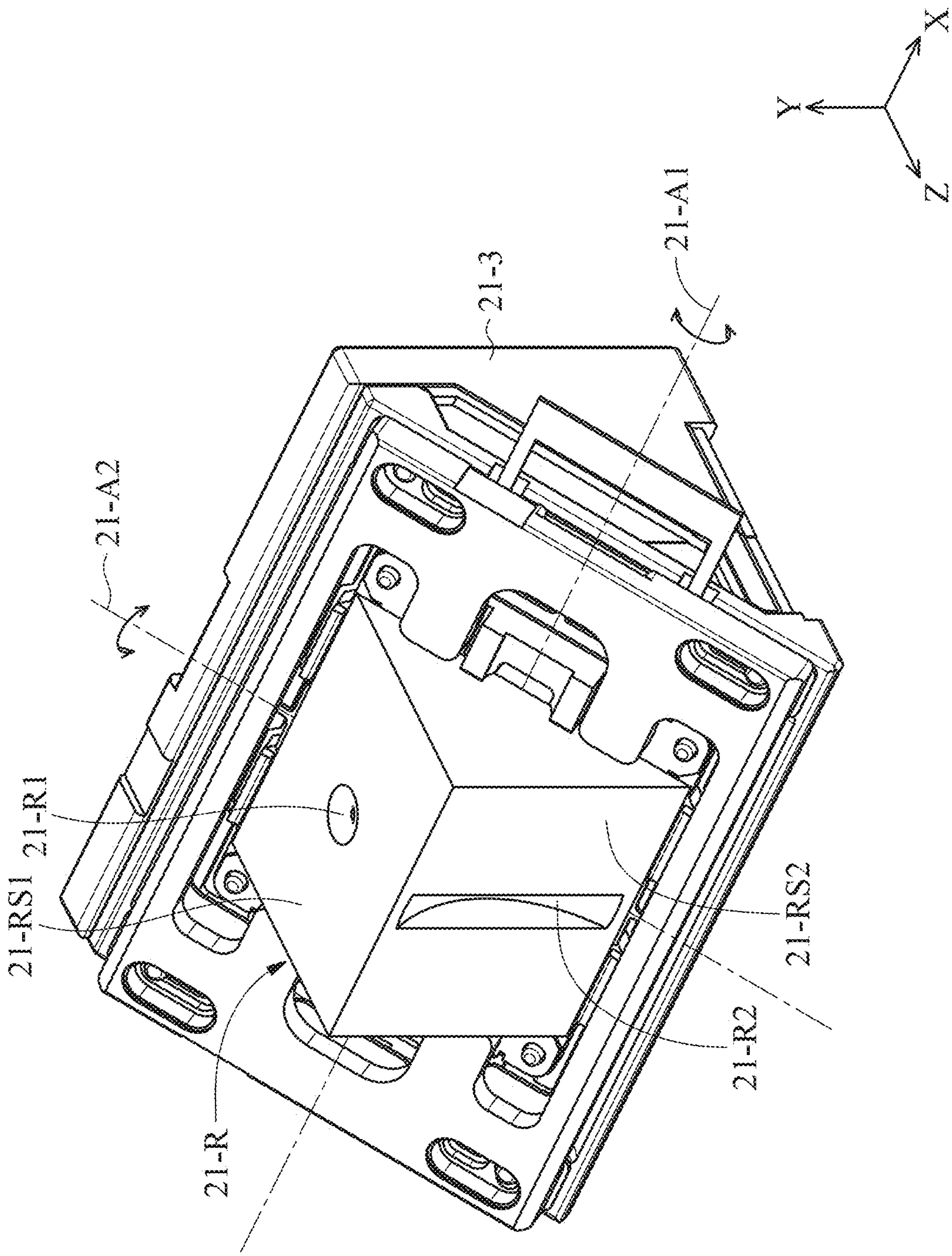
Figures 8, 21:
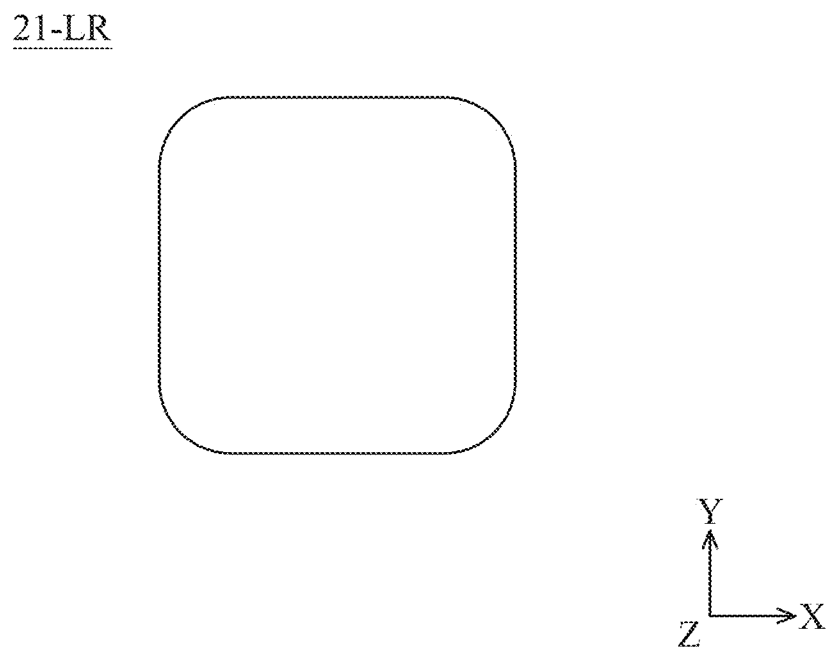
Figures 9, 21:
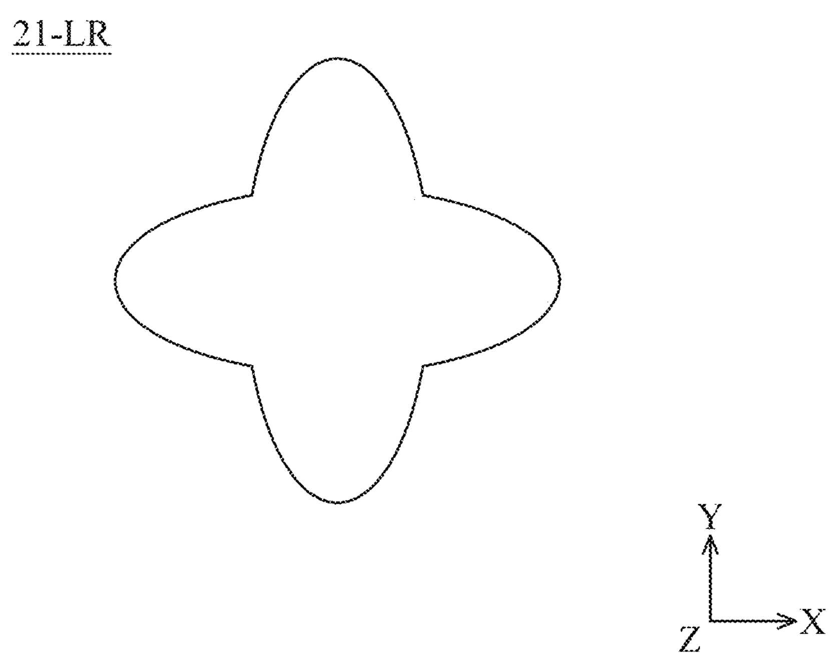

FIGS. 17-6A to 17-6D are flow diagrams showing the assembly of an optical system according to an embodiment of the present disclosure.

FIG. 17-7 is a schematic diagram showing an optical system according to another embodiment of the present disclosure.

FIG. 17-8 is a cross-sectional view of the second optical module, the optical path adjustment module, the liquid optical module, and the first optical module in FIG. 17-7.

Figures 15, 16, 17, 18:
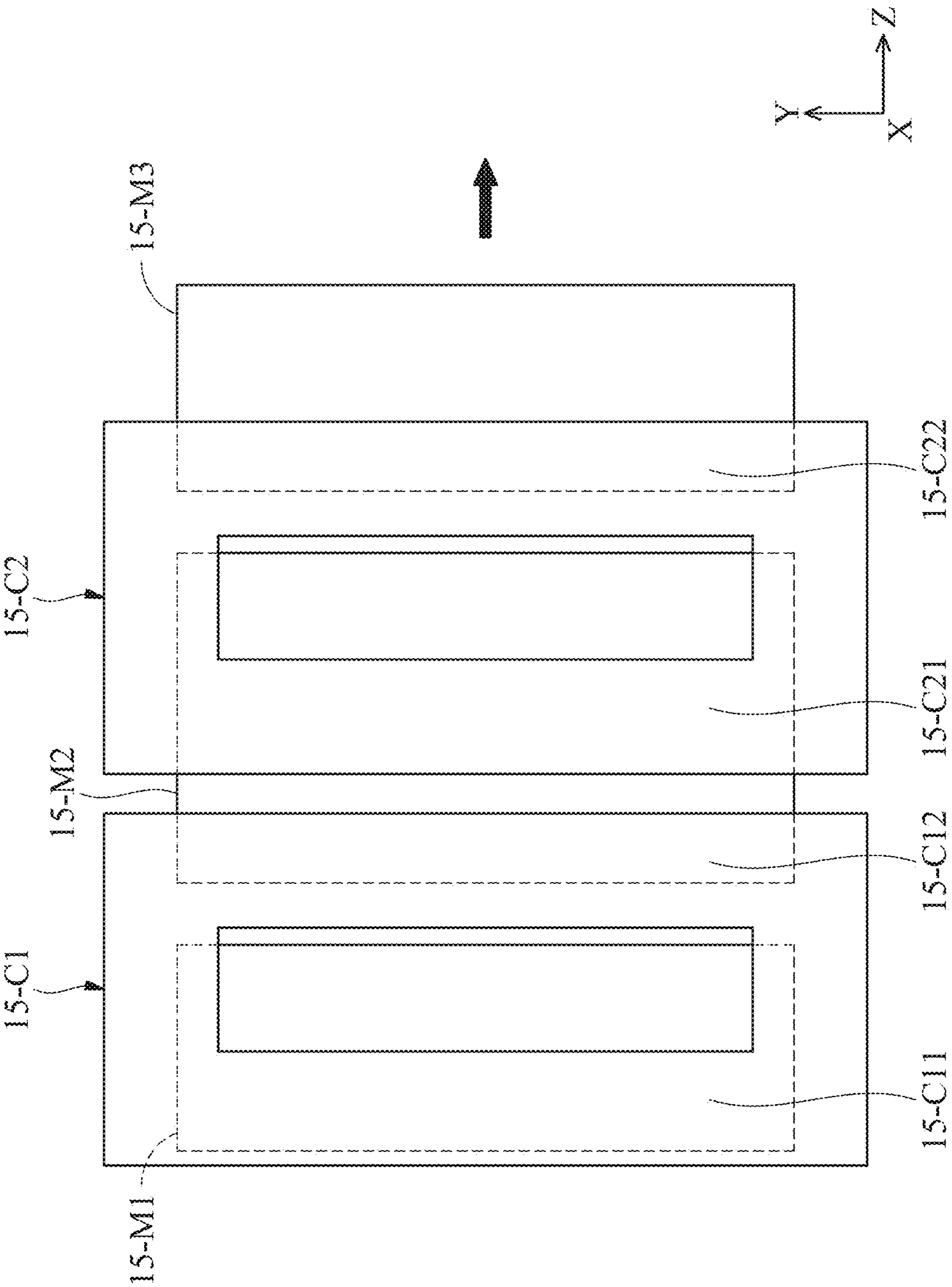

FIGS. 18-1 and 18-2 are schematic diagrams showing several optical systems 18-1, 18-2, and 18-3 disposed in a cell phone in accordance with an embodiment of the application.

FIGS. 18-3 and 18-4 are schematic diagrams showing the optical systems 18-1, 18-3 and the reflecting unit 18-21 of the optical system 18-2 linearly arranged along an axis.

FIG. 18-5 is a schematic diagram showing an optical system 18-2 in accordance with an embodiment of the application.

FIG. 18-6 is a schematic diagram showing an optical system 18-2 having a fixed member 18-212 integrally formed with a base 18-222 in one piece.

FIGS. 18-7 and 18-8 are exploded diagrams of a lens unit 18-22 in accordance with an embodiment of the application.

FIG. 18-9 is a schematic diagram showing at least a sensor 18-G disposed on the base 18-222.

FIG. 18-10 is a schematic diagram showing the first and second fixed portions 18-S11 and 18-S21 do not overlap when viewed along the Z axis.

FIGS. 18-11 and 18-12 are schematic diagrams showing the lens unit 18-22 with the housing 12-221, the frame 18-F, and the optical element 18-L removed therefrom.

FIG. 18-13 is a schematic diagram showing that light 18-L2 is reflected by the reflecting element 18-211 and propagates through the optical element 18-L of the lens unit 18-22 to the image sensor 18-1.

FIG. 18-14 is a schematic diagram showing a lens unit 18-22 with the housing 12-221, the frame 18-F, and the optical element 18-L removed therefrom, in accordance with another embodiment of the application.

FIG. 18-15 is a schematic diagram showing the conductive members 18-P extending inside the base 18-222.

FIG. 18-16 is a schematic diagram showing the base 18-222, the first and second resilient members 18-S1 and 18-S2 of FIGS. 18-14 after assembly.

FIG. 18-17 is another schematic diagram showing the lens unit 18-22 with the housing 12-221, the frame 18-F, and the optical element 18-L removed therefrom.

FIG. 18-18 is a schematic diagram showing the coil 18-C electrically connected to the second resilient member 18-S2 via the wire 18-W wound around the protrusion 18-B.

Figures 15, 16, 17, 18, 19:
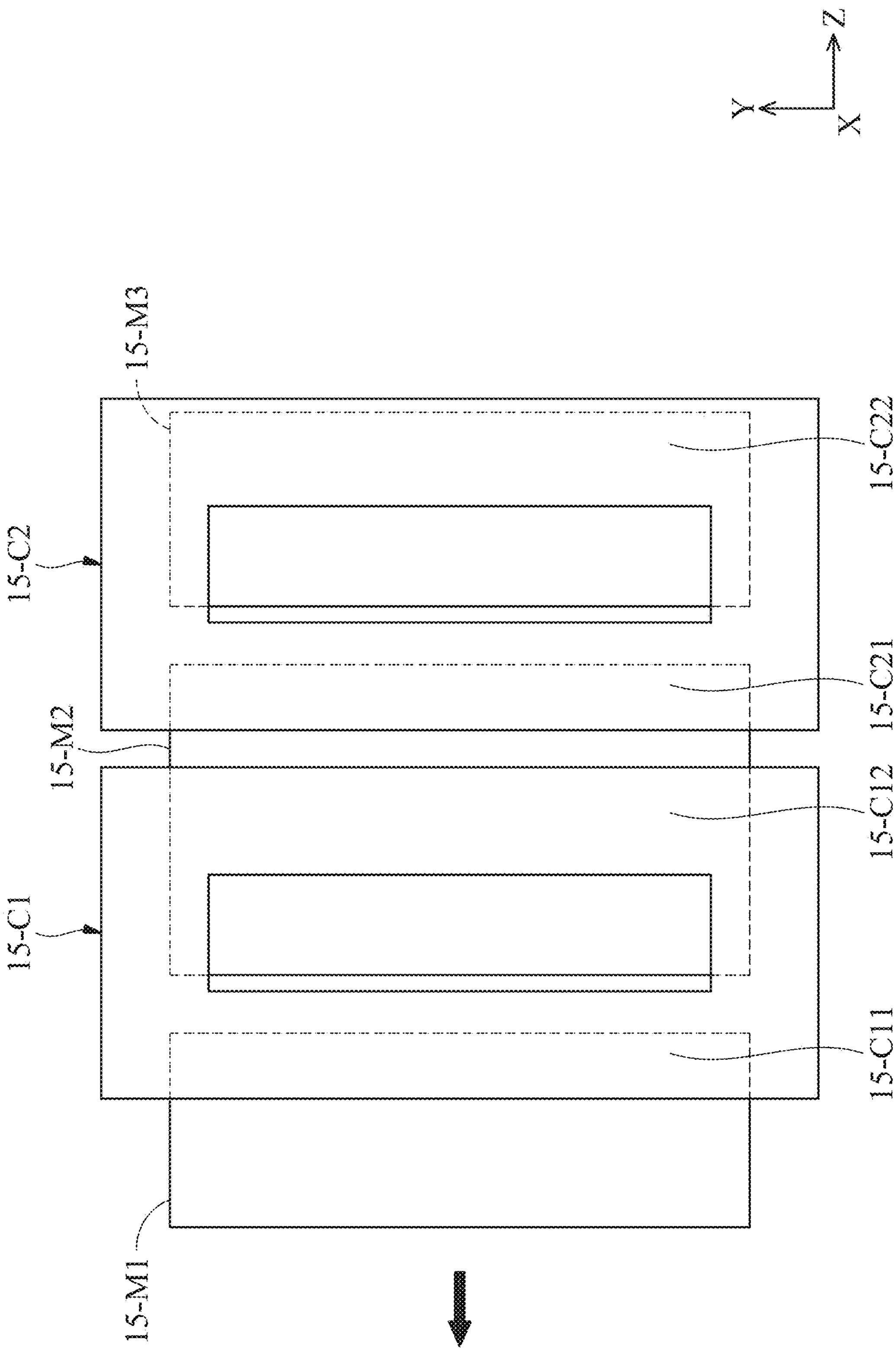

FIG. 18-19 is a schematic diagram showing the first and second resilient members 18-S1 and 18-S2 when viewed along the Z axis.

FIG. 19-1 is a diagram of an electronic device according to an embodiment of the present disclosure.

FIG. 19-2 is a diagram of the first optical module according to an embodiment of the present disclosure.

FIG. 19-3 is a block diagram of the first optical module according to the embodiment in FIG. 19-1 of the present invention.

FIG. 19-4A to FIG. 19-4C are diagrams illustrating that a focal plane of the light is in different positions relative to the image sensor according to an embodiment of the present disclosure.

Figures 1, 7:
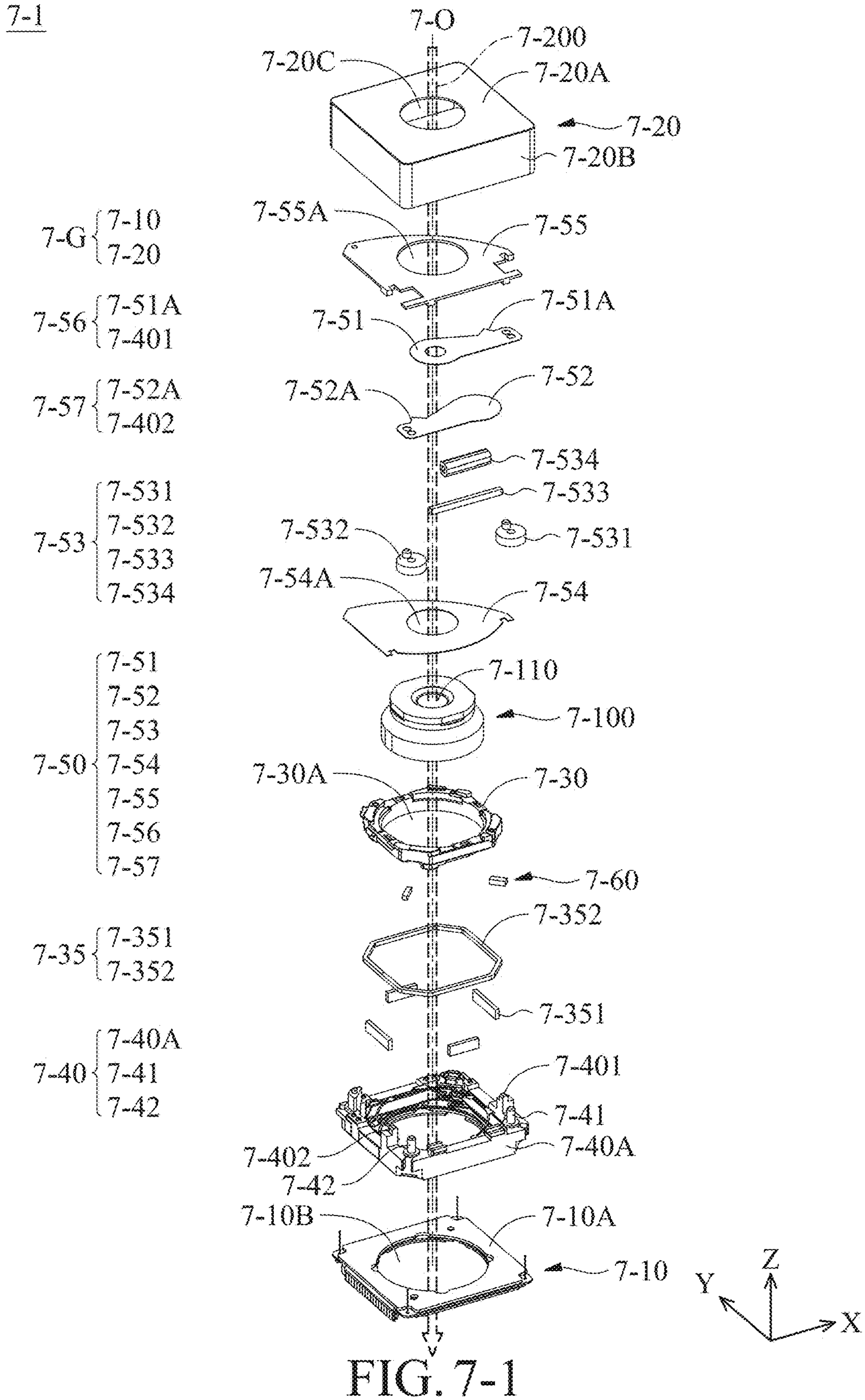
Figures 2A, 7:
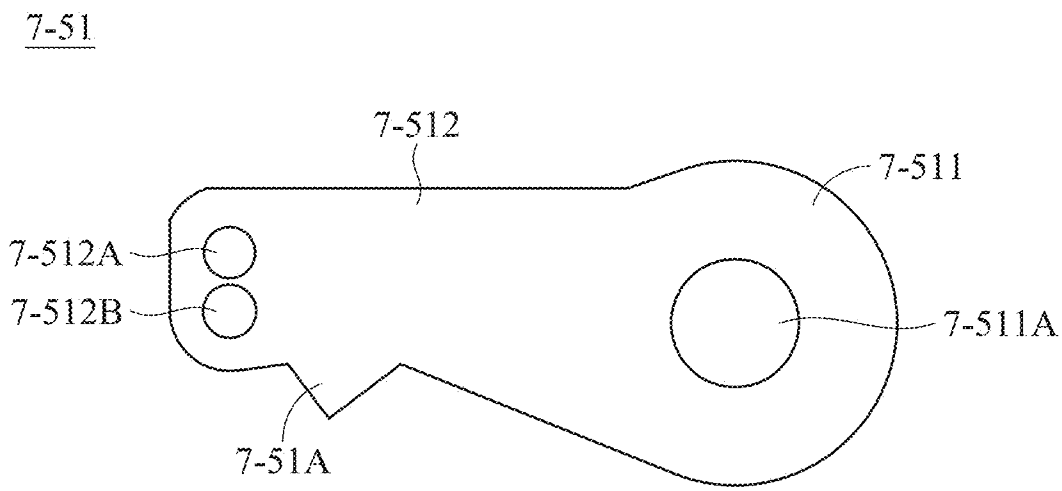
Figures 2B, 7:
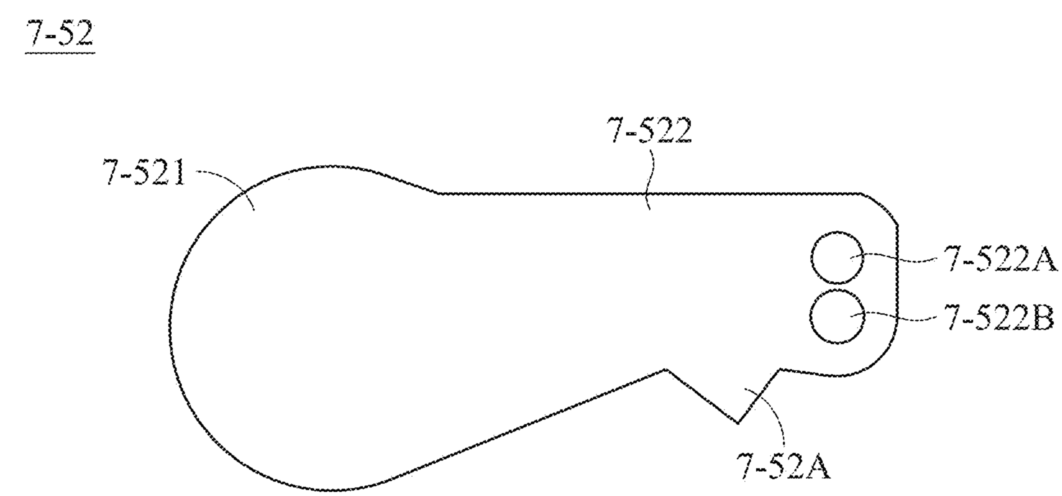
Figures 3, 7:
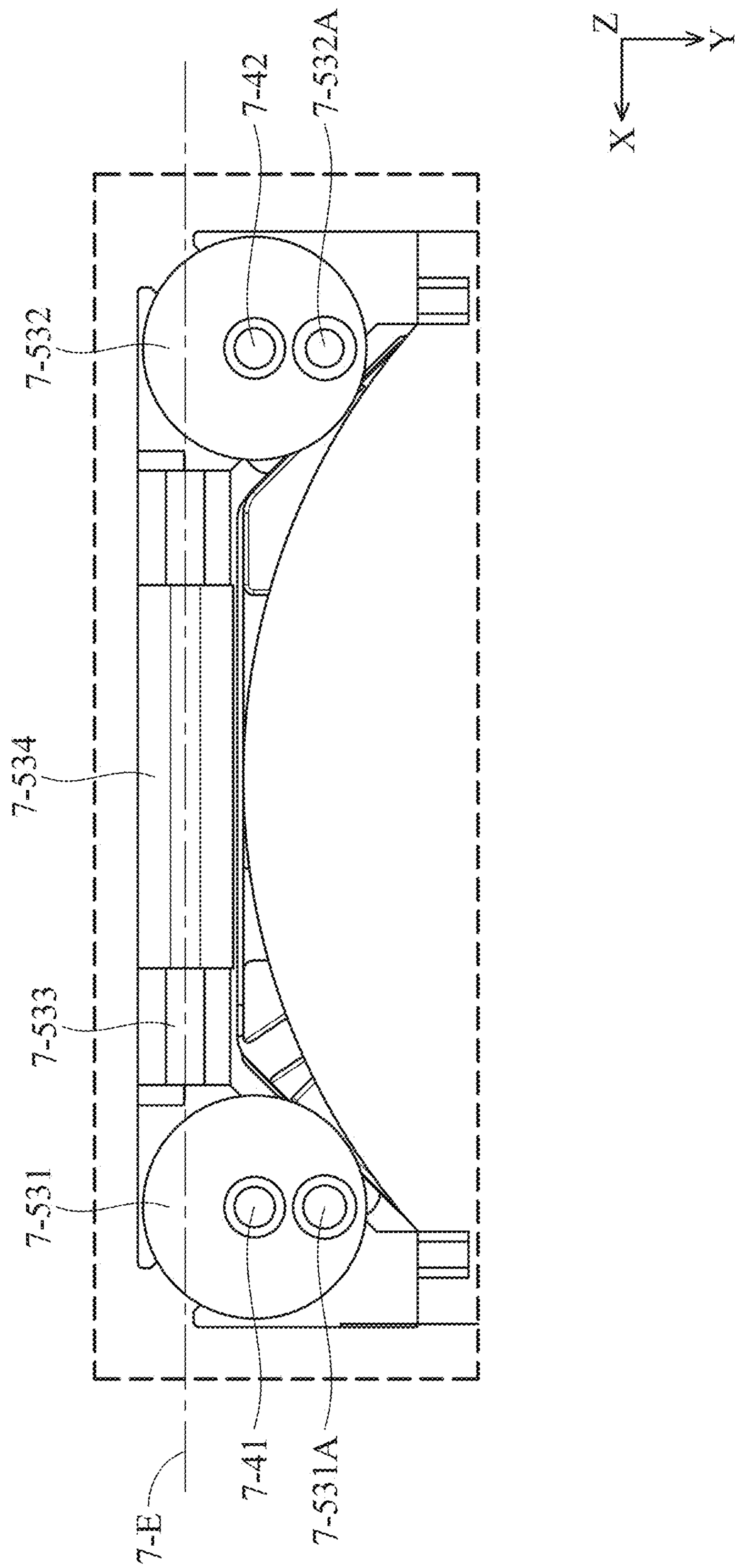
Figures 4A, 7:
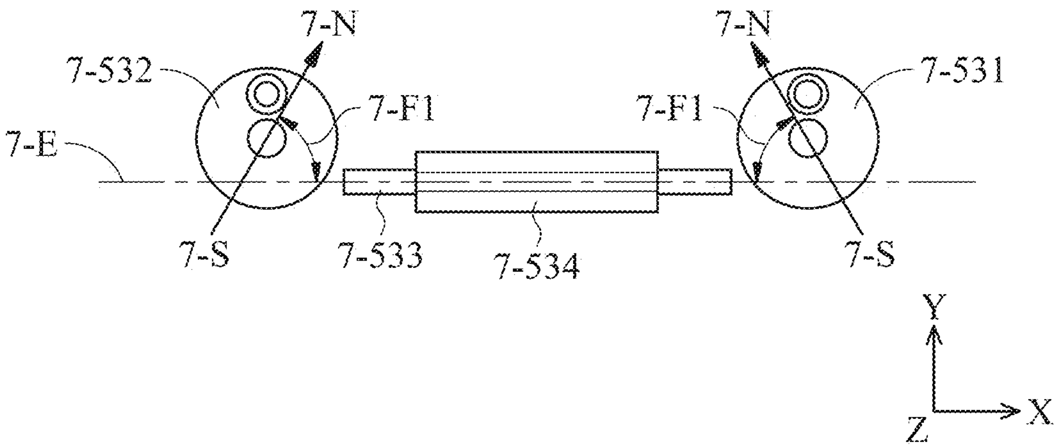
Figures 4B, 7:
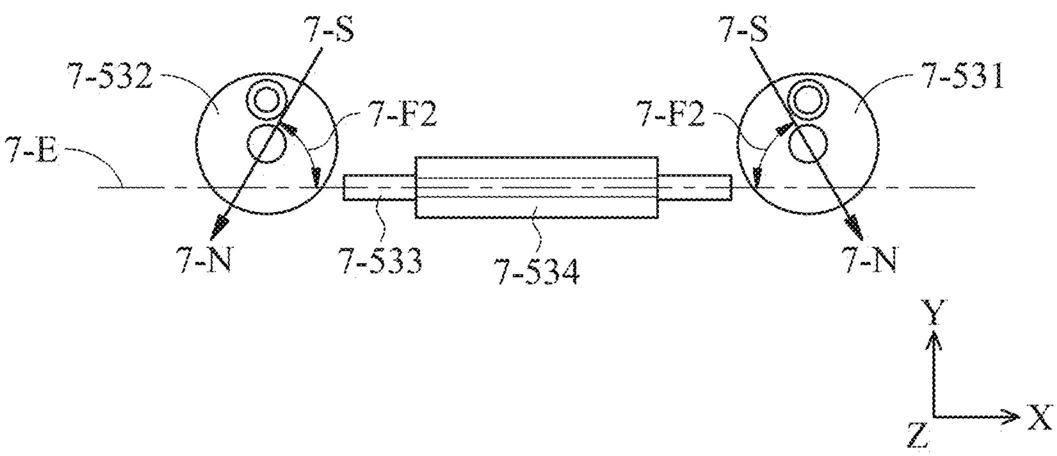
Figures 5A, 7:
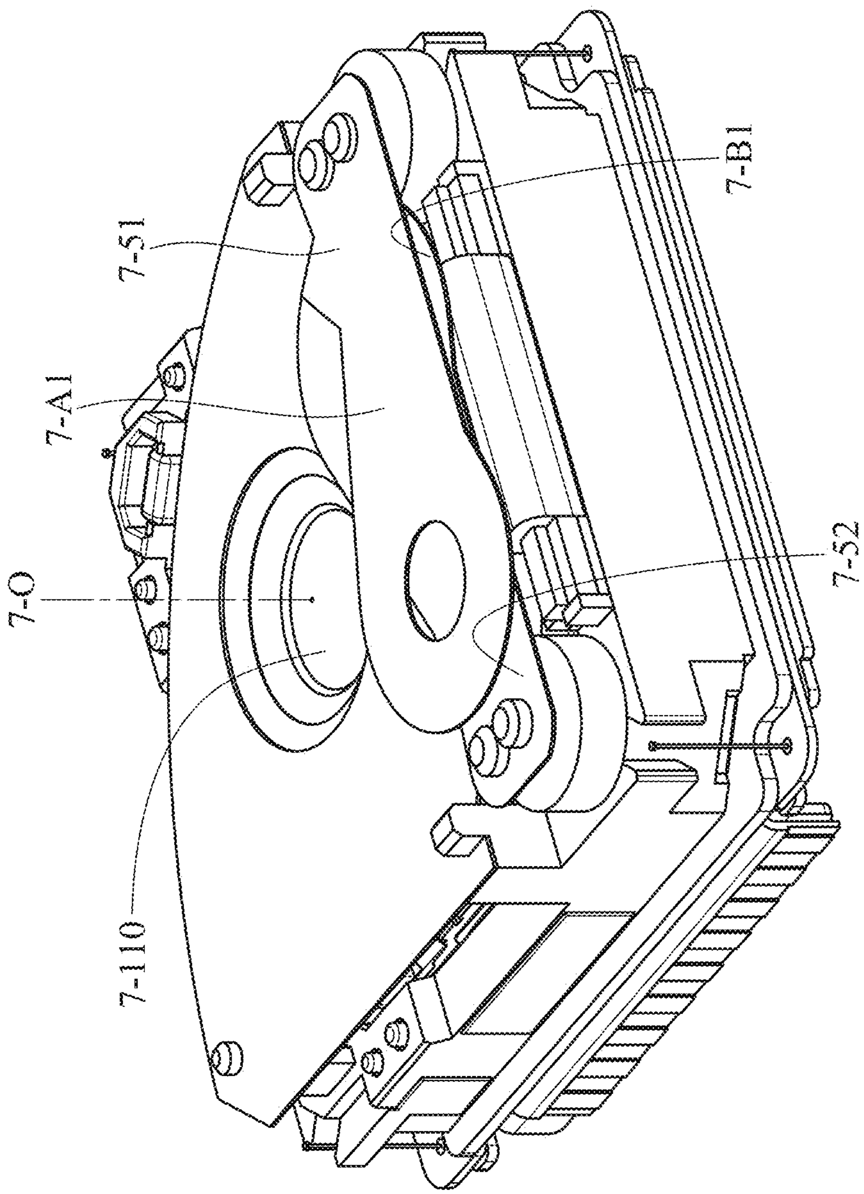
Figures 5B, 7:
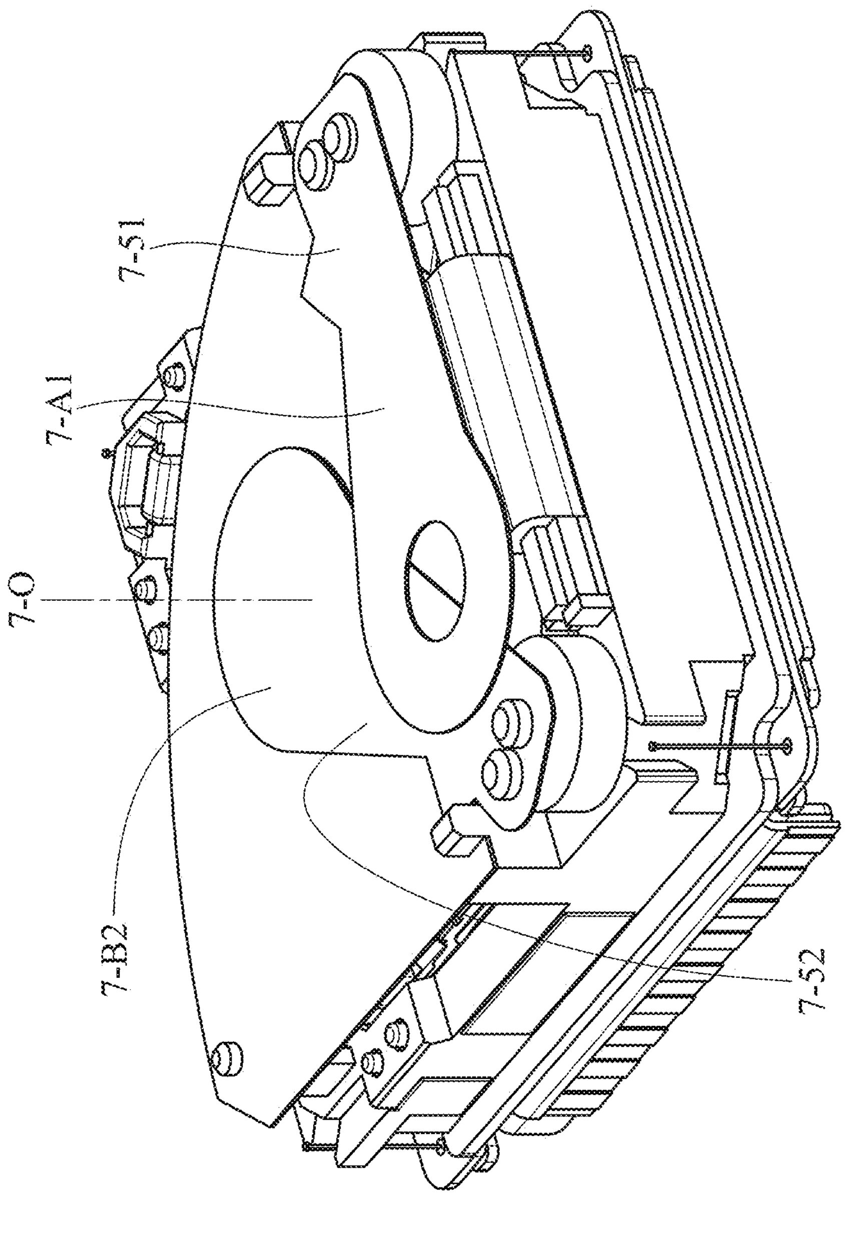
Figures 5C, 7:
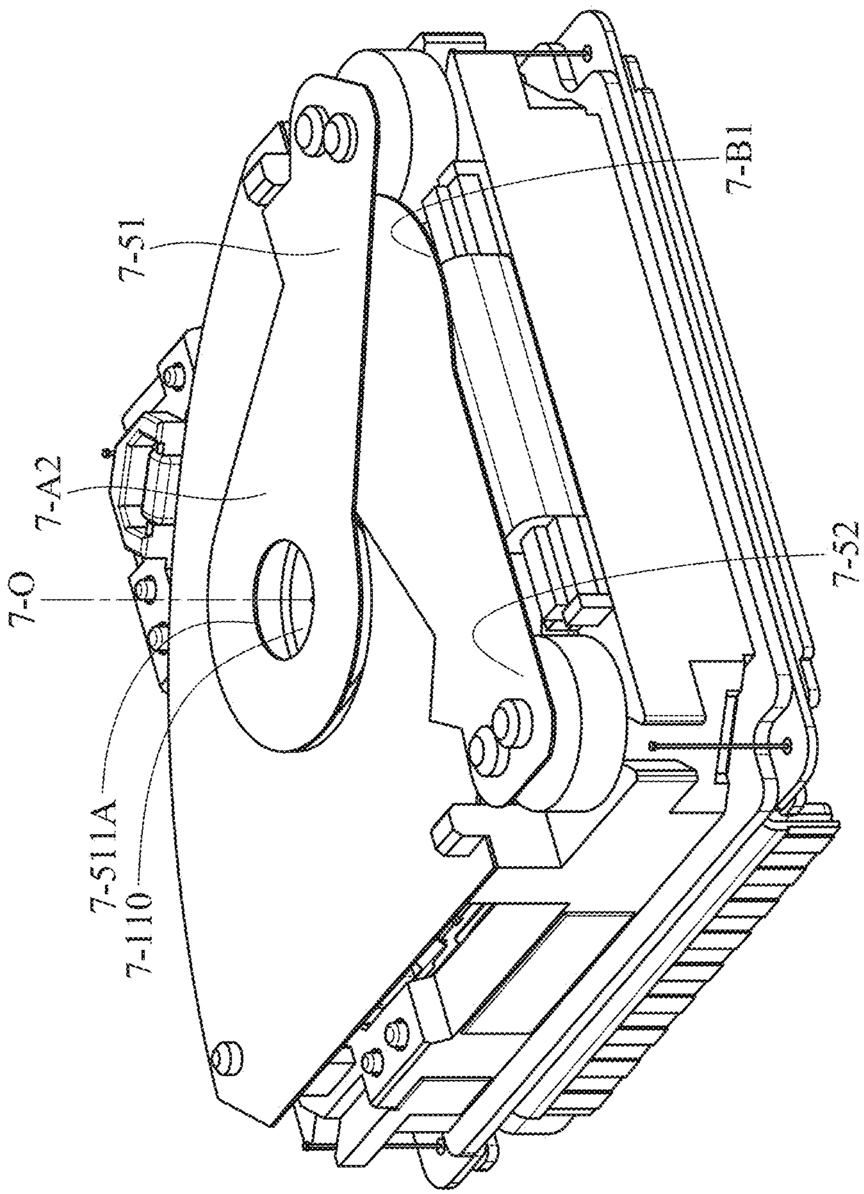
Figures 6A, 7:
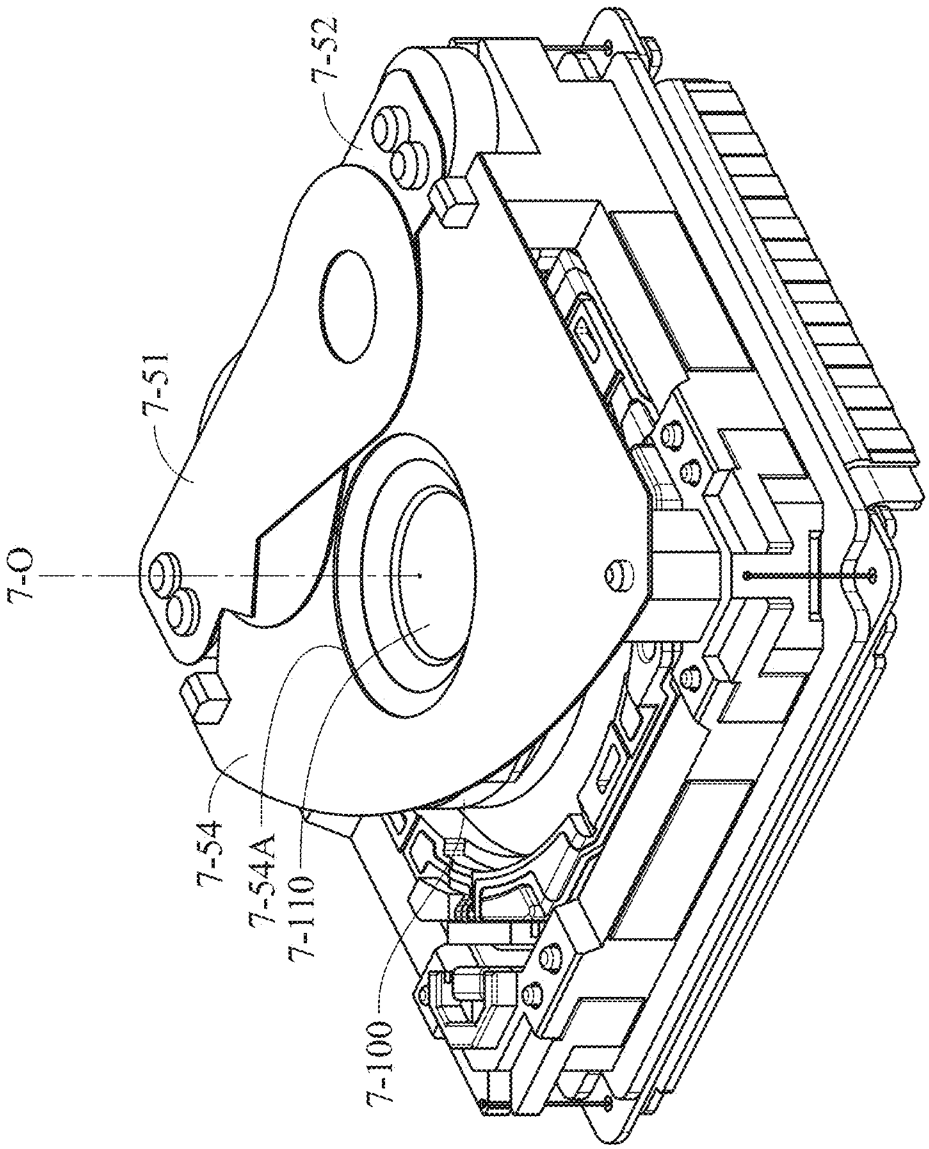
Figures 6B, 7:
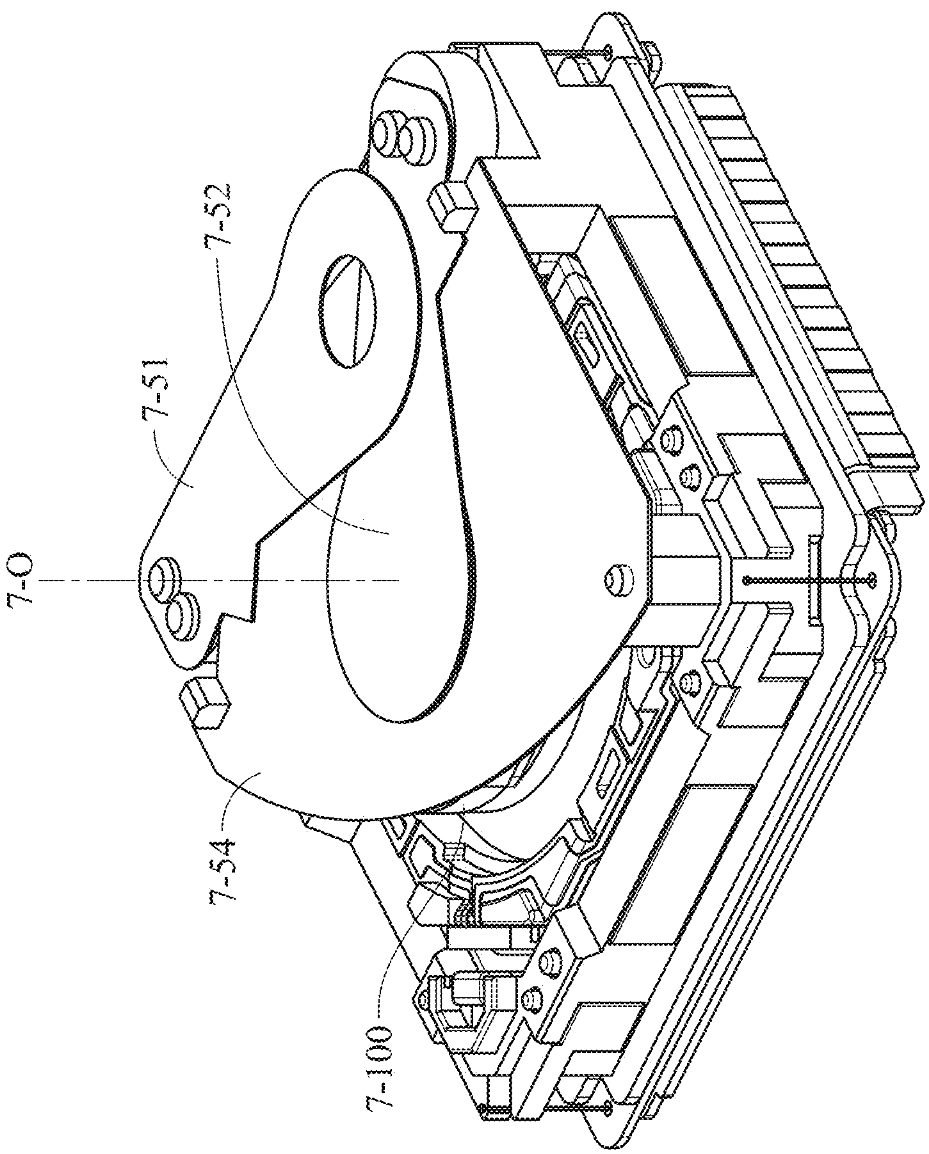
Figures 7, 7A:
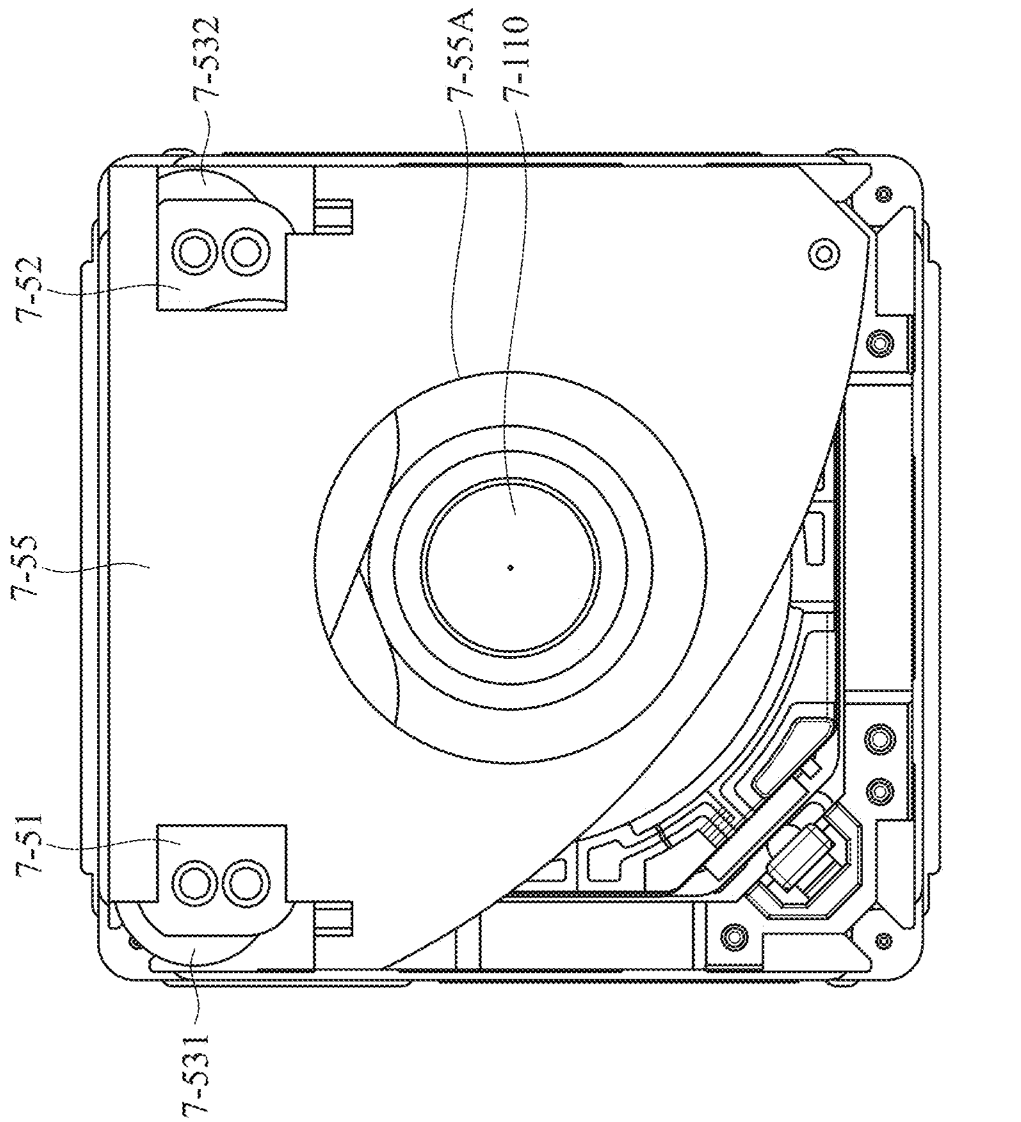
Figures 7, 7B:
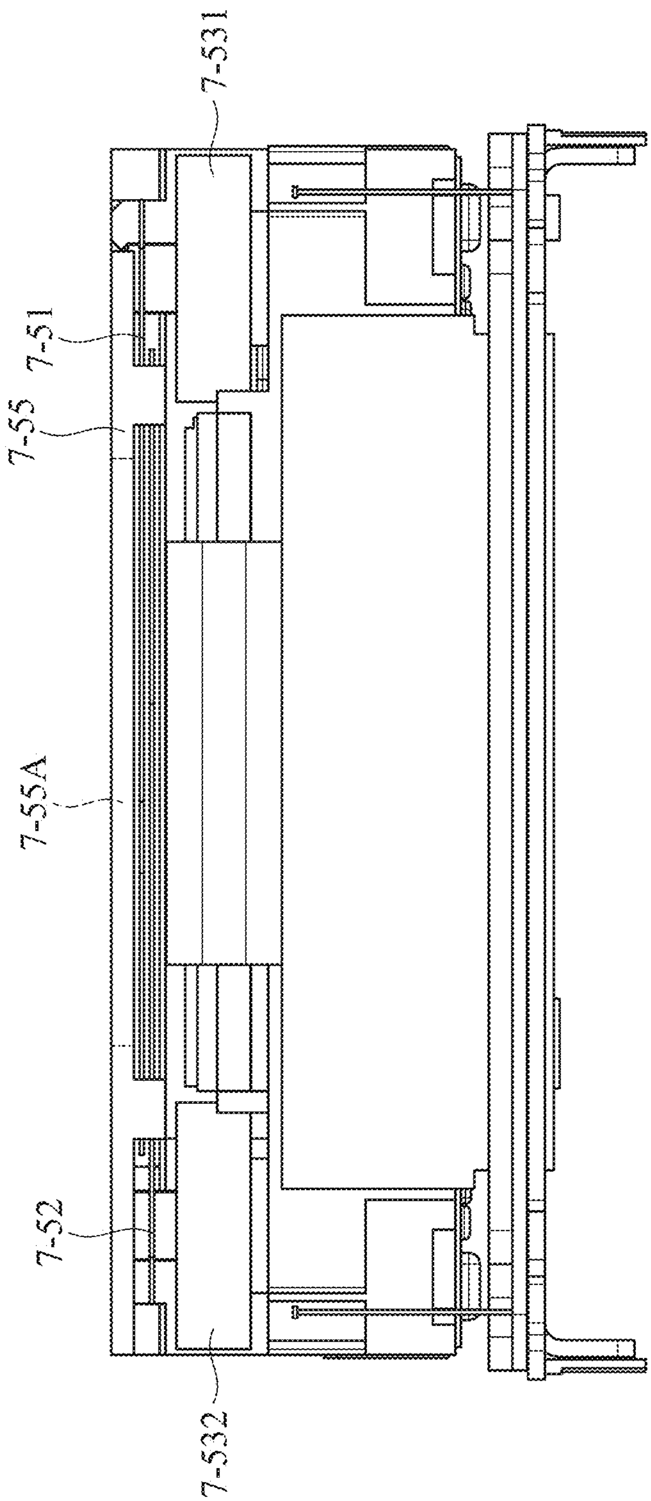
Figures 7, 7C:
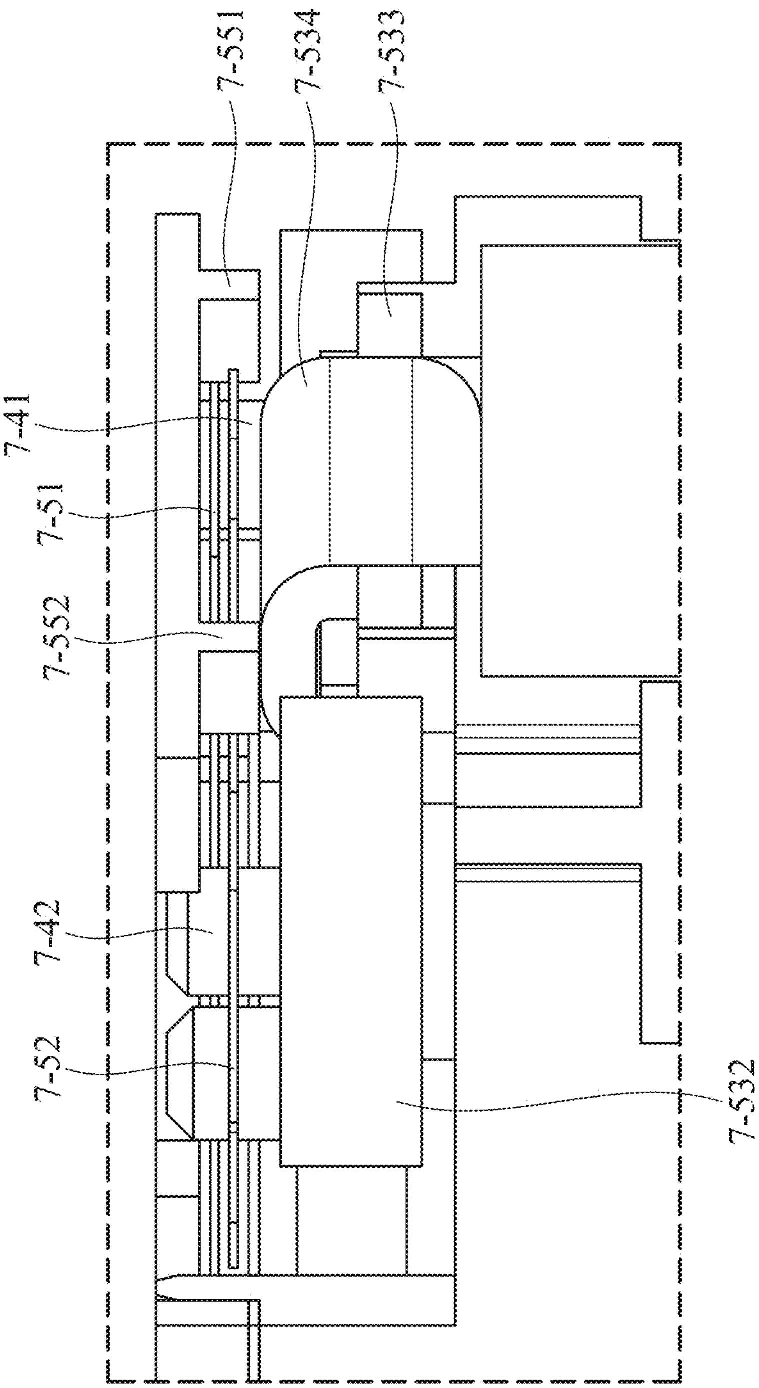
Figures 7, 8:
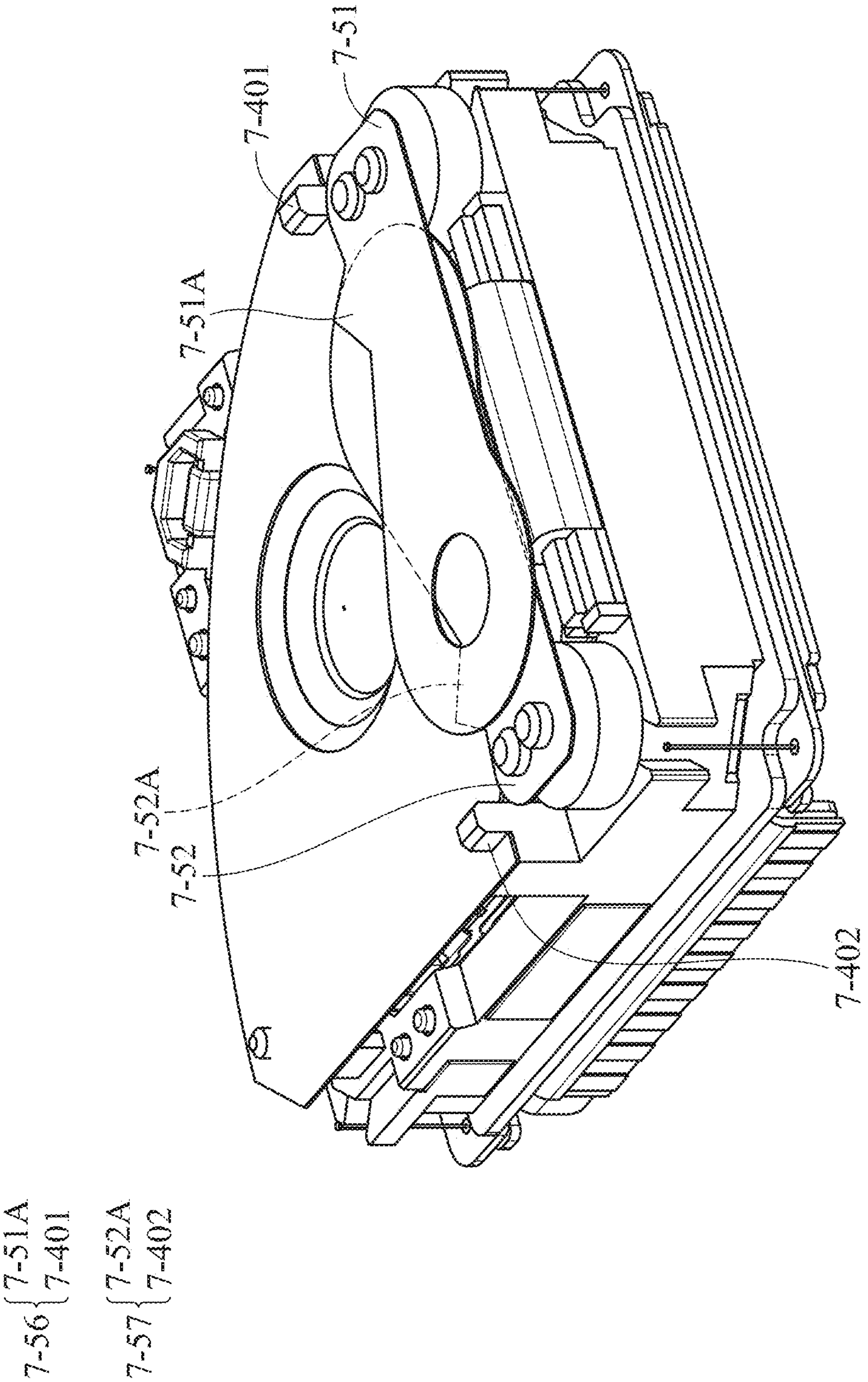
Figures 7, 8, 9:
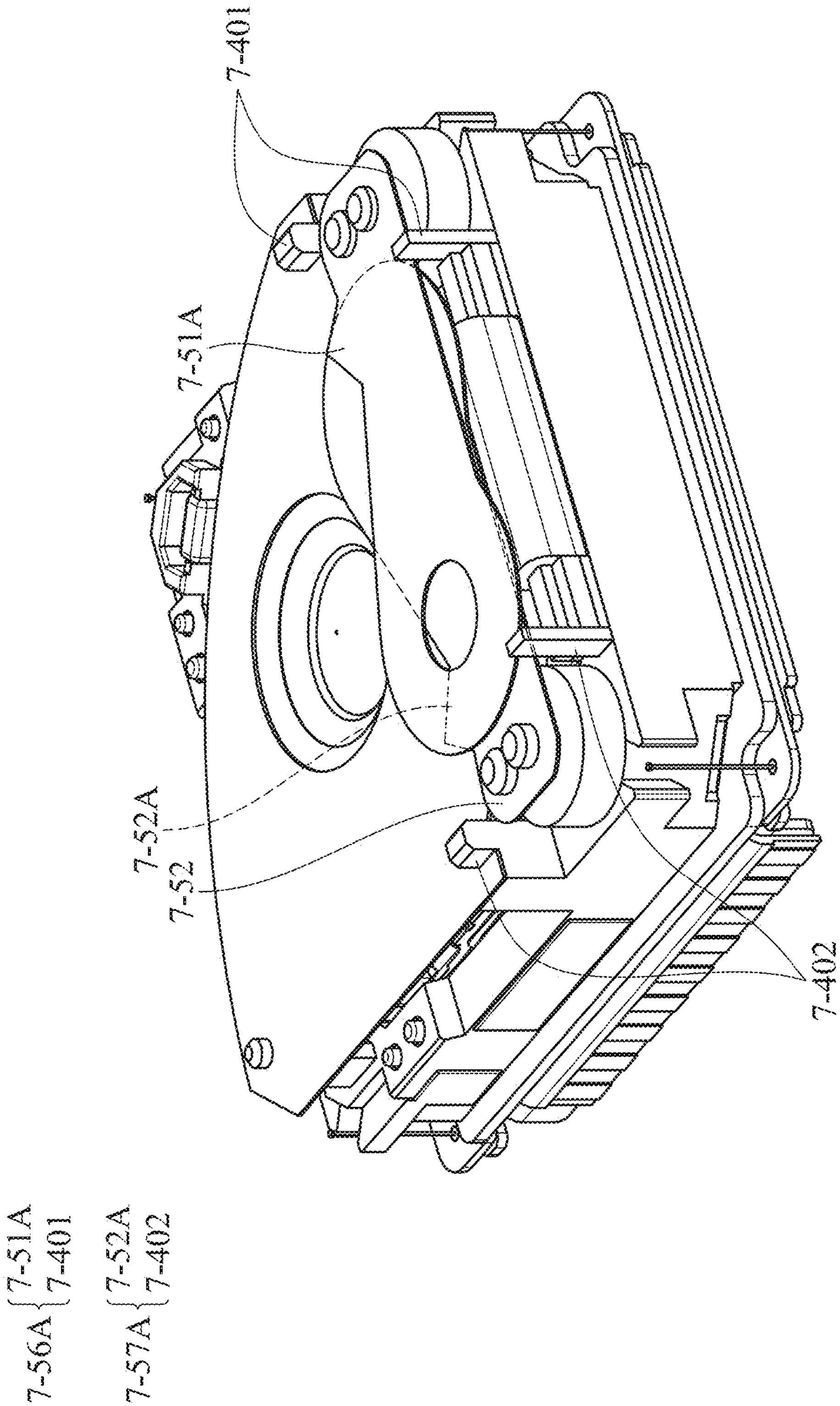
Figures 7, 8, 9, 10, 10B:
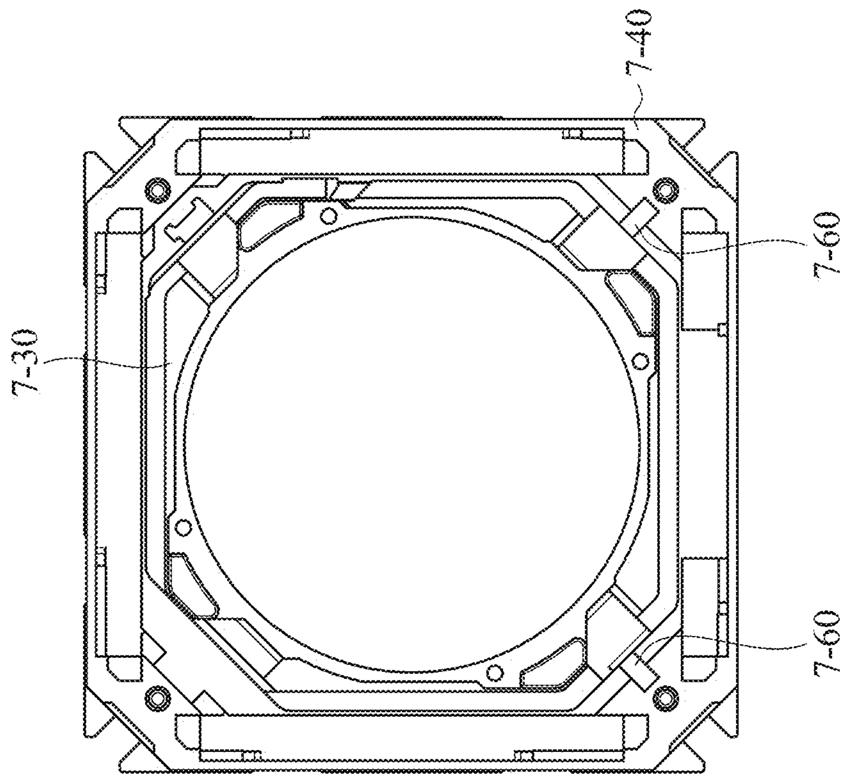
Figures 7, 8, 9, 10, 10A:
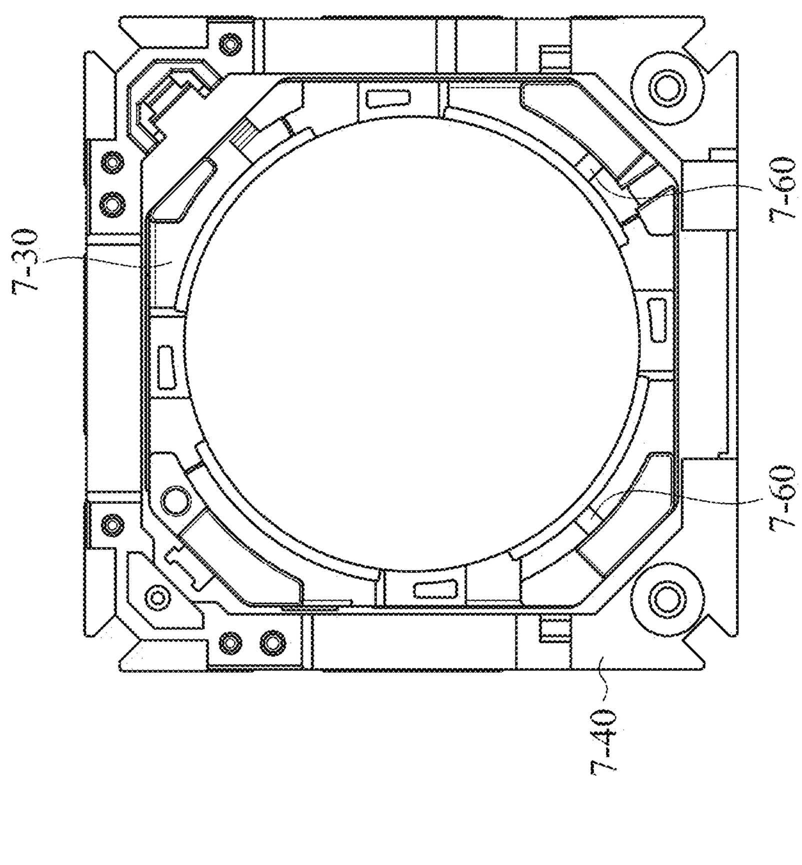
Figures 7, 8, 9, 10, 11:
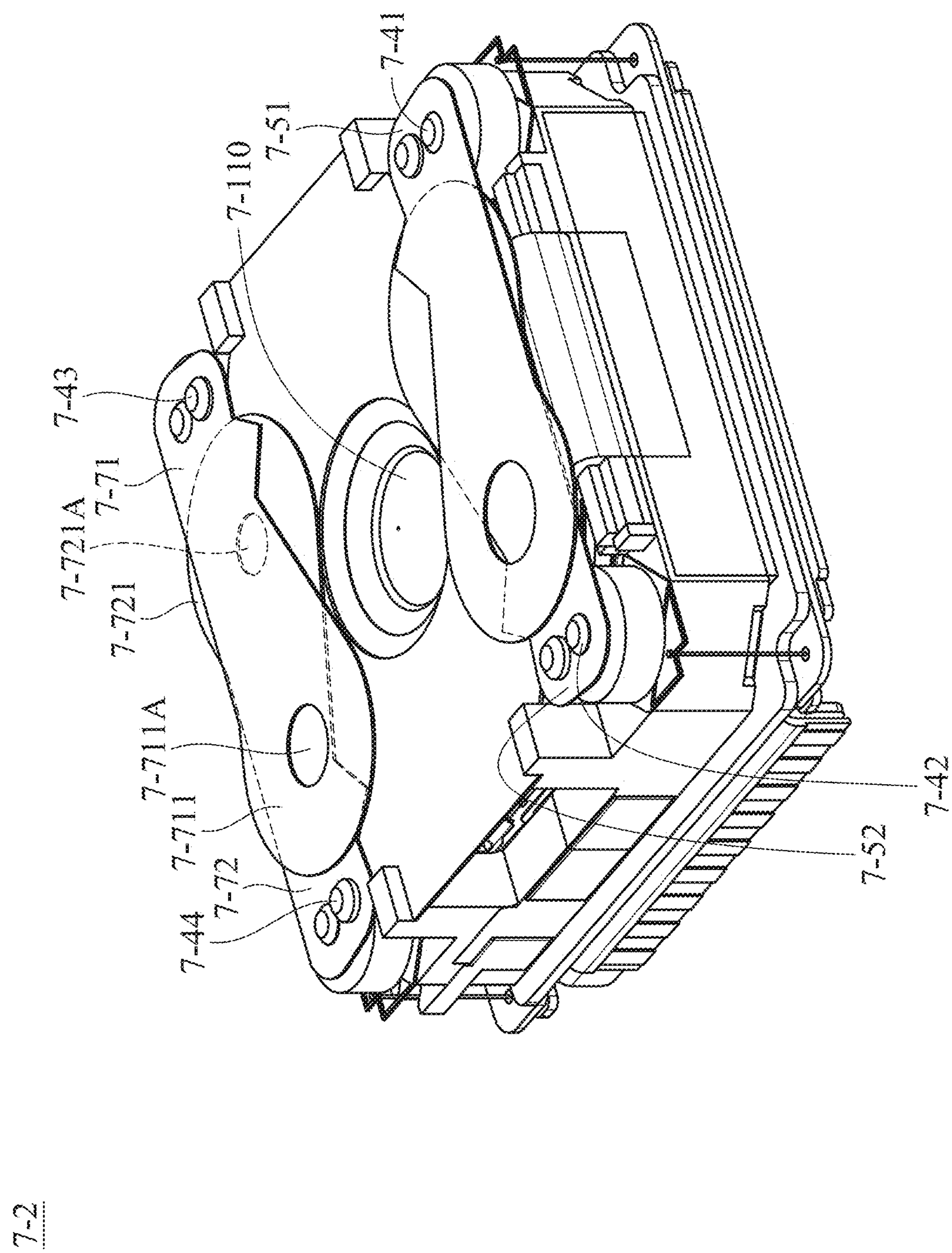

FIG. 19-5A to FIG. 19-5C are images generated by the image sensor corresponding to FIG. 19-4A to FIG. 19-4C, respectively.

FIG. 19-6A to FIG. 19-6C are diagrams illustrating the contrast value curve corresponding to a first zone, a second zone and a third zone in FIG. 19-5A to FIG. 19-5C, respectively.

FIG. 19-7A is a diagram illustrating that the tilt of the focal plane with respect to the image sensor according to an embodiment of the present disclosure.

FIG. 19-7B is a diagram of a fourth image generated by the image sensor in the FIG. 19-7A.

FIG. 19-7C and FIG. 19-7D are diagrams of contrast value curves of a fourth zone and a fifth zone, respectively.

FIG. 19-8A is a diagram illustrating that the light is deviated from the center of the image sensor according to an embodiment of the present disclosure.

FIG. 19-8B is a diagram of a fifth image generated by the image sensor in the FIG. 19-8A.

Figures 8, 8C:
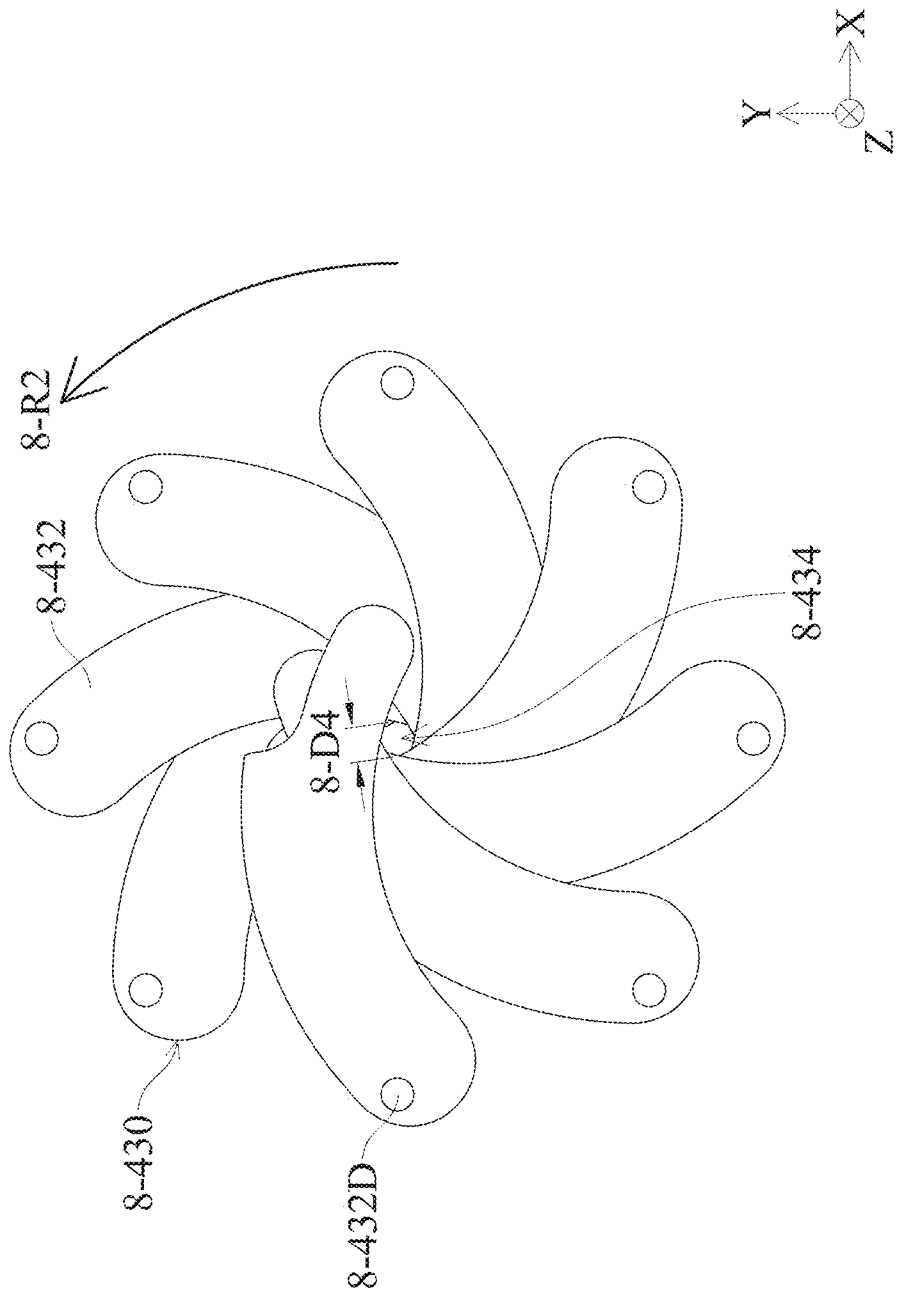
Figures 1, 9:
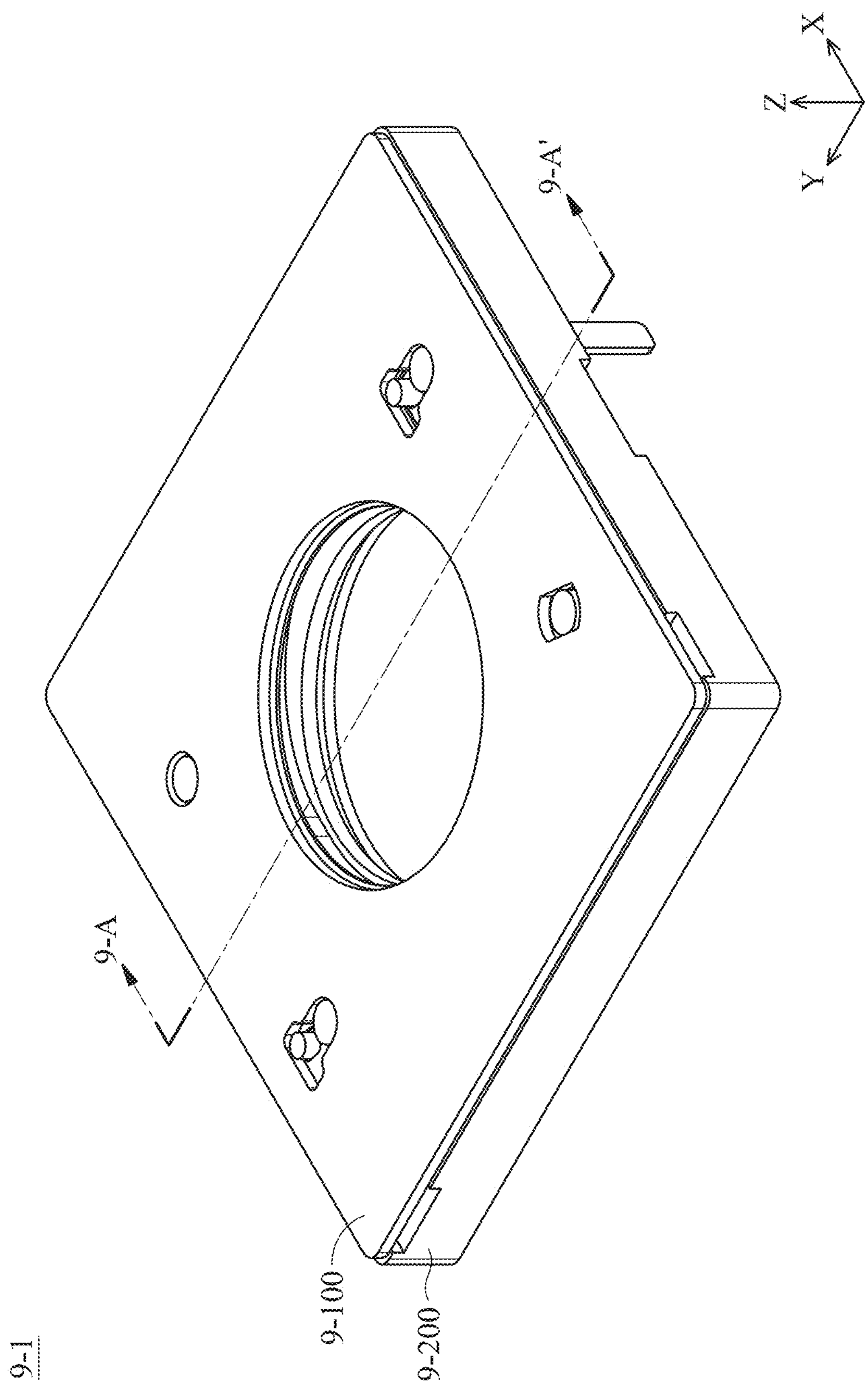
Figures 2, 9:
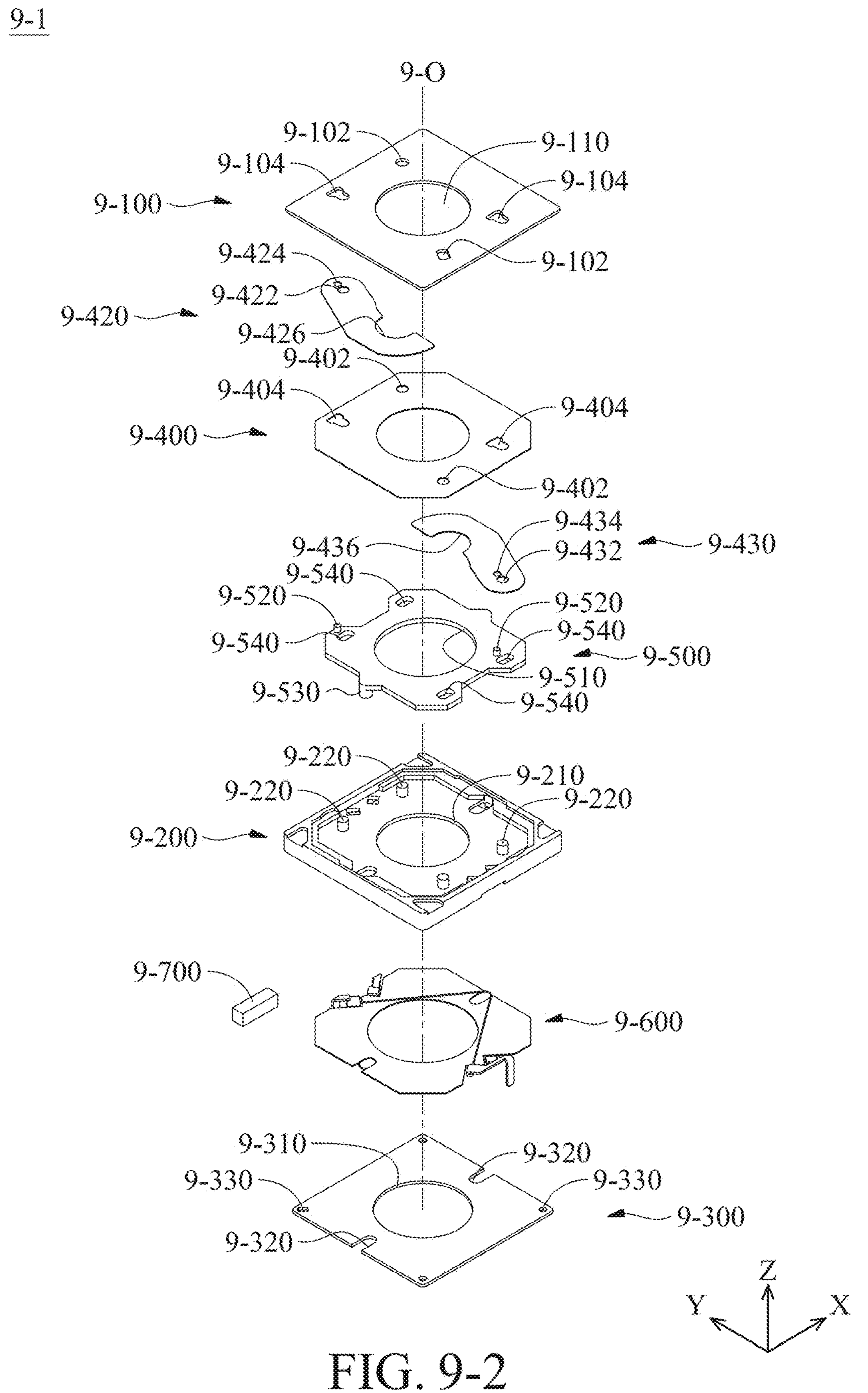
Figures 3, 9:
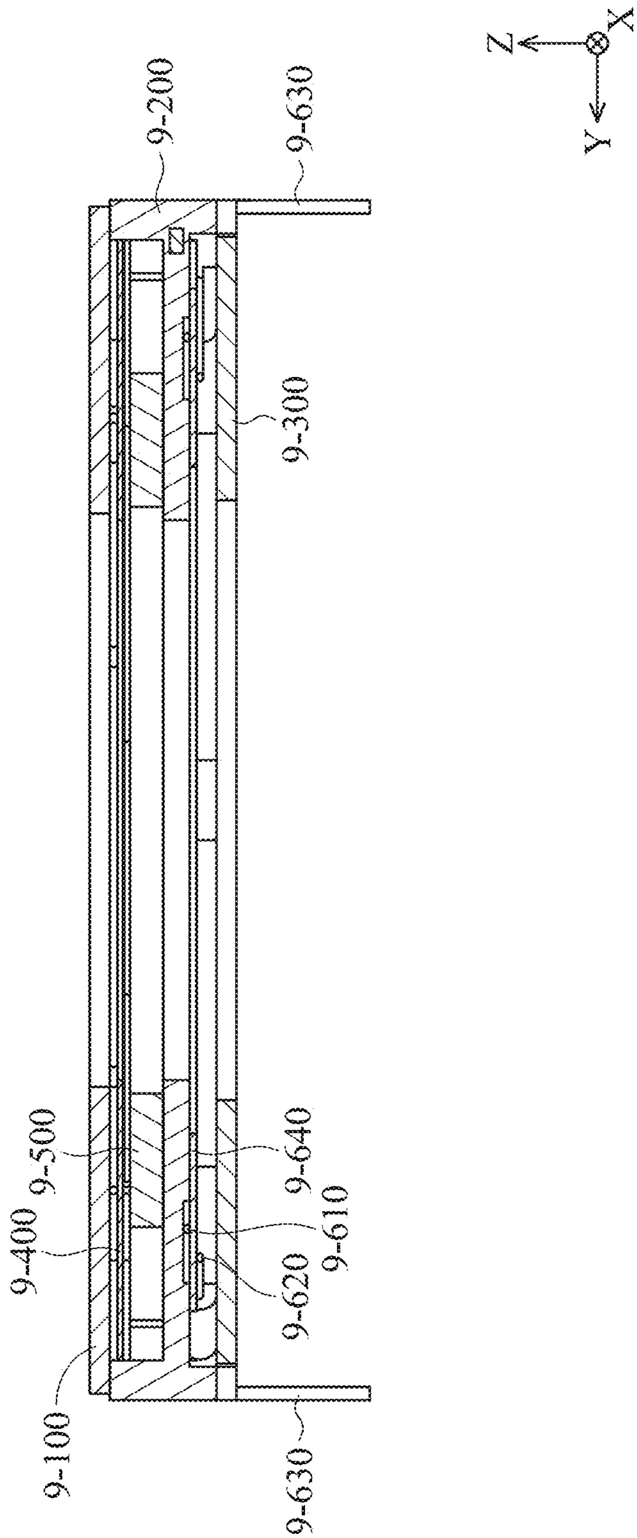
Figures 4A, 9:
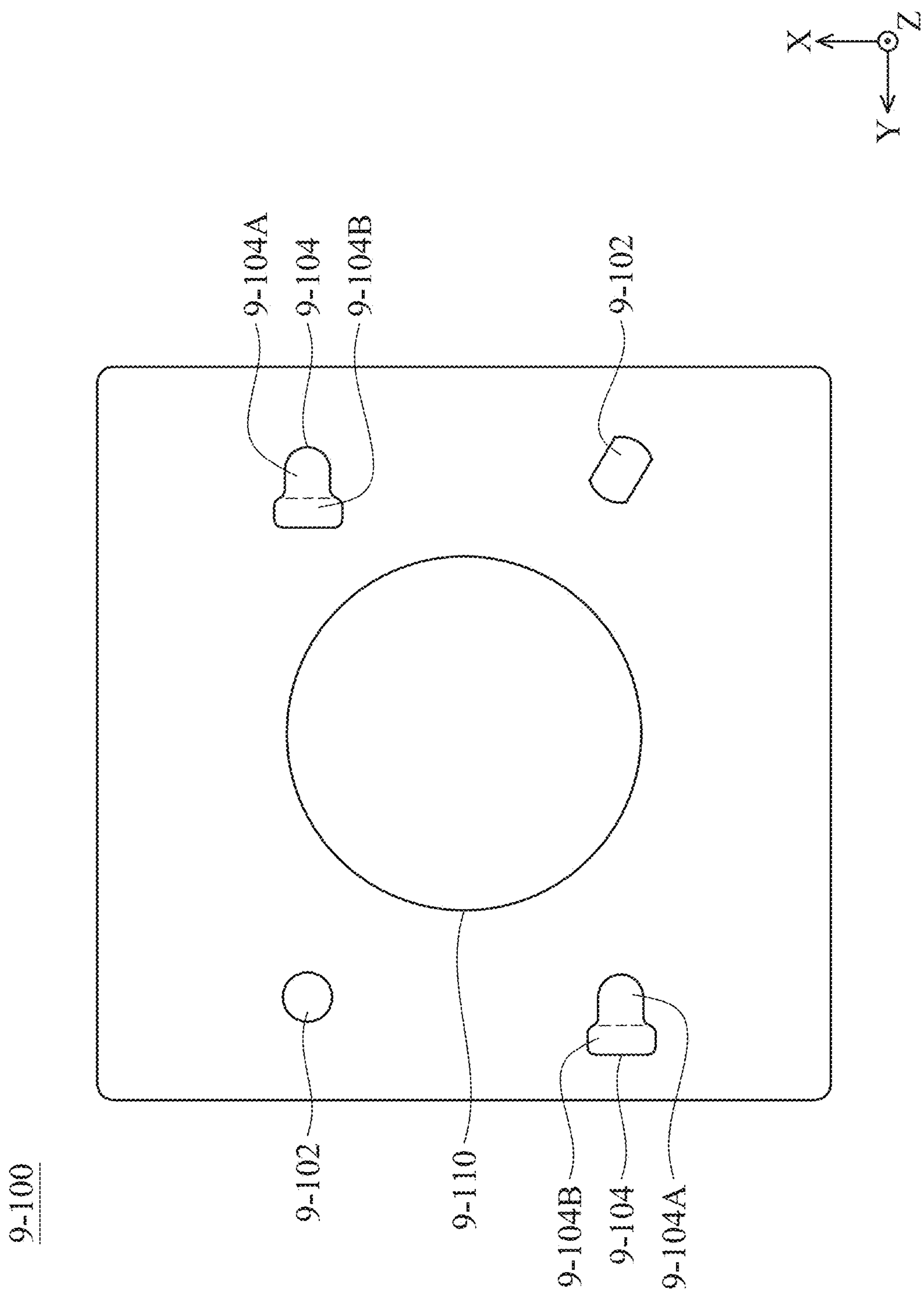
Figures 4B, 9:
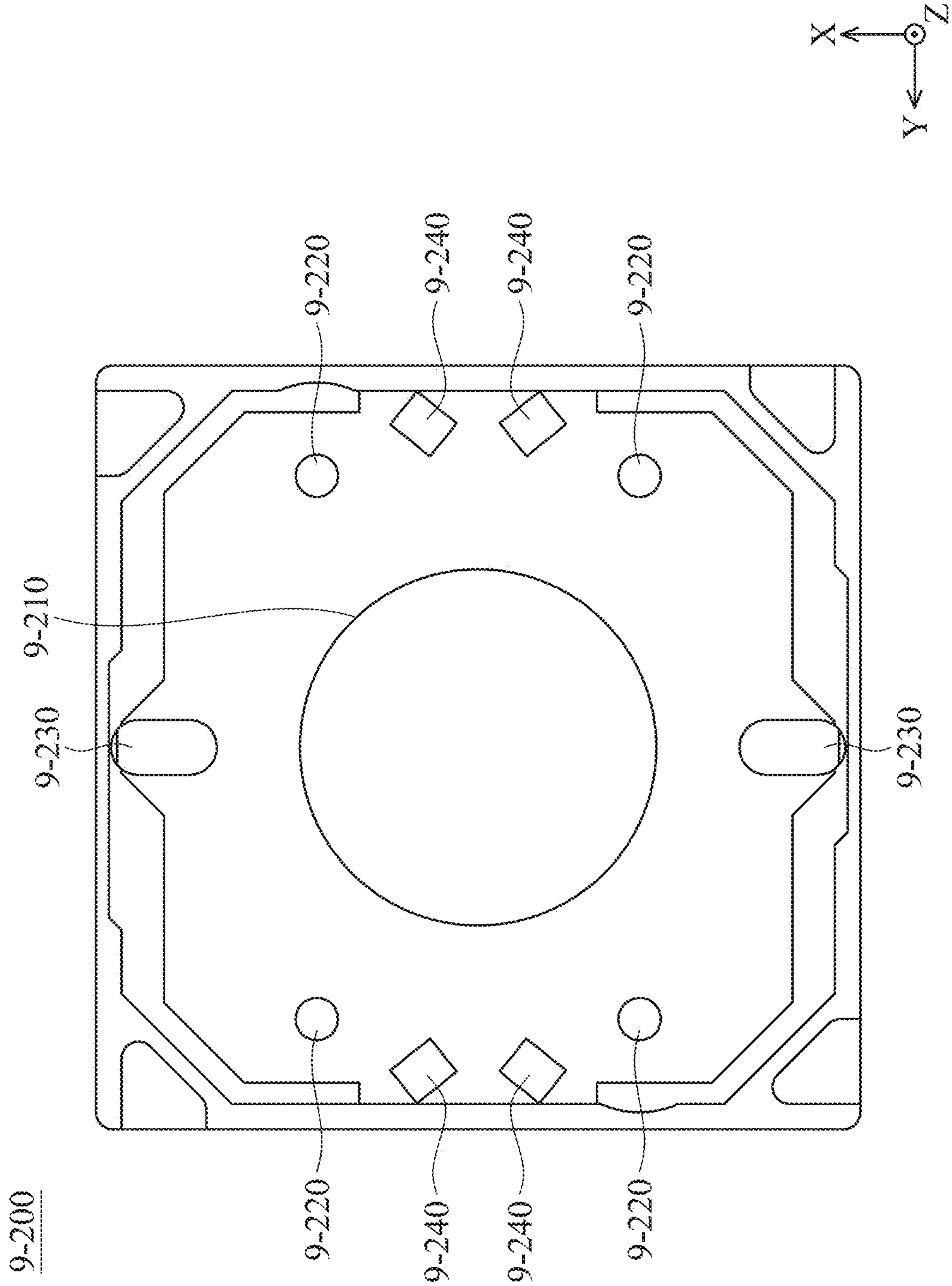
Figures 4C, 9:
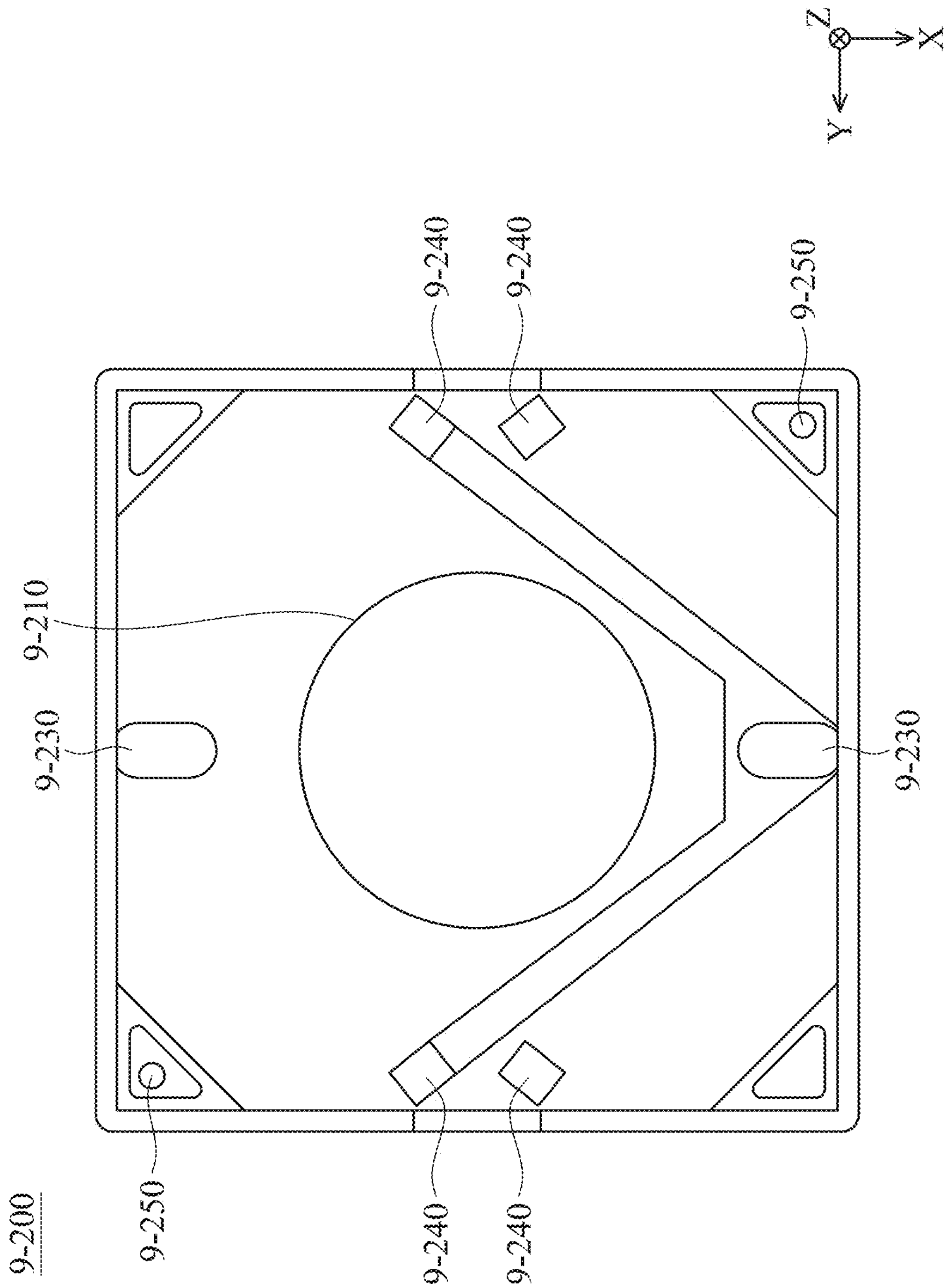
Figures 4D, 9:
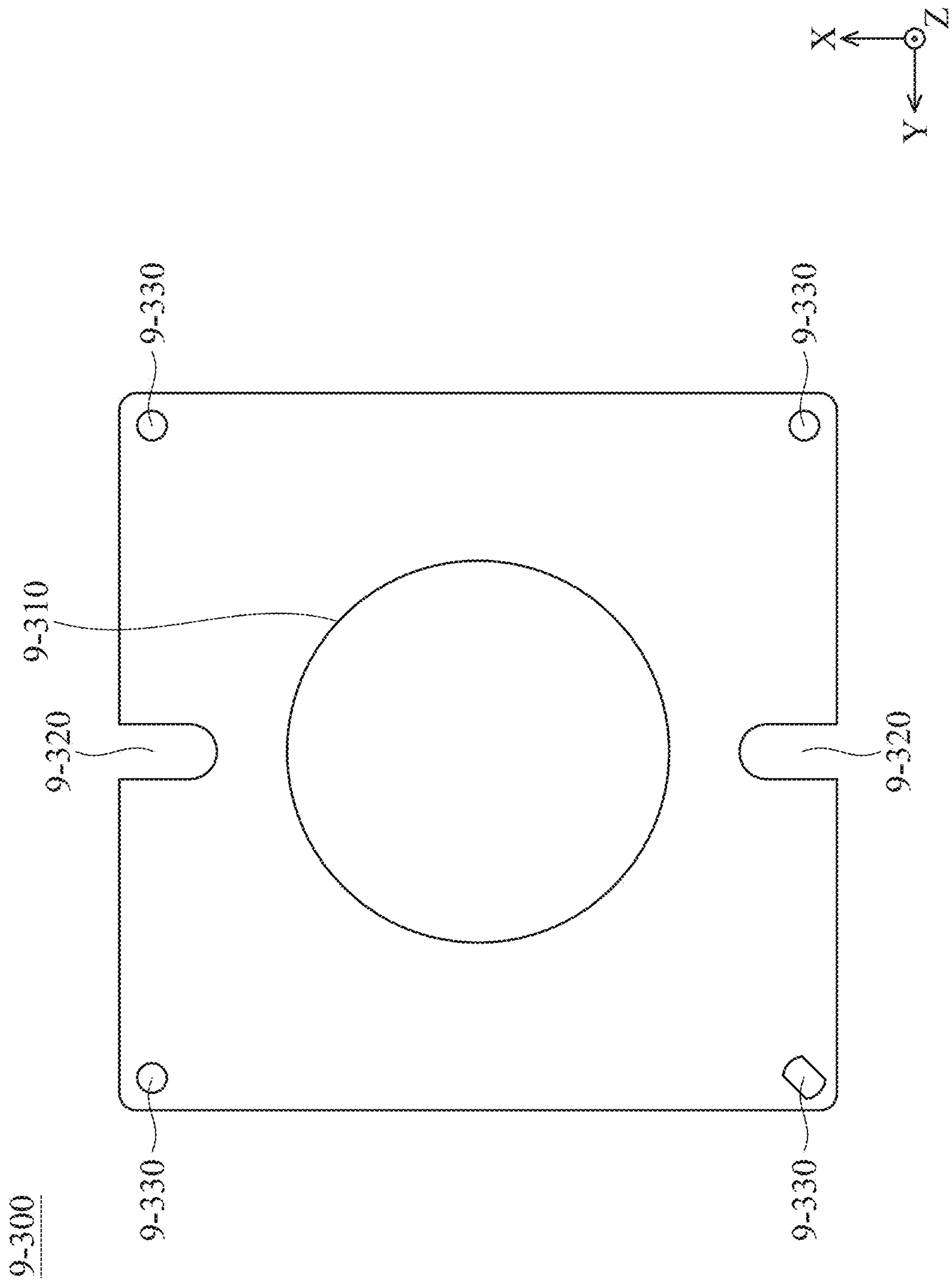
Figures 4E, 9:
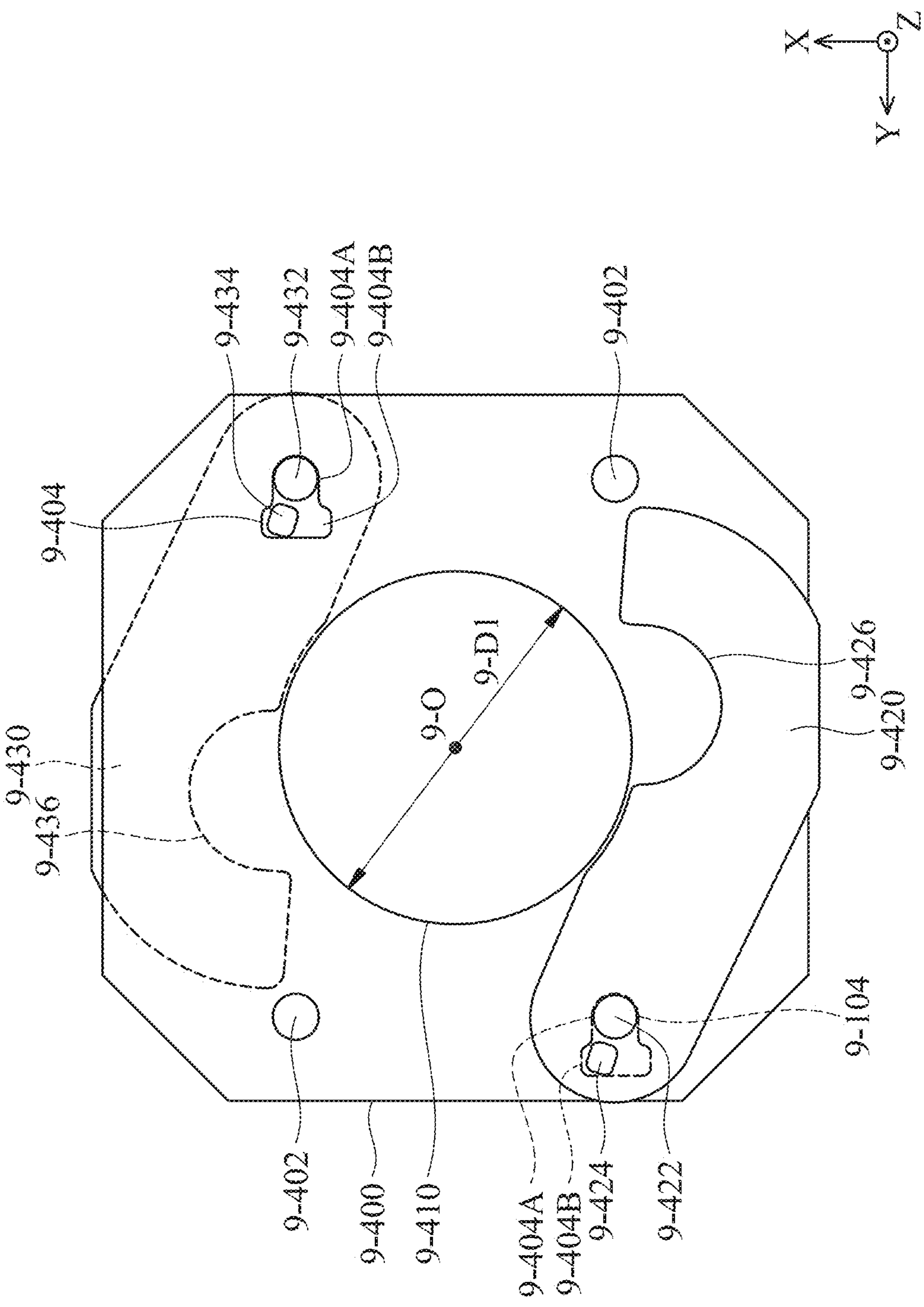
Figures 4F, 9:
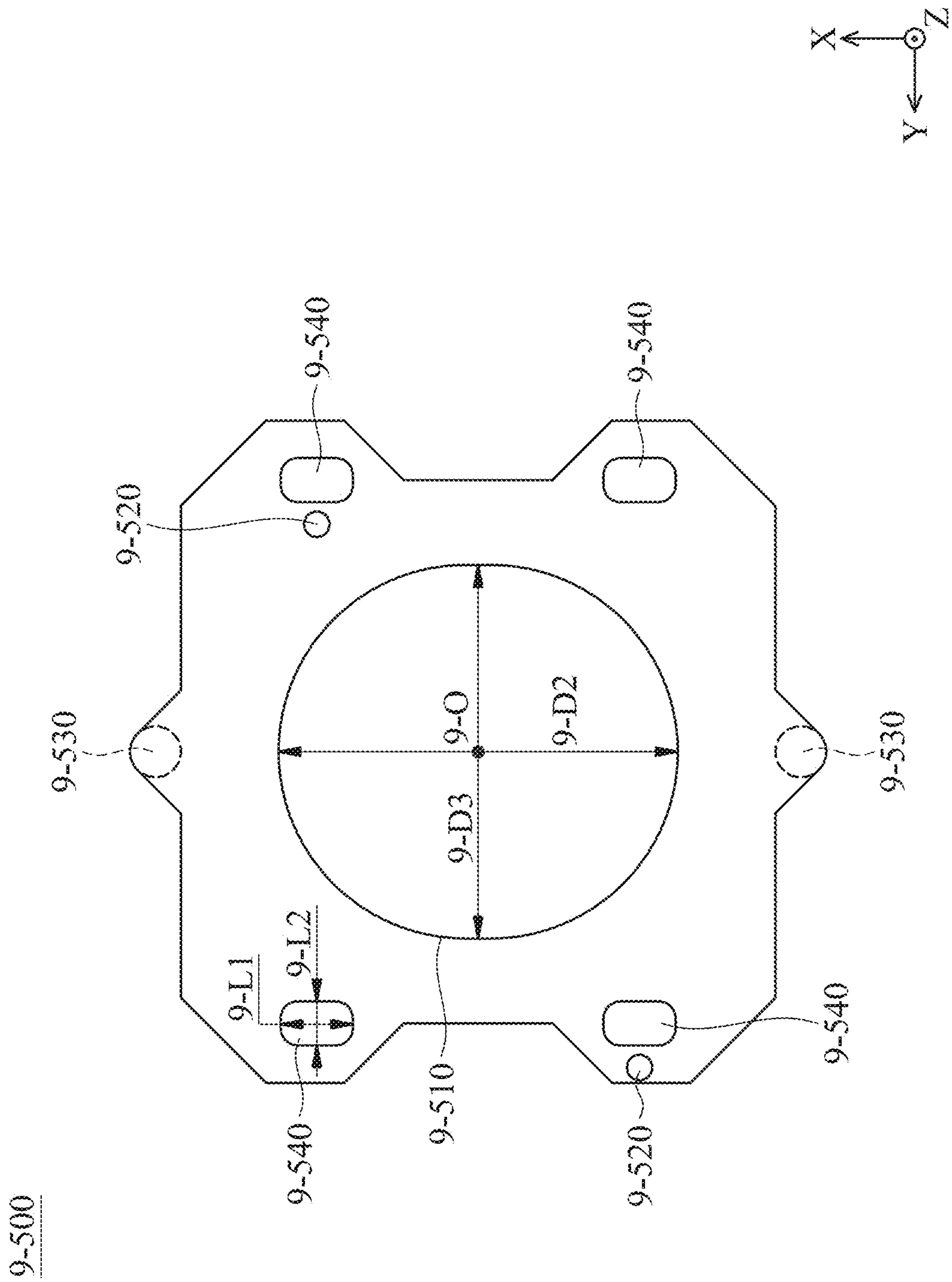
Figures 4G, 9:
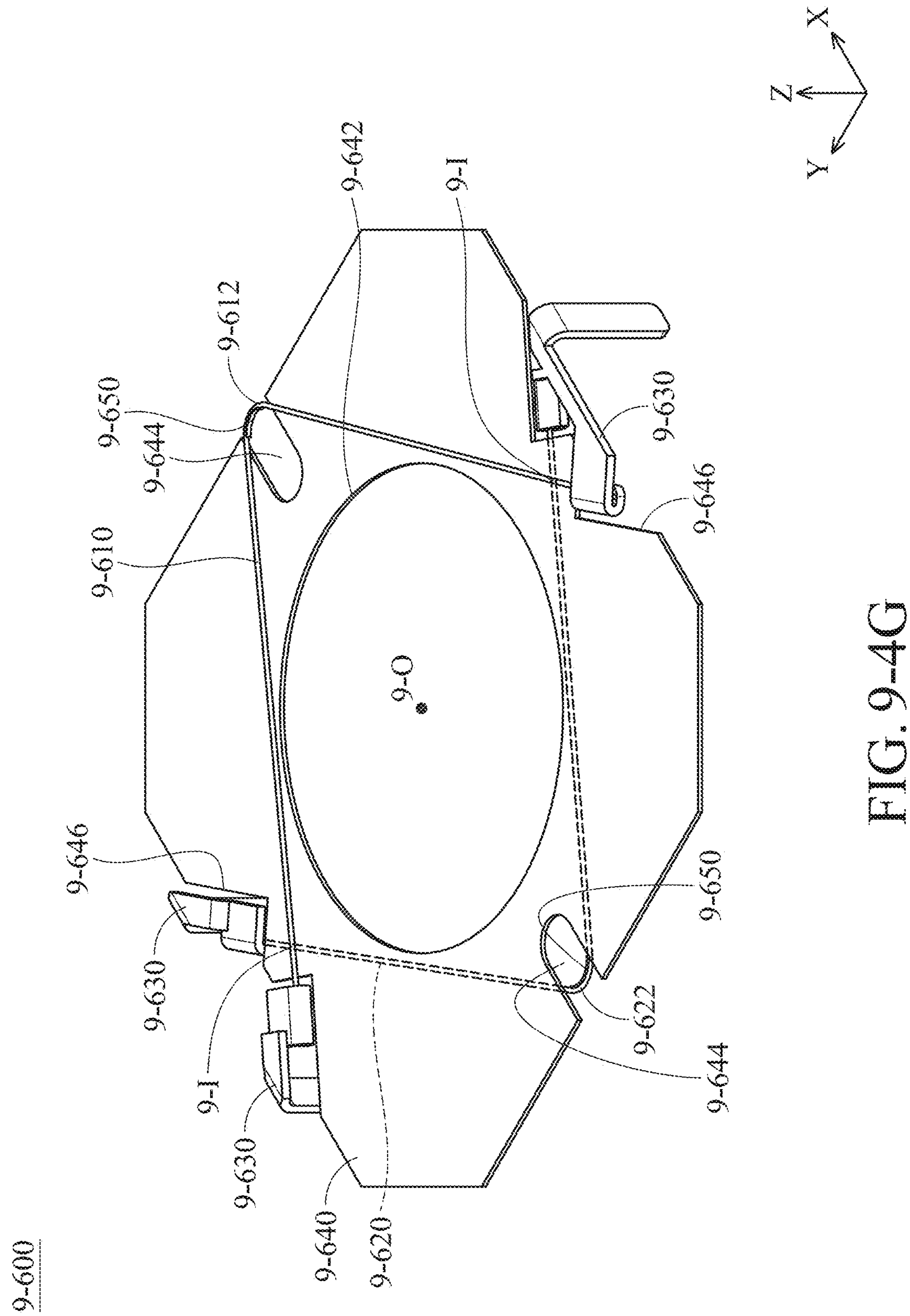
Figures 5A, 9:
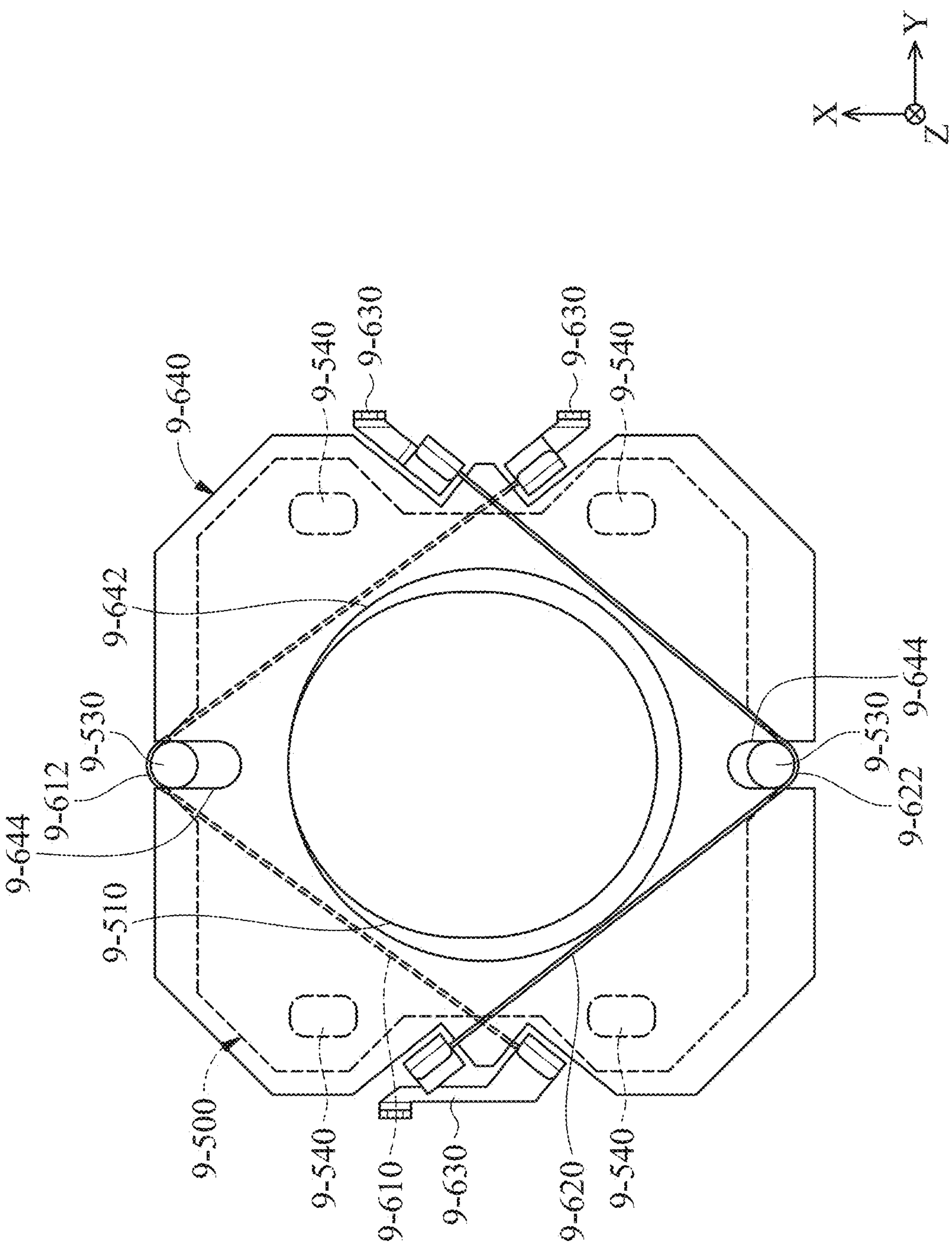
Figures 5B, 9:
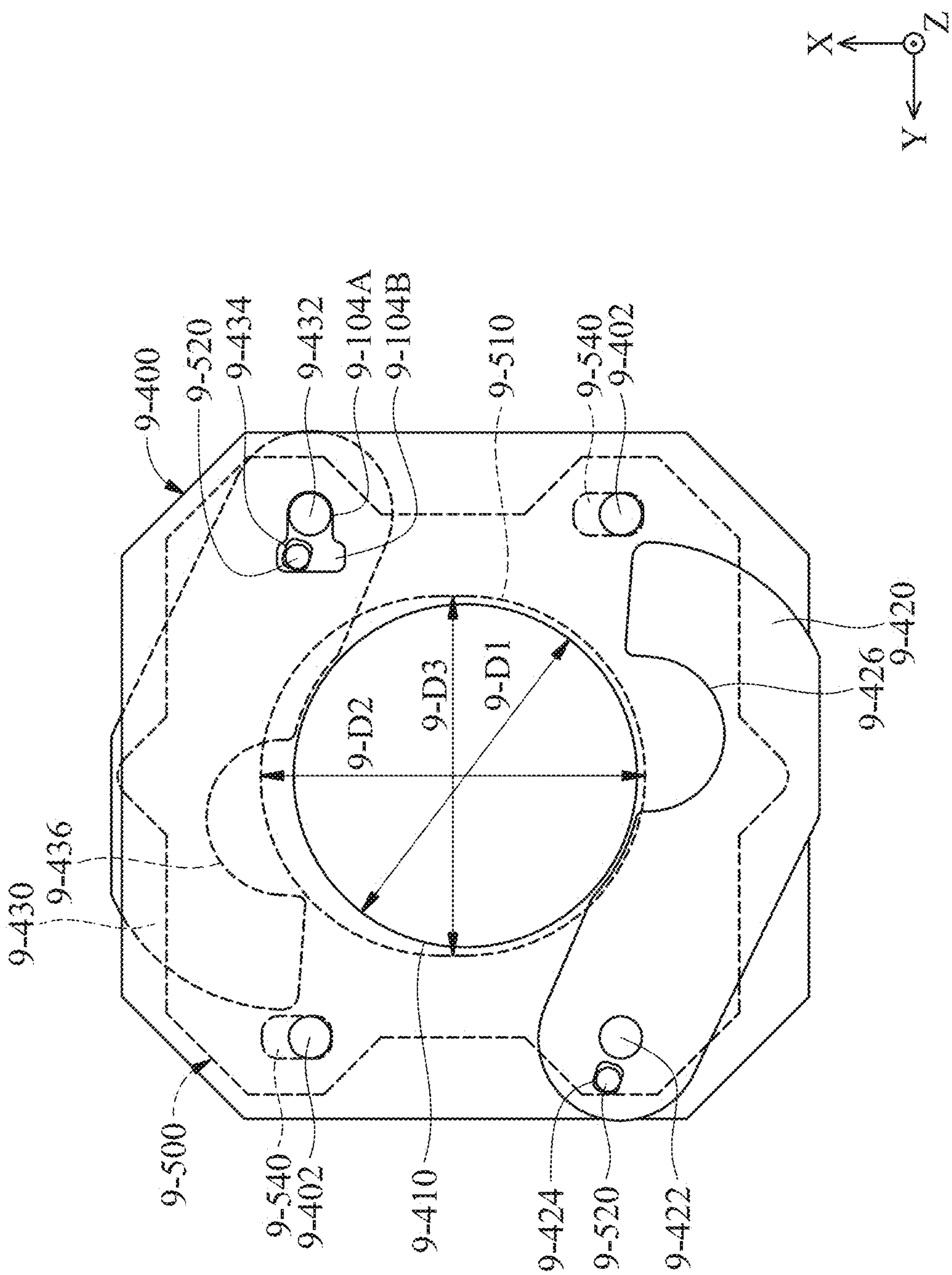
Figures 6A, 9:
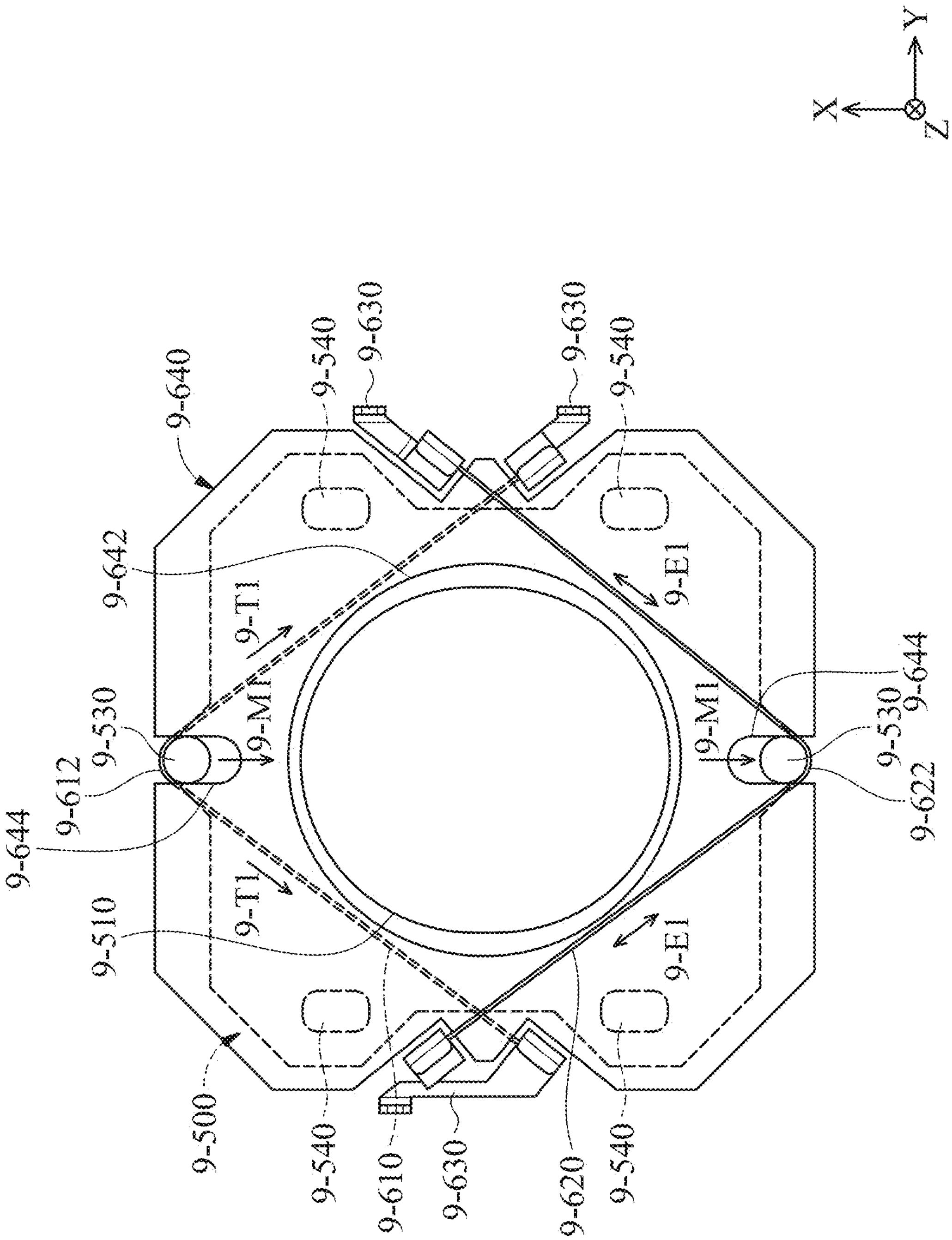
Figures 6B, 9:
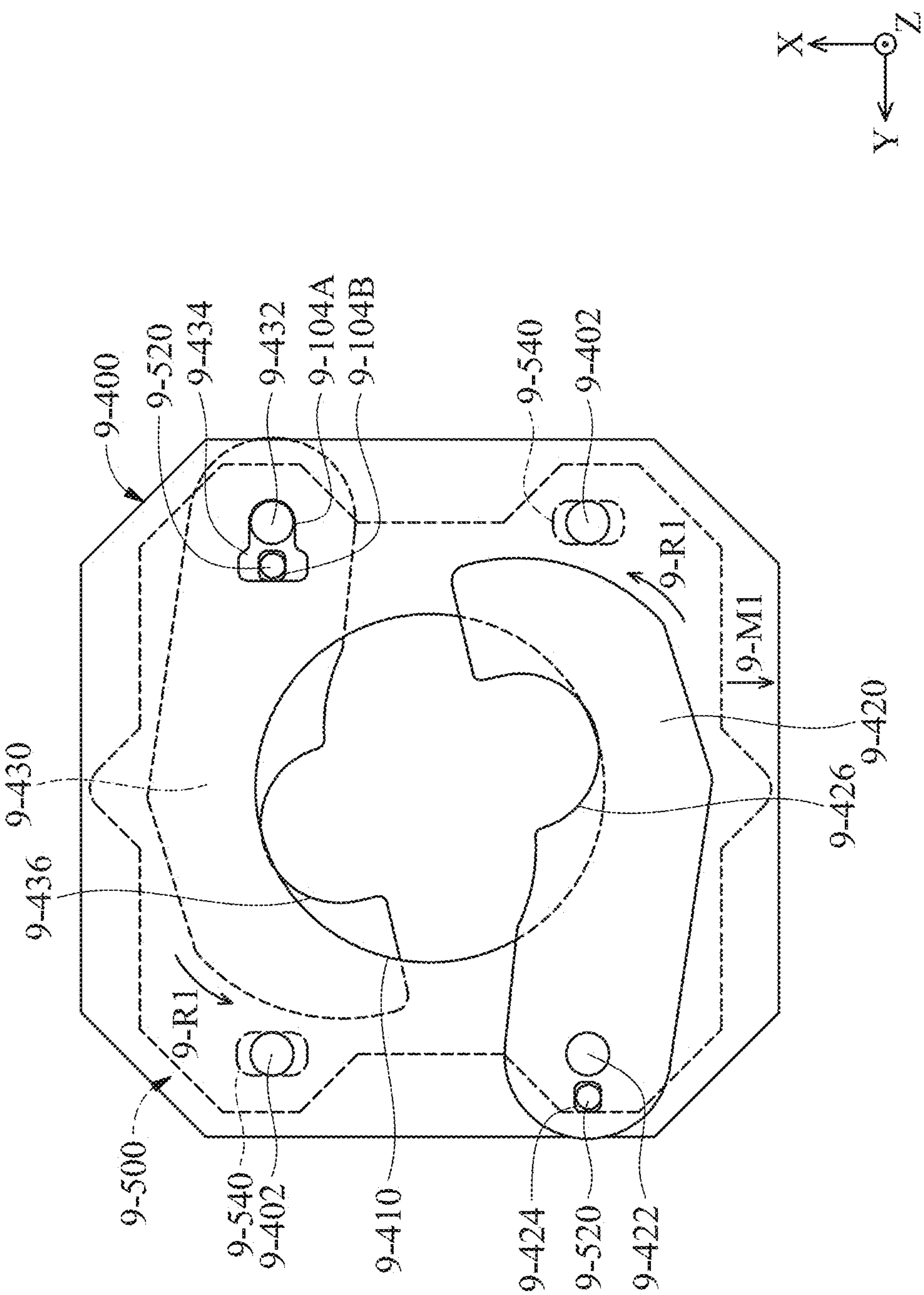
Figures 7A, 9:
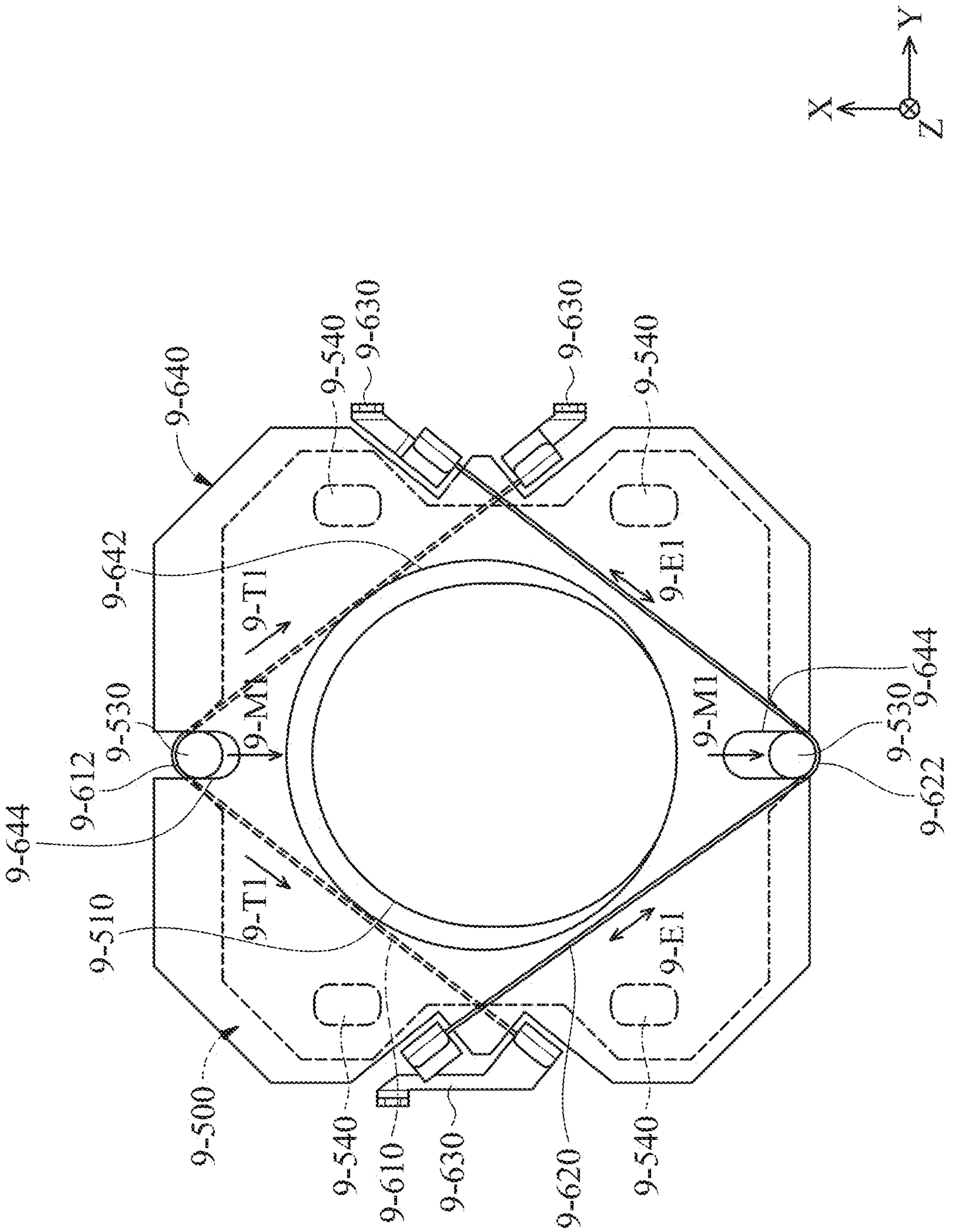
Figures 7B, 9:
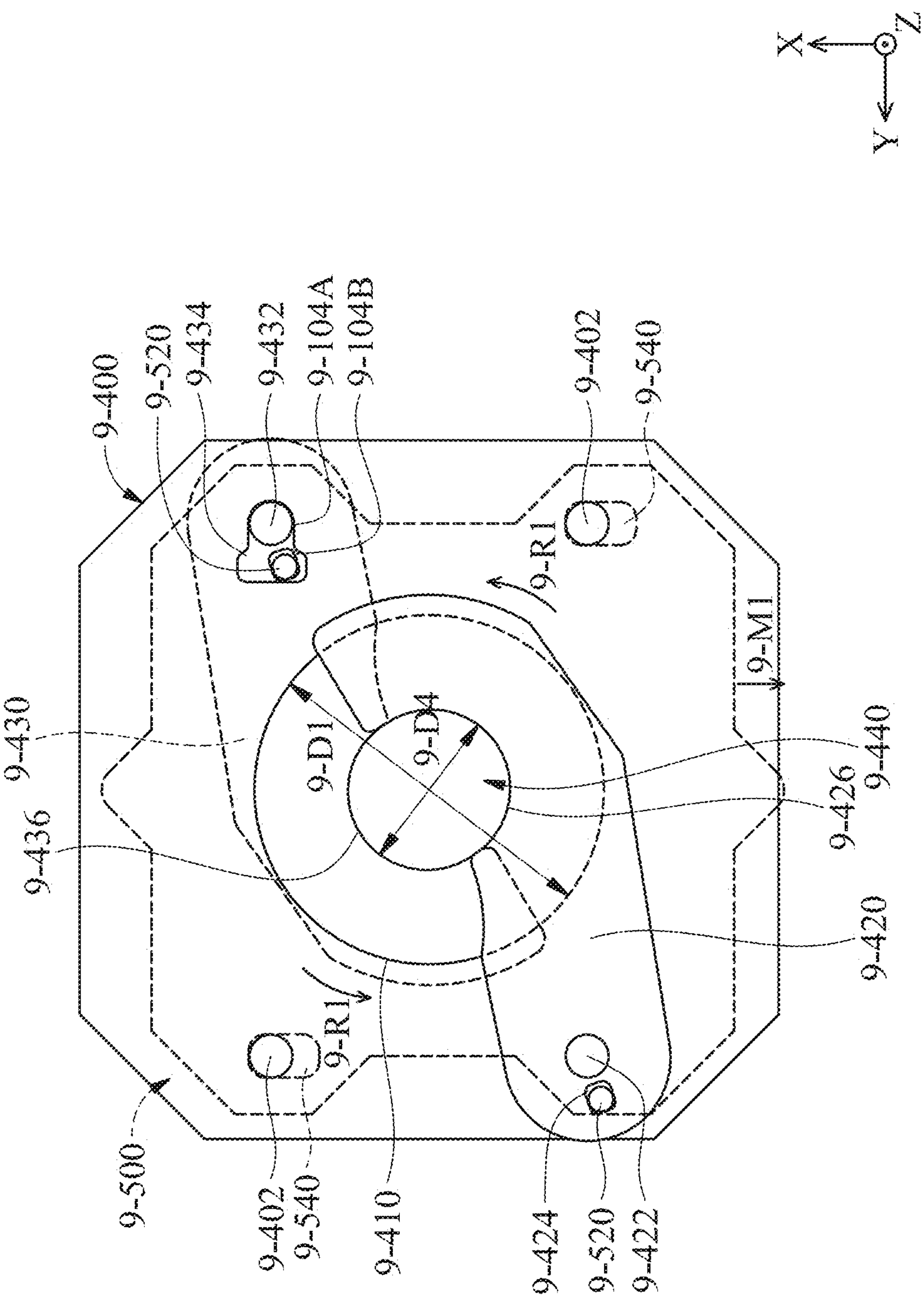
Figures 8A, 9:
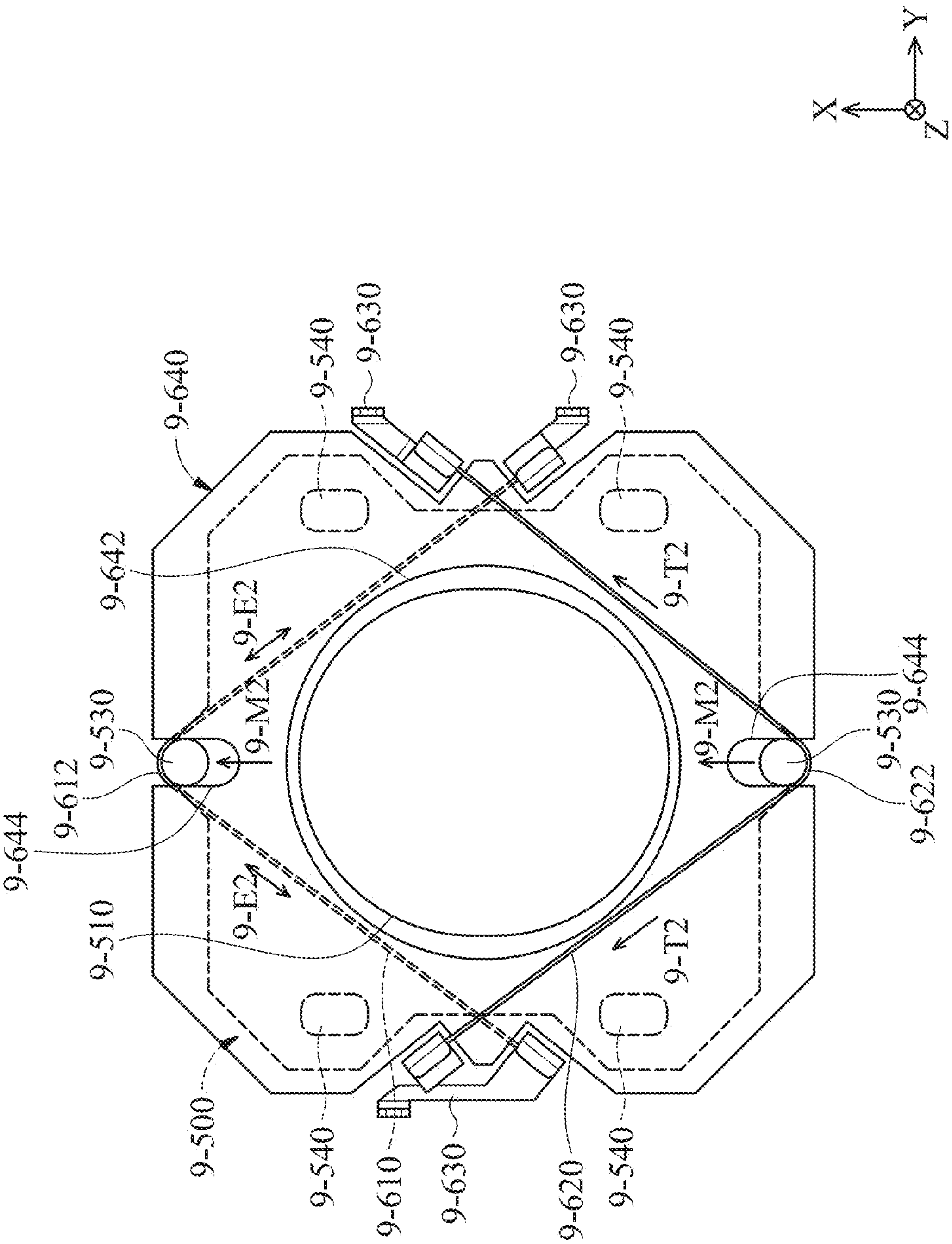
Figures 8B, 9:
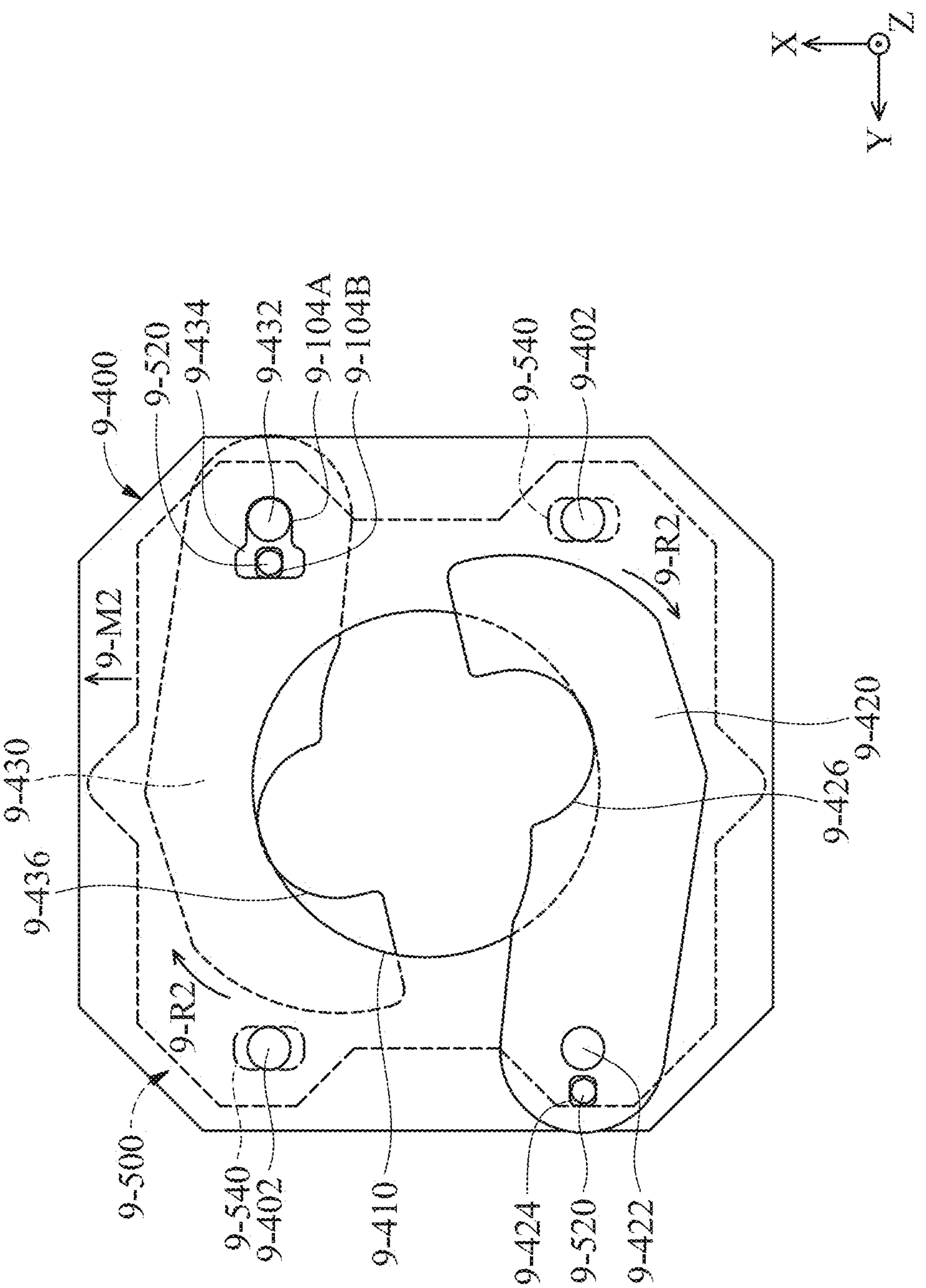

FIG. 19-8C is a diagram of a contrast value curve corresponding to a sixth zone in the fifth image.

FIG. 19-9 is a flowchart of a control method for an optical system according to an embodiment of the present disclosure.

Figures 15, 16, 17, 18, 19, 20:
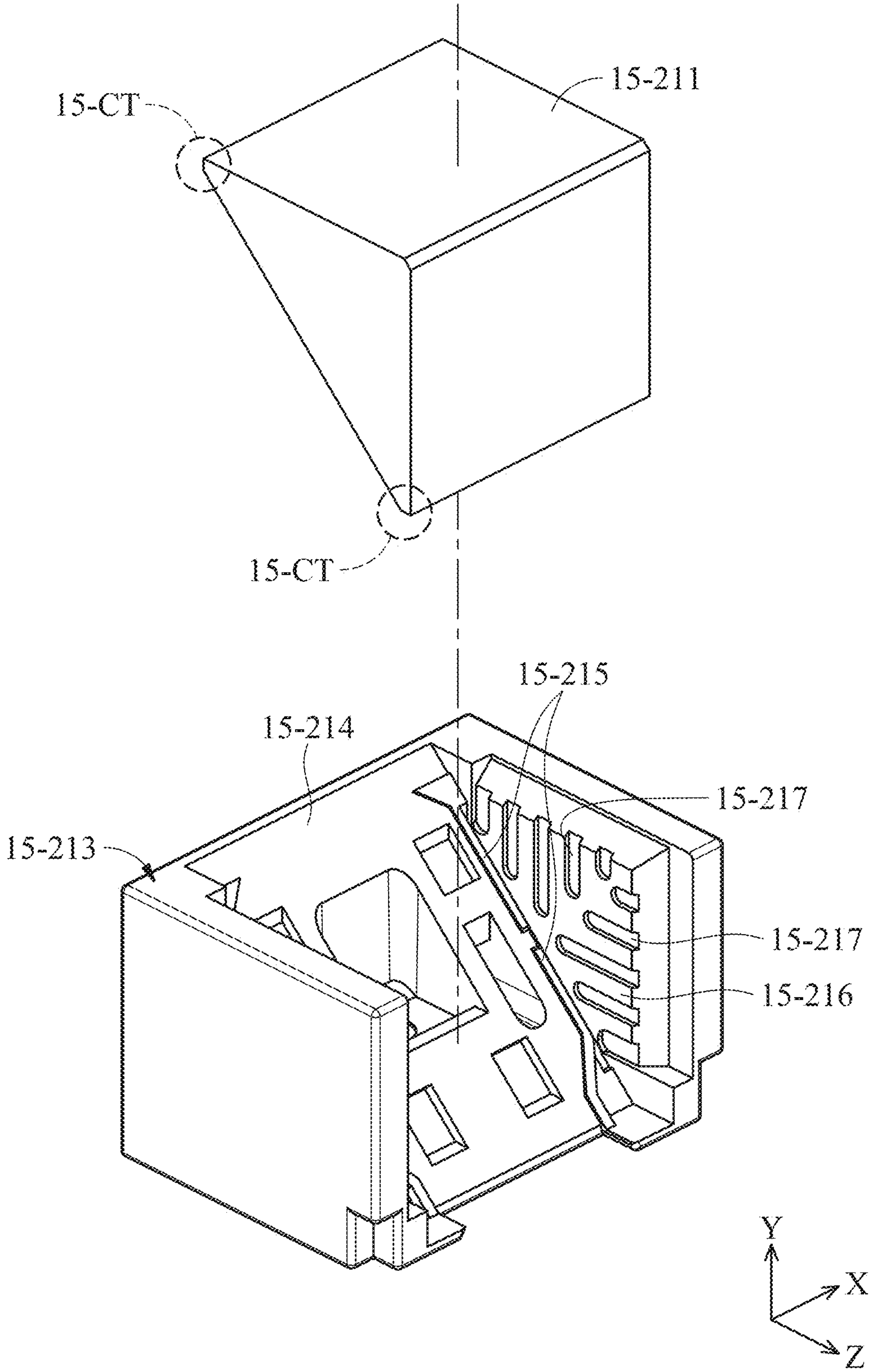

FIG. 20-1 is a schematic diagram showing a 3D object information capturing system in accordance with an embodiment of the application.

FIG. 20-2 is a schematic diagram showing a 3D object information capturing method in accordance with an embodiment of the application.

FIG. 20-3 is a schematic diagram showing the 2D image captured by the camera module 20-1 when the illumination by environmental light is weak.

FIG. 20-4 is a schematic diagram showing the 2D distance matrix information captured by the camera module 20-1 when the illumination by environmental light is weak.

FIGS. 20-5, 20-6, and 20-7 are schematic diagrams showing a 3D object information capturing system 20-10 detecting an object 20-20 from different locations or angles, in accordance with an embodiment of the application.

FIGS. 20-8, 20-9, and 20-10 are schematic diagrams showing the 2D images captured by the 3D object information capturing system 20-10 from different locations or angles as shown in FIGS. 20-5, 20-6, and 20-7.

FIG. 20-11 is a schematic diagram showing a plurality of 3D object information capturing systems 20-10 detecting an object 20-20 on the ground 20-P from different locations or angles at the same time, in accordance with another embodiment of the application.

FIG. 20-12 is a schematic diagram showing a plurality of 3D object information capturing systems 20-10 facing different directions to detect the surrounding environment at the same time, in accordance with another embodiment of the application.

FIG. 20-13 is a schematic diagram showing a 3D object information capturing system 20-10 in accordance with another embodiment of the application.

Figures 15, 16, 17, 18, 19, 20, 21:
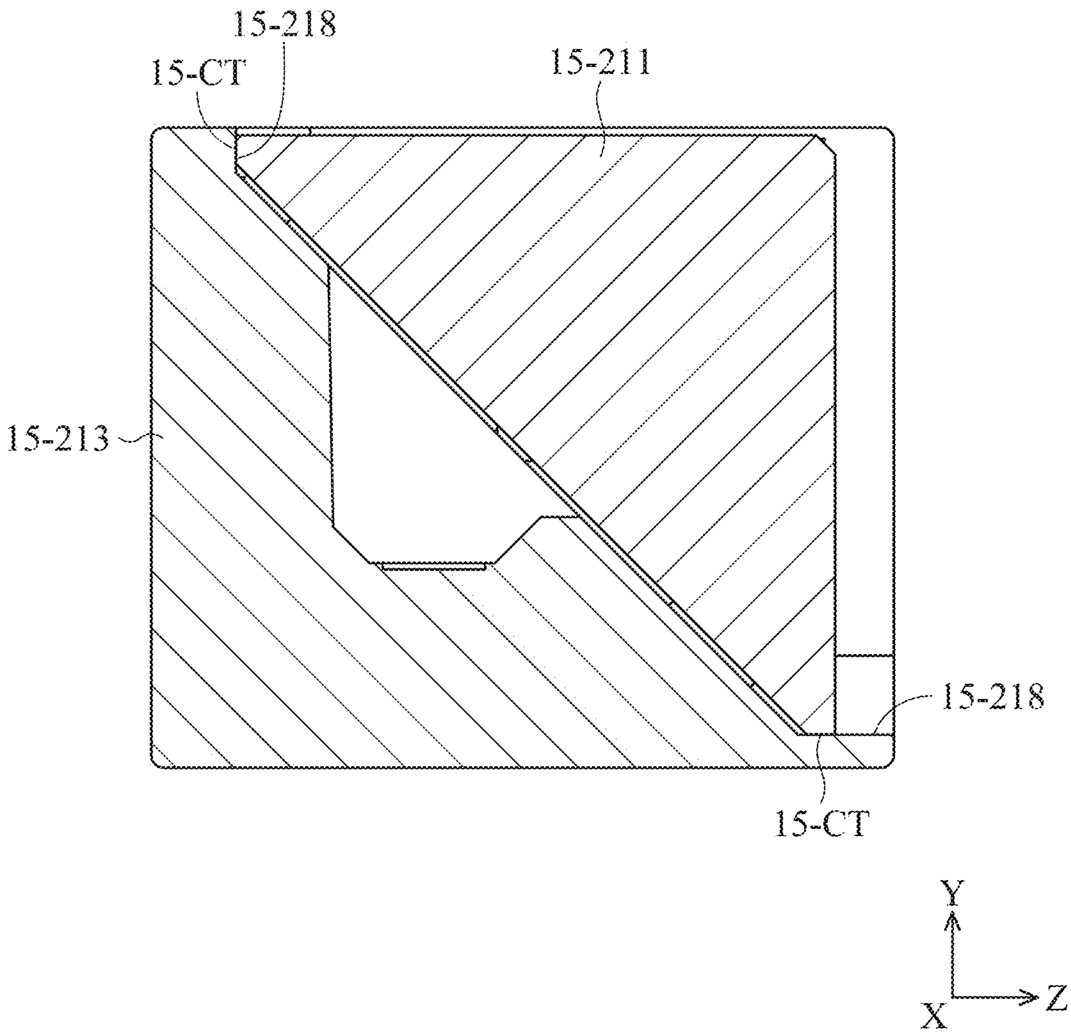
Figures 1, 16:
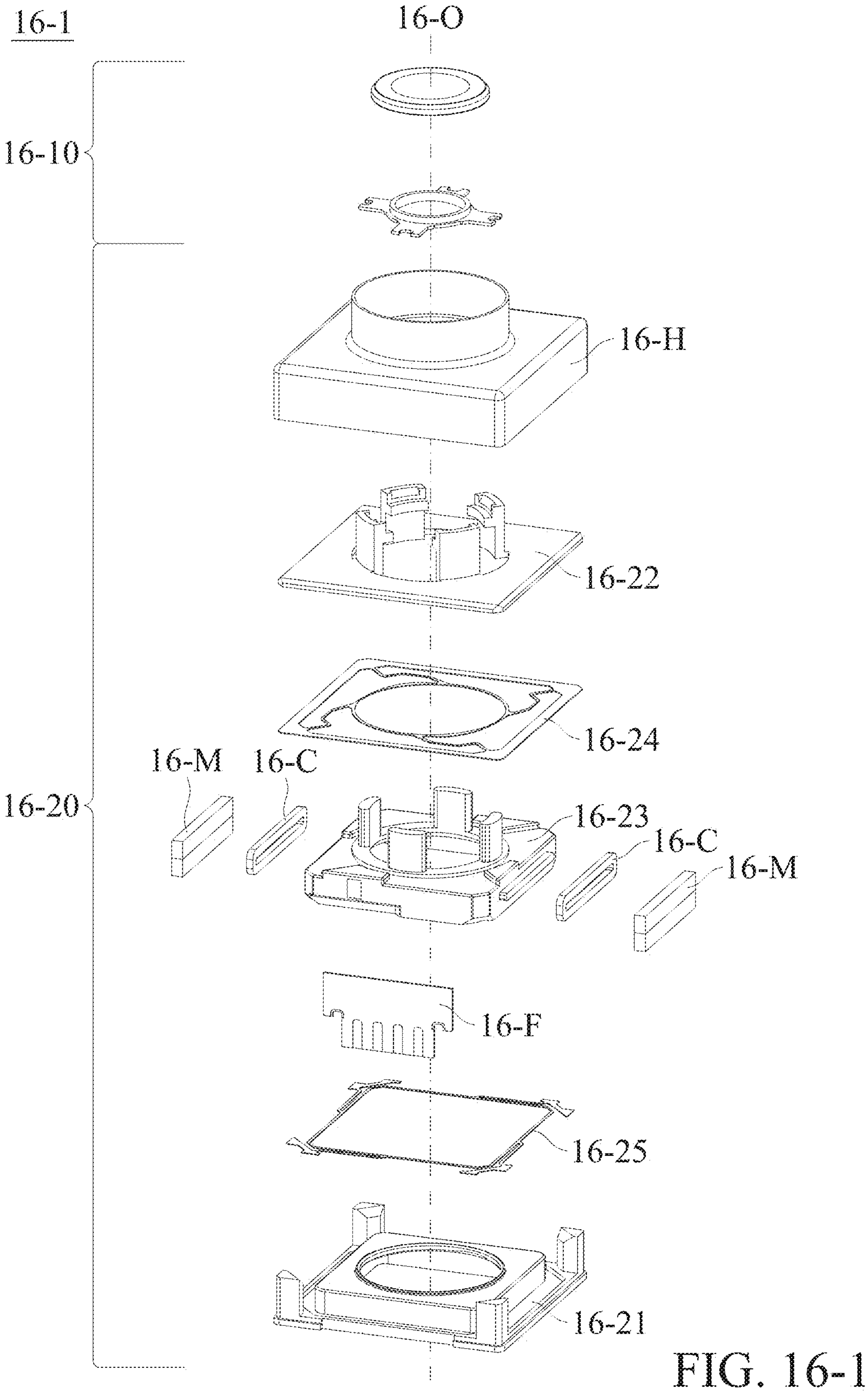
Figures 2, 16:
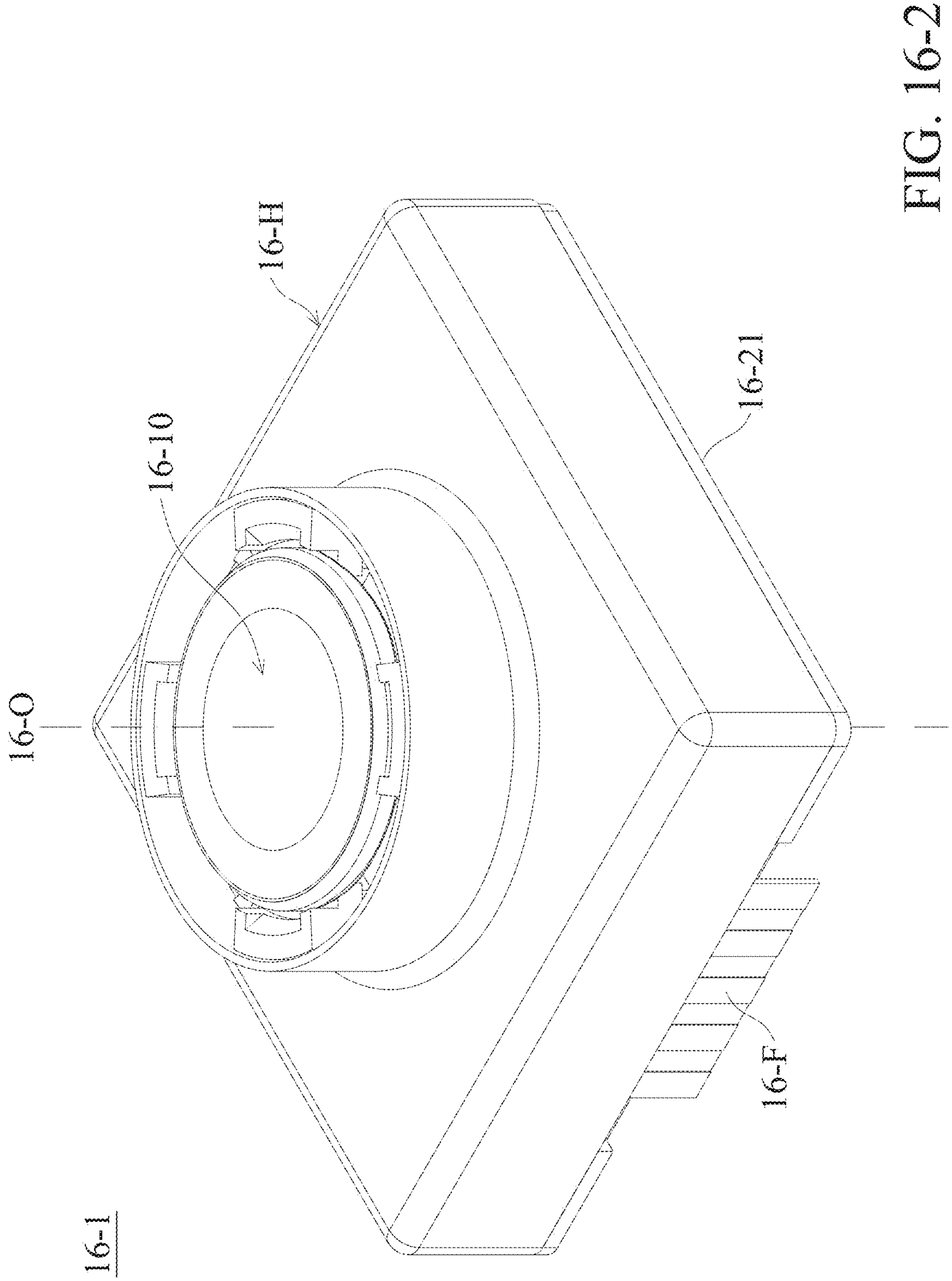
Figures 3, 16:
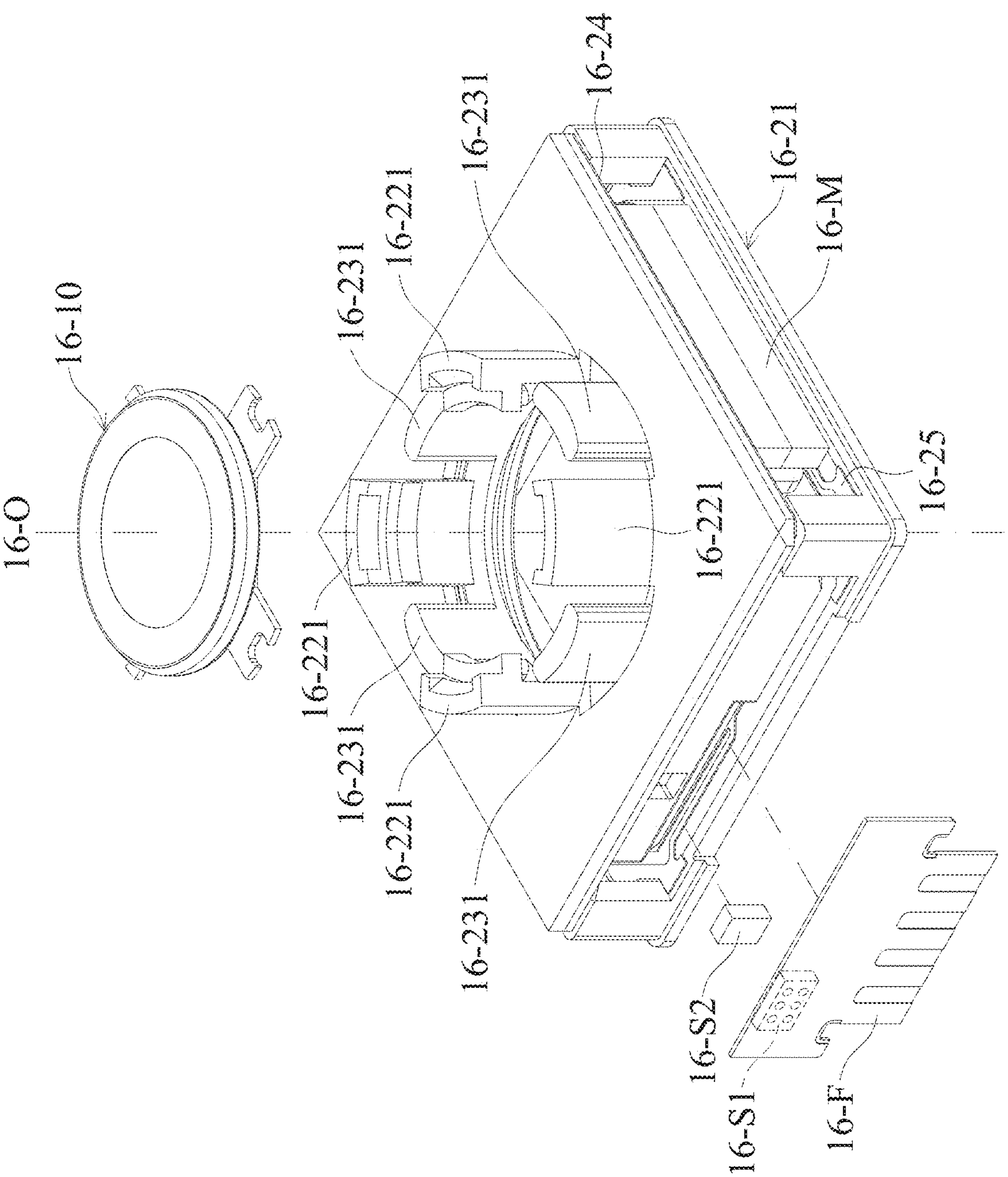
Figures 4A, 16:
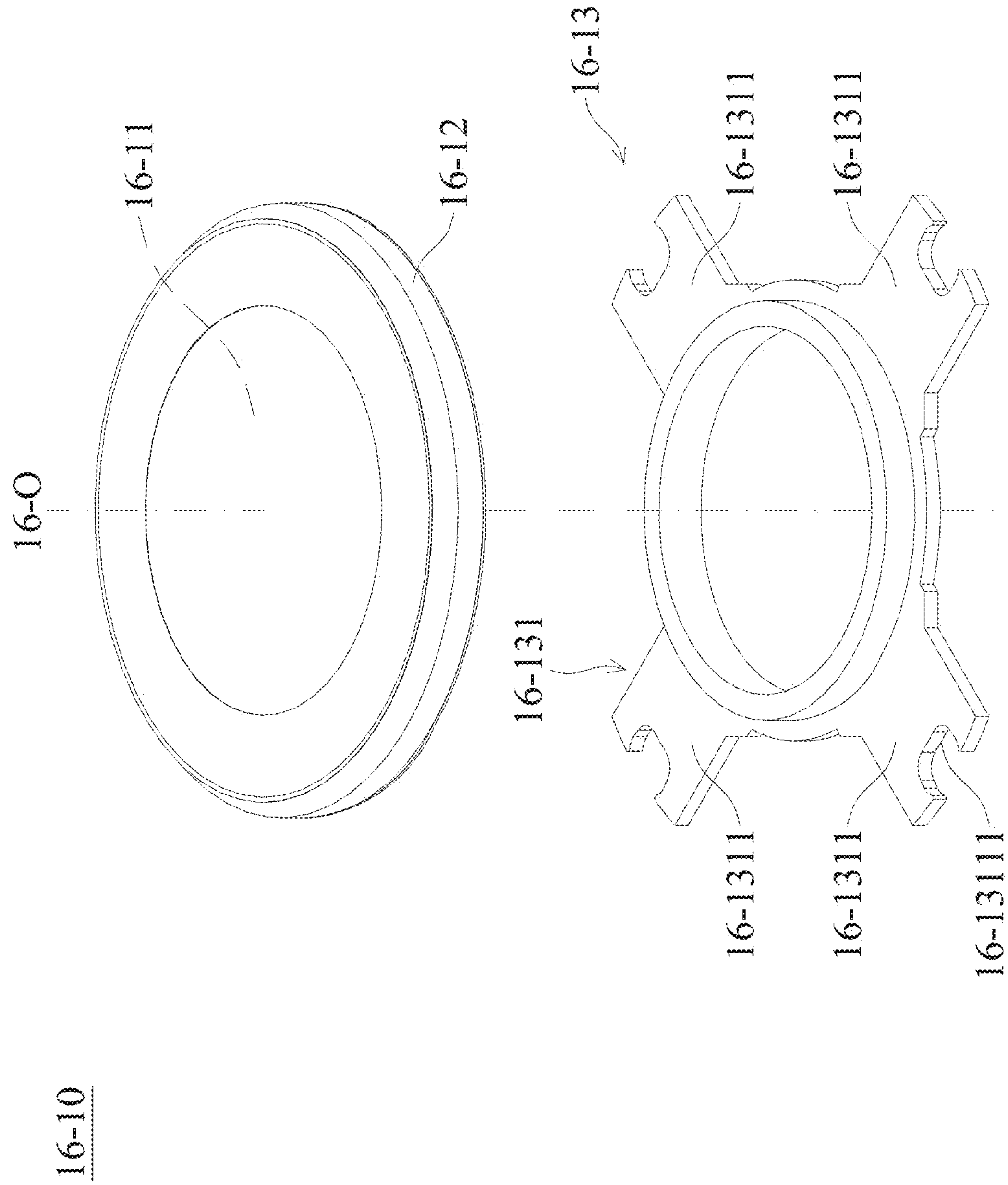
Figures 4B, 16:
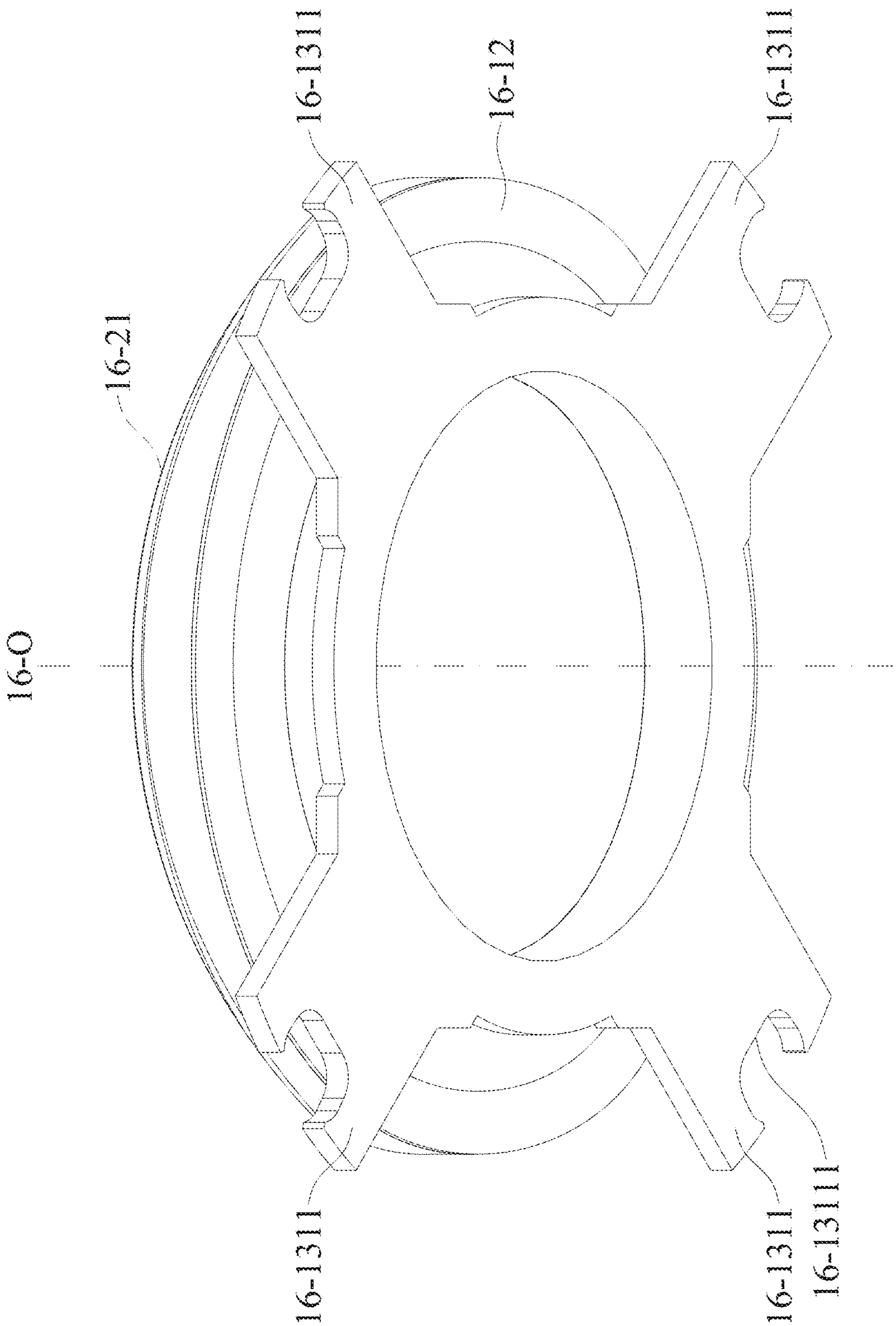
Figures 5A, 16:
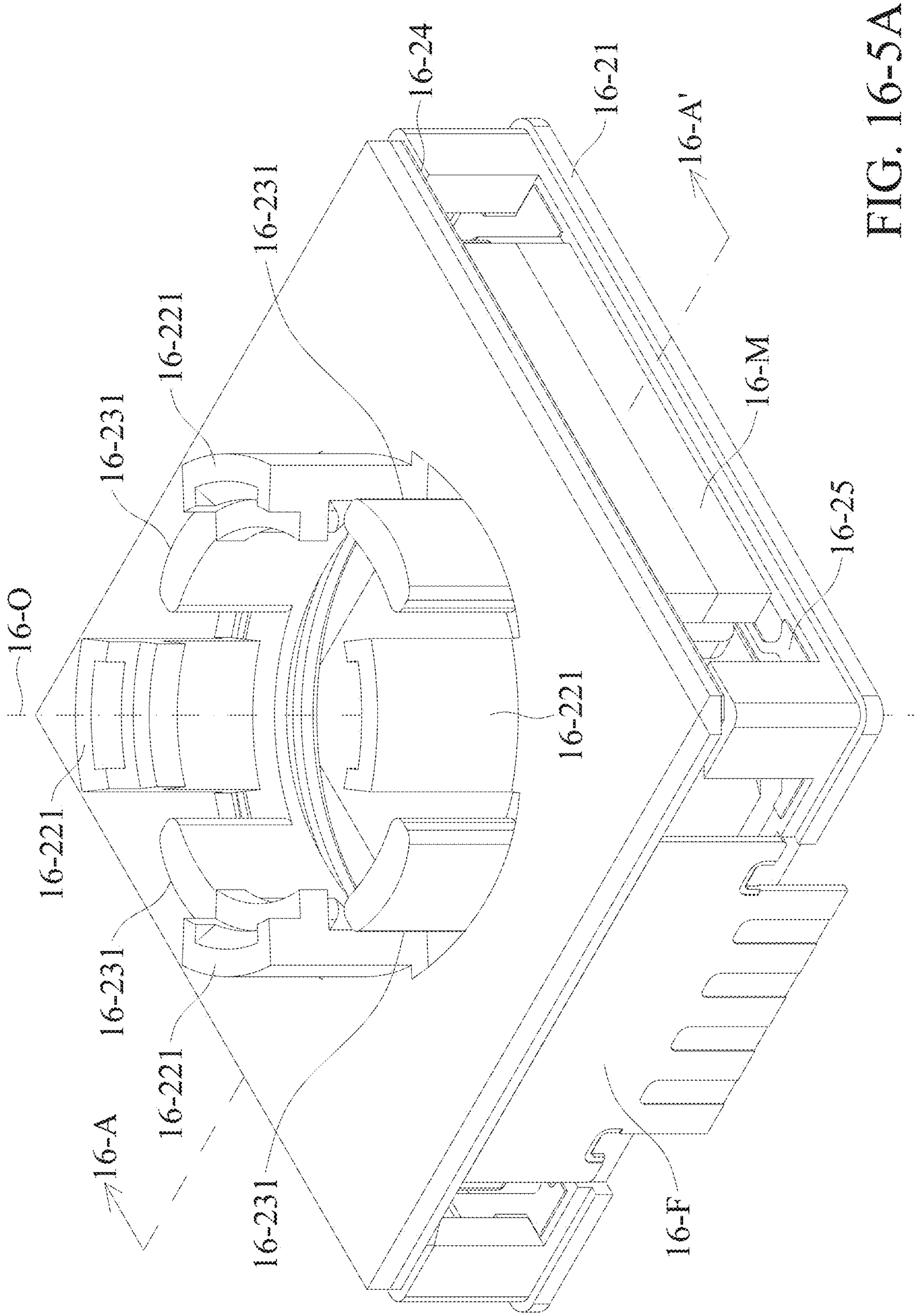
Figures 5B, 16:
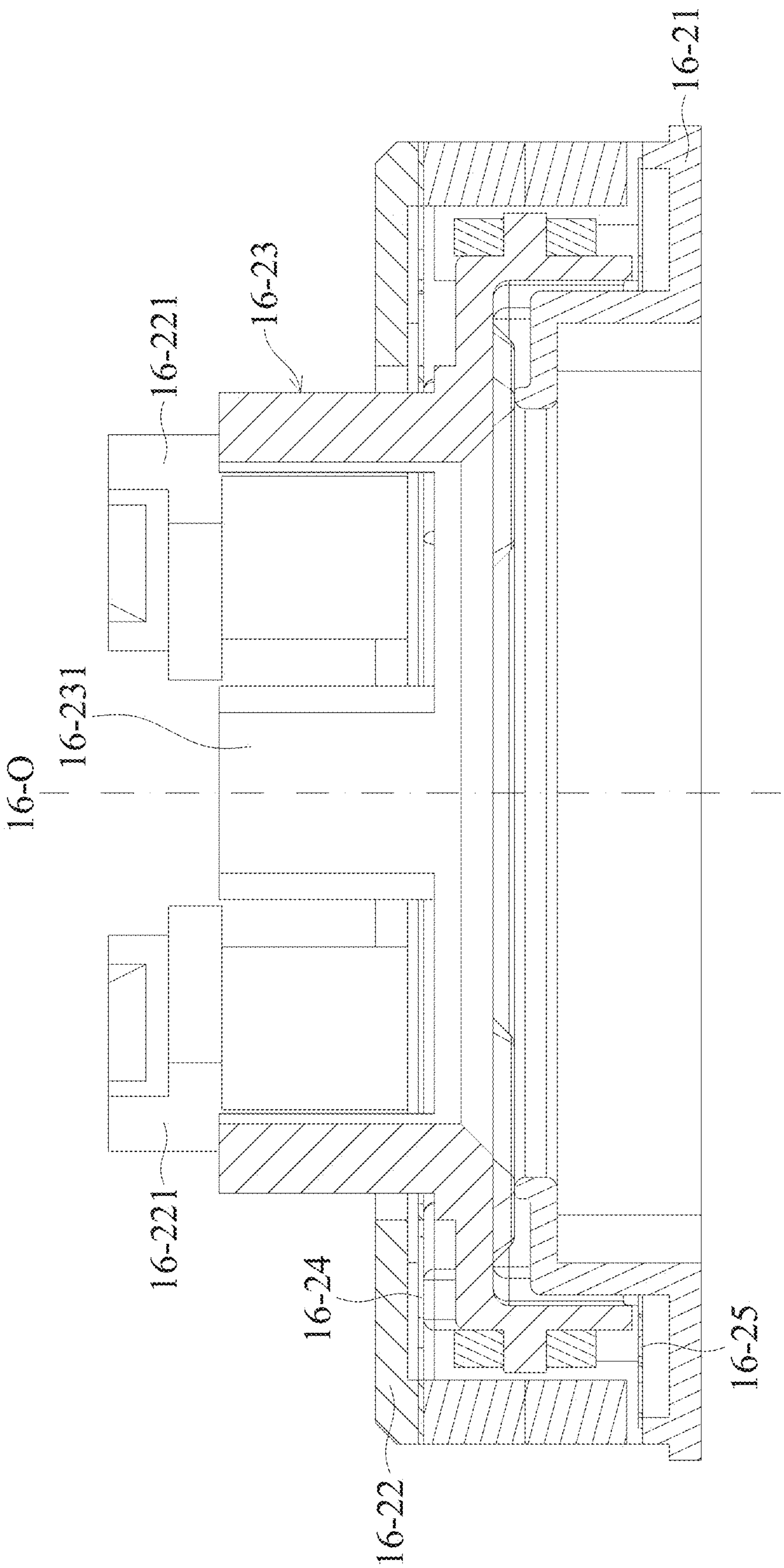
Figures 6A, 16:
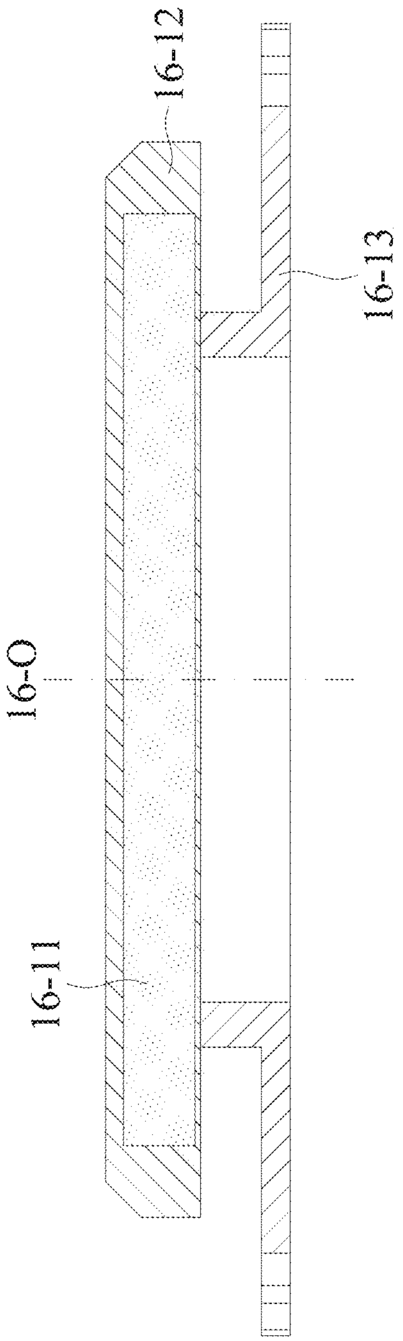
Figures 6B, 16:
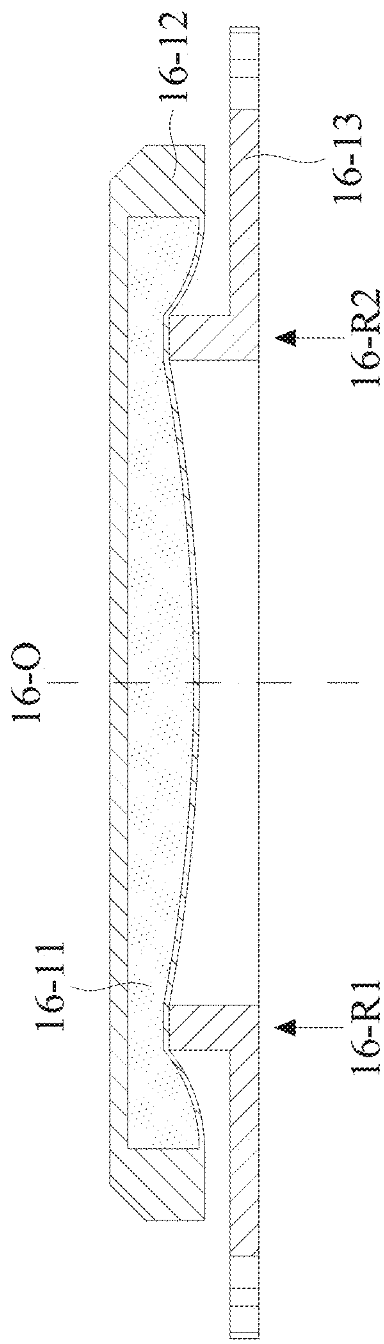
Figures 6C, 16:
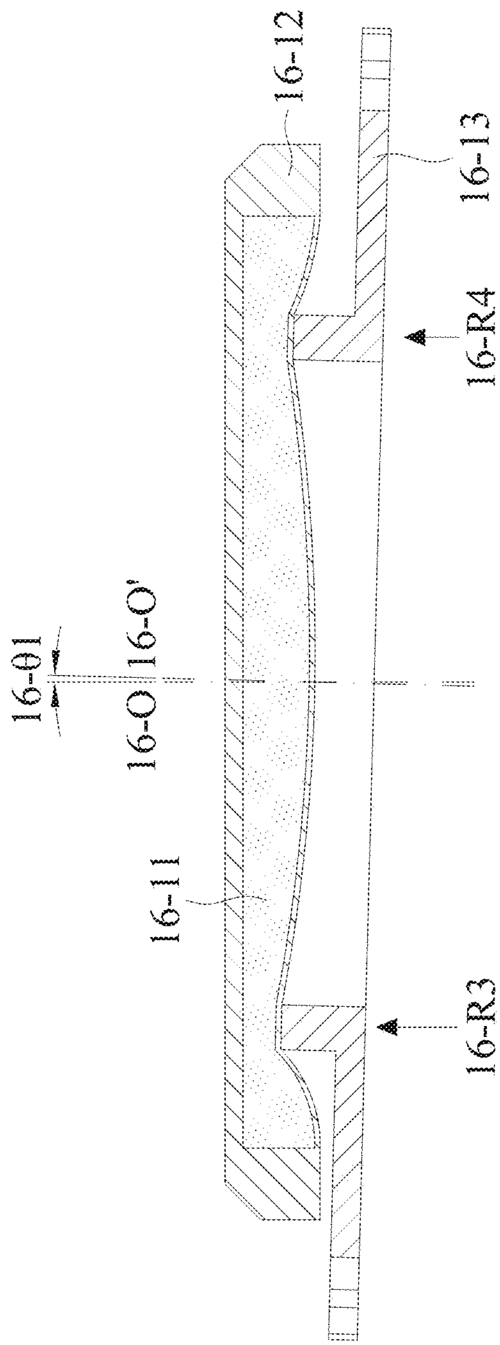
Figures 7A, 16:
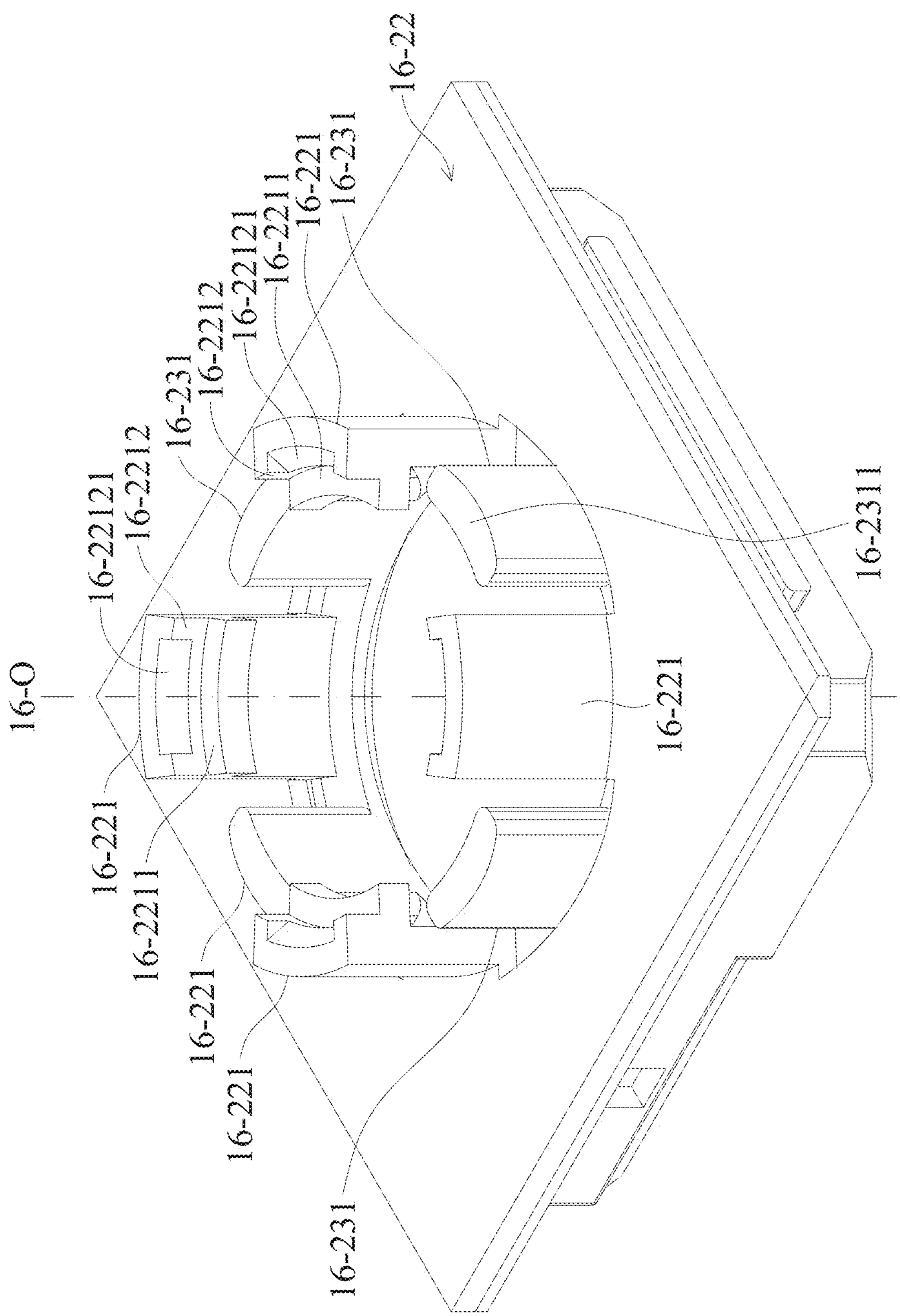
Figures 7B, 16:
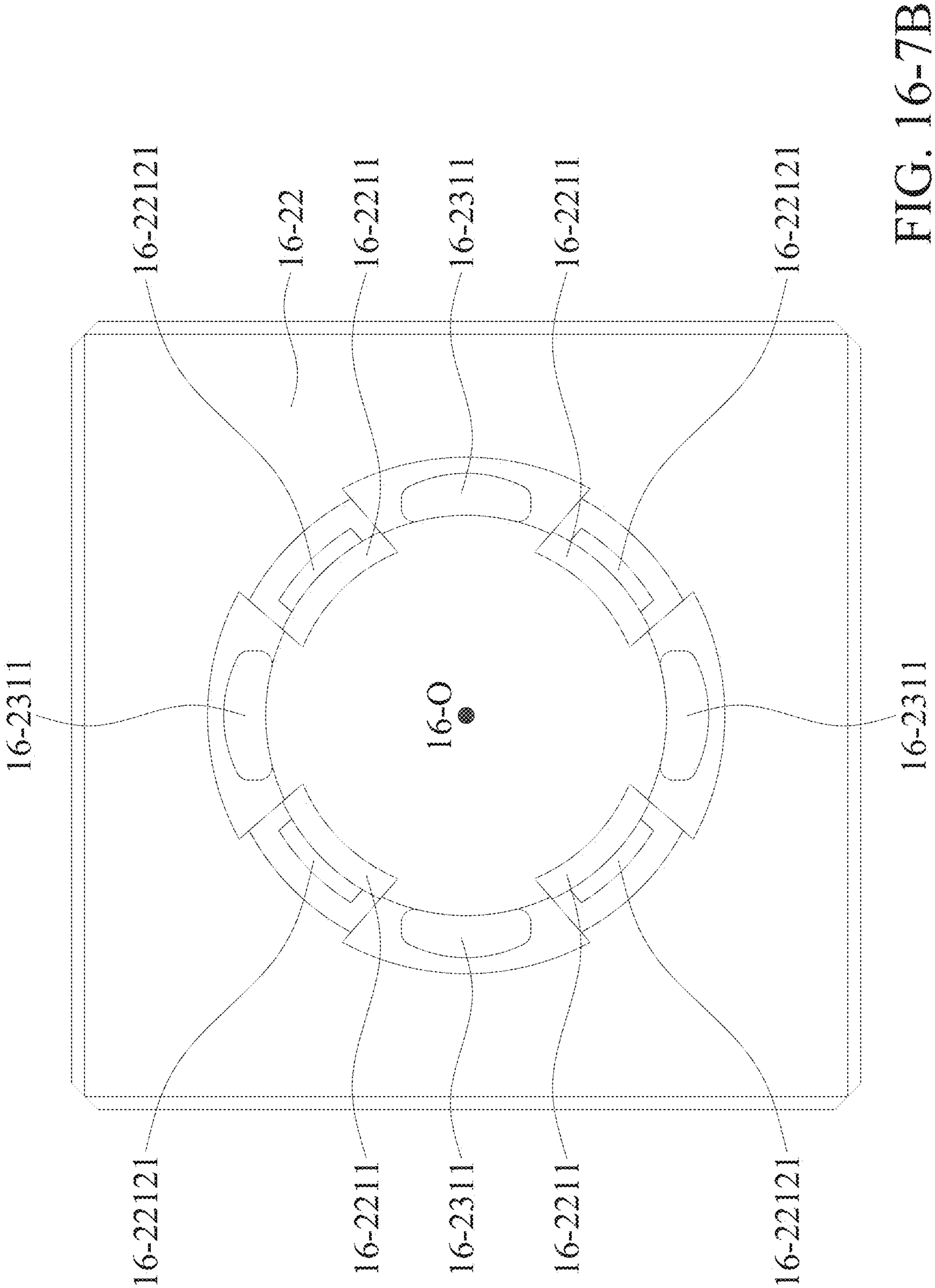
Figures 8A, 16:
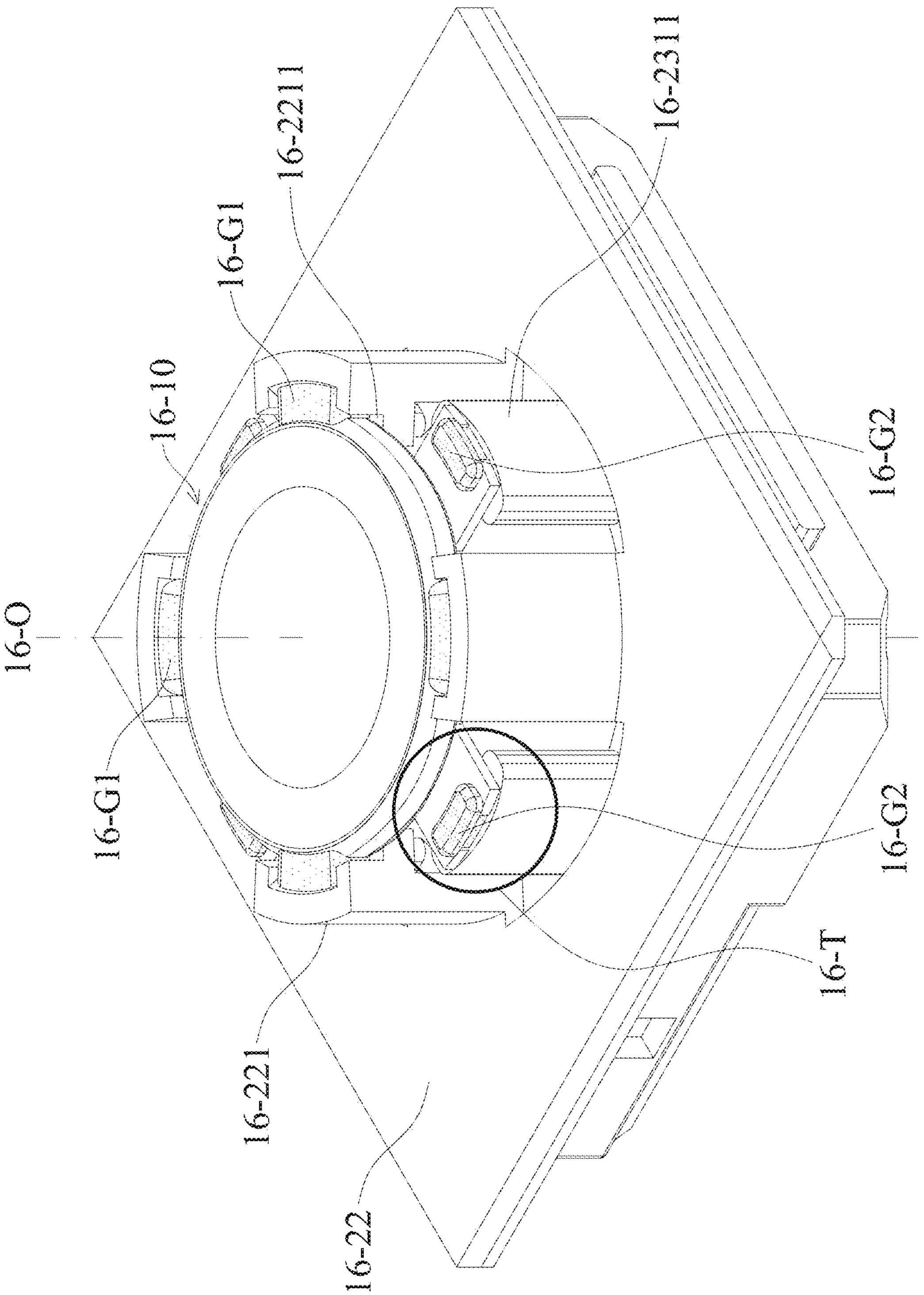
Figures 8B, 16:
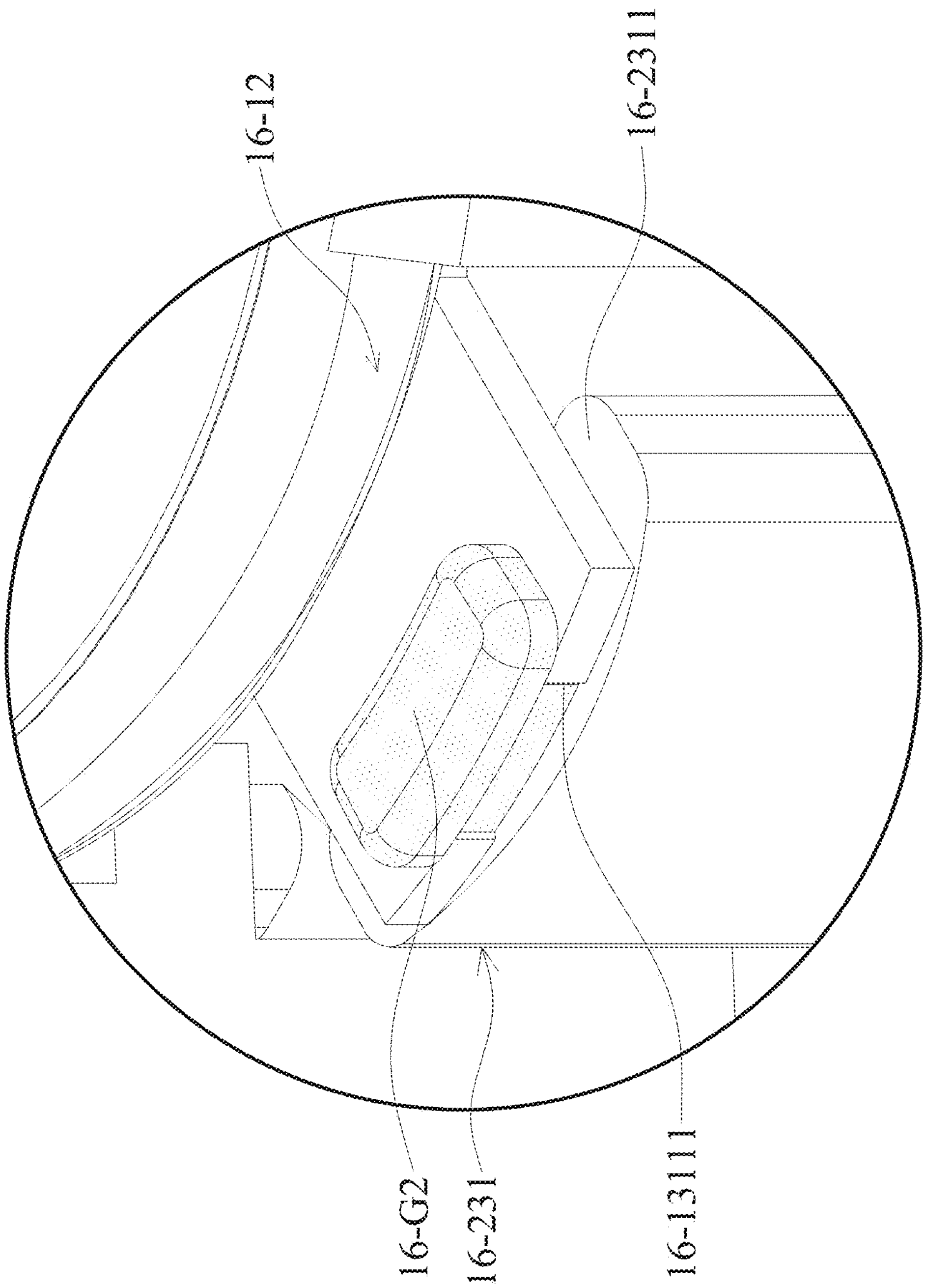

FIG. 21-1 is a schematic diagram showing an optical system in accordance with an embodiment of the application.

FIG. 21-2 is a schematic diagram showing an optical system disposed in a vehicle, wherein the optical system comprises a lens unit 21-4 and a light receiver 21-5, in accordance with another embodiment of the application.

FIGS. 21-3 and 21-4 are schematic diagrams showing a light guiding element 21-R in accordance with an embodiment of the application.

FIG. 21-5 is a schematic diagram showing a light guiding element 21-R in accordance with another embodiment of the application.

FIG. 21-6 is a schematic diagram showing the light beam 21-LR reflected by the light guiding element 21-R to scan in a predetermined area.

FIG. 21-7 is a schematic diagram showing a light guiding module in accordance with an embodiment of the application.

FIG. 21-8 is a schematic diagram showing the light beam 21-LR having a square or rectangle shape in cross-section.

FIG. 21-9 is a schematic diagram showing the light beam 21-LR having a cross shape in cross-section.

Figures 1, 22:
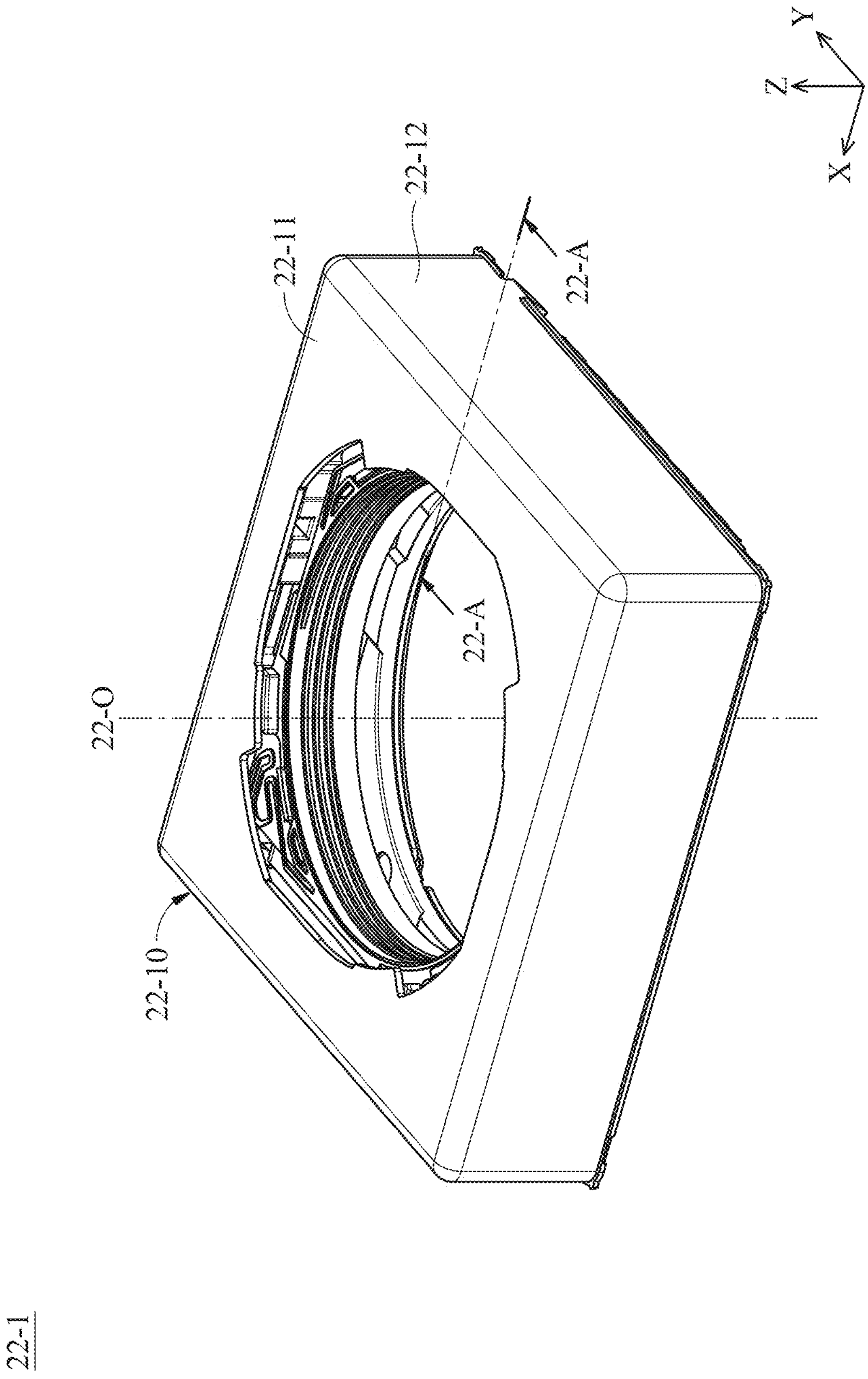
Figures 2, 22:
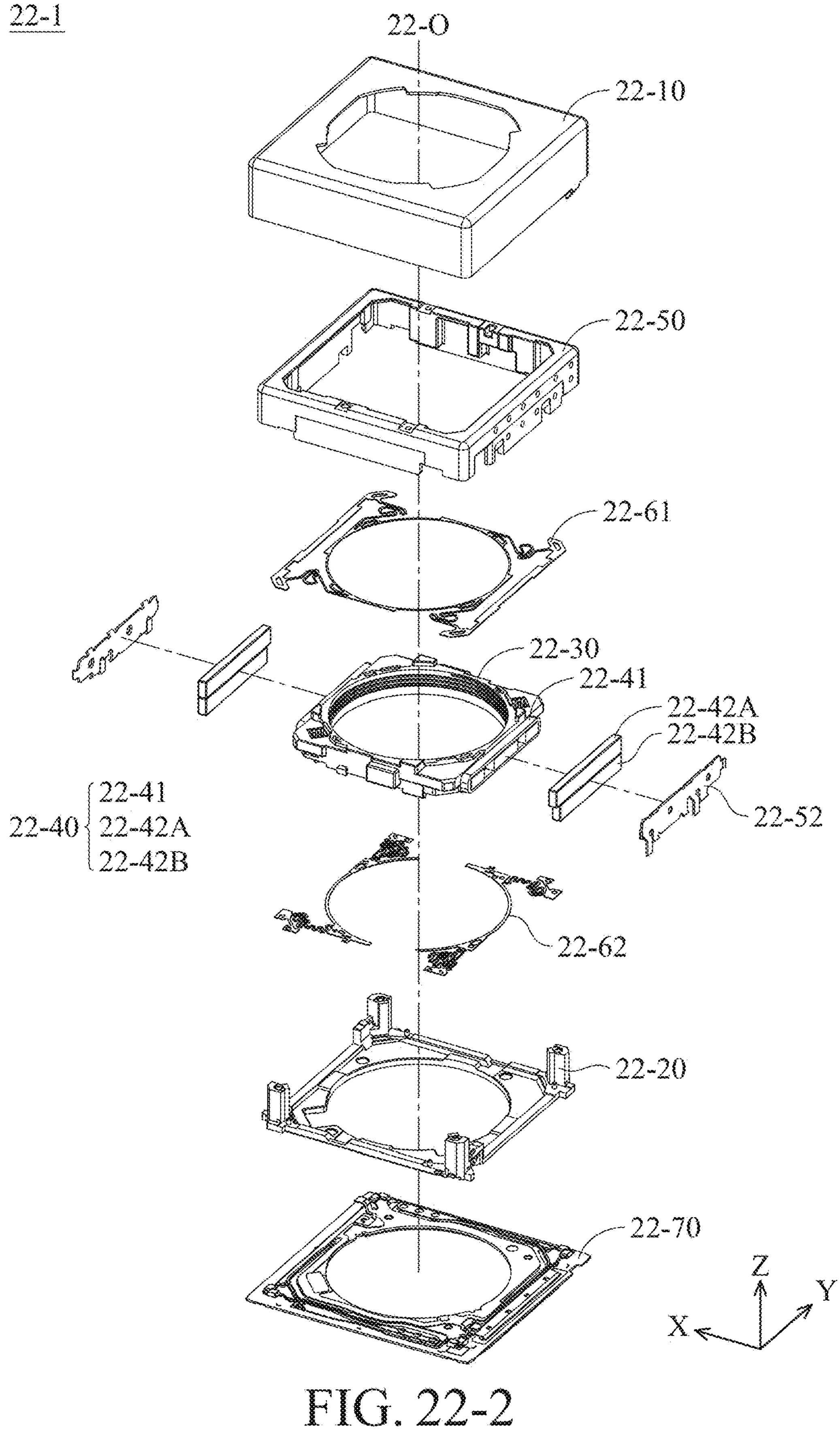
Figures 3, 22:
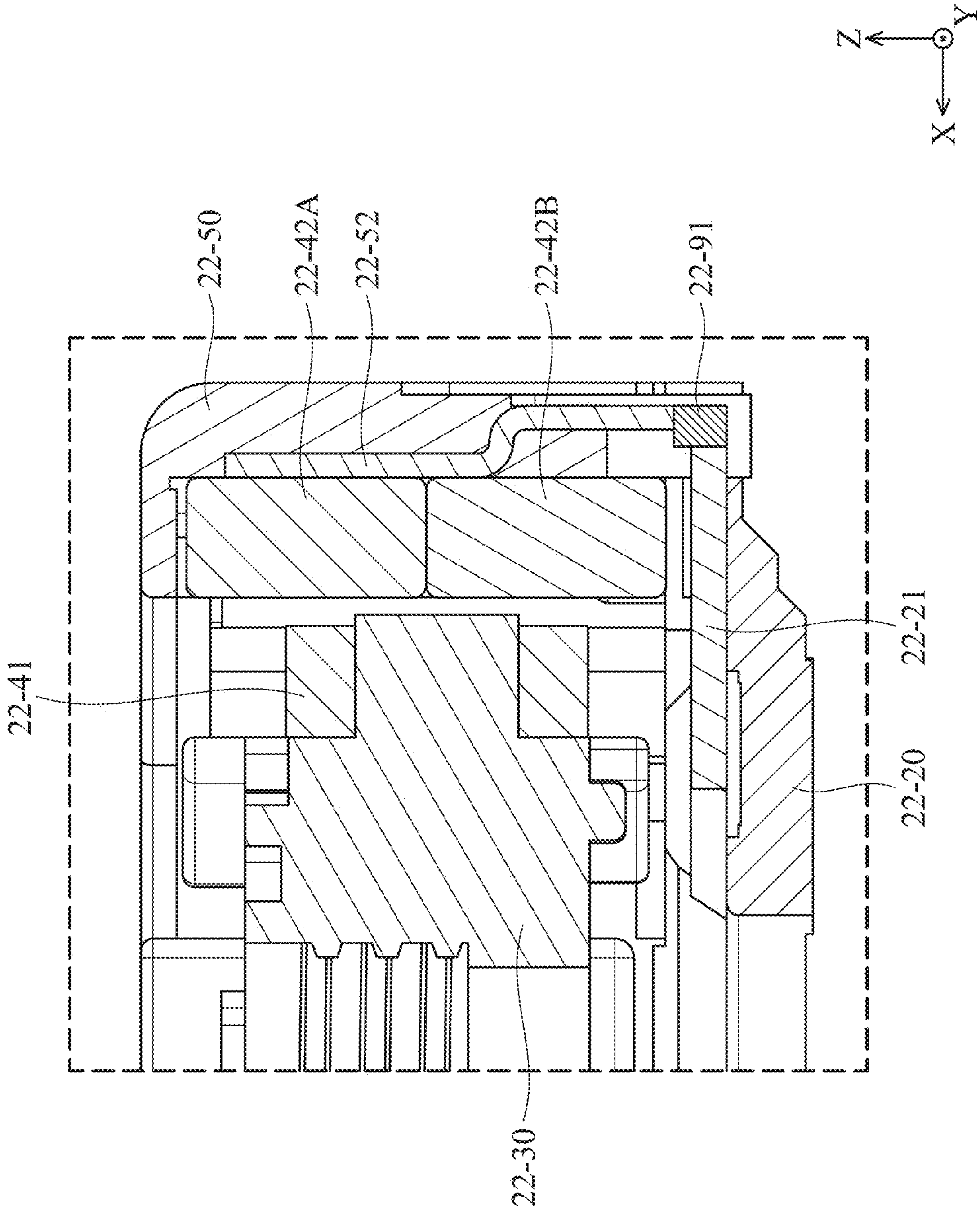
Figures 4, 22:
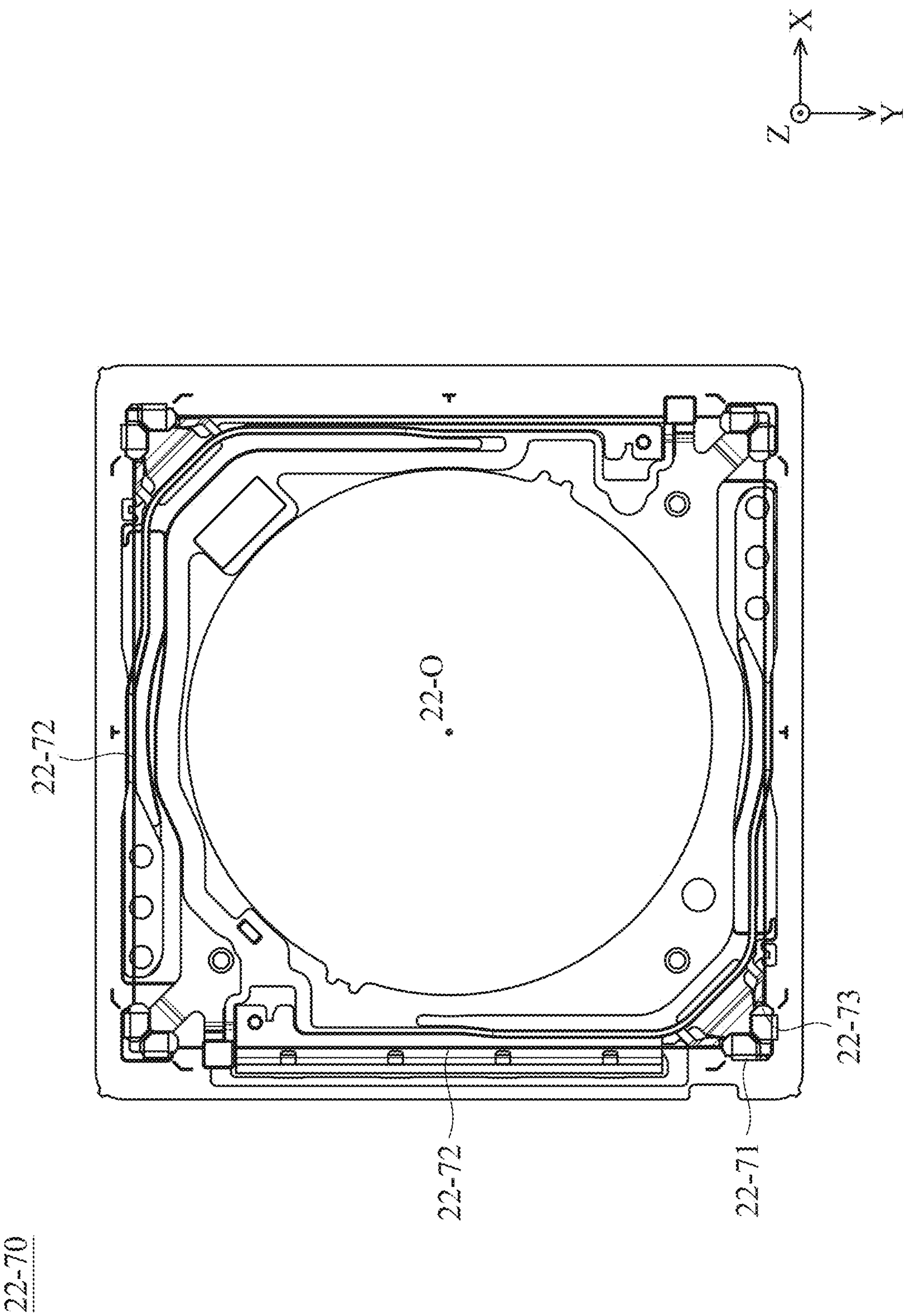
Figures 5, 22:
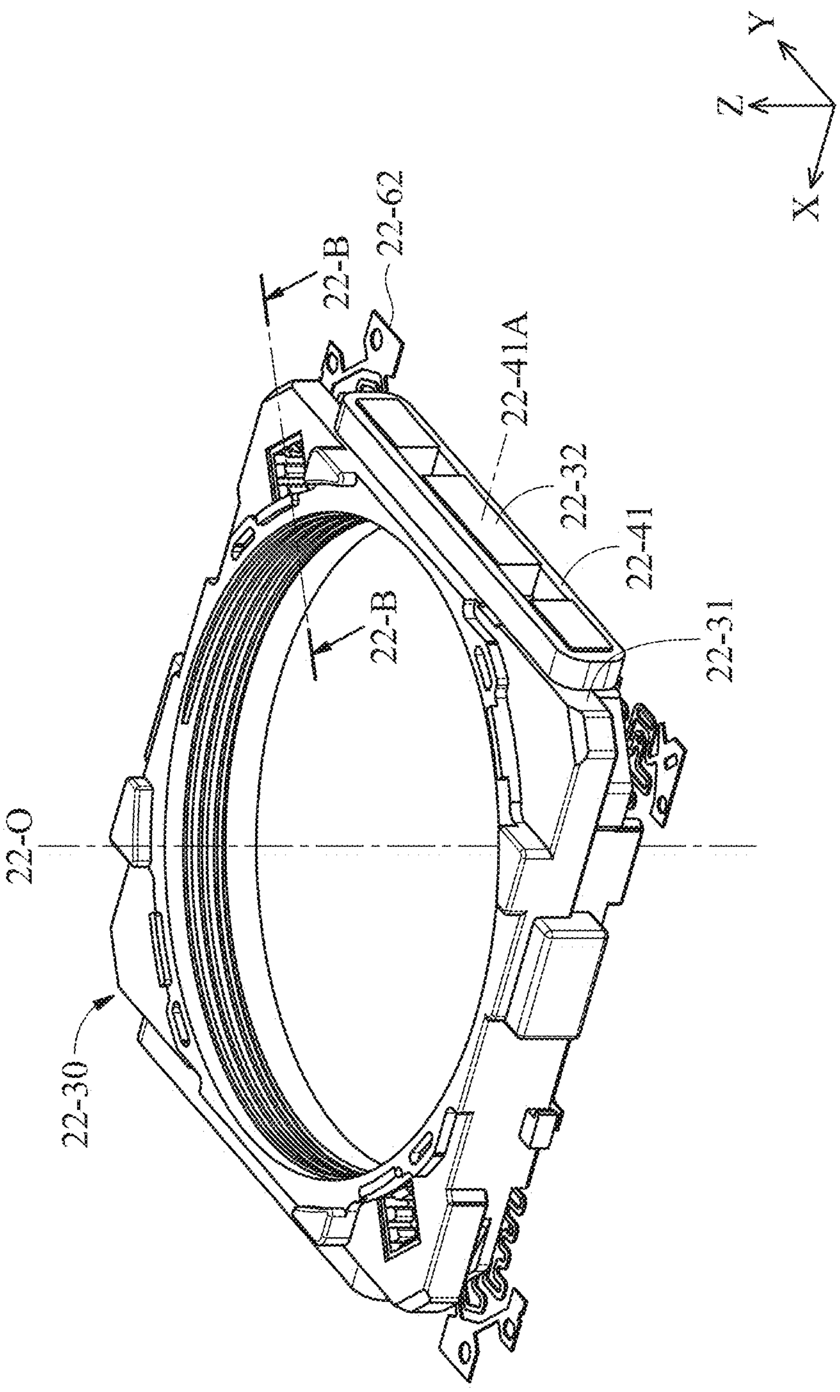
Figures 6, 22:
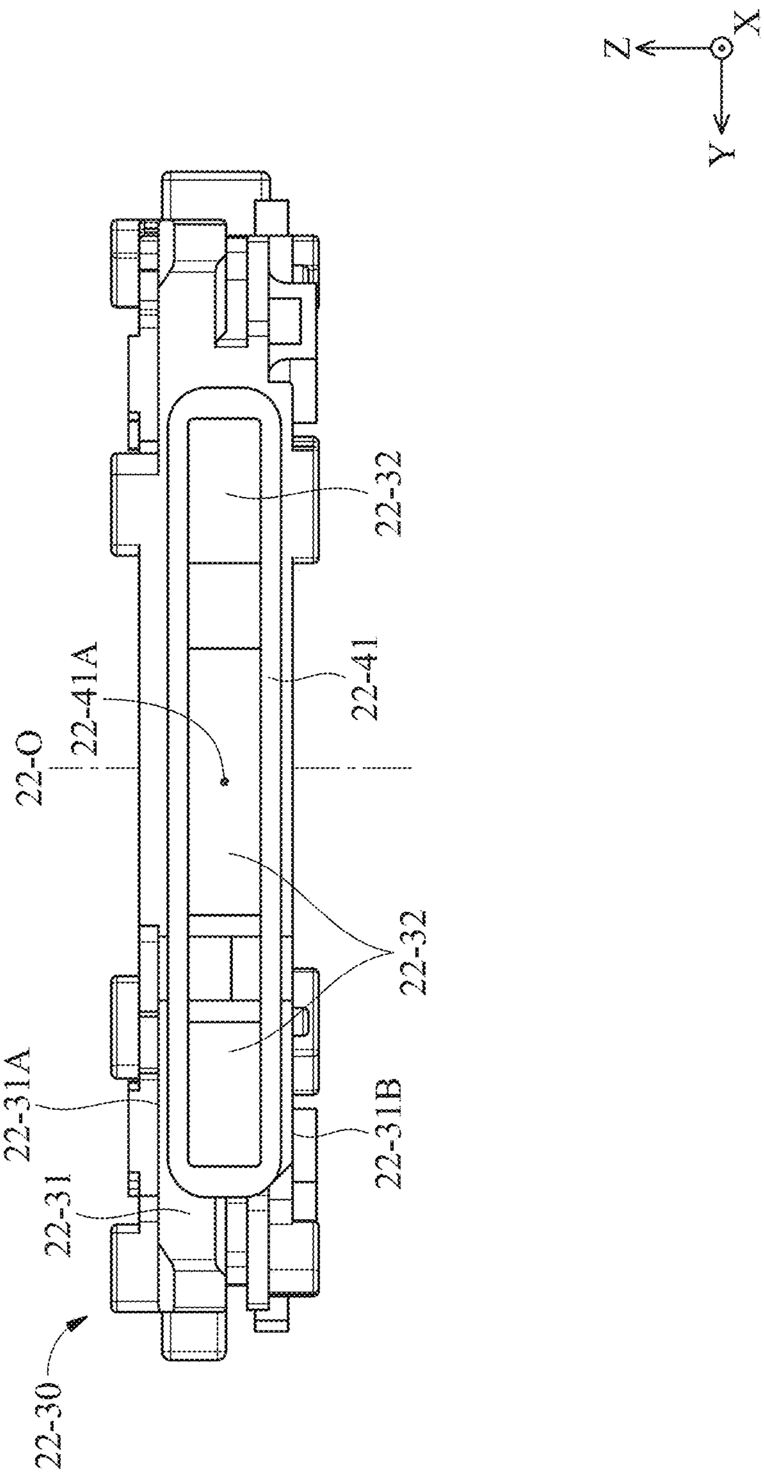
Figures 7, 22:
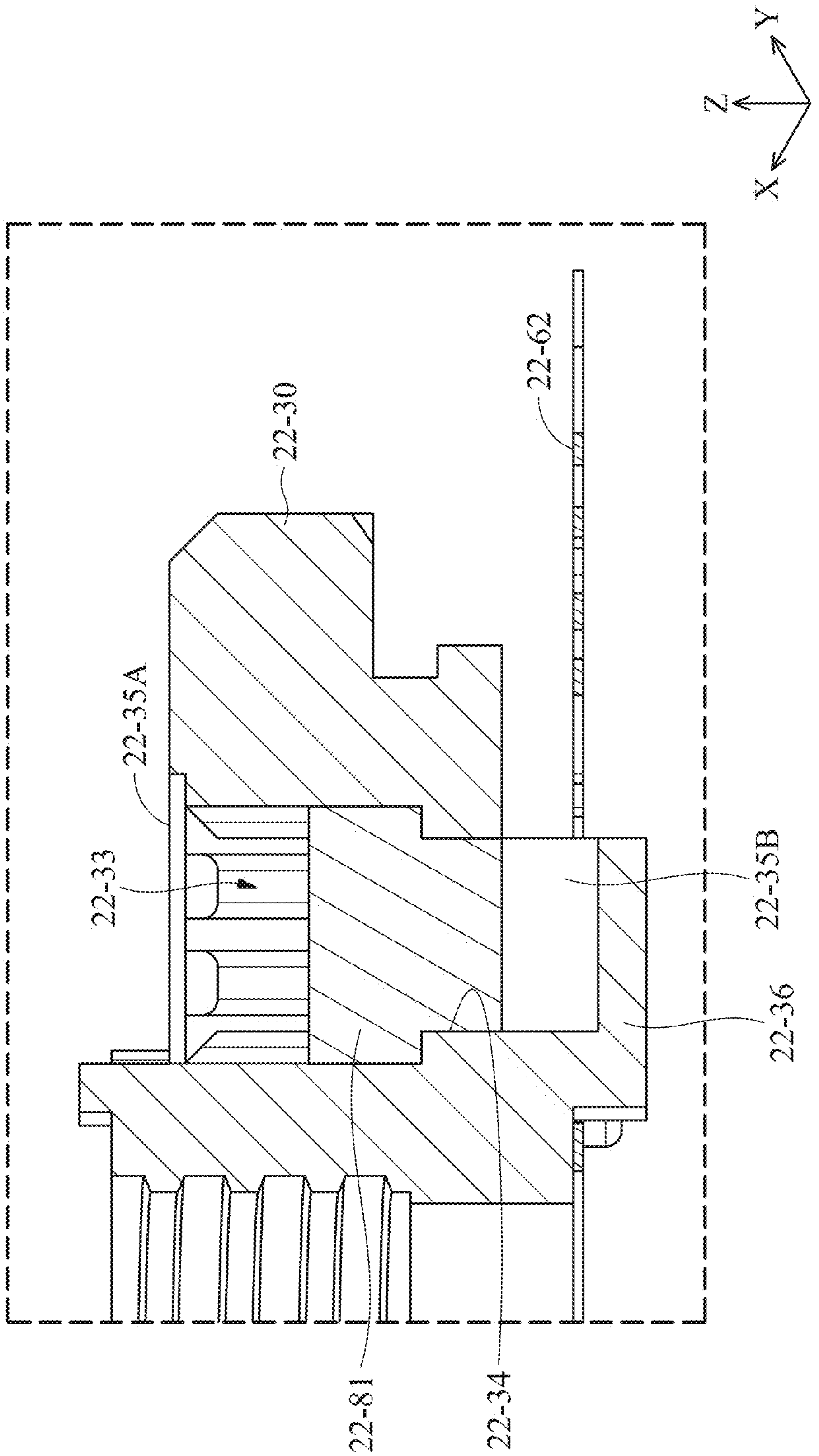
Figures 8, 22:
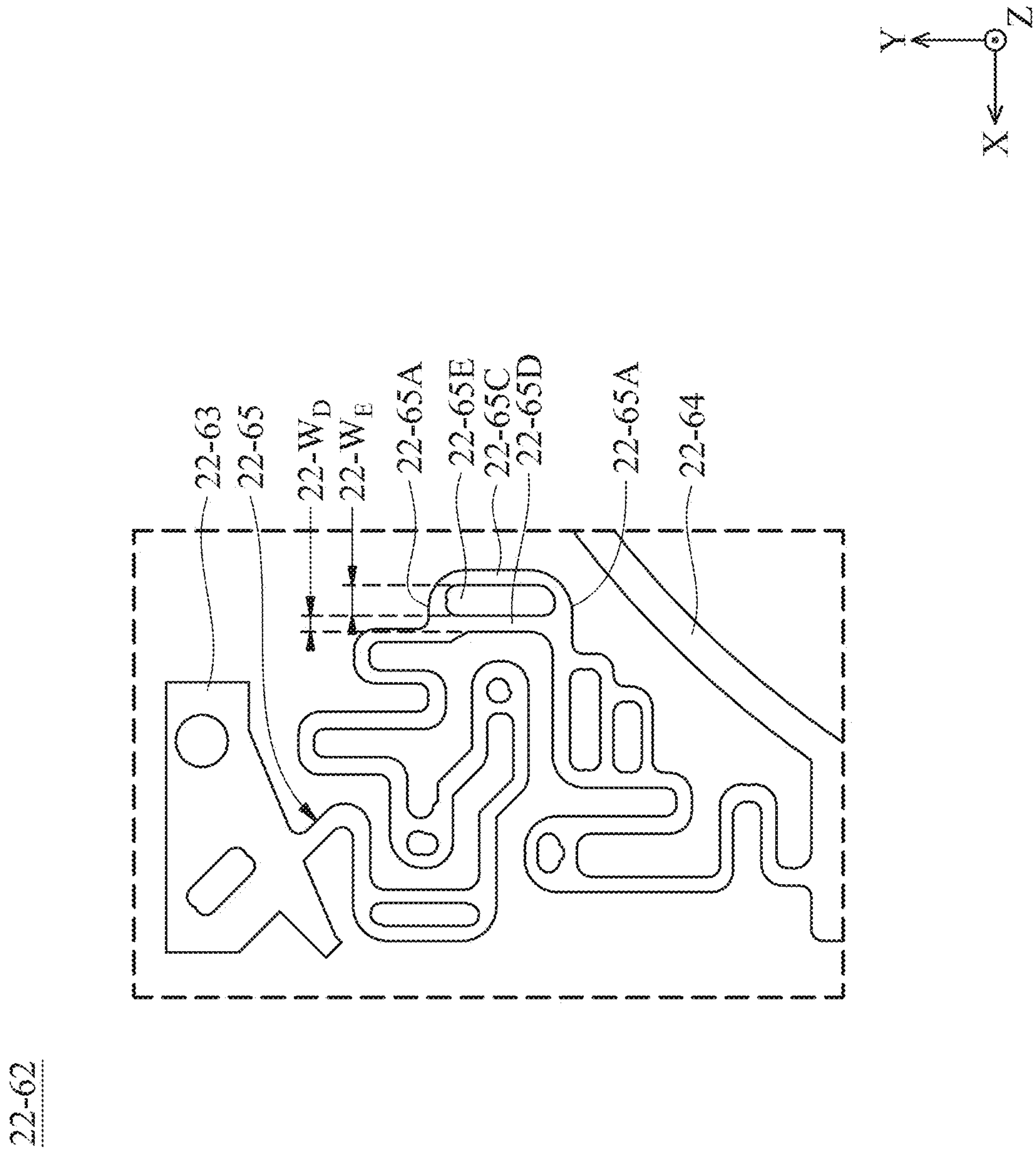
Figures 9, 22:
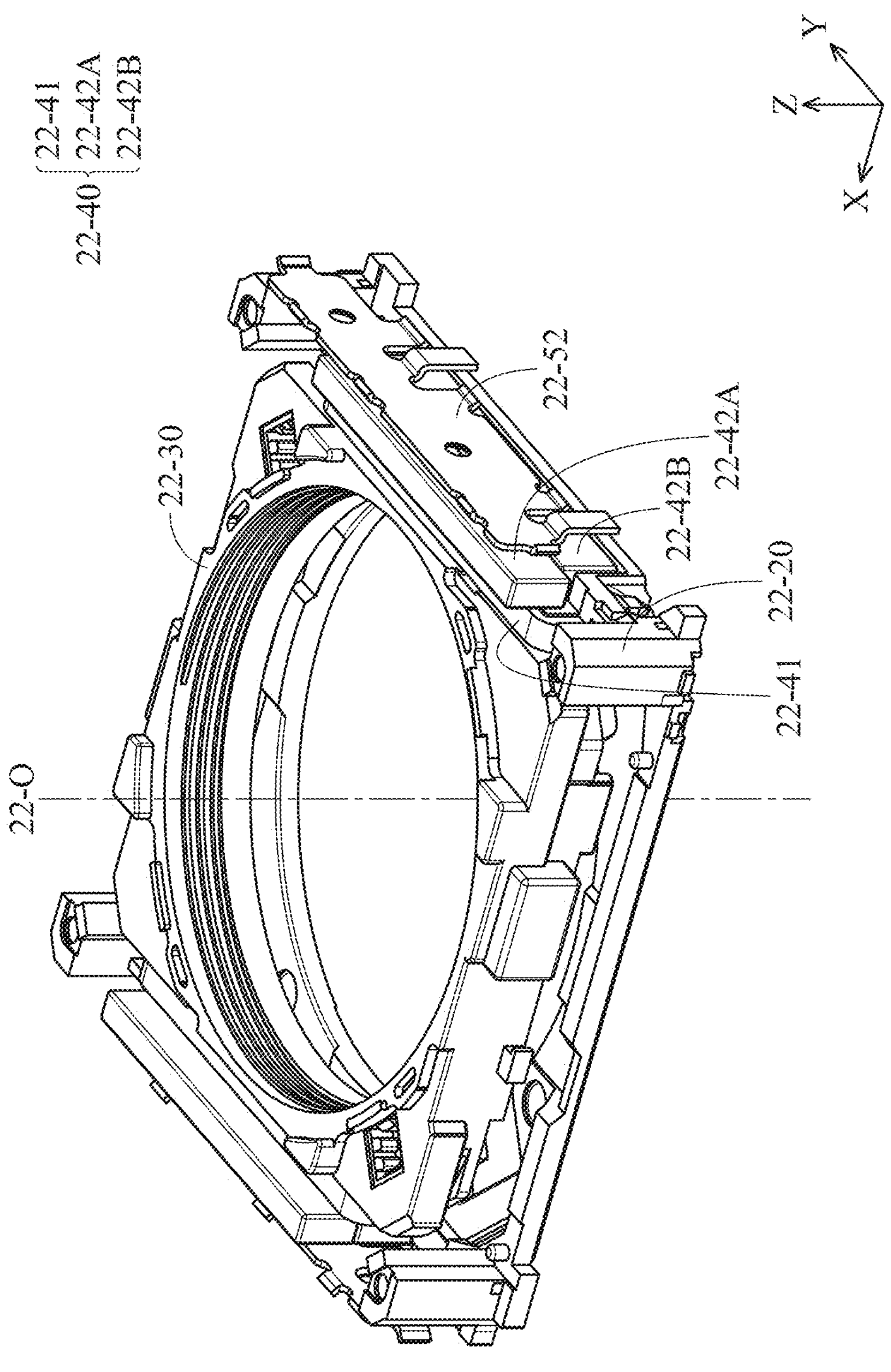
Figures 10, 22:
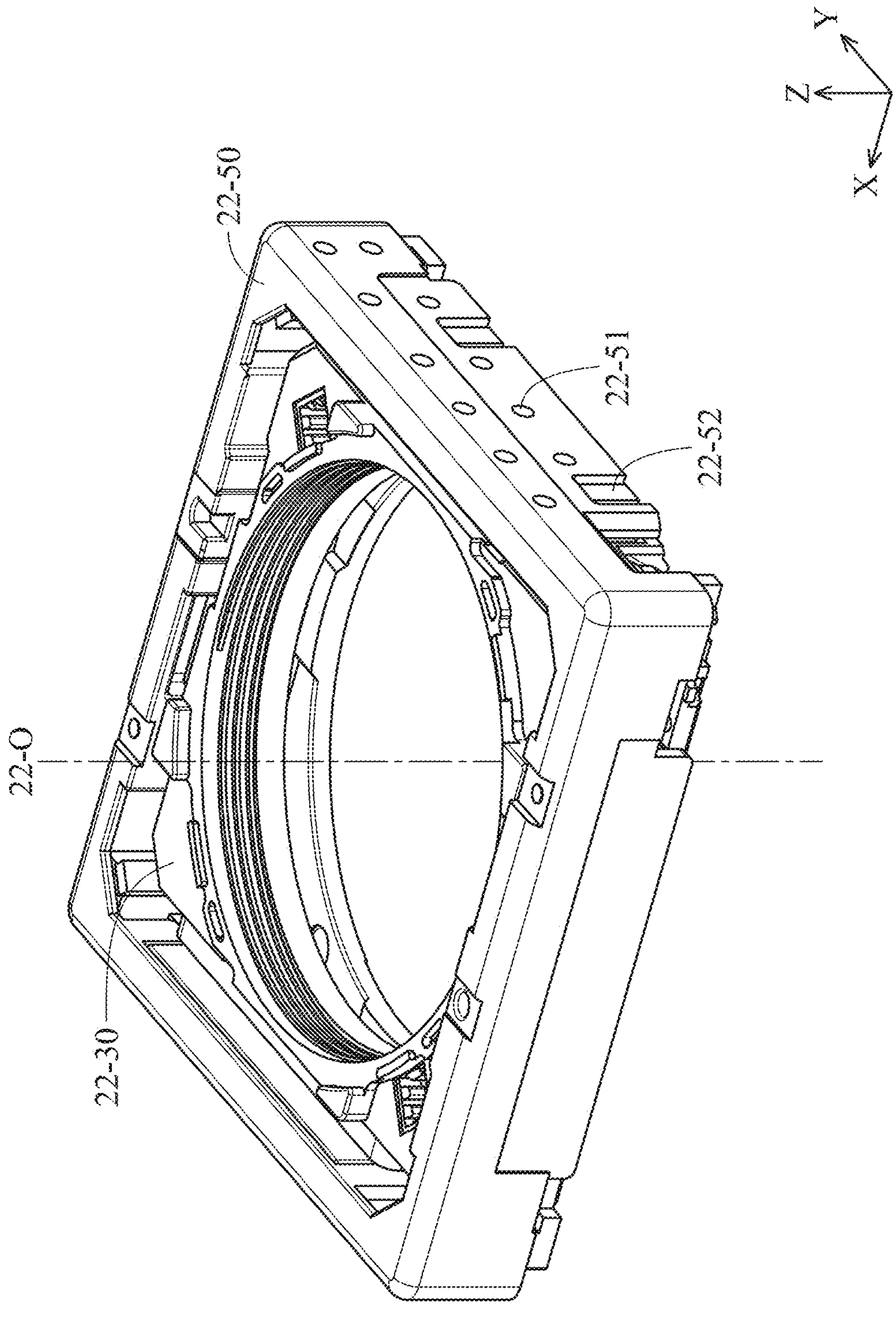

FIG. 22-1 is a schematic perspective view illustrating an optical member driving mechanism in accordance with an embodiment of the present disclosure.

FIG. 22-2 is an exploded view illustrating the optical member driving mechanism shown in FIG. 22-1.

FIG. 22-3 is a cross-sectional view illustrating along line 22-A shown in FIG. 22-1.

FIG. 22-4 is a top view illustrating a biasing driving assembly in accordance with an embodiment of the present disclosure.

FIG. 22-5 is a schematic view illustrating a carrier, a driving coil, and a second elastic member in accordance with an embodiment of the present disclosure.

FIG. 22-6 is a side view illustrating the carrier and the driving coil shown in FIG. 22-5.

FIG. 22-7 is a cross-sectional view illustrating along line 22-B shown in FIG. 22-5.

FIG. 22-8 is a partial plane view illustrating the second elastic member in accordance with an embodiment of the present disclosure.

FIG. 22-9 is a perspective view illustrating an interior structure of the optical member driving mechanism in FIG. 22-1.

FIG. 22-10 is a schematic view illustrating the structure shown in FIG. 22-9 with a frame.

Figures 11A, 22:
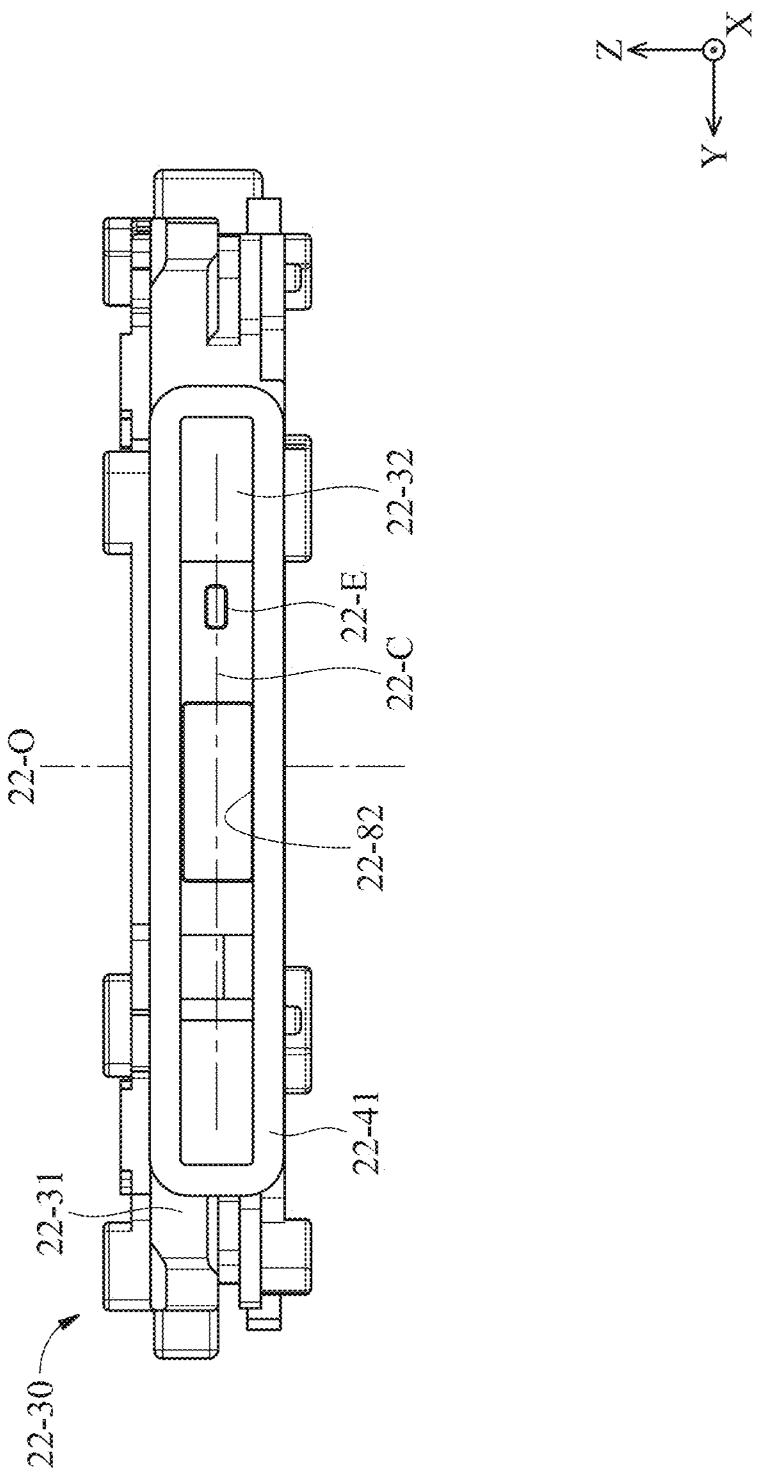

FIG. 22-11A is a side view illustrating the carrier, the driving coil, a position sensor, and an electronic component in accordance with another embodiment of the present disclosure.

Figures 11B, 22:
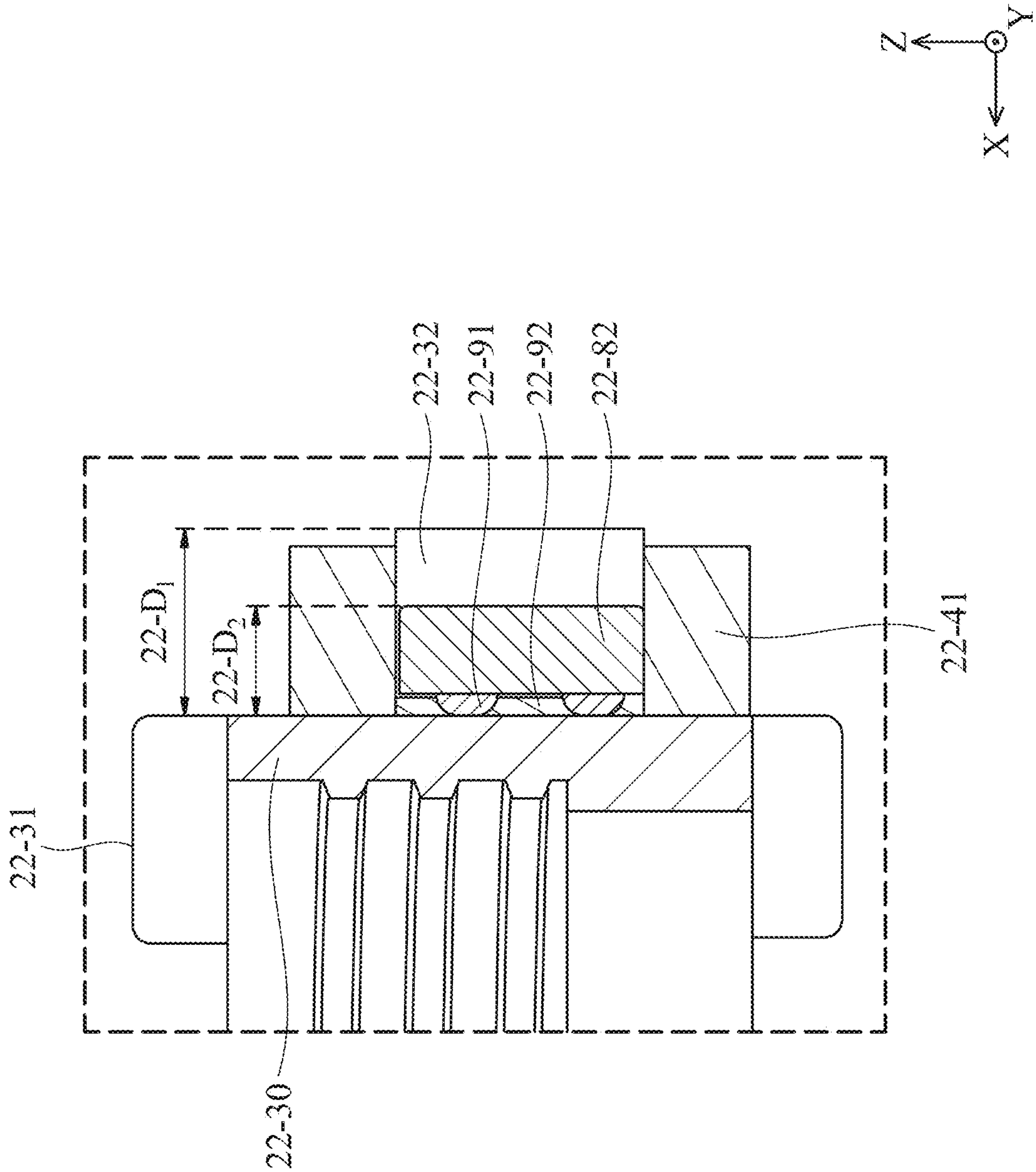

FIG. 22-11B is a cross-sectional view illustrating the carrier, the driving coil, and the position sensor shown in FIG. 22-11A.

Figures 12A, 22:
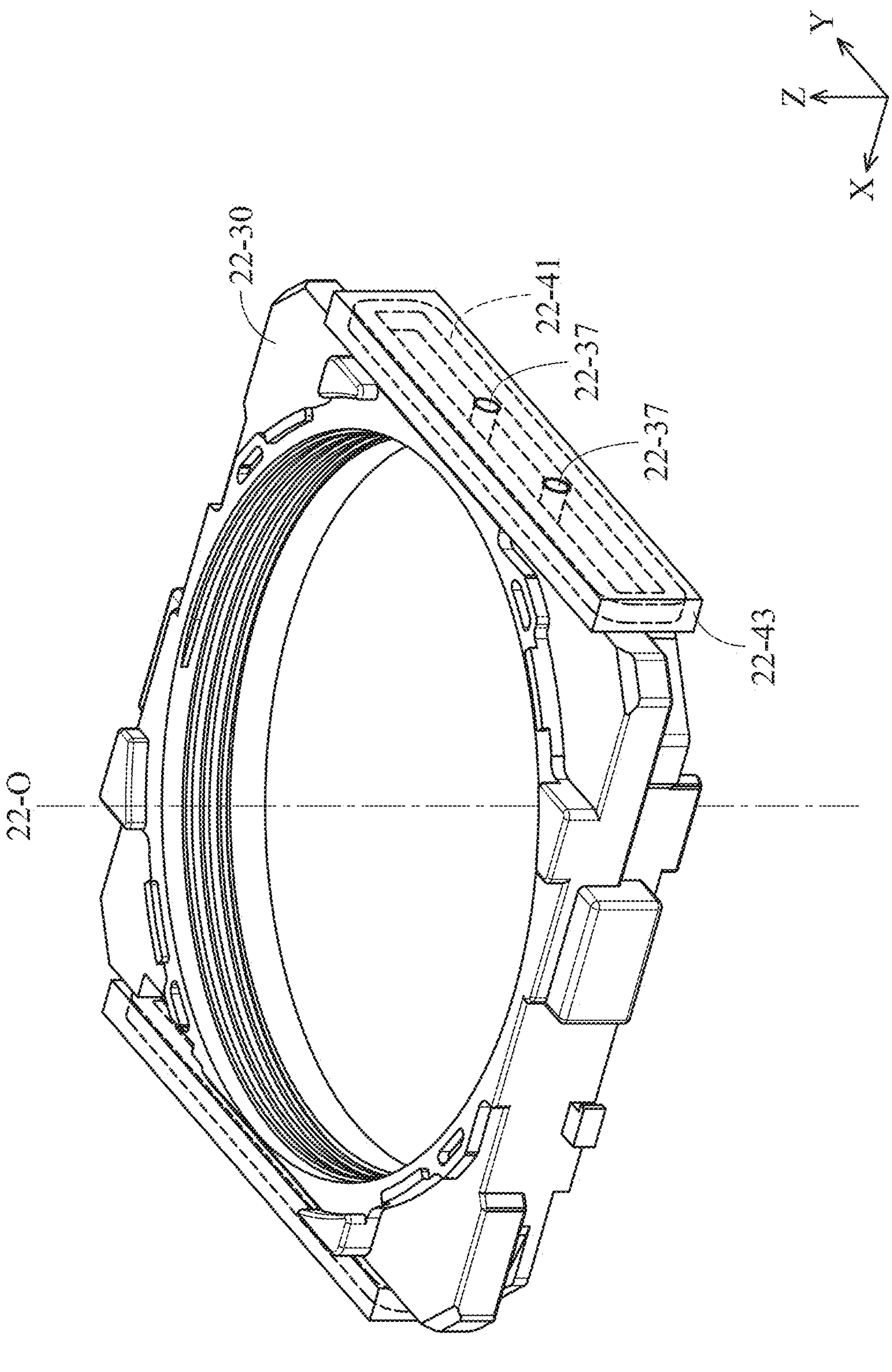

FIG. 22-12A is a perspective view illustrating the carrier, the driving coil, and a circuit board in accordance with another embodiment of the present disclosure.

Figures 12B, 22:
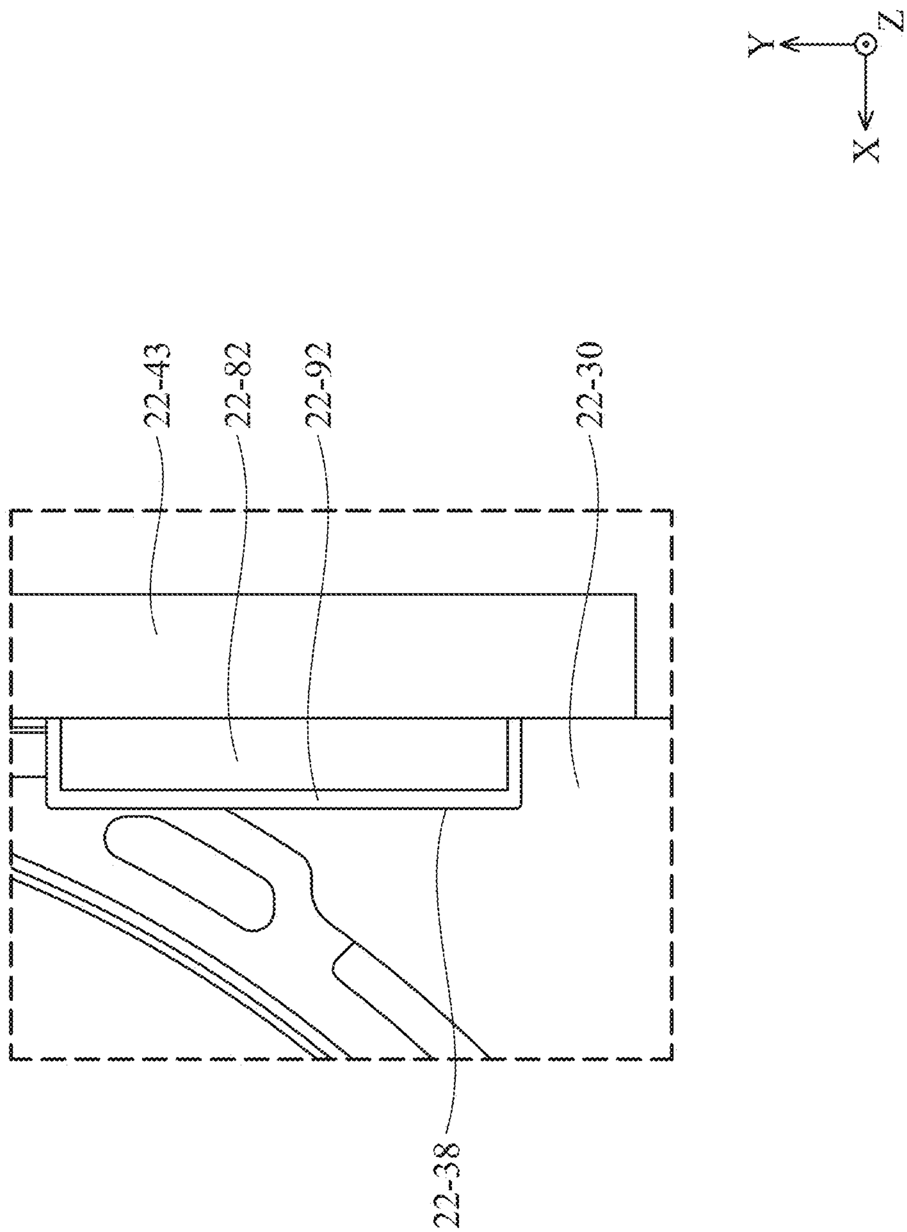

FIG. 22-12B is a partial top view illustrating the carrier, the circuit board, and the position sensor in accordance with another embodiment of the present disclosure.

Figures 1, 23:
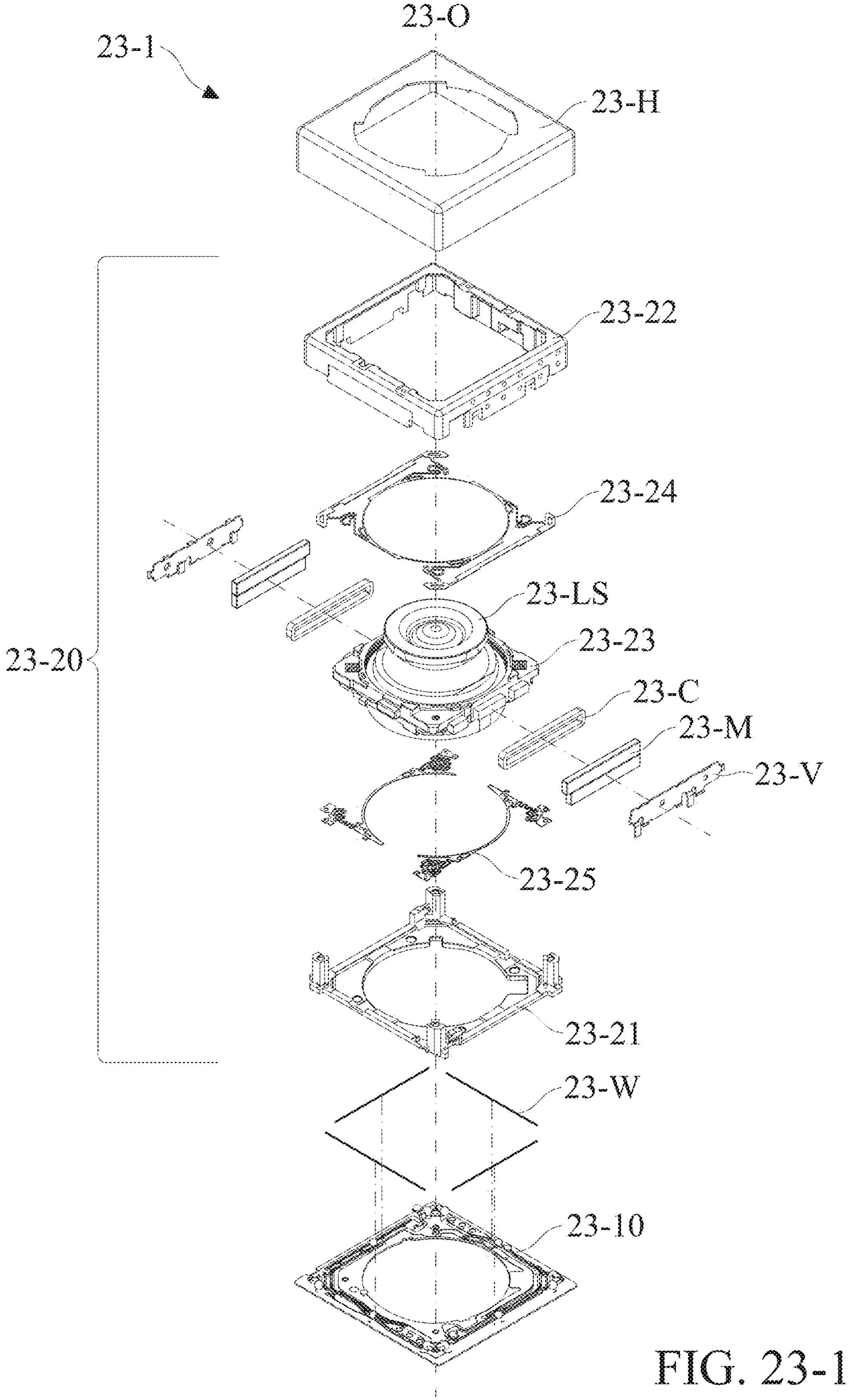
Figures 2, 23:
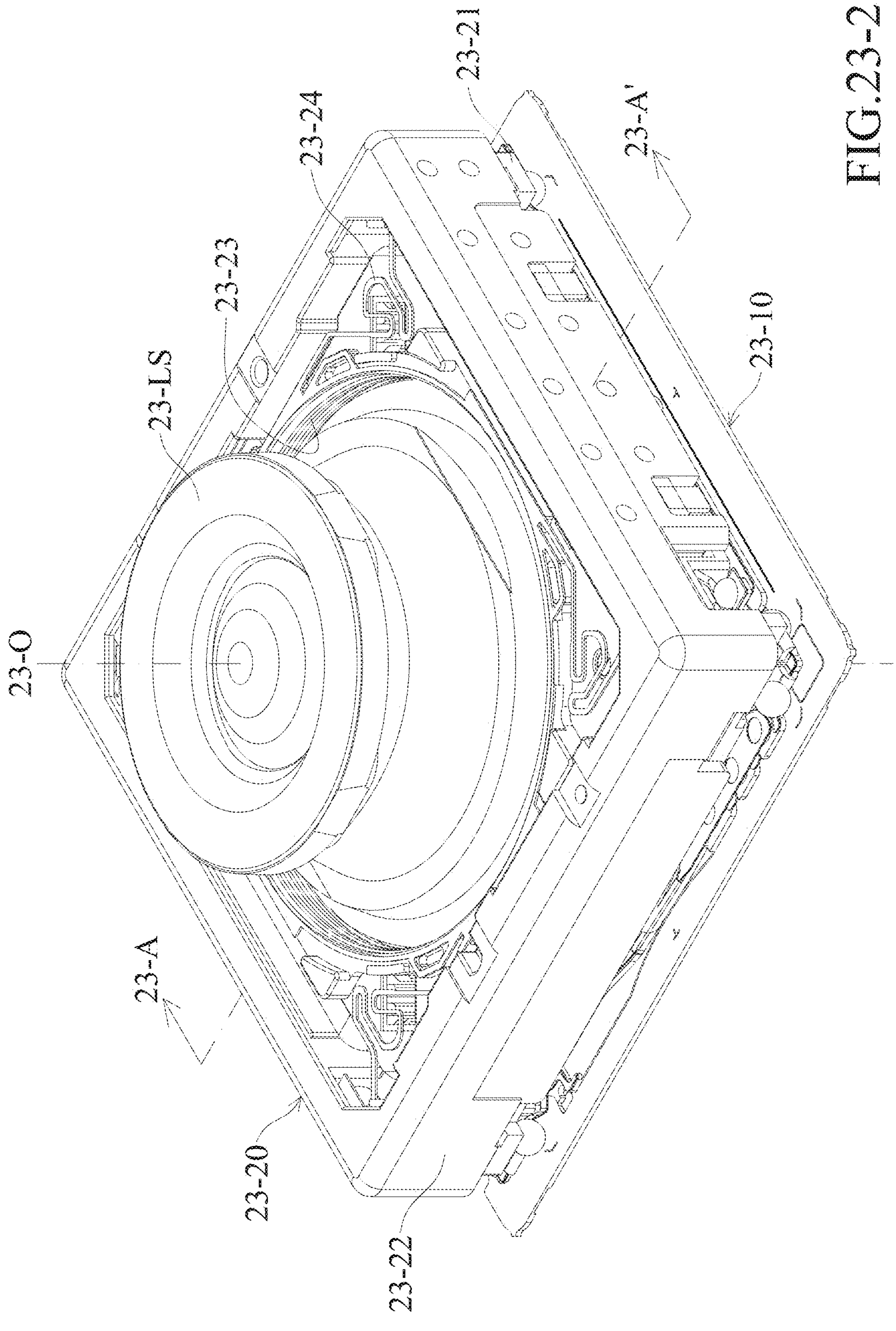
Figures 3, 23:
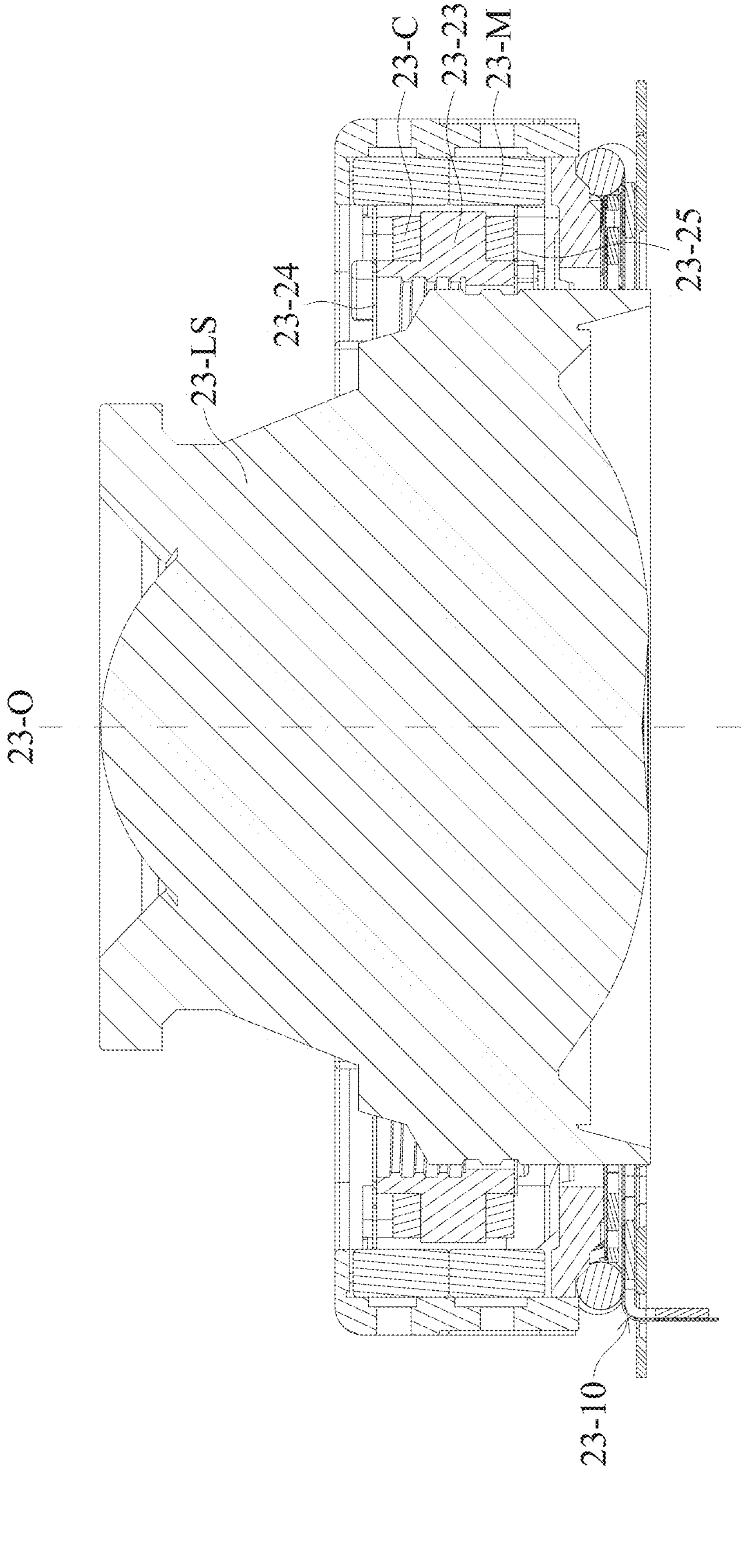
Figures 4, 23:
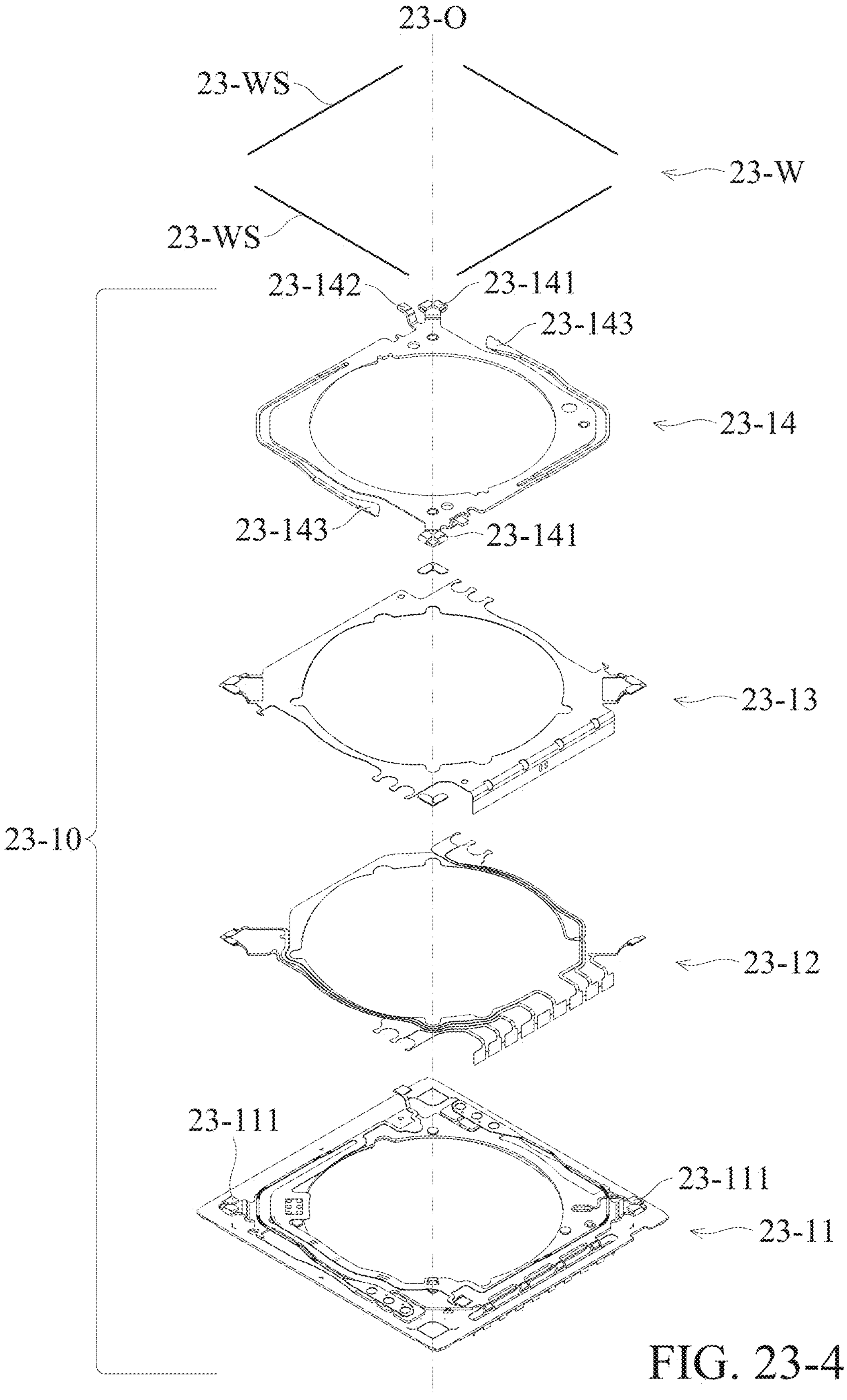
Figures 5, 23:
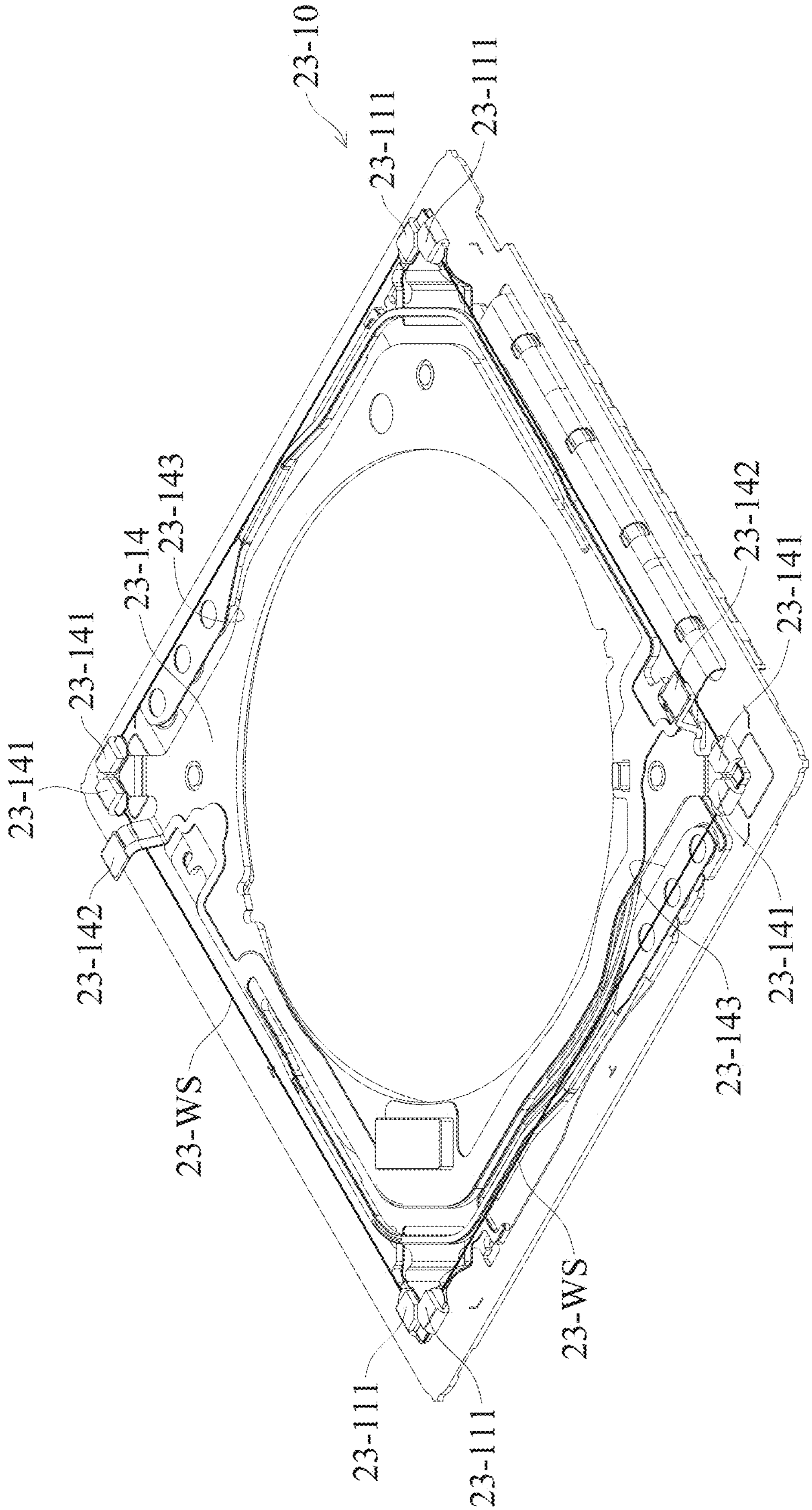
Figures 6A, 23:
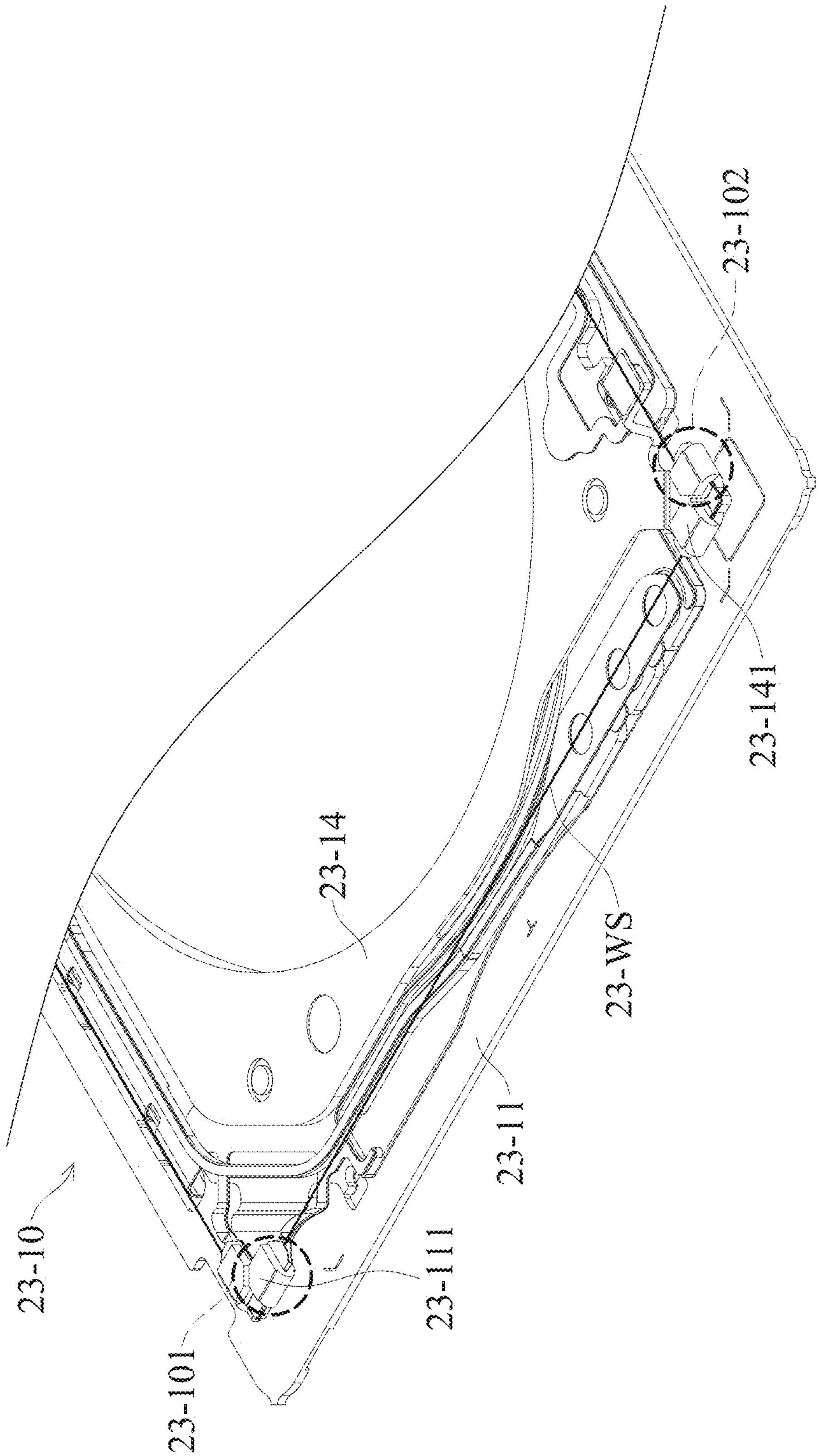
Figures 6B, 23:
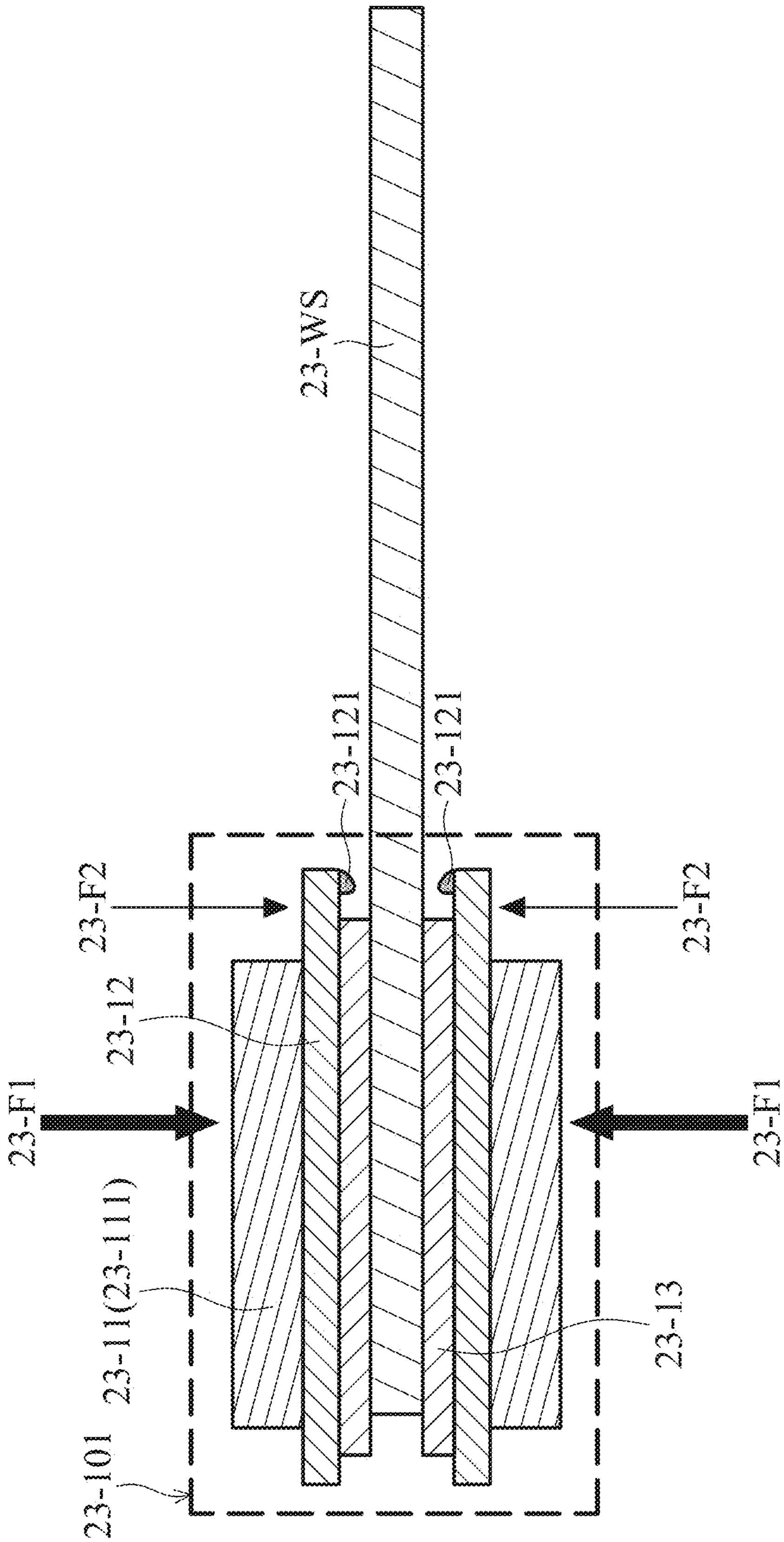
Figures 6C, 23:
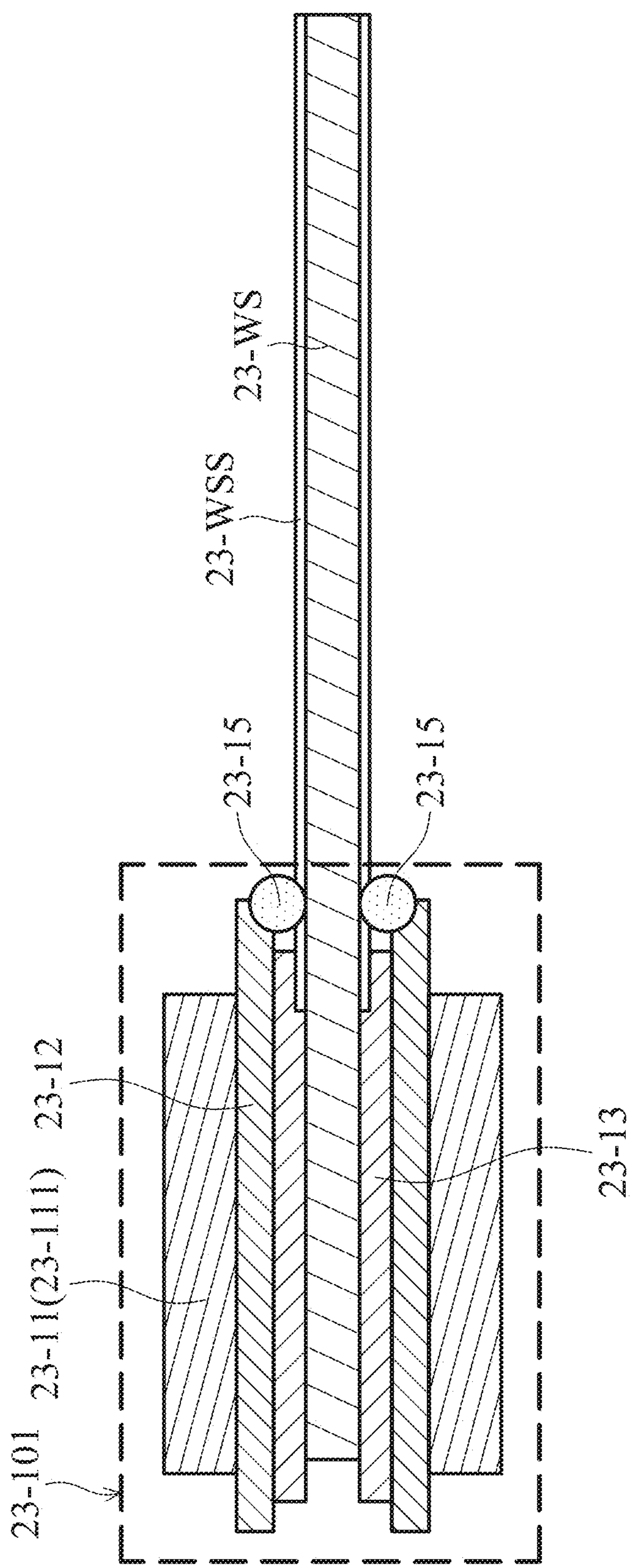
Figures 6D, 23:
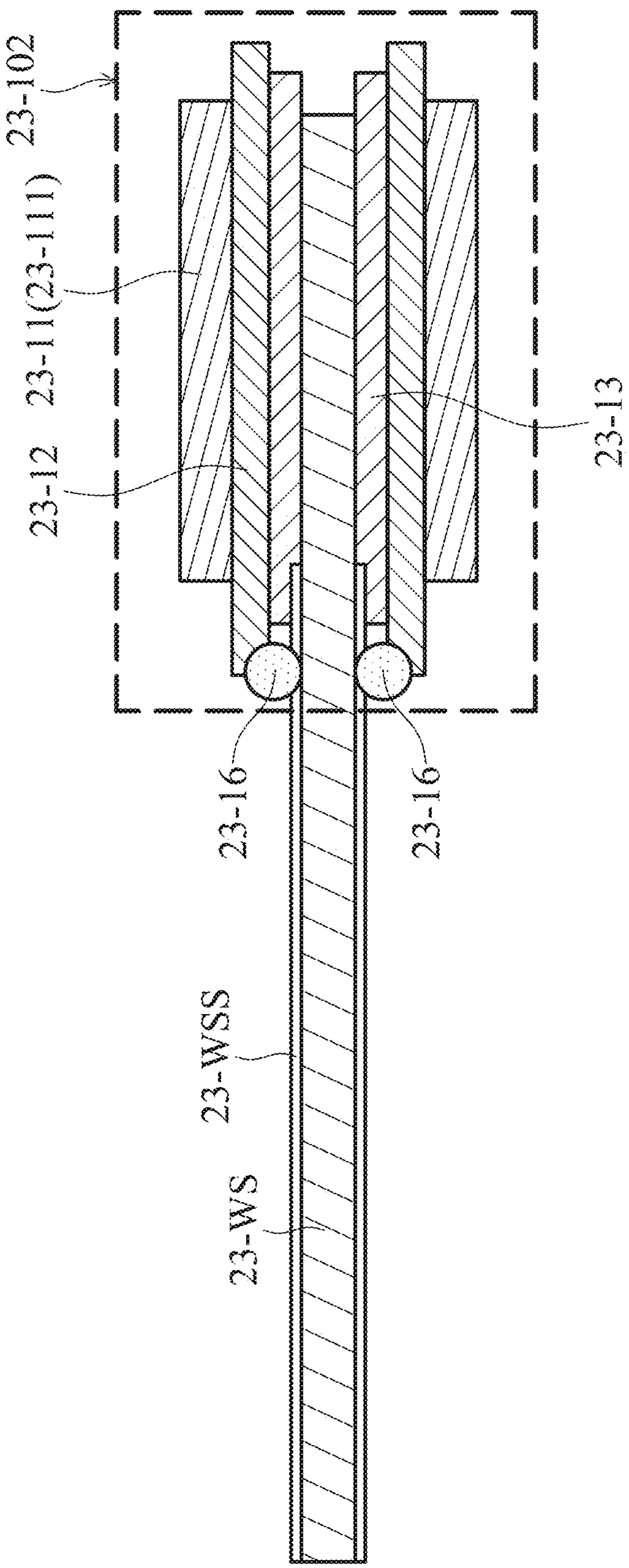
Figures 7, 23:
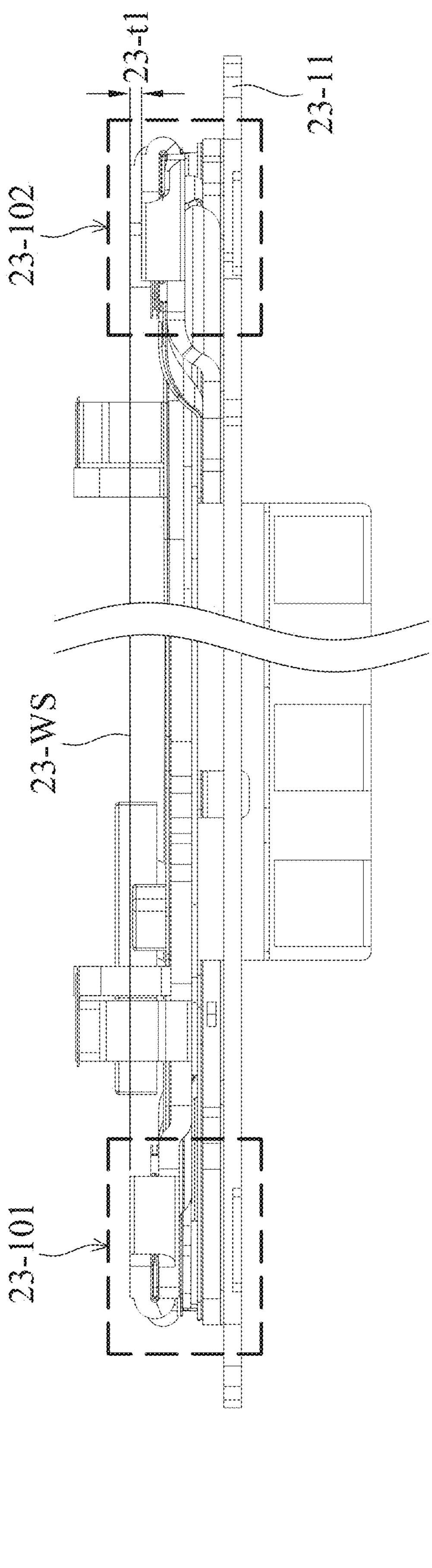
Figures 8, 23:
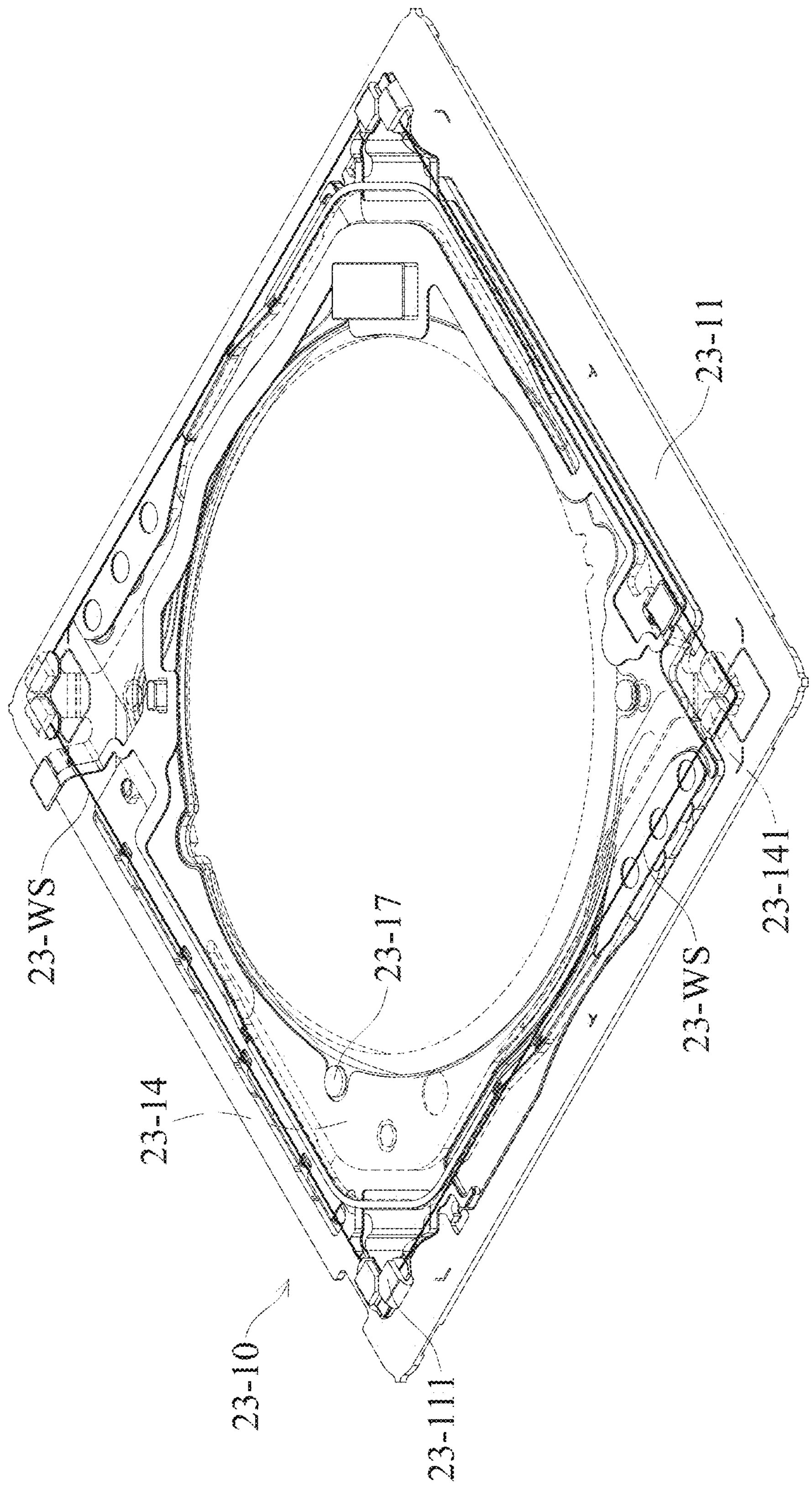
Figures 9A, 23:
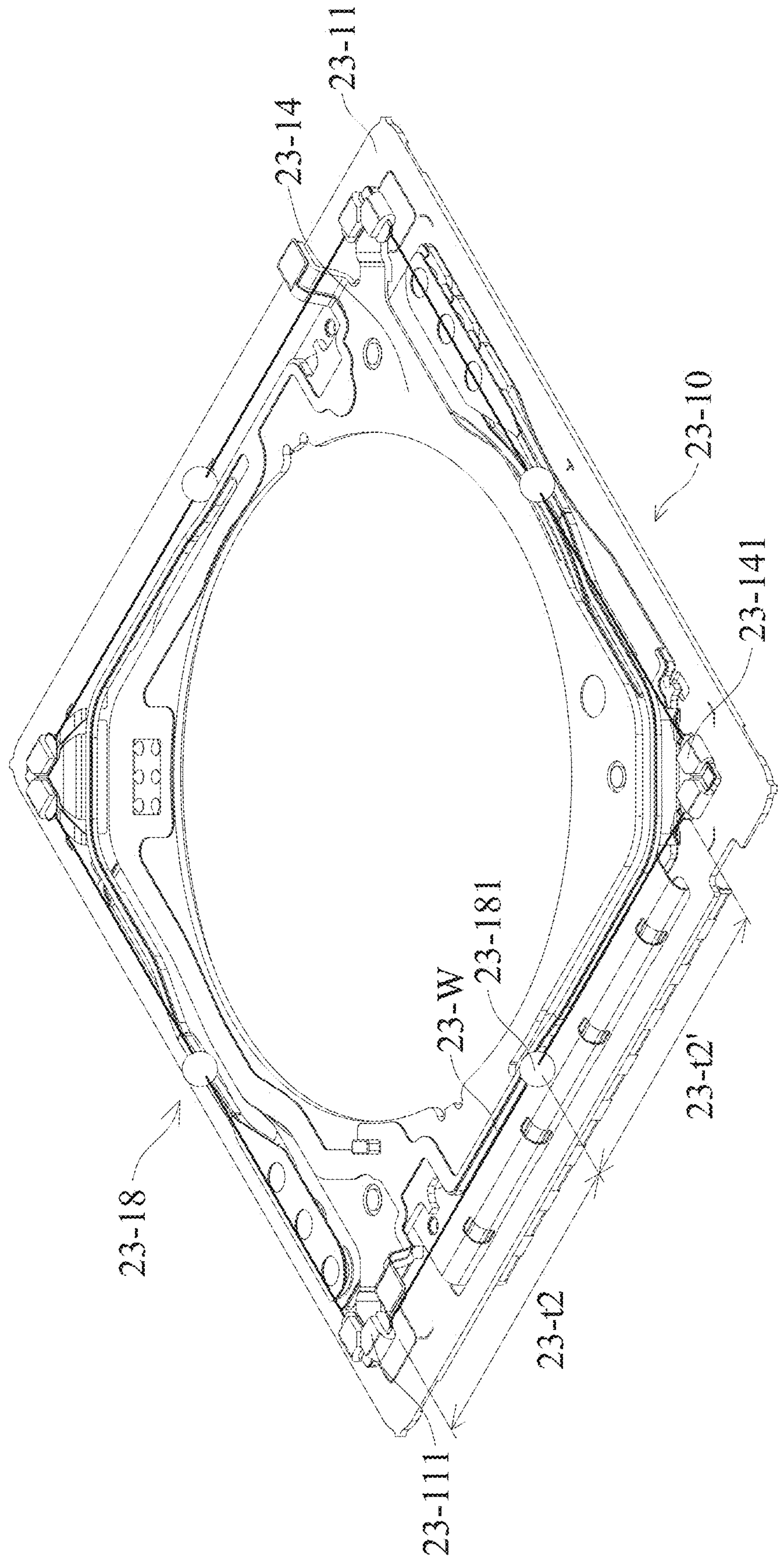
Figures 9B, 23:
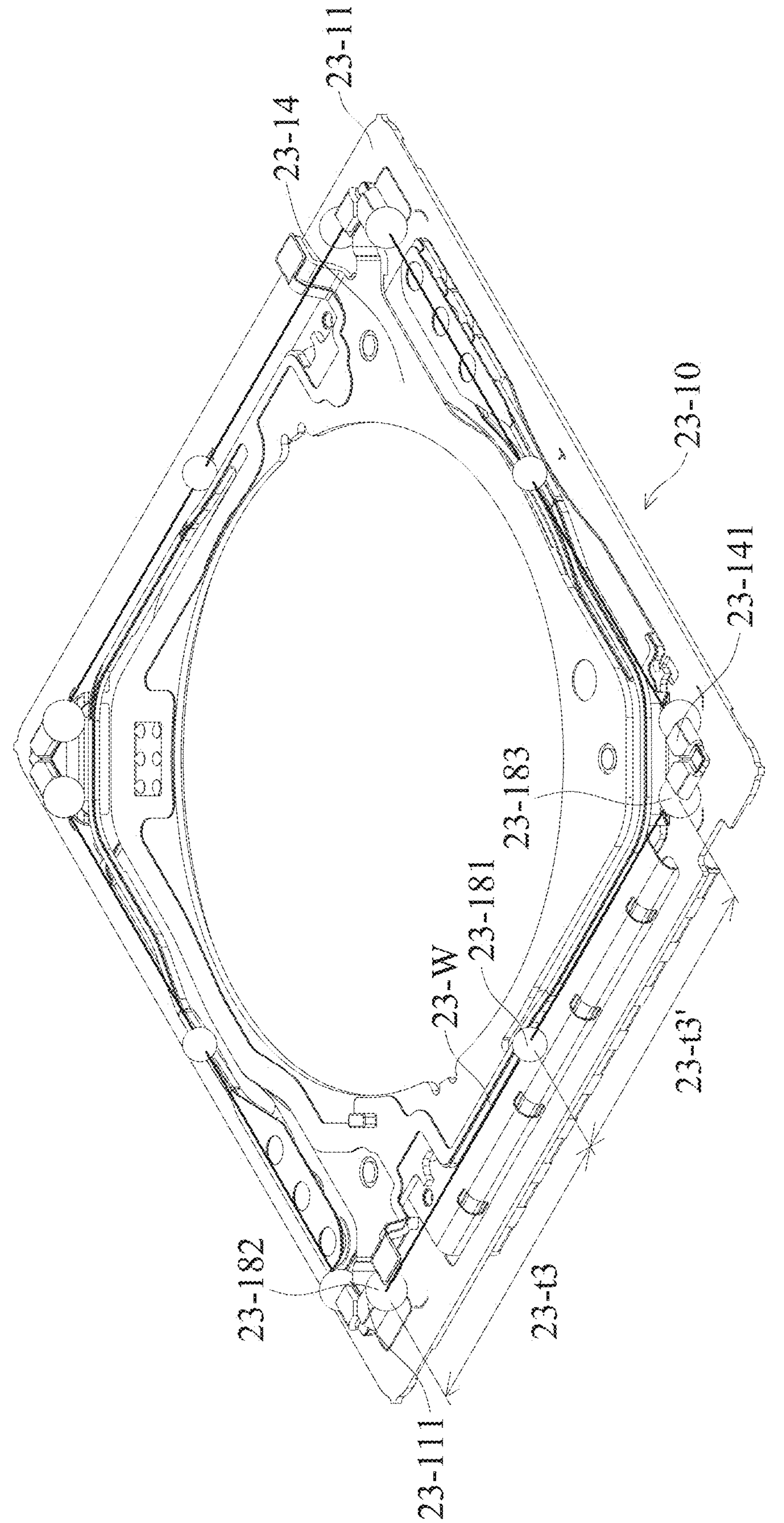

FIG. 23-1 is an exploded view diagram of an optical driving mechanism according an embodiment of the present disclosure.

FIG. 23-2 is a schematic diagram showing the assembled optical driving mechanisms in FIG. 23-1 (the housing 23-H is omitted).

FIG. 23-3 is a cross-sectional view taken along the line 23-A-23-A' in FIG. 23-2.

FIG. 23-4 is a schematic diagram of the bottom plate and the biasing assembly.

FIG. 23-5 shows a schematic diagram of the bottom plate and the biasing assembly in FIG. 23-4 after assembly.

FIG. 23-6A is a schematic diagram of the partial bottom plate and the biasing assembly in FIG. 23-5.

FIG. 23-6B is a schematic diagram of the first electrical connection portion and the biasing element.

FIG. 23-6C is a cross-sectional view diagram showing the first electrical connection portion of the bottom plate and the biasing element, wherein the bottom plate further includes a first resin member, and the surface of the biasing member further includes a protective layer.

FIG. 23-6D is a cross-sectional view diagram showing the second electrical connection portion of the bottom plate and the biasing element, wherein the bottom plate further includes a second resin member, and the surface of the biasing member further includes a protective layer.

FIG. 23-7 is a schematic diagram of a height difference between the first and second electrical connection portions.

FIG. 23-8 is a schematic diagram of the bottom plate having a slider.

FIG. 23-9A is a schematic diagram of the bottom plate having a vibration-damping assembly.

FIG. 23-9B is a schematic diagram of another vibration-damping assembly according an embodiment of the present disclosure.

Figures 9C, 23:
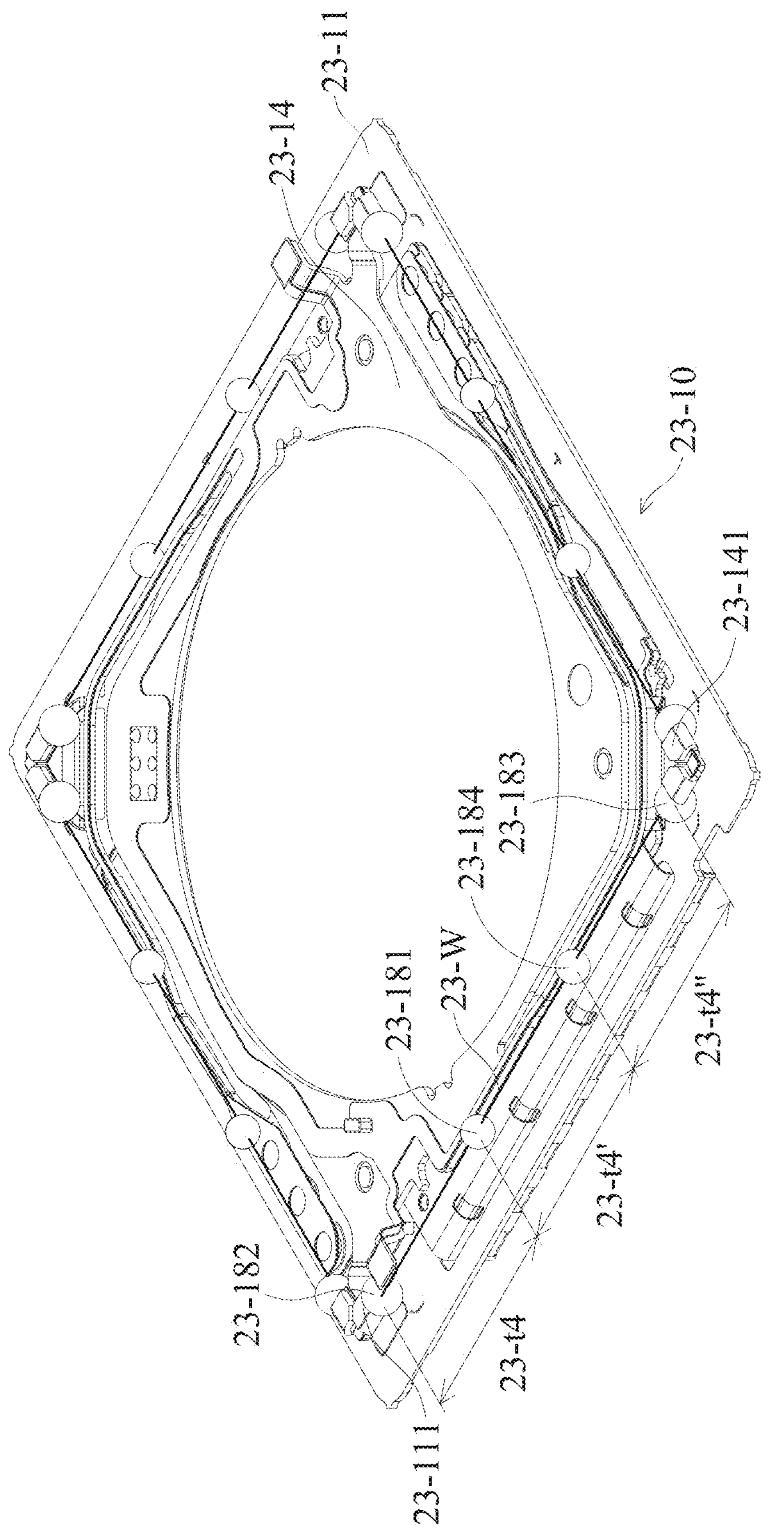

FIG. 23-9C is a schematic diagram of another vibration-damping assembly according an embodiment of the present disclosure.

DETAILED DESCRIPTION OF INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

First Group of Embodiments

Referring to FIG. 1-1A, in an embodiment of the disclosure, an optical system 1-A10 can be disposed in an electronic device 1-A20 and used to take photographs or record video. The electronic device 1-A20 can be a smartphone or a digital camera, for example. The optical system 1-A10 comprises a first optical module 1-A1000, a second optical module 1-A2000, and a third optical module 1-A3000. When taking photographs or recording video, these optical modules can receive lights and form images, wherein the images can be transmitted to a processor (not shown) in the electronic device 1-A20, where post-processing of the images can be performed.

In particular, the focal lengths of the first optical module 1-A1000, the second optical module 1-A2000, and the third optical module 1-A3000 are different, and the first optical module 1-A1000, the second optical module 1-A2000, and the third optical module 1-A3000 respectively have a first light-entering hole 1-A1001, a second light-entering hole 1-A2001, and a third light-entering hole 1-A3001. The external light(s) can reach the image sensor in the optical module through the light-entering hole.

Referring to FIG. 1-1B, the first optical module 1-A1000 comprises a housing 1-A1100, a lens driving mechanism 1-A1200, a lens 1-A1300, a base 1-A1400, an image sensor 1-A1500. The housing 1-A1100 and the base 1-A1400 can form a hollow box, and the housing 1-A1100 surrounds the lens driving mechanism 1-A1200. Therefore, the lens driving mechanism 1-A1200 and the lens 1-A1300 can be accommodated in the aforementioned box. The image sensor 1-A1500 is disposed on a side of the box, the first light-entering hole 1-A1001 is formed on the housing 1-A1100, and the base 1-A1400 has an opening 1-A1410 corresponding to the first light-entering hole 1-A1001. Thus, the light can reach the image sensor 1-A1500 through the first light-entering hole 1-A1001, the lens 1-A1300, and the opening 1-A1410 in sequence, so as to form an image on the image sensor 1-A1500.

The lens driving mechanism 1-A1200 comprises a lens holder 1-A1210, a frame 1-A1220, at least one first electromagnetic driving assembly 1-A1230, at least one second electromagnetic driving assembly 1-A1240, a first elastic member 1-A1250, a second elastic member 1-A1260, a coil board 1-A1270, a plurality of suspension wires 1-A1280, and a plurality of position detectors 1-A1290.

The lens holder 1-A1210 has an accommodating space 1-A1211 and a concave structure 1-A1212, wherein the accommodating space 1-A1211 is formed at the center of the lens holder 1-A1210, and the concave structure 1-A1212 is formed on the outer wall of the lens holder 1-A1210 and surrounds the accommodating space 1-A1211. The lens 1-A1300 can be affixed to the lens holder 1-A1210 and accommodated in the accommodating space 1-A1211. The first electromagnetic driving assembly 1-A1230 can be disposed in the concave structure 1-A1212.

The frame 1-A1220 has a receiving portion 1-A1221 and a plurality of recesses 1-A1222. The lens holder 1-A1210 is received in the receiving portion 1-A1221, and the second electromagnetic driving assembly 1-A1240 is affixed in the recess 1-A1222 and adjacent to the first electromagnetic driving assembly 1-A1230.

The lens holder 1-A1210 and the lens 1-A1300 disposed thereon can be driven by the electromagnetic effect between the first electromagnetic driving assembly 1-A1230 and the second electromagnetic driving assembly 1-A1240 to move relative to the frame 1-A1220 along the Z-axis. For example, in this embodiment, the first electromagnetic driving assembly 1-A1230 can be a driving coil surrounding the accommodating space 1-A1211 of the lens holder 1-A1210, and the second electromagnetic driving assembly 1-A1240 can comprise at least one magnet. When a current flows through the driving coil (the first electromagnetic driving assembly 1-A1230), an electromagnetic effect is generated between the driving coil and the magnet. Thus, the lens holder 1-A1210 and the lens 1-A1300 disposed thereon can be driven to move relative to the frame 1-A1220 and the image sensor 1-A1500 along the Z-axis, and the purpose of auto focus can be achieved.

In some embodiments, the first electromagnetic driving assembly 1-A1230 can be a magnet, and the second electromagnetic driving assembly 1-A1240 can be a driving coil.

The first elastic member 1-A1250 and the second elastic member 1-A1260 are respectively disposed on opposite sides of the lens holder 1-A1210 and the frame 1-A1220, and the lens holder 1-A1210 and the frame 1-A1220 can be disposed therebetween. The inner portion 1-A1251 of the first elastic member 1-A1250 is connected to the lens holder 1-A1210, and the outer portion 1-A1252 of the first elastic member 1-A1250 is connected to the frame 1-A1220. Similarly, the inner portion 1-A1261 of the second elastic member 1-A1260 is connected to the lens holder 1-A1210, and the outer portion 1-A1262 of the second elastic member 1-A1260 is connected to the frame 1-A1220. Thus, the lens holder 1-A1210 can be hung in the receiving portion 1-A1221 of the frame 1-A1220 by the first elastic member 1-A1250 and the second elastic member 1-A1260, and the range of motion of the lens holder 1-A1210 along the Z-axis can also be restricted by the first and second elastic members 1-A1250 and 1-A1260.

Referring to FIG. 1-1B, the coil board 1-A1270 is disposed on the base 1-A1400. Similarly, when a current flows through the coil board 1-A1270, an electromagnetic effect is generated between the coil board 1-A1270 and the second electromagnetic driving assembly 1-A1240 (or the first electromagnetic driving assembly 1-A1230). Thus, the lens holder 1-A1210 and the frame 1-A1220 can be driven to move relative to coil board 1-A1270 along the X-axis and/or the Y-axis, and the lens 1-A1300 can be driven to move relative to image sensor 1-A1500 along the X-axis and/or the Y-axis. The purpose of image stabilization can be achieved.

In this embodiment, the lens driving mechanism 1-A1200 comprises four suspension wires 1-A1280. Four suspension wires 1-A1280 are respectively disposed on the four corners of the coil board 1-A1270 and connect the coil board 1-A1270, the base 1-A1400 and the first elastic member 1-A1250. When the lens holder 1-A1210 and the lens 1-A1300 move along the X-axis and/or the Y-axis, the suspension wires 1-A1280 can restrict their range of motion. Moreover, since the suspension wires 1-A1280 comprise metal (for example, copper or an alloy thereof), the suspension wires 1-A1280 can be used as a conductor. For example, the current can flow into the first electromagnetic driving assembly 1-A1230 through the base 1-A1400 and the suspension wires 1-A1280.

The position detectors 1-A1290 are disposed on the base 1-A1400, wherein the position detectors 1-A1290 can defect the movement of the second electromagnetic driving assembly 1-A1240 to obtain the position of the lens holder 1-A1210 and the lens 1-A1300 in the X-axis and the Y-axis. For example, each of the position detectors 1-A1290 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

Referring to FIGS. 1-1A and 1-1B, in this embodiment, the structure of the second optical module 1-A2000 and the structure of the third optical module 1-A3000 are substantially the same as the structure of the first optical module 1-A1000. The only difference between the first, second, and third optical modules 1-A1000, 1-A2000, and 1-A3000 is that their lenses have different focal lengths. For example, the focal length of the first optical module 1-A1000 is greater than that of the third optical module 1-A3000, and the focal length of the third optical module 1-A3000 is greater than that of the second optical module 1-A2000. In other words, in the Z-axis, the thickness of the first optical module 1-A1000 is greater than that of the third optical module 1-A3000, and the thickness of the third optical module 1-A3000 is greater than that of the second optical module 1-A2000. In this embodiment, the second optical module 1-A2000 is disposed between the first optical module 1-A1000 and the third optical module 1-A3000.

Referring to FIG. 1-2A, in another embodiment of the disclosure, an optical system 1-B10 can be disposed in an electronic device 1-B20, and comprise a first optical module 1-B1000, a second optical module 1-B2000, and a third optical module 1-B3000. The second optical module 1-B2000 is disposed between the first optical module 1-B1000 and the third optical module 1-B3000, and the focal lengths of the first optical module 1-B1000, the second optical module 1-B2000, and the third optical module 1-B3000 are different. A first light-entering hole 1-B1001 of the first optical module 1-B1000, a second light-entering hole 1-B2001 of the second optical module 1-B2000, and a third light-entering hole 1-B3001 of the third optical module 1-B3001 are adjacent to each other.

As shown in FIG. 1-2B, the first optical module 1-B1000 comprises a lens unit 1-B1100, a reflecting unit 1-B1200, and an image sensor 1-B1300. An external light (such as a light 1-L) can enter the first optical module 1-B1000 through the first light-entering hole 1-B1001 and be reflected by the reflecting unit 1-B1200. After that, the external light can pass through the lens unit 1-B1100 and be received by the image sensor 1-B1300.

The specific structures of the lens unit 1-B1100 and the reflecting unit 1-B1200 in this embodiment are discussed below. As shown in FIG. 1-2B, the lens unit 1-B1100 primarily comprises a lens driving mechanism 1-B1110 and a lens 1-B1120, wherein the lens driving mechanism 1-B1110 is used to drive the lens 1-B1120 to move relative to the image sensor 1-B1300. For example, the lens driving mechanism 1-B1110 can comprise a lens holder 1-B1111, a frame 1-B1112, two spring sheets 1-B1113, at least one coil 1-B1114, and at least one magnetic member 1-B1115.

The lens 1-B1120 is affixed to the lens holder 1-B1111. Two spring sheets 1-B1113 are connected to the lens holder 1-B1111 and the frame 1-B1112, and respectively disposed on opposite sides of the lens holder 1-B1111. Thus, the lens holder 1-B1111 can be movably hung in the frame 1-B1112. The coil 1-B1114 and the magnetic member 1-B1115 are respectively disposed on the lens holder 1-B1111 and the frame 1-B1112, and correspond to each other. When current flows through the coil 1-B1114, an electromagnetic effect is generated between the coil 1-B1114 and the magnetic member 1-B1115, and the lens holder 1-B1111 and the lens 1-B1120 disposed thereon can be driven to move relative to the image sensor 1-B1300.

Referring to FIGS. 1-2B-1-2D, the reflecting unit 1-B1200 primarily comprises an optical member 1-B1210, an optical member holder 1-B1220, a frame 1-B1230, at least one bearing member 1-B1240, at least one first hinge 1-B1250, a first driving module 1-B1260, and a position detector 1-B1201.

The first bearing member 1-B1240 is disposed on the frame 1-B1230, the first hinge 1-B1250 can pass through the hole at the center of the first bearing member 1-B1240, and the optical member holder 1-B1220 can be affixed to the first hinge 1-B1250. Therefore, the optical member holder 1-B1220 can be pivotally connected to the frame 1-B1230 via the first hinge 1-B1250. Since the optical member 1-B1210 is disposed on the optical member holder 1-B1220, when the optical member holder 1-B1220 rotates relative to the frame 1-B1230, the optical member 1-B1210 disposed thereon also rotates relative to the frame 1-B1230. The optical member 1-B1210 can be a prism or a reflecting mirror.

Referring to FIG. 1-2E, in this embodiment, a dust-proof assembly 1-B1231 is disposed on the frame 1-B1230. The dust-proof assembly 1-B1231 is adjacent to the first hinge 1-B1250 and disposed between the optical member 1-B1210 and the first bearing member 1-B1240. The dust-proof assembly 1-B1231 does not contact the first hinge 1-B1250 or the first bearing member 1-B1240, in other words, a gap is formed between the dust-proof assembly 1-B1231 and the first hinge 1-B1250 and another gap is formed between the dust-proof assembly 1-B1231 and first bearing member 1-B1240.

Owing to the first bearing member 1-B1240, the dust generated from the friction between the first hinge 1-B1250 and the frame 1-B1230 when the optical member holder 1-B1220 rotates relative to the frame 1-B1230 can be prevented. Furthermore, owing to the dust-proof assembly 1-B1231, the minor dust from the first bearing member 1-B1240 can also be blocked and does not attach to the optical member 1-B1210. The optical properties of the optical member 1-B1210 can be maintained.

In this embodiment, the dust-proof assembly 1-B1231 is a plate integrally formed with the frame 1-B1230. In some embodiments, the dust-proof assembly 1-B1231 is a brush disposed on the frame 1-B1230.

Referring to FIG. 1-2F, a fixing structure 1-B1221 is formed on the optical member holder 1-B1220 for joining to the first hinge 1-B1250. In this embodiment, the fixing structure 1-B1221 is a recess, and a narrow portion 1-B1222 is formed in the recess. Therefore, it is convenient to join the optical member holder 1-B1220 to the first hinge 1-B1250, and the narrow portion 1-B1222 can prevent the optical member holder 1-B1220 from falling from the first hinge 1-B1250.

In some embodiments, the position of the first bearing member 1-B1240 and the position of the fixing structure 1-B1221 can be interchanged. That is, the first bearing member 1-B1240 can be disposed on the optical member holder 1-B1220, and the fixing structure 1-B1221 can be formed on the frame 1-B1230. In some embodiments, the reflecting unit 1-B1200 can further comprise a sealing member (such as a glue or a hook). After the first hinge 1-B1250 enters the recess of the fixing structure 1-B1221, the sealing member can seal the opening of the recess.

As shown in FIGS. 1-2B-1-2D, the first driving module 1-B1260 can comprise a first electromagnetic driving assembly 1-B1261 and a second electromagnetic driving assembly 1-B1262, respectively disposed on the frame 1-B1230 and the optical member holder 1-B1220 and corresponding to each other.

For example, the first electromagnetic driving assembly 1-B1261 can comprise a driving coil, and the second electromagnetic driving assembly 1-B1262 can comprise a magnet. When a current flows through the driving coil (the first electromagnetic driving assembly 1-B1261), an electromagnetic effect is generated between the driving coil and the magnet. Thus, the optical member holder 1-B1220 and the optical member 1-B1210 can be driven to rotate relative to the frame 1-B1230 around a first rotation axis 1-R1 (extending along the Y-axis), so as to adjust the position of the external light 1-L on the image sensor 1-B1300.

The position detector 1-B1201 can be disposed on the frame 1-B1230 and correspond to the second electromagnetic driving assembly 1-B1262, so as to detect the position of the second electromagnetic driving assembly 1-B1262 to obtain the rotation angle of the optical member 1-B1210. For example, the position detectors 1700 can be Hall sensors, magnetoresistance effect sensors (MR sensor), giant magnetoresistance effect sensors (GMR sensor), tunneling magnetoresistance effect sensors (TMR sensor), or fluxgate sensors.

In some embodiments, the first electromagnetic driving assembly 1-B1261 comprises a magnet, and the second electromagnetic driving assembly comprises a driving coil. In these embodiments, the position detector 1-B1201 can be disposed on the optical member holder 1-B1220 and corresponds to the first electromagnetic driving assembly 1-B1261.

Referring to FIG. 1-2A, in this embodiment, the structure of the first optical module 1-B1000 is the same as the structure of the third optical module 1-B3000, but the focal length of the lens 1-B1120 in the first optical module 1-B1000 is different from the focal length of the lens in the third optical module 1-B3000.

Furthermore, it should be noted that, the reflecting unit 1-B1200 in the first optical module 1-B1000 and the reflecting unit in the third optical module 1-B3000 can respectively guide the external lights entering the optical system 1-B10 from the first light-entering hole 1-B1001 and the third light-entering hole 1-B3001 to the image sensors in the first and third optical modules 1-B1000 and 1-B3000. In particular, the external light entering the optical system 1-B10 from the first light-entering hole 1-B1001 can be reflected by the reflecting unit 1-B1200 in the first optical module 1-B1000 and move along the –X-axis (the first direction), and another external light entering the optical system 1-B10 from the third light-entering hole 1-B3001 can be reflected by the reflecting unit in the third optical module 1-B3000 and move along the X-axis (the second direction).

The structure of the second optical module 1-B2000 in the optical system 1-B10 is similar to the structure of the first optical module 1-A1000 in the optical system 1-A10, the features thereof are not repeated in the interest of brevity. It should be noted that, the external light entering the second optical module 1-B2000 passes through the second light-entering hole 1-B2001 and reaches the image sensor in the second optical module 1-B2000 along the Z-axis, and the sensing surface of the image sensor in the second optical module 1-B2000 is perpendicular to the Z-axis. On the contrary, the sensing surfaces of the image sensors of the first optical module 1-B1000 and the third optical module 1-B3000 are parallel to the Z-axis.

Owing to the aforementioned structure, the thickness of the first optical module 1-B1000 along the Z-axis and the thickness of the third optical module 1-B3000 along the Z-axis can be reduced, and the first and third optical module 1-B1000 and 1-B3000 can be disposed in the thin electronic device 1-B20, wherein the focal length of the first optical module 1-B1000 and the focal length of the third optical module 1-B3000 is greater than the focal length of the second optical module 1-B2000.

Referring to FIGS. 1-3A and 1-3B, in another embodiment of the disclosure, the reflecting unit 1-B1200 further comprises a first steady member 1-B1270, a second driving module 1-B1280, and a second steady member 1-B1290. The first steady member 1-B1270 comprises at least one spring sheet connected to the frame 1-B1230 and the optical member holder 1-B1220, so that a stabilizing force can be provided to maintain the optical member holder 1-B1220 in an original position relative to the frame 1-B1230. Therefore, even when the first driving module 1-B1260 does not operate (for example, the current does not flow into the first electromagnetic driving assembly 1-B1261), the rotation of the optical member holder 1-B1220 relative to the frame 1-B1230 caused by the shake of the electronic device 1-B20 can still be avoided, and the damage of the optical member 1-B1210 due to the collision can be avoided.

The second driving module 1-B1280 comprises at least one third electromagnetic driving assembly 1-B1281 and at least one fourth electromagnetic driving assembly 1-B1282, respectively disposed on the frame 1-B1230 and the housing 1-B11 of the optical system 1-B10. For example, the third electromagnetic driving assembly 1-B1281 comprises a magnet, and the fourth electromagnetic driving assembly 1-B1282 comprises a driving coil. When current flows through the driving coil (the fourth electromagnetic driving assembly 1-B1282), an electromagnetic effect is generated between the driving coil and the magnet. Thus, the frame 1-B1230, the optical member holder 1-B1220, and the optical member 1-B1210 can be simultaneously driven to rotate relative to the housing 1-B11 around a second rotation axis 1-R2 (extending along the Z-axis), so as to adjust the position of the external light on the image sensor 1-B1300. It should be noted that, in this embodiment, the second rotation axis 1-R2 passes through the center of the reflecting surface of the optical member 1-B1210.

In some embodiments, the third electromagnetic driving assembly 1-B1281 comprises a driving coil, and the fourth electromagnetic driving assembly 1-B1282 comprises a magnet.

As shown in FIG. 1-3B, similar to the first steady member 1-B1270, the second steady member 1-B1290 is connected to the housing 1-B11 and the frame 1-B1230, and a stabilizing force can be provided to maintain the frame 1-B1230 in a predetermined position relative to the housing 1-B11.

In this embodiment the second steady member 1-B1290 is a spring sheet, comprising a first fixing section 1-B1291, a second fixing section 1-B1292, and a plurality of string sections 1-B1293. The first fixing section 1-B1291 and the second fixing section 1-B1292 are respectively affixed to the housing 1-B11 and the frame 1-B1230, and the string sections 1-B1293 are connected to the first fixing section 1-B1291 and the second fixing section 1-B1292. Specifically, the string sections 1-B1293 are arranged in parallel. Each of the string sections 1-B1293 has a bend structure, and the widths of the string sections 1-B1293 are different. In particular, the width of the string section 1-B1293 away from the second rotation axis 1-R2 is greater than the width of the string section 1-B1293 close to the second rotation axis 1-R2, so as to endure the larger deformation volume.

In this embodiment, a first guiding assembly 1-B1232 is disposed on the frame 1-B1230, and a second guiding assembly 1-B12 is disposed on the housing 1-B11. The first guiding assembly 1-B1232 can be a curved slot, and the second guiding assembly 1-B12 can be a slider accommodated in the slot, wherein the center of the curvature of the curved slot is situated on the second rotation axis 1-R2. When the second driving module 1-B1280 drives the optical member holder 1-B1220 to rotate relative to the housing 1-B11, the slider slides along the slot. In this embodiment, a plurality of balls are disposed in the slot, such that the slider can be smoothly slide.

Referring to FIGS. 1-4A and 1-4B, in another embodiment of the disclosure, the second steady member 1-B1290 is a magnetic permeability member, disposed on the housing 1-B11 and corresponding to the third electromagnetic driving assembly 1-B1281 of the second driving module 1-B1280. The third electromagnetic driving assembly 1-B1281 can be a magnet. Thus, the frame 1-B1230 can be maintained in a predetermined position relative to the housing 1-B11 by the magnetic attraction between the second steady member 1-B1290 and the third electromagnetic driving assembly 1-1281. Furthermore, the magnetic permeability member can enhance the electromagnetic effect between the third electromagnetic driving assembly 1-B1281 and the fourth electromagnetic driving assembly 1-B1282, so as to increase the driving force of the second driving module 1-B1280.

The first guiding assembly 1-B1232 disposed on the frame 1-B1230 comprises at least one ball, and the second guiding assembly 1-B12 is a curve slot formed on the housing 1-B11. The ball can be accommodated in the curved slot, and the center of the curvature of the curved slot is situated on the second rotation axis 1-R2. Thus, when the second driving module 1-B1280 drives the optical member holder 1-B1220 to rotate relative to the housing 1-B11, the ball slides along the slot.

Referring to FIGS. 1-5A and 1-5B, in another embodiment of the disclosure, the second steady member 1-B1290 is a flat coil spring connected to the frame 1-B1230 and the housing 1-B11. Furthermore, the first guiding assembly 1-B1232 and the second guiding assembly 1-B12 can be replaced by a second bearing member 1-B1234 and a second hinge 1-B1235. The second bearing member 1-B1234 is disposed on the housing 1-B11, the second hinge 1-B1235 passes through the hole at the center of the second bearing member 1-B1234, and the optical member holder 1-B1220 is affixed to the second hinge 1-B1235.

The second bearing member 1-B1234 is disposed on the second rotation axis 1-R2 and extended along the second rotation axis 1-R2. Therefore, it can ensure that the optical member holder 1-B1220 rotates around the second rotation axis 1-R2 when the second driving module 1-B1280 drives the optical member holder 1-B1220 rotates relative to the housing 1-B11. In some embodiments, the second bearing member 1-B1234 can be disposed on the optical member holder 1-B1220, and an end of the second hinge 1-B1235 is affixed to the housing 1-B11.

Referring to FIGS. 1-6A and 1-6B, in another embodiment of the disclosure, the second steady member 1-B1290 is a torsion spring connected to the frame 1-B1230 and the housing 1-B11, and the first steady member 1-B1270 is a helical spring connected to the frame 1-B1230 and the optical member holder 1-B1220.

Referring to FIGS. 1-7A-1-7C, in another embodiment of the disclosure, an optical system 1-C10 can be disposed in an electronic device 1-C20, and comprise a first optical module 1-C1000, a second optical module 1-C2000, and a third optical module 1-C3000. The structure of the second optical module 1-C2000 is similar to the structure of the first optical module 1-A1000 in the optical system 1-A10, and the first optical module 1-C1000 and the third optical module 1-C3000 can respectively comprise lens units 1-C1100 and 1-C3100 and the image sensors 1-C1300 and 1-C3300, wherein the lens units 1-C1100 and 1-C3100 are the same as the lens unit 1-B1100, and the image sensors 1-C1300 and 1-C3300 are the same as the image sensor 1-B1300. The features thereof are not repeated in the interest of brevity.

A first light-entering hole 1-C1001 of the first optical module 1-C1000 and a third light-entering hole 1-C3001 of the third optical module 1-C3000 can be integrally formed, and adjacent to a second light-entering hole 1-C2001 of the second optical module 1-C2000. A reflecting unit 1-C1200 can be used by the first optical module 1-C1000 and the third optical module 1-C3000, wherein an external light can be reflected to the lens unit 1-C1100 of the first optical module 1-C1000 or the lens unit 1-C3100 of the third optical module 1-C3000 by the reflecting unit 1-C1200.

As shown in FIGS. 1-7D and 1-7E, the reflecting unit 1-C1200 comprises an optical member 1-C1210, an optical member holder 1-C1220, a frame 1-C1230, at least one first bearing member 1-C1240, at least one first hinge 1-C1250, and a first driving module 1-C1260.

The first bearing member 1-C1240 is disposed on the frame 1-C1230, the first hinge 1-C1250 can pass through the hole at the center of the first bearing member 1-C1240, and the optical member holder 1-C1220 can be affixed to the first hinge 1-C1250. Therefore, the optical member holder 1-C1220 can be pivotally connected to the frame 1-C1230 via the first hinge 1-C1250. Since the optical member 1-C1210 is disposed on the optical member holder 1-C1220, when the optical member holder 1-C1220 rotates relative to the frame 1-C1230, the optical member 1-C1210 disposed thereon also rotates relative to the frame 1-C1230. The optical member 1-C1210 can be a prism or a reflecting mirror.

The first driving module 1-C1260 comprises at least one first electromagnetic driving assembly 1-C1261 and at least one second electromagnetic driving assembly 1-C1262, respectively disposed on the frame 1-C1230 and the optical member holder 1-C1220.

For example, the first electromagnetic driving assembly 1-C1261 can comprise a driving coil, and the second electromagnetic driving assembly 1-C1262 can comprise a magnet. When a current flows through the driving coil (the first electromagnetic driving assembly 1-C1261), an electromagnetic effect is generated between the driving coil and the magnet. Thus, the optical member holder 1-C1220 and the optical member 1-C1210 can be driven to rotate relative to the frame 1-C1230 around a first rotation axis 1-R1 (extending along the Y-axis).

It should be noted that, in this embodiment, the first driving module 1-C1260 can drive the optical member holder 1-C1220 and the optical member 1-C1210 to rotate relative to the frame 1-C1230 more than 90 degrees. Therefore, the external light entering the optical system 1-C10 from the first and third light-entering holes 1-C1001 and 1-C3001 can be reflected to the lens unit 1-C1100 of the first optical module 1-C1000 or the lens unit 1-C3100 of the third optical module 1-C-3000 according to the angle of the optical member 1-C-1210.

As shown in FIGS. 1-7B and 1-7C, in this embodiment, the reflecting unit 1-C1200 further comprises a first steady member 1-C1270 comprising two first magnetic members 1-C1271 and a second magnetic member 1-C1272. Two first magnetic members 1-C1271 are respectively disposed on the different surfaces of the optical member holder 1-C1220, and the second magnetic member 1-C1272 is disposed on the housing 1-C11 of the optical system 1-C10 or the frame 1-C1230.

When the optical member 1-C1210 is in a first angle (FIG. 1-7B), one of the first magnetic members 1-C1271 is adjacent to the second magnetic member 1-C1272, and the optical member holder 1-C1220 and the optical member 1-C1210 is affixed relative to the frame 1-C1230, the external light can be reflected by the optical member 1-C1210 and reach the image sensor 1-C1300. When the optical member 1-C1210 is driven by the first driving module 1-C1260 and rotates from the first angle to a second angle (FIG. 1-7C), the other first magnetic member 1-C1271 is adjacent to the second magnetic member 1-C1272, and the optical member holder 1-C1220 and the optical member 1-C1210 is affixed relative to the frame 1-C1230, the external light can be reflected by the optical member 1-C1210 and reach the image sensor 1-C3300.

Referring to FIGS. 1-8A and 1-8B, in another embodiment of the disclosure, the first light-entering hole 1-C1001 and the third light-entering hole 1-C3001 are respectively formed on the opposite surfaces of the optical system 1-C10. The first steady member 1-C1270 comprises a first magnetic member 1-C1271 and two second magnetic members 1-C-1272. The first magnetic member 1-C1271 is disposed on the optical member holder 1-C1220, and the second magnetic members 1-C1272 are disposed on the housing 1-C11 of the optical system 1-C10 or the frame 1-C1230. The optical member holder 1-C1220 and the optical member 1-C1210 is disposed between two second magnetic members 1-C1272.

When the optical member 1-C1210 is in a first angle (FIG. 1-8A), the first magnetic member 1-C1271 is adjacent to one of the second magnetic members 1-C1272, and the optical member holder 1-C1220 and the optical member 1-C1210 is affixed relative to the frame 1-C1230, the external light can be reflected by the optical member 1-C1210 and reach the image sensor 1-C1300. When the optical member 1-C1210 is driven by the first driving module 1-C1260 and rotates from the first angle to a second angle (FIG. 1-8B), the first magnetic member 1-C1271 is adjacent to the other second magnetic member 1-C1272, and the optical member holder 1-C1220 and the optical member 1-C1210 is affixed relative to the frame 1-C1230, the external light can be reflected by the optical member 1-C1210 and reach the image sensor 1-C3300.

Referring to FIGS. 1-9A and 1-9B, in another embodiment of the disclosure, an optical system 1-D10 can be disposed in an electronic device 1-D20, and comprise a first optical module 1-D1000, a second optical module 1-D2000, and a third optical module 1-D3000. The structure of the second optical module 1-D2000 is similar to the structure of the first optical module 1-A1000 in the optical system 1-A10, and the first optical module 1-D1000 and the third optical module 1-D3000 can respectively comprise lens units 1-D1100 and 1-D3100 and the image sensors 1-D1300 and 1-D3300, wherein the lens units 1-D1100 and 1-D3100 are the same as the lens unit 1-B1100, and the image sensors 1-D1300 and 1-D3300 are the same as the image sensor 1-B1300. The features thereof are not repeated in the interest of brevity.

A reflecting unit 1-D1200 can be used by the first optical module 1-D1000 and the third optical module 1-D3000. The reflecting unit 1-D1200 comprises two optical members 1-D1210 and 1-D1220 and an optical member holder 1-D1230. The optical members 1-D1210 and 1-D1220 are disposed on the optical member holder 1-D1230, and respectively corresponds to a first light-entering hole 1-D1001 of the first optical module 1-D1000 and a third light-entering hole 1-D3001 of the third optical module 1-D3000. Therefore, the external light entering the optical system 1-D10 from the first light-entering hole 1-D1001 can be reflected by the optical member 1-D1210 and move along the −X-axis (the first direction), and another external light entering the optical system 1-D10 from the third light-entering hole 1-D3001 can be reflected by the optical member 1-D1220 and move along the X-axis (the second direction).

Referring to FIGS. 1-9A and 1-9B, in this embodiment, the reflecting unit 1-D1200 further comprises a correction driving module 1-D1240, and the optical system 1-D10 further comprises an inertia detecting module 1-D4000. The correction driving module 1-D1240 comprises electromagnetic driving assemblies 1-D1241 and 1-D1242, respectively disposed on the optical member holder 1-D1230 and the case of the reflecting unit 1-D1200. The correction driving module 1-D1240 is used to drive the optical member holder 1-D1230 to rotate. For example, the electromagnetic driving assembly 1-D1241 can be a magnet, and the electromagnetic driving assembly 1-D1242 can be a driving coil. When a current flows through the driving coil (the electromagnetic driving assembly 1-D1242), an electromagnetic effect is generated between the driving coil and the magnet. Thus, the optical member holder 1-D1230 and the optical members 1-D1241 and 1-D1242 disposed thereon can be simultaneously driven to rotate.

The inertia detecting module 1-D4000 can be a gyroscope or an acceleration detector, and electrically connected to the correction driving module 1-D1240. After the inertia detecting module 1-D4000 measures the gravity state or the acceleration state of the optical system 1-D10, it can transmit the measure result to the correction driving module 1-D1240. The correction driving module 1-D1240 can provide a suitable current to the driving assembly 1-D1242 according to the measure result, so as to drive the optical members 1-D1210 and 1-D1220 to rotate.

The refractive indexes of the optical members 1-D1210 and 1-D1220 are greater than the refractive index of the air. In this embodiment, the optical members 1-D1210 and 1-D1220 are prisms. In some embodiments, the optical member 1-D1210 and/or the optical member 1-D1220 are/is reflecting mirror(s).

In some embodiments, the lens unit in the aforementioned embodiments can comprise a zoom lens, and the optical module will become a zoom module. For example, as shown in FIG. 1-10, the lens unit can comprises an objective lens 1-O, an eyepiece lens 1-E, and at least one optical lens 1-S, wherein the optical lens 1-S is disposed between the objective lens 1-O and the eyepiece lens 1-E, and is movable relative to the objective lens 1-O.

In summary, a reflecting unit is provided, including an optical member holder, an optical member, a frame, a first bearing member, a first hinge, and a first driving module. The optical member is disposed on the optical member holder. The first bearing member is disposed on the frame or the optical member holder. The first hinge is pivotally connected to the optical member holder and the frame. The first driving module can drive the optical member holder to rotate relative to the frame. When the optical member holder rotates relative to the frame, the first hinge rotates relative to the optical member holder or the frame via the first bearing member.

Second Group of Embodiments

Referring to FIG. 2-1, in an embodiment of the disclosure, an optical system 2-10 can be disposed in an electronic device 2-20 and used to take photographs or record video. The electronic device 2-20 can be a smartphone or a digital camera, for example. When taking photographs or recording video, the optical system 2-10 can receive light and form an image, wherein the image can be transmitted to a processor (not shown) in the electronic device 2-20, where post-processing of the image can be performed.

Referring to FIG. 2-2, the optical system 2-10 comprises a lens unit 2-1000, a reflecting unit 2-2000, and an image sensor 2-3000, wherein the lens unit 2-1000 is disposed between the reflecting unit 2-2000 and the image sensor 2-3000, and the reflecting unit 2-2000 is disposed beside an opening 2-22 on an case 2-21 of the electronic device 2-20.

The external light 2-L can enter the optical system 2-10 through the opening 2-22 along a first direction (the Z-axis), and be reflected by the reflecting unit 2-2000. The reflected external light 2-L moves along a second direction (the −X-axis), passes through the lens unit 2-1000 and reaches the image sensor 2-3000. In other words, the reflecting unit 2-2000 can change the moving direction of the external light 2-L from the first direction to the second direction.

As shown in FIG. 2-2, the lens unit 2-1000 primarily comprises a lens driving mechanism 2-1100 and a lens 2-1200, wherein the lens driving mechanism 2-1100 is used to drive the lens 2-1200 to move relative to the image sensor 2-3000. For example, the lens driving mechanism 2-1100 can comprise a lens holder 2-1110, a frame 2-1120, two spring sheets 2-1130, at least one coil 2-1140, and at least one magnetic member 2-1150.

The lens 2-1200 is affixed to the lens holder 2-1110. Two spring sheets 2-1130 are connected to the lens holder 2-1110 and the frame 2-1120, and respectively disposed on opposite sides of the lens holder 2-1110. Thus, the lens holder 2-1110 can be movably hung in the frame 2-1120. The coil 2-1140 and the magnetic member 2-1150 are respectively-disposed on the lens holder 2-1110 and the frame 2-1120, and correspond to each other.

When current flows through the coil 2-1140, an electromagnetic effect is generated between the coil 2-1140 and the magnetic member 2-1150, and the lens holder 2-1110 and the lens 2-1200 disposed thereon can be driven to move relative to the image sensor 2-3000, so as to achieve the purpose of auto focus.

FIG. 2-3 is a schematic diagram of the reflecting unit 2-2000 in this embodiment, and FIG. 2-4 is an exploded-view diagram thereof. Referring to FIGS. 2-2-2-4, the reflecting unit 2-2000 primarily comprises an optical member 2-2100 and an optical member driving mechanism 2-2200, wherein the optical member driving mechanism 2-2200 comprises a movable portion 2-2210, a fixed portion 2-2220, a driving module 2-2230, a plurality of elastic members 2-2240, and a plurality of damping members 2-2250.

Referring to FIGS. 2-5 and 2-6, the movable portion 2-2210 comprises an optical member holder 2-2211 and a plurality of spacing members 2-2212. The spacing members 2-2212 are disposed on a surface 2-2213 of the optical member holder 2-2211, and the optical member 2-2100 is disposed on the spacing members 2-2212.

When the optical member 2-2100 is disposed on the spacing members 2-2212, the surface 2-2213 of the optical holder 2-2211 faces the optical member 2-2100, and a gap 2-G can be formed between the optical member 2-2100 and the surface 2-2213 due to the spacing members 2-2212.

Air can be filled in the gap 2-G. Otherwise, the user can fill a resin in the gap 2-G, wherein the refractive index of the aforementioned resin is less than that of the optical member 2-1000. Therefore, the materials on the opposite sides of the reflecting interface of the optical member 2-1000 can be maintained, and the reflectance of the optical member 2-2100 can be effectively enhanced (if the optical member 2-2100 directly contacts the optical member holder 2-2211, the occurrence of the total internal reflection is usually affected due to the surface which is not totally flat).

In this embodiment, the spacing members 2-2212 are symmetrically disposed on the edge of the surface 2-2213 of the optical member holder 2-2211, and the optical member holder 2-2211 and the spacing members 2-2211 are integrally formed in one piece.

The optical member holder 2-2211 can further comprise at least one attaching wall 2-2214 connected to the surface 2-2213, wherein the normal direction of the attaching wall 2-2214 is different from the normal direction of the surface 2-113. At least one groove 2-2215 is formed on the surface of the attaching wall 2-2214 facing the optical member 2-2100, and the groove 2-2215 is extended to a lateral side 2-2216 of the attaching wall 2-2214. After the optical member 22100 is disposed on the spacing members 2-2212, the user can fill an adhesive member 2-2260 (such as glue) into the groove 2-2215. The adhesive member 2-2260 can be spread to the position between the attaching wall 2-2214 and the optical member 2-2100 and contact the optical member 2-2100. Thus, the optical member 2-2100 can be affixed to the optical member holder 2-2211.

In this embodiment, a glue slot 2-2217 and a depression portion 2-2218 are further formed on the surface 2-2213 of the optical member holder 2-2211. The glue slot 2-2217 is adjacent to the attaching wall 2-2214, therefore, the redundant adhesive member 2-2260 can be accommodated in the glue slot 2-2217 and will not enter the position between the optical member 2-2100 and the surface 2-2213. The position of the depression portion 2-2218 is corresponded to the optical member 2-2100, such that the weight of the optical member holder 2-2211 can be reduced without affecting the reflectance.

Furthermore, as shown in FIGS. 2-2 and 2-5, the optical member holder 2-2211 further comprises a abutting surface 2-2219, connected to the surface 2-2213 and facing a cutting surface 2-2110 of the optical member 2-2100. The abutting surface 2-2219 and the cutting surface 2-2110 can be used to position the optical member 2-2100. It should be noted that, the abutting surface 2-2219 is substantially parallel to the cutting surface 2-2110, and is not parallel to the surface 2-2213 and the spacing members 2-2212.

Referring to FIGS. 2-2-2-4, the fixed portion 2-2220 comprises a frame 2-2221, a base 2-2222, a cover 2-2223, a circuit board 2-2224, and at least one toughened component 2-2225. The frame 2-2221 and the base 2-2222 can be joined together, and protrusions 2-P1 and 2-P2 can be respectively formed on the frame 2-2221 and the base 2-2222. The cover 2-2223 has a plurality of holes 2-O corresponding to the protrusions 2-P1 and 2-P2. Therefore, the frame 2-2221 and the base 2-2222 can be affixed to each other by passing the protrusions 2-P1 and 2-P2 through the holes 2-O.

In this embodiment, the fixed portion 2-2220 further comprises a plurality of (at least three) extending portions 2-2226 protruding from a lateral surface 2-2227 of the frame 2-2221. Each of the extending portions 2-2226 has a contacting surface **2-2226*a*. The contacting surfaces 2-2226*a* of the extending portions 2-2226** are coplanar.

When the reflecting unit 2-2000 is assembled in the optical system 2-10, the lateral surface 2-2227 of the fixed portion 2-2220 faces the lens unit 2-1000, and the contacting surfaces **2-2226*a* contact the lens unit 2-1000 (FIG. 2-2). Since the contacting surfaces 2-2226*a* are coplanar, the reflecting unit 2-2000 can be prevented from skewing relative to the lens unit 2-1000 when assembling, and the deviation of the moving direction of the external light 2**-L can be avoided.

The circuit board 2-2224 is disposed on the base 2-2222, and electrically connected to the driving module 2-2230. The toughened component 2-2225 is disposed on the circuit board 2-2224, so as to protect the circuit board 2-2224 from impacting by other members. In other words, the circuit board 2-2224 is disposed between the toughened component 2-2225 and the driving module 2-2230, and covered by the toughened component 2-2225.

In some embodiments, the toughened component 2-2225 can be omitted, and the cover 2-2223 of the fixed portion 2-2220 can be extended to the position below the circuit board 2-2224. The circuit board 2-2224 can be disposed between the base 2-2222 and the cover 2-2223.

As shown in FIGS. 2-2-2-4, the driving module 2-2230 can comprise at least one first electromagnetic driving assembly 2-2231 and at least one second electromagnetic driving assembly 2-2232, respectively disposed on the optical member holder 2-2211 and the circuit board 2-2224. The second electromagnetic driving assembly 2-2232 can pass through a hole 2-2228 of the base 2-2222 and correspond to the first electromagnetic driving assembly 2-2231.

The optical member holder 2-2211 and the optical member 2-2100 can be driven by an electromagnetic effect between the first electromagnetic driving assembly 2-2231 and the second electromagnetic driving assembly 2-2232 to rotate relative to the fixed portion 2-2220. For example, in this embodiment, the first electromagnetic driving assembly 2-2231 can be a driving coil, and the second electromagnetic driving assembly 2-2232 can comprise at least one magnet.

When a current flows through the driving coil (the first electromagnetic driving assembly 2-2231), an electromagnetic effect is generated between the driving coil and the magnet. Thus, the optical member holder 2-2211 and the optical member 2-2100 can be driven to rotate relative to the fixed portion 2-2220 around a rotation axis 2-R (extending along the Y-axis), so as to finely adjust the position of the light 2-L on the image sensor 2-3000.

In some embodiments, the first electromagnetic driving assembly 2-2231 can be a magnet, and the second electromagnetic driving assembly 2-2232 can be a driving coil.

Referring to FIGS. 2-4 and 2-7, the elastic members 2-2240 are connected to the movable portion 2-2210 and the fixed portion 2-2220, so as to hang the movable portion 2-2210 on the fixed portion 2-2220. In particular, each of the elastic members 2-2240 comprises a first fixing section 2-2241, a second fixing section 2-2242, and one or more string sections 2-2243. The first fixing section 2-2241 is affixed to the fixed portion 2-2220, the second fixing section 2-2242 is affixed to the movable portion 2-2210, and the string sections 2-2243 are connected to the first fixing section 2-2241 and the second fixing section 2-2242.

At least one positioning pillar 2-T1 is formed on the optical member holder 2-2211, and at least one positioning recess 2-T2 corresponding to the positioning pillar 2-T1 is formed on the second fixing section 2-2242. When the elastic member 2-2240 is connected to the movable portion 2-2210 and the fixed portion 2-2220, the positioning pillar 2-T1 enters the positioning recess 2-T2. The user can use a glue to stick the positioning pillar 2-T1 and the second fixing section 2-2242, so as to affix the second fixing portion 2-2242 to the movable portion 2-2210.

Referring to FIGS. 2-8 and 2-9, when the frame 2-2221 and the base 2-2222 of the fixed portion 2-2220 are joined, at least a portion of the first fixing section 2-2241 is clamped between the frame 2-2221 and the base 2-2222. Therefore, the first fixing section 2-2241 can be affixed to the fixed portion 2-2220.

It should be noted that, in this embodiment, the second fixing sections 2-2242 of the elastic members 2-2240 disposed on the movable portion 2-2210 are coplanar, so as to apply an uniform elastic force on the optical member holder 2-2211. Furthermore, as seen from the rotation axis 2-R, at least a portion of the optical member 2-2100 and each of the elastic members 2-2230 overlap (as shown in FIG. 2-9).

As shown in FIG. 2-7, in this embodiment, some damping members 2-2250 are connected to the optical member holder 2-2211 and the fixed portion 2-2220, and some damping members 2-2250 are connected to the first fixing section 2-2241 and the string section 2-2243. These damping members 2-2250 can reduce the vibration when the driving module 2-2230 drives the optical member holder 2-2211 to rotate relative to the fixed portion 2-2220.

It should be note that, the damping members 2-2250 are disposed on the positions away from the rotation axis 2-R, and the center of the optical member holder 2-2211 is situated between the damping members 2-2250 which connected the same members. For example, the damping members 2-2250 are adjacent to the corners of the surface 2-2213 of the optical member holder 2-2211, and the center of the optical member holder 2-2211 is situated between two damping members 2-2250 connected the optical member holder 2-2211 and the fixed portion 2-2220 (and/or situated between two damping members 2-2250 connected to the first fixing section 2-2241 and the string section 2-2243). Therefore, the deviation of the optical member holder 2-2211 when the driving module 2-2230 drives the optical member holder 2-2211 to rotate can be avoided.

In some embodiments, the reflecting unit 2-2000 also comprises the damping members 2-2250 connected to the second fixing section 2-2242 and the string section 2-2243.

Referring to FIG. 2-2, 2-5, and 2-10, in this embodiment, the optical member holder 2-2211 can further comprise at least one rotation restricting structure 2-B1 and at least one shift restricting structure 1-B2, respectively used to restrict the rotation angle and the shifting range of the optical member holder 2-2211.

In particular, the rotation restricting structures 2-B1 can protrude from the first electromagnetic driving assembly 2-2231, and the shift restricting structure 2-B2 can be disposed on the opposite sides of the optical member 2-2100 along the rotation axis 2-R. When the optical member holder 2-2211 rotates relative to the fixed portion 2-2220 to a predetermined angle, the rotation restriction structures 2-B1 contact the fixed portion 2-2220, a gap is formed between the first electromagnetic driving assembly 2-2231 and the second electromagnetic driving assembly 2-2232, and other gap is formed between the shift restricting structures 2-B2 and the fixed portion 2-2220.

When the optical member holder 2-2211 shifts relative to the fixed portion 2-2220 to a predetermined position, the shift restriction structures 2-B2 contact the fixed portion 2-2220, and a gap is formed between the rotation restriction structures 2-B1 and the fixed portion 2-2220.

Owing to the aforementioned structure, the moving range of the optical member holder 2-2211 can be restricted. Damage to the optical member 2-2100 and the driving module 2-2230 due to collision can be avoided, and the dust caused by friction between the members can also be reduced.

In some embodiments, the rotation restricting structure 2-B1 can be formed on the shift restricting structure 2-B2. The rotation restricting structure 2-B1 and the shift restricting structure 2-B2 can be integrally formed in one piece. In other words, in some embodiments, the rotation restricting structure 2-B1 can be used to restrict the shift range of the optical member holder 2-2211.

Furthermore, in this embodiment, the light-entering surface 2-2120 of the optical member 2-2100 is disposed between the an outer surface 2-2229 of the fixed portion 2-2220 and the optical member holder 2-2211, and the light-entering surface 2-2120 does not protrude from the outer surface 2-2229 during the optical member holder 2-221 moves relative to the fixed portion 2-2229. Therefore, some foreign object falling on the reflecting unit 2-2000 can be blocked by the fixed portion 2-2220 and do not contact the optical member 2-2100 directly.

The aforementioned reflecting unit 2-2000 can be also applied on the reflecting unit 1-B1200, 1-C1200, 1-D1200, or 12-1200 in embodiments of the disclosure.

In summary, an optical member driving mechanism is provided, including a fixed portion, a movable portion, and a driving module, wherein the movable portion is movably connected to the fixed portion and includes an optical member holder and a spacing member. The optical member holder can support an optical member and has a surface facing the optical member. The optical member can change the moving direction of an external light. The spacing member is disposed between the surface and the optical member, and a gap is formed between the surface and the optical member. The driving module can drive the movable portion to move relative to the fixed portion.

Third Group of Embodiments

Please refer to FIG. 3-1, which is a schematic diagram of a camera system 3-100 according to an embodiment of the present disclosure. The camera system 3-100 of the present disclosure can be installed in various electronic devices or portable electronic devices, for example, on a smart phone or a tablet computer, for the user to perform the function of capturing images. In this embodiment, the camera system 3-100 can be disposed on various transportation vehicles, such as a car. The camera system 3-100 may be a camera system with a fixed focal length, but it is not limited thereto. In other embodiments, the camera system may also be a voice coil motor (VCM) with an auto focus (AF) function.

As shown in FIG. 3-1, the camera system 3-100 includes a lens module 3-108, a fixed frame 3-112, and a photosensitive module 3-115. The lens module 3-108 is disposed on the photosensitive module 3-115 and is connected to the fixed frame 3-112 by a connecting member 3-116. As shown in FIG. 3-1, the lens module 3-108 includes a lens barrel 3-108H and one or more optical elements. The lens barrel 3-108H may be made of a material with a thermal expansion coefficient less than 50 ($10^{-6}$/K @20° C.), which means that the thermal expansion coefficient of the lens barrel 3-108H at 20° C. is less than 50 ($10^{-6}$/K). For example, the lens barrel 3-108H is made of a metal material, such as Kovar, which has better thermal conductivity and a lower thermal expansion coefficient, so that when the temperature of the external environment is high (such as 60° C.), the camera system 3-100 and the external environment can quickly enter the thermal equilibrium state, thereby solving the problem of the image quality affected by temperature variation.

Furthermore, the lens barrel 3-108H is for accommodating the optical elements (for example, a first lens 3-LS1, a second lens 3-LS2, a third lens 3-LS3, a fourth lens 3-LS4 and a fifth lens 3-LS5), and the lens module 3-108 defines an optical axis 3-O. Specifically, the first lens 3-LS1 to the fifth lens 3-LS5 are arranged along the optical axis 3-O. For example, the second lens 3-LS2 is disposed between the first lens 3-LS1 and the photosensitive module 3-115.

In this embodiment, the aforementioned lenses may be made of a glass material and have a low thermal expansion coefficient, such as 7.1 ($10^{-6}$/K @20° C.). In addition, the lens module 3-108 may have at least one spacer 3-SP disposed between the first lens 3-LS1 and the second lens 3-LS2, and the thermal expansion coefficient of the spacer 3-SP is less than 50 ($10^{-6}$/K @20° C.). For example, the spacer 3-SP may be made of a metal material, such as Kovar. Because the spacer 3-SP has a low coefficient of thermal expansion, when the camera system 3-100 is heated, influence to a spacing between adjacent two lenses due to the thermal expansion of the spacer 3-SP can reduce.

In addition, the camera system 3-100 may further include a first airtight adhesive component 3-117 disposed on the lens barrel 3-108H, and the first airtight adhesive component 3-117 surrounds the first lens 3-LS1. Therefore, the first airtight adhesive component 3-117 can effectively prevent the air of the external environment from entering the gap between the first lens 3-LS1 and the lens barrel 3-108H, to increase the airtightness of the lens barrel 3-108H.

In this embodiment, the camera system 3-100 may further include a filter 3-FL disposed between the lens module 3-108 and the photosensitive module 3-115, and the filter 3-FL is configured to filter the light entering the lens module 3-108. In this embodiment, the filter 3-FL may be an infrared light filter, but it is not limited thereto. In addition, the filter 3-FL can be made of a glass material.

As shown in FIG. 3-1, the photosensitive module 3-115 can include a base 3-1151 and a photosensitive element 3-1153. The photosensitive element 3-1153 is disposed on the base 3-1151, and the photosensitive element 3-1153 corresponds the lens module 3-108. External light can travel along a direction 3-A1 from a light incident side (the left side of the first lens 3-LS1) to the lens module 3-108, and the external light is received by the photosensitive module 3-115 after passing through the plurality of lenses, so as to generate a digital image signal. In this embodiment, the base 3-1151 may be made of, for example, a ceramic material, and the photosensitive element 3-1153 may be made of, for example, silicon.

As shown in FIG. 3-1, the lens module 3-108 and the photosensitive module 3-115 are disposed on the fixed frame 3-112. Specifically, the fixed frame 3-112 includes a bottom portion 3-1121 and a side wall 3-1123. The fixed frame 3-112 can form an accommodating space 3-AS for accommodating the photosensitive module 3-115. Furthermore, the fixed frame 3-112 further includes a first surface 3-1125 located on the side wall 3-1123. The first surface 3-1125 faces the light incident side, and the lens module 3-108 is disposed on the first surface 3-1125 by the connecting member 3-116. Specifically, the lens barrel 3-108H has a third surface 3-1081, and the connecting member 3-116 is configured to connect the third surface 3-1081 and the first surface 3-1125. The connecting member 3-116 may be solder or glue, but it is not limited thereto. It should be noted that the connecting member 3-116 may surround an opening 3-1120 formed by the side wall 3-1123.

In this embodiment, the camera system 3-100 may further include a second airtight adhesive component 3-119 disposed between the first surface 3-1125 and the third surface 3-1081 of the lens module 3-108. The second airtight adhesive component 3-119 may be a glass frit, but it is not limited thereto. The second airtight adhesive component 3-119 may also surround the opening 3-120 formed by the side wall 3-1123.

By providing the connecting member 3-116 and the second airtight adhesive component 3-119, an enclosed space 3-ES can be formed between the fixed frame 3-112, the photosensitive module 3-115 and the lens module 3-108, and the enclosed space 3-ES includes the accommodating space 3-AS. The enclosed space 3-ES is isolated from the external environment outside of the camera system 3-100. Therefore, it can prevent foreign objects (for example, dust in the air) from entering the camera system 3-100 and affecting the image quality. In addition, based on the configuration of the enclosed space 3-ES, the influence of the thermal convection of the external environment to the camera system 3-100 can also be reduced.

Furthermore, by providing the connecting member 3-116 and the second airtight adhesive component 3-119, the overall mechanical strength of the camera system 3-100 can be increased, and the overall sealing effect can also be increased. In this embodiment, the connecting member 3-116 is closer to the optical axis 3-O of the lens module 3-108 than the second airtight adhesive component 3-119. Based on this configuration, the manufacturing process of the camera system 3-100 can be more convenient.

In addition, the fixed frame 3-112 further includes a second surface 3-1126, and the second surface 3-1126 and the first surface 3-1125 are located on different planes. In addition, in this embodiment, the photosensitive module 3-115 is fixed to the second surface 3-1126 of the bottom portion 3-1121 by glue 3-GU.

It should be noted that the side wall 3-1123 may be made of a material with a thermal expansion coefficient less than 50 ($10^{-6}$/K @20° C.). For example, the side wall 3-1123 is made of a metal material. Because the side wall 3-1123 is made of a metal material, it has better thermal conductivity and a lower thermal expansion coefficient, so that the camera system 3-100 and the external environment may quickly enter the thermal equilibrium state, thereby preventing the problem of the image quality affected by temperature variation.

Please refer to FIG. 3-1 and FIG. 3-2. FIG. 3-2 is a diagram of the lens module 3-108 and the photosensitive element 3-1153 of the photosensitive module 3-115 in FIG. 3-1 of the present disclosure. When the camera system 3-100 is not heated (for example, 25° C.), a focus plane of the lens module 3-108 may be located on a position 3-P1 in FIG. 3-2, that is, on the photosensitive element 3-1153 of the photosensitive module 3-115. However, when the temperature of the lens module 3-108 rises, the focus plane of the lens module 3-108 may move to the rear of the photosensitive element 3-1153 to a position 3-P2. At this time, the image generated by the photosensitive module 3-115 may blur.

In order to solve the above problems, the connecting member 3-116 and the side wall 3-1123 of the present disclosure may be designed to have different thermal expansion coefficients. For example, the thermal expansion coefficient of the connecting member 3-116 is greater than the thermal expansion coefficient of the side wall 3-1123. When the temperature of the camera system 3-100 rises, the expansion length of the connecting member 3-116 along the optical axis 3-O is greater than the expansion length of the side wall 3-1123 along the optical axis 3-O. That is, the variation of a distance between the first surface 3-1125 and the third surface 3-1081 is greater than the variation of a distance between first surface 3-1125 and the second surface 3-1126. Therefore, the focus plane on the position 3-P2 can be moved toward the lens module 3-108 along a direction 3-A2 and can be returned to the photosensitive element 3-1153 of the photosensitive module 3-115, so that the photosensitive module 3-115 can generate a clear image. It should be noted that the thermal expansion coefficients of the connecting member 3-116 and the side wall 3-1123 can be adjusted to suit actual needs.

Please refer to FIG. 3-3, which is a schematic diagram of a camera system 3-200 according to another embodiment of the present disclosure. The camera system 3-200 is similar to the aforementioned camera system 3-100, and the difference between them is that the connecting member 3-116 in this embodiment is farther away from the optical axis 3-O of the lens module 3-108 than the second airtight adhesive component 3-119. This configuration can avoid contamination of the photosensitive module 3-115 when the connecting member 3-116 is provided.

Next, please refer to FIG. 3-4, which is a schematic diagram of a camera system 3-300 according to another embodiment of the present disclosure. The camera system 3-300 is similar to the aforementioned camera system 3-100, and the difference between them is that the first lens 3-LS1 and the second lens 3-LS2 in this embodiment can be made of different materials. For example, the first lens 3-LS1 may be made of glass, and the second lens 3-LS2 may be made of a plastic material. A thermal expansion coefficient of the first lens 3-LS1 is lower than a thermal expansion coefficient of the second lens 3-LS2.

Because the thermal expansion coefficient of the first lens 3-LS1 is low, the problem of the gap between the first lens 3-LS1 and the lens barrel 3-108H due to thermal expansion can be solved, thereby improving airtightness of the lens module 3-108. In addition, in this embodiment, the hardness of the first lens 3-LS1 is greater than that of the second lens 3-LS2, so that the first lens 3-LS1 at the outer side can protect the second lens 3-LS2 at the inner side.

Next, please refer to FIG. 3-5, and FIG. 3-5 is a schematic diagram of a camera system 3-400 according to another embodiment of the present disclosure. The camera system 3-400 is similar to the camera system 3-100 described above, and the difference between them is that a lens module 3-108A in this embodiment further includes a driving assembly 3-DA, a holder 3-109 and a transparent protective cover 3-120. The lens barrel 3-108H is movably disposed in the holder 3-109. For example, the lens barrel 3-108H is suspended within the holder 3-109 by two elastic members (not shown).

The driving assembly 3-DA includes two magnets 3-MG and two coils 3-CL, the coils 3-CL are disposed on opposite sides of the lens barrel 3-108H, and the magnets 3-MG corresponding to the coils 3-CL are disposed on the holder 3-109. When the coils 3-CL are provided with electricity, the coils 3-CL may act with the magnets 3-MG to generate an electromagnetic force, so as to drive the lens barrel 3-108H with the lenses to move relative to the photosensitive module 3-115 along the optical axis 3-O, so that the autofocus function of the camera system 3-400 can be achieved.

Furthermore, as shown in FIG. 3-5, in this embodiment, the camera system 3-400 further includes a third airtight adhesive component 3-121 which is disposed between the transparent protective cover 3-120 and the holder 3-109 (with the drive assembly 3-DA), and the third airtight adhesive component 3-121 surrounds the lens barrel 3-108H. Based on the configuration of the third airtight adhesive component 3-121 and the second airtight adhesive component 3-119, an enclosed space 3-ES can be formed between the transparent protective cover 3-120, the holder 3-109, the driving assembly 3-DA, the fixed frame 3-112 and the photosensitive module 3-115, and the enclosed space 3-ES is isolated from the external environment outside of the camera system 3-400.

Based on the arrangement of the enclosed space 3-ES, the influence of the thermal convection of the external environment to the camera system 3-400 can also be reduced. In addition, the transparent protective cover 3-120 can also protect the first lens 3-LS1, so as to prevent the first lens 3-LS1 from being scratched.

It should be noted that any of the foregoing camera systems may also be applied to the optical modules 1-A1000, 1-A2000, 1-A3000, 1-B2000, 1-C2000, 1-D2000, 12-2000 of the present disclosure.

The present disclosure provides camera systems that can be disposed on various transportation vehicles. Several components in the camera system can be made of materials with thermal expansion coefficients less than 50 ($10^{-6}$/K @20° C.). For example, the lenses can be made of glass, the spacer, the lens barrel and the fixed frame can be made of Kovar, and the base can be made, for example, of a ceramic material. In contrast to the conventional camera system, because the thermal expansion coefficients of the components in the camera system of the present disclosure are similar, when the camera system is in a high-temperature external environment, the thermal expansion of each component changes little, thereby improving stability of the camera system to change of temperature.

Fourth Group of Embodiments

Refer to FIG. 4-1, wherein FIG. 4-1 is a perspective view illustrating an optical member driving mechanism 4-1 in accordance with an embodiment of the present disclosure. It should be noted that, in this embodiment, the optical member driving mechanism 4-1 may be disposed in the electronic devices (not shown) with camera function for driving an optical member 4-40, and can perform an autofocus (AF) and/or optical image stabilization (OIS) function.

Refer to FIG. 4-2, wherein FIG. 4-2 is an exploded view illustrating the optical member driving mechanism 4-1 shown in FIG. 4-1. In the present embodiment, the optical member driving mechanism 4-1 has a substantial rectangular structure. The optical member driving mechanism 4-1 mainly includes a fixed portion 4-F, a movable portion 4-M, a plurality of first elastic members 4-71, a plurality of second elastic members 4-72, a first driving assembly 4-61, and a second driving assembly 4-62. The fixed portion 4-F includes a housing 4-10, a base 4-20, a frame 4-50, and a circuit component 4-80. The housing 4-10 has a hollow structure, which includes a top surface 4-11, four sidewalls 4-12, wherein the housing 4-10 and the base 4-20 may be assembled as a hollow case for containing interior members of the optical member driving mechanism 4-1. The frame 4-50 is disposed in the housing 4-10, and affixed to the housing 4-10. The circuit component 4-80 is disposed on the base 4-20 for transmitting electric signals, performing function of autofocus and/or optical image stabilization. For example, the optical member driving mechanism 4-1 may control the position of the optical member 4-40 in order to perform camera function.

The movable portion 4-M is movably connected to the fixed portion 4-F. The movable portion 4-M mainly includes a carrier 4-30, and the carrier 4-30 carries the optical member 4-40. As shown in FIG. 4-2, the carrier 4-30 is movably connected to the housing 4-10 and the base 4-20. The first elastic members 4-71 extend in a first direction (Z-axis), and are elastically connected to the base 4-20 and the carrier 4-30, wherein the first direction is perpendicular to the optical axis 4-0. In addition, the second elastic members 4-72 are disposed on the carrier 4-30, and connected to the first elastic members 4-71 and the carrier 4-30. In other words, the carrier 4-30 may be connected to the base 4-20 via the first elastic members 4-71 and the second elastic members 4-72, and the first elastic members 4-71 and the second elastic members 4-72 are metallic materials.

The first driving assembly 4-61 may include a first magnetic member 4-61A and a corresponding first driving coil 4-61B. The first magnetic member 4-61A is disposed on the frame 4-50, and the first driving coil 4-61B is disposed on the carrier 4-30. When a current is applied to the first driving coil 4-61B, an electromagnetic driving force may be generated by the first driving coil 4-61B and the first magnetic member 4-61A (namely, the first driving assembly 4-61) to drive the carrier 4-30 and the optical member 4-40 to move along the first direction (Z-axis) relative to the base 4-20. Therefore, the autofocus or optical image stabilization function is performed.

In addition, the second driving assembly 4-62 may include a second magnetic member 4-62A and a corresponding second driving coil 4-62B. The second magnetic member 4-62A is disposed on the carrier 4-30, and the second driving coil 4-62B is disposed on the base 4-20. When a current is applied to the second driving coil 4-62B, an electromagnetic driving force may be generated by the second driving assembly 4-62 to drive the carrier 4-30 and the optical member 4-40 to move along the optical axis (X-axis) relative to the base 4-20. Therefore, the autofocus function is performed. The carrier 4-30 may be movably suspended between the frame 4-50 and the base 4-20 by the electromagnetic driving forces of the first driving assembly 4-61, the second driving assembly 4-62, and the forces of the first elastic members 4-71, the second elastic members 4-72.

Refer to FIG. 4-3, wherein FIG. 4-3 is a perspective view illustrating the interior of the optical member driving mechanism 4-1 shown in FIG. 4-1. It should be noted that for the sake of clearly illustrating the structure inside the optical member driving mechanism 4-1, the housing 4-10 and the frame 4-50 are not illustrated. In the present embodiment, the first driving coil 4-61B of the first driving assembly 4-61 is connected to the first elastic members 4-71 via the second elastic members 4-72. Therefore, the electrical signals may be transmitted from the circuit component 4-80 to the first driving coil 4-61B via the first elastic members 4-71 for controlling the position of the carrier 4-30 by the first driving assembly 4-61. In the present embodiment, the first driving coil 4-61B is electrically connected to the circuit component 4-80 via the first driving coil 4-61B, and whereby the circuit for electrically connecting the first driving coil 4-61B and the circuit component 4-80 may not be additionally disposed. Therefore, the circuit structure in the optical member driving mechanism 4-1 may be simplified.

FIG. 4-4 is a schematic view illustrating the optical member driving mechanism 4-1 as viewed in a light exit direction 4-$D_0$. As shown in FIG. 4-4, the optical member driving mechanism 4-1 further includes a plurality of damping materials 4-90, which are disposed between the circuit component 4-80 and the carrier 4-30, and located on an imaginary plane parallel to the optical axis 4-0 (namely, the plane parallel to the X-Y plane). For example, the damping materials 4-90 may be gel or any other damping material with buffer effect. By arranging the damping materials 4-90, the oscillating effect of the optical member driving mechanism 4-1 may be reduced. Therefore, after arriving to a predetermined position, the carrier 4-30 may rapidly become stable.

In the present embodiment, the carrier 4-30 further includes a plurality of damping material limiting portions 4-31, which protrude towards the circuit component 4-80, and extend in the first direction (Z-axis). In addition, the damping materials 4-90 are disposed between the damping material limiting portions 4-31 and the circuit component 4-80. By arranging the damping material limiting portions 4-31, the contact area between the damping materials 4-90 and the carrier 4-30 may be increased, enhancing the buffer effect of the damping materials 4-90. Therefore, the carrier 4-30 may become stable more rapidly after moving.

In addition, as viewed in the light exit direction 4-$D_0$, the carrier 4-30 further includes a plurality of first bonding recesses 4-32A, which are disposed in the carrier 4-30 and adjacent to the optical member 4-40. In the present embodiment, the first bonding recesses 4-32A are symmetrically disposed towards the optical member 4-40, wherein the optical axis 4-O is the axis of symmetry. The first bonding recesses 4-32A are arranged along a second direction (Y-axis), wherein the second direction is perpendicular to the first direction (Z-axis) and the optical axis (X-axis). An adhesive (not shown) may be disposed in the first bonding recesses 4-32A in order to bond the optical member 4-40 to the carrier 4-30 stably.

Refer to FIG. 4-5, wherein FIG. 4-5 is a schematic view illustrating the carrier 4-30 as viewed in a light incident direction 4-$D_i$. As shown in FIG. 4-5, as view in the light incident direction 4-$D_i$, the carrier 4-30 further includes a plurality of second bonding recesses 4-32B, which are disposed in the carrier 4-30, and adjacent to the optical member 4-40. In other words, the first bonding recesses 4-32A and the second bonding recesses 4-32B are disposed on opposite sides of the carrier 4-30. In the present embodiment, the second bonding recesses 4-32B are symmetrically disposed towards the optical member 4-40, wherein the optical axis 4-0 is the axis of symmetry. The second bonding recesses 4-32B are also arranged along the second direction (Y-axis). Similarly, an adhesive (not shown) may be disposed in the second bonding recesses 4-32B in order to bond the optical member 4-40 to the carrier 4-30.

In addition, the carrier 4-30 further includes two first sidewalls 4-33A and two second sidewalls 4-33B respectively located on different opposite side of the optical member 4-40. In the present embodiment, the first sidewalls 4-33A are located on left and right sides of the optical member 4-40, and the second sidewalls 4-33B are located on upper and lower sides of the optical member 4-40. The first sidewalls 4-33A are arranged along the second direction (Y-axis), and the second sidewalls 4-33B are arranged along the first direction (Z-axis). A first width 4-W1 of the first sidewalls 4-33A is greater than a second sidewall 4-W2. By the aforementioned design, the structural strength, along the second direction (Y-axis), of the carrier 4-30 may be enhanced, preventing the optical member 4-40 from damage due to collision.

FIG. 4-6 is a cross-sectional view along line 4-B shown in FIG. 4-5. As shown in FIG. 4-6, as viewed along the optical axis 4-O, the first bonding recesses 4-32A and the second bonding recesses 4-32B at least partially overlap, and thereby the optical member 4-40 may be affixed to the carrier 4-30 more stably. In addition, FIG. 4-7 is a cross-sectional view illustrating the carrier 4-30 shown in FIG. 4-6 with the optical member 4-40. In the present embodiment, the carrier 4-30 has a surface 4-34, which faces the optical member 4-40, and is perpendicular to the optical axis 4-0. The optical member 4-40 includes a lens barrel 4-41, and a length L of the optical member 4-40 along the optical axis 4-O is at least greater than 5 mm. Therefore, the lens barrel 4-41 may contain at least five lenses 4-42, such that great optical effect may be achieved.

Refer to FIG. 4-8A, wherein FIG. 4-8A is a perspective view illustrating the separated carrier 4-30 and base 4-20 in accordance with one embodiment of the present disclosure. As shown in FIG. 4-8A, the carrier 4-30 further includes a first direction stopping portion 4-35A, a second direction stopping portion 4-35B, and a third direction stopping portion 4-35C, which are disposed on the first sidewalls for limiting the moving range of the movable portion 4-M (including the carrier 4-30). For example, the first direction stopping portion 4-35A is disposed on a surface, which is perpendicular to the first direction (Z-axis), of the carrier 4-30 (namely, protruding from an X-Y plane of the carrier 4-30) for limiting the moving range of the movable portion 4-M in the first direction. The second direction stopping portion 4-35B is disposed on a surface, which is perpendicular to the second direction (Y-axis), of the carrier 4-30 (namely, protruding from a Z-X plane of the carrier 4-30) for limiting the moving range of the movable portion 4-M in the second direction. The third direction stopping portion 4-35C is disposed on a surface, which is perpendicular to the optical axis 4-0, of the carrier 4-30 (namely, protruding from a Y-Z plane of the carrier 4-30) for limiting the moving range of the movable portion 4-M in the optical axis 4-O.

As viewed along the second direction (Y-axis), the third direction stopping portion 4-35C and the first elastic members 4-71 may partially overlap. In addition, the first elastic members 4-71 are located between the optical member 4-40 and the second direction stopping portion 4-35B, or between the optical member 4-40 and the third direction stopping portion 4-35C. By the aforementioned design, the size, in a horizontal direction (X-Y plane), of the optical member driving mechanism 4-1 may be effectively reduced, and thereby when the carrier 4-30 moves, the carrier 4-30 may be prevented from colliding with the circuit component 4-80, which is disposed on the base 4-20.

FIG. 4-8B is a plane view illustrating the carrier 4-30 and the base 4-20 shown in FIG. 4-8A. The first driving coil 4-61B of the first driving assembly 4-61 is disposed around the first direction stopping portion 4-35A, which is located on the carrier 4-30. The second driving coil 4-62B of the second driving assembly 4-62 is disposed around the first direction stopping portion 4-35A, which is located on the base 4-20. It should be noted that a height of the first direction stopping portion 4-35A along the first direction (Z-axis) is greater than a height of the first driving coil 4-61B and/or the second driving coil 4-62B along the first direction. Therefore, the first driving coil 4-61B and/or the second driving coil 4-62B may be prevented from damage due to the collision with the movable portion 4-M.

FIG. 4-9 is a cross-sectional view along line 4-A shown in FIG. 4-1. As shown in FIG. 4-9, the circuit component 4-80 is disposed on the base 4-20, wherein as viewed along the second direction (Y-axis), which is perpendicular to the first direction (Z-axis), the optical axis 4-O, the circuit component 4-80 and the carrier 4-30 partially overlap. Therefore, the size of optical member driving mechanism 4-1 may be reduced in Z-axis, making it easier to arrange the optical member driving mechanism 4-1 in thin electronic devices.

Refer to FIGS. 4-10A and 4-10B, wherein FIG. 4-10A is a schematic view illustrating the optical member driving mechanism 4-1 shown in FIG. 4-1 as viewed in the light incident direction 4-$D_i$, and FIG. 4-10B is a schematic view illustrating the optical member driving mechanism 4-1 shown in FIG. 4-1 as viewed in the light exit direction 4-$D_0$. As shown in FIGS. 4-10A and 4-10B, the housing 10 has four sidewalls 4-12, a first opening 4-$T_1$, and a second opening 4-$T_2$. The first opening 4-$T_1$ and the second opening 4-$T_2$ are respectively disposed on different sidewalls 4-12 of the housing 4-10. The first opening 4-$T_1$ is closer to the light incident direction 4-$D_i$ of the optical member 4-40 than second opening 4-$T_2$, and the second opening 4-$T_2$ is near the image sensing member (not shown) disposed out of the optical member driving mechanism 4-1. The optical axis 4-O may pass through the first opening 4-$T_1$ and the second opening 4-$T_2$. The second opening 4-$T_2$ is formed by the frame 4-50, the housing 4-10, and the base 4-20. Therefore, the first opening 4-$T_1$ may be greater than the second opening 4-$T_2$. By arranging for the second opening 4-$T_2$ to be smaller, the light incident to the optical member driving mechanism 4-1 may be concentrated on the image sensing member, increasing the image quality.

As set forth above, the present disclosure provides an optical member driving mechanism with an elastic member electrically connected to a driving assembly. By arranging for the elastic member to be a portion of the circuit, the circuit structure of the optical member driving mechanism may be simplified. In addition, the optical member driving mechanism 4-1 may also be applied to the lens unit of the optical modules 1-B1000, 1-B3000, 1-C1000, 1-C3000, 1-D1000, 1-D3000, and 12-1000 in the present disclosure.

Fifth Group of Embodiments

FIG. 5-1 is a perspective view of a lens unit 5-1 in accordance with some embodiments of this disclosure. FIG. 5-2A is an exploded view of the lens unit 5-1 in FIG. 5-1. The lens unit 5-1 has a central axis 5-M. The lens unit 5-1 includes a fixed portion 5-P1, a movable portion 5-P2, and a first driving assembly 5-90, wherein the movable portion 5-P2 is movably connected to the fixed portion 5-P1, and holds a lens 5-2 with an optical axis 5-O. The central axis 5-M of the lens unit 5-1 is not parallel to the optical axis 5-O of the lens 5-2. The first driving assembly 5-90 connects the fixed portion 5-P1 and the movable portion 5-P2, and drives the movable portion 5-P2 to move relative to the fixed portion 5-P1.

As shown in FIG. 5-2A, in this embodiment, the fixed portion 5-P1 includes an outer frame 5-10 and a bottom 5-100. The movable portion 5-P2 includes a housing 5-20, a framework 5-30, a second driving assembly 5-40, four leaf springs 5-55, a holder 5-50, four elastic elements 5-60, two position sensing elements 5-70, and a base 5-80. The first driving assembly 5-90 includes a body 5-92 and four biasing elements 5-91 made of a shape memory alloy (SMA). It is noted that the elements of the lens unit 5-1 may be added or removed depending on users' needs.

The outer frame 5-10 is located above the bottom 5-100, and may be combined with the bottom 5-100. The methods for combining the outer frame 5-10 and the bottom 5-100 may be rivet joint, engagement or welding, etc. The movable portion 5-P2 and the first driving assembly 5-90 are accommodated in a space formed by the combination of the outer frame 5-10 and the bottom 5-100. Additionally, the outer frame 5-10 and the bottom 5-100 are arranged along the central axis 5-M of the lens unit 5-1.

The outer frame 5-10 includes a first side wall 5-11 and a second side wall 5-13 parallel to the central axis 5-M. A first perforation 5-12 is formed on the first side wall 5-11, and a second perforation 5-14 is formed on the second side wall 5-13. The positions of the first perforation 5-12 and the second perforation 5-14 correspond to the lens 5-2. As shown in FIG. 5-1, the movable portion 5-P2 is located between the first side wall 5-11 and the second side wall 5-13.

The housing 5-20 is located under the outer frame 5-10, made of a metal material, and is fixedly connected to the base 5-80. A top surface 5-25 of the housing 5-20 is perpendicular to the central axis 5-M, and two openings 5-21 are formed on the housing 5-20. Additionally, the positions of the openings 5-21 correspond to the lens 5-2.

The framework 5-30 is under the housing 5-20, and two openings 5-31 are formed on the framework 5-30.

The second driving assembly 5-40 drives the holder 5-50 to move relative to the base 5-80. The second driving assembly 5-40 includes two X-axis magnets 5-41, two X-axis coils 5-42, four Z-axis magnets 5-43, and four Z-axis coils 5-44. The two X-axis magnets 5-41 may be accommodated in the openings 5-31 of the frame 5-30.

The two X-axis magnets 5-41 may be permanent magnets with bar structures, and correspond to the two X-axis coils 5-42. The X-axis coils 5-42 have substantially elliptical structures, and the winding axes of the X-axis coils 5-42 are substantially perpendicular to the optical axis 5-O. The X-axis magnets 5-41 and the X-axis coils 5-42 are arranged adjacent to the holder 5-50 and are disposed above the holder 5-50.

Please refer to FIG. 5-2B. FIG. 5-2B is a schematic view of the X-axis magnets 5-41 and the corresponding X-axis coils 5-42 of the second driving assembly. As shown in FIG. 5-2B, the X-axis magnets 5-41 is a multi-pole magnet, having two pairs of magnetic pole, and the arrangement direction of the magnetic poles of the X-axis magnets 5-41 is substantially perpendicular to the optical axis 5-O. Additionally, the opposite magnetic poles are adjacent to each other, and the X-axis coils 5-42 directly face to the magnetic poles of the X-axis magnets 5-41. When a current is supplied to the X-axis coils 5-42, an attractive magnetic force or a repulsive magnetic force is generated between the X-axis magnets 5-41 and the X-axis coils 5-42 to drive the holder 5-50 and the lens 5-2 inside the holder 5-50 to move along a direction indicated by the arrows 5-E and 5-F, that is perpendicular to the optical axis 5-O (X-axis), thereby achieving the optical image stabilization function.

Similarly, the four Z-axis magnets 5-43 may be permanent magnets with bar structures, and correspond to the four Z-axis coils 5-44. The Z-axis coils 5-44 have substantially elliptical structures, and the winding axes of the Z-axis coils 5-44 are substantially perpendicular to the optical axis 5-O. The Z-axis magnets 5-43 and the Z-axis coils 5-44 are arranged adjacent to the holder 5-50 and are disposed below the holder 5-50.

The arrangement of the Z-axis magnets 5-43 and the Z-axis coils 5-44 is similar to that of the X-axis magnets 5-41 and X-axis coils 5-42. Therefore, the arrangement of the X-axis magnets 5-41 and X-axis coils 5-42 in FIG. 5-2B may also be referred. The Z-axis magnets 5-43 have two pairs of magnetic pole, and the arrangement direction of the magnetic poles of the Z-axis magnets 5-43 is substantially parallel to the optical axis 5-O. Additionally, the opposite magnetic poles are adjacent to each other, and the Z-axis coils 5-44 directly face to the magnetic poles of the Z-axis magnets 5-43. When a current is supplied to the Z-axis coils 5-44, an attractive magnetic force or a repulsive magnetic force is generated between the Z-axis magnets 5-43 and the Z-axis coils 5-44 to drive the holder 5-50 and the lens 5-2 inside the holder 5-50 to move along a direction that is parallel to the optical axis 5-O (Z-axis), thereby achieving the auto focus function.

It is noted that the arrangement direction of the magnetic poles of the X-axis magnets 5-41 and the Z-axis magnets 5-43 is not limited thereto. FIG. 5-2C is a schematic view of the X-axis magnets 5-41 and the corresponding X-axis coils 5-42 of the second driving assembly in accordance with another embodiment of this disclosure. For example, the X-axis magnets 5-41 and the Z-axis magnets 5-43 may only have a pair of magnetic poles. Additionally, the X-axis coils 5-42 and the Z-axis coils 5-44 are respectively and directly face to the X-axis magnets 5-41 and the Z-axis magnets 5-43. The arrangement direction of the magnetic poles of the X-axis magnets 5-41 and the Z-axis magnets 5-43 may be parallel to the main axis 5-M, such that a magnetic force generated between the X-axis magnets 5-41 and the corresponding X-axis coils 5-42 and/or the Z-axis magnets 5-43 and the corresponding Z-axis coils 5-44 may drive the holder 5-50 and the lens 5-2 inside the holder 5-50 to move along a direction indicated by the arrows 5-G and 5-H, that is parallel to the main axis 5-M (Y-axis), thereby achieving the optical image stabilization function.

Moreover, the second driving assembly 5-40 may also drive the holder 5-50 to rotate, for example, rotating around a first rotation axis 5-R1. In this embodiment, the first rotation axis 5-R1 is the central axis 5-M, but is not limited thereto. The first rotation axis 5-R1 may be parallel to the central axis 5-M.

In summary, when a current is supplied to the X-axis coils 5-42 and/or the Z-axis coils 5-44 of the second driving assembly 5-40, an attractive magnetic force or a repulsive magnetic force is generated between the X-axis coils 5-42 and the corresponding X-axis magnets 5-41 and/or between the Z-axis coils 5-44 and the corresponding Z-axis magnets 5-43, in order to drive the holder 5-50 move or rotate relative to the base 5-80. For example, the second driving assembly 5-40 may drive the holder 5-50 to move along a direction that is parallel to or perpendicular to the optical axis 5-O. Alternatively, the second driving assembly 5-40 may drive the holder 5-50 to move in a direction parallel to or perpendicular to the central axis 5-M. Also, the second driving assembly 5-40 may drive the holder 5-50 to rotate.

Please refer to FIG. 5-2A again. The holder 5-50 is disposed between the framework 5-30 and the base 5-80. The holder 5-50 has a through hole 5-51 for holding the lens 5-2. In some embodiments, the through hole 5-51 forms a thread structure corresponding to another thread structure on the periphery of the lens 5-2, such that the lens 5-2 may be screwed into the through hole 5-51. In this embodiment, the central axis 5-M of the lens unit 5-1 is perpendicular to the optical axis 5-O of the lens 5-2, but is not limited thereto.

Four elastic elements 5-60 are respectively disposed at four corners of the base 5-80, and are connected to the four leaf springs 5-55 and the base 5-80. The leaf springs 5-55 are located above the holder 5-50 and are electrically connected to the X-axis coils 5-42, and thus a current may be supplied to the X-axis coils 5-42 and a magnetic force may be generated between the X-axis coils 5-42 and the X-axis magnets 5-41.

The two position sensing elements 5-70 are disposed adjacent to the holder 5-50 for sensing the position of the holder 5-50. The position sensing elements 5-70 may be a hall sensor, a magnetoresistive effect sensor (MR sensor), a giant magnetoresistive effect sensor (GMR sensor), a tunneling magnetoresistive effect sensor (TMR sensor), an optical encoder or an infrared sensor.

The base 5-80 is disposed between the holder 5-50 and the bottom 5-100, and is movably connected to the holder 5-50.

The first driving assembly 5-90 is located between the fixed portion 5-P1 and the movable portion 5-P2, and connected to the movable portion 5-P2 for driving the movable portion 5-P2 to move relative to the fixed portion 5-P1. The first driving assembly 5-90 includes four biasing elements 5-91 made of shape memory alloy and the body 5-92.

The biasing elements 5-91 are disposed above the body 5-92. The biasing elements 5-91 include an iron-based alloy, a copper-based alloy (for example, copper-zinc-aluminum alloy, copper-aluminum-nickel alloy), a titanium-nickel alloy, a titanium-palladium alloy, a titanium-nickel-copper alloy, a titanium-nickel-palladium alloy, a gold-cadmium alloy, a thallium-indium alloy or combination of any above-described shape memory alloy.

In this embodiment, when viewed along the center axis 5-M, the four biasing elements 5-91 do not cross or overlap each other. Additionally, the four biasing elements 5-91 are symmetrically disposed. However, the biasing elements 5-91 may not be symmetrically disposed if any deviation is produced when assembling.

The body 5-92 may be further defined as a first substrate 5-93 and a second substrate 5-94. The first substrate 5-93 is located above the second substrate 5-94. The first substrate 5-93 includes two protrusions 5-931, and the second substrate 5-94 also includes two protrusions 5-941. The four biasing elements 5-91 are respectively connected to the protrusions 5-931 and the protrusions 5-941, such that the structure of the first driving assembly 5-90 may be more stable.

After the lens unit 5-1 is assembled, the base 5-80 of the movable portion 5-P2 is located on the first substrate 5-93, and the second substrate 5-94 is located on the bottom 5-100 of the fixed portion 5-P1. In this embodiment, the size of the first substrate 5-93 is slightly larger than the size of the base 5-80, such that the periphery of the body 5-92 surrounds around the base 5-80, which means the first driving assembly 5-90 surrounds around the movable portion 5-P2. Also, a portion of the first driving assembly 5-90 is disposed between the movable portion 5-P2 and the first side wall 5-11 of the outer frame 5-10, wherein one of the biasing elements 5-92 is disposed between the movable portion 5-P2 and the first side wall 5-11 of the outer frame 5-10 as well.

The shape memory alloy deforms when the temperature changes. Therefore, at least one driving signal (e.g. current, voltage) may be applied to the four biasing elements 5-91 by a power source. The driving signals may be the same or different. The temperature of the four biasing elements 5-91 are controlled respectively, and the lengths of the four biasing elements 5-91 are changed respectively, the lengths of the four biasing elements 5-91 may be changed identically or differently. Moreover, the driving signal is calculated based on a compensation information. The relationship between the compensation information and the driving signal will be described with FIG. 5-7 in the following description.

For example, when a driving signal is applied to the biasing elements 5-91, the temperature of the biasing elements 5-91 are changed, and thus the lengths of the biasing elements 5-91 are lengthened or shortened to make the first substrate 5-93 move. The position of the base 5-80 on the first substrate 5-93 is changed because the base 5-80 is connected to the first substrate 5-93, such that the movable portion 5-P2 moves relative to the fixed portion 5-P1. When stopping applying driving signal, the biasing elements 5-91 may be restored to its original length due to the characteristics of the shape memory alloy.

Next, please refer to FIGS. 5-3A to 5-3C to better understand the acting way of the first driving assembly 5-90. FIG. 5-3A, FIG. 5-3B and FIG. 5-3C are top views of the first driving assembly 5-90. It is noted that since the second substrate 5-94 is located above the base 5-100 of the fixed portion 5-P1, the second substrate 5-94 remains stationary. That is, in FIGS. 5-3A to 5-3C, the positions of the two protrusions 5-941 of the second substrate 5-94 remained unchanged. It is the first substrate 5-93 which is connected to the base 5-80 of the movable portion 5-P2 move relative to the second substrate 5-94. Moreover, for convenience of explanation, the first substrate 5-93 and the second substrate 5-94 are greatly simplified in FIGS. 5-3A to 5-3C, and only the two protrusions 5-941 of the second substrate 5-94 are shown. The four biasing elements 5-91 are further defined as a first biasing element 5-91A, a second biasing element 5-91B, a third biasing element 5-91C and a fourth biasing element 5-91D.

As shown in FIG. 5-3A, no driving signal is applied at this time, and the four biasing elements 5-91 maintain the original lengths and are symmetrically arranged.

As shown in FIG. 5-3B, when the applied driving signal makes the length of the first biasing element 5-91A lengthened, and makes the length of the third biasing element 5-91C shortened, the first substrate 5-93 moves relative to the second substrate 5-94 along a direction indicated by the arrow 5-P (negative Z-axis), which means the position correction and the displacement compensation is performed in the negative Z-axis direction. Vice versa, when the length of the first biasing element 5-91A is shortened and the length of the third biasing element 5-91C is lengthened, the first substrate 5-93 moves relative to the second substrate 5-94 along the positive Z-axis to perform the position correction and the displacement compensation.

As shown in FIG. 5-3C, when the applied driving signal makes the length of the second biasing element 5-91B shortened, and makes the length of the fourth biasing element 5-91D lengthened, the first substrate 5-93 moves relative to the second substrate 5-94 along a direction indicated by the arrow 5-Q (positive X-axis), which means the position correction and the displacement compensation is performed in the positive X-axis direction. Vice versa, when the length of the second biasing element 5-91B is lengthened and the length of the fourth biasing element 5-91D is shortened, the first substrate 5-93 moves relative to the second substrate 5-94 along the negative X-axis to perform the position correction and the displacement compensation.

Furthermore, the movable portion 5-P2 may be rotated by the first driving assembly 5-90 via the biasing elements 5-91. For example, the movable portion 5-P2 may be rotated around the aforementioned first rotation axis 5-R1 in FIG. 5-2A.

In summary, the length of the biasing elements 5-91 is controlled by applying an appropriate driving signal, the first driving assembly 5-90 may drive the movable portion 5-P2 to move or to rotate relative to the fixed portion 5-P1. For example, the first driving assembly 5-90 may drive the movable portion 5-P2 to move along a direction that is parallel to or perpendicular to the optical axis 5-O. Alternatively, the first driving assembly 5-90 may drive the movable portion 5-P2 to move along a direction that is perpendicular to the central axis 5-M. Also, the first driving assembly 5-90 may drive the movable portion 5-P2 to rotate.

The first driving assembly 5-90 drives the movable portion 5-P2 to move or rotate by controlling the length of the biasing elements 5-91 for achieving the auto focus or optical image stabilization functions, thereby improving the quality of the image produced by the lens unit 5-1. Compared with a lens unit that achieves displacement correction by an element requires a magnetic field to be generated, such as a magnetic element or a driving coil, the biasing elements 5-91 have much smaller volume than the magnetic element or the driving coil, and thus the lens unit 5-1 may be miniaturized. In addition, when the first driving assembly 5-90 drives the movable portion 5-P2 to move or rotate, no magnetic field or electromagnetic wave is generated, thereby reducing the electromagnetic interference inside the lens unit 5-1. Additionally, the driving force generated by the shape memory alloy is higher than the driving force generated by the magnetic element or the driving coil, thereby achieving a better correction effect. Besides, the quality of images or videos of the electronic device provided with the lens unit 5-1 is improved.

Next, please refer to FIGS. 5-4 to 5-6, in order to better understand the position relationship between the lens 5-2 and the elastic elements 5-60. FIG. 5-4 is a cross-sectional view illustrated along the line 5-A-5-A' of FIG. 5-1. FIG. 5-5 is a plan view of the lens unit 5-1 with the outer frame 5-10, the housing 5-20, and the framework 5-30 omitted in accordance with some embodiments of this disclosure. FIG. 5-6 is a plan view of the lens unit 5-1 with the outer frame 5-10, the housing 5-20, and the framework 5-30 omitted in accordance with some embodiments of this disclosure.

As shown in FIG. 5-4, in this embodiment, the lens 5-2 includes a first lens 5-201, a second lens 5-202, and a plurality of lenses between the first lens 5-201 and the second lens 5-202. The number of lenses between the first lens 5-201 and the second lens 5-202 may be added or removed depending on users' demands. The position of the first lens 5-201 faces the first perforation 5-12 of the outer frame 5-10, and the position of the second lens 5-202 faces the second perforation 5-14 of the outer frame 5-10, and the first lens 5-201 is closer to an incident light 5-IN than the second lens 5-202. As shown in FIG. 5-4, a difference 5-*d*1 between the first lens 5-201 and the first perforation 5-12 is less than a difference 5-*d*2 between the second lens 5-202 and the second perforation 5-14. Since the difference 5-*d*1 is different from the difference 5-*d*2, the lens 5-2 is not located at the center of the lens unit 5-1, and thus elements with larger volume may be disposed between the second lens 5-202 and the second side wall 5-13 to achieve the effects of miniaturization of the device.

As shown in FIG. 5-5 and FIG. 5-6, the four elastic elements 5-60 may be further defined as a first elastic element 5-60A, a second elastic element 5-60B, a third elastic element 5-60C, and a fourth elastic element 5-60D. The first elastic element 5-60A and the second elastic element 5-60B are closer to the first lens 5-201 and the incident light 5-IN, and the third elastic element 5-60C and the fourth elastic element 5-60D are closer to the second lens 5-202.

As described above, the first elastic element 5-60A and the second elastic element 5-60B are closer to the first lens 5-201 while the third elastic element 5-60C and the fourth elastic element 5-60D are closer to the second lens 5-202. When viewed along a direction parallel to the central axis 5-M, a virtual line 5-I1 connecting the first elastic element 5-60A to the second elastic element 5-60B partially overlaps with the first lens 5-201. On the contrary, a virtual line 5-I2 connecting the third elastic element 5-60C to the fourth elastic element 5-60D does not overlap with the second lens 5-202.

Next, please refer to FIG. 5-7. FIG. 5-7 is a schematic view of the lens unit 5-1 and a driving unit 5-6 in accordance with some embodiments of this disclosure. As shown in FIG. 5-7, the first driving assembly 5-90 is electrically connected to the external driving unit 5-6. Therefore, the second driving assembly 5-40 may be electrically connected to the external driving unit 5-6 via the first driving assembly 5-90. The driving unit 5-6 includes a drive IC, a control IC, etc. The driving unit 5-6 makes the first driving assembly 5-90 drive the movable portion 5-P2 and/or the second driving assembly 5-40 drive the holder 5-50 to move or rotate in response to the compensation information.

By simultaneously performing position correction and displacement compensation by the first driving assembly 5-90 and the second driving assembly 5-40, the lens unit 5-1 may have a wider correction range, and may correct the position of the holder 5-50 more quickly, thereby achieving better operational results.

Here, the maximum distance that the first driving assembly 5-90 drives the movable portion 5-P2 to move relative to the fixed portion 5-P1 is defined as a first limit movement range. That is, the movable portion 5-P2 may move within the first limit movement range. Additionally, the maximum distance that the second driving assembly 5-40 drives the holder 5-50 to move relative to the base 5-90 is defined as a second limit movement range. That is, the holder 5-50 may move within the second limit movement range.

It is noted that the sum of the first limit movement range and the second limit movement range of the lens unit 5-1 of this disclosure is designed to be smaller than the distance between the movable portion 5-P2 and the fixed portion 5-P1. As a result, even if the first driving assembly 5-90 moves the maximum distance (the first limit movement range) and/or the second driving assembly 5-40 moves the maximum distance (the second limit movement range), the movable portion 5-P2 still does not collide with the fixed portion 5-P1, thereby reducing the possibility of the damage of the lens unit 5-1 and extending the life of the lens unit 5-1.

The compensation information includes the shock or the vibration on the lens unit 5-1, the distance or the movement of the shooting object, and so on. A compensation value is calculated based on the compensation information, and the compensation value is the overall distance or angle required to correct the position of the lens units 5-1. According to the compensation value, the first driving assembly 5-90 and the second driving assembly 5-40 may act separately or together to actually move a distance that is equal to the compensation value, thereby achieving the position correction more rapidly.

For example, when the compensation value is less than the first limit movement range, the position correction may be performed by the first driving assembly 5-90 only. The first driving assembly 5-90 drives the movable portion 5-P2 to move a distance that is equal to the compensation value.

For example, when the compensation value is greater than the first limit movement range, the position correction is performed collectively by the first driving assembly 5-90 and the second driving assembly 5-40. The first driving assembly 5-90 drives the movable portion 5-P2 to move a distance that is equal to the first limit movement range, and the second driving assembly 5-40 drives the holder 5-50 to move a distance that is equal to the compensation value minus the first limit movement range.

For example, when the compensation value is less than the second limit movement range, the position correction is performed by the second driving assembly 5-40 only. The second driving assembly 5-40 drives the holder 5-50 to move a distance that is equal to the compensation value.

For example, when the compensation value is greater than the second limit movement range, the position correction is performed collectively by the first driving assembly 5-90 and the second driving assembly 5-40. The second driving assembly 5-40 drives the holder 5-50 to move a distance that is equal to the second limit movement range of motion, and the first driving assembly 5-90 drives the movable portion 5-P2 to move a distance that is equal to the compensation value minus the second limit movement range.

In summary, Table 1 is the distance that the movable portion 5-P2 and the holder 5-50 move under different situations. The sum of the distance that the first driving assembly 5-90 drives the movable portion 5-P2 and the distance that the second driving assembly 5-40 drives the holder 5-50 to move is the compensation value.

TABLE 1

The distance that the movable portion 5-P2 and the holder 5-50 move under different situations

| | The distance that the first driving assembly 5-90 drives the movable portion 5-P2 to move | The distance that the second driving assembly 5-40 drives the holder 5-50 to move |
|---|---|---|
| The compensation value is less than the first limit movement range | The compensation value | None |
| The compensation value is less than the second limit movement range | None | The compensation value |
| The compensation value is greater than the first limit movement range | The first limit movement range | The compensation value minus the first limit movement range |
| The compensation value is greater than the second limit movement range | The compensation value minus the second limit movement range | The second limit movement range |

Next, please refer to FIG. 5-8A and FIG. 5-8B together. FIG. 5-8A and 5-8B are perspective views of the lens unit 5-1, a reflecting unit 5-3, and a lens holding unit 5-4. In FIG. 5-8A and FIG. 5-8B, the arrangement of the lens unit 5-1, the reflecting unit 5-3, and the lens holding unit 5-4 is different.

As shown in FIG. 5-8A, the reflecting unit 5-3 is disposed adjacent to the first side wall 5-11 of the outer frame 5-10 of the lens unit 5-1. It is noted that the direction of the incident light 5-IN in FIG. 5-8A is different from the direction of the incident light 5-IN in FIG. 5-4. The direction of the incident light 5-IN in FIG. 5-8A is parallel to the Y-axis while the direction of the incident light 5-IN in FIG. 5-4 is parallel to the Z-axis. This is because the reflecting unit 5-3 may change the direction of the incident light 5-IN and adjust the direction of the incident light 5-IN to be substantially parallel to the optical axis 5-O of the lens 5-2, i.e. parallel to the Z-axis. That's the reason why the direction of incident light 5-IN is shown parallel to the optical axis 5-O of the lens 5-2 in FIG. 5-4.

Please refer to FIG. 5-9 and FIG. 5-10 to better understand the structure of the reflecting unit 5-3. FIG. 5-9 is a perspective view of the reflecting unit 5-3 in accordance with some embodiments of this disclosure. FIG. 5-10 is a cross-sectional view illustrated along line 5-B-5-B' of FIG. 5-9. The reflecting unit 5-3 includes an optical path adjustment element 5-301 and an optical path adjustment element driving assembly 5-302.

The optical path adjustment element 5-301 may be a mirror, a refractive prism, a beam splitter, etc. The incident light 5-IN may be received by the optical path adjustment element 5-301. Additionally, the direction of the incident light 5-IN may be adjusted by the rotation of the optical path adjustment element 5-301. The optical path adjustment element driving assembly 5-302 includes two optical path adjustment elements driving magnetic elements 5-303 and two corresponding optical path adjustment element driving coils 5-304. When a current is supplied to the optical path adjustment element driving coil 5-304, an electromagnetic induction occurs between the optical path adjustment element driving coil 5-304 and the optical path adjustment element driving magnetic element 5-303, so that the optical path adjustment element driving assembly 5-302 drives the optical path adjustment element 5-301 to rotate around a second rotation axis 5-R2, which is perpendicular to the central axis 5-O of the lens unit 5-1.

Please refer to FIG. 5-8A and FIG. 5-8B again. The lens holding unit 5-4 holds another lens 5-5. As shown in FIG. 5-8A, the lens holding unit 5-4 is disposed adjacent to the second side wall 5-13 of the outer frame 5-10 of the lens unit 5-1, such that the lens unit 5-1 is disposed between the lens holding unit 5-4 and the reflecting unit 5-3. As shown in FIG. 5-8B, the lens holding unit 5-4 is disposed adjacent to the reflecting unit 5-3, such that the reflecting unit 5-3 is disposed between the lens unit 5-1 and the lens holding unit 5-4. The lens 5-2 in the lens unit 5-1 and the other lens 5-5 in the lens holding unit 5-4 may be taken images separately. Therefore, when disposed on an electronic device, a double lens may be formed to enhance applicability.

The reflecting unit 5-3 may receive the incident light 5-IN and change the direction of the incident light 5-IN, and the lens holding unit 5-4 may be a corresponding receiving unit, and vice versa. That is, the lens holding unit 5-4 may be an emitting unit and the reflecting unit 5-3 may be a corresponding receiving unit. With structured light, infrared ray or ultrasonic waves, this disclosure may achieve the effects of depth sensing, spatial scanning, etc. Additionally, this disclosure may be applied to spatial planning, compensating for the impact of the environment, improving the blurring of images or videos when the light is bad or weather is poor, and enhancing the quality of shooting or recording.

FIG. 5-11 and FIG. 5-12 show a lens unit 5-1A in accordance with another embodiment of this disclosure. FIG. 5-11 is a perspective view of the lens unit 5-1A. FIG. 5-12 is a cross-sectional view illustrated along the line 5-C-5-C' of FIG. 5-11. In the following description, the same elements will be denoted by the same symbols, and the same content will not be described again, and similar elements are denoted by similar symbols.

The lens unit 5-1A and the lens unit 5-1 is substantially the same, the difference is that a housing 5-20A of the lens unit 5-1A may replace the housing 5-20 and the framework 5-30 of the lens unit 5-1, and the housing 5-20A of the lens unit 5-1A is made of a plastic material. As shown in FIG. 5-12, an accommodation portion 5-22A is formed on the housing 5-20A to accommodate X-axis magnets 5-41, i.e. to accommodate a portion of the second driving assembly 5-40. Therefore, the overall structure of the lens unit 5-1A is simplified, the manufacture cost is reduced, and the production efficiency is enhanced.

The lens unit 5-1 and 5-1A can also be applied to the lens unit of the optical modules 1-B1000, 1-B3000, 1-C1000, 1-C3000, 1-D1000, 1-D3000, and 12-1000 in the embodiment of this disclosure.

Based on this disclosure, the biasing elements made of a shape memory alloy may improve the speed and accuracy of the displacement correction of the lens unit of this disclosure, thereby better achieving the auto focus or optical image stabilization functions. Moreover, the displacement compensation of the lens unit of this disclosure may be simultaneously performed by the first driving assembly and the second driving assembly, thereby improving the correction efficiency. In addition, the lens unit of this disclosure may be combined with a reflecting unit and a lens holding unit to achieve the effects of depth sensing, spatial scanning, etc.

Sixth Group of Embodiments

Firstly, referring to FIGS. 6-1, 6-2A and 6-3, which are a perspective view, a exploded view and a cross sectional view illustrated along a line 6-A-A' in FIG. 6-1 of an image capturing device 6-1, according to some embodiments of the present disclosure. The image capturing device 6-1 mainly includes a case 6-100, a bottom 6-200 and other elements disposed between the case 6-100 and the bottom 6-200. For example, in FIG. 6-2A, a first holder 6-300, a first driving component 6-310 (includes a first magnetic element 6-312 and a second magnetic element 6-314), a first lens unit 6-320, an upper spring 6-330, a lower spring 6-332, a second holder 6-400, a second lens unit 6-420, an aperture unit 6-500 (includes an aperture holder 6-510, an aperture 6-520, a spring 6-530 and a magnetic element 6-540) and a spacer 6-700 are disposed between the case 6-100 and the bottom 6-200. Furthermore, the image capturing device 6-1 further includes an image sensor 6-600 disposed on another side of the bottom 6-200 relative to the aforementioned elements, and the image sensor 6-600 may be disposed on a substrate 6-S.

The case 6-100 and the bottom 6-200 may be combined to form an outer case of the image capturing device 6-1. It should be noted that a case opening 6-110 and a bottom opening 6-210 are formed on the case 6-100 and the bottom 6-200, respectively. The center of the case opening 6-110 corresponds to an optical axis 6-O of the first lens unit 6-320 and the second lens unit 6-420, and the bottom opening 6-210 corresponds to the image sensor 6-600. Accordingly, the first lens unit 6-320 and the second lens unit 6-420 disposed in the image capturing device 6-1 and the image sensor 6-600 can perform image focusing in the direction of the optical axis 6-O (i.e. Z direction). In some embodiments, the case 6-100 and the bottom 6-200 may be made of nonconductive materials (e.g. plastic), so short circuits or electrical interference between the first lens unit 6-320 or the second lens unit 6-420 and other electronic elements around may be prevented. In some embodiments, the case 6-100 and the bottom 6-200 may be made of metal to enhance the mechanical strength of the case 6-100 and the bottom 6-200.

The first holder 6-300 has a through hole 6-302, and the first lens unit 6-320 may be fixed in the through hole 6-302. For example, the first lens unit 6-320 may be fixed in the through hole 6-302 by locking, adhering, engaging, etc., and is not limited. The second magnetic element 6-314 may be, for example, a coil, and may be disposed around on an outer surface of the first holder 6-300. The first magnetic element 6-312 may be, for example, a magnetic element such as magnet, multi-pole magnet, etc., and the first magnetic element 6-312 may be fixed in the case 6-100. The first driving component 6-310 (including the first magnetic element 6-312 and the second magnetic element 6-314) is disposed in the case 6-100 and corresponds to the first lens unit 6-320, and the first driving component 6-310 is used for driving the first lens unit 6-320 to move relative to the case 6-100.

Specifically, a magnetic force may be created by the interaction between the first magnetic element 6-312 and the second magnetic element 6-314 to move the first holder 6-300 relative to the case 6-100 along the Z direction to achieve rapid focusing. Furthermore, the second holder 6-400 includes a through hole 6-402, and the second lens unit 6-420 may be fixed in the through hole 6-402. For example, the second lens unit 6-420 may be fixed in the through hole 6-402 by locking, adhering, engaging, and is not limited. By providing the first lens unit 6-320 and the second lens unit 6-420 corresponding to the same optical axis 6-O, the image capturing space of the image capturing device 6-1 may be increased to enhance the quality of image capturing.

In this embodiment, the first holder 6-300 and the first lens unit 6-320 disposed in the first holder 6-300 are movably disposed in the case 6-100. More specifically, the first holder 6-300 is suspended in the case 6-100 by the upper spring 6-330 and the lower spring 6-332 made of a metal material (FIG. 6-3). The upper spring 6-330 and the lower spring 6-332 may be disposed on two sides of the first holder 6-300. When a current is supplied to the second magnetic element 6-314, the second magnetic element 6-314 can act with the magnetic field of the first magnetic element 6-312 to generate an electromagnetic force to move the first holder 6-300 and the first lens unit 6-320 along the optical axis 6-O direction relative to the case 6-100 to achieve auto focusing. Furthermore, in this embodiment, the second holder 6-400 and the second lens unit 6-420 in the second holder 6-400 may be fixed in the case 6-100. As a result, auto focusing may be achieved by only adjusting the position of the first holder 6-300 and the first lens unit 6-320 in the first holder 6-300, and the quantity of required elements may be decreased to achieve miniaturization.

Furthermore, the substrate 6-S may be, for example, a flexible printed circuit (FPC), which may be fixed on the bottom 6-200 by adhering. In this embodiment, the substrate 6-S is electrically connected to other electronic elements disposed in the image capturing device 6-1 or outside the image capturing device 6-1. For example, the substrate 6-S may provide electronic signal to the second magnetic element 6-314 through the upper spring 6-330 or the lower spring 6-332 to control the movement of the first holder 6-300 along X, Y or Z directions. It should be noted that a coil may be formed on the substrate 6-S (e.g. a flat printed coil, not shown). As a result, a magnetic force may be created between the substrate 6-S and the first magnetic element 6-312 to drive the first holder 6-300 move along a direction parallel to the optical axis 6-O (Z direction) or a direction perpendicular to the optical axis 6-O (parallel to the XY plane) to achieve auto focus (AF) or optical image stabilization (OIS).

In some embodiments, position sensors (not shown) may be disposed in the image capturing device 6-1 to detect the position of the elements in the image capturing device 6-1. The position sensors may be suitable position sensors such as Hall, MR (Magneto Resistance), GMR (Giant Magneto Resistance), or TMR (Tunneling Magneto Resistance) sensors.

In the aperture unit 6-500, the aperture 6-520 is disposed on the aperture holder 6-510 and includes an opening 6-522 for controlling the amount of light passing through the aperture unit 6-500. In general, when the diameter of the opening 6-522 of the aperture 6-520 is enlarged, the light flux of the incident light may be increased. As a result, it can be applied in a low brightness environment, and the influence of the background signal may be decreased to avoid image noise. Furthermore, in a high brightness environment, the sharpness of the image may be increased by reducing the diameter of the opening 6-522 of the aperture 6-520, and the image sensor 6-600 may be prevented from overexposure.

In some embodiments, a spring 6-530 and a magnetic element 6-540 may be disposed on the aperture holder 6-510 to allow the aperture unit 6-500 moving relative to the case 6-100. For example, the magnetic element 6-540 may be a coil, and the magnetic element 6-540 may interact with the magnetic field of the first magnetic element 6-312 to drive the aperture unit 6-500 move along the direction of the optical axis 6-O (Z direction) to achieve auto focusing. However, the present disclosure is not limited thereto. For example, the aperture unit 6-500 may be disposed on the first lens unit 6-320 rather than providing the spring 6-530 and the magnetic element 6-540, to move the aperture unit 6-500 and the first holder 6-300 together. As a result, the quantity of elements may be reduced to achieve miniaturization.

Furthermore, a spacer 6-700 may be disposed between the first holder 6-300 and the aperture unit 6-500 to prevent the first holder 6-300 and the aperture unit 6-500 from colliding with each other when the first holder 6-300 moving relative to the aperture unit 6-500. Furthermore, in some embodiments, the aperture unit 6-500 may be fixed on the case 6-100, and the optical image stabilization or the auto focus may be achieved by only moving the first lens unit 6-320 or the second lens unit 6-420. As a result, the quantity of elements may be reduced to achieve miniaturization.

Although the aperture 6-520 of the aperture unit 6-500 is illustrated as having a fixed diameter, it is only for illustration, and the present disclosure is not limited thereto. For example, in some embodiments, a driving element 6-550 (e.g. spring, magnets, coils, etc.) may be provided in the case 6-100 to adjust the diameter of the aperture 6-520 of the aperture unit 6-500. In this embodiment, the aperture 6-520 may be formed of a plurality of adjustable portions (e.g. including aperture elements having multiple different diameters, or movable elements which can combine to form apertures having different diameters). As a result, the amount of light passing through the aperture unit 6-500 may be controlled to meet different requirements of image capturing.

In the embodiment shown in FIG. 6-2A, the second holder 6-400 and the second lens unit 6-420 in the second holder 6-400 are fixed in the case 6-100, but the present disclosure is not limited thereto. For example, referring to FIG. 6-2B, an exploded view of an image capturing device 6-2 according to other embodiments of the present disclosure is shown. The difference between the image capturing device 6-2 and the image capturing device 6-1 is that the image capturing device 6-2 further includes a second driving component 6-410 (including a third magnetic element 6-412 and a fourth magnetic element 6-414), an upper spring and a lower spring (not shown) corresponding to the second lens unit 6-420 and disposed on the second holder 6-400, to drive the second lens unit 6-420 to move relative to the case 6-100. The third magnetic element 6-412 may be, for example, a magnet, and the fourth magnetic element 6-414 may be, for example, a coil.

As a result, when current is applied to the fourth magnetic element 6-414, the fourth magnetic element 6-414 may interact with the magnetic field of the third magnetic element 6-412 to create an electromagnetic force to drive the second holder 6-400 and the second lens unit 6-420 to move relative to the case 6-100 along the optical axis 6-O (Z direction) to achieve auto focus.

Furthermore, in some embodiments, the third magnetic element 6-412 may be omitted, and the fourth magnetic element 6-414 may interact with the magnetic field of the first magnetic element 6-312 to drive the second holder 6-400 and the second lens unit 6-420 moving relative to the case 6-100 along the optical axis 6-O. In this embodiment, a spacer (not shown) may be disposed between the second holder 6-400 and the aperture unit 6-500 to prevent collision between the second holder 6-400 and the aperture unit 6-500 during their movement. Furthermore, the third magnetic element 6-412 is omitted, so the dimensions of the image capturing device 6-2 may be minimized further to achieve miniaturization.

Furthermore, in some embodiments, the aperture unit 6-500 may be fixed on the second holder 6-400 to allow the second holder 6-400 and the aperture unit 6-500 use the third magnetic element 6-412 and the fourth magnetic element 6-414 together, and move the second holder 6-400 and the aperture unit 6-500 together, without providing the spring 6-530 and the magnetic 6-540 in the aforementioned embodiments on the aperture unit 6-500. As a result, the quantity of elements may be reduced to achieve miniaturization.

Referring to FIG. 6-4, position relationship between some elements of the image capturing device 6-1 of FIG. 6-1 is shown. In FIG. 6-4, only the first lens unit 6-320, the second lens unit 6-420, the aperture unit 6-500 and the image sensor 6-600 are shown for simplicity.

The first lens unit 6-320 includes a barrel 6-322 and a first lens 6-324 and a second lens 6-326 disposed in the barrel 6-322. The inner surface of the barrel 6-322 includes a first bearing surface 6-322A and a second bearing surface 6-322B. In this embodiment, the barrel 6-322 is contacted to the first lens 6-324 through the first bearing surface 6-322A, and contacted to the second lens 6-326 through the second bearing surface 6-322B. The diameter 6-D1 of the first lens 6-324 is less than the diameter 6-D2 of the second lens 6-326, and the aperture unit 6-500, the first lens 6-324 and the second lens 6-326 are arranged in order.

Furthermore, the second lens unit 6-420 includes a barrel 6-422 and a first lens 6-424 and a second lens 6-426 disposed in the barrel 6-422. The inner surface of the barrel 6-422 includes a first bearing surface 6-422A and a second bearing surface 6-422B. In this embodiment, the barrel 6-422 is contacted to the first lens 6-424 through the first bearing surface 6-422A, and contacted to the second lens 6-426 through the second bearing surface 6-422B. The diameter 6-D3 of the first lens 6-424 is less than the diameter 6-D4 of the second lens 6-426, and the aperture unit 6-500, the first lens 6-424 and the second lens 6-426 are arranged in order.

The first lenses 6-324 and 6-424 and the second lenses 6-326 and 6-426 may be, for example, convex lenses to focus the light collected from the external environment of the image capturing device 6-1 toward a desired direction. As a result, when light 6-L1 from the external environment is incident to the image capturing device 6-1 along Z direction (as shown in FIG. 6-4), the light 6-L1 may sequentially pass through the second lens unit 6-420, the aperture unit 6-500 and the first lens unit 6-320, therefore reaches the image sensor 6-600. As a result, an image may be formed on a sensing surface 6-602 of the image sensor 6-600.

As a result, the angle and the width of the light passing through the aperture unit 6-500 may be controlled by controlling the position of the aperture unit 6-500, as shown in the aforementioned embodiments. As a result, the brightness of the image received may be controlled to get images having desired qualities. Furthermore, the lights passing through the aperture opening 6-502 of the aperture unit 6-500 are not parallel, so the lights may be allowed to form images on the image sensor 6-600. By arranging the aperture unit 6-500, the first lens 6-324 (or 6-424) having smaller dimensions and the second lens 6-324 (or 6-424) having greater dimensions in order, the incident light 6-L1 may be focused at the aperture unit 6-500 to pass through the aperture unit 6-500 having a smaller diameter to meet different design requirements.

The diameter of the aperture opening 6-502 of the aperture unit 6-500 may be reduced by providing an aperture unit 6-500 between the first lens unit 6-320 and the second lens unit 6-420 to increase the depth of field of the received image. Furthermore, by forming a symmetric structure where the first lens unit 6-320 and the second lens unit 6-420 are positioned on two sides of the aperture unit 6-500, the clarity of the image received may be further enhanced. Moreover, the first lens unit 6-320, the second lens unit 6-420 and the aperture unit 6-500 may be packaged in a single image capturing device (e.g. the image capturing device 6-1) together, the complexity of the process may be reduced, and the yield may be enhanced. However, the present disclosure is not limited thereto. For example, in some embodiments, the aperture unit 6-500, the second lens unit 6-420, the first lens unit 6-320 and the image sensor 6-600 may be arranged in order, to meet specific design requirements.

In conventional mobile electronic devices (e.g. cellphones), the thickness of the image capturing device (the dimensions in the Z direction) is desired to be reduced to achieve miniaturization. As a result, a reflecting unit may be disposed in the aforementioned image capturing device to change the direction of light, so some elements may be arranged in directions different from the Z direction (e.g. X direction or Y direction) to reduce the dimensions of the electronic device in the Z direction. For example, referring to FIG. 6-5, a position relationship between some elements of an image capturing device 6-3 is shown, according to some embodiments of the present disclosure. Similar to FIG. 6-4, some elements of the image capturing device 6-3 in FIG. 6-5 are omitted.

In FIG. 6-5, the image capturing device 6-3 mainly includes the first lens unit 6-320, the second lens unit 6-420, the aperture unit 6-500, the image sensor 6-600 and a reflecting unit 6-800. In this embodiment, the reflecting unit 6-800 may be disposed on an inclined surface (not shown) of the case 6-100. The second lens unit 6-420 and the reflecting unit 6-800 may be arranged along Z direction. The aperture unit 6-500 and the first lens unit 6-320 may be disposed between the reflecting unit 6-800 and the image sensor 6-600, and the reflecting unit 6-800, the aperture unit 6-500, the first lens unit 6-320 and the image sensor 6-600 may be arranged along the X direction. In other words, the reflecting unit 6-800 may be disposed between the aperture unit 6-500 and the second lens unit 6-420.

The reflecting unit 6-800 may be an element that can reflect light, such as a prism, and the reflecting unit 6-800 includes a reflecting surface 6-802, a side 6-804 (first side) and a side 6-806 (second side). By allowing the lens units (e.g. the first lens unit 6-320 and the second lens unit 6-420), the reflecting unit 6-800, the aperture unit 6-500, etc. being disposed in the same image capturing device (i.e. modularization), the quality of the image may be enhanced as well as decreasing the dimensions of the image capturing device 6-3, and the tolerance may be decreased when different modules are assembled with each other. Therefore, the quality of image capturing may be increased further.

In this embodiment, the second lens unit 6-420 is disposed at a side corresponding to the side 6-804 (the first side), and the first lens unit 6-320 and the aperture unit 6-500 are disposed at another side corresponding to the side 6-806 (the second side), and the side 6-804 and the side 6-806 are not parallel to each other. It should be noted that the first bearing surface 6-322A of the first lens unit 6-320 and the first bearing surface 6-422A of the second lens unit 6-420 face different directions in this embodiment. Furthermore, in some embodiments, no additional lens is disposed between the first lens unit 6-320 and the second lens unit 6-420. In other words, when light 6-L2 from the external environment passes through the second lens unit 6-420, the light 6-L2 from the external environment does not pass through any other lens before entering the first lens unit 6-320. As a result, the dimensions of the image capturing device 6-3 may be reduced to achieve miniaturization.

Therefore, when the light 6-L2 from the external environment entering the image capturing device 6-3 along Z direction, the light 6-L2 may pass through the second lens unit 6-420 and may be reflected by the reflecting surface 6-802 of the reflecting unit 6-800, wherein the reflecting surface 6-802 is substantially parallel to the Y direction and is tilted relative to the X and Z directions. Afterwards, the light 6-L2 being reflected may pass through the aperture opening 6-502 of the aperture unit 6-500 and the first lens unit 6-320 along a direction substantially identical to the X direction to reach the image sensor 6-600 to form an image on a sensing surface 6-602 of the image sensor 6-600. Because the reflecting unit 6-800, the aperture unit 6-500, the first lens unit 6-320 and the image sensor 6-600 are arranged along the X direction rather than the Z direction, the dimensions of the image capturing device 6-3 on the Z direction may be reduced to achieve miniaturization.

Suitable driving elements, such as springs, magnets, coils, etc., may be disposed on the reflecting unit 6-800 to allow the reflecting unit 6-800 changing the direction of light by rotating the reflecting unit 6-800. For example, the reflecting unit 6-800 may rotate relative to the case 6-100 (FIG. 6-2) along the axis 6-R in FIG. 6-5. In this embodiment, the axis 6-R is substantially parallel to the Y direction, but the present disclosure is not limited thereto. For example, suitable driving elements may be provided to allow the reflecting unit 6-800 rotating relative to axes parallel to the X or Z directions. As a result, the image capturing surface 6-3 may capture images from different directions to increase the flexibility of the image capturing device.

In some embodiments, the reflecting unit 6-800 does not rotate, and the first lens unit 6-320 may perform auto focus along the X direction. Furthermore, in other embodiments, when the reflecting unit 6-00 rotates with the axis 6-R, the first lens unit 6-320 may perform auto focus and rotate along a direction parallel to the X direction at the same time.

Furthermore, in some embodiments, an additional lens unit may be provided between the reflecting unit 6-800 and the aperture unit 6-500. For example, FIG. 6-6 illustrates the position relationship between some elements of an image capturing device 6-4, according to some embodiments of the present disclosure. In FIG. 6-6, besides the first lens unit 6-320 and the second lens unit 6-420, an additional third lens unit 6-920 may be provided between the reflecting unit 6-800 and the aperture unit 6-500. The third lens unit 6-920 may include identical or similar structures with the first lens unit 6-320 or the second lens unit 6-420. For example, in some embodiments, the third lens unit 6-920 includes a barrel 6-922 and a first lens 6-924 and a second lens 6-926 disposed in the barrel 6-922.

The inner surface of the barrel 6-922 includes a first bearing surface 6-922A and a second bearing surface 6-922B. In this embodiment, the barrel 6-922 contacts the first lens 6-924 through the first bearing surface 6-922A, and contacts the second lens 6-926 through the second bearing surface 6-922B. The diameter 6-D5 of the first lens 6-924 is less than the diameter 6-D6 of the second lens 6-926, and the aperture unit 6-500, the first lens 6-924 and the second lens 6-926 are arranged in order. By further providing the third lens unit 6-920 in the image capturing device 6-4, light 6-L3 may pass through more lenses to increase the space for image capturing, therefore allows the image capturing device 6-4 receiving a better image.

In some embodiments, the second lens unit 6-420 may be omitted to further reduce the dimensions along the Z direction. For example, FIG. 6-7 illustrates the position relationship between some elements of an image capturing device 6-5, according to some embodiments of the present disclosure. The difference between the image capturing device 6-5 in FIG. 6-7 to the aforementioned embodiments is that the image capturing device 6-5 does not include the second lens unit 6-420 arranged with the reflecting unit 6-800 along the Z direction. As a result, light 6-L4 from the external environment may directly pass through and be reflected by the reflecting unit 6-800 to pass through the aperture unit 6-500 and entering the first lens unit 6-320, therefore forms an image on the sensing surface 6-602 of the image sensor 6-600. By this configuration, the dimensions of the image capturing device 6-5 on the Z direction may be reduced further to allow the thickness of an electronic device (e.g. cellphone) using the image capturing device 6-5 on the Z direction being further reduced.

Furthermore, in some embodiments, the aperture unit 6-500 and the first lens unit 6-320 may be disposed at different sides of the reflecting unit 6-800. For example, FIG. 6-8 illustrates the position relationship between some elements of an image capturing device 6-6, according to some embodiments of the present disclosure. In FIG. 6-8, the aperture unit 6-500 is disposed at a side corresponding to the side 6-804 of the reflecting unit 6-800, the first lens unit 6-320 is disposed on another side corresponding to the side 6-806 of the reflecting unit 6-800. As a result, light 6-L5 from the external environment may be reflected by the reflecting unit 6-800 after passing through the aperture unit 6-500 to change traveling direction, and then passes through the first lens unit 6-320 to form an image on the sensing surface 6-602 of the image sensor 6-600 to fulfill different design requirements. Furthermore, the image capturing devices 6-1, 6-2, 6-3, 6-4, 6-5 and 6-6 may be applied in the optical modules 1-A1000, 1-A2000, 1-A3000, 1-B2000, 1-C2000, 1-D2000 and 12-2000 in some embodiments of the present disclosure. Furthermore, the light intensity adjusting assembly 7-50, the optical system 8-1, the aperture unit 9-1 and the aperture unit 10-1 of some embodiments of the present disclosure may be applied in the image capturing devices 6-1, 6-2, 6-3, 6-4, 6-5 and 6-6.

In summary, an image capturing device is provided in the present disclosure. By changing the position of the aperture unit in the image capturing device, the quality of the image received by the image capturing device may be enhanced to fulfill different image capturing requirements. Furthermore, by providing a reflecting unit in the image capturing device, the thickness of the electronic device using this image capturing device may be reduced to achieve miniaturization. Moreover, by allowing the lens units, the reflecting unit, the aperture unit, etc. being disposed in the same image capturing device (i.e. modularization), the quality of the image may be enhanced and the dimensions of the image capturing device may be decreased, and the tolerance may be decreased when different modules are assembled with each other to further increase the quality of image capturing.

Seventh Group of Embodiments

Firstly, referring to FIG. 7-1, FIG. 7-1 is an exploded view of an optical element driving mechanism 7-1 according to an embodiment of the present disclosure. The optical element driving mechanism 7-1 includes a base 7-10, a top cover 7-20, a holder 7-30, a holder driving mechanism 7-35, a frame 7-40, a light intensity adjusting assembly 7-50 and two optical element stop members 7-60.

The base 7-10 is combined with the top cover 7-20 to form a housing 7-G of the optical element driving mechanism 7-1. The base 7-10 constitutes a bottom wall 7-10A of the housing 7-10G, and the top cover 7-20 constitutes a top wall 7-20A and four side walls 7-20B of the housing 7-G. The base 7-10 has an opening 7-10B facing an image sensor (not shown) placed outside the optical element driving mechanism 7-1. The top cover 7-20 has an opening 7-20C. The center of the opening 7-20C is corresponding to an optical axis 7-O of an optical element 7-100. The optical element 7-100 has an opening 7-110 so that light 7-200 passes through the opening 7-110 to the optical element 7-100, and the optical axis 7-O is parallel to the Z-axis direction.

The holder 7-30 is located between the base 7-10 and the top cover 7-20. The holder 7-30 is movably connected to the frame 7-40. The holder 7-30 is suspended inside the center of the frame 7-40 by the upper spring and the lower spring (not shown) made of a metal material. The holder 7-30 has a through hole 7-30A. A corresponding threaded structure (not shown) is formed between the through hole 7-30A and the optical element 7-100 so that locks the optical element 7-100 in the through hole 7-30A. The holder 7-30 and the optical element 7-100 are moved relative to the frame 7-40 in the direction of the optical axis 7-O.

The holder driving mechanism 7-35 includes four driving magnetic elements 7-351 and a driving coil 7-352. The driving magnetic elements 7-351 are disposed on the frame 7-40. In some embodiments, the number of the driving magnetic elements may also be two. The driving coil 7-352 is disposed on the outer surface of the holder 7-30. More specifically, the driving coil 7-352 is wounded around the outer surface of the holder 7-30 which is opposite to the frame 7-40. When a current is supplied to the driving coil 7-352, the driving coil 7-352 may act with a magnetic field of the driving magnetic element to generate an electromagnetic force to move the holder 7-30 and the optical element 7-100 relative to the frame 7-40 in the direction of the optical axis 7-O.

The frame 7-40 is movably connected to the base 7-10 and the holder 7-30. The frame 7-40 includes a frame body 7-40A, a first shaft 7-41 and a second shaft 7-42. The frame body 7-40A is located on the base 7-10. The first shaft 7-41 and the second shaft 7-42 are integrally form with the frame body 7-40A. Therefore, relative to the frame body 7-40A, the first shaft 7-41 and the second shaft 7-42 are fixed and non-rotatable. Moreover, the first shaft 7-41 and the second shaft 7-42 are parallel to each other but do not contact to each other.

The light intensity adjusting assembly 7-50 is disposed on the frame 7-40. The light intensity adjusting assembly 7-50 includes a first shutter 7-51, a second shutter 7-52, a shutter driving member 7-53, a supporting plate 7-54 and a top cover 7-55. The light intensity adjusting assembly 7-50 adjusts the luminous flux to the optical element 7-100.

The first shutter 7-51 is disposed above the frame 7-40. As shown in FIG. 7-2A, the first shutter 7-51 has a first blocking part 7-511 and a first extending part 7-512. The first blocking part 7-511 is an arc-shaped part of the first shutter 7-51, so that the first blocking part 7-511 blocks the opening 7-110 of the optical element 7-100. The first extending part 7-512 includes a protruded first stop member 7-51A. The first extending part 7-512 extends from the first blocking part 7-511 in side cut, that is, the first extending part 7-512 includes two sides with the feature of side cut, and the two sides with the feature of side cut gradually approach each other. Therefore, the diameter of the first blocking part 7-511 is greater than the distance between the two sides with the feature of side cut. In the present embodiment, the first blocking part 7-511 has an opening 7-511A which allows a portion of light 7-200 to enter the optical element 7-100 via the opening 7-511A and the opening 7-110, thereby achieving the effect of restricting the luminous flux to the optical element 7-100. The first extending part 7-512 has two openings 7-512A and 7-512B. The opening 7-512A is passed through by the first shaft 7-41. The function of the first stop member 7-51A is described later.

The second shutter 7-52 is disposed between the first shutter 7-51 and the frame 7-40. As shown in FIG. 7-2B, the second shutter has a second blocking part 7-521 and a second extending part 7-522. The second blocking part 7-521 is an arc-shaped part of the second shutter 7-52, so that the second blocking part 7-521 blocks the opening 7-110 of the optical element 7-100. The second extending part 7-522 includes a protruded second stop member 7-52A. The second extending part 7-522 extends from the second blocking part 7-521 in side cut, that is, the second extending part 7-522 includes two sides with the feature of side cut, and the two sides with the feature of side cut gradually approach each other. Therefore, the diameter of the second blocking part 7-521 is greater than the distance between the two sides with the feature of side cut. In the present embodiment, the second blocking part 7-521 totally blocks the opening 7-110 of the optical element 7-100, and does not allow light 7-200 to enter the optical element 7-100 via the opening 7-110, thereby achieving the effect of restricting the luminous flux to the optical element 7-100. The second extending part 7-522 has two openings 7-522A and 7-522B. The opening 7-522A is passed through by the second shaft 7-42. The function of the second stop member 7-52A is described later.

Please refer to FIG. 7-1, the shutter driving member 7-53 is disposed on the frame 7-40, and is located between the second shutter 7-52 and the frame 7-40. The shutter driving member 7-53 includes a first magnetic element 7-531, a second magnetic element 7-532, a magnetic permeable element 7-533 and a solenoid 7-534. The shutter driving member 7-53 drives the first shutter 7-51 and the second shutter 7-52 to rotate relative to the holder 7-30 and the frame 7-40.

As shown in FIG. 7-3, the first magnetic element 7-531 and the second magnetic element 7-532 are passed through by the first shaft 7-41 and the second shaft 7-42 respectively. The first magnetic element 7-531 and the second magnetic element 7-531 have protruded parts 7-531A and 7-532A. The protruded part 7-531A of the first magnetic element 7-531 passes through the opening 7-512B of the first shutter 7-51 (as shown in FIG. 7-2A), and the protruded part 7-532A of the second magnetic element 7-532 passes through the opening 7-522B of the second shutter 7-52 (as shown in FIG. 7-2B). The materials of the first magnetic element 7-531 and the second magnetic element 7-532 are permanent magnets. The magnetic permeable element 7-533 is disposed between the first magnetic element 7-531 and the second magnetic element 7-531, and the magnetic permeable element 7-533 extends in a extending direction 7-E perpendicular to the optical axis 7-O. The extending direction 7-E is parallel to the X-axis. More specifically, the magnetic permeable element 7-533 may have a long strip structure, and the two ends of the magnetic permeable element 7-533 extend adjacent to the first magnetic element 7-531 and the second magnetic element 7-532 respectively.

The center of the magnetic permeable element 7-533 is not overlapped with the first shaft 7-41 and the second shaft 7-42 when observing along the extending direction 7-E. The magnetic permeable element 7-533 is made of magnetic permeable materials, for example, the magnetic permeable material forming the magnetic permeable element 7-533 may be nickel-iron alloy. The solenoid 7-534 covers the middle part of the magnetic permeable element 7-533. More specifically, the two ends of the magnetic permeable element 7-533 are not covered by the solenoid 7-534. The solenoid 7-534 receives the current to generate a magnetic field, thereby driving the first magnetic element 7-531 and the second magnetic element 7-532 rotate about the first shaft 7-41 and the second shaft 7-42, respectively.

Please refer to FIGS. 7-4A and 7-4B, FIGS. 7-4A and 7-4B are schematic views of disposition of the magnetic pole directions of the first magnetic element 7-531 and second magnetic element 7-532. As shown in FIG. 7-4A, directions of north poles 7-N of the first magnetic element 7-531 and the second magnetic element 7-532 and the extending direction 7-E has same angles 7-F1 when a current is not supplied to the solenoid 7-534. Alternatively, the magnetic pole directions of the first magnetic element 7-531 and second magnetic element 7-532 may be disposed as shown in FIG. 7-4B, directions of south poles 7-S of the first magnetic element 7-531 and the second magnetic element 7-532 and the extending direction 7-E has same angles 7-F2 when the current is not supplied to the solenoid 7-534.

FIGS. 7-5A, 7-5B and 7-5C are schematic views of the relationship of relative positions of the first shutter 7-51 and the second shutter 7-52 of the optical element driving mechanism 7-1. The shutter driving member 7-53 drives and change the positions of the first shutter 7-51 and the second shutter 7-52 by the incoming current. No matter which positions the first shutter 7-51 and the second shutter 7-52 are located, the first shutter 7-51 is partially overlapped with the second shutter 7-52 when observing along the optical axis 7-O.

The shutter driving member 7-53 drives the first shutter 7-51 to move between the first beginning position 7-A1 and the first final position 7-A2. When the current is not supplied to the shutter driving member 7-53, the first magnetic element 7-531 attracts the magnetic permeable element 7-533 and makes the first shutter 7-51 located at the first beginning position 7-A1.

When the first shutter 7-51 is located at the first beginning position 7-A1, the first shutter 7-51 is not overlapped with the optical element 7-100 when observing along the optical axis 7-O. When the first shutter 7-51 is located at the first final position 7-A2, the first shutter 7-51 is partially overlapped with the optical element 7-100 when observing along the optical axis 7-O.

The shutter driving member 7-53 drives the second shutter 7-52 to move between the second beginning position 7-B1 and the second final position 7-B2. When the current is not supplied to the shutter driving member 7-53, the second magnetic element 7-532 attracts the magnetic permeable element 7-533 and makes the second shutter 7-52 located at the second beginning position 7-A2.

When the second shutter 7-52 is located at the second beginning position 7-B1, the second shutter 7-52 is not overlapped with the optical element 7-100 when observing along the optical axis 7-O. When the second shutter 7-52 is located at the second final position 7-B2, the second shutter 7-52 is overlapped with the optical element 7-100 when observing along the optical axis 7-O. Thus, in this state, the second shutter 7-52 blocks the light 7-200 to the opening 7-110.

FIG. 7-5A shows the first shutter 7-51 and the second shutter 7-52 of the optical element driving mechanism 7-1 of the present disclosure located at the first beginning position 7-A1 and the second beginning position 7-B1, respectively. In this state, the light 7-200 to the optical element 7-100 via the opening 7-110 is not blocked by the first shutter 7-51 or the second shutter 7-52. Thus, the light 7-200 totally enters the optical element 7-100 via the opening 7-110.

FIG. 7-5B shows the first shutter 7-51 and the second shutter 7-52 of the optical element driving mechanism 7-1 of the present disclosure located at the first beginning position 7-A1 and the second final position 7-B2, respectively. In this state, the light 7-200 to the optical element 7-100 via the opening 7-110 is blocked by the second shutter 7-52 but is not blocked by the first shutter 7-51. Thus, the second shutter 7-52 does not allow the light 7-200 to enter the optical element 7-100 via the opening 7-110.

FIG. 7-5C shows the first shutter 7-51 and the second shutter 7-52 of the optical element driving mechanism 7-1 of the present disclosure located at the first final position 7-A2 and the second beginning position 7-B1, respectively. In this state, the light 7-200 to the optical element 7-100 via the opening 7-110 is blocked by the first shutter 7-51 but is not blocked by the second shutter 7-52. Thus, the opening 7-511A of the first shutter 7-51 allows a portion of the light 7-200 to enter the optical element 7-100 via the opening 7-110.

Therefore, the quantity of the luminous flux to the optical element 7-100 via the opening 7-110 may be controlled by driving and changing positions of the first shutter 7-51 and the second shutter 7-52 by the shutter driving member 7-53.

As shown in FIGS. 7-6A and 7-6B, the supporting plate 7-54 is located between the second shutter 7-52 and the optical element 7-100 to prevent the first shutter 7-51 and the second shutter 7-52 from contacting the optical element 7-100. The supporting plate 7-54 has an opening 7-54A which allows the light 7-200 to enter the optical element 7-100 via the opening 7-54A and the opening 7-110. The supporting plate 7-54 is partially overlapped with the second shutter 7-52 when observing along the optical axis 7-O.

As shown in FIGS. 7-7A and 7-7B, the top cover 7-55 is located above the first shutter 7-51. The top cover 7-55 has an opening 7-55A which allows the light 7-200 to pass through the opening 7-55A to the opening 7-110. More specifically, the first shutter 7-51 is located between the top cover 7-55 and the first magnetic element 7-531, and the second shutter 7-52 is located between the top cover 7-55 and the second magnetic element 7-532.

As shown in FIG. 7-7C, in an embodiment, the top cover 7-55 has a first protruded portion 7-551 and a second protruded portion 7-552. When the first shutter 7-51 moves to the first beginning position 7-A1, the first protruded portion 7-551 blocks the first shutter 7-51 such that the first shutter 7-51 halts at the first beginning position 7-A1. Similarly, when the second shutter 7-52 moves to the second beginning position 7-B1, the second protruded portion 7-552 blocks the second shutter 7-52 such that the second shutter 7-52 halts at the second beginning position 7-B1. Therefore, the first protruded portion 7-551 of the top cover 7-55 restricts the range of movement of the first shutter 7-51 within the first beginning position 7-A1, and the second protruded portion 7-552 of the top cover 7-55 restricts the range of movement of the second shutter 7-52 within the second beginning position 7-B1.

Please refer to FIGS. 7-2A and 7-8, a protruded portion 7-401 located at the frame 7-40 and the first stop member 7-51A located at the first shutter 7-51 consist a first stop mechanism 7-56. When the first shutter 7-51 moves to the first final position 7-A2, the protruded portion 7-401 blocks the first stop member 7-51A such that the first shutter 7-51 halts at the first final position 7-A2 (as shown in FIG. 7-5C). Therefore, the first stop mechanism 7-56 restricts the range of movement of the first shutter 7-51 within the first final position 7-A2.

Please refer to FIGS. 7-2B and 7-8, another protruded portion 7-402 located at the frame 7-40 and the second stop member 7-52A located at the second shutter 7-52 consist a second stop mechanism 7-57. When the second shutter 7-52 moves to the second final position 7-B2, the protruded portion 7-402 blocks the second stop member 7-52A such that the second shutter 7-52 halts at the second final position 7-B2 (as shown in FIG. 7-5B). Therefore, the second stop mechanism 7-57 restricts the range of movement of the second shutter 7-52 within the second final position 7-B2.

Please refer to FIG. 7-9, in another embodiment, the top cover (not shown) may not have protruded portion. Under this circumstance, the first stop mechanism 7-56A includes two protruded portions 7-401 located at the frame 7-40 and the first stop member 7-51A located at the first shutter 7-51. When the first shutter 7-51 moves to the first beginning position 7-A1, the protruded portion 7-401 blocks the first shutter 7-51 such that the first shutter 7-51 halts at the first beginning position 7-A1. When the first shutter 7-51 moves to the first final position 7-A2, the protruded portion 7-401 blocks the first stop member 7-51A such that the first shutter 7-51 halts at the first final position 7-A2 (as shown in FIG. 7-5C). Therefore, the range of movement of the first shutter 7-51 is merely restricted by the first stop mechanism 7-56A. The second stop mechanism 7-57A includes the other two protruded portions 7-402 located at the frame 7-40 and the second stop member 7-52A located at the second shutter 7-52. When the second shutter 7-52 moves to the second beginning position 7-B1, the protruded portion 7-402 blocks the second shutter 7-52 such that the second shutter 7-52 halts at the second beginning position 7-B1. When the second shutter 7-52 moves to the second final position 7-B2, the protruded portion 7-402 blocks the second stop member 7-52A such that the second shutter 7-52 halts at the second final position 7-B2 (as shown in FIG. 7-5B). Therefore, the range of movement of the second shutter 7-52 is merely restricted by the second stop mechanism 7-57A.

As shown in FIGS. 7-10A and 7-10B, the optical element stop members 7-60 are disposed on the frame 7-40. The optical element stop members 7-60 extend from the holder 7-30 to a housing space (not shown) of the frame 7-40. The housing space of the frame 7-40 has a height parallel to the direction of the optical axis 7-O, such height is greater than heights of the optical element stop members 7-60. Thus, the optical element stop members 7-60 are allowed to move in the direction of the optical axis 7-O in the housing space of the frame 7-40. The housing space of the frame 7-40 has a width perpendicular to the direction of the optical axis 7-O, such width is substantially the same as the widths of the optical element stop members 7-60. Thus, the optical element stop members 7-60 are not allowed to move in the direction perpendicular to the optical axis 7-O and not allowed to rotate about the optical axis 7-O. The optical element stop members 7-60 and the housing space of the frame 7-40 can restrict the range of movement of the holder 7-30 along the optical axis 7-O and restrict the holder 7-30 from rotating.

FIG. 7-11 illustrates another embodiment of the present disclosure. The structure of the optical element driving mechanism 7-2 of the present embodiment is substantially the same as the optical element driving mechanism 7-1 of the embodiments described above, for the reason of simplification, the similar parts are not repeated hereinafter.

The main difference between the optical element driving mechanism 7-2 of the present embodiment and the optical element driving mechanism 7-1 of the embodiments described above is that the optical element driving mechanism 7-1 of the embodiments described above has two shutters, while the optical element driving mechanism 7-2 of the present embodiment has four shutters. Hence, the other two shutters are mainly described hereinbelow, as for the description of the corresponding elements, structures and dispositions, one can take the embodiments described above as references.

As shown in FIG. 7-11, the frame 7-40 of the optical element driving mechanism 7-2 of the present embodiment further includes a third shaft 7-43 and a fourth shaft 7-44 disposed on the frame body 7-40A. The third shaft 7-43 and the fourth shaft 7-44 are integrally form with the frame body 7-40A. Therefore, relative to the frame body 7-40A, the third shaft 7-43 and the fourth shaft 7-44 are fixed and non-rotatable. Moreover, the third shaft 7-43 and the fourth shaft 7-44 are parallel to each other but do not contact to each other.

The light intensity adjustment assembly 7-50 of the optical element driving mechanism 7-2 of the present embodiment further includes a third shutter 7-71 and a fourth shutter 7-72 and elements which are similar to the embodiments described above.

The structure of the third shutter 7-71 is substantially similar to the first shutter 7-51, the similar parts are not repeated herein. The main difference between the third shutter 7-71 and the first shutter 7-51 is that the size of the opening 7-711A of the third blocking part 7-711 of the third shutter 7-71 is different from the size of the opening 7-511A of the first blocking part 7-511 of the first shutter 7-51. More specifically, the luminous flux to the optical element 7-100 via the opening 7-711A and the opening 7-110 is different from the luminous flux to the optical element 7-100 via the opening 7-511A and the opening 7-110.

The structure of the fourth shutter 7-72 is substantially similar to the first shutter 7-51 and the third shutter 7-71, the similar parts are not repeated herein. The main difference between the fourth shutter 7-72 and the first shutter 7-51 and the third shutter 7-71 is that the size of the opening 7-721A of the fourth blocking part 7-721 of the fourth shutter 7-72 is different from the size of the opening 7-511A of the first blocking part 7-511 of the first shutter 7-51 and the size of the opening 7-711A of the third blocking part 7-711 of the third shutter 7-71. More specifically, the luminous flux to the optical element 7-100 via the opening 7-721A and the opening 7-110 is different from the luminous flux to the optical element 7-100 via the opening 7-511A and the opening 7-110, and the luminous flux to the optical element 7-100 via the opening 7-721A and the opening 7-110 is different from the luminous flux to the optical element 7-100 via the opening 7-711A and the opening 7-110.

Since the optical element driving mechanism 7-2 is provided with a third shutter 7-71 and a fourth shutter 7-72, the luminous flux to the optical element can be more controlled and have more choices.

In some embodiments, the number of shutters can be one, three, five, six or more. In fact, the number of shutters is not limited by the embodiments of the present disclosure. As for the description of the corresponding elements, structures and dispositions, one can take the embodiments described above as references, the similar parts are not repeated herein.

The aforementioned optical element driving mechanism 7-1 and optical element driving mechanism 7-2 may also be applied in the optical modules 1-A1000, 1-A2000, 1-A3000, 1-B2000, 1-C2000, 1-D2000 and 12-2000 in some embodiments of the present disclosure.

Eighth Group of Embodiments

Firstly, referring to FIGS. 8-1, 8-2A and 8-3, which are a perspective view, an exploded view and a cross sectional view illustrated along a line 8-A-8-A' in FIG. 8-1 of an optical system 8-1, according to some embodiments of the present disclosure. The optical system 8-1 mainly includes a top case 8-100, a bottom 8-200 and other elements disposed between the top case 8-100 and the bottom 8-200. The top case 8-100 and the bottom 8-200 may be defined as a fixed portion of the optical system 8-1.

For example, in FIG. 8-2, a substrate 8-250 (or called as first driving assembly 8-250, wherein a first driving coil 8-255 is embedded therein), a holder 8-300, a second driving assembly 8-310 (including a magnetic unit 8-312 and a second driving coil 8-314), a first resilient element 8-320, an upper spring 8-330, a lower spring 8-332, a lens unit 8-340, an aperture unit 8-400 (including a top cover 8-410, a base 8-420, an aperture 8-430, a guiding element 8-440, a bottom plate 8-450 and a third driving assembly 8-460), a frame 8-500 and a size sensor 8-700 are disposed between the top case 8-100 and the bottom 8-200. Furthermore, the optical system 8-1 further includes an image sensor 8-600 disposed on another side of the bottom 8-200 relative to the aforementioned elements. It should be noted that a portion that is movable relative to the fixed portion (e.g. the top case 8-100 and the bottom 8-200) may be defined as a movable portion (e.g. the holder 8-300 and the frame 8-500, etc.). In other words, the movable portion is movably connected to the fixed portion and may be used for holding an optical element (e.g. the lens unit 8-340).

The top case 8-100 and the bottom 8-200 may be combined with each other to form a case of the optical system 8-1. It should be noted that a top case opening 8-110 and a bottom opening 8-210 are formed on the top case 8-100 and the bottom 8-200, respectively. The center of the top case opening 8-110 corresponds to an optical axis 8-O of the lens unit 8-340, the bottom opening 8-210 corresponds to the image sensor 8-600, and the image sensor 8-600 may be disposed on the fixed portion (e.g. the bottom 8-200). As a result, the lens unit 8-340 disposed in the optical system 8-1 can perform image focusing with the image sensor 8-600 in the direction of the optical axis 8-O (i.e. the Z direction).

In some embodiments, the top case 8-100 and the bottom 8-200 may be formed by nonconductive materials (e.g. plastic), so the short circuit or electrical interference between the lens unit 8-340 and other electronic elements around may be prevented. In some embodiments, the top case 8-100 and the bottom 8-200 may be formed by metal to enhance the mechanical strength of the top case 8-100 and the bottom 8-200.

The holder 8-300 has a through hole 8-302, and the lens unit 8-340 may be fixed in the through hole 8-302. For example, the lens unit 8-340 may be fixed in the through hole 8-302 by locking, adhering, engaging, etc., and is not limited. The second driving coil 8-314 may surround on the outer surface of the holder 8-300.

The frame 8-500 includes a frame opening 8-510, and the magnetic unit 8-312 may be movably connected to the frame 8-500, and the frame 8-500 may be movably connected to the fixed portion through the first resilient element 8-320, the upper spring 8-330 and the lower spring 8-332. The magnetic unit 8-312 may be magnetic elements such as magnets or multi-pole magnets. The second driving assembly 8-310 (including the magnetic unit 8-312 and the second driving coil 8-314) is disposed in the top case 8-100 and corresponds to the lens unit 8-340 for moving the holder 8-300 relative to the frame 8-500. Specifically, a magnetic force may be created by the interaction between the magnetic unit 8-312 and the second driving coil 8-314 to move the holder 8-300 relative to the top case 8-100 along the direction of the optical axis 8-O (the Z direction) to achieve rapid focusing.

In this embodiment, the holder 8-300 and the lens unit 8-340 disposed therein are movably disposed in the top case 8-100. More specifically, the holder 8-300 may be suspended in the top case 8-100 by the upper spring 8-330, the lower spring 8-332 and the first resilient element 8-320 made of a metal material (FIG. 8-3). In some embodiments, the upper spring 8-330 and the lower spring 8-332 may be respectively disposed on two sides of the holder 8-300, and the first resilient element 8-320 may be disposed at the corner of the holder 8-300. When current is applied to the second driving coil 8-314, the second driving coil 8-314 can act with the magnetic field of the magnetic unit 8-312 to generate an electromagnetic force to move the holder 8-300 and the lens unit 8-340 along the optical axis 8-O direction relative to the top case 8-100 to achieve auto focusing.

Furthermore, the substrate 8-250 may be, for example, a flexible printed circuit (FPC), which may be affixed to the bottom 8-200 by adhesion. In this embodiment, the substrate 8-250 is electrically connected to other electronic elements disposed in the optical system 8-1 or outside the optical system 8-1. For example, the substrate 8-250 may provide electronic signal to the second driving coil 8-314 through first resilient element 8-320, the upper spring 8-330 or the lower spring 8-332 to control the movement of the holder 8-300 along X, Y or Z directions. It should be noted that a coil (e.g. the first driving coil 8-255) may be formed in the substrate 8-250. As a result, a magnetic force may be created between the substrate 8-250 and the magnetic unit 8-312 to drive the holder 8-300 to move in a direction that is parallel to the optical axis 8-O (the Z direction) or a direction that is perpendicular to the optical axis 8-O (parallel to the XY plane) to achieve auto focus (AF) or optical image stabilization (OIS).

It should be noted that the aperture unit 8-400 is disposed on the movable portion (e.g. the holder 8-300 and the frame 8-500, etc.) and corresponds to the optical element (e.g. the lens unit 8-340) carried by the movable portion. For example, in some embodiments, the aperture unit 8-400 may be affixed to the holder 8-300. As a result, the light flux entering the lens unit 8-340 may be controlled.

In some embodiments, position sensors (not shown) may be disposed in the optical system 8-1 to detect the position of the elements in the optical system 8-1. Furthermore, the size sensor 8-700 is disposed in the fixed portion for sensing the size of the aperture opening 8-434. The position sensor or the size sensor 8-700 may be suitable position sensors such as Hall, MR (Magneto Resistance), GMR (Giant Magneto Resistance), or TMR (Tunneling Magneto Resistance) sensors.

In FIG. 8-2, the aperture unit 8-400 includes the top cover 8-410, the aperture 8-430, the guiding element 8-440, the bottom plate 8-450 and the base 8-420 arranged along the optical axis 8-O. A space is formed between the top cover 8-410 and the bottom plate 8-450, and the aperture 8-430 and the guiding element 8-440 are disposed in the space to prevent the aperture 8-430 and the guiding element 8-440 from colliding with other elements when moving. At last, the aforementioned elements are disposed on the base 8-420. Furthermore, the aperture unit 8-400 further includes a third driving assembly 8-460 disposed in a recess 8-424 of the base 8-420. In some embodiments, the base 8-420 may be directly disposed on the holder 8-300, and the relative positions of the base 8-420, the holder 8-300 and the lens unit 8-340 may be fixed to achieve better imaging quality. Furthermore, when viewed in a direction perpendicular to the optical axis 8-O (i.e. a direction parallel to the XY plane), the base 8-420 partially overlaps with the frame 8-500 and the magnetic element 8-312 to achieve miniaturization.

FIGS. 8-4A to 8-4F are illustrative views of the top cover 8-410, the base 8-420, the aperture 8-430, the aperture elements 8-432 in the aperture 8-430, the guiding element 8-440 and the third driving assembly 8-460 of the aperture unit 8-400, respectively.

In FIG. 8-4A, the top cover 8-410 includes a top cover opening 8-412 and a plurality of connecting holes 8-414. The top cover opening 8-412 may allow light to pass through, and the center of the top cover opening 8-412 corresponds to the optical axis 8-O. The connecting holes 8-414 allow other elements (e.g. the aperture 8-430) being connected with the top cover 8-410. It should be noted that the plurality of connecting holes 8-414 of the top cover 8-410 are arranged in a rotational symmetry way relative to the optical axis 8-O.

FIG. 8-4B, the base 8-420 includes a base opening 8-422, a recess 8-424 and an opening 8-426. The opening 8-426 connects the recess 8-424 and a top surface 8-428 of the base 8-420. In other words, one side of the opening 8-426 is formed on the top surface 8-428, and another side of the opening 8-426 is formed in the recess 8-424. In FIG. 8-4C, the aperture 8-430 is formed by a plurality of aperture elements 8-432. It should be noted that the aperture elements 8-432 are arranged in a rotational symmetry way relative to the optical axis 8-O. In FIG. 8-4D, the aperture element 8-432 includes a plate 8-432A, a column 8-432B and a hole 8-432C integrally formed with each other, and a connecting bolt 8-432D disposed in the hole 8-432C.

In FIG. 8-4E, an opening 8-442, a plurality of guiding recesses 8-444 and a connecting hole 8-446 are formed on the guiding element 8-440. The guiding recesses 8-444 are arranged in a rotational symmetry way relative to the optical axis 8-O. In FIG. 8-4F, the third driving assembly 8-460 includes a driving magnetic element 8-462, two third driving coils 8-464 and two second resilient elements 8-466. A transmitting portion 8-468 is formed on the driving magnetic element 8-462.

The two second resilient elements 8-466 are disposed on two opposite sides of the driving magnetic element 8-462 and arranged with the driving magnetic element 8-462 along a first direction (the X or Y direction), and the two third driving coils 8-464 are disposed on the driving magnetic element 8-462 and disposed on two sides of the transmitting portion 8-468. It should be noted that the third driving coils 8-464 are wound on the driving magnetic elements 8-462. Furthermore, the third driving coil 8-464 is electrically connected to the first resilient element 8-320. The second resilient element 8-466 may be a metal sheet being compressed to apply pressure to the driving magnetic element 8-462.

Accordingly, a predetermined pressure may be directly or indirectly applied to the aperture 8-430. For example, in this embodiment, the second resilient element 8-466 may indirectly apply a predetermined pressure to the aperture 8-430 through the transmitting portion 8-468 of the driving magnetic element 8-462 and the guiding element 8-440. Afterwards, FIG. 8-4G illustrates an exploded view of the aperture unit 8-400 when viewed along the Z direction. In FIG. 8-4G, when viewed along the direction of the optical axis 8-O (the Z direction), the connecting holes 8-414 correspond to the connecting bolts 8-432D, the guiding recesses 8-444 correspond to the columns 8-32B, and the transmitting portion 8-468 corresponds to the connecting hole 8-446.

FIGS. 8-5A to 8-5C are illustrative views of the base 8-420 and the third driving assembly 8-460, the aperture 8-430 and the guiding element 8-440, and the aperture 8-430 itself under one condition. It should be noted that no current is applied to the third driving assembly 8-460 under the condition shown in FIGS. 8-5A to 8-5C.

In FIG. 8-5A, the driving magnetic element 8-462 is directly contacted to the second resilient element 8-466, and the length of the second resilient elements 8-466 at the left side and the right side are 8-L1 and 8-L2, respectively. In some embodiments, the length 8-L1 is identical to the length 8-L2. In other embodiments, the length 8-L1 is different from the length 8-L2. For example, the length 8-L1 may be greater or less than the length 8-L2, depending on design requirement.

In FIG. 8-5A, the third driving assembly 8-460 is disposed in the recess 8-424. Accordingly, it may be ensured that the optical path of light passes through the optical system 8-1 may not be influenced by the movement of the third driving assembly 8-460. At the same time, in FIG. 8-5B, the columns 8-432B are disposed in the guiding recesses 8-444, and the connecting bolts 8-432D are disposed in the connecting holes 8-414 of the top cover 8-410 (referring to FIG. 8-4G, not shown in FIG. 8-5B). Furthermore, in FIG. 8-5A, one end of the transmitting portion 8-468 is disposed in the opening 8-426 (FIG. 8-4B). Accordingly, the aperture elements 8-432 may be rotated with the connecting bolts 8-432D as rotational axes, and the columns 8-432B may slide in the guiding recesses 8-444 to control the rotation direction of the aperture elements 8-432. In FIG. 8-5C, the size of the aperture opening 8-434 is 8-D1 (predetermined size). It should be noted that the size of the aperture opening 8-434 is defined as the greatest size of the aperture opening 8-434.

FIGS. 8-6A to 8-6C are illustrative views of the base 8-420 and the third driving assembly 8-460, the aperture 8-430 and the guiding element 8-440, and the aperture 8-430 itself under one condition. It should be noted that current is applied to the third driving assembly 8-460. As a result, a magnetic driving force may be created between the driving magnetic element 8-462 and the third driving coil 8-464 to move the driving magnetic element 8-462 and the third driving coil 8-464 in the same direction.

Accordingly, when compared to what is illustrated in FIG. 8-5A, the size of the second resilient element 8-466 at the right side of FIG. 8-6A (the +X direction) may be decreased because the force endured is increased, and the size of the second resilient element 8-466 at the left side of FIG. 8-6A (the −X direction) may be increased because the force endured is decreased. In other words, the length 8-L3 in the X direction of the second resilient element 8-466 at the right side of FIG. 8-6A is less than the length 8-L1 in the X direction of the second resilient element 8-466 at the right side of FIG. 8-5A, and the length 8-L4 in the X direction of the second resilient element 8-466 at the left side of FIG. 8-6A is greater than the length 8-L2 in the X direction of the second resilient element 8-466 at the left side of FIG. 8-5A. As a result, the transmitting portion 8-468 may move right (the X direction) relative to the base 8-420.

Referring to FIG. 8-6B, when the transmitting portion 8-468 moves in the X direction, because one end of the transmitting portion 8-468 is disposed in the connecting hole 8-446 of the guiding element 8-440, the guiding element 8-440 may be rotated together, as shown by the rotation direction 8-R1. Accordingly, the columns 8-432B of the aperture elements 8-432 may be pushed by the guiding recesses 8-444 of the guiding element 8-440 (as shown by the movement direction 8-M1), and the connecting bolts 8-432D may act as axes for the aperture elements 8-432 to be rotated (as shown by the rotation direction 8-R1). As a result, referring to FIG. 8-6C, under this condition, the size 8-D2 of the aperture opening 8-434 may be greater than the size 8-D1 of the aperture opening 8-434 in FIG. 8-5C.

FIGS. 8-7A to 8-7C are illustrative views of the base 8-420 and the third driving assembly 8-460, the aperture 8-430 and the guiding element 8-440, and the aperture 8-430 itself under one condition. It should be noted that higher current is applied to the third driving assembly 8-460 in the condition of FIGS. 8-7A to 8-7C than the condition of FIGS. 8-6A to 8-6C. As a result, a higher magnetic driving force may be created between the driving magnetic element 8-462 and the third driving coil 8-464 than the condition of FIGS. 8-6A to 8-6C, and the driving magnetic element 8-462 and the third driving coil 8-464 may be moved together in the same direction.

Accordingly, compared to what is illustrated in FIG. 8-6A, the length of the second resilient element 8-466 at right (the +X direction) in FIG. 8-7A may be decreased further, and the length of the second resilient element 8-466 at left (the −X direction) in FIG. 8-7A may be increased further. In other words, the length 8-L5 of the second resilient element 8-466 in the X direction at the right side of FIG. 8-7A is less than the length 8-L3 of the second resilient element 8-466 in the X direction of FIG. 8-6A, and the length 8-L6 of the second resilient element 8-466 in the X direction at the left side of FIG. 8-7A is greater than the length 8-L4 of the second resilient element 8-466 in the X direction of FIG. 8-6A. At the same time, the transmitting portion 8-468 may move further to the right (in the X direction) relative to the base 8-420.

Afterwards, please refer to FIG. 8-7B, when the transmitting portion 8-468 of FIG. 8-7A further moves to the right (in the X direction), one end of the transmitting portion 8-468 is disposed in the connecting hole 8-446 of the guiding element 8-440, so the guiding element 8-440 may be further rotated, as shown by the rotation direction 8-R1. Accordingly, the columns 8-432B of the aperture elements 8-432 may be further pushed by the guiding recesses 8-444 of the guiding element 8-440 (as shown by the movement direction 8-M1), and the aperture elements 8-432 may be further rotated with the connecting bolts 8-432D as the rotational axes to change the size of the aperture opening 8-434. As a result, referring to FIG. 8-7C, the size 8-D3 of the aperture opening 8-434 may be greater than the size 8-D2 in FIG. 8-6C.

Similarly, if current having an opposite direction to the aforementioned embodiments is applied, the size of the aperture opening 8-434 may be decreased. For example, if positive current that may increase the size of the aperture opening 8-434 is applied in the aforementioned embodiments, the size of the aperture opening 8-434 may be decreased by applying negative current. On the other hand, if negative current that may increase the size of the aperture opening 8-434 is applied in the aforementioned embodiments, the size of the aperture opening 8-434 may be decreased by applying positive current. In other words, when current is applied to the third driving assembly 8-460, the size of the aperture opening 8-434 may be different than the size 8-D1 (predetermined size.)

For example, FIGS. 8-8A to 8-8C are illustrative views of the base 8-420 and the third driving assembly 8-460, the aperture 8-430 and the guiding element 8-440, and the aperture 8-430 itself under one condition. It should be noted that, in comparison with the aforementioned embodiments, the opposite current is applied to the third driving assembly 8-460 in the condition of FIGS. 8-8A to 8-8C. As a result, a magnetic driving force having an opposite direction to the aforementioned embodiments may be created between the driving magnetic element 8-462 and the third driving coil 8-464 to drive the driving magnetic element 8-462 to move in the opposite direction than the aforementioned embodiments.

Accordingly, when compared to what is illustrated in FIG. 8-5A, the length of the second resilient element 8-466 at right (the +X direction) in FIG. 8-8A may be increased, and the length of the second resilient element 8-466 at left (the −X direction) in FIG. 8-8A may be increased. In other words, the length 8-L7 of the second resilient element 8-466 in the X direction at the right side of FIG. 8-8A is greater than the length 8-L1 of the second resilient element 8-466 in the X direction at the right side of FIG. 8-5A, and the length 8-L8 of the second resilient element 8-466 in the X direction at the left side of FIG. 8-8A is less than the length 8-L2 of the second resilient element 8-466 in the X direction at the left side of FIG. 8-5A. At the same time, the transmitting portion 8-468 may be moved to the left (the −X direction) relative to the base 8-420.

Afterwards, as illustrated in FIG. 8-8B, when the transmitting portion 8-468 of FIG. 8-7A moves to the left, one end of the transmitting portion 8-468 is disposed in the connecting hole 8-446 of the guiding element 8-440, so the guiding element 8-440 may be rotated together, as shown by the rotation direction 8-R2. Accordingly, the columns 8-432B of the aperture elements 8-432 may be pushed by the guiding recesses 8-444 of the guiding element 8-440 in a different direction than the aforementioned embodiments (as shown by the movement direction 8-M2), and the aperture elements 8-432 may be rotated with the connecting bolts 8-432D as the rotational axes, as shown by the rotation direction 8-R2. As a result, referring to FIG. 8-8C, the size 8-D4 of the aperture opening 8-434 may be less than the size 8-D1 in FIG. 8-5C.

In this configuration, the size of the aperture opening 8-434 may be continuously adjusted by applying different amounts of current to the third driving assembly 8-460. In other words, the size of the aperture opening 8-434 may be arbitrarily adjusted (e.g. size 8-D1, 8-D2, 8-D3, 8-D4 or other size) within a specific range, and the aperture opening 8-434 has a rotational symmetry structure relative to the optical axis 8-O in every conditions. However, the present disclosure is not limited thereto. For example, in some embodiments, the size of the aperture opening 8-434 may be adjusted in a multistage way.

In general, when the size of the aperture opening 8-434 is enlarged, the incident light flux may also be increased, so this aperture opening 8-434 may be applied in an environment having low brightness. Furthermore, the influence of background noises may be decreased to avoid image noise.

Moreover, the sharpness of the image received may be increased if the size of the aperture opening 8-434 is decreased in a high-brightness environment, and the image sensor 8-600 may also be prevented from overexposure. In some embodiments, the aperture unit 8-400 may be affixed to the lens unit 8-340 to move the aperture unit 8-400 and the holder 8-300 together. Accordingly, the required element amount may be decreased to achieve miniaturization. Furthermore, in some embodiments, the aperture unit 8-400 may be affixed to the top case 8-100, and the optical image stabilization or auto focus may be achieved by moving the lens unit 8-340 to reduce the amount of the required element. As a result, miniaturization may be achieved.

It should be noted that in some embodiments, the magnetic unit 8-312 may be omitted, and the elements in the optical system 8-1 may be moved merely by the magnetic driving force generated between the driving magnetic element 8-462 and the first driving coil 8-255 or the second driving coil 8-314. In other words, the driving magnetic element 8-462 may correspond to the first driving coil 8-255 or the second driving coil 8-314, or the magnetic field of the driving magnetic element 8-462 may interact with the first driving coil 8-255 or the second driving coil 8-314.

Furthermore, in some embodiments, a control unit (not shown) may be provided in the optical system 8-1 to control the size of the aperture opening 8-434. Predetermined information including the relationship between the current (or voltage) of the third driving assembly 8-460 and the size of the aperture opening 8-434 is stored in the control unit. Accordingly, the size sensor 8-700 may be omitted, and the size of the aperture opening 8-434 may be controlled by this predetermined information without the size sensor 8-700. The predetermined information may be obtained by measuring the relationship between the current (or voltage) of the third driving assembly 8-460 and the size of the aperture opening 8-434 using an external measuring apparatus, and then storing this relationship as predetermined information in the control unit. Afterwards, the external measuring apparatus may not stay in the optical system 8-1.

In this embodiment, the third driving assembly 8-460 is driven by electromagnetic force, but the present disclosure is not limited thereto. For example, the second resilient element 8-466 may be replaced by shape memory alloys, piezoelectric materials, etc., for driving the third driving assembly 8-460. As a result, design flexibility may be increased to fulfill different requirements. Furthermore, the optical system 8-1 may be applied in the optical modules 1-A1000, 1-A2000, 1-A3000, 1-B2000, 1-C2000, 1-D2000 and 12-2000 in some embodiments of the present disclosure.

In summary, an optical system that can continuously control the size of the aperture opening is provided in the present disclosure. Accordingly, different user requirements of image capturing may be fulfilled. Furthermore, the aperture unit may be disposed on the movable portion and no additional driving element is required to drive the aperture unit, so that miniaturization may be achieved. Moreover, a control unit having predetermined information is provided outside the optical system, so the position sensor used in conventional optical systems may be omitted to further achieve miniaturization.

Ninth Group of Embodiments

Firstly, referring to FIGS. 9-1, 9-2 and 9-3, which are a perspective view, an exploded view and a cross sectional view illustrated along a line 9-A-9-A' in FIG. 9-1 of an aperture unit 9-1, according to some embodiments of the present disclosure. The aperture unit 9-1 mainly includes a top plate 9-100, a bottom 9-200, a bottom plate 9-300 and other elements disposed between the top plate 9-100, the bottom 9-200 and the bottom plate 9-300. For example, in FIG. 9-2, a spacer 9-400, a first blade 9-420, a second blade 9-430, a guiding element 9-500, a driving assembly 9-600 and an initial position limiting assembly 9-700 are disposed between the top plate 9-100, the bottom 9-200 and the bottom plate 9-300.

The top plate 9-100, the bottom 9-200 and the bottom plate 9-300 may be combined with each other to form a case of the aperture unit 9-1. It should be noted that a top plate opening 9-110, a bottom opening 9-210 and a bottom plate opening 9-310 are formed on the top plate 9-100, the bottom 9-200 and the bottom plate 9-300, respectively. The centers of the top plate opening 9-110, the bottom opening 9-210 and the bottom plate opening 9-310 correspond to an optical axis 9-O of the aperture unit 9-1. In some embodiments, the top plate 9-100, the bottom 9-200 and the bottom plate 9-300 may be made of nonconductive materials (e.g. plastic), so the short circuit or electrical interference between the aperture unit 9-1 and other electronic elements around may be prevented. In some embodiments, the top plate 9-100, the bottom 9-200 and the bottom plate 9-300 may be made of metal to enhance the mechanical strength of the top plate 9-100, the bottom 9-200 and the bottom plate 9-300.

A plurality of fixed columns 9-220 are formed on one side of the bottom 9-200, and the positions of the fixed columns 9-220 correspond to first connecting holes 9-102 and second connecting holes 9-104 of the top plate 9-100, first connecting holes 9-402 and second connecting holes 9-404 of the spacer 9-400, a fixed connecting hole 9-422 of the first blade 9-420, a fixed connecting hole 9-432 of the second blade 9-430 and guiding recesses 9-540 of the guiding element 9-500 in a direction parallel to the optical axis 9-O (the Z direction). Furthermore, a plurality of positioning columns 9-250 are formed on another side of the bottom 9-200 (FIG. 9-4C), and the positioning columns 9-250 correspond to holes 9-330 of the bottom plate 9-300 in a direction parallel to the optical axis 9-O. A guiding element opening 9-510 is formed in the guiding element 9-500, and the center of the guiding element opening 9-510 corresponds to the optical axis 9-O of light passing through the aperture unit 9-1.

Furthermore, a plurality of columns 9-520 are formed on one side of the guiding element 9-500 and correspond to the second connecting holes 9-104 of the top plate 9-100, the second connecting holes 9-404 of the spacer 9-400, a movable connecting hole 9-424 of the first blade 9-420 and a movable connecting hole 9-434 of the second blade 9-430 in a direction parallel to the optical axis 9-O. A plurality of columns 9-530 are formed on another side of the guiding element 9-500 and correspond to guiding recesses 9-230 of the bottom 9-200 (FIG. 9-4B), recesses 9-320 of the bottom plate 9-300 and recesses 9-644 of an insulating plate 9-640 (FIG. 9-4G) in a direction parallel to the optical axis 9-O.

In some embodiments, the portions that do not move may be defined as fixed portions, such as the top plate 9-110, the bottom 9-200, the bottom plate 9-300 and the insulating plate 9-640 (FIG. 9-4G), etc. The portions that may move relative to the fixed portions may be defined as movable portions, such as the guiding element 9-500, etc. In other words, the movable portion is movably connected to the fixed portion. Furthermore, the top plate opening 9-110, the bottom opening 9-210, the bottom plate opening 9-310 or the insulating plate opening 9-642 (FIG. 9-4G) may be defined as fixed portion openings, and the guiding element opening 9-510 may be defined as a movable portion opening. It should be noted that the size of the fixed portion opening is different from the size of the movable portion opening. Furthermore, the bottom 9-200 is disposed between the driving assembly 9-600 and the guiding element 9-500.

FIG. 9-4A is a top view of the top plate 9-100. In FIG. 9-4A, the second connecting hole 9-104 of the top plate 9-100 includes a first portion 9-104A and a second portion 9-104B. The first portion 9-104A has a shape similar to a circular shape, and the second portion 9-104B has a shape similar to a strip (i.e. the size of the second portion 9-104B of the X direction is greater than the size of the second portion 9-104B in the Y direction), and the size of the first portion 9-104A in the X direction is less than the size of the second portion 9-104B in the X direction. The fixed column 9-220 of the bottom 9-200 in FIG. 9-2 may be disposed in the first portion 9-104A. Because the size of the second portion 9-104B in the X direction is greater than the size of the second portion 9-104B in the Y direction, the columns 9-520 of the guiding element 9-500 may slide in the X direction in the second portion 9-104B.

FIGS. 9-4B and 9-4C are top view and bottom view of the bottom 9-200, respectively. The fixed columns 9-220 are positioned on one side of the bottom 9-200 facing the top plate 9-100 (FIG. 9-2), and the positioning columns 9-250 are positioned on one side of the bottom 9-200 facing the bottom plate 9-300. In other words, the fixed columns 9-220 extend in the Z direction, and the positioning columns in the −Z direction. The bottom 9-200 is penetrated by the guiding recesses 9-230 of the bottom 9-200, and the guiding recesses 9-230 have a shape similar to a strip (i.e. the size of the guiding recess 9-230 in the X direction is greater than the size of the guiding recess 9-230 in the Y direction). As a result, the columns 9-530 of the guiding element 9-500 (FIG. 9-2) may be disposed in the guiding recesses 9-230, and the columns 9-530 may slide in the guiding recesses 9-230 in the X direction. Furthermore, a plurality of holes 9-240 are formed on the bottom 9-200 and pass through the bottom 9-200. Grounding clamping portions 9-630 of the driving assembly 9-600 (FIG. 9-4G) may be disposed in the holes 9-240.

FIG. 9-4D is a top view of the bottom plate 9-300. In FIG. 9-4D, the bottom plate 9-300 includes two recesses 9-320 aligned with each other in the X direction, and the holes 9-330 are positioned at the corners of the bottom plate 9-300. Accordingly, the columns 9-530 of the guiding element 9-500 may be disposed in the recesses 9-320 to limit the movement of the guiding element 9-500 in the Y direction, and the columns 9-530 are allowed to move in the recesses 9-320 in the X direction, so the guiding element 9-500 may be moved in the X direction. Furthermore, the positioning columns 9-250 of the bottom 9-200 may pass through the holes 9-330, so the relative positions of the bottom 9-200 and the bottom plate 9-300 may be positioned.

FIG. 9-4E is a top view of the spacer 9-400, the first blade 9-420 and the second blade 9-430. The spacer 9-400 includes a spacer opening 9-410, the first blade 9-420 and the second blade 9-430 are disposed on two sides of the optical axis 9-O, and the spacer 9-400 is disposed between the first blade 9-420 and the second blade 9-430 to prevent the first 9-420 and the second blade 9-430 from colliding with each other. Furthermore, round corners or chamfers may be formed at where the first blade 9-420 or the second blade 9-430 contacts the spacer 9-400 to prevent damage or debris from occurring when the first blade 9-420 or the second blade 9-430 collides the spacer 9-400. The second connecting hole 9-404 of the spacer 9-400 includes a first portion 9-404A and a second portion 9-404B. The shapes of the first portion 9-404A and the second portion 9-404B are identical or similar to the shapes of the first portion 9-104A and the second portion 9-104B of the top plate 9-100, respectively. In other words, the first portion 9-404A has a shape similar to a circular shape, and the second portion 9-404B has a shape similar to a strip (the size of the second portion 9-404B in the X direction is greater than the size of the second portion 9-404B in the Y direction), and the size of the first portion 9-404A in the X direction is less than the size of the second portion 9-404B in the X direction.

The fixed columns 9-220 may be disposed in the first portion 9-404A, the fixed connecting hole 9-422 and the fixed connecting hole 9-432 to position the positions of the spacer 9-400, the first blade 9-420 and the second blade 9-430. The columns 9-520 may pass through the second portion 9-404B, the movable connecting hole 9-424 and the movable connecting hole 9-434, and may slide in the second portion 9-404B in the X direction. The first blade 9-420 and the second blade 9-430 include an arc portion 9-426 and an arc portion 9-436, respectively. In some embodiments, the arc portion 9-426 may be combined with the arc portion 9-436 to form a hole having a shape similar to a circular shape (which will be described later). It should be noted than the size 9-D4 of the hole formed from the arc portion 9-426 and the arc portion 9-436 (shown in FIG. 9-7B) is less than the size 9-D1 of the spacer opening 9-410 (i.e. the fixed portion opening).

Furthermore, in some embodiments, the movable connecting hole 9-424 of the first blade 9-420 and the movable connecting hole 9-434 of the second blade 9-430 correspond to different second portions 9-404B of the second connecting holes 9-404. In other words, when viewed along the optical axis 9-O (i.e. the Z direction), the movable connecting hole 9-424 of the first blade 9-420 and the movable connecting hole 9-434 of the second blade 9-430 are positioned in different second portions 9-404B of the second connecting holes 9-404 of the spacer 9-400, respectively. As a result, when viewed along the optical axis 9-O (the Z direction), either the first blade 9-420 or the second blade 9-430 and the spacer 9-400 at least partially overlap.

FIG. 9-4F is a top view of the guiding element 9-500. A guiding element opening 9-510, columns 9-520, columns 9-530 and guiding recesses 9-540 are formed on the guiding element 9-500. The greatest size 9-D2 of the guiding element opening 9-510 in a first direction (the X direction) is greater than the greatest size 9-D3 of the guiding element opening 9-510 in a second direction (the Y direction). It should be noted that when measuring the size 9-D2 and 9-D3, both of them are measured by measuring the lengths passing through the optical axis 9-O in FIG. 9-4F. Furthermore, the sizes 9-D2 and 9-D3 are greater than the size 9-D1 of the fixed portion opening when viewed along the optical axis 9-O.

In FIG. 9-4F, the two columns 9-520 of the guiding element 9-500 may be substantially positioned at opposite sides of the optical axis 9-O, and the columns 9-530 may also be positioned at opposite sides of the optical axis 9-O and arranged in the X direction. A plurality of guiding recesses 9-540 are formed on the guiding element 9-500, and the size 9-L1 of the guiding recess 9-540 in the X direction is greater than the size 9-L2 of the guiding recess 9-540 in the Y direction. In other words, the guiding recess 9-540 has a strip-liked shape and is extended in the X direction. Accordingly, the fixed columns 9-220 of the bottom 9-200 may be disposed in the guiding recesses 9-540 to limit the movement of the guiding element 9-500 (i.e. the movable portion) in the Y direction relative to the bottom 9-200 (i.e.

the fixed portion), and the guiding element 9-500 is allowed to move relative to the bottom 9-200 in the X direction.

FIG. 9-4G is a schematic view of the driving assembly 9-600. The driving assembly 9-600 includes a first bias element 9-610, a second bias element 9-620, a grounding clamping portion 9-630 and an insulating plate 9-640. The insulating plate 9-640 is positioned between the first bias element 9-610 and the second bias element 9-620 and includes an insulating plate opening 9-642, two recesses 9-644 and two W-shaped structures 9-646. The two recesses 9-644 are arranged in the X direction and the two W-shaped structures 9-646 are substantially arranged in the Y direction.

The first bias element 9-610 and the second bias element 9-620 may be, for example, a linear element formed from shape memory alloys (SMA). In other words, the shape of the first bias element 9-610 and the second bias element 9-620 may be changed (e.g. getting longer or shorter) when the temperature of the first bias element 9-610 or the second bias element 9-620 is beyond their phase transform temperature. Furthermore, an insulating layer maybe formed on the surface of the first bias element 9-610 or the second bias element 9-620 to prevent short circuit from happening when the first bias element 9-610 and the second bias element 9-620 are contacted with each other, or when the first bias element 9-610 or the second bias element 9-620 is contacted with other elements.

Two ends of the first bias element 9-610 and two ends the second bias element 9-620 are respectively affixed in the grounding clamping portion 9-630, and the first bias element 9-610 is electrically connected to the second bias element 9-620 through the grounding clamping portion 9-630. The grounding clamping portion 9-630 is disposed in the W-shaped structure 9-646 and pass through the hole 9-240 of the bottom 9-200 (FIG. 9-4B) to provide grounding for the aperture unit 9-1 and to prevent the grounding clamping portion 9-630 being directly connected with the insulating plate 9-460.

The first bias element 9-610 and the second bias element 9-620 include a bending portion 9-612 and a bending portion 9-622, respectively. Furthermore, in some embodiments, resin adhesives 9-650 may be disposed on the first bias element 9-610 and the second bias element 9-620 to fix the relative positions of the first bias element 9-610 and the second bias element 9-620 with other elements (e.g. the columns 9-530) and to protect the first bias element 9-610 and the second bias element 9-620. For example, the resin adhesive 9-650 may be disposed at the bending portion 9-612 and the bending portion 9-622. The resin adhesive 9-650 may be suitable resins such as gel.

Furthermore, the first bias element 9-610 and the second bias element 9-620 are disposed at two sides of the insulating plate 9-640, so the first bias element 9-610 and the second bias element 9-620 are positioned at different planes. In other words, the first bias element 9-610 and the second bias element 9-620 are positioned at a first virtual plane (not shown) and the second virtual plate (not shown), respectively, and the first virtual plate and the second virtual plate do not fully overlap. Furthermore, as shown in FIG. 9-4G, when viewed along the optical axis (the Z direction), the first bias element 9-610 and the second bias element 9-620 partially overlap one another (as shown by the intersection 9-1).

FIG. 9-5A is a top view of the guiding element 9-500 and the driving assembly 9-600 under one condition, wherein no tension is applied to the first bias element 9-610 or the second bias element 9-620 (e.g. no current is applied). In other words, the movable portion is positioned at a predetermined position. It should be noted that the movable portion (e.g. the guiding element 9-500) may be positioned at this predetermined position relative to the fixed portion (e.g. the top plate 9-100 and the bottom 9-200) through the initial position limiting assembly 9-700 (e.g. spring, magnetic element, etc.) disposed between the top plate 9-100 and the bottom 9-200 (fixed portion). In FIG. 9-5A, the size of the insulating plate opening 9-642 (the fixed portion opening) is greater than the size of the guiding element opening 9-510 (movable portion opening). In other words, the size of the fixed portion opening is different from the size of the movable portion opening.

It should be noted that the bending portion 9-612 of the first bias element 9-610 and the bending portion 9-622 of the second bias element 9-620 are positioned on different columns 9-530. Accordingly, when tension is applied to the first bias element 9-610 or the second bias element 9-620 (e.g. the tension may be created by passing current to the first bias element 9-610 or the second bias element 9-620 to increase their temperature, and the first bias element 9-610 or the second bias element 9-620 may shrink if the temperature is beyond the phase bending portion temperature of the shape memory alloys), a force may be applied to the columns 9-530 at the bending portion 9-612 or the bending portion 9-622 to push the guiding element 9-500. For example, if tension is applied to the first bias element 9-610, the guiding element 9-500 may be pushed in the –X direction through the column 9-530. Furthermore, if tension is applied to the second bias element 9-620, the guiding element 9-500 may be pushed in the X direction through the column 9-530.

FIG. 9-5B is a top view of the spacer 9-400, the first blade 9-420, the second blade 9-430 and the guiding element 9-500 under the conditions illustrated in FIG. 9-5A. It should be noted that in the present condition, the size 9-D1 of the spacer opening 9-410 is less than the size of the guiding element opening 9-510 (9-D2 or 9-D3). Furthermore, the first blade 9-420 and the second blade 9-430 do not overlap the spacer opening 9-410 in FIG. 9-5B. As a result, the light passes through the aperture unit 9-1 does not be blocked by either the guiding element opening 9-510, the first blade 9-420 or the second blade 9-430 under these conditions, and an equivalent aperture size of the aperture unit 9-1 is substantially equal to the size 9-D1 of the spacer opening 9-410.

FIG. 9-6A is a top view of the guiding element 9-500 and the driving assembly 9-600 under another condition, wherein tension having a tension direction 9-T1 is applied to the first bias element 9-610 (e.g. applying current to the first bias element 9-610 to heat up the first bias element 9-610), and no tension is applied to the second bias element 9-620. As a result, the column 9-530 may be pushed by the first bias element 9-610 at the bending portion 9-612 to allow the column 9-530 sliding in the recess 9-644 along the –X direction (as shown by the sliding direction 9-M1). As a result, the whole guiding element 9-500 may be moved in the –X direction. Furthermore, the second bias element 9-620 may be stretched by the guiding element 9-500 moving in the –X direction, as shown by the elongation direction 9-E1. At the same time, the column 9-530 contacting with the bending portion 9-622 may also slide in the recess 9-644 in the –X direction. In other words, the driving assembly 9-600 may drive the guiding element 9-500 (the movable portion) to move relative to the bottom 9-200 (the fixed portion) in a first moving dimension. It should be noted that the "first moving dimension" means a translational movement on the XY plane, and the first direction (the Y direction) and the second direction (the X direction) are parallel to the first moving dimension. However, the present disclosure is not limited thereto.

FIG. 9-6B is a top view of the spacer 9-400, the first blade 9-420, the second blade 9-430 and the guiding element 9-500 under the conditions illustrated in FIG. 9-6A. Because the guiding element 9-500 slides in the −X direction (as shown by the sliding direction 9-M1), the columns 9-520 disposed in the movable connecting hole 9-424 and the movable connecting hole 9-434 may drive the first blade 9-420 and the second blade 9-430 to rotate with the fixed columns 9-220 (FIG. 9-4B) disposed in the fixed connecting hole 9-422 and the fixed connecting hole 9-432 acting as rotational axes. In other words, the first blade 9-420 and the second blade 9-430 are movably connected to the movable portion and the fixed portion under these conditions.

It should be noted that the fixed connecting hole 9-422 of the first blade 9-420 is positioned between the movable connecting hole 9-424 and the arc portion 9-426, and the movable connecting hole 9-434 and the arc portion 9-436 of the second blade 9-430 are positioned at the same side of the fixed connecting hole 9-432. Accordingly, when the guiding element 9-500 slide in the −X direction (as shown by the sliding direction 9-M1), the first blade 9-420 and the second blade 9-430 may be rotated together in the same rotation direction. For example, in FIG. 9-6B, the first blade 9-420 and the second blade 9-430 may be rotated together in a rotation direction 9-R1 (the counterclockwise direction in FIG. 9-6B). In other words, when the guiding element 9-500 (the movable portion) moves relative to the bottom 9-200 (fixed portion) in the first moving dimension (translational movement on the XY plane), the first blade 9-420 is driven by the guiding element 9-500 (movable portion) to move in a second moving dimension relative to the bottom 9-200 (the fixed portion).

It should be noted that the "second moving dimension" means rotational movement, and the first moving dimension (translational movement) is different from the second moving dimension (rotational movement). However, the present disclosure is not limited thereto. For example, the structure of the aperture unit provided in some embodiments of the present disclosure may be adjusted appropriately to allow the first moving dimension and the second moving dimension being other different dimensions. For example, in some embodiments, the first moving dimension may be rotational movement, and the second moving dimension may be translational movement. In some embodiments, the first moving dimension and the second moving dimension may be rotational movements having different directions or translational movements having different directions.

FIG. 9-7A is a top view of the guiding element 9-500 and the driving assembly 9-600 under another condition, wherein tension is further applied to the first bias element 9-610 (e.g. applying a stronger current than the current of the condition in FIG. 9-6A to the first bias element 9-610 to heat up the first bias element 9-610), and no current is applied to the second bias element 9-620. As a result, when compared to what is illustrated in FIG. 9-6A, if the first bias element 9-610 is made of shape memory alloys, the first bias element 9-610 may shrink further to allow the guiding element 9-500 further sliding in the recesses 9-644 in the −X direction (as shown by the sliding direction 9-M1).

FIG. 9-7B is a top view of the spacer 9-400, the first blade 9-420, the second blade 9-430 and the guiding element 9-500 under the conditions illustrated in FIG. 9-7A. Because the guiding element 9-500 further slides in the −X direction, the columns 9-520 of the guiding element 9-500 may drive the first blade 9-420 and the second blade 9-430 to further rotate in the rotation direction 9-R1 (the second moving dimension). Accordingly, the arc portion 9-426 of the first blade 9-420 may be combined with the arc portion 9-436 of the second blade 9-430 to form a circular opening 9-440, and the equivalent aperture size of the aperture unit 9-1 is the size 9-D4 of the circular opening 9-440.

The size 9-D4 of the circular opening 9-440 is less than the size 9-D1 of the spacer opening 9-410, so the aperture of the aperture unit 9-1 may be switched to different equivalent apertures having different sizes to meet various requirements of image capturing. In general, when the size of the equivalent aperture is enlarged, the incident light flux may also be increased, so this kind of aperture may be applied in an environment having low brightness. Furthermore, the influence of background noise may be decreased to avoid image noise. Moreover, the sharpness of the image received may be increased if the size of the equivalent aperture is decreased in a high-brightness environment, and overexposure may also be prevented. Moreover, when the first bias element 9-610 and the second bias element 9-620 are made of shape memory alloys, it is allowed to rapidly switch apertures having different sizes because the shape memory alloys are sensitive to temperature. As a result, the flexibility of the image capturing device may be increased.

When it is desired to switch the aperture from a smaller aperture having the size 9-D4 (which is formed from the arc portion 9-426 of the first blade 9-420 and the arc portion 9-436 of the second blade 9-430) to a greater aperture having the size 9-D1 of the spacer opening 9-410, tension may be applied to another bias element to allow the guiding element 9-500 sliding toward another direction. For example, FIG. 9-8A is a top view of the guiding element 9-500 and the driving assembly 9-600 under another condition, wherein current is passed to the second bias element 9-620 to heat up the second bias element 9-620, and no current is applied to the first bias element 9-610. Accordingly, tension may be applied to the second bias element 9-620 (as shown by the tension direction 9-T2) for driving the column 9-530 of the guiding element 9-500 at the bending portion 9-622. Therefore, the guiding element 9-500 may slide in the X direction in the recess 9-644 (as shown by the sliding direction 9-M2), thus allowing the aperture unit 9-1 to be switched from the condition shown in FIG. 9-7A to the condition shown in FIG. 9-5D. Furthermore, under these conditions, the first bias element 9-610 may be stretched by the column 9-530 of the guiding element 9-500 (as the elongation direction 9-E2).

FIG. 9-8B is a top view of the spacer 9-400, the first blade 9-420, the second blade 9-430 and the guiding element 9-500 under the conditions illustrated in FIG. 9-8A. Because the guiding element 9-500 slides in the X direction, the columns 9-520 disposed in the movable connecting hole 9-424 and the movable connecting hole 9-434 may drive the first blade 9-420 and the second blade 9-430 rotating to a different direction to the direction shown in FIG. 9-7B (i.e. the clockwise direction in FIG. 9-8B, as shown by the rotation direction 9-R2) with the fixed columns 9-220 (FIG. 9-4D) disposed in the fixed connecting hole 9-422 and the fixed connecting hole 9-432 acting as rotational axes. Furthermore, if additional current is applied to the second bias element 9-620, the second bias element 9-620 may shrink further to allow the first blade 9-420, the second blade 9-430 and the guiding element 9-500 returning to the condition shown in FIGS. 9-5A and 9-5B. Accordingly, it is allowed to switch aperture unit 9-1 from having a smaller aperture (e.g. an aperture having the size 9-D4) to a greater aperture (e.g. an aperture having the size 9-D1 of the spacer opening 9-410).

The aperture unit 9-1 may be disposed in image capturing devices that require apertures. For example, the aperture unit 9-1 may be disposed in a periscope image capturing device to meet the thickness requirement of mobile electronic devices. No additional magnetic element is provided to rotate the first blade 9-420 and the second blade 9-430 in the present embodiments, so magnetic interference between the aperture unit 9-1 and other external elements may be prevented, and miniaturization may also be achieved. Moreover, the top plate 9-100, the first blade 9-420, the spacer 9-400 and the second blade 9-430 (also referred as an aperture portion) is closer to the incident of the light than the guiding element 9-500, the driving assembly 9-600, the bottom 9-200 and the bottom plate 9-300 (also referred as a driving portion), so better optical effect (e.g. better image capturing quality) may be achieved, and miniaturization may be achieved. In some embodiments, the bottom 9-200 may be fixed to an optical unit (e.g. a lens, not shown) to enhance the quality of received images. Furthermore, the aperture unit 9-1 may be applied in the optical modules 1-A1000, 1-A2000, 1-A3000, 1-B2000, 1-C2000, 1-D2000 and 12-2000 in some embodiments of the present disclosure.

In summary, an aperture unit that can switch its aperture size is provided in the present disclosure. The aperture unit is suitable for mobile small electronic devices and can increase the quality of image capturing. Furthermore, magnetic interference may be prevented, and miniaturization may be achieved by using this aperture unit. Moreover, the aperture unit provided in the present disclosure allows apertures having different sized to be switched rapidly to increase the efficiency of image capturing.

Tenth Group of Embodiments

Firstly, referring to FIGS. 10-1, 10-2 and 10-3, which are a perspective view, an exploded view and a cross sectional view illustrated along a line 10-A-10-A' in FIG. 10-1 of an aperture unit 10-1, according to some embodiments of the present disclosure. The aperture unit 10-1 mainly includes a top plate 10-100, a bottom 10-200, a bottom plate 10-300 and other elements disposed between the top plate 10-100, the bottom 10-200 and the bottom plate 10-300. For example, in FIG. 10-2, an aperture 10-400 (includes two first blades 10-410 and two second blades 10-420), a guiding element 10-500, a driving assembly 10-600 (includes a magnetic element 10-610, a driving substrate 10-620 and a circuit board 10-630), sliding elements 10-700 and a sensor 10-800 are disposed between the top plate 10-100, the bottom 10-200 and the bottom plate 10-300.

The top plate 10-100, the bottom 10-200 and the bottom plate 10-300 may be combined with each other to form a case of the aperture unit 10-1. It should be noted that a top plate opening 10-110, a bottom opening 10-210 and a bottom plate opening 10-310 are formed on the top plate 10-100, the bottom 10-200 and the bottom plate 10-300, respectively. The centers of the top plate opening 10-110, the bottom opening 10-210 and the bottom plate opening 10-310 correspond to an optical axis 10-O of the aperture unit 10-1. In some embodiments, the top plate 10-100, the bottom 10-200 and the bottom plate 10-300 may be made of nonconductive materials (e.g. plastic), so the short circuit or electrical interference between the aperture unit 10-1 and other electronic elements around may be prevented. In some embodiments, the top plate 10-100, the bottom 10-200 and the bottom plate 10-300 may be made of metal to enhance the mechanical strength of the top plate 10-100, the bottom 10-200 and the bottom plate 10-300.

The aperture 10-400, the guiding element 10-500 and the driving assembly 10-600 may be disposed between the top plate 10-100 and the bottom 10-200 in order. In other words, the driving assembly 10-600 is disposed between the guiding element 10-500 and the bottom 10-200. In the aperture 10-400, the two first blades 10-410 are arranged in a first direction (the X or Y direction), the two second blades 10-420 are arranged in a second direction (the Y or X direction), and the first direction and the second direction are different, such as perpendicular to each other. Furthermore, the two first blades 10-410 are positioned on different XY planes, and the two second blades 10-420 are also positioned on different XY planes. As a result, the first blades 10-410 and the second blades 10-420 are allowed to partially overlap along the optical axis, and the friction between the blades may be reduced.

In some embodiments, the portions that do not move, such as the top plate 10-100, the bottom 10-200 and the bottom plate 10-300, may be defined as fixed portions, and the portions that may move relative to the fixed portions may be defined as movable portions, such as the guiding element 10-500, etc. The sliding elements 10-700, such as balls, may be disposed between the guiding element 10-500 and the bottom 10-200 (fixed portion) to allow the guiding element 10-500 (movable portion) sliding relative to the bottom 10-200 (fixed portion).

The sensor 10-800 may be used to detect the positions of the elements in the aperture unit 10-1. The sensor 10-800 may be suitable position sensors such as Hall, MR (Magneto Resistance), GMR (Giant Magneto Resistance), or TMR (Tunneling Magneto Resistance) sensors. Furthermore, an initial position limiting assembly (not shown) such as a spring or a magnetic element maybe disposed in the aperture unit 10-1, when the driving assembly 10-600 does not drive the guiding element 10-500, the guiding element 10-500 may be positioned at a predetermined position relative to the fixed portion by the initial position limiting assembly.

FIG. 10-4A is a top view of the top plate 10-100. The top plate 10-100 includes a top plate opening 10-110, and two first top plate recesses 10-120 and two second top plate recesses 10-130 surrounding the top plate opening 10-110. Furthermore, two positioning holes 10-140 are formed on the top plate 10-100. In some embodiments, the two first top plate recesses 10-120 may be symmetric relative to the optical axis 10-O, and the two second top plate recesses 10-130 may also be symmetric relative to the optical axis 10-O, but the present disclosure is not limited thereto. Furthermore, in some embodiments, the width of the first top plate recess 10-120 is different than the width of the second top plate recess 10-130. Accordingly, elements disposed in the first top plate recess 10-120 and the second top plate recess 10-130 may have different sizes to increase design flexibility.

FIG. 10-4B is a schematic view of the bottom 10-200. The bottom 10-200 includes a bottom opening 10-210, a protective structure 10-220 and a recess 10-230 surrounding the bottom opening 10-210, a plurality of guiding recesses 10-232, a positioning recess 10-234, a plurality of protrusions 10-240, protrusions 10-242 and positioning columns 10-244 and a concave portion 10-250 in the recess 10-230.

The bottom opening 10-210 is surrounded by the protective structure 10-220, and the protective structure 10-220 extends along the optical axis 10-O. Accordingly, dust from external may be prevented from entering the aperture unit 10-1, or fragment that may be created during the operation of the aperture unit 10-1 may be prevented from falling out from the aperture unit 10-1 to affect other elements (such as other elements in an image capturing device). The bottom opening 10-210 and the protective structure 10-220 are surrounded by the recess 10-230. Other elements, such as the driving assembly 10-600, may be disposed in the recess 10-230 to fix the position of the elements and protect these elements. A plurality of guiding recesses 10-232 and a positioning recess 10-234 may be formed on the bottom 10-200, wherein the guiding recesses 10-232 may be arranged in a rotational symmetric way relative to the optical axis 10-O, and the positioning recess 10-234 may be disposed between two guiding recesses 10-232.

Furthermore, a plurality of protrusions 10-240, protrusions 10-242 and positioning columns 10-244 extended along the optical axis 10-O (or toward the first blade 10-410) are formed on the bottom 10-200. The positions of the positioning columns 10-244 correspond to the positioning holes 10-140 of the top plate 10-100 (FIG. 10-4A) along the optical axis 10-O to allow the relative position between the top plate 10-100 and the bottom 10-200 being fixed.

In this embodiment, the protrusions 10-240, the protrusions 10-242 and the positioning columns 10-244 may be arranged symmetrically relative to the optical axis 10-O to balance the stress in the aperture unit 10-1. However, the present disclosure is not limited thereto. For example, the positions of the protrusions 10-240, the protrusions 10-242 and the positioning columns 10-244 may be changed. In some embodiments, the sensor 10-800 may be disposed in the concave portion 10-250 to fix the position of the sensor 10-800, but the present disclosure is not limited thereto. For example, the sensor 10-800 may be disposed at other suitable positions to meet desired requirements.

FIG. 10-4C is a schematic view of the bottom plate 10-300. A bottom plate opening 10-310 is formed in the bottom plate 10-300, a concave structure 10-320 is formed on one side of the bottom plate opening 10-310 and corresponds to the concave portion 10-250 of the bottom 10-200 in FIG. 10-4B. Therefore, the sensor 10-800 is allowed to be disposed in the concave structure 10-320.

FIG. 10-4D is a top view of two first blades 10-410. The first blades 10-410 have a shape like a plate. The first blade 10-410 includes a first trench 10-412 extended substantially in the X direction and a second trench 10-414 extended substantially to the Y direction. In other words, the first trench 10-412 and the second trench 10-414 extend in different directions. In some embodiments, the length of the first trench 10-412 is different than the second trench 10-414. For example, the length of the first trench 10-412 may be greater than the second trench 10-414. In other embodiments, the length of the first trench 10-412 may be less than the second trench 10-414.

Furthermore, the first blade 10-410 further includes an outer edge 10-416 and a first window edge 10-418. In this embodiment, the outer edge 10-416 faces away from the optical axis 10-O, and the first window edge 10-418 faces toward the optical axis 10-O. In other words, the distance between the outer edge 10-416 and the optical axis 10-O is greater than the distance between the first window edge 10-418 and the optical axis 10-O. Furthermore, the outer edge 10-416 does not have right angle. Because the outer edge 10-416 may contact other elements, if the outer edge 10-416 does not have right angle, the chance of damage caused by the outer edge 10-416 contacting with other elements may be reduced.

Two second blades 10-420 are illustrated in FIG. 10-4E and have a shape like a plate. The second blade 10-420 includes a third trench 10-422 and a fourth trench 10-424 substantially extended in the same direction, such as extended in the Y direction, and a hole 10-426 is formed between the third trench 10-422 and the fourth trench 10-424. A V-shaped second window edge 10-428 (including an edge **10-428*a* and an edge 10-428*b*) is formed on one side of the second blade 10-420 facing the optical axis 10-O. In other words, the edge 10-428*a* and the edge 10-428*b* extend in different directions. Furthermore, the intersection of the edge 10-428*a* and the edge 10-428*b* is called an intersection 10-429**.

FIGS. 10-4F and 10-4G are schematic views of the guiding element 10-500 viewed from different directions. A guiding element opening 10-510 is formed in the guiding element 10-500. Two first columns 10-520, two second columns 10-530 and a positioning portion 10-540 are formed at the outer side (the side faces opposite to the optical axis 10-O) of the guiding element 10-500. The first columns 10-520 and the second columns 10-530 positioned on one side of the guiding element 10-500 that extends toward the first blade 10-410 (the Z direction) along the optical axis 10-O, and concave portions 10-550 and a recess 10-560 are formed on another side of the guiding element 10-500 (the −Z direction, please refer to FIG. 10-4G). In some embodiments, the concave portions 10-550 may be positioned under the second columns 10-530 and the positioning portion 10-540, and may have a shape corresponding to the sliding elements 10-700, but the present disclosure is not limited thereto. For example, in some embodiments, the concave portions may be formed under the first columns 10-520. The guiding element opening 10-510 is surrounded by the recess 10-560, and the recess 10-560 may have a shape corresponded to the magnetic element 10-610 to allow the magnetic element 10-610 being disposed in the recess 10-560. As a result, the position of the magnetic element 10-610 may be fixed by, for example, adhering, and the magnetic element 10-610 may be allowed to move together with the guiding element 10-500.

FIG. 10-4H is a schematic view of the bottom 10-200 and the driving assembly 10-600 (includes the magnetic element 10-610, the driving substrate 10-620 and the circuit board 10-630). In FIG. 10-4H, the circuit board 10-630 is disposed in the recess 10-230 of the bottom 10-200 (FIG. 10-4B), the driving substrate 10-620 is disposed on the circuit board 10-630, and the magnetic element 10-610 is disposed on the driving substrate 10-620. The circuit board 10-630 may be, for example, a flexible printing circuit (FPC), and may be affixed on the bottom 10-200 by adhering to be electrically connected to other elements outside the aperture unit 10-1 and may provide electrical signal to other elements of the aperture unit 10-1.

The magnetic element 10-610 may be, for example, a magnet, and may have a plurality of first magnetic poles 10-612 and second magnetic poles 10-614 arranged in turn and surrounding the optical axis 10-O, as shown by the dashed lines in FIG. 10-4H. The driving substrate 10-620 may include a coil corresponding to the magnetic element 10-610, such as a flat plate coil. Accordingly, an electromagnetic driving force may be created by the interaction between the magnetic element 10-610 and the driving substrate 10-620 to move the magnetic element 10-6.10 in clockwise or counterclockwise directions relative to the optical axis 10-O (i.e. first moving dimension).

The magnetic element 10-610 is disposed and fixed in the recess 10-560 of the guiding element 10-500 (FIG. 10-4G), so the magnetic element 10-610 may drive the guiding element 10-500 to rotate together in clockwise or counter-clockwise direction (i.e. the first moving dimension). Furthermore, the sensor 10-800 is disposed in the concave portion 10-250 of the bottom 10-200, and the driving substrate 10-620 is disposed on the sensor 10-800, so the minimum distance between the driving substrate 10-620 and the guiding element 10-500 may be less than the minimum distance between the sensor 10-800 and the guiding element 10-500, and the driving substrate 10-620 may protect the sensor 10-800 disposed under the driving substrate 10-620 by prevent the sensor 10-800 colliding with other elements. Furthermore, the driving assembly 10-600 is disposed in the recess 10-230 of the bottom 10-200, and the protective structure 10-220 is extended along the Z direction from the recess 10-230, so at least a portion of the protective structure 10-220 of the bottom 10-200 may overlap the driving assembly 10-600 when viewed in a direction that is perpendicular to the optical axis 10-O.

FIG. 10-5A is a schematic view of some elements of the aperture unit 10-1 under one condition. It should be noted that the protrusions 10-240 of the bottom 10-200 are disposed in the first trenches 10-412 of the first blades 10-410, and the protrusions 10-242 of the bottom 10-200 are disposed in the third trenches 10-422 and the fourth trenches 10-424 of the second blades 10-420. The first columns 10-520 of the guiding element 10-500 are disposed in the second trenches 10-414 of the first blades 10-410, and the second columns 10-530 of the guiding element 10-500 are disposed in the holes 10-426 of the second blades 10-420. In other words, the first blades 10-410 and the second blades 10-420 contact and are slidably connected to the bottom 10-200 (the fixed portion) and the guiding element 10-500 by different portions. Furthermore, the first blades 10-410 and the second blades 10-420 are positioned on different planes. For example, the distance between the first blades 10-410 and the circuit board 10-630 is greater than the distance between the second blades 10-420 and the circuit board 10-630.

It should be noted than in FIG. 10-5A, the first trench 10-412 of the first blade 10-410 extends in the X direction, and the second trench 10-414 of the first blade 10-410, the third trench 10-422 and the fourth trench 10-424 of the second blade 10-420 extend in the Y direction. At the same time, the first window edge 10-418 of the first blade 10-410 and the second window edge 10-428 of the second blade 10-420 form a window 10-430, and the size of the window 10-430 in the X direction is distance 10-D1 (the distance between the two first window edges 10-418), and the size of the window 10-430 in the Y direction is distance 10-D2. Furthermore, at least a portion of the first blade 10-410 overlaps the second blade 10-420 when viewed along the optical axis 10-O. For example, the first blade 10-410 may overlap the second blade 10-420 by the outer edge 10-416 in FIG. 4D. Accordingly, it can be ensured that the first blade 10-410 and the second blade 10-420 form the window 10-430.

FIG. 10-5B is a schematic view of the bottom 10-200, the guiding element 10-500 and the driving assembly 10-600 (includes the magnetic element 10-610, the driving substrate 10-620 and the circuit board 10-630) under the condition illustrated in FIG. 10-5A. The first columns 10-520, the second columns 10-530 and the positioning portion 10-540 are positioned in the guiding recesses 10-232 or the positioning recess 10-234 of the bottom 10-200. It should be noted that the sliding elements 10-700 (FIG. 10-2) are positioned between the bottom 10-200 and the first columns 10-520, the second columns 10-530 and the positioning position 10-540 to allow the guiding element 10-500 sliding relative to the bottom 10-200. The sliding element 10-700 is disposed in the concave portion 10-550 of the guiding element 10-500, so the relative positions between the guiding element 10-500 and the sliding element 10-700 may be fixed when the guiding element 10-500 is rotated, and the sliding element 10-700 slidably contacts the bottom 10-200 (fixed portion). Furthermore, the first column 10-520, the second column 10-530 and the positioning portion 10-540 are positioned at one side of the guiding recess 10-232 or the positioning recess 10-234, so the rotation direction of the guiding element 10-500 may be limited. For example, under the condition illustrated in FIG. 10-5B, the guiding element 10-500 cannot be rotated in the clockwise direction.

FIGS. 10-6A and 10-6B are schematic views of some elements of the aperture unit 10-1 under another condition, wherein an electromagnetic driving force created between the coil in the driving substrate 10-620 and the magnetic element 10-610 drives the guiding element 10-500 to be rotated, as shown by the rotation direction 10-R in FIG. 10-6B.

As a result, referring to FIG. 10-6A, the first blade 10-410 and the second blade 10-420 may be moved together due to the rotation of the guiding element 10-500. For example, in FIG. 10-6A, when the first column 10-520 of the guiding element 10-500 is rotated, the second trench 10-414 of the first blade 10-410 may be pushed, and the protrusions 10-240 on the bottom 10-200 and the first trench 10-212 of the first blade 10-410 may limit the moving direction of the first blade 10-410. The two protrusions 10-240 on the bottom 10-200 are arranged in the X direction, so the two first blades 10-410 may move in the X direction (second moving dimension) relative to the bottom 10-200 (fixed portion) and becoming closer to each other, as shown by the moving direction 10-M1. It should be noted that the second moving dimension (the lateral movement in the X direction) is different than the first moving dimension (the rotational movement relative to the optical axis 10-O).

Furthermore, the protrusions 10-240 are arranged in a direction that is parallel to the second moving dimension, and the first trench 10-412 extends in a direction that is parallel to the second moving dimension. In other words, the distance between the two first window edges 10-418 of the two first blades 10-410 is 10-D3 under this condition, the distance between the two first window edges 10-418 of the two first blades 10-410 is 10-D1 under the aforementioned condition, and the distance 10-D3 is less than the distance 10-D1.

Similarly, the holes 10-426 of the second blades 10-420 may be pushed by the second columns 10-530 of the guiding element 10-500 when the guiding element 10-500 is rotating, and the rotation direction may be limited by the protrusions 10-242 of the bottom 10-200 and the third trenches 10-422 and the fourth trenches 10-424 of the second blades 10-420. For example, the two protrusions 10-242 of the bottom 10-200 may be arranged in the Y direction, so the two second blades 10-420 may move in the Y direction (the third moving dimension) relative to the bottom 10-200 (fixed portion) and become closer to each other, as shown by the moving direction 10-M2. The third moving dimension (translational movement in the Y direction) is different than the first moving dimension (rotational movement relative to the optical axis 10-O) and the second moving dimension (translational movement in the X direction). In other words, the distance between two intersections 10-429 of the second window edges 10-428 of two second blades 10-420 is 10-D4, and the distance 10-D4 is less than the distance 10-D2 between the two second window edges 10-428 of the two second blades 10-420 illustrated in the aforementioned condition.

It should be noted that the moving distances of the first blades 10-410 and the second blades 10-420 in FIGS. 10-6A and 10-6B are different to the condition illustrated in FIGS. 10-5A and 10-5B. In other words, the distance 10-D1 minus the distance 10-D3 is different than the distance 10-D2 minus the distance 10-D4. In some embodiments, the distance 10-D1 minus the distance 10-D3 is less than the distance 10-D2 minus the distance 10-D4, i.e. (10-D1)−(10-D3)<(10-D2)−(10-D4).

It is because the window 10-430 formed by the first window edge 10-418 and the second window edge 10-428 has a hexagonal shape in this embodiment, and the distance between two opposite vertexes of a hexagon is different to two opposite edges of the hexagon. In other words, if it is desired to let the window 10-430 under different conditions being similar hexagons, the first blade 10-410 and the second blade 10-420 have to move different distances. If the hexagons are similar, this will improve the uniformity of the light that passes through different sizes of windows.

It should be noted that a portion of the aperture unit 10-1 forms a first moving connecting portion, such as the first trench 10-412 of the first blade 10-410 and the protrusion 10-240 of the bottom 10-200, or the third trench 10-422 of the second blade 10-420 and the protrusion 10-242 of the bottom 10-200, etc., but the present disclosure does not limited thereto. Another portion of the aperture unit 10-1 forms a second moving connecting portion, such as the second trench 10-414 of the first blade 10-410 and the first column 10-520 of the guiding element 10-500, or the hole 10-426 of the second blade 10-420 and the second column 10-520 of the guiding element 10-500, but the present disclosure is not limited thereto. The first blade 10-410 or the second blade 10-420 contacts to and is movably connected to the bottom 10-200 (the fixed portion) in the first moving connecting portion, and the first blade 10-410 or the second blade 10-420 contacts and is slidably connected to the guiding element 10-500 in the second moving connecting portion.

In some embodiments, another portion of the aperture unit 10-1 forms another first moving connecting portion, such as the fourth trench 10-424 of the second blade 10-420 and the protrusion 10-242 of the bottom 10-200. Under this condition, the second blade 10-420 contacts and is slidably connected to the bottom 10-200 (the fixed portion) in another first moving connecting portion, and the second moving connecting portion is disposed between the two first moving connecting portions.

FIGS. 10-7A and 10-7B are schematic view of some elements of the aperture unit 10-1 under another condition. Under this condition, the electromagnetic force created between the coil in the driving substrate 10-620 and the magnetic element 10-610 may drive the guiding element 10-500 to rotate further than the aforementioned condition, as shown by the rotation direction 10-R in FIG. 10-7B.

As a result, the two first blades 10-410 and the two second blades 10-420 may become closer to each other, and the size of the window 10-430 may be further decreased. Referring to FIG. 10-7A, the distance between two first window edges 10-418 of the two first blades 10-410 is 10-D5, and the distance 10-D5 is less than the distance 10-D3 between the two first window edges 10-418 of the two first blades 10-410 under the aforementioned condition. Furthermore, the distance between the two intersections 10-429 of the second window edges 10-428 of the two second blades 10-420 is 10-D6, and the distance 10-D6 is less than the distance 10-D4 between the second window edges 10-428 of the two second blades 10-420.

Similarly, the moving distances of the first blade 10-410 and the second blade 10-420 in FIGS. 10-7A and 10-7B are different to the condition illustrated in FIGS. 10-6A and 10-6B. In other words, the distance 10-D3 minus the distance 10-D5 is different than the distance 10-D4 minus the distance 10-D6. In some embodiments, the distance 10-D3 minus the distance 10-D5 is less than the distance 10-D4 minus the distance 10-D6, i.e. (10-D3)−(10-D5)<(10-D4)−(10-D6).

Accordingly, the first blade 10-410 may move in the second moving dimension (translational movement in the X direction) within a first range (i.e. the size of the window 10-430 in the X direction may be changed between 10-D1 and 10-D5), the second blade 10-420 may move in the third moving dimension (translational movement in the Y direction) within a second range (i.e. the size of the window 10-430 in the Y direction may be changed between 10-D2 and 10-D6), and the first range is different than the second range (i.e. 10-D1 minus 10-D5 is different than 10-D2 minus 10-D6). It should be noted that in the first range and the second range, at least a portion of the first blade 10-410 overlaps the second blade 10-420 to form the window 10-430.

If it is desired to enlarge the size of the window 10-430 of the aperture unit 10-1, an electromagnetic force having an opposite direction to the aforementioned embodiments should be applied to the guiding element 10-500 for rotating the guiding element 10-500 to a direction opposite to the rotation direction 10-R, and the first blade 10-410 and the second blade 10-420 may move in a direction opposite to the aforementioned embodiments to enlarge the size of the window 10-430.

Accordingly, the window 10-430 (equivalent aperture) of the aperture unit 10-1 may change continuously within the range to allow the aperture unit 10-1 having different aperture sizes to meet different image capturing requirements. In general, when the size of the equivalent aperture is enlarged, the incident light flux may also be increased, so this kind of aperture may be applied in an environment having low brightness. Furthermore, the influence of background noise may be decreased to avoid image noise. Moreover, the sharpness of the image received may be increased if the size of the equivalent aperture is decreased in a high-brightness environment, and overexposure may also be prevented.

Although the first moving dimension is rotational movement, and the second moving dimension and the third moving dimension are translational movements in different directions, the present disclosure is not limited thereto. As long as the first moving dimension, the second moving dimension and the third movement dimension are different, the desired result of the present disclosure may be achieved. Furthermore, the aperture unit 10-1 may be fixed to other external elements through the guiding element 10-500 and the fixed portion (such as the bottom 10-200) to move together with other external elements. As a result, no additional driving element should be provided, and miniaturization may be achieved.

The aperture unit 10-1 may be disposed in image capturing devices that require apertures. For example, the aperture unit 10-1 may be disposed in a periscope image capturing device to meet the thickness requirement of mobile electronic devices. Furthermore, the aperture unit 10-1 may be applied in the optical modules 1-A1000, 1-A2000, 1-A3000,

1-B2000, 1-C2000, 1-D2000 and 12-2000 in some embodiments of the present disclosure.

In summary, an aperture unit that can continuously control the size of the aperture opening is provided in the present disclosure. Accordingly, different user requirements of image capturing may be fulfilled. Furthermore, the aperture unit may be disposed on the movable portion and no additional driving element is required to drive the aperture unit, so that miniaturization may be achieved.

Eleventh Group of Embodiments

Referring to FIG. 11-1A, in an embodiment of the disclosure, an optical system 11-A10 can be disposed in an electronic device 11-A20 and used to take photographs or record video. The electronic device 11-A20 can be a smartphone or a digital camera, for example. The optical system 11-A10 comprises a first optical module 11-A1000, a second optical module 11-A2000, and a third optical module 11-A3000. When taking photographs or recording video, these optical modules can receive lights and form images, wherein the images can be transmitted to a processor (not shown) in the electronic device 11-A20, where post-processing of the images can be performed.

In particular, the focal lengths of the first optical module 11-A1000, the second optical module 11-A2000, and the third optical module 11-A3000 are different, and the first optical module 11-A1000, the second optical module 11-A2000, and the third optical module 11-A3000 respectively have a first light-entering hole 11-A1001, a second light-entering hole 11-A2001, and a third light-entering hole 11-A3001. The external light(s) can reach the image sensor in the optical module through the light-entering hole.

Referring to FIG. 11-1B, the first optical module 11-A1000 comprises a housing 11-A1100, a lens driving mechanism 11-A1200, a lens 11-A1300, a base 11-A1400, an image sensor 11-A1500. The housing 11-A1100 and the base 11-A1400 can form a hollow box, and the housing 11-A1100 surrounds the lens driving mechanism 11-A1200. Therefore, the lens driving mechanism 11-A1200 and the lens 11-A1300 can be accommodated in the aforementioned box. The image sensor 11-A1500 is disposed on a side of the box, the first light-entering hole 11-A1001 is formed on the housing 11-A1100, and the base 11-A1400 has an opening 11-A1410 corresponding to the first light-entering hole 11-A1001. Thus, the light can reach the image sensor 11-A1500 through the first light-entering hole 11-A1001, the lens 11-A1300, and the opening 11-A1410 in sequence, so as to form an image on the image sensor 11-A1500.

The lens driving mechanism 11-A1200 comprises a lens holder 11-A1210, a frame 11-A1220, at least one first electromagnetic driving assembly 11-A1230, at least one second electromagnetic driving assembly 11-A1240, a first elastic member 11-A1250, a second elastic member 11-A1260, a coil board 11-A1270, a plurality of suspension wires 11-A1280, and a plurality of position detectors 11-A1290.

The lens holder 11-A1210 has an accommodating space 11-A1211 and a concave structure 11-A1212, wherein the accommodating space 11-A1211 is formed at the center of the lens holder 11-A1210, and the concave structure 11-A1212 is formed on the outer wall of the lens holder 11-A1210 and surrounds the accommodating space 11-A1211. The lens 11-A1300 can be affixed to the lens holder 11-A1210 and accommodated in the accommodating space 11-A1211 The first electromagnetic driving assembly 11-A1230 can be disposed in the concave structure 11-A1212.

The frame 11-A1220 has a receiving portion 11-A1221 and a plurality of recesses 11-A1222. The lens holder 11-A1210 is received in the receiving portion 11-A1221, and the second electromagnetic driving assembly 11-A1240 is affixed in the recess 11-A1222 and adjacent to the first electromagnetic driving assembly 11-A1230.

The lens holder 11-A1210 and the lens 11-A1300 disposed thereon can be driven by the electromagnetic effect between the first electromagnetic driving assembly 11-A1230 and the second electromagnetic driving assembly 11-A1240 to move relative to the frame 11-A1220 along the Z-axis. For example, in this embodiment, the first electromagnetic driving assembly 11-A1230 can be a driving coil surrounding the accommodating space 11-A1211 of the lens holder 11-A1210, and the second electromagnetic driving assembly 11-A1240 can comprise at least one magnet. When a current flows through the driving coil (the first electromagnetic driving assembly 11-A1230), an electromagnetic effect is generated between the driving coil and the magnet. Thus, the lens holder 11-A1210 and the lens 11-A1300 disposed thereon can be driven to move relative to the frame 11-A1220 and the image sensor 11-A1500 along the Z-axis, and the purpose of auto focus can be achieved.

In some embodiments, the first electromagnetic driving assembly 11-A1230 can be a magnet, and the second electromagnetic driving assembly 11-A1240 can be a driving coil.

The first elastic member 11-A1250 and the second elastic member 11-A1260 are respectively disposed on opposite sides of the lens holder 11-A1210 and the frame 11-A1220, and the lens holder 11-A1210 and the frame 11-A1220 can be disposed therebetween. The inner portion 11-A1251 of the first elastic member 11-A1250 is connected to the lens holder 11-A1210, and the outer portion 11-A1252 of the first elastic member 11-A1250 is connected to the frame 11-A1220. Similarly, the inner portion 11-A1261 of the second elastic member 11-A1260 is connected to the lens holder 11-A1210, and the outer portion 11-A1262 of the second elastic member 11-A1260 is connected to the frame 11-A1220. Thus, the lens holder 11-A1210 can be hung in the receiving portion 11-A1221 of the frame 11-A1220 by the first elastic member 11-A1250 and the second elastic member 11-A1260, and the range of motion of the lens holder 11-A1210 along the Z-axis can also be restricted by the first and second elastic members 11-A1250 and 11-A1260.

Referring to FIG. 11-1B, the coil board 11-A1270 is disposed on the base 11-A1400. Similarly, when a current flows through the coil board 11-A1270, an electromagnetic effect is generated between the coil board 11-A1270 and the second electromagnetic driving assembly 11-A1240 (or the first electromagnetic driving assembly 11-A1230). Thus, the lens holder 11-A1210 and the frame 11-A1220 can be driven to move relative to coil board 11-A1270 along the X-axis and/or the Y-axis, and the lens 11-A1300 can be driven to move relative to image sensor 11-A1500 along the X-axis and/or the Y-axis. The purpose of image stabilization can be achieved.

In this embodiment, the lens driving mechanism 11-A1200 comprises four suspension wires 11-A1280. Four suspension wires 11-A1280 are respectively disposed on the four corners of the coil board 11-A1270 and connect the coil board 11-A1270, the base 11-A1400 and the first elastic member 11-A1250. When the lens holder 11-A1210 and the lens 11-A1300 move along the X-axis and/or the Y-axis, the suspension wires 11-A1280 can restrict their range of motion. Moreover, since the suspension wires 11-A1280 comprise metal (for example, copper or an alloy thereof), the suspension wires 11-A1280 can be used as a conductor. For example, the current can flow into the first electromagnetic driving assembly 11-A1230 through the base 11-A1400 and the suspension wires 11-A1280.

The position detectors 11-A1290 are disposed on the base 11-A1400, wherein the position detectors 11-A1290 can detect the movement of the second electromagnetic driving assembly 11-A1240 to obtain the position of the lens holder 11-A1210 and the lens 11-A1300 in the X-axis and the Y-axis. For example, each of the position detectors 11-A1290 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

Referring to FIGS. 11-1A and 11-1B, in this embodiment, the structure of the second optical module 11-A2000 and the structure of the third optical module 11-A3000 are substantially the same as the structure of the first optical module 11-A1000. The only difference between the first, second, and third optical modules 11-A1000, 11-A2000, and 11-A3000 is that their lenses have different focal lengths. For example, the focal length of the first optical module 11-A1000 is greater than that of the third optical module 11-A3000, and the focal length of the third optical module 11-A3000 is greater than that of the second optical module 11-A2000. In other words, in the Z-axis, the thickness of the first optical module 11-A1000 is greater than that of the third optical module 11-A3000, and the thickness of the third optical module 11-A3000 is greater than that of the second optical module 11-A2000. In this embodiment, the second optical module 11-A2000 is disposed between the first optical module 11-A1000 and the third optical module 11-A3000.

Referring to FIG. 11-2A, in another embodiment of the disclosure, an optical system 11-B10 can be disposed in an electronic device 11-B20, and comprise a first optical module 11-B1000, a second optical module 11-B2000, and a third optical module 11-B3000. The second optical module 11-B2000 is disposed between the first optical module 11-B1000 and the third optical module 11-B3000, and the focal lengths of the first optical module 11-B1000, the second optical module 11-B2000, and the third optical module 11-B3000 are different. A first light-entering hole 11-B1001 of the first optical module 11-B1000, a second light-entering hole 11-B2001 of the second optical module 11-B2000, and a third light-entering hole 11-B3001 of the third optical module 11-B3001 are adjacent to each other.

As shown in FIG. 11-2B, the first optical module 11-B1000 comprises a lens unit 11-B1100, a reflecting unit 11-B1200, and an image sensor 11-B1300. An external light (such as a light 11-L) can enter the first optical module 11-B1000 through the first light-entering hole 11-B1001 and be reflected by the reflecting unit 11-B1200. After that, the external light can pass through the lens unit 11-B1100 and be received by the image sensor 11-B1300.

The specific structures of the lens unit 11-B1100 and the reflecting unit 11-B1200 in this embodiment are discussed below. As shown in FIG. 11-2B, the lens unit 11-B1100 primarily comprises a lens driving mechanism 11-B1110 and a lens 11-B1120, wherein the lens driving mechanism 11-B1110 is used to drive the lens 11-B1120 to move relative to the image sensor 11-B1300. For example, the lens driving mechanism 11-B1110 can comprise a lens holder 11-B1111, a frame 11-B1112, two spring sheets 11-B1113, at least one coil 11-B1114, and at least one magnetic member 11-B1115.

The lens 11-B1120 is affixed to the lens holder 11-B1111. Two spring sheets 11-B1113 are connected to the lens holder 11-B1111 and the frame 11-B1112, and respectively disposed on opposite sides of the lens holder 11-B1111. Thus, the lens holder 11-B1111 can be movably hung in the frame 11-B1112. The coil 11-B1114 and the magnetic member 11-B1115 are respectively disposed on the lens holder 11-B1111 and the frame 11-B1112, and correspond to each other. When current flows through the coil 11-B1114, an electromagnetic effect is generated between the coil 11-B1114 and the magnetic member 11-B1115, and the lens holder 11-B1111 and the lens 11-B1120 disposed thereon can be driven to move relative to the image sensor 11-B1300.

Referring to FIGS. 11-2B-11-2D, the reflecting unit 11-B1200 primarily comprises an optical member 11-B1210, an optical member holder 11-B1220, a frame 11-B1230, at least one bearing member 11-B1240, at least one first hinge 11-B1250, a first driving module 11-B1260, and a position detector 11-B1201.

The first bearing member 11-B1240 is disposed on the frame 11-B1230, the first hinge 11-B1250 can pass through the hole at the center of the first bearing member 11-B1240, and the optical member holder 11-B1220 can be affixed to the first hinge 11-B1250. Therefore, the optical member holder 11-B1220 can be pivotally connected to the frame 11-B1230 via the first hinge 11-B1250. Since the optical member 11-B1210 is disposed on the optical member holder 11-B1220, when the optical member holder 11-B1220 rotates relative to the frame 11-B1230, the optical member 11-B1210 disposed thereon also rotates relative to the frame 11-B1230. The optical member 11-B1210 can be a prism or a reflecting mirror.

Referring to FIG. 11-2E, in this embodiment, a dust-proof assembly 11-B1231 is disposed on the frame 11-B1230. The dust-proof assembly 11-B1231 is adjacent to the first hinge 11-B1250 and disposed between the optical member 11-B1210 and the first bearing member 11-B1240. The dust-proof assembly 11-B1231 does not contact the first hinge 11-B1250 or the first bearing member 11-B1240, in other words, a gap is formed between the dust-proof assembly 11-B1231 and the first hinge 11-B1250 and another gap is formed between the dust-proof assembly 11-B1231 and first bearing member 11-B1240.

Owing to the first bearing member 11-B1240, the dust generated from the friction between the first hinge 11-B1250 and the frame 11-B1230 when the optical member holder 11-B1220 rotates relative to the frame 11-B1230 can be prevented. Furthermore, owing to the dust-proof assembly 11-B1231, the minor dust from the first bearing member 11-B1240 can also be blocked and does not attach to the optical member 11-B1210. The optical properties of the optical member 11-B1210 can be maintained.

In this embodiment, the dust-proof assembly 11-B1231 is a plate integrally formed with the frame 11-B1230. In some embodiments, the dust-proof assembly 11-B1231 is a brash disposed on the frame 11-B1230.

Referring to FIG. 11-2F, a fixing structure 11-B1221 is formed on the optical member holder 11-B1220 for joining to the first hinge 11-B1250. In this embodiment, the fixing structure 11-B1221 is a recess, and a narrow portion 11-B1222 is formed in the recess. Therefore, it is convenient to join the optical member holder 11-B1220 to the first hinge 11-B1250, and the narrow portion 11-B1222 can prevent the optical member holder 11-B1220 from falling from the first hinge 11-B1250.

In some embodiments, the position of the first bearing member 11-B1240 and the position of the fixing structure 11-B1221 can be interchanged. That is, the first bearing member 11-B1240 can be disposed on the optical member holder 11-B1220, and the fixing structure 11-B1221 can be formed on the frame 11-B1230. In some embodiments, the reflecting unit 11-B1200 can further comprise a sealing member (such as a glue or a hook). After the first hinge 11-B1250 enters the recess of the fixing structure 11-B1221, the sealing member can seal the opening of the recess.

As shown in FIGS. 11-2B-11-2D, the first driving module 11-B1260 can comprise a first electromagnetic driving assembly 11-B1261 and a second electromagnetic driving assembly 11-B1262, respectively disposed on the frame 11-B1230 and the optical member holder 11-B1220 and corresponding to each other.

For example, the first electromagnetic driving assembly 11-B1261 can comprise a driving coil, and the second electromagnetic driving assembly 11-B1262 can comprise a magnet. When a current flows through the driving coil (the first electromagnetic driving assembly 11-B1261), an electromagnetic effect is generated between the driving coil and the magnet. Thus, the optical member holder 11-B1220 and the optical member 11-B1210 can be driven to rotate relative to the frame 11-B1230 around a first rotation axis 11-R1 (extending along the Y-axis), so as to adjust the position of the external light 11-L on the image sensor 11-B1300.

The position detector 11-B1201 can be disposed on the frame 11-B1230 and correspond to the second electromagnetic driving assembly 11-B1262, so as to detect the position of the second electromagnetic driving assembly 11-B1262 to obtain the rotation angle of the optical member 11-B1210. For example, the position detectors 1700 can be Hall sensors, magnetoresistance effect sensors (MR sensor), giant magnetoresistance effect sensors (GMR sensor), tunneling magnetoresistance effect sensors (TMR sensor), or fluxgate sensors.

In some embodiments, the first electromagnetic driving assembly 11-B1261 comprises a magnet, and the second electromagnetic driving assembly comprises a driving coil. In these embodiments, the position detector 11-B1201 can be disposed on the optical member holder 11-B1220 and corresponds to the first electromagnetic driving assembly 11-B1261.

Referring to FIG. 11-2A, in this embodiment, the structure of the first optical module 11-B1000 is the same as the structure of the third optical module 11-B3000, but the focal length of the lens 11-B1120 in the first optical module 11-B1000 is different from the focal length of the lens in the third optical module 11-B3000.

Furthermore, it should be noted that, the reflecting unit 11-B1200 in the first optical module 11-B1000 and the reflecting unit in the third optical module 11-B3000 can respectively guide the external lights entering the optical system 11-B10 from the first light-entering hole 11-B1001 and the third light-entering hole 11-B3001 to the image sensors in the first and third optical modules 11-B1000 and 11-B3000. In particular, the external light entering the optical system 11-B10 from the first light-entering hole 11-B1001 can be reflected by the reflecting unit 11-B1200 in the first optical module 11-B1000 and move along the −X-axis (the first direction), and another external light entering the optical system 11-B10 from the third light-entering hole 11-B3001 can be reflected by the reflecting unit in the third optical module 11-B3000 and move along the X-axis (the second direction).

The structure of the second optical module 11-B2000 in the optical system 11-B10 is similar to the structure of the first optical module 11-A1000 in the optical system 11-A10, the features thereof are not repeated in the interest of brevity. It should be noted that, the external light entering the second optical module 11-B2000 passes through the second light-entering hole 11-B2001 and reaches the image sensor in the second optical module 11-B2000 along the Z-axis, and the sensing surface of the image sensor in the second optical module 11-B2000 is perpendicular to the Z-axis. On the contrary, the sensing surfaces of the image sensors of the first optical module 11-B1000 and the third optical module 11-B3000 are parallel to the Z-axis.

Owing to the aforementioned structure, the thickness of the first optical module 11-B1000 along the Z-axis and the thickness of the third optical module H-B3000 along the Z-axis can be reduced, and the first and third optical module 11-B1000 and 11-B3000 can be disposed in the thin electronic device 11-B20, wherein the focal length of the first optical module 11-B1000 and the focal length of the third optical module 11-B3000 is greater than the focal length of the second optical module 11-B2000.

Referring to FIGS. 11-3A and 11-3B, in another embodiment of the disclosure, the reflecting unit 11-B1200 further comprises a first steady member 11-B1270, a second driving module 11-B1280, and a second steady member 11-B1290. The first steady member 11-B1270 comprises at least one spring sheet connected to the frame 11-B1230 and the optical member holder 11-B1220, so that a stabilizing force can be provided to maintain the optical member holder 11-B1220 in an original position relative to the frame 11-B1230. Therefore, even when the first driving module 11-B1260 does not operate (for example, the current does not flow into the first electromagnetic driving assembly 11-B1261), the rotation of the optical member holder 11-B1220 relative to the frame 11-B1230 caused by the shake of the electronic device 11-B20 can still be avoided, and the damage of the optical member 11-B1210 due to the collision can be avoided.

The second driving module 11-B1280 comprises at least one third electromagnetic driving assembly 11-B1281 and at least one fourth electromagnetic driving assembly 11-B1282, respectively disposed on the frame 11-B1230 and the housing 11-B11 of the optical system 11-B10. For example, the third electromagnetic driving assembly 11-B1281 comprises a magnet, and the fourth electromagnetic driving assembly 11-B1282 comprises a driving coil. When current flows through the driving coil (the fourth electromagnetic driving assembly 11-B1282), an electromagnetic effect is generated between the driving coil and the magnet. Thus, the frame 11-B1230, the optical member holder 11-B1220, and the optical member 11-B1210 can be simultaneously driven to rotate relative to the housing 11-B11 around a second rotation axis 11-R2 (extending along the Z-axis), so as to adjust the position of the external light on the image sensor 11-B1300. It should be noted that, in this embodiment, the second rotation axis 11-R2 passes through the center of the reflecting surface of the optical member 11-B1210.

In some embodiments, the third electromagnetic driving assembly 11-B1281 comprises a driving coil, and the fourth electromagnetic driving assembly 11-B1282 comprises a magnet.

As shown in FIG. 11-3B, similar to the first steady member 11-B1270, the second steady member 11-B1290 is connected to the housing 11-B11 and the frame 11-B1230, and a stabilizing force can be provided to maintain the frame 11-B1230 in a predetermined position relative to the housing 11-B11.

In this embodiment, the second steady member 11-B1290 is a spring sheet, comprising a first fixing section 11-B1291, a second fixing section 11-B1292, and a plurality of string sections 11-B1293. The first fixing section 11-B1291 and the second fixing section 11-B1292 are respectively affixed to the housing 11-B11 and the frame 11-B1230, and the string sections 11-B1293 are connected to the first fixing section 11-B1291 and the second fixing section 11-B1292. Specifically, the string sections 11-B1293 are arranged in parallel. Each of the string sections 11-B1293 has a bend structure, and the widths of the string sections 11-B1293 are different. In particular, the width of the string section 11-B1293 away from the second rotation axis 11-R2 is greater than the width of the string section 11-B1293 close to the second rotation axis 11-R2, so as to endure the larger deformation volume.

In this embodiment, a first guiding assembly 11-B1232 is disposed on the frame 11-B1230, and a second guiding assembly 11-B12 is disposed on the housing 11-B11. The first guiding assembly 11-B1232 can be a curved slot, and the second guiding assembly 11-B12 can be a slider accommodated in the slot, wherein the center of the curvature of the curved slot is situated on the second rotation axis 11-R2. When the second driving module 11-B1280 drives the optical member holder 11-B1220 to rotate relative to the housing 11-B11, the slider slides along the slot. In this embodiment, a plurality of balls are disposed in the slot, such that the slider can be smoothly slide.

Referring to FIGS. 11-4A and 11-4B, in another embodiment of the disclosure, the second steady member 11-B1290 is a magnetic permeability member, disposed on the housing 11-B11 and corresponding to the third electromagnetic driving assembly 11-B1281 of the second driving module 11-B1280. The third electromagnetic driving assembly 11-B1281 can be a magnet. Thus, the frame 11-B1230 can be maintained in a predetermined position relative to the housing 11-B11 by the magnetic attraction between the second steady member 11-B1290 and the third electromagnetic driving assembly 11-1281. Furthermore, the magnetic permeability member can enhance the electromagnetic effect between the third electromagnetic driving assembly 11-B1281 and the fourth electromagnetic driving assembly 11-B1282, so as to increase the driving force of the second driving module 11-B1280.

The first guiding assembly 11-B1232 disposed on the frame 11-B1230 comprises at least one ball, and the second guiding assembly 11-B12 is a curve slot formed on the housing 11-B11. The ball can be accommodated in the curved slot, and the center of the curvature of the curved slot is situated on the second rotation axis 11-R2. Thus, when the second driving module 11-B1280 drives the optical member holder 11-B1220 to rotate relative to the housing 11-B11, the ball slides along the slot.

Referring to FIGS. 11-5A and 11-5B, in another embodiment of the disclosure, the second steady member 11-B1290 is a flat coil spring connected to the frame 11-B1230 and the housing 11-B11. Furthermore, the first guiding assembly 11-B1232 and the second guiding assembly 11-B12 can be replaced by a second bearing member 11-B1234 and a second hinge 11-B1235. The second bearing member 11-B1234 is disposed on the housing 11-B11, the second hinge 11-B1235 passes through the hole at the center of the second bearing member 11-B1234, and the optical member holder 11-B1220 is affixed to the second hinge 11-B1235.

The second bearing member 11-B1234 is disposed on the second rotation axis 11-R2 and extended along the second rotation axis 11-R2. Therefore, it can ensure that the optical member holder 11-B1220 rotates around the second rotation axis 11-R2 when the second driving module 11-B1280 drives the optical member holder 11-B1220 rotates relative to the housing 11-B11. In some embodiments, the second bearing member 11-B1234 can be disposed on the optical member holder 11-B1220, and an end of the second hinge 11-B1235 is affixed to the housing 11-B11.

Referring to FIGS. 11-6A and 11-6B, in another embodiment of the disclosure, the second steady member 11-B1290 is a torsion spring connected to the frame 11-B1230 and the housing 11-B11, and the first steady member 11-B1270 is a helical spring connected to the frame 11-B1230 and the optical member holder 11-B1220.

Referring to FIGS. 11-7A-11-7C, in another embodiment of the disclosure, an optical system 11-C10 can be disposed in an electronic device 11-C20, and comprise a first optical module 11-C1000, a second optical module 11-C2000, and a third optical module 11-C3000. The structure of the second optical module 11-C2000 is similar to the structure of the first optical module 11-A1000 in the optical system 11-A10, and the first optical module 11-C1000 and the third optical module 11-C3000 can respectively comprise lens units 11-C1100 and 11-C3100 and the image sensors 11-C1300 and 11-C3300, wherein the lens units 11-C1100 and 11-C3100 are the same as the lens unit 11-B1100, and the image sensors 11-C1300 and 11-C3300 are the same as the image sensor 11-B1300. The features thereof are not repeated in the interest of brevity.

A first light-entering hole 11-C1001 of the first optical module 11-C1000 and a third light-entering hole 11-C3001 of the third optical module 11-C3000 can be integrally formed, and adjacent to a second light-entering hole 11-C2001 of the second optical module 11-C2000. A reflecting unit 11-C1200 can be used by the first optical module 11-C1000 and the third optical module 11-C3000, wherein an external light can be reflected to the lens unit 11-C1100 of the first optical module 11-C1000 or the lens unit 11-C3100 of the third optical module 11-C3000 by the reflecting unit 11-C1200.

As shown in FIGS. 11-7D and 11-7E, the reflecting unit 11-C1200 comprises an optical member 11-C1210, an optical member holder 11-C1220, a frame 11-C1230, at least one first bearing member 11-C1240, at least one first hinge 11-C1250, and a first driving module 11-C1260.

The first bearing member 11-C1240 is disposed on the frame 11-C1230, the first hinge 11-C1250 can pass through the hole at the center of the first bearing member 11-C1240, and the optical member holder 11-C1220 can be affixed to the first hinge 11-C1250. Therefore, the optical member holder 11-C1220 can be pivotally connected to the frame 11-C1230 via the first hinge 11-C1250. Since the optical member 11-C1210 is disposed on the optical member holder 11-C1220, when the optical member holder 11-C1220 rotates relative to the frame 11-C1230, the optical member 11-C1210 disposed thereon also rotates relative to the frame 11-C1230. The optical member 11-C1210 can be a prism or a reflecting mirror.

The first driving module 11-C1260 comprises at least one first electromagnetic driving assembly 11-C1261 and at least one second electromagnetic driving assembly 11-C1262, respectively disposed on the frame 11-C1230 and the optical member holder 11-C1220.

For example, the first electromagnetic driving assembly 11-C1261 can comprise a driving coil, and the second electromagnetic driving assembly 11-C1262 can comprise a magnet. When a current flows through the driving coil (the first electromagnetic driving assembly 11-C1261), an electromagnetic effect is generated between the driving coil and the magnet. Thus, the optical member holder 11-C1220 and the optical member 11-C1210 can be driven to rotate relative to the frame 11-C1230 around a first rotation axis 11-R1 (extending along the Y-axis).

It should be noted that, in this embodiment, the first driving module 11-C1260 can drive the optical member holder 11-C1220 and the optical member 11-C1210 to rotate relative to the frame 11-C1230 more than 90 degrees. Therefore, the external light entering the optical system 11-C10 from the first and third light-entering holes 11-C1001 and 11-C3001 can be reflected to the lens unit 11-C1100 of the first optical module 11-C1000 or the lens unit 11-C3100 of the third optical module 11-C3000 according to the angle of the optical member 11-C1210.

As shown in FIGS. 11-7B and 11-7C, in this embodiment, the reflecting unit 11-C1200 further comprises a first steady member 11-C1270 comprising two first magnetic members 11-C1271 and a second magnetic member 11-C1272. Two first magnetic members 11-C1271 are respectively disposed on the different surfaces of the optical member holder 11-C1220, and the second magnetic member 11-C1272 is disposed on the housing 11-C11 of the optical system 11-C10 or the frame 11-C1230.

When the optical member 11-C1210 is in a first angle (FIG. 11-7B), one of the first magnetic members 11-C1271 is adjacent to the second magnetic member 11-C1272, and the optical member holder 11-C1220 and the optical member 11-C1210 is affixed relative to the frame 11-C1230, the external light can be reflected by the optical member 11-C1210 and reach the image sensor 11-C1300. When the optical member 11-C1210 is driven by the first driving module 11-C1260 and rotates from the first angle to a second angle (FIG. 11-7C), the other first magnetic member 11-C1271 is adjacent to the second magnetic member 11-C1272, and the optical member holder 11-C1220 and the optical member 11-C1210 is affixed relative to the frame 11-C1230, the external light can be reflected by the optical member 11-C1210 and reach the image sensor 11-C3300.

Referring to FIGS. 11-8A and 11-8B, in another embodiment of the disclosure, the first light-entering hole 11-C1001 and the third light-entering hole 11-C3001 are respectively formed on the opposite surfaces of the optical system 11-C10. The first steady member 11-C1270 comprises a first magnetic member 11-C1271 and two second magnetic members 11-C1272. The first magnetic member 11-C1271 is disposed on the optical member holder 11-C1220, and the second magnetic members 11-C1272 are disposed on the housing 11-C11 of the optical system 11-C10 or the frame 11-C1230. The optical member holder 11-C1220 and the optical member 11-C1210 is disposed between two second magnetic members 11-C1272.

When the optical member 11-C1210 is in a first angle (FIG. 11-8A), the first magnetic member 11-C1271 is adjacent to one of the second magnetic members 11-C1272, and the optical member holder 11-C1220 and the optical member 11-C1210 is affixed relative to the frame 11-C1230, the external light can be reflected by the optical member 11-C1210 and reach the image sensor 11-C1300. When the optical member 11-C1210 is driven by the first driving module 11-C1260 and rotates from the first angle to a second angle (FIG. 11-8B), the first magnetic member 11-C1271 is adjacent to the other second magnetic member 11-C1272, and the optical member holder 11-C1220 and the optical member 11-C1210 is affixed relative to the frame 11-C1230, the external light can be reflected by the optical member 11-C1210 and reach the image sensor 11-C3300.

Referring to FIGS. 11-9A and 11-9B, in another embodiment of the disclosure, an optical system 11-D10 can be disposed in an electronic device 11-D20, and comprise a first optical module 11-D1000, a second optical module 11-D2000, and a third optical module 11-D3000. The structure of the second optical module 11-D2000 is similar to the structure of the first optical module 11-A1000 in the optical system 11-A10, and the first optical module 11-D1000 and the third optical module 11-D3000 can respectively comprise lens units 11-D1100 and 11-D3100 and the image sensors 11-D1300 and 11-D3300, wherein the lens units 11-D1100 and 11-D3100 are the same as the lens unit 11-B1100, and the image sensors 11-D1300 and 11-D3300 are the same as the image sensor 11-B1300. The features thereof are not repeated in the interest of brevity.

A reflecting unit 11-D1200 can be used by the first optical module 11-D1000 and the third optical module 11-D3000. The reflecting unit 11-D1200 comprises two optical members 11-D1210 and 11-D1220 and an optical member holder 11-D1230. The optical members 11-D1210 and 11-D1220 are disposed on the optical member holder 11-D1230, and respectively corresponds to a first light-entering hole 11-D1001 of the first optical module 11-D1000 and a third light-entering hole 11-D3001 of the third optical module 11-D3000. Therefore, the external light entering the optical system 11-D10 from the first light-entering hole 11-D1001 can be reflected by the optical member 11-D1210 and move along the −X-axis (the first direction), and another external light entering the optical system 11-D10 from the third light-entering hole 11-D3001 can be reflected by the optical member 11-D1220 and move along the X-axis (the second direction).

Referring to FIGS. 11-9A and 11-9B, in this embodiment, the reflecting unit 11-D1200 further comprises a correction driving module 11-D1240, and the optical system 11-D10 further comprises an inertia detecting module 11-D4000. The correction driving module 11-D1240 comprises electromagnetic driving assemblies 11-D1241 and 11-D1242, respectively disposed on the optical member holder 11-D1230 and the case of the reflecting unit 11-D1200. The correction driving module 11-D1240 is used to drive the optical member holder 11-D1230 to rotate. For example, the electromagnetic driving assembly 11-D1241 can be a magnet, and the electromagnetic driving assembly 11-D1242 can be a driving coil. When a current flows through the driving coil (the electromagnetic driving assembly 11-D1242), an electromagnetic effect is generated between the driving coil and the magnet. Thus, the optical member holder 11-D1230 and the optical members 11-D1241 and 11-D1242 disposed thereon can be simultaneously driven to rotate.

The inertia detecting module 11-D4000 can be a gyroscope or an acceleration detector, and electrically connected to the correction driving module 11-D1240. After the inertia detecting module 11-D4000 measures the gravity state or the acceleration state of the optical system 11-D10, it can transmit the measure result to the correction driving module 11-D1240. The correction driving module 11-D1240 can provide a suitable current to the driving assembly 11-D1242 according to the measure result, so as to drive the optical members 11-D1210 and 11-D1220 to rotate.

The refractive indexes of the optical members 11-D1210 and 11-D1220 are greater than the refractive index of the air. In this embodiment, the optical members 11-D1210 and 11-D1220 are prisms. In some embodiments, the optical member 11-D1210 and/or the optical member 11-D1220 are/is reflecting mirror(s).

In some embodiments, the lens unit in the aforementioned embodiments can comprise a zoom lens, and the optical module will become a zoom module. For example, as shown in FIG. 11-10, the lens unit can comprises an objective lens 11-O, an eyepiece lens 11-E, and at least one optical lens 11-S, wherein the optical lens 11-S is disposed between the objective lens 11-O and the eyepiece lens 11-E, and is movable relative to the objective lens 11-O.

In summary, a reflecting unit is provided, including an optical member holder, an optical member, a frame, a first bearing member, a first hinge, and a first driving module. The optical member is disposed on the optical member holder. The first bearing member is disposed on the frame or the optical member holder. The first hinge is pivotally connected to the optical member holder and the frame. The first driving module can drive the optical member holder to rotate relative to the frame. When the optical member holder rotates relative to the frame, the first hinge rotates relative to the optical member holder or the frame via the first bearing member.

Twelfth Group of Embodiments

Referring to FIG. 12-1, in an embodiment of the disclosure, an optical system 12-10 can be disposed in an electronic device 12-20 and used to take photographs or record video. The electronic device 12-20 can be a smartphone or a digital camera, for example. The optical system 12-10 comprises a first optical module 12-1000 and a second optical module 12-2000. When taking photographs or recording video, the aforementioned optical modules can receive lights and form images, wherein the images can be transmitted to a processor (not shown) in the electronic device 12-20, where post-processing of the images can be performed.

Referring to FIGS. 12-2 and 12-3, the first optical module 12-1000 comprises a lens unit 12-1100, a reflecting unit 12-1200, a first image sensor 12-1300, and a first fixing component 12-1400. The lens unit 12-1100 and the reflecting unit 12-1200 can be joined and affixed to each other using the first fixing component 12-1400. The lens unit 12-1100 is disposed between the reflecting unit 12-1200 and the first image sensor 12-1300, and the reflecting unit 12-1200 is disposed beside an opening 12-22 on an case 12-21 of the electronic device 12-20.

An external light 12-L can enter the first optical module 12-1000 through the opening 12-22 along a first direction (the Z-axis), and be reflected by the reflecting unit 12-1200. The reflected external light 12-L moves along a second direction (the –X-axis), passes through the lens unit 12-1100 and reaches the first image sensor 12-1300. In other words, the reflecting unit 12-1200 can change the moving direction of the external light 12-L from the first direction to the second direction.

As shown in FIGS. 12-2-12-4, the lens unit 12-1100 primarily comprises a first optical member driving mechanism 12-M1 and a first optical member 12-F1, wherein the first optical member driving mechanism 12-M1 is used to drive the first optical member 12-F1 to move relative to the first image sensor 12-1300. For example, the first optical member driving mechanism 12-M1 can comprise a first movable portion 12-1110, a first fixed portion 12-1120, a plurality of elastic members 12-1130, a plurality of suspension wires 12-1140, and a first driving module 12-1150.

The first movable portion 12-1110 comprises a first optical member holder 12-1111, and the first optical member 12-F1 can be supported by the first optical member holder 12-1111. The first fixed portion 12-1120 comprises a frame 12-1121, a base 12-1122, and a first circuit component 12-1123. The frame 12-1121 has a top wall 12-1124 and a plurality of lateral walls 12-1125 connected to the top wall 12-1124, and the lateral walls 12-1125 are extended to the base 12-1122. Therefore, the frame 12-1121 and the base 12-1122 can be assembled and form an accommodating space. The first optical member holder 12-1111 can be accommodated in the accommodating space.

The first circuit component 12-1123 is disposed on the base 12-1122, and has a first connecting portion 12-1123*a*. The first connecting portion 12-1123*a* protrudes from one of the lateral walls 12-1125, so as to electrically connect one or more other electronic members in the electronic device 12-20. It should be noted that the normal direction of the lateral wall 12-1125, from which the first connecting portion 12-1123*a* protrudes, is perpendicular to the first direction and the second direction. Thus, the lens unit 12-1100, the reflecting unit 12-1200, and the first image sensor 12-1300 can be tightly connected to each other, and the first connecting portion will not form a gap between the lens unit 12-1100 and the reflecting unit 12-1.200 or between the lens unit 12-11.00 and the first image sensor 12-1300.

The elastic members 12-1130 are connected to the first fixed portion 12-1120 and the first movable portion 12-1110, so as to hang the first optical member holder 12-1111 in the accommodating space. The suspension wires 12-1140 are connected to the first circuit component 12-1123 and the elastic members 12-1130. Since both the elastic members 12-1130 and the suspension wires 12-1140 comprise metal (such as copper or an alloy thereof), they can be used as a conductor. For example, the first circuit component 12-1123 can provide current to the first driving module 12-1150 through the suspension wires 12-1140 and the elastic members 12-1130.

The first driving module 12-1150 comprises electromagnetic driving assemblies 12-1151 and 12-1152, corresponding to each other and respectively disposed on the first fixed portion 12-1120 and the first optical member holder 12-1111. In this embodiment, the electromagnetic driving assembly 12-1151 can be a magnetic member (such as a magnet), and the electromagnetic driving assembly 12-1152 can be a coil.

When current flows through the coil 12-1152 (the electromagnetic driving assembly 12-1152), an electromagnetic effect is generated between the electromagnetic driving assemblies 12-1151 and 12-1152, and the first optical member holder 12-1111 and the optical member 12-F1 disposed thereon can be driven to move relative to the first image sensor 12-1300, so as to achieve the purpose of auto focus.

FIG. 12-5 is a schematic diagram of the reflecting unit 12-1200 in this embodiment, and FIG. 12-6 is an exploded-view diagram thereof. Referring to FIGS. 12-2, 12-3, 12-5, and 12-6, the reflecting unit 12-1200 primarily comprises a second optical member driving mechanism 12-M2 and a second optical member 12-F2, wherein the second optical member driving mechanism 12-M2 comprises a second movable portion 12-1210, a second fixed portion 12-1220, a second driving module 12-1230, and a plurality of elastic members 12-1240.

The second movable portion 12-1210 comprises a second optical member holder 12-1211, and the second optical member 12-F2 is disposed on the second optical member holder 12-1211. For example, the second optical member 12-F2 can be a prism or a reflecting mirror.

The second fixed portion 12-1220 comprises a frame 12-1221, a base 12-1222, at least one metal cover 12-1223, a second circuit component 12-1224, and at least one toughened component 12-1225. The frame 12-1221 and the base 12-1222 can be joined together, and protrusions 12-P1 and 12-P2 can be respectively formed on the frame 12-1221 and the base 12-1222. The metal cover 12-1223 has a plurality of holes 2-O corresponding to the protrusions 12-P1 and 12-P2. Therefore, the frame 12-1221 and the base 12-1222 can be affixed to each other by passing the protrusions 12-P1 and 12-P2 through the holes 12-O.

In this embodiment, the second fixed portion 12-1220 further comprises a plurality of (at least three) extending portions 12-1226 protruding from an outer surface 12-1227 (a second outer surface) of the frame 12-1221. Each of the extending portions 12-1226 has a contacting surface **12-1226*a*. The contacting surfaces 12-1226*a* of the extending portions 12-1226** are coplanar.

When the lens unit 12-1100 and the reflecting unit 12-1100 are joined by the first fixing component 12-1400, the outer surface 12-1227 of the second fixed portion 12-1220 faces the lens unit 12-1100, and the contacting surfaces **12-1226*a* contact the lens unit 12-1100 (FIG. 12-3). Since the contacting surfaces 12-1226*a* are coplanar, the reflecting unit 12-1200 can be prevented from skewing relative to the lens unit 12-1200 when assembling, and the deviation of the moving direction of the external light 12-**L can be avoided.

In some embodiments, the extending portions 12-1226 can be omitted, and a first outer surface 12-1126 of the first fixed portion 12-1120 facing the second outer surface 12-1227 of the second fixed portion 12-1220 directly contacts the second outer surface 12-1227, wherein the first outer surface 12-1126 and the second outer surface 12-1227 are parallel.

The second circuit component 12-1224 is disposed on the base 12-1222, and electrically connected to the second driving module 12-1230. The toughened component 12-1225 is disposed on the second circuit component 12-1224, so as to protect the second circuit component 12-1224 from impacting by other members. In other words, the second circuit component 12-1224 is disposed between the toughened component 12-1225 and the second driving module 12-1230, and covered by the toughened component 12-1225.

Similar to the first connecting portion **12-1123*a*, the second circuit component 12-1224 has a second connecting portion 12-1224*a* protruding from the lateral wall 12-1125, so as to electrically connect other electronic member(s) in the electronic device 12-20. It should be noted that, in this embodiment, the first connecting portion 12-1123*a* and the second connecting portion 12-1224*a* are electrically independent, and disposed on the same side of the first optical module 12-1000**.

As shown in FIGS. 12-2, 12-3, 12-5, and 12-6, the elastic members 12-1240 are connected to the second movable portion 12-1210 and the fixed portion 12-1220, so as to hang the second movable portion 12-1210 on the second fixed portion 12-1220. The second driving module 12-1230 can comprise at least one electromagnetic driving assembly 12-1231 and at least one electromagnetic driving assembly 12-1232, respectively disposed on the second optical member holder 12-1.211 and the second circuit component 12-1224. The electromagnetic driving assembly 12-1232 can pass through a hole 12-1228 of the base 12-1222 and correspond to the electromagnetic driving assembly 12-1231.

The second optical member holder 12-1211 and the second optical member 12-F2 can be driven by an electromagnetic effect between the electromagnetic driving assemblies 12-1231 and 12-1232 to rotate relative to the second fixed portion 12-1220. For example, in this embodiment, the electromagnetic driving assembly 12-1231 may comprise at least one magnetic member (such as a magnet), and the electromagnetic driving assembly 12-1232 can be a driving coil.

When a current flows through the driving coil (the electromagnetic driving assembly 12-1232), an electromagnetic effect is generated between the driving coil and the magnet. Thus, the second optical member holder 12-1211 and the second optical member 12-F2 can be driven to rotate relative to the second fixed portion 12-1220 around a rotation axis 12-R (extending along the Y-axis), so as to adjust the position of the light 12-L on the image sensor 12-1300.

In some embodiments, the electromagnetic driving assembly 12-1231 can be a driving coil, and the electromagnetic driving assembly 12-1232 can be a magnet.

It should be noted that, since the lens unit 12-1100 and the reflecting unit 12-1200 are modularized (i.e. they can be independently replaced or taken out to maintain), one of the lateral walls 12-1125 is situated between the first optical member 12-F1 and the second optical member 12-F2. Furthermore, as shown in FIG. 12-2, in this embodiment, the optical system 12-10 further comprises a dust-proof plate 12-3000, disposed on a side of the first optical module 12-1000, and having an opening 12-3100 in the position corresponding to the second optical member 12-F2.

In some embodiments, the optical system 12-10 comprises a transparent material in the position corresponding to the second optical member 12-F2, and the external light 12-L can pass through.

Referring to FIG. 12-7, in this embodiment, the first optical member driving mechanism 12-M1 and the second optical member driving mechanism 12-M2 respectively have width 12-W1 and width 12-W2 along the X-axis, and the first optical member driving mechanism 12-M1 and the second optical member driving mechanism 12-M2 respectively have length 12-L1 and length 12-L2 along the Y-axis, wherein (12-L1)/(12-W1)>(12-L2)/(12-W2). In this embodiment, the length 12-L1 of the first optical member driving mechanism 12-M1 is substantially the same as the length 12-L2 of the second optical member driving mechanism 12-M2.

Referring to FIGS. 12-2, 12-3, and 12-8, the second optical module 12-2000 of the optical system 12-10 is disposed beside the first optical module 12-1000, and the first optical module 12-1000 and the second optical module 12-2000 can be joined and affixed to each other using a second fixing component 12-4000. The second optical module 12-2000 comprises a third optical member driving mechanism 12-M3, a third optical member 12-F3, and a second image sensor 12-2100, wherein the third optical member driving mechanism 12-M3 comprises a third fixed portion 12-2200, a third movable portion 12-2300, a first elastic member 12-2400, a second elastic member 12-2500, a third driving module 12-2600, a plurality of suspension wires 12-2700, and at least one light adjusting assembly 12-2800.

The third fixed portion 12-2200 comprises a housing 12-2210 and a base 12-2220. The housing 12-2210 and the base 12-2220 can form a hollow box, and the third movable portion 12-2200 and the third optical member driving mechanism 12-M3 can be accommodated in the aforementioned box.

The third movable portion 12-2300 can comprise a third optical member holder 12-2310 and a frame 12-2320. The third optical member holder 12-2310 can support the third optical member 12-F3, and movably connected to the frame 12-2320 via the first elastic member 12-2400 and the second elastic member 12-2500.

In particular, the first elastic member 12-2400 and the second elastic member 12-2500 are respectively disposed on opposite sides of the third optical member holder 12-2310. The inner portion 12-2410 and the outer portion 12-2420 of the first elastic member 12-2400 are respectively connected to the third optical member holder 12-2310 and the frame 12-2320, and the inner portion 12-2510 and the outer portion 12-2520 of the second elastic member 12-2500 are respectively connected to the third optical member holder 12-2310 and the frame 12-2320. Thus, the third optical member holder 12-2310 can be hung in the frame 12-2320.

The third driving module 12-2600 comprises at least one first electromagnetic driving assembly 12-2610, at least one second electromagnetic driving assembly 12-2620, and a coil board 12-2630. The first electromagnetic driving assembly 12-2610 and the second electromagnetic driving assembly 12-2620 are respectively disposed on the third optical member holder 12-2310 and the frame 12-2320 and corresponded to each other.

The third optical member holder 12-2310 and the third optical member 12-F3 disposed thereon can be driven by the electromagnetic effect between the first electromagnetic driving assembly 12-2610 and the second electromagnetic driving assembly 12-2620 to move relative to the frame 12-2320 along the Z-axis.

For example, in this embodiment, the first electromagnetic driving assembly 12-2610 can be a driving coil surrounding the third optical member holder 12-2610, and the second electromagnetic driving assembly 12-2620 can comprise at least one magnetic member (such as a magnet). When a current flows through the driving coil (the first electromagnetic driving assembly 12-2610), an electromagnetic effect is generated between the driving coil and the magnet. Thus, the third optical member holder 12-2310 and the third optical member 12-F3 can be driven to move relative to the frame 12-2320 and the image sensor 12-2100 along the Z-axis, and the purpose of auto focus can be achieved.

In some embodiments, the first electromagnetic driving assembly 12-2610 can be a magnetic member, and the second electromagnetic driving assembly 12-2620 can be a driving coil.

Referring to FIGS. 12-2, 12-3, and 12-8, the coil board 12-2630 is disposed on the base 12-2220. Similarly, when a current flows through the coil board 12-2630, an electromagnetic effect is generated between the coil board 12-2630 and the second electromagnetic driving assembly 12-2620 (or the first electromagnetic driving assembly 12-2610). Thus, the third optical member holder 12-2310 and the frame 12-2320 can be driven to move relative to coil board 12-2630 along the X-axis and/or the Y-axis, and the third optical member 12-F3 can be driven to move relative to second image sensor 12-2100 along the X-axis and/or the Y-axis. The purpose of image stabilization can be achieved.

In this embodiment, the third optical member driving mechanism 12-M3 comprises four suspension wires 12-2700. Four suspension wires 12-2700 are respectively disposed on the four corners of the coil board 12-2630 and connect the coil board 12-2630, the base 12-2220 and the first elastic member 12-2400. When the third optical member holder 12-2310 and the third optical member 12-F3 move along the X-axis and/or the Y-axis, the suspension wires 12-2700 can restrict their range of motion. Moreover, since the suspension wires 12-2700 comprise metal (for example, copper or an alloy thereof), the suspension wires 12-2700 can be used as a conductor. For example, the current can flow into the first electromagnetic driving assembly 12-2610 through the base 12-2220 and the suspension wires 12-2700.

Referring to FIG. 12-9, the second optical member driving mechanism 12-M2 and the third optical member driving mechanism 12-M3 respectively have a first lateral side 12-M21 and a second lateral side 12-M31. Specifically, in order to reduce magnetic interference between the second optical member driving mechanism 12-M2 and the third optical member driving mechanism 12-M3, magnetic member is only disposed on one of the first lateral side 12-M21 and the second lateral side 12-M31.

For example, in this embodiment, the third driving module 12-2600 of the third optical member driving mechanism 12-M3 is disposed adjacent to the second lateral side 12-M31, and there is no magnetic member disposed on the position adjacent to the first lateral side 12-M21 of the second optical member driving mechanism 12-M2. The second driving module 12-1230 of the second optical member driving mechanism 12-M2 is disposed away from the first lateral side 12-M21.

In some embodiments, the second driving module 12-1230 of the second driving module 12-1230 is disposed adjacent to the first lateral side 12-M21, and there is no magnetic member disposed on the position adjacent to the second lateral side 12-M31 of the third optical member driving mechanism 12-M3. The third driving module 12-2600 of the third optical member driving mechanism 12-M3 is disposed away from the second lateral side 12-M31.

Furthermore, in this embodiment, a portion of the metal cover 12-1223 is disposed between the second optical member driving mechanism 12-M2 and the third optical member driving mechanism 12-M3. In order to reduce magnetic interference between the second optical member driving mechanism 12-M2 and the third optical member driving mechanism 12-M3, the metal cover 12-1223 can comprise magnetically impermeable material.

As shown in FIGS. 12-2, 12-3, and 12-8, the light adjusting assembly 12-2800 is pivotally connected to the third optical member holder 12-2310, and can rotate to the position above the third optical member 12-F3 to adjust the area which allows external light to enter the third optical member 12-F3. It should be noted that, in some embodiments, the light adjusting assembly 12-2800 is driven by magnetic force. In order to reduce magnetic interference between the second optical member driving mechanism 12-M2 and the third optical member driving mechanism 12-M3, the light adjusting assembly 12-2800 can be disposed away from the second optical member driving mechanism 12-M2. In other words, the optical axis of the third optical member 12-F3 is disposed between the light adjusting assembly 12-2800 and the second optical member driving mechanism 12-M2.

Referring to FIG. 12-10, in another embodiment of the disclosure, the lens unit 12-1100 and the reflecting unit 12-1200 of the first optical module 12-1000 are arranged along the second direction, and the first optical module 12-1000 and the second optical module 12-2000 are arranged along the rotation axis 12-R, so as to further reduce magnetic interference between the second optical member driving mechanism 12-M2 and the third optical member driving mechanism 12-M3.

Referring to FIGS. 12-11 and 12-12, in another embodiment, the first optical module 12-1000 can comprise two or more lens units 12-1100, and the first optical members 12-F1 on the first optical member driving mechanisms 12-M1 of these lens units 12-1100 are parallel to and aligned with each other.

It should be noted that, in assembly, the user can attach the lens unit 12-1100 and the reflecting unit 12-1200 to the first fixing component 12-1400 with glue, and can adjust the positions of the lens unit 12-1100 and the reflecting unit 12-1200 before the glue solidifies. The optical axis of the first optical member 12-F1 of each lens unit 12-1100 can be aligned with the center of the second optical member 12-F2 of the reflecting unit 12-1200. Similarly, when the user attaches the first optical module 12-1000 and the second optical module 12-2000 to the second fixing component 12-4000 with glue, he can also adjust the relative positions of the first optical module 12-1000 and the second optical module 12-2000 before the glue solidifies.

In the aforementioned embodiments, the focal length of the first optical member 12-F1 is less than the focal length of the third optical member 12-F3, therefore, the thickness of the optical system 12-10 in the Z-axis can be reduced. For example, the focal length of the third optical member 12-F3 is three or more times the focal length of the first optical member 12-F1.

In summary, an optical system is provided, including a first optical member driving mechanism, a second optical member driving mechanism, and a first fixing component. The first optical member driving mechanism includes a first fixed portion, a first movable portion, a plurality of elastic members, and a first driving module. The first movable portion is movably connected to the first fixed portion, and comprises a first optical member holder to support a first optical member. Each of the elastic members is elastically connected to the first fixed portion and the first movable portion. The first driving module can drive the first movable portion to move relative to the first movable portion along an optical axis of the first optical member, and the first driving module is electrically connected to the elastic member. The second optical member driving mechanism includes a second fixed portion, a second movable portion, and a second driving module. The second movable portion is movably connected to the second fixed portion, and has a second optical member holder to support a second optical member. The second driving module can drive the second movable portion to rotate relative to the second fixed portion around a rotation axis. The first fixing component affixes the first optical member driving mechanism to the second optical member driving mechanism. The second optical member can change the moving direction of an external light from a first direction to a second direction, the second direction is parallel to the optical axis of the first optical member, and the rotation axis is perpendicular to the first direction and the second direction.

Thirteenth Group of Embodiments

Please refer to FIG. 13-1 and FIG. 13-2. FIG. 13-1 is a top view of an electronic device 13-10 according to an embodiment of the present disclosure, and FIG. 13-2 is a schematic diagram of the electronic device 13-10 according to this embodiment of the present disclosure. In this embodiment, an optical system can be disposed in the electronic device 13-10, and the optical system includes an optical module 13-100, an optical module 13-200, and an optical module 13-300. As shown in FIG. 13-1, the electronic device 13-10 includes a housing 13-12, a display panel 13-14, and a control unit 13-16. The control unit 13-16 is configured to control the operation of those optical modules and control the display panel 13-14 to display images or to present a transparent state.

In this embodiment, the control unit 13-16 may be a processor or a processing chip of the electronic device 13-10, but it is not limited thereto. For example, the control unit 13-16 can also be a control chip in the optical system and may be configured to control the operation of the optical module 13-100, the optical module 13-200, and the optical module 13-300.

As shown in FIG. 13-1, the optical module 13-100 faces the display panel 13-14. As shown in FIG. 13-2, the optical module 13-200 and the optical module 13-300 face the housing 13-12 and are respectively exposed to an opening 13-18 and an opening 13-20 of the housing 13-12. The optical module 13-100 and the optical module 13-200 may have the same structure.

Each of the optical modules mention above may be an optical camera module configured to hold and drive an optical member, and may be mounted on various electronic devices or portable electronic devices. For example, it may be installed in a smart phone (such as the electronic device 13-10) for the user to perform the function of image capturing. In this embodiment, the optical module 13-100 may have a voice coil motor (VCM) with an auto focus (AF) function, but the it is not limited thereto. In other embodiments, the optical module 13-100 can also have auto focus and optical image stabilization (OIS) functions. In addition, the optical module 13-300 can be a periscope camera module.

Next, please refer to FIG. 13-3, which is an exploded diagram of the optical module 13-100 according to the embodiment in FIG. 13-1 of the present disclosure. As shown in FIG. 13-3, in the embodiment, the optical module 13-100 mainly includes a buffering member 13-50, a fixed assembly (including an outer frame 13-102 and a base 13-112), a first elastic member 13-106, a lens 13-LS, a movable member (a lens holder 13-108), a driving assembly (including a first magnet 13-MG11, a second magnet 13-MG12, a first coil 13-CL11, and a second coil 13-CL12), a second elastic member 13-110, two circuit members 13-114, and a photosensitive module 13-115.

In this embodiment, the lens holder 13-108 is movably connected to the fixed assembly, the lens holder 13-108 is configured to hold an optical member (such as the lens 13-LS), and the lens 13-LS defines an optical axis 13-O.

As shown in FIG. 13-3, the outer frame 13-102 has a hollow structure, and an outer frame opening 13-1021 is formed thereon. A base opening 13-1121 is formed on the base 13-112, the center of the outer frame opening 13-1021 corresponds to the optical axis 13-O of the lens 13-LS, and the base opening 13-1121 corresponds to the photosensitive module 13-115 disposed under the base 13-112. An external light can enter the outer frame 13-102 through the outer frame opening 13-1021 and can be received by the photosensitive module 13-115 through the lens 13-LS and the base opening 13-1121 so as to generate a digital image signal.

Furthermore, the outer frame 13-102 is disposed on the base 13-112, and can form an accommodating space 13-1023 for accommodating the lens 13-LS, the lens holder 13-108, the first elastic member 13-106, the first magnet 13-MG11, the second magnet 13-MG12, the first coil 13-CL11, the second coil 13-CL12 and so on.

In addition, the outer frame 13-102 has a top wall 13-TW that is not parallel to the optical axis 13-O and a side wall 13-SW extending from the edge of the top wall 13-TW along the optical axis 13-O. The top wall 13-TW has a first surface 13-S1, and the first surface 13-S1 faces a light incident end.

As shown in FIG. 13-3, the buffering member 13-50 is disposed on the first surface 13-S1 of the outer frame 13-102, and the buffering member 13-50, the lens holder 13-108 (the moving member) and the fixed assembly are arranged along the optical axis 13-O. The buffering member 13-50 is made of a soft resin material and surrounds the optical axis 13-O. Specifically, as shown in FIG. 13-3, a groove 13-1024 is further formed on the first surface 13-S1 for accommodating a portion of the buffering member 13-50.

In this embodiment, the driving assembly is electrically connected to the circuit members 13-114 and can drive the lens holder 13-108 to move relative to the fixed assembly, such as relative to the base 13-112. The first coil 13-CL11 and the second coil 13-CL12 are disposed on the lens holder 13-108, and the first magnet 13-MG11 and the second magnet 13-MG12 respectively corresponding to the first coil 13-CL11 and the second coil 13-CL12 are disposed on the outer frame 13-102.

Please refer to FIG. 13-3 and FIG. 13-4 together. FIG. 13-4 is a schematic diagram of the first magnet 13-MG11, the second magnet 13-MG12, the first elastic member 13-106 and the outer frame 13-102 in another view according to an embodiment of the present disclosure. As shown in FIG. 13-4, in this embodiment, the outer frame 13-102 includes a plurality of positioning columns 13-1025 which are extended from the top wall 13-TW along the optical axis 13-O, and the positioning columns 13-1025 are configured to fix the first magnet 13-MG11 and the second magnet 13-MG12 of the driving assembly.

In this embodiment, the first coil 13-CL11 and the second coil 13-CL12 may be winding coils disposed on opposite sides of the lens holder 13-108. The first coil 13-CL11 corresponds to the first magnet 13-MG11, and the second coil 13-CL12 corresponds to the second magnet 13-MG12. When the first coil 13-CL11 and the second coil 13-CL12 are provided with electricity, they can act with the first magnet 13-MG11 and the second magnet 13-MG12 to generate an electromagnetic force, to drive the lens holder 13-108 and the lens 13-LS to move relative to the base 13-112 along the optical axis 13-O (the Z-axis direction).

Furthermore, as shown in FIG. 13-4, the top wall 13-TW further has a second surface 13-S2 and a third surface 13-S3, and both the second surface 13-S2 and the third surface 13-S3 are opposite to the first surface 13-S1. When viewed along the optical axis 13-O, the first surface 13-S1 partially overlaps the second surface 13-S2, and the first surface 13-S1 partially overlaps the third surface 13-S3.

In this embodiment, as shown in FIG. 13-4, a portion (an outer ring portion) of the first elastic member 13-106 is positioned on the second surface 13-S2 by the positioning columns 13-1025. The other portion (an inner ring portion) of the first elastic member 13-106 is connected to the lens holder 13-108 so that the lens holder 13-108 is movably connected to the outer frame 13-102. In addition, when viewed along the optical axis 13-O, a portion of the first elastic member 13-106 in the Y-axis direction is located between the positioning columns 13-1025 and the side wall 13-SW.

Furthermore, as shown in FIG. 13-4, the top wall 13-TW further has a through hole 13-TH for accommodating a portion of the buffering member 13-50, and when viewed along the optical axis 13-O, the through hole 13-TH partially overlaps the third surface 13-S3.

Please refer to FIG. 13-4A, which is a cross-sectional view of a partial structure of the top wall 13-TW and the buffering member 13-50 according to another embodiment of the present disclosure. In this embodiment, the buffering member 13-50 may have a narrow portion 13-501 and a lateral protruding portion 13-503, the narrow portion 13-501 is disposed in the through hole 13-TH, and the lateral protruding portion 13-503 can prevent the buffering member 13-50 from separating from the top wall 13-TW.

Please refer to FIG. 13-5, which is a cross-sectional view of a partial structure of an optical module 13-100A according to another embodiment of the present disclosure. In this embodiment, a slot 13-ST corresponding to the through hole 13-TH may be further formed on the outer frame 13-102A. For example, the slot 13-ST is communicated with the through hole 13-TH. The slot 13-ST is configured to receive and position a circuit board 13-116. Based on the design of the outer frame 13-102A in this embodiment, the purpose of miniaturization can be further achieved.

Please refer to FIG. 13-4 and FIG. 13-6 together. FIG. 13-6 is a top view of FIG. 13-4 along the Z-axis direction according to the embodiment of the present disclosure. The outer frame 13-102 may further include a fourth surface 13-S4 disposed on the side wall 13-SW and connected to the first surface 13-S1. As shown in FIG. 13-6, a portion of the first surface 13-S1 is located between the buffering member 13-50 and the fourth surface 13-S4 when viewed along the optical axis 13-O.

Please refer to FIG. 13-6 and FIG. 13-7. FIG. 13-7 is a cross-sectional views along the line 13-A-13-A' in FIG. 13-6 according to the embodiment of the present disclosure. As shown in FIG. 13-6 and FIG. 13-7, the buffering member 13-50 includes a body 13-504 and an extension fixing portion 13-505. A portion of the extension fixing portion 13-505 is disposed in the groove 13-1024 and protrudes from the body 13-504 of the buffering member 13-50 in a direction perpendicular to the optical axis 13-O (for example, the X-axis direction). In addition, as shown in FIG. 13-7, in the direction of the optical axis 13-O (the Z-axis direction), a maximum distance 13-MD1 between the extension fixing portion 13-505 and the first surface 13-S1 is shorter than a maximum distance MD2 between the body 13-504 and the first surface 13-S1.

Please refer to FIG. 13-8, which is a cross-sectional view along the line 13-B-13-B' in FIG. 13-6 according to the embodiment of the present disclosure. As shown in FIG. 13-8, in the direction of the optical axis 13-O (the Z-axis direction), a distance 13-ZD1 between the first surface 13-S1 and the second surface 13-S2 is greater than a distance 13-ZD2 between the first surface 13-S1 and the third surface 13-S3. In addition, when viewed along the optical axis 13-O, the groove 13-1024 partially overlaps the second surface 13-S2. Based on the structural design of this embodiment, the purpose of miniaturization can be achieved.

It should be noted that, as shown in FIG. 13-8, when viewed in a direction that is different from the optical axis 13-O, the first surface 13-S1 partially overlaps the buffering member 13-50.

Please refer back to FIG. 13-3. As shown in FIG. 13-3, four protruding columns 13-1122 and a receiving groove 13-1123 are formed on the base 13-112. An outer portion (an outer ring portion) of the second elastic member 13-110 is fixed to the receiving groove 13-1123, and inner portions (the inner ring portions) of the first elastic member 13-106 and the second elastic member 13-110 are respectively connected to the upper side and the lower side of the lens holder 13-108, so that the lens holder 13-108 can be suspended in the accommodating space 13-1023.

Furthermore, in this embodiment, the circuit members 13-114 are disposed inside the base 13-112. For example, the base 13-112 is made of a plastic material, and the circuit members 13-114 are formed in the base 13-112 in the form of the molded interconnected device (MID).

Please refer to FIG. 13-3 and FIG. 13-9 together. FIG. 13-9 is a top view of the outer frame 13-102 and the circuit members 13-114 according to an embodiment of the present disclosure. As shown in FIG. 13-9, the circuit member 13-114 partially overlaps the through hole 13-TH when viewed along the optical axis 13-O (the Z-axis direction).

Next, please refer to FIG. 13-10, which is a diagram of the lens holder 13-108 and the base 13-112 according to an embodiment of the present disclosure. In this embodiment, the lens holder 13-108 includes two winding portions 13-1081 and a plurality of first stopping members 13-1082. The winding portions 13-1081 are connected to the driving assembly (such as the first coil 13-CL11) and are extended along the optical axis 13-O (the Z-axis direction) toward the base 13-112. The first stopping members 13-1082 are extended along the optical axis 13-O (the Z-axis direction) toward the base 13-112, so as to limit a moving range (a range of motion) of the lens holder 13-108 in the Z-axis direction.

Furthermore, along the optical axis 13-O, a first distance 13-BD1 between the winding portion 13-1081 and a base surface 13-1125 of the base 13-112 is different from a second distance 13-BD2 between the first stopping member 13-1082 and the base surface 13-1125. The base surface 13-1125 faces toward alight-exiting end.

In addition, the lens holder 13-108 further includes a second stopping member 13-1083 extending toward the base 13-112 along the optical axis 13-O for limiting the moving range of the lens holder 13-108. In the direction of the optical axis 13-O (the Z-axis direction), a third distance 13-BD3 between the second stopping member 13-1083 and the base surface 13-1125 is different from the first distance 13-BD1 and the second distance 13-BD2. Specifically, the first distance 13-BD1 is shorter than the second distance 13-BD2, and the second distance 13-BD2 is shorter than the third distance 13-BD3.

Please refer to FIG. 13-11, which is a partial structural diagram of the lens holder 13-108 and the outer frame 13-102 according to an embodiment of the present disclosure. As shown in FIG. 13-11, the lens holder 13-108 has a side wall 13-1084, a receiving groove 13-1085, and a blocking wall 13-1086. The receiving groove 13-1085 is located between the blocking wall 13-1086 and the side wall 13-1084 for accommodating a portion of the second coil 13-CL12 (a wire 13-WR).

Furthermore, as shown in FIG. 13-11, the side wall 13-1084 is parallel to the optical axis 13-O (the Z-axis direction), and a shortest distance 13-SD1 between the side wall 13-1084 and the outer frame 13-102 is shorter than a shortest distance 13-SD2 between the blocking wall 13-1086 and the outer frame 13-102.

Furthermore, it should be noted that, as shown in FIG. 13-11, the winding portion 13-1081 has a first side surface 13-1088, and the first side surface 13-1088 is a slope. That is, the first side surface 13-1088 is not parallel or perpendicular to the optical axis 13-O.

Based on the structural design of the lens holder 13-108 of the present disclosure, the force applied to the lens holder 13-108 can be distracted when the lens holder 13-108 is collided, thereby reducing the probability of damage of the optical module 13-100, and the purpose of miniaturization can also be achieved at the same time.

Please refer to FIG. 13-12, which is a cross-sectional view along the line 13-C-13-C' in FIG. 13-1 according to the embodiment of the present disclosure. As shown in FIG. 13-12, the optical module 13-100 is in contact with the display panel 13-14, the first surface 13-S1 of the top wall 13-TW faces the display panel 13-14, and the buffering member 13-50 is disposed between the top wall 13-TW and the display panel 13-14.

The buffering member 13-50 includes a first portion 13-506 and a second portion 13-507, the second portion 13-507 is located between the first portion 13-506 and the first surface 13-S1. Furthermore, in a direction (for example, in the X-axis direction) which is perpendicular to the optical axis 13-O and the extending direction of the buffering member 13-50, the size of the first portion 13-506 is smaller than the size of the second portion 13-507.

In this embodiment, the buffering member 13-50 is a tapered structure along the Z-axis direction, for example, a trapezoidal shape, so as to facilitate deformation when being squeezed, and the buffering effect between the optical module 13-100 and the display panel 13-14 can be enhanced.

In this embodiment, the lens holder 13-108 (the moving member) can move along the Z-axis direction toward the light incident end to an extreme position, as shown in FIG. 13-12. When the lens holder 13-108 is at the extreme position, the lens 13-LS is not over a top end 13-508 of the buffering member 13-50. When viewed in a direction perpendicular to the optical axis 13-O (for example, in the Y-axis direction) and the lens holder 13-108 is located at this extreme position, a top surface 13-LS1 of the lens 13-LS partially overlaps the buffering member 13-50.

In addition, in this embodiment, the length of the lens 13-LS along the Z-axis direction is greater than the overall height of the outer frame 13-102 and the base 13-112, so that a portion of the lens 13-LS protrudes from the base opening 13-1121 of the base 13-112 toward a light-exiting end, and the portion is adjacent to the photosensitive module 13-115.

As shown in FIG. 13-12, the photosensitive module 13-115 of this embodiment may include a substrate 13-1151, a protective frame 13-1152, and a photosensitive element 13-1153. The photosensitive element 13-1153 is disposed on the substrate 13-1151, and the protective frame 13-1152 is disposed between the substrate 13-1151 and the base 13-112. The protective frame 13-1152 partially overlaps the lens 13-LS when viewed in a direction perpendicular to the optical axis 13-O (for example, in the X-axis direction). Based on the arrangement of the protective frame 13-1152, the photosensitive element 13-1153 can be shielded to prevent unnecessary light from affecting the imaging quality.

In addition, the photosensitive module 13-115 may further include a transparent sheet 13-1154, and the transparent sheet 13-1154 may be, for example, a red light filter, but it is not limited thereto. The transparent sheet 13-1154 is configured to filter the light into the photosensitive element 13-1153.

It should be noted that the optical module (such as the optical module 13-100, the optical module 13-200, and the optical module 13-300) can also be applied to the optical modules 1-A1000, 1-A2000, 1-A3000, 1-B2000, 1-C2000, 1-D2000, 12-2000 in the embodiments of the present disclosure.

The present disclosure provides an optical system disposed in an electronic device. The display panel of the electronic device is a display panel capable of controlling its transparency. When a user wishes to take an image using one optical module of the optical system of the present disclosure, the display panel can be changed to be transparent to facilitate taking such an image. The optical module may include a buffering member disposed between the fixed assembly and the display panel, so that the fixed assembly can be more closely connected to the display panel, and the buffering capabilities of the optical module may be increased.

In addition, the buffering member is made of a soft material and surrounds the lens of the optical module. Therefore, when the buffering member is closely attached to the display panel, the buffering member can effectively prevent unnecessary light from entering the optical module and affecting the imaging quality.

Fourteenth Group of Embodiments

FIGS. 14-1 and 14-2 are schematic diagrams showing several optical systems 14-1, 14-2, and 14-3 disposed in a cell phone, in accordance with an embodiment of the application. As shown in FIGS. 14-1 and 14-2, the optical systems 14-1, 14-2, and 14-3 may comprise camera lenses with different functionalities. Light 14-L1 and 14-L2 can enter the optical systems 14-1 and 14-2 from the rear side of the cell phone, and light 14-L3 can enter the optical system 14-3 from the front side of the cell phone. In some embodiments, a plurality of digital images captured by the optical systems 14-1, 14-2 can be combined to generate a new digital image that has an improved quality.

In this embodiment, the optical system 14-2 primarily comprises a reflecting unit 14-21 and a lens unit 14-22, and the reflecting unit 14-21 can reflect light 14-L2 to the lens unit 14-22. Subsequently, light reaches an image sensor 14-1, so that a digital image can be generated. As depicted in FIGS. 14-1 and 14-2, the optical systems 14-1, 14-3, and the reflecting unit 14-21 of the optical system 14-2 are arranged in an L-shaped configuration. However, they may also be linearly arranged along an axis, as shown in FIGS. 14-3 and 14-4.

FIG. 14-5 is a schematic diagrams showing an optical system 14-2 in accordance with an embodiment of the application, and FIG. 14-6 is a schematic diagram showing an optical system 14-2 having a fixed member 14-212 integrally formed with a base 14-222 in one piece. Referring to FIG. 14-5, the reflecting unit 14-21 of the optical system 14-2 comprises a fixed member 14-212 with a reflecting element 14-211 disposed thereon, and the lens unit 14-22 comprises a housing 14-221 (e.g. metal housing) and abase 14-222 (e.g. plastic base) connected to the housing 14-221. In some embodiments, as shown in FIG. 14-6, the fixed member 14-212 may be integrally formed with abase 14-222 in one piece, so that the fixed member 14-212 can become a part of the base 14-222 and protrude from the housing in the Z direction. Thus, precise assembly and low production cost of the optical system can be achieved.

Referring to FIGS. 14-7, 14-8, and 14-9, the housing 14-221 and the base 14-222 are affixed to each other and constitute a fixed module, wherein a plastic frame 14-F is affixed to the inner surface of the housing 14-221. Additionally, a holder 14-LH is movably disposed between the housing 14-221 and the base 14-222. In this embodiment, the holder 14-LH is connected to the base 14-222 via two first resilient members 14-S1 and two second resilient members 14-S2 (e.g. metal sheet springs).

As shown in FIGS. 14-7 and 14-8, a plurality of magnets 14-M and coils 14-C (e.g. FP-coils or planar coils) are respectively disposed on the holder 14-LH and the base 14-222. The magnets 14-M and coils 14-C can constitute a driving assembly for driving the holder 14-LH and an optical element 14-L (e.g. optical lens) received therein to move relative to the fixed module along the Z axis, thereby achieving auto-focusing of the optical system 14-2. Here, the optical element 14-L defines an optical axis along the Z axis, and the coils 14-C can be electrically connected to an external circuit via several conductive members 14-P embedded in the base 14-222.

Specifically, each of the first resilient members 14-S1 has a first fixed portion 14-S11, and each of the second resilient members 14-S2 has a second fixed portion 14-S21. During assembly, the first and second fixed portions 14-S11 and 14-S21 are respectively affixed to a first surface 14-N1 of a first pillar and a second surface 14-N2 of a second pillar on the base 14-222 (FIG. 14-9), wherein the first and second surfaces 14-N1 and 14-N2 are facing in the same direction, and they are not parallel to the bottom surface 14-222' of the base 14-222 (e.g. perpendicular to the bottom surface 14-222').

Referring to FIGS. 14-7, 14-8, 14-9, and 14-10, when viewed along the Z axis, the first and second fixed portions 14-S11 and 14-S21 do not overlap (FIG. 14-10). During assembly, the second resilient member 14-S2 can be firstly mounted on the second surface 14-N2 in the –Z direction, and the first resilient member 14-S1 is then mounted on the first surface 14-N1, whereby high efficiency of assembly can be achieved.

FIGS. 14-7 and 14-8 further show that at least a sensor 14-G (e.g. Hall sensor) is disposed on the base 14-222, and a reference element 14-R (e.g. magnet) is disposed on the bottom side of the holder 14-LH. The sensor 14-G and the reference element 14-R can constitute a sensing assembly between the holder 14-LH and the base 14-222, and the sensor 14-G can be used to detect the position of the reference element 14-R. In some embodiments, the sensor 14-G may protrude from the bottom surface 14-222', or the bottom surface 14-222' may be located between the sensor 14-G and the reference element 14-R, so that the relative position offset between the holder 14-LH and the fixed module can be obtained.

In this embodiment, the sensing assembly (the sensor 14-G and the reference element 14-R) and the driving assembly (magnets 14-M and coils 14-C) do not overlap when viewed along the Y axis.

Referring to FIGS. 14-9 and 14-11, a wall 14-K connects the first and second pillars to enhance the mechanical strength of the base 14-222. The conductive members 14-P are extended inside the base 14-222, and some of the conductive members 14-P may have an end surface 14-P' exposed to atop surface of the wall 14-K. The end surfaces 14-P' can be electrically connected to the conductive pads 14-C' on the coils 14-C by soldering or welding (FIG. 14-11). Therefore, the coils 14-C can electrically connect to an external circuit via the conductive members 14-P, wherein the conductive pads 14-C' are not parallel to the end surfaces 14-P' (e.g. perpendicular to the end surfaces 14-P').

Referring to FIG. 14-12, the holder 14-LH forms at least a stopper 14-Q to contact the frame 14-F or the housing 14-221, so that the movement of the holder 14-LH along the Z axis can be restricted. During assembly, a buffer (e.g. gel or damper) may be disposed between the stopper 14-Q and the fixed module to prevent mechanical failure due to unintentional collision therebetween.

Referring to FIG. 14-13, after light 14-L2 enters the reflecting unit 14-21 in the −Y direction, it is reflected by the reflecting element 14-211, as light 14-L2' indicates in FIG. 14-13. Subsequently, light 14-L2' propagates through the optical element 14-L of the lens unit 14-22 and reaches the image sensor 14-1 to generate a digital image. It should be noted that a distance 14-D1 between the optical element 14-L and a front end of the lens unit 14-22 is less than a distance 14-D2 between the optical element 14-L and a rear end of the lens unit 14-22.

Referring to FIGS. 14-7, 14-8, 14-13, 14-14, 14-15, FIG. 14-14 is a schematic diagram showing the lens unit 14-22 in FIGS. 14-7 and 14-8 after assembly, and FIG. 14-5 is a cross-sectional view taken along line 14-X1-14-X2 in FIG. 14-14. As shown in FIGS. 14-7, 14-8 and 14-13, the housing 14-221 forms two openings 14-H1 and 14-H2 on opposite sides thereof. Light can be reflected by the reflecting unit 14-21 and enters the lens unit 14-22 via the opening 14-H1. Subsequently, light propagates through the optical element 14-L and leaves the lens unit 14-22 via the opening 14-H2, wherein the optical element 14-L defines an optical axis 14-Z (FIG. 14-14) extending through the openings 14-H1 and 14-H2 along the Z direction.

It should be noted that the base 14-222 forms a first light shield portion 14-V1 protruding from the bottom surface 14-222', and the frame 14-F forms a second light shield portion 14-V2 having an inverted U-shaped structure, wherein the first and second shield portions 14-V1 and 14-V2 are located adjacent to the opening 14-H2. Specifically, at least a part of the first and second shield portions 14-V1 and 14-V2 is exposed to the opening 14-H2 (FIG. 14-14), and when viewed along the Z axis, the opening 14-H2 and the first and second light shield portions 14-V1 and 14-V2 overlap with respect to each other.

As shown in FIGS. 14-9 and 14-15, the first light shield portion 14-V1 has a surface 14-V1' not parallel or perpendicular to the Z axis, wherein the surface 14-V1' may be a slope surface facing the holder 14-LH. Similarly, as shown in FIGS. 14-8 and 14-13, the second light shield portion 14-V2 has a surface 14-V2' not parallel or perpendicular to the Z axis, wherein the surface 14-V2' may also be a slope surface facing the holder 14-LH.

In this embodiment, since the housing 14-221 comprises metal, and the base 14-222 and the frame 14-F comprise plastic, at least a part of the first shield portion 14-V1 or the second shield portion 14-V2 can be exposed to the opening 14-H2 to block and adsorb undesired light. Thus, light reflection, refraction, scattering or diffraction caused by the sharp edges of the opening 14-H2 can be prevented. Moreover, the stray light can also be prevented from entering the image sensor 14-1 via the opening 14-H2.

It should be noted that undesired reflection, refraction, scattering or diffraction of light within the lens unit 14-22 can be efficiently avoided since the surfaces 14-V1' and 14-V2' are not parallel or perpendicular to the Z axis. In some embodiments, a light-absorbing material may be disposed on the surfaces 14-V1' and 14-V2' to absorb light, so that the image sensor 14-1 can be prevented from being interfered by the stray light, and the image quality can be greatly improved.

Referring to FIG. 14-15, the frame 14-F is affixed to an inner side of the housing 14-221, and the base 14-222 is not in contact with the frame 14F. In this embodiment, a non-linear passage is formed between the first and second shield portions 14-V1 and 14-V2, whereby the stray light can be efficiently blocked, and mechanical interference between the base 14-222 and the frame 14-F during assembly can also be avoided.

As shown in FIGS. 14-12 and 14-15, each of the first resilient members 14-S1 has two deformable portions 14-S20 respectively located on the upper and lower sides of the stopper 14-Q. The two stoppers 14-Q in FIG. 14-12 protruding in the −Z direction are used to contact the frame 14-F and restrict the holder 14-LH in a limit position relative to the fixed module along the Z axis. When viewed along the Z axis, the stoppers 14-Q and the frame 14-F at least partially overlap.

Still referring to FIG. 14-12, a central line 14-Q' extending through the centers of the two stoppers 14-Q is parallel to the bottom surface 14-222' of the base 14-222. When viewed along the Z axis, the central line 14-Q' passes through and overlaps with the optical element 14-L. That is, the stoppers 14-Q are at a height approximately equal to the height of the optical element 14-L, so as to enhance mechanical strength and stability of the optical system.

Fifteen Group of Embodiments

FIGS. 15-1 and 15-2 are schematic diagrams showing several optical systems 15-1, 15-2, and 15-3 disposed in a cell phone, in accordance with an embodiment of the application. As shown in FIGS. 15-1 and 15-2, the optical systems 15-1, 15-2, and 15-3 may comprise camera lenses with different functionalities. Light 15-L1 and 15-L2 can enter the optical systems 15-1 and 15-2 from the rear side of the cell phone, and light 15-L3 can enter the optical system 15-3 from the front side of the cell phone. In some embodiments, a plurality of digital images captured by the optical systems 15-1, 15-2 can be combined to generate a new digital image that has an improved quality.

In this embodiment, the optical system 15-2 primarily comprises a reflecting unit 15-21 and a lens unit 15-22, and the reflecting unit 15-21 can reflect light 15-L2 to the lens unit 15-22. Subsequently, light reaches an image sensor 15-1, so that a digital image can be generated. As depicted in FIGS. 15-1 and 15-2, the optical systems 15-1, 15-3, and the reflecting unit 15-21 of the optical system 15-2 are arranged in an L-shaped configuration. However, they may also be linearly arranged along an axis, as shown in FIGS. 15-3 and 15-4.

FIG. 15-5 is a schematic diagrams showing an optical system 15-2 in accordance with an embodiment of the application, and FIG. 15-6 is a schematic diagram showing an optical system 15-2 having a fixed member 15-212 integrally formed with a base 15-222 in one piece. Referring to FIG. 15-5, the reflecting unit 15-21 of the optical system 15-2 comprises a fixed member 15-212 with a reflecting element 15-211 disposed thereon, and the lens unit 15-22 comprises a housing 15-221 (e.g. metal housing) and a base 15-222 (e.g. plastic base) connected to the housing 15-221. In some embodiments, as shown in FIG. 15-6, the fixed member 15-212 may be integrally formed with a base 15-222 in one piece, so that the fixed member 15-212 can become a part of the base 15-222 and protrude from the housing in the Z direction. Thus, precise assembly and low production cost of the optical system can be achieved.

Referring to FIGS. 15-7, 15-8, and 15-9, the housing 15-221 and the base 15-222 are affixed to each other and constitute a fixed module, wherein a plastic frame 15-F is affixed to the inner surface of the housing 15-221. Additionally, a holder 15-LH is movably disposed between the housing 15-221 and the base 15-222. In this embodiment, the holder 15-LH is connected to the base 15-222 via two first resilient members 15-S1 and two second resilient members 15-S2 (e.g. metal sheet springs).

As shown in FIGS. 15-7 and 15-8, a plurality of magnets 15-M and coils 15-C (e.g. FP-coils or planar coils) are respectively disposed on the holder 15-LH and the base 15-222. The magnets 15-M and coils 15-C can constitute a driving assembly for driving the holder 15-LH and an optical element 15-L (e.g. optical lens) received therein to move relative to the fixed module along the Z axis, thereby achieving auto-focusing of the optical system 15-2. Here, the optical element 15-L defines an optical axis along the Z axis, and the coils 15-C can be electrically connected to an external circuit via several conductive members 15-P embedded in the base 15-222.

Specifically, each of the first resilient members 15-S1 has a first fixed portion 15-S11, and each of the second resilient members 15-S2 has a second fixed portion 15-821. During assembly, the first and second fixed portions 15-S11 and 15-S21 are respectively affixed to a first surface 15-N1 of a first pillar and a second surface 15-N2 of a second pillar on the base 15-222 (FIG. 15-9), wherein the first and second surfaces 15-N1 and 15-N2 are facing in the same direction, and they are not parallel to the bottom surface 15-222' of the base 15-222 (e.g. perpendicular to the bottom surface 15-222').

Referring to FIGS. 15-7, 15-8, 15-9, and 15-10, when viewed along the Z axis, the first and second fixed portions 15-S11 and 15-S21 do not overlap (FIG. 15-10). During assembly, the second resilient member 15-S2 can be firstly mounted on the second surface 15-N2 in the –Z direction, and the first resilient member 15-S1 is then mounted on the first surface 15-N1, whereby high efficiency of assembly can be achieved.

FIGS. 15-7 and 15-8 further show that at least a sensor 15-G (e.g. Hall sensor) is disposed on the base 15-222, and a reference element 15-R (e.g. magnet) is disposed on the bottom side of the holder 15-LH. The sensor 13-G and the reference element 15-R can constitute a sensing assembly between the holder 15-LH and the base 15-222, and the sensor 15-G can be used to detect the position of the reference element 15-R. In some embodiments, the sensor 15-G may protrude from the bottom surface 15-222', or the bottom surface 15-222' may be located between the sensor 15-G and the reference element 15-R, so that the relative position offset between the holder 15-LH and the fixed module can be obtained.

In this embodiment, the sensing assembly (the sensor 15-G and the reference element 15-R) and the driving assembly (magnets 15-M and coils 15-C) do not overlap when viewed along the Y axis.

Referring to FIGS. 15-9 and 15-11, a wall 15-K connects the first and second pillars to enhance the mechanical strength of the base 15-222. The conductive members 15-P are extended inside the base 15-222, and some of the conductive members 15-P may have an end surface 15-P' exposed to a top surface of the wall 15-K. The end surfaces 15-P' can be electrically connected to the conductive pads 15-C' on the coils 15-C by soldering or welding (FIG. 15-11). Therefore, the coils 15-C can electrically connect to an external circuit via the conductive members 15-P, wherein the conductive pads 15-C' are not parallel to the end surfaces 15-P' (e.g. perpendicular to the end surfaces 15-P').

Referring to FIG. 15-12, the holder 15-LH forms at least a stopper 15-Q to contact the frame 15-F or the housing 15-221, so that the movement of the holder 15-LH along the Z axis can be restricted. During assembly, a buffer (e.g. gel or damper) may be disposed between the stopper 15-Q and the fixed module to prevent mechanical failure due to unintentional collision therebetween.

Referring to FIG. 15-13, after light 15-L2 enters the reflecting unit 15-21 in the –Y direction, it is reflected by the reflecting element 15-211, as light 15-L2' indicates in FIG. 15-13. Subsequently, light 15-L2' propagates through the optical element 15-L of the lens unit 15-22 and reaches the image sensor 15-1 to generate a digital image. It should be noted that a distance 15-D1 between the optical element 15-L and a front end of the lens unit 15-22 is less than a distance 15-D2 between the optical element 15-L and a rear end of the lens unit 15-22.

Referring to FIGS. 15-7, 15-8, and 15-13, the housing 15-221 has a lateral wall 15-H extending in the –Y direction, and the lateral wall 15-H is located between the optical element 15-L and the reflecting element 15-211 (FIG. 15-13) when viewed along the X axis.

FIG. 15-14 is a schematic diagram showing a top view of the base 15-222 in FIG. 15-9. Referring to FIGS. 15-9 and 15-14, the base 15-222 has a depressed structure formed on the inner side of the wall 15-K for receiving the coil 15-C of the driving assembly. At least one of the conductive members 15-P has an embedded portion 15-E extending inside the base 15-222 along the X axis (FIG. 15-14). Specifically, when viewed along the Y axis, the embedded portion 15-E and the first resilient member 15-S1 or the second resilient member 15-S2 partially overlap. The embedded portion 15-E can be used for electrically connection between the sensors 15-G and the coils 15-C, and it can also enhance the mechanical strength of the base 15-222.

FIG. 15-15 is a schematic diagram showing relative positions between the coils 15-C and the magnets 15-M after assembly. FIG. 15-16 is a schematic diagram showing relative positions between the winding portions 15-C1, 15-C2 of the coils 15-C and the magnetic units 15-M1, 15-M2, 15-M3 of the magnets 15-M in FIG. 15-15 after assembly. FIG. 15-17 is a schematic diagram showing a side view of the winding portions 15-C1, 15-C2 and the magnetic units 15-M1, 15-M2, 15-M3 in FIG. 15-16.

Referring to FIGS. 15-15, 15-16, and 15-17, the coils 15-C and the magnets 15-M are respectively disposed on the base 15-222 and the holder 15-LH, and they are spaced apart from each other. In this embodiment, the magnets 15-M includes a first magnetic unit 15-M1, a second magnetic unit 15-M2, and a third magnetic unit 15-M3. The coil 15-C may be an FP-coil or planar coil that comprises a substrate and a first winding portion 15-C1 and a second winding portion 15-C2 embedded in the substrate.

The first winding portion 15-C1 has a first section 15-C11 and a second section 15-C12, and the second winding portion 15-C2 has a third section 15-C21 and a fourth section 15-C22. The first, second, third, and fourth sections 15-C11, 15-C12, 15-C21, and 15-C22 are parallel to each other and extend along the Y axis. Specifically, the first magnetic unit 15-M1 is located corresponding to the first section 15-C11, the second magnetic unit 15-M2 is located corresponding to the second and third sections 15-C12 and 15-C21, and the third magnetic unit 15-M3 is located corresponding to the fourth section 15-C22. The polar direction of the second magnetic unit 15-M2 is different from that of the first and third magnetic units 15-M1 and 5-M3 (FIG. 15-16).

In this embodiment, the width of the second magnetic unit 15-M2 along the Z axis is greater than that of the first magnetic unit 15-M1 or the third magnetic unit 15-M3. For example, the width of the second magnetic unit 15-M2 along the Z axis is greater than 1.5 times of that of the first magnetic unit 15-M1 or the third magnetic unit 15-M3.

Additionally, the first, second, third, and fourth sections 15-C11, 15-C12, 15-C21, and 15-C22 have a length along the Y direction (first direction) greater than the length of the first, second, and third magnetic units 15-M1, 15-M2, and 15-M3 along the Y direction. In some embodiments, the first, second, and third magnetic units 15-M1, 15-M2, and 15-M3 may be integrally formed in one piece as a multipolar magnet.

When driving the holder 15-LH to move along the Z axis relative to the base 15-2222 (fixed module), two opposite currents can be applied to the first winding portion 15-C1 and the second winding portion 15-C2, as the arrows indicate in FIG. 15-17, so as to perform the auto-focusing function of the optical system.

FIG. 15-18 is a schematic diagram showing the first, second, and third magnetic units 15-M1, 15-M2, and 15-M3 when moving relative to the first and second winding portions 15-C1 and 15-C2 in the Z direction. FIG. 15-19 is a schematic diagram showing the first, second, and third magnetic units 15-M1, 15-M2, and 15-M3 when moving relative to the first and second winding portions 15-C1 and 15-C2 in the –Z direction.

Referring to FIGS. 15-18 and 15-19, when the first and second winding portions 15-C1 and 15-C2 are charged by electrical currents, an electromagnetic force can be generated between the coils 15-C and the magnets 15-M. Therefore, the holder 15-LH can be driven to move relative to the base 15-222 in the Z or –Z direction, as the arrows indicate in FIGS. 15-18 and 15-19. When viewed along the X direction (second direction) during the movement of the holder 15-LH relative to the base 15-222, it can be observed that the first section 15-C11 partially overlaps with the first magnetic unit 15-M1, the second and third sections 15-C12 and 15-C21 partially overlap with the second magnetic unit 15-M2, and the fourth section 15-C22 partially overlaps with the third magnetic unit 15-M3.

Still referring to FIGS. 15-18 and 15-19, when viewed along the X direction (second direction) during the movement of the holder 15-LH relative to the base 15-222, the first section 15-C11 and the second and third magnetic units 15-M2 and 15-M3 do not overlap, the second and third sections 15-C12, 15-C21 and the first and third magnetic units 15-M1, 15-M3 do not overlap, and the fourth section 15-C22 and the first and second magnetic units 15-M1, 15-M2 do not overlap.

FIG. 15-20 is an exploded diagram showing a reflecting element 15-211 and a carrier 15-213 in accordance with an embodiment of the application. As shown in FIG. 15-20, the reflecting element 15-211 is affixed to a carrier 15-213 of the reflecting unit 15-21. The carrier 15-213 has a main surface 15-214 and at least a rib 15-215 protruding from the main surface 15-214. The main surface 15-214 faces the reflecting element 15-211, and the rib 15-215 is close to an edge of the main surface 15-211 for sustaining the reflecting element 15-211, wherein a gap is formed between the main surface 15-211 and the reflecting element 15-211.

The carrier 15-213 further has a sidewall 15-216 forming a plurality of grooves 15-217. The grooves 15-217 may extend in different directions to the edges of the sidewall. During assembly, an adhesive can be disposed between the reflecting element 15-211 and the sidewall 15-216, and the grooves 15-217 can guide and receive the adhesive. Therefore, the adhesive can be averagely distributed between the reflecting element 15-211 and the sidewall 15-216.

In this embodiment, the reflecting element 15-211 may be a prism having two notch portions 15-218 on the top and bottom sides (FIG. 15-20). Thus, precise positioning for the reflecting element 15-211 and other components can be achieved, and crack of the reflecting element 15-211 can also be avoided during assembly.

In another embodiment of FIG. 15-21, the carrier 15-213 has two restricting surfaces 15-218 on the top and bottom sides thereof, corresponding to the notch portions 15-218 of the reflecting element 15-211. For example, the notch portions 15-218 may have a flat surface abutting the restricting surfaces 15-218, so that the reflecting element 15-211 can be restricted in a predetermined position along the Y or Z axis, thereby improving the accuracy and efficiency of assembly.

Sixteen Group of Embodiments

Referring to FIGS. 16-1 and 16-2, FIG. 16-1 is an exploded view showing the liquid optical module 16-1 according to an embodiment of the present disclosure, and FIG. 16-2 is a schematic view showing the assembled liquid optical module 16-1. The liquid optical module 16-1 can be used, for example, to drive and sustain an optical element (such as a lens or a lens assembly), and can be disposed inside an electronic device (such as a camera, a tablet or a mobile phone). When light (incident light) from the outside enters the liquid optical module 16-1, the light passes through the optical element in the liquid optical module 16-1 along an optical axis O and then to an image sensor assembly (not shown) outside the liquid optical module 16-1, to acquire an image. The liquid optical module 16-1 has a liquid lens assembly which shape can be changed, so that the optical properties thereof can be changed, and the optical element can be driven to move relative to the image sensor assembly, to achieve the purpose of optical zoom, Auto-Focusing (AF) and/or Optical Image Stabilization (OIS). The detailed structure of the liquid optical module 16-1 will be described below.

As shown in FIGS. 16-1 and 16-3, the liquid optical module 16-1 primarily comprises a liquid lens assembly 16-10 and a liquid lens driving mechanism 16-20, wherein the shape of a liquid lens element 16-11 of the liquid lens assembly 16-10 can be changed by the liquid lens driving mechanism 16-20, to achieve optical zoom, optical focus or an anti-shake effect. The structure of the liquid lens assembly 16-10 and the liquid lens driving mechanism 16-20 are described in detail below.

Referring to FIGS. 16-1 and 16-4A, the liquid lens assembly 16-10 includes the liquid lens element 16-1, a fixing member 16-12, and a deforming member 16-13 configured to change the shape of the liquid lens element 16-1.

Referring to FIGS. 16-1 and 16-5A, the liquid lens driving mechanism 16-20 includes a base 16-21, a frame 16-22, a movable portion 16-23, an upper leaf spring 16-24, an lower leaf spring 16-25, a driving assembly 16-MC, a circuit board 16-F, a first sensing element 16-S1, a second sensing element 16-S2, and a housing 16-H providing protective function.

As shown in FIG. 16-2, the housing 16-H and the base 16-21 of the liquid lens driving mechanism 16-20 are affixed to each other and form an accommodating space for accommodating other components of the liquid lens driving mechanism 16-20, such as the frame 16-22, the movable portion 16-23, the upper leaf spring 16-24, the lower spring 16-25, the driving assembly 16-MC, the circuit board 16-F and the sensing elements 16-S1 and 16-S2. Also, an optical element such as a lens element can be disposed therein. The aforementioned frame 16-22 is affixed to the base 16-21 and is positioned above the movable portion 16-23. The housing 16-H, the base 16-21, and the frame 16-22 may constitute a fixed portion.

It is worth noting that the housing 16-H has a protective sidewall. When the liquid optical module 16-1 has been assembled, as shown in FIG. 16-2, the liquid lens assembly 16-10 and the frames 16-22 and the movable portions 16-23 of the liquid lens driving mechanism 16-20 can be protected by the protective sidewall. In the direction of the optical axis 16-O, the protective sidewall of the housing 16-H is higher than the liquid lens assembly 16-10 and the frame 16-22. That is, the housing 16-H is closer to the light incident end of the liquid optical module 16-1. Furthermore, viewed from a direction perpendicular to the optical axis 16-O, the housing 16-H covers the liquid lens assembly 16-10 and the frame 16-22.

FIG. 16-3 show a schematic view of the liquid lens assembly 16-10 and the liquid lens driving mechanism 16-20 which are separated, and FIGS. 16-4A and 16-4B show the detailed structure of the liquid lens assembly 16-10. In the direction of the optical axis 16-O of the liquid lens element 16-11, the liquid lens element 16-11 is disposed within a fixing member 16-12 having a hollow structure that protects and supports the liquid lens element 16-11. The deforming member 16-13 is disposed under the liquid lens member 16-11 and the fixing member 16-12, and is in contact with the liquid lens element 16-11 for changing the shape of the liquid lens element 16-11.

Referring to FIGS. 16-5A and 16-5B, the movable portion 16-23 can be a earner that sustains the optical element, which is disposed on the base 16-21. The movable portion 16-23 connects the base 16-21 via the upper and lower leaf springs 16-24 and 16-25, so that the movable portion 16-23 is movably disposed on the base 16-21. The upper leaf spring 16-24 is disposed on four protruding pillars of the base 16-21, and the lower leaf spring 16-25 is disposed on the main body of the base 16-21. The outer frame portion of the upper leaf spring 16-24 is sandwiched by the base 16-21 and the frame 16-22 such that the frame 16-22 is connect to the base 16-21 and affixed to each other. The movable portion 16-23 is disposed between the upper and lower leaf springs 16-24 and 16-25.

The driving assembly 16-MC is disposed on a side of the movable portion 16-23. In detail, the driving assembly 16-MC may be an electromagnetic driving assembly, including a plurality of coils 16-C and a plurality of magnetic elements M (for example, magnets) which are matched to each other and disposed on two sides of the movable portion 16-23. Each coil 16-C has a hollow structure which is disposed on the movable portion 16-23 and can be affixed to each other, and each magnetic element 16-M is disposed on the bottom surface of the upper leaf spring 16-24 or the frame 16-22 and faces the coil 16-C. When a suitable driving signal (e.g., a driving current) is applied to the coils 16-C, a magnetic force is generated between the coils 16-C and the magnetic elements 16-M, and the driving assembly 16-MC drives the movable portion 16-23 to move by the magnetic force relative to the frame 16-22 and the base 16-21, so that the movable portion 16-23 and the deforming member 16-13 (disposed on the movable portion 16-23) can be linearly moved or tilted (or obliquely moved), to achieve the effect of optical zoom, focusing or optical shaking compensation. It should be understood that the driving assembly 16-MC in this embodiment is a moving coil type, but in other embodiments, it may be a moving magnetic type.

In some embodiments, the driving assembly may include one or a plurality of elongated wires comprising a shape-memory alloy (SMA) material. One end of the wire is affixed to the fixed portion such as the base 16-21 or the frame 16-22, and the other end is connected to the movable portion 16-23. A driving signal (for example, a driving current) can be applied to the wire through a power source to change the length thereof, for example, elongation or shortening, thereby the movable portion 16-23 being able to move relative to the fixed portion. The SMA wire, for example, may comprise a titanium-nickel (TiNi) alloy, a titanium-palladium (TiPd) alloy, a titanium-nickel (TiNiCu) alloy, a titanium-nickel-palladium (TiNiPd) alloy, or a combination thereof.

Referring to FIG. 16-3, the aforementioned circuit board 16-F, the first sensing element 16-S1 and the second sensing element 16-S2 are disposed on the outer side of the movable portion 16-23. Specifically, the upper side of the circuit board 16-F is connected to the bottom surface of the frame 16-22. The first sensing element 16-S1 is disposed on the circuit board 16-F and is located between the circuit board 16-F and the movable portion 16-23. The second sensing element 16-S2 is disposed on the movable portion 16-23 and also is located between the circuit board 16-F and the movable portion 16-23. The first and second sensing elements 16-S1 and 16-S2 can be used to sense the movement of the movable portion 16-23 relative to the fixed portion (such as the base 16-21 and the frame 16-22). In addition, the circuit board 16-F, the first sensing element 16-S1 and the second sensing element 16-S2 are located on a side of the movable portion 16-23, wherein the foregoing side does not provided with the driving assembly 16-MC. In this embodiment, they are adjacent to each other.

For example, the first sensing component 16-S1 can be one of a permanent magnet and a Hall Effect Sensor, and the matching second sensing component 16-S2 disposed on the movable portion 16-23 can be the other one of them. The Hall effect detector can determine the position of the permanent magnet by detecting the change of the magnetic field of the permanent magnet, thereby increasing the accuracy of compensation, optical zoom or focusing. In some embodiments, other types of alignment components/assembly, such as a magnetoresistive sensor (MRS) or an optical sensor, may be used to detect the position of the movable portion 16-23 relative to the frame 16-22 and the base 16-21.

FIG. 16-6A shows that the liquid lens element 16-11 is undeformed and the deforming member 16-13 is in an initial position, and the liquid lens element 16-11 has an initial optical axis 16-O. When the driving assembly 16-MC drives the movable portion 16-23 to move, for example, applying a driving current to the coils 16-C of the driving assembly 16-MC, a magnetic force is generated between the coils C and the magnetic elements 16-M, so that the movable portion 16-23 is driven to move through the magnetic force and to force the deforming member 16-13 to press the lower side of the liquid lens element 16-11, the liquid lens element 16-11 is deformed. As shown in FIG. 16-6B, equal amounts of pushing forces 16-R1 and 16-R2 are provided to both sides of the liquid lens element 16-11 when the deforming member 16-13 moves linearly along the optical axis 16-O due to the driving force provided by the driving assembly 16-MC. The lens curvature of the liquid lens element 16-11 is changed from that of the liquid lens element 16-11 in the initial position in FIG. 16-6A. That is, the shape of the liquid lens element 16-11 is changed. Therefore, the optical properties of the liquid lens element 16-11 can be changed, thereby achieving an optical zoom, focus or shockproofing effect.

Referring to FIG. 16-6C, when the driving assembly 16-MC drives the deforming member 16-13 with a tilted movement, as illustrated in FIG. 16-6C, the deforming member 16-13 obliquely moves and provides an unequal amount of pushing forces 16-R3 and 16-R4 to two different sides of the liquid lens element 16-11, so that the initial optical axis 16-O of the liquid lens element 16-11 is rotated to the rotated optical axis 16-O'. That is, there is an angular displacement θ1 between the two. Therefore, the optical properties of the liquid lens element 16-11 having been changed, an optical zoom, focusing or shockproofing effect can be accomplished.

It should be noted that, referring to FIG. 16-7A, the frame 16-22 has a plurality (four in this embodiment) of fixing portion pillars (or protrusions) 16-221, and each fixing portion pillar 16-221 has a first fixing portion surface 16-2211, providing for the fixing members 16-12 of the liquid lens assembly 16-10 to be placed and affixed to each other. Each of the fixing portion pillars 16-221 further has a second fixing portion surface 16-2212 which is not parallel to the first fixing portion surface 16-2211. In some embodiments, the first and second fixing portion surfaces 16-2211 and 16-2212 are perpendicular or substantially perpendicular (for example, 85 to 95 degrees between the two surfaces) to each other.

The movable portion 16-23 has a plurality of (four in this embodiment) movable portion pillars (or protrusions) 16-231, and each of the movable portion pillars 16-231 has a movable portion surface 16-2311. The movable portion surface 16-2311 and the first fixed portion surface 16-2211 are toward the same direction. Moreover, in the direction of the optical axis 16-O, the first fixing portion surface 2211 is closer to the light incident end (the upper end) of the liquid optical module 16-1 than the movable portion surface 2311.

FIG. 16-7B is a top plan view of the movable portion 16-23 and the frame 16-22. It can be seen from FIG. 16-7B, when viewed from the direction of the optical axis 16-O, the movable portion pillars 16-231 of the movable portion 16-23 and the fixed portion pillars 16-221 of the frame 16-22 surround the optical axis 16-O with a staggered configuration. Or, the movable portion surface 16-2311 and the first fixed portion surface 16-2211 are surrounding the optical axis 16-O with a staggered arrangement, and when viewed along the optical axis 16-O direction, surfaces 16-2311 and 16-2211 are configured along the circumference of an imaginary circle. The movable portion surface 16-2311 and the first fixed portion surface 16-2211 are facing in the same direction and are not parallel to the optical axis 16-O, and the shortest distance between the first fixed portion surface 16-2211 and the optical axis 16-O is less the shortest distance from the movable portion surface 16-2311 to the optical axis 16-O.

FIG. 16-8A shows a schematic view of the liquid lens element 16-11 connecting the movable portion 16-23 and the frame 16-22 by the first and second adhesive members 16-G1 and 16-G2. Referring to FIGS. 16-7A and 16-8A, each second fixing portion surface 16-2212 of the frame 16-22 has a recessed structure 16-22121, and a first adhesive member 16-G1 can be provided in the recessed structure 16-22121 to connect the fixing member 16-12 of the liquid lens assembly 16-10 to the frame 16-22, to make them affixed each other. By the recessed structures 16-22121, the first adhesive members 16-G1 can be smoothly applied from above (the light incident end of the liquid optical module 16-1) to simplify the manufacturing process, and the structure of the recess can also strengthen the bonding strength. In some embodiments, the recessed structure 16-22121 has curved inclined structure. The first adhesive member 16-G1 and the second adhesive member 16-G2 are, for example, a viscose containing a resin material.

Referring to FIGS. 16-4A and 16-8B, the aforementioned deforming member 16-13 has a protruding portion 16-131 extending in a direction non-parallel to the optical axis 16-O (from the optical axis 16-O direction). It can be seen that the protruding portion 16-131 protrudes from the liquid lens element 16-11 and has a plurality of (four in this embodiment) connecting structures 16-1311. The connecting structures 16-1311 are placed on the movable portion surfaces 16-2311 of the movable portion pillars 16-231 of the movable portion 16-23, and the connecting structures 16-1311 and the movable portion surfaces 16-2311 are affixed to each other, for example, by applying the second adhesive members 16-G2.

The connecting structure 16-1311 has a recess 16-13111 where the second adhesive member 16-G2 can be disposed, and the second adhesive member 16-G2 is directly connected the connecting structure 16-1311 and the movable portion surface 16-2311, so that the connecting structure 16-1311 and the movable portion surface 16-2311 are affixed to each other. Viewed from the direction perpendicular to the optical axis 16-O, the connecting structure 16-1311 (of the protruding portion 16-131) at least partially overlaps the second adhesive member 16-G2.

In this way, by these surfaces: the movable surfaces 16-2311, the first fixed portion surfaces 16-2211 and the second fixed portion surfaces 16-2212, and the recessed structure 16-22121 and the groove 16-13111. The liquid lens assembly 16-10 and the liquid lens driving mechanism 16-20 are assembled more easily, quickly and accurately, and the first and second adhesive members 16-G1 and 16-G2 are easily applied, which not only greatly enhances the mechanical strength of the module, also simplifies the complexity of assembly.

It should be noted that the movable portion 16-23 and the frame 16-22 of the foregoing embodiment respectively have four pillars (or protrusions) 16-231 and 16-221, but are not limited thereto. In some embodiments, the movable portion 16-23 and the frame 16-22 may have other numbers of the pillars 16-231 and 16-221, and the quantity of the connecting structures 16-1311 of the deforming member 16-13 is matching with the pillars, such as at least one, two, three or five pillars and connecting members, and with one or a plurality of appropriate guidance mechanisms such as chutes and slides.

In addition, the liquid optical module 16-1 can also be applied to the optical modules 1-1000, 1-A2000, 1-A3000, 1-B2000, 1-C2000, 1-D2000, and 12-2000 in the present disclosure.

In summary, an embodiment of the present disclosure provides a liquid optical module including a liquid lens driving mechanism and a liquid lens assembly. The liquid lens driving mechanism includes a fixed portion, a movable portion and a driving assembly. The movable portion is movably connected to the fixed portion, and the driving assembly is configured to drive the movable portion to move relative to the fixed portion. The liquid lens assembly includes a liquid lens element, a fixing member and a deforming member. The liquid lens element has an optical axis. The fixing member is disposed on a first fixed portion surface of the fixed portion, and the deforming member is disposed on a movable portion surface of the movable portion. The movable portion surface and the first fixed portion surface face the same direction, and when the movable portion is driven by the driving assembly to move relative to the fixed portion, the liquid lens element is deformed by the deforming member, causing the optical properties of the liquid lens element to change. Thereby, functions such as optical zoom, focusing or optical shake compensation can be achieved, and the performance of the optical module can be improved.

Seventh Group of Embodiments

Referring to FIGS. 17-1 and 17-2, FIG. 17-1 is an exploded view showing the optical system 17-1 according to an embodiment of the present disclosure, and FIG. 17-2 is a schematic view showing the assembled optical system 17-1. The optical system 17-1 can be used, for example, to drive and sustain an optical element (such as a lens or a lens assembly), and can be disposed inside an electronic device (such as a camera, a tablet or a mobile phone). When light (incident light) from the outside enters the optical system 17-1, the light passes through the optical element in the optical system 17-1 along an optical axis O and then to an image sensor assembly inside the optical system 17-1, to acquire an image. The optical system 17-1 has a liquid lens assembly which shape can be changed so that the curvature of the lens is changed causing the optical properties changed, and the optical element can be driven to move relative to the image sensor assembly, thereby achieving the purpose of optical zoom, Auto-Focusing (AF) and/or Optical Image Stabilization (OIS). The detailed structure of the optical system 17-1 will be described below.

As shown in FIG. 17-1, the optical system 17-1 primarily comprises a liquid optical module 17-A100, a first optical module 17-A200, and an image sensor module 17-A300. The liquid optical module 17-A100 includes a liquid lens assembly 17-10 and a liquid lens driving mechanism 17-20. The liquid lens driving mechanism 17-20 is configured to drive the liquid lens assembly 17-10, so that the shape of a liquid lens element 17-11 in the liquid lens assembly 17-10 can be changed. In this way, the incident light can pass through the changed liquid lens element 17-11 and then pass through the first optical module 17-A200 to the image sensor module 17-A300, thereby achieving the effects of optical zooming, focusing or anti-shaking. The structure of the liquid optical module 17-A100 will be described below firstly.

Referring to FIGS. 17-2 and 17-3A, the liquid lens assembly 17-10 includes the aforementioned liquid lens element 17-11, a fixing member 17-12, and a deforming member 17-13 configured to change the shape of the liquid lens element 17-11, wherein the liquid lens elements 17-11 are disposed in the fixing members 17-12 for protection, and the deforming member 17-13 is disposed under the liquid lens element 17-11 and has a connecting structure 17-131 having a plurality of (in this embodiment having four) protrusions 17-1311.

The liquid lens driving mechanism 17-20 includes a base 17-21, a frame 17-22, a movable portion 17-23, an upper leaf spring 17-24, a lower leaf spring 17-25, a first driving assembly 17-MC, a circuit board 17-F, a matching first sensing element 17-S1 and a second sensing element 17-S2, and an outer casing 17-H for protection.

The outer casing 17-H and the base 17-21 of the liquid lens driving mechanism 17-20 are affixed to each other and form an accommodating space for receiving other components of the liquid lens driving mechanism 17-20, such as the frame 17-22, movable portion 17-23, upper leaf spring 17-24, lower leaf spring 17-25, first driving assembly 17-MC, circuit board 17-F and sensing elements 17-S1 and 17-S2. The accommodating space also can accommodate an optical lens element. The aforementioned frame 17-22 is affixed to the base 17-21 and is located on the movable portion 17-23. The outer casing 17-H, the base 17-21, and the frame 17-22 may constitute a fixed portion.

It should be noted that, referring to FIG. 17-3A, the frame 17-22 has a plurality of (four in this embodiment) fixed portion pillars (or protrusions) 17-221, and each fixed portion pillar 17-221 has a first fixed portion surface 17-2211 providing for the fixing member 17-12 of the liquid lens assembly 17-10 to be placed and affixed to each other. Each of the fixed portion pillars 17-221 further has a second fixed portion surface 17-2212 which is not parallel to the first fixed portion surface 17-2211. In some embodiments, the first and second fixed portion surfaces 17-2211 and 17-2212 are perpendicular or substantially perpendicular (for example, 85 to 95 degrees between the two surfaces).

The movable portion 17-23 has a plurality of (four in this embodiment) movable portion pillars (or protrusions) 17-231, and each of the movable portion pillars 17-231 has a movable portion surface 17-2311. The movable portion surfaces 17-2311 face the same direction as the first fixed portion surfaces 17-2211. Further, in the direction of the optical axis 17-O, the first fixed portion surface 17-2211 is adjacent to the light incident end (upper end) of the optical system 17-1 than the movable portion surface 2311.

FIG. 17-3B shows a schematic view of the liquid lens element 17-11 being connected to the movable portion 17-23 and the frame 17-22 via first and second adhesive members 17-G1 and 17-G2. Referring to FIGS. 17-3A and 17-3B, the second fixed portion surface 17-2212 of the frame 17-22 has a recessed structure 17-22121 where the first adhesive member 17-G1 can be provided, so that the fixing member 17-12 of the liquid lens assembly 17-10 and the frame 17-22 are affixed to each other. The protrusions 17-131 of the deforming member 17-13 are placed and attached to the movable portion surface 17-2311 of the movable portion 17-23, and are then affixed by the second adhesive members 17-G2.

The first driving assembly 17-MC is disposed at a side of the movable portion 17-23. In detail, the first driving assembly 17-MC may be an electromagnetic driving assembly, and includes a plurality of first coils 17-C and a plurality of first magnetic elements 17-M (for example, magnets) that match each other and are disposed on both sides of the movable portion 17-23. The first coils 17-C are disposed on the movable portion 17-23, and the first magnetic members 17-M are disposed on the bottom surface of the upper leaf spring 17-24 or the frame 17-22 and face the first coils 17-C. When a suitable driving signal (e.g., driving current) is applied to the first coils 17-C, a magnetic force is generated between the first coils 17-C and the first magnetic elements 17-M, such that the first driving assembly 17-MC drives the movable portion 17-23 to move via the magnetic force, and the deforming member 17-13 linearly moves or obliquely moves (tilted) relative to the frame 17-22 and the base 17-21 to press the liquid lens element 17-11, to achieve the effect of optical zooming, focusing or shaking compensation. It should be understood that the first driving assembly 17-MC in this embodiment is a moving coil type, and in other embodiments, it may be a moving magnetic type.

Referring to FIG. 17-3A, the aforementioned circuit board 17-F, the first sensing element 17-S1, and the second sensing element 17-S2 are disposed on the outer side of the movable portion 17-23. For example, the first sensing element 17-S1 may be one of a permanent magnet and a Hall Effect Sensor, and the matching second sensing element 17-S2 is the other of the two which is disposed on the movable portion 17-23. The Hall Effect Sensor can determine the position of the permanent magnet by detecting the change of the magnetic field of the permanent magnet, thereby increasing the accuracy of compensation, focusing or zooming. In another embodiment, other types of alignment components/components, such as a magnetoresistive sensor (MRS) or an optical sensor, may be used to detect the relative positions of the movable portion 17-23 and the frame 17-22 and the base 17-21.

With regard to the example in which the first driving assembly 17-MC drives the movable portion 17-23 to force the deforming member 17-13 to push the liquid optical element 17-11, reference may be made to FIGS. 16-6A to 16-6C of the present disclosure. The shape of the liquid lens element 17-11 is changed by the movable portion 17-23 and the deforming member 17-13, thereby changing the optical properties of the liquid lens element 17-11, to achieve an optical zoom, focus or shockproof effect.

It should be understood that the liquid optical module 17-A100 (including the liquid lens assembly 17-10 and the liquid lens driving mechanism 17-20 thereof) is the same as the liquid optical module 16-1 in FIGS. 16-1 to 16-7B of the present disclosure. For a more detailed structure, reference may be made to the embodiments depicted in FIGS. 16-4A through 16-7B of the present disclosure.

For the first optical module 17-A200 and the image sensor module 17-A300 of the optical system 17-1, please refer to FIGS. 17-1 and 17-4.

The first optical module 17-A200 includes a first optical element 17-30 (e.g., a lens) and a first optical driving mechanism 17-40. The first optical driving mechanism 17-40 is configured to drive the first optical element 17-30, and includes: an immovable portion 17-41, a mobile portion 17-42 and a second driving element 17-43. The immovable portion 17-41 includes a base 17-411 and a case member 17-412, which form an accommodating space for the mobile portion 17-42 to be disposed therein. The mobile portion 17-42 is a carrier that sustains the first optical element 17-30 and is affixed thereto, and is movably disposed on the base 17-411, for example, by two leaf springs (not shown). The mobile portion 17-42 is movably connected to the base 17-411.

The second driving assembly 17-43 can be an electromagnetic driving assembly including a coil component 17-43C and a magnetic component 17-43M. The second driving assembly 17-43 may be the same as the first driving assembly 17-MC of the liquid optical module 17-A100, or substantially the same, only slightly different in appearance. A magnetic force is generated between the coil component 17-43C and the magnetic component 17-43M by applying a driving current, thereby driving the first optical element 17-30 sustained by the mobile portion 17-42.

Regarding the image sensor module 17-A300, which has an image sensor 17-51 and a case member 17-52 for protecting the image sensor 17-51, the outside light sequentially passes through the liquid lens assembly 17-10 and the first optical element 17-30 then to the image sensor 17-51 to acquire an image. The liquid optical module 17-A100, the first optical module 17-A200 and the image sensor module 17-A300 are arranged along the optical axis 17-O, and the image sensor module 17-A300 is located below the liquid optical module 17-A300 and the first optical module 17-A200.

Referring to FIGS. 17-5A and 17-5B, which show a cross-sectional view taken along line 17-A-17-A' in FIG. 17-2 with the separated outer casing 17-H, and a cross-sectional plan view taken along line 17-A-17-A'. The base 17-21 of the liquid optical module 17-A100 has a receiving space 17-21SP for the first optical module 17-A200 to be disposed therein. The first optical element 17-30 at least partially overlaps the first driving assembly 17-MC of the liquid optical module 17-A100 and also at least partially overlaps the movable portion 17-23 when viewed along a direction that is perpendicular to the optical axis 17-O.

The movable portion 17-23 can be driven by the first drive assembly 17-MC, and the first optical element 17-30 can be driven by the second drive assembly 17-43, thus, the movable portion 17-23 and the first optical element 17-30 can move relative to each other. In the present embodiment, the movable portions 17-23 are not directly connected or directly contact the first optical element 17-30.

Still referring to FIGS. 17-5A and 17-5B, the outer casing 17-H has an upper surface 17-H1 that is not parallel with the optical axis 17-O, and in this embodiment is substantially perpendicular to the optical axis 17-O. The upper surface 17-H1 has a circular opening 17-H11, and the outer casing 17-H also has a protective wall 17-H2 that extends in the direction of the optical axis 17-O (upward) along the edge of the opening 17-H11. The outer casing 17-H further has a side casing member 17-H3 that extends along the optical axis 17-O (downward) along the edge of the upper surface 17-H1.

When the optical system 17-1 is assembled, as shown in FIG. 17-2, the liquid lens assembly 17-10 and the frame 17-22 and the movable portion 17-23 of the liquid lens driving mechanism 17-20 are protected by the protective wall 17-H2. In the direction of the optical axis 17-O, the movable portions 17-23 and the frame 22 protrude from the opening 17-H11, and the protective wall 17-H2 of the outer casing 17-H is higher than the liquid lens assembly 17-10, the frame 17-22, and the movable portion 17-23: That is, the outer casing 17-H is closer to a light incident end of the optical system 17-1, and the outer casing 17-H covers the liquid lens assembly 17-10, the frame 17-22 and the movable portion 17-23. The frame 17-22 and the movable portion 17-23 also partially overlap the upper surface 17-H1 when viewed from a direction that is perpendicular to the optical axis 17-O.

FIGS. 17-A to 17-6D are flow diagrams showing a method for assembling the foregoing optical system 17-1 of an embodiment. First, please refer to FIG. 17-6A, the image sensor module 17-A300 is provided, and the first optical driving mechanism 17-40 of the first optical module 17-A100 is disposed on the image sensor module 17-A300. Then, as shown in FIG. 17-6B, the first optical element 17-30 of the first optical module 17-A100 is disposed in the first optical driving mechanism 17-40 and on the image sensor module 17-A300 and preforming alignment (or calibration) and fixing. Thereafter, as shown in FIG. 17-6C, the liquid lens driving mechanism 17-20 of the liquid optical module 17-A100 is disposed and fixed on the first optical module 17-A200 or the image sensor module 17-A100. And then, as shown in FIG. 17-6D, the liquid optical assembly 17-10 of the liquid optical module 17-A100 is placed on the liquid drive mechanism 17-20.

Subsequently, an adhesive assembly (e.g., including the first and second adhesive members 17-G1 and 17-G2) is disposed between the liquid lens assembly 17-10 and the liquid lens driving mechanism 17-20. Before curing (i.e., the adhesive assembly is uncured), the liquid optical assembly

17-10 is aligned with image sensor module 17-A300 or the first optical element 17-30, followed by curing of the adhesive assembly. Thus, the optical system 17-1 can be assembled quickly, conveniently, and accurately.

In other embodiments, the first optical element 17-30 may be disposed on the first optical driving mechanism 17-40, and then the first optical element 17-30 and the first optical driving mechanism 17-40, (the first optical module 17-A200) is disposed on the image sensor module 17-A300 and are aligned with it. In other embodiments, the liquid lens assembly 17-10 can be first disposed on the liquid lens driving mechanism 17-20, and then the liquid lens assembly 17-10 and the liquid lens driving mechanism 17-20 (the liquid optical module 17-A100) are disposed on the first optical module 17-A200 or the image sensor module 17-A300 and are aligned with it.

FIG. 17-7 shows an optical system 17-2 according to another embodiment of the present disclosure. In this embodiment, the liquid optical module 17-A100 and the image sensor module 17-A300 are the same as those of the foregoing embodiment (FIG. 17-1). The optical system 17-2 further has a first optical module 17-A200', an optical path adjustment module 17-A400, and a second optical module 17-A500. The main differences between the first optical module 17-A200' and the first optical module 17-A200 is that: the length of the first optical elements 17-30' is longer than the first optical element 17-30. The first optical elements 17-30' may have one or more optical lenses. The second optical module 17-A500 includes a second lens element 17-70. It should be understood that the second optical module 17-A500 may the same as or corresponding to the optical module 13-100 in FIG. 13-3, and the second optical element 17-70 is the same as or corresponding to the lens 13-LS. For other detailed structures, please refer to FIG. 13-3, which will not be repeated here again.

The optical system 17-2 can function as a system with dual optical elements (e.g., dual lenses). The liquid optical module 17-A100 is disposed between the optical path adjustment module 17-A400 and the first optical module 17-A200' (in the Y-axis direction). The optical path adjustment mechanism 17-A400 is configured to guide an incident light P from a first direction (Z axis) to the first optical module 17-200'.

As shown in FIGS. 17-7 and 17-8, when light (incident light) from the outside enters the optical system 17-2, an incident light 17-P (Z-axis direction) is passed through a light path adjusting unit (for example, a prism, a reflecting mirror or a refract mirror) 17-60 of the optical path adjustment module 17-A400, and then the light 17-P is reflected or refracted and enters to the first optical module 17-A200' in the direction of the optical axis 17-O (Y-axis direction), so that the light 17-P can be transmitted to pass the first optical element (such as a lens) 17-30' and to the image sensor module 17-A300; and another incident light 17-Q (Z-axis direction) along the optical axis 17-U passes through the second optical element 17-70 of the second optical module 17-A500 to another image sensor module to capture the image. In this way, the optical path adjustment module 17-A400 guides the incident light 17-P from the Z axis to the Y axis direction, so that the first optical element 17-30' can be designed to arrange in the Y axis direction (not arranging in the Z-axis direction to limit the length thereof), which can improve the zoom performance of the first optical element 17-30', such as high-magnification zoom. With this configuration, the optical system 17-2 has a high-performance zoom function and can also be miniaturized. In the present embodiment, the incident light 17-P is substantially perpendicular to the optical axis 17-O.

In the present embodiment, the liquid lens element 17-11 and the first optical element 17-30' constitute a first optical member having a first focal length. The first focal length can be changed within a predetermined interval (or range) by the change of the shape of the liquid lens element 17-11 (driven via the first driving assembly 17-MC) in the liquid optical module 17-A100, and/or the driven via the second driving element 17-43. For example, the first focal length is any value within the range of 48 mm to 72 mm, or 24 mm to 72 mm, which has continuity. The second optical module 17-A500 has a second focal length, such as a fixed value: 24 mm.

In some embodiments, the first focal length includes the second focal length, such as a first focal length of 24 mm to 72 mm and a second focal length of 24 mm. In some embodiments, the first focal length does not include the second focal length, such as a first focal length of 48 mm to 72 mm and a second focal length of 24 mm. In this way, the optical system 17-2 has a wide and continuous zoom system, and is equipped with dual optical components, which greatly enhances the optical performance and provides a user with a rich experience.

In some embodiments, the optical system 17-2 further comprises a main housing configured to protect the liquid optical module 17-A100, the first optical module 17-A200', the image sensor module 17-A300, the optical path adjustment module 17-A400, and the second optical module 17-A500. The main housing has a first light entrance and a second light entrance. The first light entrance corresponds to the optical path adjustment module 17-A400, the liquid optical module 17-A100, and the first optical module 17-A200'. The second light entrance corresponds to the second optical module 17-A500. The light received by the first light entrance (incident light P) and the light received by the second light entrance (incident light Q) are parallel to each other. As shown in FIG. 17-7, the incident lights P and Q are parallel.

In addition, the optical system 17-1 can also be applied to the optical modules 1-1000, 1-A2000, 1-A3000, 1-B2000, 1-C2000, 1-D2000, and 12-2000 in the present disclosure.

In summary, an embodiment of the present disclosure provides an optical system, including a liquid optical module and a first optical module. The liquid optical module includes a liquid lens driving mechanism and a liquid lens assembly. The liquid lens driving mechanism includes a fixed portion, a movable portion and a first driving assembly configured to drive the movable portion to move relative to the fixed portion. The liquid lens assembly includes a liquid lens element, a fixing member and a deforming member. The liquid lens element has an optical axis, the fixing member is disposed on a first fixed portion surface of the fixed portion, and the deforming member is disposed on a movable surface of the movable portion. The first optical module is disposed in a receiving space of the fixed portion and includes: a first optical element and a first optical driving mechanism for driving the first optical element. The first optical element, the liquid lens driving mechanism and the liquid lens element are arranged along the optical axis. The first optical element at least partially overlaps the first driving assembly when viewed in the direction that is perpendicular to the optical axis. When the movable portion is driven by the driving assembly to move relative to the fixed portion, the liquid lens element is deformed via the deforming member, causing the optical properties of the liquid lens element to change. Thereby, functions such as optical zoom, focusing or optical shake compensation can be achieved, and the performance of the optical module can be improved.

The embodiments of the present disclosure have at least one of the following advantages or effects, in that the movable portion surface and the first fixed portion surface are oriented in the same direction, so that the liquid lens assembly can be assembled simply and quickly with the liquid lens driving mechanism, for example, by applying an adhesive member from the upper light incident end to combine the two, and the bonding strength of the two can be improved by these surfaces.

In some embodiments, the optical system further comprises a second optical module and an optical path adjustment module corresponding to the first optical module. By the configuration of the optical path adjustment module and the first optical module, a longer first optical element can be set. Moreover, with the liquid optical module, the zooming, focusing, and anti-shock functions of the optical system are greatly improved, thereby improving the quality of the optical system.

Eighteenth Group of Embodiments

FIGS. 18-1 and 18-2 are schematic diagrams showing several optical systems 18-1, 18-2, and 18-3 disposed in a cell phone, in accordance with an embodiment of the application. As shown in FIGS. 18-1 and 18-2, the optical systems 18-1, 18-2, and 18-3 may comprise camera lenses with different functionalities. Light 18-L1 and 18-L2 can enter the optical systems 18-1 and 18-2 from the rear side of the cell phone, and light 18-L3 can enter the optical system 18-3 from the front side of the cell phone. In some embodiments, a plurality of digital images captured by the optical systems 18-1, 18-2 can be combined to generate a new digital image that has an improved quality.

In this embodiment, the optical system 18-2 primarily comprises a reflecting unit 18-21 and a lens unit 18-22, and the reflecting unit 18-21 can reflect light 18-L2 to the lens unit 18-22. Subsequently, light reaches an image sensor 18-1, so that a digital image can be generated. As depicted in FIGS. 18-1 and 18-2, the optical systems 18-1, 18-3, and the reflecting unit 18-21 of the optical system 18-2 are arranged in an L-shaped configuration. However, they may also be linearly arranged along an axis, as shown in FIGS. 18-3 and 18-4.

FIG. 18-5 is a schematic diagrams showing an optical system 18-2 in accordance with an embodiment of the application, and FIG. 18-6 is a schematic diagram showing an optical system 18-2 having a fixed member 18-212 integrally formed with a base 18-222 in one piece. Referring to FIG. 18-5, the reflecting unit 18-21 of the optical system 18-2 comprises a fixed member 18-212 with a reflecting element 18-211 disposed thereon, and the lens unit 18-22 comprises a housing 18-221 (e.g. metal housing) and abase 18-222 (e.g. plastic base) connected to the housing 18-221. In some embodiments, as shown in FIG. 18-6, the fixed member 18-212 may be integrally formed with a base 18-222 in one piece, so that the fixed member 18-212 can become a part of the base 18-222 and protrude from the housing in the Z direction. Thus, precise assembly and low production cost of the optical system can be achieved.

Referring to FIGS. 18-7, 18-8, and 18-9, the housing 18-221 and the base 18-222 are affixed to each other and constitute a fixed module, wherein a plastic frame 18-F is affixed to the inner surface of the housing 18-221. Additionally, a holder 18-LH is movably disposed between the housing 18-221 and the base 18-222. In this embodiment, the holder 18-LH is connected to the base 18-222 via two first resilient members 18-S1 and two second resilient members 18-S2 (e.g. metal sheet springs).

As shown in FIGS. 18-7 and 18-8, a plurality of magnets 18-M and coils 18-C (e.g. FP-coils or planar coils) are respectively disposed on the holder 18-LH and the base 18-222. The magnets 18-M and coils 18-C can constitute a driving assembly for driving the holder 18-LH and an optical element 18-L (e.g. optical lens) received therein to move relative to the fixed module along the Z axis, thereby achieving auto-focusing of the optical system 18-2. Here, the optical element 18-L defines an optical axis along the Z axis, and the coils 18-C can be electrically connected to an external circuit via several conductive members 18-P embedded in the base 18-222.

Specifically, each of the first resilient members 18-S1 has a first fixed portion 18-S11, and each of the second resilient members 18-S2 has a second fixed portion 18-S21. During assembly, the first and second fixed portions 18-S11 and 18-S21 are respectively affixed to a first surface 18-N1 of a first pillar and a second surface 18-N2 of a second pillar on the base 18-222 (FIG. 18-9), wherein the first and second surfaces 18-N1 and 18-N2 are facing in the same direction, and they are not parallel to the bottom surface 18-222' of the base 18-222 (e.g. perpendicular to the bottom surface 18-222').

Referring to FIGS. 18-7, 18-8, 18-9, and 18-10, when viewed along the Z axis, the first and second fixed portions 18-S11 and 18-S21 do not overlap (FIG. 18-10). During assembly, the second resilient member 18-S2 can be firstly mounted on the second surface 18-N2 in the –Z direction, and the first resilient member 18-S1 is then mounted on the first surface 18-N1, whereby high efficiency of assembly can be achieved.

FIGS. 18-7 and 18-8 further show that at least a sensor 18-G (e.g. Hall sensor) is disposed on the base 18-222, and a reference element 18-R (e.g. magnet) is disposed on the bottom side of the holder 18-LH. The sensor 18-G and the reference element 18-R can constitute a sensing assembly between the holder 18-LH and the base 18-222, and the sensor 18-G can be used to detect the position of the reference element 18-R. In some embodiments, the sensor 18-G may protrude from the bottom surface 18-222', or the bottom surface 18-222' may be located between the sensor 18-G and the reference element 18-R, so that the relative position offset between the holder 18-LH and the fixed module can be obtained.

In this embodiment, the sensing assembly (the sensor 18-G and the reference element 18-R) and the driving assembly (magnets 18-M and coils 18-C) do not overlap when viewed along the Y axis.

Referring to FIGS. 18-9 and 18-11, a wall 18-K connects the first and second pillars to enhance the mechanical strength of the base 18-222. The conductive members 18-P are extended inside the base 18-222, and some of the conductive members 18-P may have an end surface 18-P' exposed to a top surface of the wall 18-K. The end surfaces 18-P' can be electrically connected to the conductive pads 18-C' on the coils 18-C by soldering or welding (FIG. 18-11). Therefore, the coils 18-C can electrically connect to an external circuit via the conductive members 18-P, wherein the conductive pads 18-C' are not parallel to the end surfaces 18-P' (e.g. perpendicular to the end surfaces 18-P').

Referring to FIG. 18-12, the holder 18-LH forms at least a stopper 18-Q to contact the frame 18-F or the housing 18-221, so that the movement of the holder 18-LH along the Z axis can be restricted. During assembly, a buffer (e.g. gel or damper) may be disposed between the stopper 18-Q and the fixed module to prevent mechanical failure due to unintentional collision therebetween.

Referring to FIG. 18-13, after light 18-L2 enters the reflecting unit 18-21 in the −Y direction, it is reflected by the reflecting element 18-211, as light 18-L2' indicates in FIG. 18-13. Subsequently, light 18-L2' propagates through the optical element 18-L of the lens unit 18-22 and reaches the image sensor 18-1 to generate a digital image. It should be noted that a distance 18-D1 between the optical element 18-L and a front end of the lens unit 18-22 is less than a distance 18-D2 between the optical element 18-L and a rear end of the lens unit 18-22.

Referring to FIGS. 18-14, 18-15, and 18-16, the difference of the lens unit 18-22 in another embodiment from the above-mentioned embodiment 18-7 to FIGS. 18-13 is primarily in that the magnets 18-M and the coils 18-C are respectively disposed on the base 18-222 and the holder 18-LH.

As shown in FIG. 18-14, the holder 18-LH has a substantially rectangular profile 18-U perpendicular to the Z axis, wherein the rectangular profile 18-U has two long sides parallel to the X axis and two short sides parallel to the Y axis. The coils 18-C and magnets 18-M (magnetic elements) are disposed on the short sides of the rectangular profile 18-U. In some embodiments, a wire (not shown) may extend through a groove 18-J on the holder 18-LH for electrically connecting the two coils 18-C, wherein the groove 18-J is located corresponding to a long side the rectangular profile 18-U.

As shown in FIG. 18-15, the conductive members 18-P are embedded in the base 18-222, and at least one of the conductive members 18-P has an end surface 18-P' exposed to a side of the pillar. Specifically, the end surface 18-P' can contact the second resilient member 18-S2, whereby the coil 18-C can be electrically connected to an external circuit via the second resilient member 18-S2 and the conductive members 18-P.

Still referring to FIG. 18-15, one of the conductive members 18-P has a first segment 18-P1 and a second segment 18-P2 embedded in the base 18-222, wherein the first segment 18-P1 extends along the Y axis, and the second segment 18-P2 extend in the X axis, both not parallel to the optical axis (Z axis). Additionally, a tapered portion 18-N3 is formed on an inner side of the first pillar (FIG. 18-15), wherein the tapered portion 18-N3 is tapered toward the holder 18-LH. In some embodiments, a buffer (e.g. gel or damper) can be disposed between the tapered portion 18-N3 and the holder 18-LH to prevent mechanical failure due to unintentional collision therebetween.

As shown in FIG. 18-16, the second resilient members 18-S2 can be stacked on the end surfaces 18-P' of the conductive member 18-P in the Z direction during assembly. That is, the end surface 18-P' and the second resilient member 18-S2 overlap when viewed along the Y direction. In this embodiment, the end surface 18-P' defines a normal direction parallel to the Y axis, and the second resilient member 18-S2 (sheet spring) defines a normal direction parallel to the Z axis different from the Y axis.

Referring to FIG. 18-17, at least a stopper 18-Q is formed on a rear side of the holder 18-LH to contact the frame 18-F or the housing 18-221, whereby the movement of the holder 18-LH relative to the fixed module along the Z axis can be restricted. During assembly, a buffer (e.g. gel or damper) may be disposed between the stopper 18-Q and the second pillar where the second resilient member 18-S2 is affixed (as the area. 18-A indicates in FIG. 18-17), thereby preventing mechanical failure due to unintentional collision therebetween.

Referring to FIG. 18-18, the holder 18-LH forms at least one protrusion 18-B. In this embodiment, a wire 18-W extending from the coil 18-C is wound around the protrusion 18-B, so that an end portion 18-S22 of the second resilient member 18-S2 (sheet spring) can be electrically connected to the wire 18-W on the protrusion 18-B by soldering or welding, wherein the end portion 18-S22 is affixed to the holder 18-LH.

As shown in FIG. 18-18, two protrusions 18-B are provided and respectively protrude from a first flat surface 18-Q1 and a second flat surface 18-Q1 of the holder 18-LH in the −Y direction. Since the first and second flat surfaces 18-Q1 and 18-Q2 are substantially situated on the same virtual plane, miniaturization and simple assembly of the optical system can be achieved.

Moreover, at least a channel 18-LH1 is formed on the holder 18-LH to receive and protect the wire 18-W. When viewed along the Z axis, the two protrusions 18-B are located within an outline of the holder 18-LH, thus facilitating miniaturization of the mechanism.

Referring to FIG. 18-19, the first fixed portion 18-S11 of the first resilient member 18-S1 forms a longitudinal slot 18-T1 and two openings 18-T2 at opposite ends of the slot 18-T1, wherein the openings 18-T2 are wider than the slot 18-T1. Additionally, a first central line 18-CL1 that extends through the centers of the two end portions 18-S22 on the inner sides of the two second resilient members 18-S2 is parallel to and spaced apart from a second central line 18-CL2 that extends through the centers of the two second fixed portions 18-S21 on the outer sides of the two second resilient members 18-S2.

It should be noted that the embodiment of FIGS. 18-14 to 18-19 is different from the embodiment of FIGS. 18-7 to 18-15 primarily in the arrangement of the magnets 18-M and the coils 18-C. However, the features and configurations of the other components can still be mutually applied to each other. The novel mechanical design as disclosed in the aforementioned embodiments can at least improve the structural strength and achieve miniaturization of the optical system.

Nineteenth Group of Embodiments

Please refer to FIG. 19-1, which is a diagram of an electronic device 19-20 according to an embodiment of the present disclosure. In one embodiment of the present disclosure, an optical system 19-10 can be disposed in an electronic device 19-20 and includes a first optical module 19-1000 and a second optical module 19-2000. The focal lengths of the first optical module 19-1000 and the second optical module 19-2000 are different. A first light-entering hole 19-1001 of the first optical module 19-1000 and a second light-entering hole 19-2001 of the second optical module 19-2000 are adjacent to each other.

Please refer to FIG. 19-2, which is a diagram of the first optical module 19-1000 according to an embodiment of the present disclosure. As shown in FIG. 19-2, the first optical module 19-1000 includes a housing 19-100, a lens unit 19-1100, a reflecting unit 19-1200, and an image sensor 19-1300. An external light (such as a light 19-L) can enter the first optical module 19-1000 through the first light-entering hole 19-1001 and be reflected by the reflecting unit

19-1200. After that, the external light can pass through the lens unit 19-1100 and be received by the image sensor 19-1300.

The specific structures of the lens unit 19-1100 and the reflecting unit 19-1200 in this embodiment are discussed below. As shown in FIG. 1-2B, the lens unit 19-1100 primarily includes a lens driving mechanism 19-1110 and a lens 19-1120 (a first optical member), wherein the lens driving mechanism 19-1110 is used to drive the lens 19-1120 to move relative to the image sensor 19-1300. For example, the lens driving mechanism 19-1110 can include a lens holder 19-1111, an outer frame 19-1112, two spring sheets 19-1113, at least one coil 19-1114, and at least one magnetic member 19-1115.

The lens 19-1120 is affixed to the lens holder 19-1111. Two spring sheets 19-1113 are connected to the lens holder 19-1111 and the outer frame 19-1112, and respectively disposed on opposite sides of the lens holder 19-1111. Thus, the lens holder 19-1111 can be movably hung in the outer frame 19-1112. The coil 19-1114 and the magnetic member 19-1115 are respectively disposed on the lens holder 19-1111 and the outer frame 19-1112, and correspond to each other. When current flows through the coil 19-1114, an electromagnetic effect is generated between the coil 19-1114 and the magnetic member 19-1115, and the lens holder 19-1111 and the lens 19-1120 disposed thereon can be driven to move relative to the image sensor 19-1300, such as moving along the Y-axis. In addition, the lens unit 19-1100 can further include a second sensing component 19-1116 configured to sense the motion of the lens holder 19-1111 relative to the outer frame 19-1112.

Referring to FIG. 19-2, the reflecting unit 19-1200 primarily includes an optical member 19-1210, an optical member holder 19-1220, a frame 19-1230, at least one first hinge 19-1250, a first driving module 19-1260, and a position detector 19-1201 (a first sensing component).

The optical member holder 19-1220 can be pivotally connected to the frame 19-1230 via the first hinge 19-1250. When the optical member holder 19-1220 rotates relative to the frame 19-1230, the optical member 19-1210 disposed thereon also rotates relative to the frame 19-1230. The optical member 19-1210 can be a prism or a reflecting mirror.

The first driving module 19-1260 can include a first electromagnetic driving assembly 19-1261 and a second electromagnetic driving assembly 19-1262, respectively disposed on the frame 19-1230 and the optical member holder 19-1220 and corresponding to each other.

For example, the first electromagnetic driving assembly 19-1261 can include a driving coil, and the second electromagnetic driving assembly 19-1262 can include a magnet. When a current flows through the driving coil (the first electromagnetic driving assembly 19-1261), an electromagnetic effect is generated between the driving coil and the magnet. Thus, the optical member holder 19-1220 and the optical member 19-1210 can be driven to rotate relative to the frame 19-1230 around the first hinge 19-1250 (the first axis, extending along the Y-axis), so as to adjust the position of the external light 19-L on the image sensor 19-1300.

The position detector 19-1201 can be disposed on the frame 19-1230 and correspond to the second electromagnetic driving assembly 19-1262, so as to detect the position of the second electromagnetic driving assembly 19-1262 to obtain the rotation angle of the optical member 19-1210. For example, the position detector 19-1201 can be Hall sensors, magnetoresistance effect sensors (MR sensor), giant magnetoresistance effect sensors (GMR sensor), tunneling magnetoresistance effect sensors (TMR sensor), or fluxgate sensors.

Next, please refer to FIG. 19-3, which is a block diagram of the first optical module 19-1000 according to the embodiment in FIG. 19-1 of the present invention. In this embodiment, the first optical module 19-1000 can further include a control module 19-1400 and an inertial sensing component 19-1500. The inertial sensing component 19-1500 is configured to sense the motion of the optical system 19-10 to output a third sensing signal 19-SD3. In this embodiment, the inertial sensing component 19-1500 can include an acceleration sensor and a gyroscope, and the third sensing signal 19-SD3 can be an acceleration variation and attitude changes (an angle variation) when the first optical module 19-1000 is shaken.

Furthermore, the control module 19-1400 can include a processor 19-1410, a storage circuit 19-1420 and a driving circuit 19-1430. The storage circuit 19-1420 can be a random access memory (RAM), can store reference information, and the processor 19-1410 can, according to the aforementioned reference information, control the first driving module 19-1260 to drive the light 19-L to move in a first direction (the Z-axis direction) on the image sensor 19-1300 and/or controlling the lens driving mechanism 19-1110 to drive the light 19-L to move in a second direction (the Y-axis direction) on the image sensor 19-1300, so as to compensate for an offset displacement of the light 19-L on the image sensor 19-1300 when the optical system 19-10 is shaken. The first direction and the second direction are perpendicular to each other, and the first direction and the second direction are both parallel to a photosensitive surface 19-1301 of the image sensor 19-1300.

In this embodiment, the reference information may include preset information, and the preset information may include a range of movement of the lens holder 19-1111 relative to the outer frame 19-1112, a range of rotation of the optical member 19-1210 relative to the frame 19-1230, a current-angle relation table of the first driving current supplied to the first driving module 19-1260 and a rotation angle of the optical member holder 19-1220, a current-distance relation table of a second driving current supplied to the lens driving mechanism 19-1110 and a moving distance of the lens holder 19-1111, and a position of a focal plane when the first optical module 19-1000 is not provided with electricity. The preset information can be measured by an external measuring device 19-50 for the first optical module 19-1000, and the preset information is stored in the storage circuit 19-1420, and then the external measuring device 19-50 is removed from the first optical module 19-1000.

In addition, the preset information may also include weight information recording the weight of the lens holder 19-1111 and the lens 19-1120, the weight of the optical member 19-1210 and the optical member holder 19-1220.

In this embodiment, the first sensing component (the position detector 19-1201) is configured to sense a relative motion of the optical member holder 19-1220 relative to the frame 19-1230 (i.e., a rotation angle of the optical member holder 19-1220 relative to one of the frame 19-1230) to output a first sensing signal 19-SD1 to the control module 19-1400. In addition, the reference information may further include a first relation table, recording the relation between the first sensing signal 19-SD1 and the rotation angle.

Therefore, when the optical system 19-10 is shaken, the control module 19-1400 can determine the rotation angle of the optical member holder 19-1220 due to shaking according to the first sensing signal 19-SD1 and the first relation table.

For example, in FIG. 19-2, the optical member holder 19-1220 is rotated 5 degrees clockwise due to shaking. Therefore, the control module 19-1400 can correspondingly calculate a first compensation value, and the first driving module 19-1260 controls the optical member holder 19-1220 to rotate 5 degrees counterclockwise according to the first compensation value so as to compensate for the offset displacement of the light 19-L on the image sensor 19-1300 along the Z-axis.

Furthermore, the second sensing component 19-1116 is configured to sense a relative motion of the lens holders 19-1111 relative to the outer frame 19-1112, such as a movement of the lens holder 19-1111 relative to the outer frame 19-1112 along the Y-axis, to output a second sensing signal 19-SD2 to the control module 19-1400, and the aforementioned reference information may further include a second relation table, recording the relation between the second sensing signal 19-SD2 and a position of the lens holder 19-1111 relative to the outer frame 19-1112.

In this embodiment, the second sensing component 19-1116 can be a Hall sensor, the second sensing signal 19-SD2 outputted therefrom is a voltage signal, and the second relation table is a position code-voltage signal table. Therefore, when the optical system 19-10 is shaken, the control module 19-1400 can obtain a position code according to the second sensing signal 19-SD2 and the second relation table, and the position code indicates a position of the lens holder 19-1111 relative to the outer frame 19-1112, so that the control module 19-1400 can obtain the movement of the lens holder 19-1111 relative to the outer frame 19-1112.

For example, in FIG. 19-2, the lens holder 19-1111 moves 1 mm along the +Y-axis due to shaking. Therefore, the control module 19-1400 can correspondingly calculate a second compensation value, and the lens driving mechanism 19-1110 controls the lens holder 19-1111 to move 1 mm along the −Y-axis according to the second compensation value, so as to compensate for the offset displacement of the light 19-L on the image sensor 19-1300 along the +Y-axes.

In addition, the control module 19-1400 can compensate for the offset displacement of the light 19-L on the image sensor 19-1300 according to the third sensing signal 19-SD3 outputted from the inertial sensing component 19-1500. For example, the control module 19-1400 can obtain the acceleration variations or angle variations of the lens holder 19-1111 and the optical member holder 19-1220 after the first optical module 19-1000 is shaken according to the third sensing signal 19-SD3.

Then, the control module 19-1400 can obtain a force applied to the lens holder 19-1111 or the optical member holder 19-1220 during the procedure of shaking of the first optical module 19-1000 according to the acceleration variations and the preset information (such as the weight of the lens holder 19-1111 or the optical member holder 19-1220) based on integral operation.

In this embodiment, the reference information may further include motion compensation information which has a first compensation corresponding table and a second compensation corresponding table. The first compensation corresponding table records the relation between the force received by the optical member holder 19-1220 and a compensation angle, and the second compensation corresponding table records the relation between the force received by the lens holder 19-1111 and a compensation displacement. Therefore, the control module 19-1400 can generate the first compensation value and the second compensation value according to the motion compensation information to control the first driving module 19-1260 and the lens driving mechanism 19-1110 to compensate for offset displacement of the light 19-L on the image sensor 19-1300.

In this embodiment, the processor 19-1410 of the control module 19-1400 can generate compensation information according to the aforementioned reference information and the first sensing signal 19-SD1 and/or the second sensing signal 19-SD2 and/or the third sensing signal 19-SD3, and the compensation information includes the first compensation value and the second compensation value.

It should be noted that the reference information may further include an extreme motion information having a first limit value and a second limit value. The first limit value corresponds to a maximum first driving current for driving the optical member holder 19-1220 to rotate to a maximum rotation angle, and the second limit value corresponds to a maximum second driving current for driving the lens holder 19-1111 to move a maximum movement relative to the outer frame 19-1112.

Before outputting the compensation information to the driving circuit 19-1430, the processor 19-1410 compares the first compensation value with the first limit value. When the first compensation value is greater than the first limit value, the processor 19-1410 outputs the first limit value to the driving circuit 19-1430, and then the driving circuit 19-1430 outputs the maximum first driving current to the first driving module 19-1260 to drive the optical member holder 19-1220 to a first limit angle (the maximum rotation angle).

When the first compensation value is less than the first limit value, the processor 19-1410 outputs the first compensation value to the driving circuit 19-1430, and then the driving circuit 19-1430 correspondingly outputs a first driving current to the first driving module 19-1260 to drive the optical member holder 19-1220 to rotate a first angle, and the first angle corresponds to the first compensation value.

Moreover, before outputting the compensation information to the driving circuit 19-1430, the processor 19-1410 is configured to compare the second compensation value with the second limit value. When the second compensation value is greater than the second limit value, the processor 19-1410 outputs the second limit value to the driving circuit 19-1430, and then the driving circuit 19-1430 correspondingly outputs the maximum second driving current to the lens driving mechanism 19-1110, to drive the lens holder 19-1111 to move to an extreme position (a second extreme position).

When the second compensation value is less than the second limit value, the processor 19-1410 outputs the second compensation value to the driving circuit 19-1430, and then the driving circuit 19-1430 correspondingly outputs a second driving current to the lens driving mechanism 19-1110 to drive the lens holder 19-1111 to move a second movement, and the second movement corresponds to the second compensation value.

Please refer to FIG. 19-4A to FIG. 19-6C. FIG. 19-4A to FIG. 19-4C are diagrams illustrating that a focal plane 19-FP of the light 19-L is in different positions relative to the image sensor 19-1300 according to an embodiment of the present disclosure. FIG. 19-5A to FIG. 19-5C are images generated by the image sensor 19-1300 corresponding to FIG. 19-4A to FIG. 19-4C, respectively. FIG. 19-6A to FIG. 19-6C are diagrams illustrating the contrast value curve corresponding to a first zone 19-Z1, a second zone 19-Z2 and a third zone 19-Z3 in FIG. 19-5A to FIG. 19-5C, respectively. In this embodiment, the reference information includes the images generated by the image sensor 19-1300.

As shown in FIG. 19-4A, when the focal plane 19-FP of the light 19-L is located on the image sensor 19-1300, the image sensor 19-1300 can obtain a clear first image, as shown in FIG. 19-5A. In this embodiment, the contrast value curve in FIG. 19-6A is obtained along a center line 19-CL in the first image of FIG. 19-5A, and the center line 19-CL intersects an outline of an object 19-OB in the first zone 19-Z1. As shown in FIG. 19-6A, the first contrast value curve 19-61 shows two peaks respectively corresponding to the aforementioned two intersection points.

When the first optical module 19-1000 is shaken, the focal plane 19-FP may deviate from the image sensor 19-1300. As shown in FIG. 19-4B, the focal plane 19-FP is in front of the image sensor 19-1300, so that the edge of the object 19-OB in the second image represented by the FIG. 19-5B is separated, and a second contrast value curve 19-62 in FIG. 19-6B shows four peaks respectively corresponding to the intersection points of the center line 19-CL and the outline of the object 19-OB in the second zone 19-Z2.

Furthermore, the reference information may further include a contrast-information table, recording the relation between the contrast value curve and the position of the focal plane 19-FP. Therefore, when the processor 19-1410 receives the second image generated by the image sensor 19-1300 (as shown in FIG. 19-5B), the processor 19-1410 can obtain the displacement between the focal plane 19-FP and the image sensor 19-1300 in FIG. 19-4B according to the contrast-information table. Then, the control module 19-1400 can control the lens holder 19-1111 to compensate so that the focal plane 19-FP in FIG. 19-4B may return to the image sensor 19-1300.

In contrast, when the first optical module 19-1000 is shaken, the focal plane 19-FP may be located behind the image sensor 19-1300, as shown in FIG. 19-4C. At this time, the edge of the object 19-OB in a third image represented by the FIG. 19-5C becomes unclear, and the two peaks of a third contrast value curve 19-63 in FIG. 19-6C are smaller than the two peaks in FIG. 19-6A. It should be noted that the two peaks of the third contrast value curve 19-63 are substantially at the same position as the two peaks in FIG. 19-6A, and the main difference is the change of peak intensity.

Similarly, when the processor 19-1410 receives the third image generated by the image sensor 19-1300 (as shown in FIG. 19-5C), the processor 19-1410 can obtain the displacement between the focal plane 19-FP and the image sensor 19-1300 in FIG. 19-4C according to the contrast-information table. Then, the control module 19-1400 can control the lens holder 19-1111 to compensate so that the focal plane 19-FP in FIG. 19-4C may return to the image sensor 19-1300.

It can be seen from the above description that the control module 19-1400 can obtain a system motion information according to the contrast values of the plurality of images generated by the image sensor 19-1300, and the system motion information includes a position of the focal plane 19-FP relative to the image sensor 19-1300. In the present embodiment, when the focal plane 19-FP is deviated from the image sensor 19-1300 in different forms, the image generated by the image sensor 19-1300 may generate different forms of blur corresponding to different forms of offset so that it can determine the relative relation between the focal plane 19-FP and the image sensor 19-1300. In addition, due to the optical characteristics of the lens 19-1120 (such as depth of field), the relative relation between the focal plane 19-FP and the image sensor 19-1300 and the degree of image blurring produced by the corresponding image sensor 19-1300 may be different for the object in different distances. For example, when the deviation distance between the focal plane 19-FP and the image sensor 19-1300 is fixed, but the distance between the object and the lens 19-1120 is different, the image generated by the image sensor 19-1300 may also have different degrees of blur. (In this embodiment, when the object is closer to the lens 19-1120, the deviation between the focal plane 19-FP and the image sensor 19-1300 may cause a more serious blur). In this embodiment, the external measuring device 19-50 can be used to record the relative position or angle of the focal plane 19-FP and the image sensor 19-1300 with the corresponding image blurring pattern, so that even if there is no external measuring device 19-50 or other position sensing element for sensing the relative positions of the lens 19-1120 (or the optical member) and the image sensor 19-1300, the relation between the focal plane 19-FP and the image sensor 19-1300 can be determined based on the image blurring patterns so as to perform more precise control.

Please continue to refer to FIG. 19-7A to FIG. 19-7D. FIG. 19-7A is a diagram illustrating that the tilt of the focal plane 19-FP with respect to the image sensor 19-1300 according to an embodiment of the present disclosure, FIG. 19-7B is a diagram of a fourth image generated by the image sensor 19-1300 in the FIG. 19-7A, and FIG. 19-7C and FIG. 19-7D are diagrams of contrast value curves of a fourth zone 19-Z4 and a fifth zone 19-Z5, respectively. When the first optical module 19-1000 is shaken, an angle may be formed between the optical member holder 19-1220 and the frame 19-1230, so that the light 19-L does not vertically enter the image sensor 19-1300, as shown in FIG. 19-7A.

At this time, the fourth image generated by the image sensor 19-1300 can be as shown in FIG. 19-7B. The fourth image can define a first corresponding area 19-R1 on the left side and a second corresponding area 19-R2 on the right side, (each of the first, second, and third images may also define a first corresponding area 19-R1 and a second corresponding area 19-R2). As shown in FIG. 19-7B, the edge of the object 19-OB in the first corresponding area 19-R1 is separated, and the edge of the object 19-OB in the second corresponding area 19-R2 is blurred. A fourth contrast value curve 19-64 and a fifth contrast value curve 19-64' respectively correspond to the fourth zone 19-Z4 and the fifth zone 19-Z5, as shown in FIG. 19-7C and FIG. 19-7D.

When the processor 19-1410 receives the fourth image generated by the image sensor 19-1300 (as shown in FIG. 19-7B), the processor 19-1410 may determine that the left area of the focal plane 19-FP is in front of the image sensor 19-1300 and the right area of the focal plane 19-FP is located behind the image sensor 19-1300 according to the fourth contrast value curve 19-64, the fifth contrast value curve 19-64', the second contrast value curve 19-62 and the third contrast value curve 19-63. That is, the control module 19-1400 can obtain the system motion information according to the variation of the contrast value of the first corresponding areas of those images and the variation of the contrast value of the second corresponding areas of those images.

Next, the control module 19-1400 can obtain an angle 19-AG between the light 19-L and the image sensor 19-1300 according to a first radius 19-D1 in FIG. 19-5A and a second radius 19-D2 in FIG. 19-7B and based on the trigonometric functions. The first radius 19-D1 is the original radius of the object 19-OB, and the second radius 19-D2 is the radius after the object 19-OB is blurred. Furthermore, the aforementioned system motion information includes the angle 19-AG.

As a result, the control module 19-1400 can control the lens driving mechanism 19-1110 and the first driving module 19-1260 to perform compensation according to the preset information and the angle 19-AG, so that the focal plane 19-FP may returns to the image sensor 19-1300, as shown in FIG. 19-4A.

Please continue to refer to FIG. 19-8A to FIG. 19-8C. FIG. 19-8A is a diagram illustrating that the light 19-L is deviated from the center of the image sensor 19-1300 according to an embodiment of the present disclosure. FIG. 19-8B is a diagram of a fifth image generated by the image sensor 19-1300 in the FIG. 19-8A, and FIG. 19-8C is a diagram of a contrast value curve corresponding to a sixth zone 19-Z6 in the fifth image.

The control module 19-1400 can determine that the light 19-L is deviated from the center of the image sensor 19-1300 according to a fifth contrast value curve 19-65 in FIG. 19-8C and the first contrast value curve 19-61. For example, the light 19-L is deviated along the Y-axis (the first direction). Similarly, the control module 19-1400 can also determine whether the light 19-L is deviated along the Z-axis (the second direction) according to the contrast value curves of the different images.

That is, the control module 19-1400 can determine the position change of the light 19-L on the image sensor 19-1300 in the first direction and/or the second direction, and the aforementioned system motion information includes the position change.

Please refer to FIG. 19-9, which is a flowchart 19-900 of a control method for an optical system according to an embodiment of the present disclosure. In step 19-902, a light 19-L is provided to pass through the reflecting unit 19-1200 and the lens unit 19-1100 to the image sensor 19-1300.

Next, in step 19-904, at least one sensing signal is provided to the control module 19-1400 by a sensing module. The sensing module may include the position detector 19-1201, the second sensing component 19-1116 and an the inertial sensing component 19-1500, but it is not limited to this embodiment.

In addition, in step 19-906, the control module 19-1400 controls the first driving module 19-1260 and/or the lens driving mechanism 19-1110 according to the sensing signal (e.g., the first sensing signal 19-SD1, the second sensing signal 19-SD2, or the third sensing signal 19-SD3) and the reference information to drive the light 19-L to move in the first direction and/or the second direction on the image sensor 19-1300 so as to compensate for the offset displacement of the light 19-L on the image sensor 19-1300 when the first optical module 19-1000 is shaken.

In some embodiments, the control module 19-1400 can obtain the acceleration variations or angle variations of the lens holder 19-1111 and the optical member holder 19-1220 after the first optical module 19-1000 is shaken according to the third sensing signal 19-SD3. Then, the control module 19-1400 generates the first driving current or the second driving current according to the motion compensation information and the preset information, thereby driving the first driving module 19-1260 and/or the lens driving mechanism 19-1110 to perform compensation.

In another embodiment, the control module 19-1400 can obtain the system motion information according to the contrast values of the plurality of images generated by the image sensor 19-1300, and the system motion information includes the position of the focal plane 19-FP relative to the image sensor 19-1300 and the angle 19-AG between the light 19-L and the image sensor 19-1300. Then, the control module 19-1400 generates the first driving current or the second driving current according to the system motion information and the preset information, thereby driving the first driving module 19-1260 and/or the lens driving mechanism 19-1110 to perform compensation.

In other embodiments, the control module 19-1400 can also refer to the third sensing signal 19-SD3 outputted from the inertial sensing component 19-1500, the plurality of images generated by the image sensor 19-1300, and the preset information at the same time to calculate a more accurate first compensation value and a more accurate second compensation value to drive the first driving module 19-1260 and/or the lens driving mechanism 19-1110 for compensation.

The present disclosure provides an optical system and a control method. The control module 19-1400 in the optical system can calculate the first compensation value and the second compensation value according to the sensing signals of the sensing module (the position detector 19-1201, the second sensing component 19-1116, and the inertial sensing component 19-1500) and the preset information. Furthermore, the control module 19-1400 can calculate a more accurate first compensation value and a more accurate second compensation value according to the images obtained by the image sensor 19-1300, the sensing signals outputted from the sensing module and the preset information at the same time, so that the image sensor 19-1300 can produce a clearer compensated image so as to achieve the purpose of optical image stabilization.

Twentieth Group of Embodiments

FIG. 20-1 is a schematic diagram showing a 3D object information capturing system in accordance with an embodiment of the application. The 3D object information capturing system 20-10 in FIG. 20-1 may be applied to vehicles, measuring equipment, cell phones, or moving object monitoring devices, which primarily comprises a camera module 20-1, a distance measuring module 20-2, and a processing unit 20-3.

The camera module 20-1 may have a camera lens for capturing image information of an object, and the distance measuring module 20-2 can capture distance information of the object's surface. The processing unit 20-3 can receive the image information and the distance information of the object respectively from the camera module 20-1 and the distance measuring module 20-2, so as to perform a 3D model construction of the object.

For example, the camera module 20-1 can capture a 2D image of the object, wherein the 2D image may be gray-level or color image that includes color information of the object. Subsequently, the camera module 20-1 transmits the 2D image to the processing unit 20-3, and the processing unit 20-3 can generate first outline information of the object by performing binarization on the 2D image.

During operation of the camera module 20-1, the distance measuring module 20-2 can perform distance measurement for the object and generate 2D distance matrix information of the object's surface. In some embodiments, the distance measuring module 20-2 can transmit infrared light and acquire 2D distance matrix information of the object's surface, and the 2D distance matrix information is then transmitted to the processing unit 20-3. Subsequently, the processing unit 20-3 can generate second outline information of the object by calculating the differences between adjacent elements of the 2D distance matrix information.

As a result, the processing unit 20-3 can establish a 3D model of the object based on the first outline information and the second outline information. For example, when the 3D object information capturing system 20-10 is applied to a moving object monitoring device, it can be used to calculate and analyze the traffic flow or amount of people by constructing 3D models of objects in a specific environment.

In some embodiments, the 3D object information capturing system 20-10 may be applied in measuring equipment for detecting and recording the size and texture of the objects, especially suitable for the fields of architecture and interior design.

In some embodiments, the 3D object information capturing system 20-10 may be applied in cell phones or camera devices to get a better quality of photography.

Additionally, the 3D object information capturing system 20-10 may also be applied in a vehicle, to rapidly construct 3D models of the objects around the vehicle. The 3D models can help the driver to have information about the surrounding environment and notice a potential hazard approaching.

In some embodiments, the 3D object information capturing system 20-10 can transmit the 3D models of the objects around the vehicle to a computing unit, and the computing unit can generate a moving path of the vehicle according to the 3D models of the objects. Thus, traffic accidents can be efficiently avoided, especially suitable for self-driving cars.

FIG. 20-2 is a schematic diagram showing a 3D object information capturing method in accordance with an embodiment of the application. Based on the 3D object information capturing system 20-10 disclosed in FIG. 20-1, the disclosure further provides a method for capturing 3D information of an object (FIG. 20-2). The method includes the step 20-S1 of providing a camera module 20-1 and capturing a 2D image of an object using the camera module 20-1. Subsequently, the camera module 20-1 transmit the 2D image to the processing unit 20-3, and the processing unit 20-3 analyzes the 2D image and generates first outline information of the object according to the 2D image (step 20-S2).

The method further includes the step 20-S3 of providing a distance-measuring module 20-2 and capturing 2D distance matrix information of the object's surface using the distance-measuring module 20-2. Subsequently, the distance-measuring module 20-2 can transmit the 2D distance matrix information to the processing unit 20-3, and the processing unit 20-3 analyzes the 2D distance matrix information and generates second outline information of the object according to the 2D distance matrix information (step 20-S4).

Finally, the processing unit 20-3 can establish a 3D model of the object according to the first outline information and the second outline information (step 20-S5).

It should be noticed that the 2D image and the 2D distance matrix information are respectively generated from the camera module 20-1 and the distance-measuring module 20-2, so that poor information quality of the object can be compensated to facilitate a precise 3D model of the object. For example, when the illumination by environmental light is weak (FIG. 20-3), the camera module 20-1 is hard to acquire a good gray-level or color image. In this circumstance, the 2D distance matrix information acquired by the distance-measuring module 20-2 can compensate for the gray-level or color image, to reduce the adverse influence of environmental light.

Alternatively, when the weather is rainy or foggy (FIG. 20-4), the distance-measuring module 20-2 is hard to acquire a good 2D distance matrix information of the object. In this circumstance, the gray-level or color image (including color, boundary, brightness information of the object) acquired by the camera module 20-1 can compensate for the 2D distance matrix information, to reduce the adverse influence of inclement weather conditions.

As described above, the disclosure can overcome the adverse influence of environmental light or inclement weather conditions by combining two different types of information which can compensate for each other. Hence, precise 3D models of the around objects can be established, suitable for the fields of vehicles, measuring equipment, consumer electronics, or moving object monitoring devices.

FIGS. 20-5, 20-6, and 20-7 are schematic diagrams showing a 3D object information capturing system 20-10 detecting an object 20-20 from different locations or angles, in accordance with an embodiment of the application. FIGS. 20-8, 20-9, and 20-10 are schematic diagrams showing the 2D images captured by the 3D object information capturing system 20-10 from different locations or angles as shown in FIGS. 20-5, 20-6, and 20-7.

In this embodiment, the 3D object information capturing system 20-10 can be moved with a car or other vehicles, whereby the camera module 20-1 can capture a plurality of 2D images of the object 20-20 on the ground 20-P from different locations or angles, as the 2D images show in FIGS. 20-8, 20-9, and 20-10.

Similarly, the distance-measuring module 20-2 can capture several 2D distance matrix information about the surface of the object 20-20 on the ground 20-P from different locations or angles by the same manner. Therefore, the processing unit 20-3 can receive the 2D images and the 2D distance matrix information respectively from the camera module 20-1 and the distance-measuring module 20-2, and establish a 3D model of the object 20-20 accordingly.

In some embodiments, the 3D object information capturing system 20-10 may be applied to a vehicle, and the 3D model of the object 20-20 can be constructed based on the 2D images and the 2D distance matrix information of the object 20-20. Here, the distance between the wall 20-W and the object 20-20 in the 3D space can be measured and provided to the driver. Additionally, the 3D object information capturing system 20-10 can further transmit 3D models of the objects in the surrounding environment to a computing unit of the vehicle, and the computing unit can generate a moving path of the vehicle accordingly to prevent from traffic accidents, especially suitable for self-driving vehicles.

FIG. 20-11 is a schematic diagram showing a plurality of 3D object information capturing systems 20-10 detecting an object 20-20 on the ground 20-P from different locations or angles at the same time, in accordance with another embodiment of the application. In this embodiment, several 3D object information capturing systems 20-10 can be applied at the same time to detect object 20-20, so as to enhance the accuracy of 3D model construction. For example, the variation of the environment may also be detected and analyzed by video recording.

FIG. 20-12 is a schematic diagram showing a plurality of 3D object information capturing systems 20-10 facing different directions to detect the surrounding environment at the same time, in accordance with another embodiment of the application. In this embodiment, several 3D object information capturing systems 20-10 may be applied to a vehicle, and the 3D object information capturing systems 20-10 may be disposed on the front, lateral and bottom sides of the vehicle, so as to detect, record, and analyze different objects in the surrounding environment at the same time. Since these 3D object information capturing systems 20-10 can move with the vehicle, a great quantity of 2D data would be generated, so that a precise 3D model construction of the objects in the surrounding environment can be achieved.

FIG. 20-13 is a schematic diagram showing a 3D object information capturing system 20-10 in accordance with another embodiment of the application. The 3D object information capturing system 20-10 of FIG. 20-13 is different from FIG. 20-1 in that the 3D object information capturing system 20-10 further comprises a sensing unit 20-4 to acquire various useful information of the objects or the environment.

For example, the sensing unit 20-4 may comprise an infrared sensing module for sensing and obtaining an infrared image of the object. The sensing unit 20-4 can transmit the infrared image to the processing unit 20-3, and the processing unit 20-3 can analyze the infrared image and generate third outline information. Subsequently, the processing unit 20-3 can establish a 3D model of the object based on the aforementioned first, second and third outline informations. In some embodiments, the infrared sensing module may receive the infrared light that is emitted by the distance measuring module 20-2 and reflected by the object.

In some embodiments, the sensing unit 20-4 may comprise a light measuring module for measuring environmental light. When the illumination of environmental light is lower than a predetermined value, the light measuring module can transmit infrared light to the object, and the infrared sensing module can receive the infrared light that is reflected by the object. Therefore, adverse influence to the 3D model construction can be avoided when the environment is dark.

In some embodiments, the sensing unit 20-4 may comprise a GPS module for capturing location information of the camera module 20-1 and the distance measuring module 20-2 relative to the object. The processing unit 20-3 can establish a 3D model of the object at least based on the location information and the aforementioned first and second outline informations.

In some embodiments, the sensing unit 20-4 may comprise an inertial sensor to obtain posture information of the camera module 20-1 and the distance measuring module 20-2 relative to the object.

In some embodiments, the sensing unit 20-4 may comprise a temperature sensor for sensing the temperature around the 3D object information capturing system 20-10.

In some embodiments, the sensing unit 20-4 may comprise a magnetic field sensor for sensing the magnetic field around the 3D object information capturing system 20-10.

As mentioned above, since the 3D object information capturing system 20-10 can acquire different types of useful information (e.g. location, posture, temperature, or magnetic field), a precise and realistic 3D model of the objects in the surrounding environment can be achieved.

In some embodiments, the camera module 20-1 of the 3D object information capturing system 20-10 may apply the optical systems as disclosed in the embodiments of groups 11, 12, and 21, and the distance measuring module 20-2 of the 3D object information capturing system 20-10 may apply the light-reflecting or lens mechanism as disclosed in the embodiments of groups 1-5 and 16-18.

Twenty-First Group of Embodiments

FIG. 21-1 is a schematic diagram showing an optical system in accordance with an embodiment of the application. The optical system can be used to perform distance measurement or 3D model construction of an object, and it primarily comprises a light source 21-1, a light shape adjusting element 21-2, a base 21-3, and a light guiding element 21-R. In this embodiment, the light source may comprise a Fabry-Perot structure, and it can emit a light beam 21-L1 such as laser in a first direction (−Y direction). Specifically, after the light beam 21-L1 propagating through the light shape adjusting element 21-2, a cross-section of the light beam 21-L1 changes, as the light beam 21-L2 indicates in FIG. 21-1.

It should be noted that the light shape adjusting element 21-2 may comprise a light filter and can change the shape of the light beam 21-L1. The area of a cross-section of the light beam 21-L1 may increase or decrease after propagating through the light shape adjusting element 21-2, wherein the cross-section is perpendicular to an optical axis of the light beam 21-L1. That is, the light shape adjusting element 21-2 can change the cross-section of the light beam 21-L1 from a first shape to a second shape, as the light beams 21-L1 and 21-L2 show in FIG. 21-1.

In some embodiments, the shape (first shape) of the light beam 21-L1 may be a round shape or a first longitudinal shape (e.g. wide oval shape), and the shape (second shape) of the light beam 21-L2 may be a line shape or a second longitudinal shape (e.g. thin oval shape) different from the first longitudinal shape, wherein the length-to-width ratio of the second longitudinal shape is greater than that of the first longitudinal shape.

Subsequently, the light beam 21-L2 reaches the light guiding element 21-R on the base 21-3. In this embodiment, the light guiding element 21-R may comprise a prism or mirror, and the propagating direction of the light beam 21-L2 can be altered by the light guiding element 21-R, as the reflected light beam 21-LR shows in FIG. 21-1.

Here, the light guiding element 21-R is movably disposed on the base 21-3, and it can translate or rotate with respect to the base 21-3. Thus, an object can be detected and scanned in a predetermined range, and the distance information of the object's surface can be obtained to establish its 3D model.

A driving assembly for driving the light guiding element 21-R to move relative to the base 21-3 may be provided in the optical system. In this embodiment, at least a metal sheet spring is provided to movably connect the light guiding element 21-R with the base 21-3, and the driving assembly may comprise magnets and coils respectively disposed on the light guiding element 21-R and the base 21-3. When an electrical current is applied to the coils, an electromagnetic force can be produced by the magnets and coils, so that the light guiding element 21-R can translate or rotate with respect to the base 21-3 for scanning the object in a predetermined range.

Referring to FIG. 21-2, another embodiment of the optical system may be disposed in a vehicle, and it further comprises a lens unit 21-4 and a light receiver 21-5. As shown in FIG. 21-2, the light beam 21-R is reflected by the light guiding element 21-R to an object 21-P (e.g. a car), and it is then reflected by the object 21-P to the light receiver 21-5, as the light beam 21-LP shows in FIG. 21-2.

Subsequently, the light receiver 21-5 can convert light signal of the light beam 21-LP into electronic signal. As the electronic signal comprise distance and 3D model information of the object 21-P, it can be utilized in an Advanced Driver Assistance System (ADAS) or unmanned driving system.

FIGS. 21-3 and 21-4 are schematic diagrams showing a light guiding element 21-R in accordance with an embodiment of the application. In this embodiment, the light guiding element 21-R is comprises a prism having a light-incident surface 21-RS1 and a light-emission surface 21-RS2, wherein the light-incident surface 21-RS1 or/and the incident light-emission surface 21-RS2 may have a non-planar structure.

In some embodiments, the light guiding element 21-R may comprise a mirror having a reflecting surface that forms a non-planar structure for altering the cross-sectional shape of the light beam.

As shown in FIGS. 21-3 and 21-4, the light-incident surface 21-RS1 forms a round recess 21-R1, and the light-emission surface 21-RS2 forms a longitudinal recess 21-R2 for changing the cross-sectional shape of the light beam, so that the light guiding element 21-R can substitute for the light shape adjusting element 21-2. That is, the light shape adjusting element 21-2 can be omitted from the optical system to simplify the assembly and reduce the production cost of the optical system.

FIG. 21-5 is a schematic diagram showing a light guiding element 21-R in accordance with another embodiment of the application. As shown in FIG. 21-5, a round hollow space 21-RH is formed inside the light guiding element 21-R (e.g. prism). In this embodiment, the hollow space 21-RH may be vacuumed, or filled with gas or other material that has a different refractive index from the light guiding element 21-R. For example, the round hollow space 21-RH may be formed by bonding two prism parts to each other.

FIG. 21-6 is a schematic diagram showing the light beam 21-LR reflected by the light guiding element 21-R to scan in a predetermined area. In this embodiment, the light guiding element 21-R can move or rotate relative to the base 21-3 by a driving assembly (e.g. magnets and coils), so as to scan the environment in a wide range. As the light-incident surface 21-RS1 or/and the incident light-emission surface 21-RS2 may form a non-planar structure, the cross-sectional shape of the light beam can be altered to facilitate rapid efficient object detection and 3D scanning.

FIG. 21-7 is a schematic diagram showing a light guiding module in accordance with an embodiment of the application. As shown in FIG. 21-7, the light guiding module primarily comprises the light guiding element 21-R and the base 21-3. The light guiding element 21-R can rotate relative to the base 21-3 around a first axis 21-A1 and a second axis 21-A2 by the driving assembly (e.g. magnets and coils), wherein the first and second axes 21-A1 and 21-A2 are not parallel to the first direction (−Y direction) or a second direction (Z direction).

For example, the driving assembly (e.g. magnets and coils) may drive the light guiding element 21-R to rotate relative to the base 21-3 around the first axis 21-A1 within a first range, and drive the light guiding element 21-R to rotate relative to the base around the second axis 21-A2 within a second range, wherein the time taken by the light guiding element 21-R to rotate throughout the first range or the second range is less than 0.1 second. That is, the scanning frequency is greater than 10 Hz.

The optical system as disclosed in the aforementioned embodiments may further comprise a switchable light filter (not shown) disposed between the light source 21-1 and the light guiding element 21-R, so as to block visible or invisible light of the light beam. Specifically, the optical system may comprise only a single light source 21-1, and the light beam 21-L1 generated by the light source 21-1 has a continuous and indiscrete structure (e.g. round or oval shape).

In some embodiments, the light beam 21-LR after propagating through the light shape adjusting element 21-2 and reflected by the light guiding element 21-R may have a square, rectangle, or cross shape in cross-section, as shown in FIGS. 21-8 and 21-9. It should be noticed that the light guiding element 21-R in the disclosure can move or rotate reciprocally relative to the base 20-3 within a predetermined range, whereby the optical system can use only one light source to perform a wide-range scanning for distance measurement or 3D model construction of an object.

In some embodiments, the aforementioned light guiding module and the lens unit 21-4 may apply the configurations of the reflecting and lens mechanisms disclosed in the embodiments of groups 1-5 and 16-18, whereby the miniaturization of the optical system can be achieved, and efficiency and structural strength of the optical system can also be increased.

Twenty-Second Group of Embodiments

Refer to FIG. 22-1, wherein FIG. 22-1 is a schematic perspective view illustrating an optical member driving mechanism 22-1 in accordance with an embodiment of the present disclosure. It should be noted that, in this embodiment, the optical member driving mechanism 22-1 may be, for example, a voice coil motor (VCM), which may be disposed in the electronic devices with camera function for driving an optical member (such as a lens), and can perform an autofocus (AF) and/or optical image stabilization (OIS) function. In addition, the optical member driving mechanism 22-1 has a substantial rectangular structure, a housing 22-10 of the optical member driving mechanism 22-1 has a hollow structure, which includes a top wall 22-11, four sidewalls 22-12, and an opening formed on the top wall 22-11 corresponds to the optical member (not shown). That is, an optical axis 22-O may pass through the opening of the top wall 22-11, such that light may enter into the optical member driving mechanism 22-1 via the optical axis.

FIG. 22-2 is an exploded view illustrating the optical member driving mechanism 22-1 shown in FIG. 22-1. As shown in FIG. 22-2, the optical member driving mechanism 22-1 mainly includes a housing 22-10, a base 22-20, a carrier 22-30, a first driving assembly 22-40, a frame 22-50, a first elastic member 22-61, a second elastic member 22-62, and a biasing driving assembly 22-70. The housing 22-10 and the base 22-20 may be assembled as a hollow case. Therefore, the carrier 22-30, the first driving assembly 22-40, the frame 22-50, the first elastic member 22-61, and the second elastic member 22-62 may be surrounded by the housing 22-1.0, and thus may be contained in the case.

The carrier 22-30 has a hollow structure, and carries an optical member with an optical axis 22-O. The frame 22-50 is disposed on the base 22-20, and fixed to the housing 22-10. In addition, the carrier 22-30 is movably connected to the housing 22-10 and the base 22-20. To be more specific, the carrier 22-30 may be connected to the frame 22-50 through the first elastic member 22-61, the earner 22-30 may also be connected to the base 22-20 through the second elastic member 22-62, and the first elastic member 22-61 and the second elastic member 22-62 are metallic materials. Therefore, the carrier 22-30 is movably suspended between the frame 22-50 and the base 22-20.

The first driving assembly 22-40 includes a driving coil 22-41, a first driving magnetic member 22-42A, and a second driving magnetic member 22-42B. The driving coil 22-41 is disposed on the carrier 22-30, and the first driving magnetic member 22-42A and the second driving magnetic member 22-42B may be disposed on the frame 22-50. When a current is applied to the driving coil 22-41, an electromagnetic driving force may be generated by the driving coil 22-41 and the first driving magnetic member 22-42A, the second driving magnetic member 22-42B to drive the carrier 22-30 and the optical member carried therein to move along Z-axis (the optical axis 22-O) relative to the base 22-20. Therefore, the autofocus (AF) function is performed. In addition, a magnetically permeable plate 22-52 may be disposed and connected to the frame 22-50. Therefore, the magnetic field generated by the first driving magnetic member 22-42A and the second driving magnetic member 22-42B may be concentrated, enhancing the electromagnetic driving force. Furthermore, the biasing driving assembly 22-70 is disposed below the base 22-20, and drives the carrier 22-30 and the optical member carried therein to move along a direction that is perpendicular to the optical axis 22-O (X-Y plane) relative to the base 22-20. Therefore, the optical image stabilization (OIS) function is performed. Regarding the operation of the biasing driving assembly 22-70, a further description will be provided below accompanied by FIG. 22-4.

FIG. 22-3 is a cross-sectional view illustrating along line 22-A shown in FIG. 22-1. It should be noted that for the sake of illustrating the structure inside the base 22-20 and the frame 22-50 more clearly, the housing 22-10 and the biasing driving assembly 22-70 are not illustrated in the present embodiment. As shown in FIG. 22-3, the base 22-20 further includes an embedded member 22-21 embedded in the base 22-20 for enhancing the structural strength of the base 22-20. For example, the embedded member 22-21 may be formed of metallic materials with a high strength. In addition, in the present embodiment, the magnetically permeable plate 22-52 is partially embedded in the frame 22-50, and faces the first driving assembly 22-40 (including the first driving magnetic member 22-42A and the second driving magnetic member 22-42B). It should be noted that the magnetically permeable plate 22-52 may be fixedly connected to the embedded member 22-21 via a first bonding material 22-91, such that the mechanical strength of the optical member driving mechanism 22-1.

FIG. 22-4 is a top view illustrating the biasing driving assembly 22-70 in accordance with an embodiment of the present disclosure. As shown in FIG. 22-4, the biasing driving assembly 22-70 includes a metal base 22-71, metal wires, and an insulating layer 22-73. In the present embodiment, the metal base has a rectangular structure. The metal wires 22-72 are disposed on four edges of the metal base 22-71, and connected to the metal base 22-71 via the insulating layer 22-73 at each of the corners of the metal base 22-71. The metal wires 22-72 are made of shape memory alloys (SMA). Accordingly, the metal wires 22-72 have certain plasticity. Therefore, each of the metal wires 22-72 may individually deform along a horizontal direction (X-axis or Y-axis) according to electric signals. Therefore, the position of the carrier 22-30 (shown in FIG. 22-2), which is disposed on the biasing driving assembly 22-70, may be controlled, and the optical image stabilization (OIS) function is performed.

FIG. 22-5 is a schematic view illustrating the carrier 22-30, the driving coil 22-41, and the second elastic member 22-62 in accordance with an embodiment of the present disclosure. As shown in FIG. 22-5, the carrier 22-30 has an abutting surface 22-31, and the driving coil 22-41 is disposed on the abutting surface 22-31 of the earner 22-30. In other words, the abutting surface 22-31 faces and is in direct contact with the driving coil 22-41. The carrier 22-30 further includes a plurality of positioning columns 22-32 protruding from the abutting surface 22-31. The driving coil 22-41 is disposed around the positioning columns 22-32, wherein a winding axis 22-41A serves as a center of the driving coil 22-41. That is, the driving coil 22-41 may surround at least a portion of each of the positioning columns 22-32. In the present embodiment, the direction of the winding axis 22-41A (parallel to X-axis) is perpendicular to the direction of the optical axis 22-O (parallel to Z-axis).

FIG. 22-6 is a side view illustrating the carrier 22-30 and the driving coil 22-41 shown in FIG. 22-5. As shown in FIG. 22-6, the abutting surface 22-31 has a first edge 22-31A and a second edge 22-31B parallel to the first edge 22-31A. In the present embodiment, the first edge 22-31A and the second edge 22-31B are located on upper and lower sides of the abutting surface 22-31. The extending direction of the first edge 22-31A and the second edge 22-31B is perpendicular to the direction of the optical axis 22-O. In addition, in the direction of the optical axis 22-O, the maximum size of the abutting surface 22-31 is greater than the maximum size of the driving coil 22-41. In other words, the distance between the first edge 22-31A and the second edge 22-31B is greater than the thickness of the driving coil 22-41 in Z-axis. Therefore, the driving coil 22-41 may completely abut the abutting surface 22-31, reducing the probability of the dispersion issue to the driving coil 22-41. In some embodiments, the minimum distance between the positioning columns 22-32 and the first edge 22-31A is different from the minimum distance between the positioning columns 22-32 and the second edge 22-31B. In other words, the positioning columns 22-32 may be closer to the first edge 22-31A or the second edge 22-31B.

FIG. 22-7 is a cross-sectional view illustrating along line 22-B shown in FIG. 22-5. As shown in FIG. 22-7, the carrier 22-30 further has a containing space 22-33 for containing a reference member 22-81. For example, the reference member 22-81 may be a magnetic member. The position of the reference member 22-81 may be detected by a position sensor, such that the position of the carrier 22-30 may be determined. The reference member 22-81 and the position sensor may constitute a position sensing assembly for detecting the movement of the carrier 22-30 relative to the base 22-20. The operation of the position sensing assembly allows the optical member driving mechanism 22-1 to perform AF and/or OIS function. Regarding the arrangement of the position sensor, a further description will be provided below accompanied by FIG. 22-11A.

The containing space 22-33 includes a containing surface 22-34, an upper opening 22-35A, a lower opening 22-35B, and a supporting portion 22-36. In the present embodiment, the reference member 22-81 may abut the containing surface 22-34. As viewed along a direction that is perpendicular to the optical axis 22-O (Z-axis), the second elastic member 22-62 and the containing surface 22-34 partially overlap. The upper opening 22-35A is disposed on an upper side of the carrier 22-30, and the lower opening 22-35B is disposed on a lower side of the carrier 22-30. In the present embodiment, the supporting portion 22-36 is disposed below the containing space 22-33, making the directions of the upper opening 22-35A and the lower opening 22-35B different. A check, may be made as to whether the reference member 22-81 is correctly mounted into the carrier 22-30 thanks to the appropriate arrangement of the upper opening 22-35A, the lower opening 22-35B, and the supporting portion 22-36. In addition, an adhesive may be filled into the upper opening 22-35A, the lower opening 22-35B, or the supporting portion 22-36, and thereby the reference member 22-81 may be affixed more stably.

FIG. 22-8 is a partial plane view illustrating the second elastic member 22-62 in accordance with an embodiment of the present disclosure. As shown in FIG. 22-8, the second elastic member 22-62 includes a fixed portion fastening end 22-63, a movable portion fastening end 22-64, and an elastic connecting portion 22-65. The fixed portion fastening end 22-63 is fixedly connected to the base 22-20. The movable portion fastening end 22-64 is fixedly connected to the movable portion fastening end 22-64 and the fixed portion fastening end 22-63. Thanks to the aforementioned design, the carrier 22-30 may be movably connected to the base 22-20 via the second elastic member 22-62.

In the present embodiment, the elastic connecting portion 22-65 has a first section 22-65A, a second section 22-65B, and a bending section 22-65C. An angle between the first section 22-65A and the second section 22-65B is less than or equal to 90 degrees. In some other embodiments, the angle between the first section 22-65A and the second section 22-65B is less than or equal to 45 degrees. The bending section 22-65C is connected to the first section 22-65A and the second section 22-65B. The bending section 22-65C has at least one side section 22-65D, and a recess 22-65E is formed by the bending section 22-65C, the first section 22-65A, and the second section 22-65B. The recess 22-65E has an elongated structure. The side section 22-65D is located on one side of the recess 22-65E, and a width 22-$W_E$ is greater than or equal to a width 22-$W_D$ of the side section 22-65D.

In some embodiments, an extending direction of the recess 22-65E is parallel to an extending direction of the first section 22-65A. In some other embodiments, the extending direction of the recess 22-65E is different from the extending direction of the first section 22-65A, the second section 22-65B. The flexibility of the second elastic member 22-62 may be significantly reduced in the horizontal direction (X-axis and/or Y-axis) by arranging the side section 22-65D. Therefore, the second elastic member 22-62 may mainly move along Z-axis, preventing the second elastic member 22-62 from colliding with other members of the optical member driving mechanism 22-1 in the horizontal direction. It should be noted that in the present embodiment, the second elastic member 22-62 serves as an example, therefore those skilled in the art should understand that the first elastic member 22-61 may also have the aforementioned structure.

FIG. 22-9 is a perspective view illustrating an interior structure of the optical member driving mechanism 22-1 in FIG. 22-1. It should be noted that for the sake of clearly illustrating the interior structure of the optical member driving mechanism 22-1, the housing 22-10, the frame 22-50, and the biasing driving assembly 22-70 are not illustrated in the present embodiment. As shown in FIG. 22-9, the first driving assembly 22-40 includes a driving coil 22-41, a first driving magnetic member 22-42A, and a second driving magnetic member 22-42B. The first driving magnetic member 22-42A and the second driving magnetic member 22-42B are arranged along a direction that is perpendicular to the winding axis 22-41A, and face the driving coil 22-41. It should be noted that a magnetic pole of the first driving magnetic member 22-42A is opposite to a magnetic pole of the second driving magnetic member 22-42B. To be more specific, the magnetic poles, which face the driving coil 22-41, of the first driving magnetic member 22-42A and the second driving magnetic member 22-42B are opposite. In addition, in the direction that is perpendicular to the winding axis 22-41A, the size of the first driving magnetic member 22-42A is different from the size of the second driving magnetic member 22-42B.

FIG. 22-10 is a schematic view illustrating the structure shown in FIG. 22-9 with the frame 22-50. As shown in FIG. 22-10, the frame 22-50 is disposed outside the magnetically permeable plate 22-52, and partially covers the magnetically permeable plate 22-52. The frame 22-50 further has a plurality of holes 22-51 corresponding to the magnetically permeable plate 22-52. In other words, the magnetically permeable plate 22-52 is disposed between the holes 22-51 and the first driving magnetic member 22-42A, the second driving magnetic member 22-42B. Arranging the holes 22-51 this way makes it easy to dissipate the heat inside the optical member driving mechanism 22-1.

FIG. 22-11A is a side view illustrating the carrier 22-30, the driving coil 22-41, a position sensor 22-82, and an electronic component 22-E in accordance with another embodiment of the present disclosure. In the present embodiment, the driving coil 22-41 is disposed on the abutting surface 22-31 of the carrier 22-30, and surrounds a plurality of the positioning columns 22-32. The position sensor 22-82 is also disposed on the abutting surface 22-31, and the driving coil 22-41 may surround the position sensor 22-82. In other words, the position sensor 22-82 is disposed between the positioning columns 22-32, and a center connecting line 22-C may pass through the position sensor 22-82. In addition, the electronic component 22-E. In the present embodiment, electronic component 22-E is disposed between the positioning columns 22-32, and adjacent to the position sensor 22-82.

For example, the position sensor 22-82 may be a Hall effect sensor, a magnetoresistive (MR) sensor, such as a giant magnetoresistive (GMR) sensor or a tunnel magnetoresistive (TMR) sensor, or a fluxgate. In some embodiments, the position sensor 22-82 and a reference member, which is disposed on the base 22-20, may constitute a position sensing assembly. The displacement of the carrier 22-30 in the X-axis, Y-axis, and/or Z-axis direction relative to the base 22-20 may be obtained to perform AF and/or OIS function by detecting the reference member.

FIG. 22-11B is a cross-sectional view illustrating the earner 22-30, the driving coil 22-41, and the position sensor 22-82 shown in FIG. 22-11A. As shown in FIG. 22-11B, in a direction (X-axis) that is perpendicular to the abutting surface 22-31, a first distance 22-$D_1$ between the top end of the positioning columns 22-32 and the abutting surface 22-31 is greater than a second distance 22-$D_2$ between the top end of the position sensor 22-82 and the abutting surface 22-31. Therefore, the positioning columns 22-32 may prevent the position sensor 22-82 from damage due to the collision with other members. In addition, the position sensor 22-82 is disposed on the abutting surface 22-31 of the carrier 22-30 via a first bonding material 22-91 and a second bonding material 22-92. For example, the first bonding material 22-91 is solder or other conductive material, the second bonding material 22-92 is an insulating material. In the present embodiment, the second bonding material 22-92 is in direct contact with the driving coil 22-41.

FIG. 22-12A is a perspective view illustrating the carrier 22-30, the driving coil 22-41, and a circuit board 22-43 in accordance with another embodiment of the present disclosure. In the present embodiment, the circuit board 22-43 may be disposed, and the driving coil 22-41 of the first driving assembly 22-40 is disposed in the circuit board 22-43. In addition, the circuit board 22-43 may be electrically connected to the position sensing assembly. For example, the position sensor 22-82 (shown in FIG. 22-12B) may be disposed on the circuit board 22-43, and electrically connected to the circuit board 22-43. The carrier 22-30 has a positioning structure 22-37, which protrudes from the carrier 22-30. The circuit board 22-43 may be affixed to the carrier 22-30 by arranging the positioning structure 22-37. A bonding material may be disposed between the positioning structure 22-37 and the circuit board 22-43 in order to enhance the effect of fixing the circuit board 22-43. In some embodiments, the carrier 22-30 is movably connected to the base 22-20 via an elastic member (such as the second elastic member 22-62), and the elastic member may be electrically connected to the circuit board 22-43.

FIG. 22-12B is a partial top view illustrating the carrier 22-30, the circuit board 22-43, and the position sensor 22-82 in accordance with another embodiment of the present disclosure. As shown in FIG. 22-12B, the position sensor 22-82 is disposed between the carrier 22-30 and the circuit board 22-43. As viewed along Z-axis, the position sensor 22-82 may be at least partially exposed from the carrier 22-30. In addition, the position sensor 22-82, the carrier 22-30, and the circuit board 22-43 partially overlap as viewed along X-axis. In the present embodiment, the carrier 22-30 has a containing recess 22-38 for containing the position sensor 22-82. It should be noted that the containing recess 22-38 has a surface that is parallel to Z-axis. The surface faces the position sensor 22-82, and does not come into direct contact with the position sensor 22-82. The second bonding material 22-92 is disposed between the position sensor 22-82 and the containing recess 22-38 of the carrier 22-30, and the second bonding material 22-92 may come into direct contact with the circuit board 22-43. The position sensor 22-82 may be fixed more stably by arranging the second bonding material 22-92.

As set forth above, the present disclosure provides an optical member driving mechanism including a carrier having an abutting surface, wherein the maximum size of the abutting surface is greater than the maximum size of the driving coil in the direction of the optical axis. Therefore, the driving coil may indeed abut the abutting surface, such that the dispersion issue of the driving coil may be reduced. In addition, the optical member driving mechanism 22-1 may also be applied to the optical modules 1-A1000, 1-A2000, 1-A3000, 1-B2000, 1-C2000, 1-D2000, and 12-2000 in the present disclosure.

Twenty-Third Group of Embodiments

Referring to FIGS. 23-1 and 23-2, FIG. 23-1 is an exploded view showing an optical driving mechanism 23-1 according to an embodiment of the present disclosure, and FIG. 23-2 is a schematic view showing the assembled optical driving mechanism 23-1, wherein the housing 23-H is omitted. The optical driving mechanism 23-1 can be used, for example, to drive and sustain an optical element (such as a lens or a lens assembly) 23-LS, and can be disposed inside an electronic device (such as a camera, a tablet or a mobile phone). When light (incident light) from the outside enters the optical driving mechanism 23-1, the light passes through the optical element 23-LS in the optical driving mechanism 23-1 along an optical axis O and then to an image sensor assembly (not shown) outside the optical driving mechanism 23-1, to acquire an image. The optical driving mechanism 23-1 has a biasing assembly and a driving assembly which can move the optical element 23-LS, to achieve the purpose of Auto-Focusing (AF) and/or Optical Image Stabilization (OIS). The detailed structure of the optical driving mechanism 23-1 will be described below.

As shown in FIGS. 23-1 and 23-2, the optical driving mechanism 23-1 primarily comprises a bottom plate 23-10, a movable portion 23-20, a biasing assembly 23-W, and a housing 23-H. The bottom plate 23-10 and the housing 23-H are affixed to each other, and an accommodating space is formed for the movable portion 23-20 and the biasing assembly 23-W to be disposed in such a way that they can be protected. The biasing assembly 23-W is disposed between the bottom plate 23-10 and the movable portion 23-20, and connects the bottom plate 23-10 with the movable portion 23-20. The biasing assembly 23-W can drive the movable portion 23-20 to move relative to the bottom plate 23-10. The movable portion 23-20 is movably connected to the bottom plate 23-10. The detailed structure of the movable portion 23-20 will be described below, and the biasing assembly 23-W and the bottom plate 23-10 will be described later.

The movable portion 23-20 includes: a base 23-21, a frame 23-22, a holder 23-23, an upper leaf spring 23-24, a lower leaf spring 23-25 and a driving assembly 23-MC. The aforementioned frame 23-22 and the holder 23-23 are disposed on the base 23-21, and the frame 23-22 is surrounding the holder 23-23. The holder 23-23 is configured to sustain an optical element 23-LS, such as a lens. The light from the outside passes through the optical element 23-LS along the optical axis 23-O of the optical driving mechanism 23-1 or the optical element 23-LS to an image sensor, to acquire an image.

Referring to FIGS. 23-2 and 23-3, the upper and lower leaf springs 23-24 and 23-25 are respectively disposed on the upper and lower sides of the holder 23-23, and connect the holder 23-23 with the base 23-21. In detail, the lower leaf spring 23-25 is disposed on the main body of the base 23-21, and the upper leaf spring 23-24 is disposed on the plurality of (four in this embodiment) pillars (or studs) of the base 23-21. The upper and lower leaf springs 23-24 and 23-25 sandwich the holder 23-23 being movably connected to the base 23-21.

Still referring to FIGS. 23-2, the aforementioned driving assembly 23-MC includes a coil assembly 23-C, a magnetic assembly 23-M and a permeability assembly 23-V, wherein the coil assembly 23-C may include one or more driving coils, the magnetic assembly 23-M may include one or more magnetic elements (e.g., magnets), and the permeability assembly 23-V may include one or more permeability members. The coil assembly 23-C and the magnetic assembly 23-M are disposed on the holder 23-23 and the frame 23-22, respectively. In detail, the coil assembly 23-C is affixed to the holder 23-23, and the magnetic assembly 23-M is connected to the lower surface of the upper leaf spring 23-24 (for example, applying adhesive) or to the frame 23-22 and facing the coil assembly 23-C.

When a suitable driving signal (e.g., drive current) is applied to the coil assembly 23-C, a magnetic force is generated between the coil assembly 23-C and the first magnetic assembly 23-M, such that the first driving assembly 23-MC drives the holder 23-23 and the optical element 23-LS to linearly or obliquely move (tilted) via the magnetic force, so as to achieve the effect of optical focusing or shaking compensation. In addition, the upper and lower leaf springs 23-24 and 23-25 make the holder 23-23 keep in an initial position relative to the base 23-21 before applying the driving signal. It should be understood that the driving assembly 23-MC in this embodiment is a moving coil type, and in other embodiments, it may be a moving magnetic type.

The permeability assembly 23-V of the driving assembly 23-MC is disposed on the inner side of the frame 23-22, which can concentrate the magnetic force generated by the magnetic assembly 23-M in a predetermined direction to enhance the magnetic force that drives the holder 23-23 and the optical element 23-LS to move, and reducing magnetic interference. In other embodiments, the inner side or the portion of the wall of the frame 23-22 corresponding to the magnetic assembly 23-M can be embedded with the permeability assembly 23-V, so that the frame 23-22 has a permeability assembly material, and the mechanical strength of the frame 23-22 can be enhanced.

Thus, the driving assembly 23-MC drives the holder 23-23 to move with the optical element 23-LS disposed therein relative to the base 23-21 and the frame 23-22, thereby achieving the auto-focusing function, or a good compensation effect can be obtained when the optical lens is shaken through the aforementioned mechanism.

The detailed structure of the biasing assembly 23-W and the bottom plate 23-10 will be described in detail below.

Referring to FIGS. 23-1 and 23-4, the biasing assembly 23-W is located between the bottom plate 23-10 and the movable portion 23-20 and connects the two. The biasing assembly 23-W includes at least one biasing element 23-WS (four in this embodiment). The biasing element 23-WS is, for example, a wire having a shape memory alloy (SMA) material, and can be changed in length by applying a driving signal (for example, driving current) thereto through an external power source (not shown). For example, when the driving signal is applied to raise the temperature of the biasing component 23-W, the biasing assembly 23-W can be deformed to be elongated or shortened; when the driving signal is stopped, the biasing assembly 23-W can be restored to original length. In other words, by applying an appropriate drive signal, the length of the biasing assembly 23-W can be controlled to move the movable portion 23-20 (including the carried optical element 23-LS) relative to the bottom plate 23-10, thereby changing the position or posture of the movable portion 23-20 relative to the bottom plate 23-10, so that the optical driving mechanism 1 has the functions of focusing, or anti-shake compensation.

The material of the foregoing biasing element 23-W, for example, may include TiNi alloy, TiPd, TiNiCu, TiNiPd or combination.

The foregoing bottom plate 23-10 has a fixed body 23-11, an insulating layer 23-12, a conductive layer 23-13 and a moving member 23-14, wherein the insulating layer 23-12 and the conductive layer 23-13 are sandwiched between the fixed body 23-11 and the moving member 23-14. The fixed body 23-11 and the moving member 23-14 will be described below, and the insulating layer 23-12 and the conductive layer 23-13 will be described later (referring to FIGS. 23-6A and 23-6B).

Referring to FIGS. 23-4 and 23-5, the fixed body 23-11 has a plurality of (two) fixed protrusions 23-111 disposed at diagonal corners, and the moving member 23-14 has a plurality of (two) connecting protrusions 23-141 located at diagonal corners. As can be seen from FIG. 23-5, the fixed protrusions 23-111 and the connecting protrusions 23-141 are located at the four corners of the bottom plate 23-10 having a substantially rectangular structure, and those protrusions 23-111 and 23-141 are staggered (i.e., any two adjacent corners providing with one fixed protrusion 23-111 and one connecting protrusion 23-141), and the biasing assembly 23-W connects the fixed protrusion 23-111 with the connecting protrusion 23-141.

Specifically, two ends of each biasing element 23-WS of the biasing assembly 23-W are respectively connected to the fixed protrusion 23-111 of the fixed body 23-11 and the connecting protrusion 23-141 of the moving member 23-14. The fixed protrusion 23-111 and the connecting protrusion 23-141 are extending toward the movable portion 23-20.

The moving member 23-14 further includes at least one (two in this embodiment) extending protrusion 142 and at least one (two in the present embodiment) L-shaped flexible string arms 23-143. The extending protrusion 142 is adjacent to the connecting protrusion 23-141 and is fixedly connected to the movable portion 23-20 above the bottom plate 23-10, and the string arm 23-143 is flexible to movably connect the fixed body 23-11 of the bottom plate 23-10. As such, the biasing assembly 23-W can be driven to move or rotate the movable portion 23-20 relative to the bottom plate 23-10.

Referring to FIGS. 23-6A and 23-6B, the bottom plate 23-10 defines a first electrical connection portion 23-101 and a second electrical connection portion 23-102. The biasing element 23-WS is connected to the first electrical connection portion 23-101 and the second electrical connection portion 23-102. Viewed in the direction of the optical axis 23-O, starting from the light incident end (upper end) of the optical driving mechanism 1, the fixed body 23-11 (fixed protrusion 23-111), the insulating layer 23-12, and the conductive layer 23-13 are sequentially arranged, and the biasing element 23-WS is sandwiched by the three and electrically connected to the conductive layer 23-13. The fixed protrusion 23-111 has a curved portion, and the surface of the curved portion is not provided with the insulating layer 23-12 and the conductive layer 23-13.

It is to be noted that, in the direction of the optical axis 23-O, the insulating layer 23-12 in the first electrical connecting portion 23-101 protrudes from the fixed protrusion 23-111 of the fixed body 23-11 and the conductive layers 23-13, and the conductive layer 23-13 protrudes from the fixed body 23-111. In this way, it is ensured that the contact area of the conductive layer 12 with the biasing element 23-WS is increased, and the overall quality of the driving mechanism is improved.

Furthermore, the insulating layer 23-12 has a buffer portion 23-121 located on a surface of the insulating layer 23-12 facing the biasing element 23-WS, and in the direction of the optical axis 23-O, there is a gap (or distance) between the buffer portion 23-121 and the biasing element 23-WS. The buffer portion 23-121 has a function of providing the biasing element 23-WS to be buffered during the movement, which helps to reduce the situation in which the biasing element 23-WS is damaged by the collision. In some embodiments, the buffer portion 23-121 may be of a soft material and have a fillet structure (or curved or rounded structure) or a tapered structure, which may further reduce the damage of the biasing element 23-WS due to collision during the movement.

Still referring to FIGS. 23-6B, when the biasing element 23-WS of the biasing assembly 23-W is assembled to the electrical connection portion 23-101 of the bottom plate 23-10, the biasing element 23-WS is wrapped via the electrically conductive layer 23-13, the insulating layer 23-12 and the fixed body 23-11 which are sequentially arranged from the inside to the outside, and a plurality of clamping forces are applied: a first clamping force 23-F1 and a second clamping force 23-F2 (for example, it is applied by a clamping member (not shown) for assembly). In this embodiment, the first clamping force 23-F1 is applied to a middle position of the first electrical connection portion 23-101, and the second clamping force 23-F2 is applied to one end portion of the first electrical connection portion 23-101 to hold the biasing element 23-WS. The first clamping force 23-F1 is different from the second clamping force 23-F2: the first clamping force 23-F1 is greater than the second clamping force 23-F2. Therefore, the situation that the stress of the biasing assembly 23-W is excessively concentrated to cause damage can be avoided, and the smaller second clamping force 23-F2 applied at the end position can also make the biasing assembly 23-W have better flexible effect.

In another embodiment, the bottom plate 23-10 further includes a first resin member 23-15. Referring to FIGS. 23-6C, the first resin member 23-15 is disposed between the insulating layer 23-12 in the first electrical connection portion 23-101 and the biasing element 23-WS. The first resin member 23-15 in direct contact with the biasing element 23-WS and the insulating layer 23-12 of the first electrical connecting portion 23-101. Via the first resin member 23-15, the end portion of the biasing element 23-WS can be prevented from directly colliding with the first electrical connecting portion 23-101, particularly for the insulating layer 23-12 in the first electrical connecting portion 23-101, to enhance the reliability of the overall organization. Furthermore, the surface of the biasing element 23-WS has a protective layer 23-WSS. When viewed in the direction of the optical axis 23-O, at the end portion of the first electrical connecting portion 23-101 overlapping the biasing element 23-WS, the protective layer 23-WSS partially overlaps the insulating layer 23-12, and also partially overlaps the conductive layer 23-13. This enhances the protection of the biasing element 23-WS as the biasing assembly 23-W moves.

FIG. 23-6D show a schematic view of the connection of the second electrical connection portion 23-102 and the biasing element 23-WS. The bottom plate 23-10 further includes a second resin member 23-16 disposed between and in direct contact with the insulating layer 23-12 in the second electrical connection portion 23-102 and the biasing element 23-WS. Similarly to the aforementioned first resin members 23-15, the second resin members 23-16 can also provide protection for the biasing element 23-WS from being hit against the second electrical connecting portions 23-102 to be damaged. The foregoing first resin member 23-15 and second resin member 23-16 may have a glass fiber or ceramic material, and they may constitute a resin assembly.

FIG. 23-7 show that a distance (or a gap) between the first electrical connection portion 23-101 and the second electrical connection portion 23-102 of the bottom plate 23-10: distance 23-*t*1. That is, the connection line of two is inclined relative to the surface of the bottom plate 23-10. Therefore, the direction in which the first and second electrical connecting portions 23-101, 23-102 are arranged is not perpendicular to and not parallel to the optical axis 23-O as viewed in the direction that is perpendicular to the optical axis 23-O.

FIG. 23-8 show that the bottom plate 23-10 further includes a slider 23-17. The slider 23-17 is disposed between the fixed body 23-11 and the moving member 23-14, and the slider is slidably in contact with the fixed body 23-11 and the moving member 23-14. In this way, it can be ensured that the biasing assembly 23-WS can force the moving member 23-14 to move relative to the fixed body 23-11 to be smoother, thereby improving the performance of the driving mechanism.

FIG. 23-9A shows that the aforementioned bottom plate 23-10 further includes a vibration-damping or (seismic) assembly 23-18. In the present embodiment, the vibration-damping assembly 23-18 has a plurality of (four) damping elements 23-181 corresponding to a plurality of biasing elements 23-WS of the biasing assembly 23-W, respectively. Each of the vibration-damping elements 23-181 is disposed on the biasing element 23-WS and in direct contact with the biasing element 23-WS and the elastic string arm 23-143 of the movable member 23-14, so that the effects of fracture prevention and shock absorption for the biasing element 23-WS can be reached. In this embodiment, each of the vibration-damping elements 23-181 is disposed substantially at a middle position of the first and second electrical connecting portions 23-101 and 23-102. A gap (or distance) 23-*t*2 is between the vibration-damping element 23-181, and another gap (or distance), 23-*t*2' is between the second electrical connection portion 23-102, wherein the gaps 23-*t*2 and 23-*t*2' are substantially equal. When viewed in the direction of the optical axis 23-O, these vibration-damping elements 23-181 surround the optical axis 23-O in a symmetrical form. The vibration-damping elements 23-181 can have a fiberglass or ceramic material.

FIG. 23-9B shows that the bottom plate 23-10 includes another vibration-damping assembly 23-18 of another embodiment in present disclosure. Unlike the embodiment of the vibration-damping assembly 23-18 of FIG. 23-9A, the vibration-damping assembly 23-18 of the present embodiment has more of the vibration-damping elements: first vibration-damping elements 23-181, second vibration-damping elements 23-182 and third vibration-damping elements 23-183. Each first vibration-damping element 23-181 is disposed the middle of the first and second electrical connection portions 23-101 and 23-102; each second vibration-damping element 23-182 is in direct contact with the first electrical connection portion 23-101; and each third vibration-damping element 23-183 is in direct contact with the second electrical connection portion 23-102. Furthermore, there is a gap 23-*t*-3 or 23-*t*3' between two adjacent vibration-damping elements, wherein the gaps 23-*t*-3 or 23-*t*3' are substantially equal. This can further improve the shock absorption effect.

FIG. 23-9C shows that the bottom plate 23-10 includes another vibration-damping assembly 23-18 of another embodiment. Different from the embodiment of the seismic assembly 23-18 of FIG. 23-9B, this vibration-damping assembly 23-18 in this embodiment has more vibration-damping elements: first, second, third, and fourth damping elements 23-181, 23-182, 23-183 and 23-184. The main difference between the embodiments in FIG. 9C and FIG. 23-9B is that in FIG. 9C, there are two damping elements: the first and fourth damping elements 23-181 and 23-184 disposed between the second and third damping elements 23-182 and 23-183, and substantially equal gaps 23-*t*-4, 23-*t*4', and 23-*t*4" are formed between those damping elements. This can further improve the damping effect.

In summary, an embodiment of the present disclosure provides an optical driving mechanism, including a movable portion, a bottom plate and a biasing assembly. The movable portion is configured to sustain an optical element having an optical axis. The bottom plate has a moving member, and the movable portion is movably connected to the bottom plate. The biasing assembly has at least one biasing element and the biasing assembly located between the bottom plate and the movable portion for driving the movable portion to move relative to the bottom plate. The bottom plate defines a first electrical connection portion and a second electrical connection portion, and the biasing element is connected to the first and second electrical connection portions. The first electrical connection portion has a fixed body, an insulating layer and a conductive layer, which are sequentially overlapped along the optical axis. The conductive layer is directly and electrically connected to the biasing element. When viewed along the optical axis, the insulating layer protrudes from the fixed body and the conductive layer.

The embodiments in present disclosure have at least one of the advantages or effects that the optical driving mechanism has better focus function and optical compensation, and can protect the biasing assembly, to greatly reduce the damage or breakage caused by the collision during the movement. In some embodiments, the optical driving mechanism further includes a resin assembly and a vibration-damping assembly disposed on and in direct contact with the biasing element to provide a vibration-damping effect, thereby improving the quality of the driving mechanism.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:

a fixed portion;

a movable portion, movably connected to the fixed portion, comprising:

an optical member holder, supporting an optical member, wherein the optical member can change the moving direction of an external light, the optical member holder comprising:

a surface facing the optical member;

a wall surface facing the optical member, wherein the wall surface is not parallel to the surface; and a glue slot formed on the surface and adjacent to the wall surface; and a spacing member, disposed between the surface and the optical member and forming a gap therebetween;

a driving module, driving the movable portion to move relative to the fixed portion; and an adhesive member, wherein the optical member is connected to the wall surface via the adhesive member and the glue slot is configured to receive the redundant adhesive member.

2. The optical member driving mechanism as claimed in claim 1, wherein the spacing member is adjacent to the edge of the surface.

3. The optical member driving mechanism as claimed in claim 1, wherein the optical member holder further comprises an attaching connected to the surface, and the adhesive member is disposed between the attaching wall and the optical member.

4. The optical member driving mechanism as claimed in claim 3, wherein the glue shot is adjacent to the attaching wall.

5. The optical member driving mechanism as claimed in claim 3, wherein the attaching wall comprises a groove, extending to a lateral side of the attaching wall.

6. The optical member driving mechanism as claimed in claim 1, wherein the optical member holder further comprises an abutting surface, and the optical member holder comprises a cutting surface, wherein the abutting surface connects the surface and faces the cutting surface, and the abutting surface and the cutting surface are substantially parallel.

7. The optical member driving mechanism as claimed in claim 1, wherein the fixed portion has at least three extending portions protruding from a lateral surface of the fixed portion, each of the extending portions has a contacting surface, and the contacting surfaces of the extending portions are coplanar.

8. An optical member driving mechanism, comprising:

a fixed portion;

a movable portion, movably connected to the fixed portion, comprising an optical member holder to support an optical member, wherein the optical member can change the moving direction of an external light from a first direction to a second direction, the optical member holder comprising:

a surface facing the optical member;

a wall surface facing the optical member, wherein the wall surface is not parallel to the surface; and a glue slot formed on the surface and adjacent to the wall surface;

a driving module, driving the movable portion to rotate relative to the fixed portion around a rotation axis, wherein the rotation axis is substantially perpendicular to the first direction and the second direction;

a damping member, connected to the fixed portion and the movable portion, and disposed away from the rotation axis; and an adhesive member, wherein the optical member is connected to the wall surface via the adhesive member and the glue slot is configured to receive the redundant adhesive member.

9. The optical member driving mechanism as claimed in claim 8, wherein the optical member driving mechanism further comprises a plurality of damping members, and the center of the optical member holder is disposed between the damping members.

10. The optical member driving mechanism as claimed in claim 8, wherein the optical member driving mechanism further comprises an elastic member, comprising:

a first fixing section, affixed to the fixed portion;

a second fixing section, affixed to the movable portion; and a string section, connected to the first fixing section and the second fixing section, wherein the damping member is connected to the string section and the first fixing section, or the string section and the second fixing section.

11. The optical member driving mechanism as claimed in claim 10, wherein the optical member driving mechanism further comprises a plurality of elastic members, and the second fixing sections of the elastic members are coplanar.

12. The optical member driving mechanism as claimed in claim 11, wherein the optical member holder comprises a plurality of positioning pillars, and the elastic members comprise a plurality of positioning recesses corresponding to the positioning pillars.

13. The optical member driving mechanism as claimed in claim 12, wherein the optical member driving mechanism further comprises a glue connected the positioning pillars and the second fixing sections.

14. The optical member driving mechanism as claimed in claim 11, wherein the elastic member and the optical member overlap as seen from the rotation axis.

15. The optical member driving mechanism as claimed in claim 11, wherein the fixed portion further comprises a toughened component and a circuit board, wherein the toughened component is disposed on the circuit board, and the circuit board is disposed between the toughened component and the driving module.

16. An optical member driving mechanism, comprising:

a fixed portion;

a movable portion, movably connected to the fixed portion, comprising:

an optical member holder, supporting an optical member, wherein the optical member can change the moving direction of an external light from a first direction to a second direction, the optical member holder comprising:

a surface facing the optical member;

a wall surface facing the optical member, wherein the wall surface is not parallel to the surface; and a glue slot formed on the surface and adjacent to the wall surface; and a rotation restricting structure, formed on the optical member holder and restricting the rotating range of the movable portion;

a driving module, driving the movable portion to rotate relative to the fixed portion around a rotation axis, wherein the rotation axis is substantially perpendicular to the first direction and the second direction; and an adhesive member, wherein the optical member is connected to the wall surface via the adhesive member and the glue slot is configured to receive the redundant adhesive member.

17. The optical member driving mechanism as claimed in claim 16, wherein the rotation restricting structure restricts the shift range of the movable portion.

18. The optical member driving mechanism as claimed in claim 16, wherein the movable portion further comprises a plurality of shift restricting structures, formed on the optical member holder and restricting the shifting distance of the movable portion along the rotation axis.

19. The optical member driving mechanism as claimed in claim 18, wherein when the movable portion rotates relative to the fixed portion and the rotation restricting structure contacts the fixed portion, a gap is formed between the shift restricting structure and the fixed portion.

20. The optical member driving mechanism as claimed in claim 18, wherein when the movable portion shifts relative to the fixed portion and the shift restricting structure contacts the fixed portion, a gap is formed between the rotation restricting structure and the fixed portion.

* * * * *